US007562028B1

(12) United States Patent
Donner

(10) Patent No.: US 7,562,028 B1
(45) Date of Patent: Jul. 14, 2009

(54) SYSTEM AND METHOD FOR DETERMINING AND/OR TRANSMITTING AND/OR ESTABLISHING COMMUNICATION WITH A MOBILE DEVICE USER FOR PROVIDING, FOR EXAMPLE, CONCESSIONS, TOURNAMENTS, COMPETITIONS, MATCHING, REALLOCATING, UPGRADING, SELLING TICKETS, AND OTHER EVENT ADMITTANCE MEAN

(76) Inventor: Irah H. Donner, 310 Lewis Ave., Woodmere, NY (US) 11598

( * ) Notice: Subject to any disclaimer, the term of this patent is extended or adjusted under 35 U.S.C. 154(b) by 0 days.

(21) Appl. No.: 12/011,599

(22) Filed: Jan. 28, 2008

Related U.S. Application Data

(63) Continuation of application No. 11/978,442, filed on Oct. 29, 2007, which is a continuation of application No. 11/639,077, filed on Dec. 14, 2006, now Pat. No. 7,386,517, which is a continuation of application No. 11/028,827, filed on Jan. 5, 2005, now Pat. No. 7,280, 975, which is a continuation-in-part of application No. 10/697,089, filed on Oct. 31, 2003, now Pat. No. 7,216, 109, which is a continuation-in-part of application No. 09/910,821, filed on Jul. 24, 2001, now Pat. No. 7,031, 945.

(60) Provisional application No. 60/220,218, filed on Jul. 24, 2000, provisional application No. 60/226,594, filed on Aug. 21, 2000, provisional application No. 60/534,096, filed on Jan. 5, 2004, provisional application No. 60/548,951, filed on Mar. 2, 2004.

(51) Int. Cl.
*G06F 17/60* (2006.01)

(52) U.S. Cl. ................................................ 705/5; 705/1

(58) Field of Classification Search ..................... 705/5, 705/1
See application file for complete search history.

(56) References Cited

U.S. PATENT DOCUMENTS 4,599,490 A 7/1986 Cornell et al.

(Continued)

FOREIGN PATENT DOCUMENTS

EP 0 597 225 5/1994

(Continued)

OTHER PUBLICATIONS

Whalen, David J. and Gary Churan, "The American Mobile Satellite Corporation Space Segment." American Mobile Satellite Corporation, Washington DC, pp. 394-404.

(Continued)

*Primary Examiner*—Pierre E Elisca
(74) *Attorney, Agent, or Firm*—Thomas, Kayden, Horstemeyer & Risley, LLP

(57) ABSTRACT

A method, system, server architecture and/or tangible medium determines and/or transmits and/or establishes communication with a mobile device user. The method includes, for example, receiving a communication from and/or transmitting a communication to, an event customer, and optionally updating a database to reflect the communication. The method also includes obtaining at least one mobile address, e.g., a telephone number and a communication network used thereon by the event user and building a data address therefrom to establish the communication with the event user. In one embodiment, the method does not require the event user to provide a bbnetwork address associated with the mobile contact address. Various optional embodiments are disclosed.

43 Claims, 46 Drawing Sheets

U.S. PATENT DOCUMENTS

| | | | | |
|---|---|---|---|---|
| 4,700,374 | A | | 10/1987 | Bini |
| 4,724,435 | A | | 2/1988 | Moses et al. |
| 4,740,792 | A | | 4/1988 | Sagey et al. |
| 4,754,495 | A | | 6/1988 | Kawano et al. |
| 4,866,732 | A | | 9/1989 | Carey et al. |
| 4,905,301 | A | | 2/1990 | Krolopp et al. |
| 4,951,279 | A | | 8/1990 | Hotta |
| 4,956,875 | A | | 9/1990 | Bernard et al. |
| 4,972,455 | A | | 11/1990 | Phillips et al. |
| 4,972,456 | A | | 11/1990 | Kaczmarek et al. |
| 5,020,091 | A | | 5/1991 | Krolopp et al. |
| 5,020,092 | A | | 5/1991 | Phillips et al. |
| 5,020,093 | A | | 5/1991 | Pireh |
| 5,073,900 | A | | 12/1991 | Mallinckrodt |
| 5,119,397 | A | | 6/1992 | Dahlin et al. |
| 5,163,131 | A | | 11/1992 | Row et al. |
| 5,216,427 | A | | 6/1993 | Yan et al. |
| 5,239,647 | A | | 8/1993 | Anglin et al. |
| 5,247,699 | A | | 9/1993 | Hartman |
| 5,257,400 | A | | 10/1993 | Yoshida |
| 5,303,286 | A | | 4/1994 | Wiedeman |
| 5,307,400 | A | | 4/1994 | Sawyer et al. |
| 5,339,330 | A | | 8/1994 | Mallinckrodt |
| 5,353,331 | A | | 10/1994 | Emery et al. |
| 5,353,352 | A | | 10/1994 | Dent et al. |
| 5,369,681 | A | | 11/1994 | Boudreau et al. |
| 5,371,898 | A | | 12/1994 | Grube et al. |
| 5,392,355 | A | | 2/1995 | Khurana et al. |
| 5,394,560 | A | | 2/1995 | Kane |
| 5,446,756 | A | | 8/1995 | Mallinckrodt |
| 5,475,734 | A | | 12/1995 | McDonald et al. |
| 5,488,649 | A | | 1/1996 | Schellinger |
| 5,511,233 | A | | 4/1996 | Otten |
| 5,526,404 | A | | 6/1996 | Wiedeman et al. |
| 5,533,023 | A | | 7/1996 | Ohlson et al. |
| 5,535,430 | A | | 7/1996 | Aoki et al. |
| 5,555,257 | A | | 9/1996 | Dent |
| 5,586,165 | A | | 12/1996 | Wiedeman |
| 5,590,395 | A | | 12/1996 | Diekelman |
| 5,592,470 | A | | 1/1997 | Rudrapatna et al. |
| 5,594,740 | A | | 1/1997 | LaDue |
| 5,594,780 | A | | 1/1997 | Wiedeman et al. |
| 5,612,703 | A | | 3/1997 | Mallinckrodt |
| 5,618,045 | A | | 4/1997 | Kagan et al. |
| 5,636,920 | A | | 6/1997 | Shur et al. |
| 5,647,795 | A | | 7/1997 | Stanton |
| 5,649,292 | A | | 7/1997 | Doner |
| 5,659,878 | A | | 8/1997 | Uchida et al. |
| 5,794,207 | A | | 8/1998 | Walker et al. |
| 5,812,968 | A | | 9/1998 | Hassan et al. |
| 5,832,379 | A | | 11/1998 | Mallinckrodt |
| 5,835,857 | A | | 11/1998 | Otten |
| 5,867,765 | A | | 2/1999 | Nilsson |
| 5,878,329 | A | | 3/1999 | Mallinckrodt |
| 5,915,207 | A | | 6/1999 | Dao et al. |
| 5,940,753 | A | | 8/1999 | Mallinckrodt |
| 5,995,832 | A | | 11/1999 | Mallinckrodt |
| 6,038,455 | A | | 3/2000 | Gardner et al. |
| 6,052,629 | A | | 4/2000 | Leatherman et al. |
| 6,091,955 | A | | 7/2000 | Aalto et al. |
| 6,107,932 | A | * | 8/2000 | Walker et al. .............. 340/5.22 |
| 6,108,561 | A | | 8/2000 | Mallinckrodt |
| 6,192,349 | B1 | | 2/2001 | Husemann et al. ............ 705/65 |
| 6,496,809 | B1 | | 12/2002 | Nakfoor ...................... 705/80 |
| 6,738,150 | B1 | | 5/2004 | Claiborne et al. .......... 358/1.11 |
| 2001/0018660 | A1 | | 8/2001 | Sehr .............................. 705/5 |

FOREIGN PATENT DOCUMENTS

| | | | | |
|---|---|---|---|---|
| EP | 0 712 215 | | | 5/1996 |
| EP | 0 750 406 | | | 12/1996 |
| GB | 2265795 | | | 10/1996 |
| JP | 08214362 | | | 8/1996 |
| JP | 10-506517 | | | 6/1998 |
| JP | 10/209939 | | | 8/1998 |
| JP | 2002279269 | A | * | 9/2002 |
| WO | WO 95/19078 | | | 7/1995 |
| WO | WO 99/34636 | | | 7/1999 |

OTHER PUBLICATIONS

Calcutt, David and Laurie Tetley. "Satellite Communications: Principles and Applications."

White, Lawrence, Anil Agarwal, Brian Skerry and Bill Tisdale. "North American Mobile Satellite System Signaling Architecture." American Institute of Aeronautics and Astronautics and Astronautics, Inc. 1992, pp. 427-439.

Lunsford, J., R. Thorne, D. Gokhale, W. Garner and G. Davies. "The AMSC/TMI Mobile Satellite Services (MSS) System Ground Segment Architecture." American Institute of Aeronautics and Astronautics, Inc. 1992, pp. 405-426.

www.salutation.org/simulate.htm.

Green, James Harry. *The Irwin Handbook of Telecommunications*. Irwin Professional Publishing. 2nd ed. 1992.

Gitlin, R. D., J. F. Hayes and S. B. Weinstain. *Data Communications Principles*. Plenum Press, 1992.

Spohn, Darren L. *Data Network Design*. McGraw-Hill Inc., 1993.

Stallings, William. *Computer Organization and Architecture*. MacMillam Publishing Co. 3rd ed. 1993.

Baranowsky II, Patrick W. "MSAT and Cellular Hybrid Networking," *Proceedings of the Third International Mobile Satellite Conference*, Jun. 16-18, 1993, pp. 149-154.

Whalen, David J. and Gary Churan, "The American Mobile Satellite Corporation Space Segment." American Mobile Satellite Corporation, Washington DC, pp. 394-404.

Calcutt, David and Laurie Tetley. "Satellite Communications: Principles and Applications.".

Johanson, Gary A., N. George Davies and William R. H. Tisdale. "Implementation of a System to Provide Mobile Satellite Services in North America." Presented at International Mobile Satellite Conference '93, Jun. 16-18, 1993.

Fasulo, A. and T. Haines. "Westinghouse MSAT Mobile Terminal Channel Emulator." American Institute of Aeronautics and Astronautics, 1993, pp. 256-260.

Harvey, Tony and Vicky Schumaker. "MSAT Communications Controller and Network Operations Center." American Institute of Aeronautics and Astronautics, Inc. 1993, pp. 1-10.

Tisdale, William R. H. and Gary A. Johanson. "Call Control in the AMSC Mobile Satellite Service System." Pre-Publication Review Copy for AIAA: 15th CSSC/Session S-9/Mar. 1, 1994.

McCauley, Robert H. and Jeffrey O. Pike, "Feederlink Earth Station to Provide Mobile Satellite Services in North America." American Institute of Aeronautics and Astronautics, 1994, pp. 1-9.

Kittiver, Charles. "Radio Transmission in the American Mobile Satellite System." American Institute of Aeronautics and Astronautics, 1994, pp. 280-294.

Fong, Kok-Song and Gary Churan. "Mobile Earth Terminal in the AMSC Mobile Satellite Service System." American Institute of Aeronautics and Astronautics, 1994, pp. 1-11.

Boxer, A. "Where Buses Cannot Go." IEEE Spectrum, Feb. 1995, pp. 41-45.

Barroso, L.A. et al. "RPM: A Rapid Prototyping Engine for Multiprocessor Systems." IEEE Computer, Feb. 1995, pp. 26-34.

Katzela, I. and M. Naghshineh. "Channel Assignment Schemes for Cellular Mobile Telecommunication Systems: A Comprehensive Survey." *IEEE Personal Communications*, Jun. 1996, pp. 10-31.

Lutz, Erich. "Issues in Satellite Personal Communication Systems." *Wireless Networks*, 1998, pp. 109-1274.

Wood and Douglas. "Radio Telemetry Applications Manual." *Wood and Douglas Ltd Applications Manual*, Oct. 1999, pp. 1-70.

Toewijzing, Frequentie. *Frequency Assignment, Models and Algorithms*. Nov. 4, 1999, pp. 1-161.

Leavitt, Neal. "Will WAP Deliver the Wireless Internet?" Computer, Technology News, May 2000, pp. 16-20.

Goodman, David J. "The Wireless Internet: Promises and Challenges." *IEEE, Perspectives*, Jul. 2000, pp. 36-41.
Lui-Kwan, Gerald. "In-Flight Entertainment: The Skys's the Limit." *Computer, Entertainment Computing*, Oct. 2000, pp. 98-101.
Oliphant, Malcolm W. "Radio Interfaces Make the Difference in 3G Cellular Systems." *IEEE Spectrum*, Oct. 2000, pp. 53-58.
Boxer, A. "Where Buses Cannot Go." IEEE Spectrum, Feb. 1995, pp. 41-45.
Barroso, L.A. et al. "RPM: A Rapid Prototyping Engine for Multiprocessor Systems." IEEE Computer, Feb. 1995, pp. 26-34.
Richard III, Golden G. *Service Advertisement and Discover*, IEEE Internet Computing, Sep. - Oct. 2000.
Clark, David. "Speech Recognition: The Wireless Interface Revolution." *Computer, Technology News*, Mar. 2001, pp. 16-18.
Ingebretsen, Mark and Matt Siegel. "Cable Slouches Toward Open Access." *IEEE Spectrum*, Apr. 2001, pp. 74-79.
Dixit, Sudhir and Yinghua Ye. "Streamlining the Internet-Fiber Connection." *IEEE Spectrum*, Apr. 2001, pp. 52-57.
Ledbetter, James. "Wireless Promises a Bold Future of Mobile Commerce and Multimedia But Before We Get There, The Telecom Industry Will have to Overcome Five Unspoken Hurdles." *The Industry Standard*, Jun. 25, 2001, pp. 37-44.
Katzela, I. and M. Naghshineh. "Channel Assignment Schemes for Cellular Mobile Telecommunication Systems: A Comprehensive Survey." *IEEE Personal Communications*, Jun. 1996, pp. 10-31.
Lutz, Erich. "Issues in Satellite Personal Communication Systems." *Wireless Networks*, 1998, pp. 109-1274.
Wood and Douglas. "Radio Telemetry Applications Manual." *Wood and Douglas Ltd Applications Manual*, Oct. 1999, pp. 1-70.
Toewijzing, Frequentie. *Frequency Assignment, Models and Algorithms*. Nov. 4, 1999, pp. 1-161.
Leavitt, Neal. "Will WAP Deliver the Wireless Internet?" *Computer, Technology News*, May 2000, pp. 16-20.
Goodman, David J. "The Wireless Internet: Promises and Challenges." *IEEE, Perspectives*, Jul. 2000, pp. 36-41.
Lui-Kwan, Gerald. "In-Flight Entertainment: The Sky's the Limit." *Computer, Entertainment Computing*, Oct. 2000, pp. 98-101.
Oliphant, Malcolm W. "Radio Interfaces Make the Difference in 3G Cellular Systems." *IEEE Spectrum*, Oct. 2000, pp. 53-58.
Clark, David. "Speech Recognition: The Wireless Interface Revolution." *Computer, Technology News*, Mar. 2001, pp. 16-18.
Ingebretsen, Mark and Matt Siegel. "Cable Slouches Toward Open Access." *IEEE Spectrum*, Apr. 2001, pp. 74-79.
Dixit, Sudhir and Yinghua Ye. "Streamlining the Internet-Fiber Connection." *IEEE Spectrum*, Apr. 2001, pp. 52-57.
Parameswaran, Manoj, Anjana Susarla and Andrew B. Whinston. "P2P Networking: An Information-Sharing Alternative." *IEEE, Computing Practices*, Jul. 2001, pp. 31-37.
Wood and Douglas. "Radio Telemetry Applications Manual." *Wood and Douglas Ltd Applications Manual*, Oct. 1999, pp. 1-70.
Toewijzing, Frequentie. *Frequency Assignment, Models and Algorithms*. Nov. 4, 1999, pp. 1-161.
Elsen, Ingo, Frank Hartung, Uwe Horn, Markus Kampmann and Liliane Peters. "Streaming Technology in 3G Mobile Communication Systems." *IEEE, Cover Feature*, Sep. 2001, pp. 46-52.
Danesh, Mina, Juan-Carlos Zuniga and Fabio Concilio. "Fixed Low-Frequency Broadband Wireless Access Radio Systems." *IEEE Communications Magazine*, Sep. 2001, pp. 134-138.
Izadpanah, Hossein. "A Millimeter-Wave Broadband Wireless Access Technology Demonstrator for the Next-Generation Internet Network Reach Extension." *IEEE Communications Magazine*, Sep. 2001, pp. 140-145.
Minoh, Michihiko. "Networked Appliances and Their Peer-to-Peer Architecture AMIDEN." *IEEE Communications Magazine*, Oct. 2001, pp. 80-84.
Ala-Laurila, Juha, Jouni Mikkonen and Jyri Rinnemaa. "Wireless LAN Access Network Architecture for Mobile Operators." *IEEE Communications Magazine*, Nov. 2001 pp. 82-89.
Lawton, George. "Browsing the Mobile Internet." *Computer, Industry Trends*, Dec. 2001, pp. 17-21.
Kagal, Lalana, Tim Finin and Anupam Joshi. "Trust-Based Security in Pervasive Computing Environments." *Computer, Communications*, Dec. 2001, pp. 153-157.
Garber, Lee. "Will 3G Really be the Next Big Wireless Technology?" *Computer, Technology News*, Jan. 2002, pp. 26-32.
Moyer, Stan, Dave Maples, Simon Tsang and Abhrajit Ghosh. "Service Portability of Networked Appliances." *IEEE Communications Magazine*, Jan. 2002, pp. 116-121.
Lienhart, Rainer, Matthew Holliman, Yeh-Kuang Chen, Igor Kozintsev and Minerva Yeung. Improving Media Services on P2P Networks. *IEEE Internet Computing*, Jan.-Feb. 2002, pp. 73-77.
Berezdivin, Robert, Robert Breinig and Randy Topp. "Next-Generation Wireless Communications Concepts and Technologies." *IEEE Communications Magazine*, Mar. 2002, pp. 108-116.
DeVriendt, Johan, Philippe Lainé, Christophe Lerouge and Xiaofeng Xu. "Mobile Network Evolution: A Revolution on the Move." *IEEE Communications Magazine*, Apr. 2002, pp. 104-111.
Raghu, T.S., Ramesh, R. and Andrew B. Whinston. "Next Steps for Mobile Entertainment Portals." *IEEE, Research Feature*, May 2002, pp. 63-70.
Parameswaran, Manoj, Anjana Susaria and Andrew B. Whinston. "P2P Networking: An Information-Sharing Alternative." *IEEE, Computing Practices*, Jul. 2001, pp. 31-37.
Kagal, Lalana, Tim Finin and Anupam Joshi. "Trust-Based Security in Pervasive Computing Environments." *Computer, Communications*, Dec. 2001, pp. 153-157.
Garber, Lee. "Will 3G Really be the Next Big Wireless Technology?" *Computer, Technology News*, Jan. 2002, pp. 26-32.
Moyer, Stan, Dave Maples, Simon Tsang and Abhrajit Ghosh. "Service Portability of Networked Appliances." *IEEE Communications Magazine*, Jan. 2002, pp. 116-121.
Lienhart, Rainer, Matthew Holliman, Yeh-Kuang Chen, Igor Kozintsev and Minerva Yeung. Improving Media Services on P2P Networks. *IEEE Internet Computing*, Jan.-Feb. 2002, pp. 73-77.
Calcutt, David and Laurie Tetley. "Satellite Communications: Principles and Applications.".
White, Lawrence, Anil Agarwal, Brian Skerry and Bill Tisdale. "North American Mobile Satellite System Signaling Architecture." American Institute of Aeronautics and Astronautics and Astronautics, Inc. 1992, pp. 427-439.
Lunsford, J., R. Thorne, D. Gokhale, W. Garner and G. Davies. "The AMSC/TMI Mobile Satellite Services (MSS) System Ground Segment Architecture." American Institute of Aeronautics and Astronautics, Inc. 1992, pp. 405-426.
www.salutation.org/simulate.htm.
Green, James Harry. *The Irwin Handbook of Telecommunications*. Irwin Professional Publishing. 2nd ed. 1992.
Gitlin, R. D., J. F. Hayes and S. B. Weinstain. *Data Communications Principles*. Plenum Press, 1992.
Spohn, Darren L. *Data Network Design*. McGraw-Hill Inc., 1993.
Stallings, William. *Computer Organization and Architecture*. MacMillam Publishing Co. 3rd ed. 1993.
Baranowsky II, Patrick W. "MSAT and Cellular Hybrid Networking," *Proceedings of the Third International Mobile Satellite Conference*, Jun. 16-18, 1993, pp. 149-154.
Whalen, David J. and Gary Churan, "The American Mobile Satellite Corporation Space Segment." American Mobile Satellite Corporation, Washington DC, pp. 394-404.
Calcutt, David and Laurie Tetley. "Satellite Communications: Principles and Applications.".
Johanson, Gary A., N. George Davies and William R. H. Tisdale. "Implementation of a System to Provide Mobile Satellite Services in North America." Presented at International Mobile Satellite Conference '93, Jun. 16-18, 1993.
Fasulo, A. and T. Haines. "Westinghouse MSAT Mobile Terminal Channel Emulator." American Institute of Aeronautics and Astronautics, 1993, pp. 256-260.
Harvey, Tony and Vicky Schumaker. "MSAT Communications Controller and Network Operations Center." American Institute of Aeronautics and Astronautics, Inc. 1993, pp. 1-10.
Tisdale, William R. H. and Gary A. Johanson. "Call Control in the AMSC Mobile Satellite Service System." Pre-Publication Review Copy for AIAA: 15th ICSSC/Session S-9/Mar. 1, 1994.
McCauley, Robert H. and Jeffrey O. Pike, "Feederlink Earth Station to Provide Mobile Satellite Services in North America." American Institute of Aeronautics and Astronautics, 1994, pp. 1-9.

Kittiver, Charles. "Radio Transmission in the American Mobile Satellite System." American Institute of Aeronautics and Astronautics, 1994, pp. 280-294.

Fong, Kok-Song and Gary Churan. "Mobile Earth Terminal in the AMSC Mobile Satellite Service System." American Institute of Aeronautics and Astronautics, 1994, pp. 1-11.

"Toronto Blue Jays 'Take Baseball to the People' With Xybernaut® Wearable Computers", www.xybernaut.com, Apr. 8, 2002.

Wolverton, Troy, "Ticket market meets its digital future", www.news.com, May 21, 2002.

Sairam, K., N. Gunasekaran, S. Rama Reddy, "Bluetooth in Wireless Communications", *IEEE Communications Magazine*, Jun. 2002, pp. 90-96.

Cochennec, Jean-Yves, "Activities on Next-Generation Networks Under Global Information Infrastructure in ITU-T", *IEEE Communications Magazine*, Jul. 2002, pp. 98-101.

Personick, Stewart D., "Evolving toward the Next-Generation Internet: Challenges in the Path Forward", *IEEE Communications Magazine*, Jul. 2002, pp. 72-76.

Farber, David J., "Predicting the Unpredictable: Future Directions in Internetworking and Their Implications", *IEEE Communications Magazine*, Jul. 2002, pp. 67-71.

Andrews, Frederick T., "The Telephone Network of the 1960s", *IEEE Communications Magazine*, Jul. 2002, pp. 49-53.

Baran, Paul, "The Beginnings of Packet Switching: Some Underlying Concepts", *IEEE Communications Magazine*, Jul. 2002, pp. 42-48.

Soriano, Miguel and Diego Ponce, "A Security and Usability Proposal for Mobile Electronic Commerce", *IEEE Communications Magazine*, Aug. 2002, pp. 62-67.

Demestichas, Panagiotis, Louisa Papadopoulou, Vera Stavroulaki, Michael Theologou, Guillaume Vivier, Georges Martinez and Fabio Galliano, "Wireless Beyond 3G: Managing Services and Network Resources", Aug. 2002, pp. 80-82.

Huber, Josef F., "Toward the Mobile Internet", Oct. 2002, pp. 100-102.

Schilit, Bill N., Jonathan Trevor, David M. Hilbert, Tzu Khiau Koh, "Web Interaction Using Very Small Internet Devices", IEEE Oct. 2002, pp. 37-45.

El-Sayed, Mohamed and Jeffrey Jaffe, "A View of Telecommunications Network Evolution", IEEE Communications Magazine, Dec. 2002, pp. 74-81.

Nava, Mario Diaz and Goran S. Okvist, "The Zipper Prototype: A Complete and Flexible VDSL Multicarrier Solution", *IEEE Communications Magazine*, Dec. 2002, pp. 92-106.

Henry, Paul S. and Hui Luo, "WiFi: What's Next?", *IEEE Communications Magazine*, Dec. 2002, pp. 66-72.

Rege, Kiran, Subra Dravida, Sanjiv Nanda, Sriram Narayan, Jerome Strombosky, Manas Tandon, and Dev Gupta, "QoS Management in Trunk-and-Branch Switched Ethernet Networks", *IEEE Communications Magazine*, Dec. 2002, 30-36.

Oh-ishi, Tetsuya, Koji Sakai, Kazuhiro Kikuma, and Akira Kurokawa, "Study of Relationship between Peer-to-Peer Systems and IP Multicasting", *IEEE Communications Magazine*, Jan. 2003, pp. 80-84.

Paulson, Linda Dailey, "Low-Power Chips for High-Powered Handhelds", Jan. 2003, pp. 21-23.

* cited by examiner

SYSTEM AND METHOD FOR DETERMINING AND/OR TRANSMITTING AND/OR ESTABLISHING COMMUNICATION WITH A MOBILE DEVICE USER FOR PROVIDING, FOR EXAMPLE, CONCESSIONS, TOURNAMENTS, COMPETITIONS, MATCHING, REALLOCATING, UPGRADING, SELLING TICKETS, AND OTHER EVENT ADMITTANCE MEAN

RELATED APPLICATIONS

This application is a continuation of U.S. application Ser. No. 11/978,442, filed Oct. 29, 2007, entitled "SYSTEM AND METHOD FOR DETERMINING AND/OR TRANSMITTING AND/OR ESTABLISHING COMMUNICATION WITH A MOBILE DEVICE USER FOR PROVIDING, FOR EXAMPLE, CONCESSIONS, TOURNAMENTS, COMPETITIONS, MATCHING, REALLOCATING, UPGRADING, SELLING TICKETS, AND OTHER EVENT ADMITTANCE MEANS, GOODS AND/OR SERVICES", which, in turn is a continuation of U.S. application Ser. No. 11/639,077, filed Dec. 14, 2006, entitled "SYSTEM AND METHOD FOR DETERMINING AND/OR TRANSMITTING AND/OR ESTABLISHING COMMUNICATION WITH A MOBILE DEVICE USER FOR PROVIDING, FOR EXAMPLE, CONCESSIONS, TOURNAMENTS, COMPETITIONS, MATCHING, REALLOCATING, UPGRADING, SELLING TICKETS, AND OTHER EVENT ADMITTANCE MEANS, GOODS AND/OR SERVICES", which, in turn, is a continuation of U.S. application Ser. No. 11/028, 827, filed Jan. 5, 2005 and entitled "SYSTEM AND METHOD FOR DETERMINING AND/OR TRANSMITTING AND/OR ESTABLISHING COMMUNICATION WITH A MOBILE DEVICE USER FOR PROVIDING, FOR EXAMPLE, CONCESSIONS, TOURNAMENTS, COMPETITIONS, MATCHING, REALLOCATING, UPGRADING, SELLING TICKETS, AND OTHER EVENT ADMITTANCE MEANS, GOODS AND/OR SERVICES", which, in turn is a continuation-in-part application of, and claims priority to, U.S. application Ser. No. 10/697,089 filed on Oct. 31, 2003 and entitled "SYSTEM AND METHOD FOR REALLOCATING AND/OR UPGRADING AND/OR REWARDING TICKETS, OTHER EVENT ADMITTANCE MEANS, GOODS AND/OR SERVICES," which in turn is a continuation-in-part application of, and claims priority to, U.S. application Ser. No. 09/910,821 filed on Jul. 24, 2001 and entitled "SYSTEM AND METHOD FOR REALLOCATING AND/OR UPGRADING AND/OR REWARDING TICKETS, OTHER EVENT ADMITTANCE MEANS, GOODS AND/OR SERVICES," which in turn claims priority to both U.S. provisional application Ser. No. 60/220,218 filed on Jul. 24, 2000 and entitled "SYSTEM AND METHOD FOR REALLOCATING AND/OR UPGRADING TICKETS OR OTHER EVENT ADMITTANCE MEANS", and U.S. provisional application Ser. No. 60/226,594 filed on Aug. 21, 2000 and entitled "SYSTEM AND METHOD FOR REALLOCATING AND/OR UPGRADING TICKETS OR OTHER EVENT ADMITTANCE MEANS", and the details of all the above applications are hereby incorporated by reference. This application also claims priority to U.S. provisional applications Ser. Nos. 60/534,096, filed on Jan. 5, 2004, 60/548,951, filed Mar. 2, 2004, and 60/599,010, filed Aug. 6, 2004, all of which are hereby incorporated by reference.

FIELD OF THE INVENTION

The present invention relates generally to purchasing and provisioning items or services online for reallocating and/or upgrading and/or rewarding tickets and/or other goods/services, and more particularly, to a system, method, and computer readable medium storing computer-executable instructions for upgrading, reallocating, purchasing, and/or being rewarded items or services including event tickets, concessions, trivia competitions and/or merchandise over a data communication network and provisioning these purchases for, for example, reallocating and/or upgrading tickets.

Provisioning, as defined herein, includes in whole or in part, the process of effectuating and/or facilitating the processing of a transaction, including, for example, the sale and/or transfer and/or reallocation of tickets, goods, services, and the like, for movies, theatre, shows, sporting events, cultural events, and other non-event related purchases, services, and the like.

BACKGROUND OF THE INVENTION

U.S. Pat. No. 6,052,629 to Leatherman et al. (Leatherman), incorporated herein by reference, is directed to an Internet capable browser dispenser architecture. As shown in prior art FIG. 1 (FIG. 1 of Leatherman), the system of Leatherman includes a plurality of fuel dispensers 12, each having at least two fueling positions and acting as a point of sale (POS) interface. Connected to the fuel dispensers 12 is a main service station store 16, a local server 18, a convenience store 20, a number of restaurants 22, and a car wash 24, as well as other remote servers 26 via the Internet. Basically, the system of Leatherman provides gas station customers with access to a server on a local network and remote sites via the Internet. With this arrangement, the gas station customers may purchase services at the POS dispensers and be subject to advertisements transmitted thereto. However, while Leatherman discusses purchasing items at a gas station, it makes no disclosure of effectively provisioning and/or performing transactions in the entertainment and/or ticketing industry.

U.S. Pat. No. 5,618,045 to Kagan et al. (Kagen), incorporated herein by reference, relates to an interactive game system. As depicted in prior art FIG. 2 (FIG. 1 of Kagen), the interactive game system 610 of Kagen includes three playing devices 612, 614, and 616, which communicate via a wireless local area network. Communication is effected utilizing short-range radio, infrared, or ultra-sonic signals. As shown in prior art FIG. 3 (FIG. 2 of Kagen), each playing device includes a processor 718, an interface 720, a transmitter 722, a receiver 724 and a display 726. Using these components, a player's actions are transmitted to and received by another player's playing device.

U.S. Pat. No. 5,636,920 to Shur et al. (Shur), incorporated herein by reference, relates to a sports team organizer. In prior art FIG. 4 (FIG. 1 of Shur), a portable computing device for organizing a sports team includes an input device 812, a processor 814, a memory 816, a number of stored programs 818, and an output device 820. With these elements, the organizing system allows a team roster, a starting lineup, and a number of drills to be generated.

U.S. Pat. No. 5,647,795 to Stanton (Stanton), incorporated herein by reference, relates to portable computerized parimutuel sports entertainment system. In prior art FIG. 5 (FIG.

1 of Stanton), the system includes a computer 911 and conductor 916, a video cassette recorder 912 with video tape 917, a television set 913, keypads 914, and printers 915. The computer 911 operates as a main computing server, and includes a motherboard 920, a memory card 921, and a number of graphics and other serial cards 922, 923, and 924. With this system, bets are entered from remote locations with keypads 914 and stored in computer 911. After a race, winnings are collected at the cashiers' windows (keypads 914).

The above cited patents are relevant from the perspective that wireless devices are gaining more popularity in today's society.

U.S. Pat. No. 5,794,207 to Walker et al. (Walker), incorporated herein by reference, relates to a method and apparatus for a cryptographically assisted commercial network system designed to facilitate buyer-driven conditional purchase offers. In prior art FIG. 6 (FIG. 1 of Walker), the system includes seller interfaces 300, central controller 200, and buyer node 400. A number of modems 350 and 450 facilitate connection to central controller 200. Using these components, a buyer communicates a binding purchase offer to a number of sellers. In response, the sellers have the option to accept a purchase offer and thus bind the corresponding buyer to a contract. Nevertheless, Walker makes no mention of allowing redemption of the purchases at a point of sale location upon identification or verification of the purchaser or of the purchase.

FIGS. 7-9 show a prior art radio frequency (RF) transmission system 100, as disclosed in U.S. Pat. No. 5,819,172, incorporated herein by reference, for transmitting information from one of a plurality of originating processors A-N to at least one of a plurality of destination processors (A-N) which may be transported during operation. The system 100 includes at least one gateway switch 150 that stores information received from one of the at least one originating processor prior to transmission of the information to the at least one destination processor; a RF information transmission network 130 for transmitting stored information received from one of the at least one gateway switch 150 by RF transmission to at least one destination processor; and at least one interface switch 162 that connects a gateway switch 150 to the RF transmission network 100 and transmits stored information received from one of the at least one gateway switch 150 to the RF information transmission network 100.

The information is transmitted to a receiving interface switch by the electronic mail system in response to an address of the receiving interface switch which has been added to the information originated by the originating processor by either the originating processor or gateway switch 14. The information is transmitted from the receiving interface switch to the RF information transmission network 130 with an address of the destination processor to receive the information which has been added by either the originating processor, a gateway switch or the receiving interface switch.

More particularly, FIG. 8 illustrates a block diagram of the connection between a plurality of gateway switches with mailboxes 150 in different electronic mail systems to the RF information transmission network 160. Multiple gateway switches with mailboxes 150 from a single electronic mail system 1-N may be connected to each interface switch 162 instead of the connection of a single gateway switch with a mailbox to a single interface switch as illustrated. A plurality of interface switches 162 connect information transmitted from at least one electronic mail system as illustrated in FIG. 7. Optionally, a plurality of electronic mail systems 1-N are connected to a data input port of the RF information transmission system which is preferably hub switch 116. The dotted line communication paths 163 illustrate optional information transmissions in which information from a plurality of different electronic mail systems is concentrated at a single interface switch 304. The dotted line communication paths 161 illustrate connections to additional gateway switches with mailboxes 150 within electronic mail systems 1-N.

The interface switches 162 function as a security check to determine that information transmissions originating from a gateway switch with mailbox 150 represent transmissions which should be coupled to a hub switch 116 of the RF information transmission network 160. The security check is performed by the interface switch 162 comparing the identification number of the RF receiver 119 which has been added by either an originating processor A-N or a gateway switch with mailboxes 150 with permissible identification numbers or the interface switch performing the addition of the identification number.

The interface switch 162 also removes information added by the electronic mail system 1-N to the information originated by the originating processor A-N from the stored information received from one of the gateway switches 14, and adds information used by the RF information transmission network 130 during transmission of the information originated at the originating processor to a RF receiver 119 in the RF information transmission network 130 which receives the information and transfers it to the destination processor A-N. Additionally, the interface switch 162 encodes data, which is required to format the display of the cathode ray tube (CRT) of the destination processor for the electronic mail system to which the destination processor is connected, in the form of a character or characters which are decoded by either the RF receiver 119 or the destination processor A-N. This information is added in decoded form back to the information which is processed by the destination processor with a format of the electronic mail system to which the destination processor A-N is connected.

The interface switches 162 also function to store information which has been stored by at least one gateway switch 150 that is received from a plurality of originating processors, and assemble the information from a plurality of originating processors into a packet having a predetermined format and transmit the packet to the hub switch 116 within the RF information transmission network 160. The hub switch is the preferable node in the RF information transmission network to which communications from the gateway switches 150 should be transmitted as a consequence of it having jurisdiction over both local access and transport area (LATA) switches 150 and the local switches 112 in the RF information transmission network, which results in lesser network overhead.

The hub switch 116 receives the packet from the receiving interface switch 162 and disassembles the packet into information from the plurality of originating processors. The originating processors are either within a single electronic mail system such as system 1, or from a plurality of electronic mail systems, such as systems 1-N, or from outside of any electronic mail system from at least one additional processor 312 which is connected directly to interface switch 162 to originate information to be transmitted to a destination processor A-N in an electronic mail system as described below. The RF information transmission network 130 transmits the disassembled information from the hub switch 116, including the identification number of the RF receiver 119 transferring information, to the destination processor A-N to a local switch 112 storing the file identified by the identification number and any destination of the RF receiver in the RF information transmission network to which the information and identification number is to be transmitted by the RF information transmission network, and adds any destination of the RF receiver to the information. The RF information transmission network, in response to any added destination, transmits the information and identification number to the destination for RF broadcast to the RF receiver 119 for transfer to the destination processor A-N.

The information is transmitted to a receiving interface switch 162 from one or more gateway switches 150 by one or more electronic mail systems 1-N in response to an address of the receiving interface switch which has been added to the information originated by the originating processor by either the originating processor or gateway switch. The information is transmitted from the receiving interface switch 162 to the RF information transmission network with an address of the destination processor, such as a name of a user of the destination processor A-N, to receive the information which has been added by either the originating processor A-N, a gateway switch 150 or the receiving interface switch 304.

Preferably, the address of the receiving interface switch is a code word, such as "TF-MOBOX", which is recognized throughout the electronic mail system when appended to information as directing the information to be transmitted to the interface switch 304. The address of the destination processor is preferably the identification number of the RF receiver 119 within the RF information transmission network 160. The address of the receiving interface switch may be added to the information originated by the originating processor, by a gateway switch 150 or by the originating processor A-N. The address of the receiving interface switch 162 may be added to the information by matching an identification of the destination processor A-N which may be the name of the individual utilizing the processor or some other information to add an address of an interface switch such as the aforementioned "TF-MOBOX" stored with the matched identification of the destination processor to the information as the address of the receiving interface switch.

Alternatively, the originating processor may be used to add the address of the receiving interface switch 150 by inputting the address of the receiving interface switch (TF-MOBOX) along with an identification of the destination processor A-N (name of recipient using the processor).

The originating processor A-N may also add the address of the receiving interface switch 162 by matching an identification of the destination processor (name of the user of the processor) with a stored identification of a destination processor and adding an address of the interface switch (TF-MOBOX) stored with the matched identification of the destination processor to the information as the address of the receiving interface switch.

The identification number may be added to the information originated by the originating processor or, alternatively, maybe added by the originating processor by matching an identification of the destination processor (the name of the user of the processor) with a stored identification of a destination processor (the authorized user of the destination processor) and adding an identification number stored with the matched identification of the destination processor to the information as the identification number of the RF receiver 119. Alternatively, the aforementioned matching process may be performed by either the gateway switch 150 or the interface switch 304. The additional processors 312 originates information from outside of any electronic mail system.

Processors 312 provide an address of at least one destination processor in an electronic mail system, such as the name of the user, to receive information transmitted by the RF information transmission system 160, or an identification number of the RF receiver 119 receiving information and transferring the information to the destination processor. The interface switch 162 which receives the information from each processor 312 adds information used by the RF information transmission network 130 during transmission of the information to the RF receiver 119 receiving the information in the same manner as described above with respect to the interface switch 304.

Processors 312 are only required to have a telephone modem and support programming to format information for RF transmission to a destination processor A-N within any one of one or more electronic mail systems 1-N. The processors 312 are not required to have the necessary electronic mail system software present in originating processors A-N or interconnections with an electronic mail system. As a result of the connection to the interface switch 304, information originating from the additional processors 312 may be transmitted by RF transmission to a destination processor A-N within any one or a plurality of electronic mail systems with the user of the processor 312, the processor 312 or the interface switch 162 only having to supply an identification number of the receiver 119 to input information into the RF information transmission system 130 for RF transmission to a destination processor.

The difference between originating information by one of the additional processors 312 outside of any electronic mail system and originating information by one of the processors within one of the electronic mail systems is that the direct connection of the additional processor to the interface switch 162 eliminates the requirement for the adding of an address of the interface switch 162 which is required by the electronic mail systems to forward the information to the interface switch where necessary formatting of the information to be compatible with the RF information transmission system is performed. The interface switch 162 packetizes information originating from the additional processors 312 in the same manner as described above with respect to information originating from within an electronic mail system.

Information from within an electronic mail system and originating from additional processors 312 outside of the electronic mail system may be formatted into the same packets which are forwarded to the hub switch 116. Additionally, interface switch 162 may be connected only to the additional processors 312 to provide an interface only for processors outside of any electronic mail system to destination processors A-N within one or more electronic mail systems 1-N. The only information which is necessary to be inputted by the additional processors 312 is the address of the destination processor (user of the processor). The addition of the identification number of the receiver 119 may be added by matching of an identification of the destination processor with stored destination processors within the additional processor 312, or the interface switch 162 with an identification number of the receiver 119 stored with an identification of a destination processor A-N used as an identification of the destination processor upon a match having been made.

Prior art FIGS. 7-9, however, do not generally relate to, for example, providing an integrated or combination real time and polled electronic messaging system, method and/or a computer readable medium storing computer-executable instructions for enabling e-mail messages and/or other data messages and/or services to be transmitted and/or received via a wireless communications device on either a real time and/or polled basis In recent years, technological advance and consumer demand together have made wireless messaging and related services (e.g., eLink$^{SM}$ provided by Motient Corporation, Reston, Va.) increasingly popular. These services allow users to, for example, send and receive e-mail messages, as well as provide other messaging services such as paging and faxing. Such e-mail messages are generally received on either a polled or real time basis, where the user has to select the preferred delivery method.

In a polled delivery scheme, the user's existing Internet e-mail account is "extended" via a wireless communications device. For example, in the case of eLink[SM], messages are retrieved from, for example, a Post Office Protocol 3 (POP3) or Internet Messaging Access Protocol 4 (IMAP4) server and forwarded to a user's wireless device. Using a wireless device, users can access their Internet mailbox either automatically by, for example, setting one or more times at which they wish to receive their messages, or manually by, for example, clicking a "Get Messages" or similar icon. Other ways of accessing the mailbox are also optionally possible. In a real time delivery scheme, user's are generally provided a new, unique e-mail address, which obviously provides the user with an e-mail account that is separate from their desktop e-mail account. For example, in the case of eLink[SM], user's are provided a unique e-mail address having the form <username>@2way.net. Other message forms and/or domain names may also optionally be utilized. Such wireless schemes also generally allow users to respond to e-mails in a way such that they appear as though they are originated from the user's e-mail system residing on their desktop PC.

Accordingly, the above prior art is cited as background, none of which relates to the reallocating and/or reprovisionsing and/or upgrading and/or rewarding of tickets at events or other goods and services as described in connection with the detailed description below.

SUMMARY OF THE INVENTION

Driven by a widespread understanding of the Internet's capabilities, the power of electronic commerce, and advances in wireless technologies and devices, mobile commerce (m-commerce) is rapidly approaching the business forefront. According to independent research findings, m-commerce—the conduct of business and services over portable, wireless devices will soon be a dominant force in business and society. For example:

IDC, an information technology research firm, reports that 70 percent of all wireless subscribers worldwide will access data applications via their phones by 2002.

The investment firm Robinson Humphrey predicts that, in the US, 50 percent of Internet hits will originate from wireless devices by 2004.

The Yankee Group, a telecommunications research firm, projects that by 2004 more than 40 percent of wireless users in the US will access Internet content directly from their mobile devices. The viability of these projections depends on the power of the underlying technology drivers and the attractiveness of m-commerce applications. To compete in a marketplace dominated by wireless devices, businesses must devise effective m-commerce strategies. Building successful strategies begins by recognizing the forces driving m-commerce's emergence.

The US Federal Communication Commission's auctioning of personal communication-service spectrum space in the mid-1990s triggered the current rush to wireless communication methods. Wireless communication now encompasses not only telephones but appliances, including personal digital assistants (PDAs).

Internet use has grown on the strength of PC networks. According to Yankee Group projections, the installed base of PCs will reach 500 million by 2003, as FIG. 10 shows. This huge base is essential to continued growth in electronic commerce and other communications applications. Moreover, because these systems will have greater power and storage capability, as well as the best ever price-performance ratios, more powerful and sophisticated applications will likely emerge for desktop computing and the Internet.

Although these expectations are impressive, PCs still have two limiting characteristics. First, users must sit in front of them. Second, even portable-notebook PCs have to load software, dial into and connect with a network service provider, and await completion of the handshaking process before they can launch an Internet application. This sequence is understandable, but at best it seems a tolerable nuisance. Hence, the dominant applications are still those that are worth the trouble it takes for a user to follow this access sequence or, at least, to keep the computer and applications running.

The aggregate PC installation is substantial, but even more mobile communication devices are in use. The Gartner Group and other research firms project that by 2004, the installed base of mobile phones worldwide will exceed 1 billion more than twice the number of PCs. In addition, the number of other wireless mobile devices will also increase dramatically. Wireless PDA use will more than triple in the next three years. Unlike PCs, these wireless devices require no boot sequence, so people can use them as soon as they turn them on-making them attractive for quick-hit applications.

Just as the transmission control protocol/Internet protocol and the general purpose browser were principal drivers of Internet growth, letting disparate devices interconnect and communicate, similar factors will simplify the interconnectivity and communication of heterogeneous wireless devices. As FIG. 11 shows, mobile network carriers have relied on a variety of incompatible wireless access standards. Recently, however, a common communications technology and uniform interface standard for presenting and delivering wireless services on mobile devices-wireless application protocol (WAP)—have emerged.

WAP specifications include a microbrowser; scripting similar to JavaScript; access functions; and layered communication specifications for sessions, transport, and security. These specifications enable interface-independent and interoperable applications. Most wireless handset and device manufacturers, as well as several service and infrastructure providers, have adopted the WAP standard.

Current access technologies, including TDMA (time division multiple access), CDMA (code division multiple access), and GSM (Global System for Mobile Communication), transmit at 9.6 to 19.2 Kbps. These speeds are dramatically slower than the dial-up rates of desktop PCs connecting to the Internet. Although m-commerce is possible at these bandwidth rates, the slow speeds are not conducive to creating widespread business or consumer participation.

3G (third-generation) wireless technology will also be available. In addition to having greater bandwidth rates, with speeds up to 2 Mbps, 3G will support multimedia transmission. Integrating voice, data, and one- or two-way video will let m-commerce run over any wireless device.

M-commerce applications fall into three main categories: transaction management, digital content delivery, and telemetry services. Users will increasingly initiate a wide range of business transactions from mobile devices. Online shopping sites tailored to mobile phones and PDAs including browsing, selection, purchase, payment, and delivery—have already emerged. These sites include all the necessary shopping features, such as online catalogs, shopping carts, and back office functions. Online booksellers are among the firms that have already implemented wireless shopping transactions. Another class of m-commerce transactions involves using wireless devices to initiate and pay for purchases and services in real time. These kinds of transactions will likely increase as users gain the capability—and become comfortable enough-to manage them. The highest m-commerce transaction volume will probably occur in micro transactions. When individuals reach for their e-cash-equipped mobile phones or PDAs-rather than coins-to settle transactions such as subway fees, widespread use of digital cash will be a reality.

Digital content delivery uses the wireless channel's distribution characteristics. These m-commerce activities include information browsing-instant retrieval of status information (weather, transit schedules, sports scores, ticket availability, and market prices)—and directory services. The CNN Wireless news subscription service and the UPS PDA-linked package tracking and locator service are representative of emerging content delivery services.

Digital products easily transport to and from wireless devices. Hence, downloading entertainment products-for example, MP3 music-is likely to become even more commonplace when 3G arrives. Transferring software, high resolution images, and full-motion advertising messages will also become common activities. The emergence of high-quality display screens and greater bandwidth will undoubtedly trigger the development of innovative video applications. Individuals will use wireless devices to access, retrieve, store, and display high-resolution video content for entertainment, product demonstration, and distance learning.

The transmission and receipt of status, sensing, and measurement information-telemetry services-form the basis for a wide range of new applications involving mobile devices. Innovations in this area let people use wireless phones and appliances to communicate with various devices from their homes, offices, or in the field. For instance, delivery drivers will "ping" intelligent dispensing machines or store computers to determine where their rolling inventory is needed most or which locations need immediate service. Similarly, users will transmit messages to activate remote recording devices or service systems.

Active m-commerce applications function only when someone directly initiates them by transmitting payment details, requesting information, receiving specific content, or retrieving status information. In contrast, passive applications occur without the user taking any action—for example, the automatic collection of toll charges with dedicated cash cards. Integrating digital cash into mobile devices would make these cash cards unnecessary. These wireless devices would facilitate and record payment of toll, mass-transit, fast-food, and other transactions without the user authorizing or entering identification information for each individual transaction. Users could arrange to have their cash chips update automatically by directing the wireless device to contact their money source and download additional digital cash whenever necessary.

Popular in Europe, short messages text messages, up to 160 characters in length, that show up on the recipient's display as they arrive—are examples of passive content delivery. As digital convergence becomes more commonplace, all forms of mail will passively go to wireless devices, including digitized voice mail, fax documents, and e-mail. Passive security, intrusion, and emergency telemetry services will refine the monitoring of facilities and individuals. Any unusual event or unacceptable condition will trigger user notification, regardless of location. Airlines are testing technology that will let them alert passengers, especially frequent fliers, to seat upgrades, schedule changes, and so on, through wireless devices. Some airlines already have prototype telemetry systems that transmit this kind of information to passengers as soon as they enter the airport or pass near a kiosk-like device.

Passive m-commerce telemetry is the foundation of still another form of interactive marketing. Stores will be able to market their products and services by transmitting promotional coupons and messages to passers by: "Come in and enjoy a complimentary cup of our new coffee blend," or "Get half off, if you make your purchase within the next 30 minutes." This type of marketing may give rise to a new challenge: managing m-junk messages without turning off your wireless device.

The technology to facilitate m-commerce is within reach, even as barriers to its development fall away. Applications and wireless devices promise to evolve together, each driving the introduction of innovative and powerful features in the other. The opportunity and challenge is for business to develop strategies that capitalize on the strengths of mobile commerce, thereby helping it to compete in an increasingly digital marketplace. The greatest challenge to structuring such a strategy may be creating the innovations that will meet the needs and expectations of consumers and commercial participants. Additional details regarding the above may be found in James A. Senn, The Emergence of M-Commerce, IEEE COMPUTER (December 2000), incorporated herein by reference and all references cited there incorporated herein by reference.

Mobile device and computer users increasingly face the management of many computing devices. One reason is the expansion of computing environments in the home and office, as printers, scanners, digital cameras, and other peripherals are integrated into networked environments. Another reason is the proliferation of mobile devices such as laptop and palm-sized computers, cellular phones, and pagers. Because these devices trade functionality for suitable form factors and low power consumption, they are necessarily "peripheral-poor" and must therefore establish connections to neighboring devices for storage, faxing, high-speed network access, and printing. It is easy to become frustrated when dealing with the configuration and interaction of such a multitude of devices. Service discovery technologies were developed to reduce this frustration and to simplify the use of mobile devices in a network by allowing them to be "discovered," configured, and used by other devices with a minimum of manual effort. Although most of these "service discovery suites" promise similar functionality—namely, reduced configuration hassles, improved device cooperation, and automated discovery of required services—they come at the problem from different philosophical and technical approaches. Since none of these technologies is a superset of the others and none is mature enough to dominate the market, interoperation among them will require bridging mechanisms. Five competing technologies are described that may be used in conjunction with the present invention, however, other technologies may also or alternatively be used.

Thus, to address the above and other needs of the prior art, it is a feature and advantage of the present invention to provide users with the ability to be awarded, reallocated, upgraded and/or reprovisioned purchase items including tickets and concessions and/or other merchandise and/or services such as trivia competitions online. By doing so, the present invention allows these users to proceed directly to the event and/or receive the goods and/or services, thereby bypassing any box offices. In addition, the present invention allows purchases of a variety of items such as movie tickets, concessions, movie merchandise, and/or other goods or services using the processes and architecture described herein or other standard platforms. The present invention facilitates these purchases and the subsequent provisioning thereof by utilizing an identification device associated with a user's account which, in turn, is readable by a reader at a point of sale location for verifying the purchases made by the user. The identification device can be, for example, a smart card and/or wireless device with infrared and/or bluetooth enabled, or other standard wireless device, including those described herein.

It is also another optional feature and advantage, alone or in combination with one or more other features, of the present invention to facilitate the provisioning of demographic information to program sponsors. By having each user register demographic information such as age and interests during, for example an initialization process, the present invention compiles information for advertising and marketing use. Using this information, the present invention allows event sponsors to create custom offerings to users. Similarly, the invention allows a sponsor to leverage user and market information to create programs that address evolving user needs for targeting and acquiring new customers.

It is another optional feature and advantage of the present invention to provide marketing opportunities for the events themselves and/or event related merchandise at an entertainment site. This allows users to shop for tickets, concessions, and event-related merchandise at a single time and location.

It is yet another optional feature and advantage of the present invention to apply these concepts to a wide variety of venues such as movies, concerts, sporting events, cultural activities, reserved seating events, events requiring advanced ticket purchase, and/or other similar and analogous events or settings where goods and/or services can be sold, including upgraded, awarded and/or reprovisioned.

To accomplish the above and other features, in one embodiment of the present invention, a user first visits a leading portal, for example, Yahoo!, and selects an event and a desired time. Next, the user is linked to a server, where he or she purchases a ticket and/or concessions and other merchandise with, for example, a credit card, in a secure transaction. The event ticket is then transferred to the user's account, which in turn is associated with a smart card and/or wireless device in the possession of the user. With the smart card/wireless device in hand, the user avoids any box office lines and proceeds directly to an attendant or a point of sale (POS) server or system. The user then presents the smart card to the attendant or POS who reads the smart card using a reading device. After reading the smart card, the attendant or POS accesses the user's account and verifies that a ticket has indeed been purchased before admitting the user. Once the user is at the event, as described below, the user has the functionality to be upgraded, reallocated and/or rewarded tickets.

For example, in one embodiment of the invention, the process begins as all tickets are checked in, for example, as the patrons enter the reserved seating area, such as a stadium or theater, through, for example, bar code readers, scanners, infrared readers, and/or manually or other method where the patron is checked in, either at the gate, seat or other location. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure to allow that seat to be provided to another willing patron in accordance with a process to be described below.

The patron may check in either a predetermined time before or after the event begins. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seats for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, or other predetermined process.

If the patron that is identified by the re-allocation process is determined to be present in the theater or event, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or more means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. Optionally, a bidding process may be initiated that allows various patrons to bid against one another. Any standard bidding process may optionally be used. The patron, of course has the option to decline, and if so, the process continues and returns to the re-allocation process to attempt to locate another possible patron.

If the patron accepts, payment of money or other means may be effectuated on the spot via the wireless device, credit card, debit card, points, and the like, and the patron may now move to the other seat. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

In another aspect of the invention, a registration form is first completed by the user in an initialization process. Subsequently, the user selects an event and pays for the ticket with, for example, a credit card in a secure e-commerce transaction. Then, in this embodiment, a bar coded ticket or receipt is generated and printed by the user. With the bar coded ticket or receipt in hand, the user avoids the box office lines and proceeds directly to an attendant or POS who collects the ticket, verifies the purchase optionally automatically via a bar code reader, and admits the user to the movie screen. The user is then eligible to participate in the reallocation, upgrade and/or reward process described herein.

In alternate embodiments, a scanner is utilized by, for example, an attendant who, rather than tearing the ticket stub in half, simply scans the bar code with the scanner to verify that a ticket purchase has indeed been made by the user. Similar processes may be used for the purchase of merchandise and concessions. Furthermore, to eliminate fraud, once a ticket has been scanned into the real time point of sale system, it cannot be used again. Alternatively, the present invention is implemented in a fully automated setting without human intervention, except in the event of a failure or when assistance is needed.

In other embodiments, the present invention utilizes credit cards, smart cards, or cards with memory media embedded therein, or other portable devices, such as wireless phones, wireless pagers, personal digital assistants, or Internet-ready watches as an alternative or in addition to the printed tickets.

In one embodiment, the present invention relates to upgrading and/or reallocating for the purchasing and provisioning an item utilizing a server linked to a client via a data communication network. This embodiment includes receiving a communication at the server from the client. The communication includes an order for a purchase of the item and an identifier associated with an identification device. This embodiment also includes updating an account associated with the identifier to reflect the purchase, accessing the account by utilizing the identifier at a point of sale server upon presentation of the identification device to verify the purchase, and provisioning the item at the point of sale server after verification of the purchase.

In another embodiment, the present invention also relates to reallocating, upgrading and/or awarding for the purchasing and/or provisioning an item utilizing a server linked to a client via a data communication network. This embodiment includes receiving a communication at the server from the client. The communication includes an order for a purchase of the item. This embodiment also includes transmitting an identifier associated with an account from the server to the client for storage on an identification device, updating the account to reflect the purchase, accessing the account at a point of sale server upon presentation of the identification device by utilizing the identifier to verify the purchase, and provisioning the item at the point of sale server after verification of the purchase. The purchaser is then optionally eligible for the reallocating, upgrading and/or awarding process described herein.

In yet another embodiment, the present invention relates to purchasing and provisioning an item utilizing a server linked to a client via a data communication network. This embodiment includes transmitting a communication from the client to the server. The communication includes an order for a purchase of the item and causes an account to be updated thereby reflecting the purchase. The purchase and the account are associated with an identifier stored on an identification device. The account is accessible upon presentation of the identification device for verifying and provisioning the item. The purchaser is then optionally eligible for the reallocating, upgrading and/or awarding process described herein.

In still yet another embodiment, the present invention relates to purchasing and provisioning an item utilizing a server linked to a client via a data communication network. This embodiment includes transmitting an order for a purchase of the item from the client to the server, associating an identifier with the purchase order and with an identification device in the possession of or to be transferred to a user, updating an account associated with the identifier to include the purchase, accessing the account at a point of sale server upon presentation of the identification device by utilizing the identifier to verify the purchase, and provisioning the item at the point of sale server after verification of the purchase order. The purchaser is then optionally eligible for the reallocating, upgrading and/or awarding process described herein.

In yet another embodiment, the present invention relates to purchasing and provisioning an item utilizing a server linked to a client via a data communication network. This embodiment includes receiving a communication from a user including a purchase order request. In this embodiment, the user is associated with an identifier. This embodiment also includes updating an account associated with the identifier to reflect the purchase order, and provisioning the purchase upon presentation of the identifier. The user is then optionally eligible for the reallocating, upgrading and/or awarding process described herein.

In one embodiment of the invention, a method at least one of reallocates, upgrades and awards admittance to events to an event customer via a data communication network. The data communication network optionally comprises a server, workstations operably connectable to the server, one or more databases operably connectable to the server and the workstations where the workstations optionally include a web browser interface facilitating communication with the server, a point of sale server operably connectable to the server, a point of sale system operably connectable to the point of sale server, and wireless devices operably connectable to the server. The wireless devices include at least one of a smart card, a personal digital assistant, a mobile telephones, and a mobile data device, and the wireless device comprising at least one of transmitting and receiving means and transceiver means for receiving and transmitting signals.

According to one embodiment, the method includes the sequential, non-sequential and sequence independent steps of receiving a communication from the event customer, the communication including a request to obtain admittance to at least one event, the communication also including an identifier associated with an identification device, updating an account associated with the identifier to reflect the request, accessing the account by utilizing the identifier stored on the identification device at the point of sale system upon presentation of the identification device to verify the request, admitting the event customer at the point of sale system after verification of the request, determining a predetermined time period associated with the event indicative of another event customer from event customers not attending the event in accordance with first predetermined criteria, releasing an allocation associated with the another event customer and notifying at least one of the event customers that are at least one of currently attending the event and registered for the at least one of reallocating, reprovisioning, upgrading and awarding responsive to the releasing the allocation, and accepting by at least one of the event customers the at least one of reallocating, reprovisioning, upgrading and awarding in accordance with second predetermined criteria.

The communication optionally includes at least one of payment information, an event selection, a venue selection, a concession selection, and a merchandise selection.

The identification device optionally comprises a memory medium for storing the identifier. The accessing optionally further comprises reading the identifier from the identification device with a reading device. The account is optionally stored in at least one of the server, the identification device, and the point of sale server. The account optionally includes a list of purchased items. The request optionally comprises at least one of a movie ticket, a sporting event ticket, a concession, or merchandise.

In other embodiments of the present invention, demographic information is received from the event customer. In addition, the identification device optionally comprises at least one of a smart card, a credit card, a ticket, a wireless phone, a personal digital assistant, and a wireless device.

The method optionally includes the step of generating at least one of a physical receipt, a confirmation, and an electronic confirmation with at least one of the identification device and the point of sale server.

The method optionally includes the step of generating at least one of a physical receipt, a confirmation, and an electronic confirmation with at least one of the identification device and the point of sale server, and the at least one of the physical receipt, the confirmation, and the electronic confirmation comprises at least one of reserved seating and purchase information.

The second predetermined criteria optionally includes the event customer willing to pay at least one of a predetermined price and the highest price, and wherein the method further comprises the step of billing the event customer in at least one of real-time or at a later time for the at least one of reallocating, reprovisioning, upgrading and awarding in accordance with the second predetermined criteria.

The method optionally includes the step of releasing an allocation associated with the another event customer and the notifying at least one of the event customers that are at least one of currently attending the event and registered for the at least one of reallocating, reprovisioning, upgrading and awarding is performed in accordance with a predetermined algorithm.

The first predetermined criteria optionally includes at least one of agreement with one or more of the event customers, the event customer not providing notice of non-attendance a first predetermined time period prior to the event, the event customer not providing notice of non-attendance a second predetermined time period after start of the event, the event customer leaving the event early, and other predetermined criteria.

In another embodiment of the invention, a method is provided of upgrading and awarding admittance to events to an event customer via a data communication network. The data communication network optionally comprises a server, workstations operably connectable to the server, one or more databases operably connectable to the server and the workstations, the workstations optionally including a web browser interface facilitating communication with the server, a point of sale system, and wireless devices operably connectable to the server, the wireless devices including at least one of a smart card, a personal digital assistant, a mobile telephone, and a mobile data device, and the wireless device comprising at least one of transmitting and receiving means and transceiver means for receiving and transmitting signals to and from the server.

The method includes the sequential, sequence independent and non-sequential steps of receiving a communication from the event customer, the communication including a request to obtain admittance to at least one event, the communication also including an identifier associated with an identification device, processing the request including accessing an account by utilizing the identifier stored on the identification device at the point of sale system upon presentation of the identification device to verify and process the request, and updating a database indicating that the request was processed, admitting the event customer at the point of sale system after verification of the request, determining a predetermined time period associated with the event indicative of at least one other event customer not attending the event in accordance with first predetermined criteria, releasing an allocation associated with the at least one other event customer and notifying at least one of the event customers that are at least one of currently attending the event, previously submitted a request to attend the event and registered for the event to perform the at least one of upgrading and awarding responsive to the releasing the allocation, and accepting by the at least one of the event customers the at least one of upgrading and awarding in accordance with second predetermined criteria.

In another embodiment of the invention, a method is provided of upgrading and awarding admittance to events to an event customer via a data communication network. The data communication network optionally includes a server, workstations operably connectable to the server, one or more databases operably connectable to the server and the workstations, the workstations optionally including a web browser interface facilitating communication with the server, a point of sale system, and wireless devices operably connectable to the server, the wireless devices including at least one of a smart card, a personal digital assistant, a mobile telephone, and a mobile data device, the wireless device comprising at least one of transmitting and receiving means and transceiver means for receiving and transmitting signals to and from the server.

The method includes the sequential, non-sequential or sequence independent steps of receiving a communication from the event customer, the communication including a request to obtain admittance to at least one event, the communication also including an identifier associated with the event customer, admitting the event customer at the point of sale system after verification of the request, and updating a database indicating that the request was processed, determining first predetermined criteria associated with the event indicative of at least one other event customer not attending the event, releasing an allocation associated with the at least one other event customer responsive to the determining step, and notifying at least another of the event customers to perform the at least one of upgrading and awarding responsive to the releasing the allocation, and accepting by the at least another of the event customers the at least one of upgrading and awarding in accordance with second predetermined criteria.

In another embodiment of the invention, a system is provided to upgrade and award admittance to events to an event customer. The system includes a server comprising a processor and a memory medium, the server connected to a data communication network, the memory medium containing instructions for controlling the processor, wherein the processor receives a communication from the event customer, the communication including a request to obtain admittance to at least one event, the communication also including an identifier associated with the event customer, updates a database indicating that the request was processed, determines first predetermined criteria associated with the event indicative of at least one other event customer not attending the event, releases an allocation associated with the at least one other event customer responsive to the determining step, and notifies at least another of the event customers to at least one of upgrade and award the at least another of the event customers with the allocation. The system also includes a plurality of wireless devices operably connectable to the server, the wireless devices including at least one of a smart card, a personal digital assistant, a mobile telephone, and a mobile data device, the wireless device comprising at least one of transmitting and receiving means and transceiver means for receiving and transmitting signals to and from the server, including accepting by the at least another of the event customers the at least one of the upgrade and award for the reallocation via at least one of the wireless devices.

In another embodiment of the invention, a system is provided for upgrading and awarding admittance to events to an event customer. The system includes means for receiving a communication from the event customer, the communication including a request to obtain admittance to at least one event, the communication also including an identifier associated with the event customer, means for admitting the event customer at the point of sale system after verification of the request, and updating a database indicating that the request was processed, means for determining first predetermined criteria associated with the event indicative of at least one other event customer not attending the event, means for releasing an allocation associated with the at least one other event customer responsive to the determining step, and notifying at least another of the event customers to perform the at least one of upgrading and awarding responsive to the releasing the allocation, and means for accepting by the at least another of the event customers the at least one of upgrading and awarding in accordance with second predetermined criteria.

In another embodiment of the invention, a method, system, server architecture and/or tangible medium upgrade and award admittance of events to an event customer, preferably via a data communication network. The method includes the sequential, sequence independent and non-sequential steps of, for example, receiving a communication from the event customer including a request to obtain admittance to at least one event, admitting the event customer, determining first predetermined criteria associated with the event indicative of at least one other event customer not attending the event, releasing an allocation associated with the at least one other event customer, and notifying at least another of the event customers to perform the upgrade and/or reallocation.

In accordance with the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that may be in the vicinity of the stadium but were unable to get seats. Since the present invention re-allocates and/or sells tickets very near to game time in accordance with one embodiment, the patron must be in the general vicinity of the stadium to take advantage of this embodiment of the invention.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron to help the patron decide the quality of the upgrade and whether to accept.

In one alternative embodiment, if the patron that has their ticket re-allocated in error, e.g., because the patron did not show up to the event based on the predetermined criteria but the patron was still planning on attending because they forgot about their seat being re-allocated, the system can re-allocate seats immediately upon the checking in of the patron and notify them that their seats have changed because they are late. In this situation, the stadium/venue might decide to further upgrade the patrons because of the mistake.

In accordance with one embodiment of the present invention, the process of the present invention specifically reserves seats of the highest or very high rating that are considered preferred, in the event a patron's seat is re-allocated prematurely or erroneously. In this situation, the patron who has had their seat re-allocated because they will likely receive an even better seat as a result of the mistaken (stadium or patron) or premature seat re-allocation.

In another embodiment of the present invention, as patrons are entering the venue or stadium, they are provided advantageously with a map of the stadium so patrons can analyze the potential upgrade to make a decision whether the upgraded seats are sufficiently good or of value to warrant the patron moving and/or paying for the additional upgrade. By handing the patron the map of the stadium, the process of the present invention is not required to transmit a detailed schematic to the patron's wireless device which would not normally be able to effectively permit the patron to evaluate the proposed upgrade seats. The map that is handed out may optionally include information for patrons on where to register for the upgrade and/or additional advertisement opportunities.

In one alternative embodiment, the patron that has purchased the ticket, for example, a season ticket holder, may advise the stadium that for a particular game, set of games or all games, they do not want their seats to be re-allocated, and perhaps, an additional fee is assessed for this type of patron. If the stadium provides the ability for the patron to selectively opt out of the seat re-allocation, the patron can, for example, connect to the system via the Internet, public switched telephone network, cellular network, and the like, and notify the system that they do not want their ticket re-allocated, for example, because they are coming late to the event. Other means of notifying the system and/or other reasons may be utilized in connection with the present invention.

In another alternative embodiment, the system provides patrons the ability to individually select when their tickets may be re-allocated. For example, one patron may prefer to only give up their ticket if they are late to the game by 15 minutes, while another patron may be willing to give up their ticket if they have not arrived 15 minutes before the game. In alternative embodiments, the stadium may provide incentives for the patron to have their ticket re-allocated prior to the game because it increases the stadiums chances of re-allocating/re-selling the ticket.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provide additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket.

Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In an alternative embodiment, the system determines priority of re-allocation of seats based first upon patrons that have seats that may also be re-allocated. That is, the systems attempts to maximize the number of re-allocations by prioritizing the re-allocation based upon seats that may be re-allocated after already being re-allocated. For example, if front row seats in a stadium are available to be re-allocated, in this alternative embodiment, patrons that are in the next closest section for example on the field level would be upgraded first to those seats. Then, patrons with less preferred seats, for example, in the upper deck would be re-allocated to the seats that have now become available from the patrons that have been upgraded to the front row. Thus, using this alternative priority scheme, the present invention maximizes the re-allocation numbers. Of course, this priority algorithm may be combined with additional factors, for example, relating to subscriber/patron value. As described above, additional factors may be utilized in the algorithm to determine the subscriber or set of subscribers to offer the upgrade.

In alternative embodiments, patrons in the vicinity of the upgraded and re-allocated patrons may optionally rate the upgraded patron, for example, for appropriate behavior, wearing of excessively large hats, drunkenness behavior, and the like. These ratings may then be taken into account in the re-allocation algorithm for future upgrades to the patron.

In alternative embodiments, the patrons eligible for the upgrade may be notified using standard email communications over a wireless device, mobile telephone, and/or other standard communication means. For example, standard text-to-voice and/or voice-to-text communications may be used to contact the patron to evaluate whether an upgrade will be accepted and to actually accept the upgrade.

As discussed above, one or more of the above alternative embodiments may be incorporated into the embodiments described above, and/or any of the embodiments discussed below.

In another embodiment of the invention, a method, system, server architecture and/or tangible medium upgrades or awards purchases for a customer. The method includes the sequential, sequence independent and non-sequential steps of, for example, receiving a communication from the customer including a request to purchase an item, determining first predetermined criteria associated with the purchase associated with at least one other customer, and notifying at least another of the event customers regarding the at least one of upgrade, award and purchase.

In another embodiment of the invention, a method, system, server architecture and/or tangible medium combines, upgrades and/or awards purchases for a customer. The method includes the sequential, sequence independent and non-sequential steps of, for example, receiving a communication from the customer including a request to purchase an item, determining first predetermined criteria associated with the purchase and associated with at least one other customer, and notifying the at least one other customer regarding the at least one of upgrade, award and purchase.

In another embodiment of the invention, a system is provided for purchasing, upgrading and awarding an item to a customer. The system includes means for receiving a communication from the customer, the communication including a request to obtain the item, the communication also including an identifier associated with the customer, means for associating the customer at the point of sale system after verification of the request, and updating a database indicating that the request was processed, means for determining first predetermined criteria associated with the item indicative of at least one other customer associated or interested in the item, means for releasing an allocation associated with the at least another customer, and notifying at least another of the customers to perform the at least one of purchasing, upgrading and awarding for the item, and means for accepting by the at least another of the customers the at least one of purchasing, upgrading and awarding in accordance with second predetermined criteria.

In another embodiment of the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that have already purchased tickets in the vicinity of the stadium but were unable to get seats and/or may be in the vicinity of the stadium but were unable to get seats. Since the present invention re-allocates and/or sells tickets at any time prior to and/or after beginning of game time in accordance with one embodiment, the patron may be in the general vicinity of the stadium to take advantage of this embodiment of the invention or even at any location when being offered upgrades and/or seats well in advance of the game. For example, the present invention can upgrade or sell tickets to patrons well in advance of the game since it advantageously is permitted or has the authority to resell tickets either via ticket holders that do not show up during the game and/or, for example, season ticket holders that have authorized the stadium in advance to resell their tickets based on predetermined criteria, for example, when the season ticket holder notifies the stadium that they will not be present at next weeks game.

In one optional embodiment of the invention, the patron presents the usher with the confirmation number which the usher can enter into a wireless device using a local or private wireless network, or can simply use a walkie talkie or telephone to call the dispatcher to confirm the upgrade and/or new seats using the customer provided confirmation number. The dispatcher will have access to the system to enter the confirmation number to confirm the validity of the upgrade. Alternatively, a patron will retain their old ticket. The patron will give in the old ticket to the usher which is scanned or barcoded by the usher for immediate identification of new seats and used in place of, or in addition to, confirmation number.

Of course, the confirmation may optionally be made via customer name with an appropriate identification card or other information. Further, alternative methods may be used to verify that the confirmation number and/or ticket being used by the patron is valid. For example, the patron may be equipped with a printing device associated with the wireless device or download an actual ticket on line from home prior to the game for the new ticket or upgrade. Alternatively, the patron may be equipped with an identifier card, optionally including a bar code with a unique identifier relating to the patron's account information and profile that can be scanned for additional convenience. Alternatively, a wireless device may be used to securely store this type of identification and/or account information.

In at least one alternative embodiment of the invention, the patron may comprise optionally a corporate account that has a number of tickets, for example, season tickets. In this embodiment, the corporate account may have associated therewith a plurality of email addresses or other communication addresses to transmit the seat or upgrade offer to a number of potential patrons that may rotate their attendance at the games. In accordance with this optional embodiment, multiple emails can be stored for a single user/corporate account, and the system may transmit individual messages to all email addresses, or may only transmit messages to individual patrons for corporate account that individually advise the system that they are associated with a particular ticket/bar code for a particular game and will be/are present at a particular game.

In an alternative embodiment, patrons may enter the stadium and subsequently inform the system that they are present and interested in an upgrade via a kiosk where the patron can scan a bar code and enter their customer number to be eligible for upgrades during the game. The system is then able to transmit a message to the customer, assuming that the customer has pre-registered with the system with the appropriate contact information. Alternatively, or in addition to individual use of a kiosk(s), the customer sales office may have a kiosk or additional functionality to enter the customer name and/or customer account and scan in the bar coded ticket on the spot to register each patron as they enter the stadium or venue.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron upon entry in the stadium to help the patron decide the quality of the upgrade and whether to accept when an offer is received by the patron at a predetermined time. The graphical map may comprise a small booklet with a map of the stadium showing seat locations, and optionally a game schedule.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provides additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In alternative embodiments, patrons in the vicinity of the upgraded and re-allocated patrons may optionally be eligible for a dating or matching service where patrons register and provide profile information to the system and/or through a third service provider dating service. Once the system knows that the patrons will be coming to the game and/or have actually checked in to the stadium, the system can then arrange for the two, four, etc. patrons to meet each other by allocating and/or re-allocating seats to the patrons together. Thus, based on profile information, customer request and availability, the system is able to upgrade or sell tickets to patrons to maximize their chances of meeting someone at the game. This optional feature provides significant potential enjoyment for the patrons participating in this dating or connection program. In accordance with this embodiment, one possible sequence of acceptance steps involves profile matching the two patrons (or groups of patrons) based on predetermined profile information; transmitting a first message to the first patron regarding availability of the second patron and requesting a conditional acceptance form the first patron; transmitting a second message to the second patron indicating that the first patron has conditionally accepted and request the second patron to accept; and when the second patron accepts before the first patron has rescinded the conditional acceptance, finalizing the upgrade and/or seat allocation for the first and second patrons. This embodiment of the invention is a complete reverse from typical dating and/or matchmaking services which attempt to develop detailed algorithms for the matching process because of the significant decision that exists in determining who to spend valuable time with. In accordance with the invention, patrons are already present at the game, and therefore, half or more than half the effort is already done. The remainder is to actually meet the other person which can be accomplished with profile criteria, whether or not the algorithms are very sophisticated. In one embodiment, the patrons that are being matched have their original seats maintained and not made available for other upgrades in the event the matching does not work out early on. In this embodiment, one or both the patrons can return to their original seat. Hopefully, there will not be a significant argument of who would need to return to their original seat if an upgrade is actually performed. In addition, in accordance with this embodiment, the seats that are selected do not necessarily have to be better seats in the classical sense. That is, seats further away from other ticket holders might be considered preferred when matching two individuals for the first time. Alternatively, couple that would prefer a little more privacy or quieter game might request to be moved to a more isolated area. Alternatively, families with small children might prefer to be moved to a less busy area as well during the game where the children might be able to freely move around. All these scenarios and/or alternatives are possible in view of the present invention. The advantage of performing a match in a public setting is that the patrons do not have to worry about leaving or ending the date, and also do not have to worry that the other person will have their home address.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like. In addition, the system advantageously and optionally provides the feature of allowing patrons to text message one another directly, and/or exchange pictures via wireless email, text messaging, and other wireless devices that provide the standard capability of exchanging pictures, such a T Mobile and/or Sprint.

In addition, this feature also optionally permits the patrons that have participated in the program to rate one another for future dates. For example, one patron can rate the conversational benefits of the second patron, the appearance of the second patron, the overall short term versus long terms relationship goals of the patron, and the like. These ratings may then be taken into account in the algorithm for future seat assignments, re-allocations and/or upgrades in the future for the first and second patrons, and all other patrons will now benefit with the additional profile information of the first and second patrons. The matching service may be for amusement or work related networking purposes, for example, to meet an executive that the patron currently works with or wishes to work with/sell in the future.

In alternative embodiments, the ticket holder can call in via a voice to text message, text message and/or email and let the stadium know early that they are not coming. In this manner the ticket holder obtains the convenience of the stadium or venue reselling their tickets in advance, thereby providing the venue with additional time to maximize the resale of the ticket.

In alternative embodiments, when the patron enters the stadium, they have their ticket barcoded or other device that detects their presence can be used such as infrared, Bluetooth, etc., and then they can become eligible for an upgrade. The patron can register in advance that they want to receive upgrades by providing their name, message address, e.g., email, telephone text message address, etc., and optionally their credit card or other payment mechanism for upgrades that actually cost money as opposed to free upgrades. In alternative embodiments, the patron can register at the ticket booth when purchasing their original ticket. In this scenario, the stadium representative can enter this information on behalf of, and with the permission of, the patron since the patron may already be providing their credit card, debit card, etc. to purchase the original tickets. Alternatively or in addition, a kiosk may be provided where the patron can enter their original ticket, e.g., scan in their original ticket and provide their name and text message information in the stadium to register for a one time upgrade for the game after purchasing, for example, a regular admission ticket.

In alternative embodiments, an usher can verify that the patron should be upgraded by the patron providing the confirmation number that may be transmitted in real-time by the system, and/or by the patron using their original confirmation number or original ticket with barcode or other identification means, such as a smart card, infrared reader, etc. that represents original ticket and presenting same to the user. The usher then needs only to scan in the original ticket and the system will verify whether the patron associated with the original ticket is valid and whether the upgrade is valid.

In alternative embodiments, a warning message may be sent to the ticket holder that has not shown up to game warning them that if they do not respond within a certain time period that their seat will be re-allocated or re-assigned to another patron. Similarly, a release message may be sent to the ticket holder after their seat has actually been released and/or re-allocated, thereby notifying the patron that if they change their mind in attending the game, they will have to obtain an additional ticket. In alternative embodiments, the ticket holder that has their seat released and re-allocated can be themselves re-allocated a similar, worse or better seat, depending on, for example, their subscriber value and/or other criteria. For example, if the patron is provided a better seat, this will encourage them to more readily give up their seats in the future even if they are attending the game. On the other hand, if the patron is provided a worse seat, then this encourages them not to artificially give up or have their seat released when attending the game. Accordingly, the present invention is designed to deal with various behavioral patterns of specific ticket holders, and may optionally and advantageously be a ticket holder specific with respect to various criteria for re-assigning, releasing, selling and/or re-allocating tickets.

In alternative embodiments, the system transmits to the ticket holder a welcome message after being upgraded and after having being moved to a new upgraded seat location. In one embodiment, the system identifies that the patron has been successfully upgraded after the patron provides the usher with a confirmation number or original ticket, which is then verified by the usher and system.

In alternative embodiments, the system, after having identified which patrons have checked into the stadium and/or have been upgraded, transmits a trivia question and/or additional advertisements to all patrons attending the game. In alternative embodiments, the information is transmitted to both patrons that are attending the game and additional patrons that have registered in the past to receive information but that are not attending the game. The participants can, for example, answer trivia questions and respond with their wireless device. Depending on whether the patron is attending the game or not, the system may determine to offer or deal with each of the patrons differently. For example, for patrons at the game, winners may be successively determined and narrowed, as patrons successfully and unsuccessfully answer questions, round after round of questions in a "spelling bee" format. For patrons that are not attending the game, winners may be declared, or statistics provided to the broadcast station that can be aired on television. In yet additional alternative embodiments, instead of transmitting information/questions to the patrons via the wireless device, the information/questions are displayed on the stadium billboard for patrons at the game and/or on television for patrons that are watching the game on television. The patron can then merely respond via the device, e.g., the telephone accordingly via a voice-to-text system or via other mobile devices via text messaging.

In alternative embodiments, the present invention provides the advantage of additional advertising sponsorship to the venue. For example, in one embodiment, the venue is partitioned into different locations that may be assigned to different sponsors. In one embodiment, the sponsor that provides the most value may be assigned a certain number of premium seats that are not available to other sponsors.

For example, the sponsor may offer a discount on the upgrade if you are a Verizon or Verizon Wireless customer or they credit your cell account for each seat upgrade or you get say 30 free minutes, etc. In alternative embodiments, the present invention provides the advantage of one wireless provider to advertise on another wireless providers mobile phone or wireless device. For example, if Verizon Wireless is a sponsor of the upgrade system for a particular stadium, the present invention will still work with, for example, AT&T, SPRINT, and CINGULAR customers. An advertisement message sent with the upgrade offer may read on the AT&T phone, "brought to you by Verizon Wireless." In an alternative embodiment of the present invention, text messaging is optionally used for mobile phones to perform the message communication of the present invention. The user is only required, in one embodiment, to reply or respond with a "Yes" to accept the upgrade offer since the user has advantageously pre-registered with the system, thereby minimizing the required communication/input by the user. In an alternative embodiment, the user, instead of pre-registering with the system, is charged on their wireless or even regular telephone number bill when they accept the upgrade offer. Thus, the wireless system that either administers the user's regular or wireless account or the upgrade sponsor may be responsible for actually billing the customer in this alternative embodiment.

In the alternative embodiment when text messaging is optionally used alone or in combination with other communication methods, the system provides the additional advantage of maximizing bandwidth usage by not requiring use of bandwidth on the wireless voice system, thereby maximizing system resources.

In another alternative embodiment, the present invention optionally and advantageously provides a security and/or safety feature in the event of, for example, a minor event where a parent gets separated from a child, a disaster or other event that might require evacuation of the stadium. In one embodiment, the person needing help provides their name to an attendant that can search the system for the contact information of their companion/parent. The system can thereafter send an email and/or text message to the companion/parent regarding the status of that person and provide instructions for meeting that person or arranging help, authorizing medical procedures, and the like. In another embodiment, the person requiring help, e.g., a child provides the attendant or kiosk with their ticket which can, e.g., scan the bar code or other reader system. The system can either automatically provide a text message to the parent who can then reply to the child/attendant via the kiosk to meet the child.

Alternatively, the parent can be instructed to meet the child at a predetermined location, and to stop looking for the child because the child was found. Thus, for this example, the person who is lost or separated from their party can notify security or access a kiosk. Security can, for example, notify the parent that child is in safe custody, and should not search the stadium, and therefore, meet outside stadium in a prespecified safe place.

In an alternative embodiment, if a child/person is separated, the security guard/kiosk can arrange the best place to meet, either in or outside the stadium, together based on an optional global positioning system (GPS). In addition, the party with the mobile device can be provided directions on where to go to meet their party from who they have been separated.

In an alternative embodiment, the present invention may also be used in a security, defense and/or safety setting to direct patrons in a stadium for an orderly evacuation or notify patrons regarding status of a safety related event via, for example, a broadcast message including text message, email and the like. In this manner, system communication resources may be most efficiently utilized by not over-utilizing the system via voice communication, unless completely necessary. For example, the message can be broadcast in the event of an impending hurricane. In this situation, patrons in different sections get different messages, for example, to exit the stadium out of gates/exits that are either less occupied or closest to the section the patrons are sitting in. Advantageously, the present invention has the patrons contact information, including optionally and advantageously text messaging, that can be broadcast or sent to different patrons. The advantage of text messaging is that the bandwidth is more efficiently used in the event of an emergency, and there are no busy signals as in a voice network. Further, the message is send, and if the network is at capacity, the system can automatically resend or the message will be placed in queue and sent as soon as capacity becomes available.

In another alternative embodiment of the invention, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction.

For instance, in sporting venues the bracelet ticket includes the machine readable information that comprises at least one of a bar code and radio frequency identifier used for security check in, and optionally check out. In this manner, the standard reading machines that can scan the bar code or RFID information can keep track of people that have checked into the sporting event and/or venue. Advantageously, the machine readable information on the bracelet can also be used by the venue in the event the patrons seat assignment is modified, for example, via an electronic ticket exchange or upgrade program. In this embodiment, the visible indicia are no longer valid for the actual seating that may be dynamically changed and only represents optionally an initial seat assignment. However, the machine readable information may be used as a code to reference the specific patron and assign that patron a new seat. Thus, when the ticket reader scans the ticket and actually identifies, for example, the bar code, this information can be used to reference the patron, update and/or confirm the patron's current seat via the reader used, for example, by ushers in the venue, kiosk, entrance to the venue, and the like.

In an alternative embodiment, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction. This information, as previously mentioned, may be visually cognizable for the patron and in combination, readable by electronic means if the bracelet includes a magnetic strip, bar code imprinting, or RF chip.

In an alternative embodiment of the present invention, the security bracelet and ticket combination of the present invention advantageously includes a bar code or other machine readable information such as a RFID device. When, for example, a child is separated form their parent, the parent can notify security and the seat number associated with the child. If the child attempts to leave with their bar code/identifier, the system detects the bar code/identifier as either being valid and identifying the child that is missing or being invalid and raising another red flag. In an alternative embodiment, the bar codes/identifiers associated between children and adults correspond such that the child identifier must be within a predetermined time and/or number of checking out identifiers from/within the adult identifier. If this does not occur, the system determines that the child is leaving without their parent, and possibly being abducted.

In an alternative embodiment, the system links one or more tickets/identifiers together and requires the tickets/identifiers to exit the venue or event within a predetermined time period from one another and/or within a predetermined number of tickets/identifiers that have exited the venue and/or event. In the event that one ticket/identifier exits the venue or event and the associated identifier does not, then an alarm or other indictor occurs, and the attendants will detain the patrons that have initiated the alarm to for security purposes.

In an alternative embodiment, the tickets are advantageously coded with designations such as adult, child and the like. In the event a child ticket/identifier exits the stadium before the associated adult and/or more that a predetermined time period and/or number of patrons exiting, the system can initiate an alarm so that an attendant can determine if a child has exited the venue or event without their parent or with a wrong parent potentially averting a kidnapping. In this embodiment, an additional combination is the use of the standard fast pass feature, for example, at theme parks, and the like, where the venue records predetermined events that the user of the card enters in a faster line. In this embodiment, if a child ticket/identifier is not associated with a parent ticket/identifier, for example, as described above, the child may be denied entry into the event or venue if not accompanied by their parent. In alternative embodiments, the venue/event sponsor or organizer associates tickets upon request from the patron. In addition, in another alternative embodiment, a kiosk is provided inside and/or outside the venue for, for example, parents to register their tickets and have them associated with their children's tickets to prevent the child from exiting the venue without them, for example, as described above.

In an alternative embodiment of the present invention, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In another alternative embodiment of the present invention, a security bracelet is advantageously utilized, for example, such as the security bracelet disclosed in U.S. application Ser. No. 10/680,207, filed on Oct. 8, 2003, to Abraham I. Reifer, et al., and incorporated herein by reference, in the event of a reported event, security breach, abduction, and the like. In this embodiment, all patrons exiting the stadium must show their ticket and/or identifier so that the venue can check all patrons out of the stadium. Thus, for example, if two kidnappers come in the stadium, and want to use one bracelet for a child, the second kidnapper will be stranded in the stadium. In addition, if one kidnapper buys two tickets, then upon exit with the child and the additional ticket, a barcode/identifier will be exiting without ever having checked in, and then the alarm will go off as well.

In another alternative embodiment, the present invention provides a broadcast message to warn patrons of an event, such as an advertisement, sale and/or even a weather related event such as a hurricane that might require the venue to be evacuated. Advantageously, in at least one embodiment, the broadcast message comprises standard text messaging that optimizes or better utilizes capacity form the communication system. Thus, when using text messaging capabilities, the present invention efficiently transmits text messages to numerous subscribers regarding, for example, exit information, contacting and/or meeting additional parties that have been separated, and the like.

In an alternative embodiment of the present invention, the present invention optionally provides the capability to penetrate into secondary market with season ticket holders selling ahead of time the games they will not be attending. For example, the present invention optionally provides the feature for the season ticket holder and/or general ticket purchaser the ability to view in advance of the season and/or game the schedule, and to alert the venue and/or stadium of games and/or events they will not be attending, thereby permitting the stadium/venue to attempt to resell the tickets to other patrons. For example, in one embodiment of the invention, the patron is provided with a monthly schedule listing the events that may be attended. The patron, such as a season ticket holder, may then click or place an indicator on all games they will not be attending for the season in advance, thereby providing the stadium with the ability to resell tickets well in advance of the event. Once the patron completes identifying games that will not be attended, the system then compiles a list and transmits the list to the patron for an optional confirmation. This list is then used by the system to release seats well in advance of the game. In an alternative embodiment of the invention, registered users of the system for, for example, upgrades, may also be notified of seat availability for sales prior to the game/event. In an alternative of this embodiment, registered users may receive text messages, emails, and the like, notifying them advantageously of the availability of seats that heretofore have never been easily available to the public for sale, thereby allowing the venue to participate in secondary market ticket sales.

In one alternative embodiment of the present invention, the system/process of the present invention provides or operates as a middle person/broker between the ticket holder that is returning tickets to the venue, such as the season ticket holder, and a ticket sales system and/or company, such as tickets.com, by notifying the tickets company of the newly available seats via notification by the ticket holder, such as the season ticket holder of season ticket games not being attended.

In one alternative embodiment of the invention, the system and/or process transmits text messages, emails and the like, to offer tickets and/or seats and/or admittance to subscribers for events and/or games with empty seats even before game. Thus, the present invention allows the venue to participate in the secondary ticket sales market and the upgrade market, thereby increasing revenue and fan loyalty.

Of course, all of the embodiments of the present invention may be used for any reserved seating event, and/or venue that require tickets for entry thereof.

In another alternative embodiment of the present invention, the use of machine readable identifiers provides advantages for, for example, the upgrade program or ticket exchange of the present invention. For example, when the upgrade, reallocation and/or electronic ticket is issued, the machine readable identifier, for example, the bar code, on the original ticket is invalidated, thereby preventing use of the invalidated ticket. Accordingly, when a new ticket holder purchases the ticket form the season ticket holder, the new purchaser will be issued a new machine readable identifier, and optionally a new paper ticket. The present invention advantageously is able to handle the issuance of a new ticket and invalidates the old ticket and optionally the old identifier that has, for example, been returned by the season ticket holder, thereby providing dynamic ticketing capability.

In an alternative embodiment of the present invention, the new patron obtains a new identifier such as a barcode, the old bar code of, for example, the season ticket holder is invalidated. In one embodiment of the invention, season ticket holders are offered to opt in the upgrade process. Various commercial incentives are possible for the season ticket holder to opt in the upgrade process, such as monetary compensation when their ticket is used for an upgrade and/or resold whether they express their intention not to go to the game prior to the game, and the like. Alternatively, season ticket holders may be offered that the cost of their season tickets will, for example, remain the same as the previous year or be reduced if they participate in the program. Therefore, the combination season ticket trade-in and upgrade program in one embodiment of the invention will be beneficial to season ticket holders by allowing them to trade when they already know that they have no intention of attending a game, and allow the season ticket holder to recoup some cost of the season tickets if they do not attend and their ticket is used as an upgrade. In addition, additional patrons of the event and/or sports team are permitted to attend the game in locations/seats that they might never have been able to obtain access to. Further, the venue/stadium/team maximize revenues by being able to place tickets on the secondary market when the ticket holder notifies the venue early enough that they are not attending the event, the venue also obtains additional revenue from upgrades when tickets are upgraded, and the venue obtains additional fan loyalty.

In another embodiment of the present invention, the system provides the ability to advertise via email, text messaging, and the like, for one wireless carrier on the wireless device that is using another wireless carrier. Since the user of the wireless device has requested the service, the user appropriately receives the communication from the ticketing system of the present invention, and therefore, also appropriately received the advertisement from the wireless carrier that is different than the wireless carrier that the user of the wireless may be using at that time.

In another alternative embodiment of the present invention, offers to purchase seats either during the game or even well in advance of the game are "pushed" or transmitted out to registered users that have supplied their wireless address. For example, patrons can register in advance for the upgrade and/or regular ticket offers to purchase admittance via various methods including the Internet. When seats band/or admittance becomes available, a broadcast message or other standard messages may be transmitted to the registered patrons to notify them of the seat availability. Thus, seat offers are "pushed" to registered users that have requested this service advantageously to a wireless device and/or other address including standard telephone communication, as well as additional optional advertisements. The system, in one alternative embodiment, provides the user the option when registering to accept certain types of advertisements to be received on their wireless device via email and/or text messaging. In other embodiments, the user does not have the option of which advertisements to receive.

Advantageously, in accordance with one alternative embodiment of the present invention, if a patron decides to attend an event such as a sporting event when the patron does not have time to wait to receive paper tickets (e.g., the patron is visiting in another city/location and does not have time to wait to receive tickets via mail and is on the go), the system of the present invention transmits a ticket to the patron via, for example, a wireless communication system and/or other standard electronic communication system such as the Internet, and the patron can present their ticket, for example, on their wireless device and show up to game.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Patrons then text message and/or email and/or answer questions via voice-to-text messaging their answers. The system can then display the overall number of answers that are correct and incorrect, display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another alternative embodiment of the present invention, the system uses a seat database to determine which of the reserved seats are currently in use. The system may integrate with the seat database system of a venue and/or stadium or optionally be used in parallel with the seat venue/stadium database. For example, prior to the event, the system may utilize the seat database of the venue to determine available seating and patrons that do not show up after a predetermined period of time. Alternatively, the present invention can operate using a separate database from the event/venue by copying or building a separate database used for the ticketing and/or upgrading according to the present invention. In this alternative, as patrons enter the venue, they are checked in directly to this separate database. At the time of the event, the system will be able to check-in patrons using either the identification system, e.g., bar code scanner, of the event or venue, or provide a separate identification system.

In another embodiment of the invention in connection with the seating upgrade and/or assignment system, an identifier and/or machine identifier such as a bar code, RFID, etc. optionally remains static for the user on the user's ticket and/or device that is provided for optional paperless ticketing. For example, the identifier will remain the same associated with the user, but the seat assignment, privileges, user characteristics, user preferences, and the like, may be dynamically changes. The system and method of the present invention will be updated so that the identifier can represent a dynamic seat assignment or other dynamic information, such as general admission to an associated event, or other event and/or venue, including, for example, a restaurant, bar, and the like.

In another embodiment of the present invention, the upgrades process and/or feature may be provided to users/patrons as a complimentary reward for fan loyalty, to reward the user but also market other goods/services and/or other advertising opportunities to be transmitted via the wireless device and/or mobile phone. In one embodiment of the invention, the system and/or method initially queries the user, for example, at the beginning of the trivia contest and/or tournament or at the beginning of the game, whether the user is present in the stadium or not. The system can then perform, for example, the trivia contest, and determine a winner(s) to award for example some form of reward. Furthermore, in another embodiment of the invention, based on the number of people responding that they are present at the game, the present invention advantageously provides a random upgrade to a predetermined number of patrons as an additional fan loyalty program and/or advertising sponsorship to one or more entities that sponsor the free upgrades.

In another embodiment of the invention, a system and/or method is provided that advantageously builds and/or acquires and/or collects mobile contact addresses of users in an efficient manner. For example, in accordance with the present invention, a user advantageously need only provide the communication network and telephone number, and the present invention builds a data address therefrom. This allows the mobile or wireless device user to still register for a service without specifically knowing their data address for, for example, data communication such as SMS messaging, text messaging, email, and the like. In one embodiment, the mobile user is provided a drop down menu where the user selects the communication network and provides their mobile phone number.

The present invention is particularly advantageous currently with the recent enactment by the Federal Communications Commission (FCC) number portability where mobile phone users are able to transfer their existing numbers to other networks. Accordingly, we have determined that a user's number will advantageously provide a mode of contact for the user even when the user decides to change communication networks. For example, in at least one embodiment, the present invention uses the cell phone number and IP address combination, e.g., 2029422785@verizon.net, or 3016814455@attwireless.com, and/or any other mobile telephone plus IP address combination that may be used to utilize the IP address of the cell phone. Alternatively and/or in addition, the SMS address may be used.

In one embodiment of the invention, the software processes and system determines and builds the actual messaging address (email, text, SMS, and the like) to send messages to the mobile device by the user only selecting and/or providing the communications network and the telephone number. Thus, the present invention advantageously simplifies the process for mobile or wireless device users to register and/or provide contact information, and therefore, beneficially increases the number of individuals that can effectively and easily register for a communication service.

In another embodiment, the present invention facilitates the ability for potential users to signup for the service of receiving, for example, trivia, upgrades and/or text messages via a user sign up device or apparatus. In one embodiment, the user sign up sheet includes numbers and/or circles that can be filled in like a grid, where the user can fill in or cover the numbers that identify their portable number. In addition, the user can check off the specific network carrier from a list of network carriers, or simply enter their specific network carrier. The user sign up sheet may be done electronically via a computer and user interface as described above, or may initially be filled out by a user via, for example, a piece of paper and then later entered into the computer system of the present invention.

In another embodiment of the invention, the system and method of the present invention is capable of re-locating a patron via the mobile address that was previously provided, even if the patron has changed wireless carriers. For example, in one embodiment, with the recent feature of mobile phone portability by the FCC, we have determined that a significant number of mobile phone users are likely never to change their number/address, and therefore, the system and method of the present invention is able to send text messages and/or email to all network addresses using the telephone number of the user if the system suspects that the previously provided network by the user is no longer being used. In this embodiment, the user can optionally respond to the message and/or network broadcast message, confirming that one of the messages has been received.

In another embodiment of the message, whenever a user wants to contact a mobile phone, mobile wireless device or even computer based, via for example, an Internet based account, wants to contact another mobile wireless device user, the present invention provides a transmission device, for example, via the Internet or individual models/mobile phones used for each of the networks to broadcast the message on all networks. Advantageously, in accordance with this embodiment, since the user is likely to maintain the same telephone number, their data or text messaging address will be their telephone number and one of the few network addresses. This type of broadcast message can happen anytime, and even for voice communication when the user of the wireless device needs to receive a data, text and/or voice message.

In another alternative embodiment of the invention, as described previously, the invention may be used by a patron to obtain specific data or information regarding sports or venue related information of interest. For example, patrons may communicate with the system and forward a player jersey number or number of racecar during an event such as a baseball game, football game, racing event such as Nascar, to obtain additional information including current statistics and past statistics. The present invention can then optionally sent statistics throughout the game or event to the patron without the patron requesting, for example, at specific time intervals or after notable achievements during the event, such as a home run, touch down, $7^{th}$ inning stretch, half time, number of laps traveled, and the like.

Thus, the present invention includes many variations in the type of information a user may receive, whether specifically checked into a venue or registered for the service for a particular event. In addition, the present invention includes various processes and systems for ensuring delivery of messages to patrons that have requested the service or merely sending messages that a patron may be interested in receiving.

In another embodiment of the invention, the matching and/or networking system includes the ability to contact and/or notify the users to coordinate the meeting using any one of a plurality of communication methods including text messaging, email and/or instant messaging, with the additional advantage of transmitting pictures, video and/or other data that provides additional information regarding the other person that has been suggested for the match and/or network. In one implementation of this embodiment, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. For example, different message transmit and/or receive formats may be used depending on the system. The present invention beneficially parses the various different formats to obtain the necessary information for the communications described herein. In addition, the represent invention formats the messages for the different wireless devices so that the messages may be appropriately received even though different devices and/or communication networks have different messaging formats. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In accordance with another embodiment of the invention, the matching and/or networking system includes the option of permitting a subscriber to notify the system when they are ready for a potential meeting and/or match. Once the matching and/or networking system is notified of the subscriber requesting the match, the system is then capable of either tracking the user though a positioning system such as GPS, permitting the user to register at predetermined locations upon user initiation such as via Bluetooth, RFID, infrared, and the like. In accordance with this embodiment, the subscribers are not being constantly tracked, and therefore, maintain an additional level of privacy. In alternative embodiment, the present invention continuously tracks the subscribers without specifically requesting to be matched. In this alternative embodiment, the subscriber is provided with less privacy because they may be notified of a specific match even though they might not be interested in the match and/or meeting at that time.

In an alternative embodiment, the present invention provides subscribers with the ability to accept/reject the match before each of the subscribers receive personal information of the other and/or before the date/match has been arranged with at minimum a meeting location. In this embodiment, the invention requires that both users accept the match and/or date prior to notifying the subscribers of the contact information for each subscriber. Therefore, subscribers can optionally request additional information from the system of the present invention, even multiple times, to better understand the potential date and/or match before accepting, and importantly, before the other subscriber is provided contact information and/or a meeting location of the subscriber. In the embodiment where the present invention merely provides the meeting location, the present invention advantageously does not provide the subscribers contact information and/or other personal information before the match/date. Advantageously, in accordance with this embodiment of the invention, subscribers never receive personalized or personal contact information unless the subscribers, after meeting in person, agree to exchange such information.

In another embodiment of the invention, the dating and/or networking system provides subscribers the functionality to email, instant message and/or text message at least one additional piece of personal information and/or questions, optionally directly to each other or via the system anonymously, to obtain additional information that may be more relevant than the user profile or information from the user profile that was used to make the initial date/match.

In another embodiment of the dating and/or matching system of the present invention, the system optionally provides automatic and/or user initiated registration in a particular establishment and/or geographic location, which can be used instead of a location determination system such as GPS, or together with such system. This form of registration may be even more precise than GPS because it confirms a subscriber's presence within a specific store, establishment, entertainment establishment, restaurant, and the like. Thus, in these embodiments, the subscriber either initiates the registration as described above, or alternatively, if the subscriber optionally sets the wireless device to automatic registration based on the appearance at a predetermined registration area and/or location, the subscriber will be automatically registered to receive communications regarding a potential match/date.

In an alternative embodiment of the present invention, once the dating and/or matching system determines that a potential match/date has been detected, the system optionally notifies the different subscribers and asks whether they want to continue to participate in the matching/dating program. When both, some and/or all subscribers agree to participate, the present invention can forward to each subscriber automatically the information that each subscriber shares substantially in common and/or the information that was responsible for the match/date between the subscribers. In this embodiment of the invention, the subscribers will know immediately the information that should be most relevant in making the match/date and can determine whether to actually agree to either contact or send the other subscriber additional information and/or arrange to meet the subscriber at a pre-designated location.

In an alternative embodiment of the present invention, the present invention optionally includes the ability to recommend a potential meeting place for the subscribers to meet after determining that the subscribers have agreed to participate in the date/meeting. In this embodiment, the present invention advantageously determines the location based on, for example, subscriber preferences, geographic location that is preferential for at least one of the subscribers and/or both subscribers, predetermined location where, for example, a sponsor will receive patronage and/or provide a discount for the subscribers and/or actual pay the organizer of the dating/matching system an advertising fee to promote their sponsorship. Accordingly, the present invention advantageously determines not only a potential match/date, but advantageously suggests, recommends and/or determines a specific location and/or geographic location and/or restaurant, clothing store, zoo, museum, and/or other suitable location for the subscribers to meet and optionally based on geographic distance.

Additional dating and/or matching features and/or differentiators of the networking and/or dating system of the present invention include one or more of the following:

Wireless messaging platform supports interactive messaging

Wireless messaging platform provides simultaneous parallel applications to run without collision Multiple wireless initiatives or topics run without conflict Different initiatives or topics may be user specific or selectable While each initiative runs independently, there can be overlap in terms of customer base Platform is flexible to add/remove initiatives quickly and efficiently One wireless carrier/network can be a dating/matching sponsor and advertise on the wireless device and/or network of another wireless carrier/network Contact members to notify of the match/date to allow members to either directly contact each other or send additional information via, for example, text messaging, email, instant messaging, such as pictures, video, and the like Contact members or wait for request from members to participate in match/date initiative; can then automatically track member via GPS instead of constantly tracking member all the time, thereby increasing privacy of member Contact each subscriber that is being offered the date/match and obtain approval for the match prior to actually notifying potential members that match has been made Contact users after initial match has been conditionally approved, and provides users the capability to request additional information, such as personal information from the other member or other members which the requestor still wants to know before finally accepting the date/match Members can register or "check-in" at predetermined locations and/or establishments which is one additional level of specificity, for example, with regard to the location where a member is that may be interested in matching; For example, two or more members may actually be in the same restaurant where they can be informed of one or more other subscribers being present; members can register via sending a message to the system via text message, email, RFID, Bluetooth, and the like, either by initiating a registration or automatically Contact members after initial match has been conditionally approved and exchange, optionally automatically, profile information that was significant in making the match/date and/or other important information regarding a match/date that a member may want to know before finally accepting the match/date and/or information the members may want to know that is geared particularly for a first date, e.g., likes/dislikes, common interests, favorite foods, wines, alcoholic beverages, and the like Contact members to suggest and/or recommend and/or arrange meeting place based on, for example, geographic location, common interests/sports, common food tastes, common beverage tastes, common entertainment preferences and/or sponsors willing to, or interested in, being utilized for the match/date for the suggestion and/or recommendation, and optionally providing the members a discount and/or compensating by the sponsor to the networking and/or dating system proprietor for the advertising and/or recommendation to visit that sponsor Wireless messaging platform includes a protocol conversion server functioning to interface with a variety of wireless networks having different messaging characteristics for both transmitting and receiving messages, and parsing the different message formats for the content from a received message, and transmitting a message to a plurality of different networks and/or devices having different messaging and/or interface capabilities and/or functionality Contact members with a wireless consent form indicating that the matching/dating system and/or the members participating in the match/date have generally consented to potential cohabitation optionally without any recourse to the other party. Alternatively, the members may be contacted with other types of informed consent forms with limited recourse for acts and/or aggressive acts that are clearly assaults, but not sexual related misconduct or sexual related crimes that are felonious in nature carrying a high penalty/sentence. Alternatively, members may be presented with consent forms that eliminate any criminal penalty, but do not foreclose the possibility of civil lawsuits for damages relating to torts, and the like As another alternative and/or in addition thereto, members may be presented with consent forms that eliminate any civil penalty, but do not foreclose the possibility of criminal lawsuits for criminal type activities, perhaps with the exception of the most severe sexual crimes such as rape and/or sexual assault that carry significant prison time.

For example, athletes, celebrities, high worth individuals, or even average individuals, male or female, may be interested in the wireless consent initiative because that allows them more flexibility to meet a variety of individuals without the worry of later being sued. In additional alternative embodiments, broadcast messages may be transmitted to numerous individual that may be interested in meeting and/or dating a celebrity or predetermined individual or individuals. In this embodiment, the optimum matching individual or individuals may be selected to meet with the celebrity, celebrities, and the like, while utilizing the informed consent feature of the present invention. In another alternative embodiment, an individual or individuals may be randomly selected as part of a match or date, based on a lottery or other competition to meet or date a specific individual or individuals.

Additional optional hardware and software requirements are as follows for one or more embodiments of the present invention:

System Capabilities

Platform supports interactive messaging

Platform provides simultaneous parallel applications to run without collision

Multiple wireless initiatives or topics run without conflict

Different initiatives or topics may be user specific or selectable

While each initiative runs independently, there can be overlap in terms of customer base Platform is flexible to add/remove initiatives quickly and efficiently Wireless Initiatives Interactive trivia with fans inside and outside of the stadium Targeted messaging, e.g., targeted advertising Broadcast messaging, e.g., general advertising Interactive messaging, e.g., with concessions Profiling for each initiative or topic, e.g., based on network operator Urgent and emergency messaging Specific initiative: discounts for concessions and/or memorabilia Specific initiative: invite patrons to different activities before, during or after game, e.g., player loyalty, family activities, etc.

Specific initiative: seating upgrade program

Specific initiative: messaging patrons in one section and separate messaging to patrons in another section Specific initiative: messaging parent of a missing child Special initiative: dating where patrons can keep their seats to return to them, or their seats are re-allocated. In alternative embodiments, the patrons switch seats instead of moving to empty seats, either for the entire game or only a portion thereof with other patrons for match making possibilities.

Functional Specifications

Front end for user signup and profiling—secure site—for example, modeled after www.mlb.com, include one or more of:

type of seats does the customer want for upgrade (decks and range of sections)

information for dating concession profile capability for additional profile information validate user by sending message to device upon sign up auto append of network information to phone number during signup login and password protected site frames on website or interface that can be easily configured to have look and feel, for example, of particular baseball team capability for space on screen for advertising opportunity that can easily be modified and relatively dynamic capability to handle lost passwords web page or interface where customers with season tickets can mark a calendar with the seats they want to keep and the ones they are interested in freeing up for early sale or upgrade.

The optional Front End of the present invention used for administration and setting up parameter for each application, optionally includes a secure site, with one or more of the following:

application email address and password minutes for all the configuration parameters and/or functionality number of threads for each application for upgrades, at least one of releasing customers old seat immediately, or it until the customer approves of the release, or holding the customer's seat for a predetermined portion or all of the game, for example, in the dating functionality)

set schedule for games section rating setup, and seat upgrade pricing revenue allocation model provide a number of retries if message send failure Concessions The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

Concession Wireless Initiative
- Purchased via cell phone
- Web registration for preferences
- Targeted concession offers
- Confirmation that purchase is ready
- Delivered to seat or ready for expedited pickup
- Customer convenience: system identifies closest concessions to customer
- Customer convenience: system determines concessions with short wait
- Each concession labeled with a number for customer identification and fulfillment
- Customers can request menu, or register for each game to receive menu around game time via mobile device
- GPS can be used effectively to inform customer of closest concession stand to pickup order, and/or customer can provide section number and/or seat location for system to identify most convenient concession stand
- Most convenient concession stand can be determined based on one or more, or combination of, predetermined criteria, such as, closest concession location, shortest wait in line, specific item being ordered, and the like.
- Interactive messaging, e.g., with concessions
- Specific initiative: discounts for concessions and/or memorabilia The optional Concessions functionality of the present invention used for administration and setting up parameter for each application, optionally includes a secure site, with one or more of the following:
- setup for orders be delivered to concession kiosk
- order confirmation provided to user
- user informed when order fulfilled so he can go to an express line for pickup or have delivery option
- auto bill feature
- interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

In one alternative embodiment, the following message exchanges may be used:

First Message

"In Game" Concessions

Menu will be sent soon!

Reply with #, item short form and seating section

Ex: BE=beer

Reply 3BE for 3 beers

408SEC for section 408

Powered by NEXTEL

Second Message (paper menu?)

Menu

BE=Beer; CO=Coke; DCO=Diet Coke

HD=Hot Dog; BUR=Burger

TA=Taco/Salsa; PO=Popcorn

FF=French Fries; CH=Chips

PZ=Pretzel; PT=Peanut

LEM=Lemon Ice

Third Message

Order received!

Summary:

3 HD@$3=$9

2 CO@$3=$6

2 LEM@$3.50=$7

Total=$22

Reply Y to ACCEPT

Credit Card charged

N to CANCEL

Fourth Message

Thank you for ordering!

Your order has been confirmed!

Confirm # REIF1001

Powered by: THE SPORTS AUTHORITY!

Fifth Message

ORDER READY

Bring Confirm # REIF1001 to Concession # 33 by sect # 212

$2 off NIKE baseball gloves

Bring #NIKE305 and game ticket to

Any SPORTS AUTHORITY!

In another embodiment of the invention used in concessions initiative, the concession attendant receives the confirmation number or other identifying information from the customer when picking up the concessions. The concessions attendant enters the confirmation number or other identifying information when ready or optionally clicks on the order on the computer screen via a concessions interface associated therewith. From there, the order is then cleared from the system with respect to orders that require fulfillment, advantageously allowing the workers to streamline their work activities in the concessions. In an alternative embodiment, the concessions are actually delivered to the customer using the customer provided seating information, either provided by the customer through, for example, the wireless device or other registration and/or notification process, or even via a telephone call or automated attendant to associate with the order.

In another embodiment of the invention, the concessions menu is advantageously only delivered to customers that have entered the stadium via a location determination system, and/or checked into the stadium via a ticket reader/scanner. In alternative embodiments, all customers that have registered for the concessions service will receive an introductory message. Thus, customers that are not attending the game need only reply with a request to terminate the concessions service for that event and/or game.

In an alternative embodiment, the customer is advantageously directed to closest concessions via, for example, GPS chip in phone or by knowing where the customer sits at check in, or by having the customer input their seat location or location where they would like to pickup the concessions.

In another embodiment of the invention, we have determined that some mobile phones will utilize different transmit and receive addresses, and therefore, a user may not know how to appropriately register to be a subscriber for one or more wireless initiatives. For example, we have determined that some mobile phone networks utilize slightly different or different electronic addresses for the transmitting and receiving of electronic messages. For example, for the Research In Motion (RIM) Blackberry communication service, the mobile device is assigned a desktop email address. In one configuration of Blackberry, the mobile device only has one address. However, in the non-integrated configuration, the mobile device actually has a separate address when transmitting from the receive address.

In accordance with this embodiment of the invention, the user registers by providing their mobile phone number and optionally a network carrier for same. In this embodiment, the mobile phone user registers with their phone number and optionally wireless network provider. The registration system of the present invention then sends a message to the mobile device, requesting that the mobile device respond, optionally with a predetermined code and/or predetermined message. The mobile device then responds to the registration system, and the registration system corresponds the mobile device response with the original registered mobile address, thereby completing the registration process by ensuring that responses received from the mobile device can be mapped appropriately to the mobile subscriber. In the embodiment where the mobile user is requested to provide a predetermined code and/or message, the registration system uses the predetermined code to map the mobile phone response potentially having a different address with the transmit address provided by the user.

Dating, Matchmaking and/or Networking

In another embodiment of the invention, patrons are provided the opportunity to meet others in the venue or at a predesignated location near or away from the venue using standard matching rules. In one embodiment, the presence of the user is detected when entering the stadium, for example, via the ticket entrance systems. In another embodiment, the presence of the patron is detected or determined based on a message that is send to the user, for example, either right before, during or after the game. In this embodiment, the user can be prompted with a request whether they would like to participate in the matchmaking, dating and/or networking program.

For example, potential business or social partners may be selected or prompted for networking or dating. When the user responds yes, in this embodiment, their current seat is irrelevant if that seat is not to be released for another patron. Therefore, the system need only select a new set of seats for the networking and/or dating for the patrons, transmit the patrons the additional new seats via, for example, a wireless ticket, update the venue seating database for subsequent verification by the ushers when seating the patrons. The patrons may then proceed to the new location and have a meeting or date, and then return to their original seats if desired.

In another embodiment, a “burnt bridge” approach or feature is provided where the original seats for the patrons that are meeting are then released for other upgrade and/or networking programs. In this embodiment, the original seat of the patron must be known for example, via check-in procedure, registration for the program in advance for example over the web registration process or other registration process, or via the patron responding to the system with their wireless device of their current seat location. Alternate combinations or modifications of the above embodiments is also used.

Trivia

In the alternative embodiment of providing the user trivia information, based on registration and/or location, for example, while attending the game, watching the game at home, or any time prior to or after the game, the user may be provided with questions, as described above, to answer as part of a tournament and/or to be eligible for prizes, awards, and the like. In one embodiment, a section or portion of the users are targeted for the questions together, while other sections and/or portions of the users are targeted at a time period thereafter, for example, 1 minute later, to stagger the communication and transmission of data, thereby reducing congestion and/or unnecessary hardware to accomplish the transmission and acceptance of information to/from the patron.

In one embodiment, while all the questions are staggered over a predetermined period of time to the patrons, whether limited to patrons in the stadium, out of the stadium and/or both, the patrons are not notified whether their answer is correct until after all questions have been transmitted, and all patrons are provided the opportunity and/or sufficient time to respond. Once that predetermined time period has elapsed, the patrons will be notified whether their answer was correct, and whether they are still in the tournament. In optional embodiments, a predetermined time period will again elapse until new questions are sent and the tournament continues.

Optional Oracle or My SQL Database

In one embodiment of the invention, an Oracle or My SQL Database is used in connection with the present invention. In one embodiment, the result set is set to be proportionally with respect to the number of users and/or data that will be stored in the system. In another embodiment, the database is optionally partitioned for specific games and/or initiatives or groups of games and/or initiatives. The system is preferably thread safe when running the games and/or initiatives. The system is optionally integrated with Credit Card for payment, and/or integrated with the venue ticket system and/or point of sale system to optionally determine who came in and when into the venue. In another embodiment, the present invention maintains and updates financial balances for users, such as patrons and stadiums. In alternative embodiments, secure interaction with ushers and an interactive kiosk is provided.

The present invention optionally provides any standard algorithm for partitioning of group of seats and users, for example, for system resource allocation, load balancing and/or division of system functionality. In alternative embodiments, a local kiosk for the stadium and/or venue is provided where the user can enter information, such as register for one or more initiatives and/or programs. In alternative embodiments, the system of the present invention includes the capability of offering for sale seats which are not currently sold via messaging to wireless devices, such as text messaging to mobile phones, or other messaging and/or wireless communication to wireless devices, and consideration. In alternative embodiments of the invention, standard algorithms such as used in the airline industry may be used to overbook seats for the venue, and consideration.

In alternative embodiment of the invention, instant messaging or any type of communication method can be used in the present invention, include local and/or global networks, such as the Internet, LANs, WANs, WAP, 811.02a, 802.11b, 802.11g networks, and the like.

Messaging Software Requirements

Trivia and/or other messaging products/initiatives are Java applications that run in a J2EE application server and utilize a JDBC 2.0 compliant relational database. There are typically open source options available for system support. Currently for development and test environments we utilize are desktop environments running Windows 2000 with the open source options below. The draw back is that open source options typically don't provide formal system support approaches, although we have found the software to be very reliable and would recommend this approach for early stage pilots. Should the customer prefer purchase software options for these components are provided as well.

I. Server Software Specifications

Alternative A—Open Source Approach (1) Web/Application Server—Tomcat 4.1.18

(2) Database—MySQL 4.0

(3) Windows 2000 Server for each server

Alternative B—Purchased Product Approach (1) Application Server—Websphere Application Server 5.0

(2) Database—Oracle 9i DBMS (3) Windows 2000 Server for each server

II. Server Hardware Specifications (4) Each of the HW Servers specification:
- (i) 2xCPU—P4 2.4 GHz Xeon
- (ii) 2 GB RAM
- (iii) Monitor
- (iv) CD ROM
- (v) Floppy Drive
- (vi) Hard Drive depending on volume (see below)

III. Communication Specifications (5) POP3 Account and SMTP server accounts that can support number of active subscribers (6) Dedicated T1 access to POP3 and SMTP provider IV. Hardware and Software Sizing Configurations Phase 1:

1K-10K subscribers and players during the game

Two Servers

Server 1—runs Web/Application Server for the website and the Trivia Application

Server 2—runs the Database server (20 Gig)

Phase 2:

10K-25K subscribers and players during the game

Server 1—runs Application Server for the Website front end

Servers 2 and 3 (2 Servers)—run the Application Server for Trivia Application (two servers are used handle load balancing)

Server 4—runs the Database server (50 gig) (Level 1 RAID 2×50G Array)

(Server 5—used as a backup to server 4—depending upon Reliability requirements)

Phase 3:

25K-50K subscribers and players during the game

Server 1—runs Application Server to run the Website front end

Servers 2, 3, 4 and 5—run the Application Server for Trivia Application (four servers are used to handle load balancing with hardware and software clustering)

Server 6—Database Server—150 gig (Level 0+1 RAID 6*50G Array)

(Server 7—used as a backup to server 6—depending upon reliability requirements).

In one alternative embodiment, as part of the sign up for trivia the system optionally asks the general admission or season ticket holders to input their seats to simplify how the system obtains information where the patron is being seated when they come to the game. In an alternative embodiment, the system obtains this information from the stadium database system, kiosk where the patron can enter the information at the stadium and/or via the point of sales system by the service personnel or attendant that is selling the tickets. Using any of the above methods, once the system knows where the patron is/are seating when present at the game, the system can then target sections of the stadium for, for example, the trivia quiz or other service/offering to the patrons.

Examples of different sections that can be separately targeted include for baseball, behind first base line first, behind home plate second, first base line third—all lower deck; same sections for upper deck and bleachers. Other sports may include football, hockey, soccer, basketball, and the like. In accordance with this embodiment, targeting different sections over different periods of time, thereby preventing a long delay to receive answers once the question is transmitted, may minimize collusion among patrons.

Thus, by segmenting the stadium over a few minutes in accordance with one embodiment of the invention, the present invention may increase the window of transmission to, for example, 2 minutes or more for the first round. As the rounds get successively smaller, the present invention will transmit messages faster. The present invention also provides optional winners for different sections of the field. In addition, the section winners can further optionally compete against each other, for example, the first class seating winner can further compete against the bleachers winner, and the like.

As discussed above, one or more of the above alternative embodiments may be incorporated into the embodiments described above, and/or any of the embodiments discussed below. Furthermore, any of the embodiments of the present invention may be used for any reserved seating or other event.

Thus, any or all of the following advantages may be provided by the present invention: decrease costs incurred via printing fewer tickets; decrease the number of employees at the events as a result of increased home based printing, wireless device and/or smart card usage; increase efficiency at concession stands; provide another method and outlet to sell tickets and concessions; sell more tickets using e-mail messages; improve sales of tickets and concessions from key demographic information; receive a portion of advertisement sales; improve safety due to the decrease in the amount of cash handled at the theatres; ensure that parents' money given to children is actually spent on the concessions; shorter lines; greater convenience at the concession stand and point of sale; advance sales; more information about events before purchase of ticket; easy way to control a family budget; greater access to merchandise; improve demographic information to improve sales; direct marketing; higher impact for advertising via e mail messages; and/or more focused advertising.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

DESCRIPTION OF BEST MODE OF THE INVENTION

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made. For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Driven by a widespread understanding of the Internet's capabilities, the power of electronic commerce, and advances in wireless technologies and devices, mobile commerce (m-commerce) is rapidly approaching the business forefront. According to independent research findings, m-commerce—the conduct of business and services over portable, wireless devices—will soon be a dominant force in business and society. For example:

IDC, an information technology research firm, reports that 70 percent of all wireless subscribers worldwide will access data applications via their phones by 2002.

The investment firm Robinson Humphrey predicts that, in the US, 50 percent of Internet hits will originate from wireless devices by 2004.

The Yankee Group, a telecommunications research firm, projects that by 2004 more than 40 percent of wireless users in the US will access Internet content directly from their mobile devices.

The viability of these projections depends on the power of the underlying technology drivers and the attractiveness of m-commerce applications. To compete in a marketplace dominated by wireless devices, businesses must devise effective m-commerce strategies. Building successful strategies begins by recognizing the forces driving m-commerce's emergence.

The US Federal Communication Commission's auctioning of personal communication-service spectrum space in the mid-1990s triggered the current rush to wireless communication methods. Wireless communication now encompasses not only telephones but appliances, including personal digital assistants (PDAs).

Figure 1:
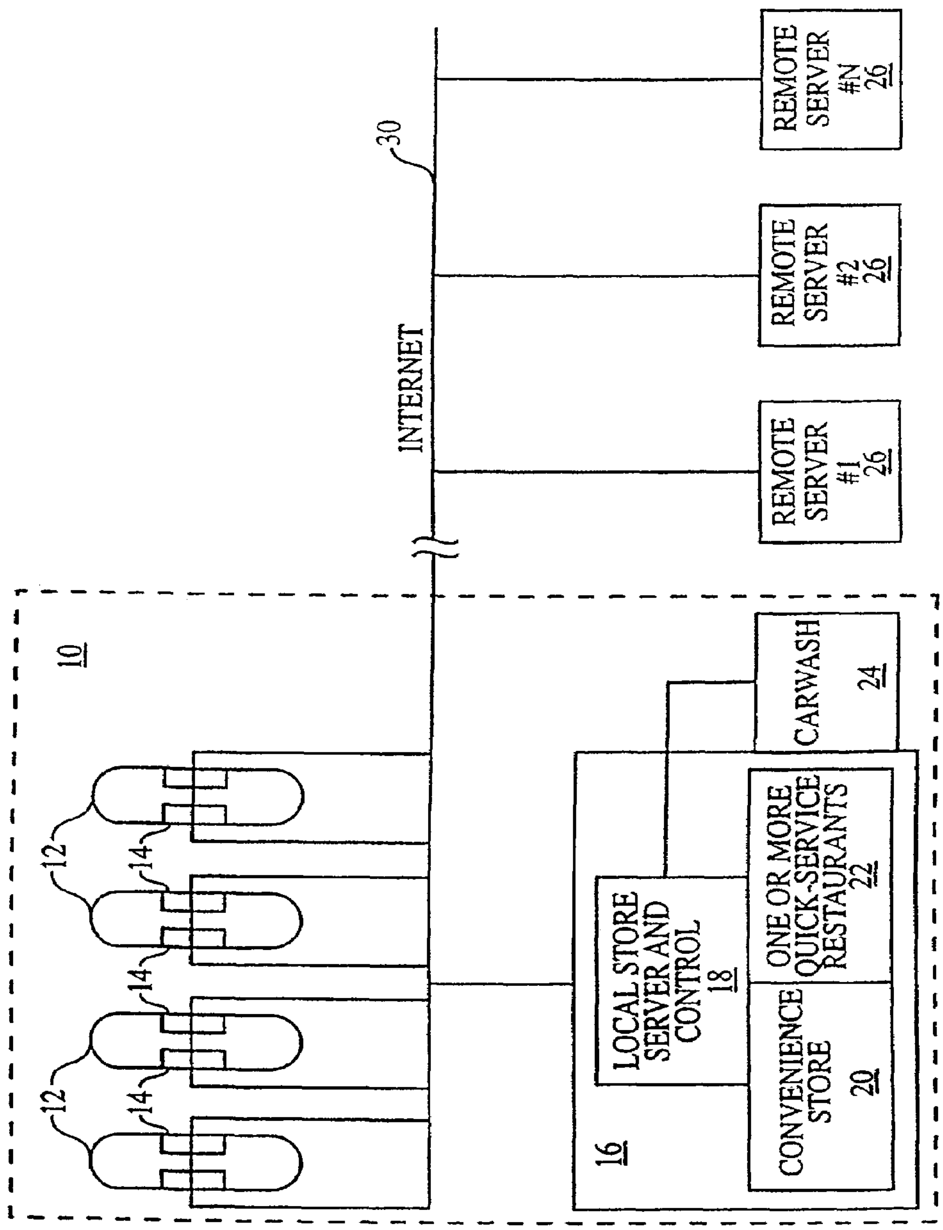
FIG. 1 is directed to a prior art Internet capable browser dispenser architecture.
Figure 2:
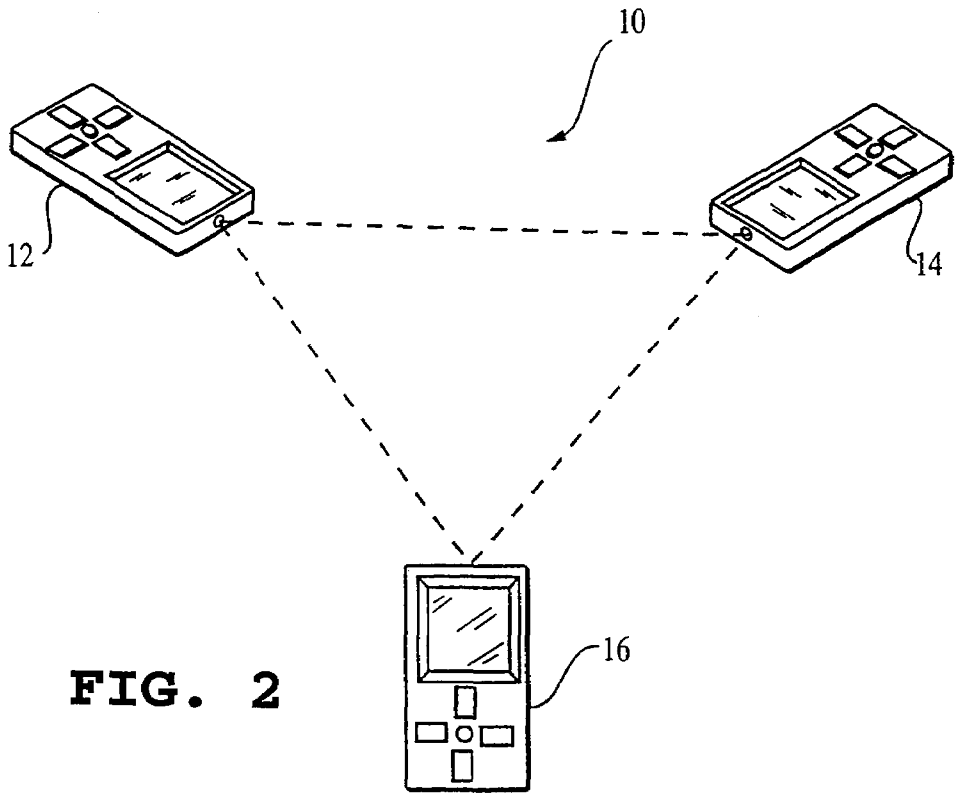
FIGS. 2-3 are illustrations of a prior art interactive game system.
Figure 3:
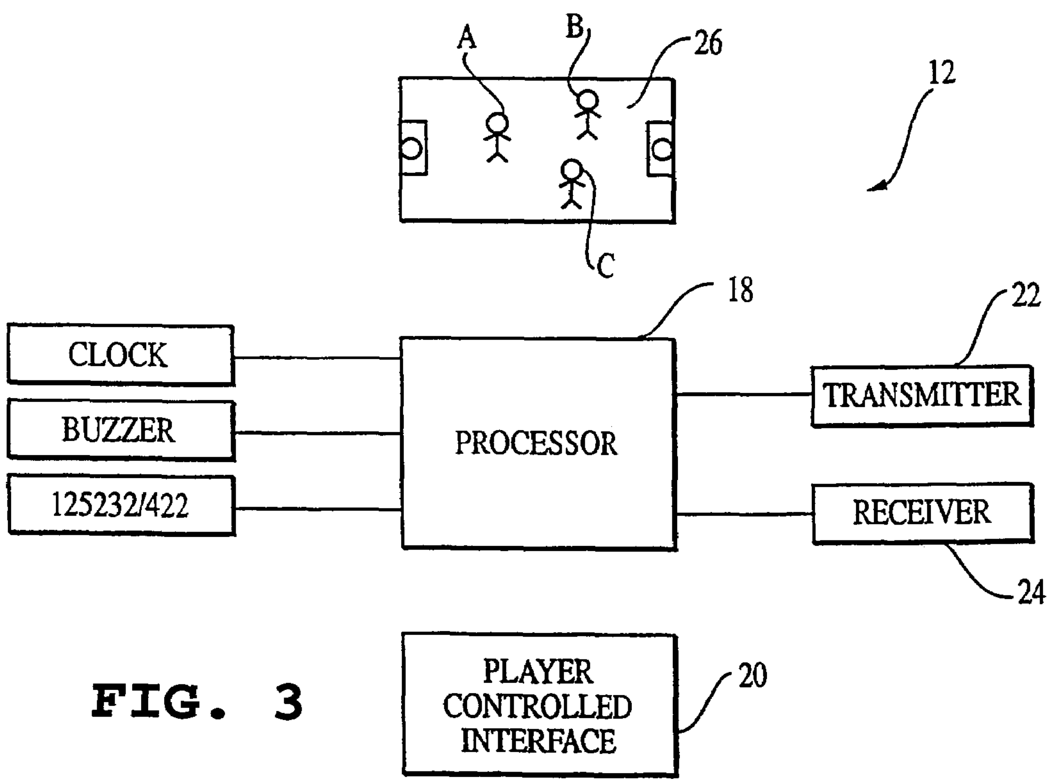
Figure 4:
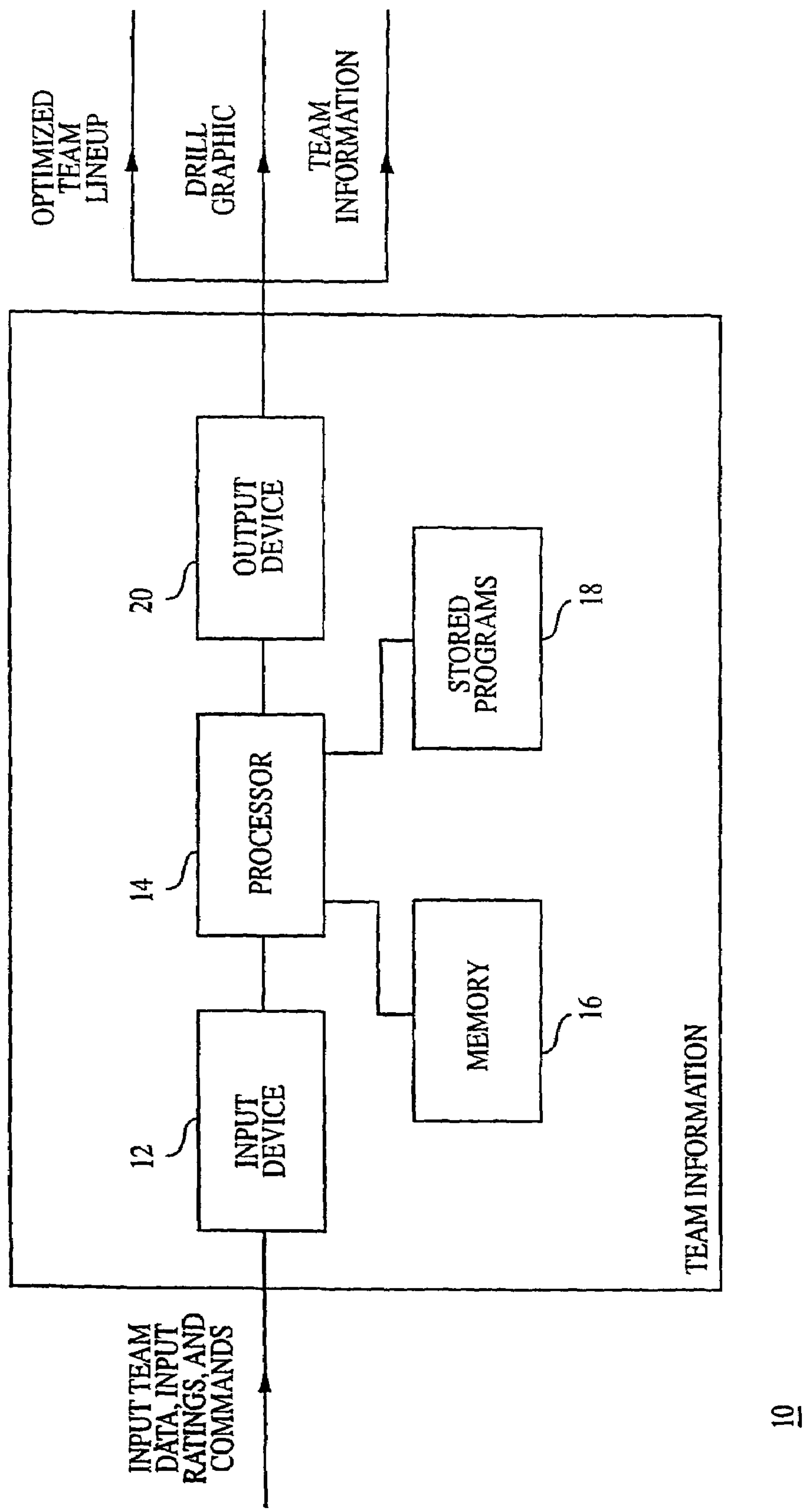
FIG. 4 is an illustration of a prior art portable computing device for organizing a sports team.
Figure 5:
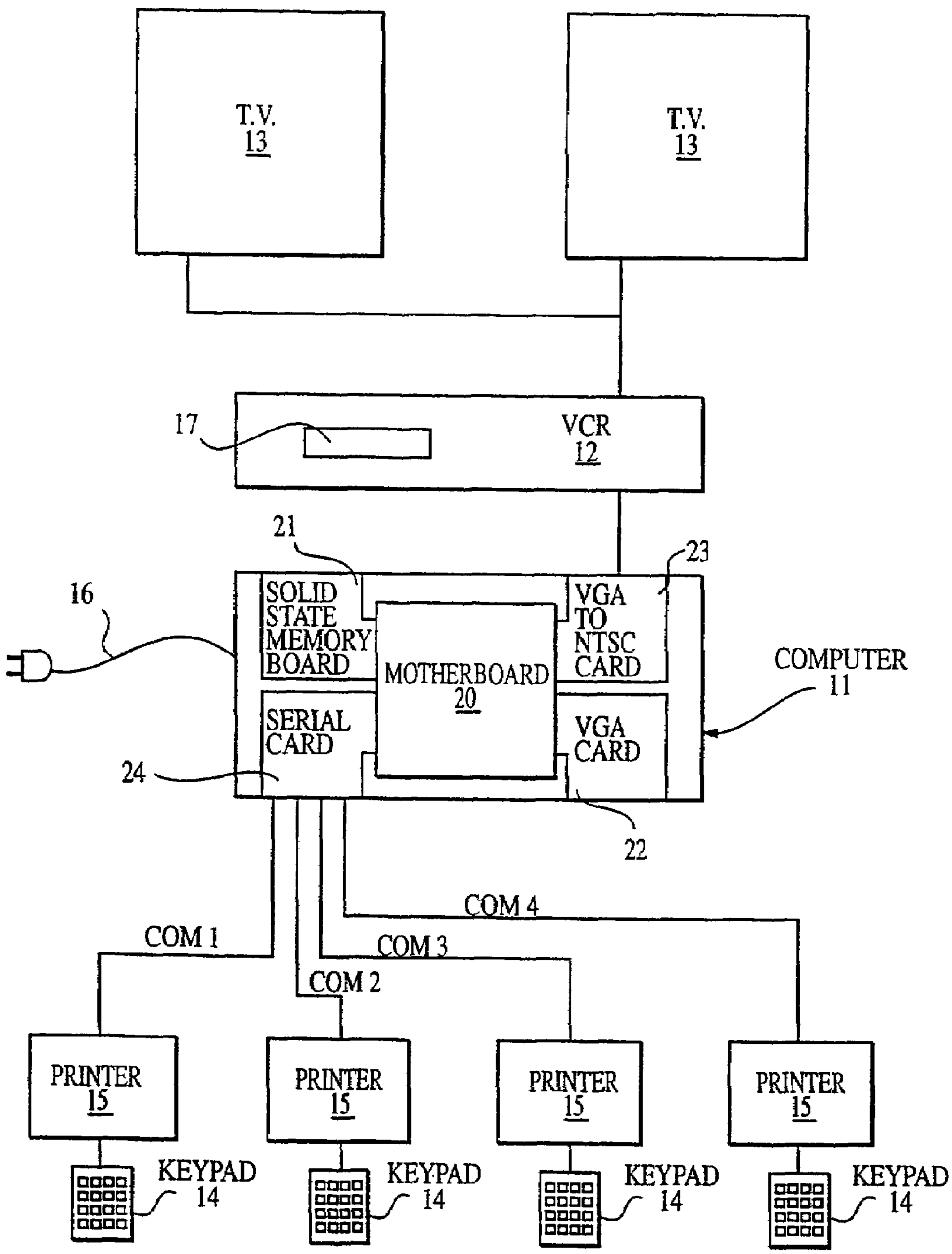
FIG. 5 is a prior art illustration of a portable computerized pari-mutuel sports entertainment system.
Figure 6:
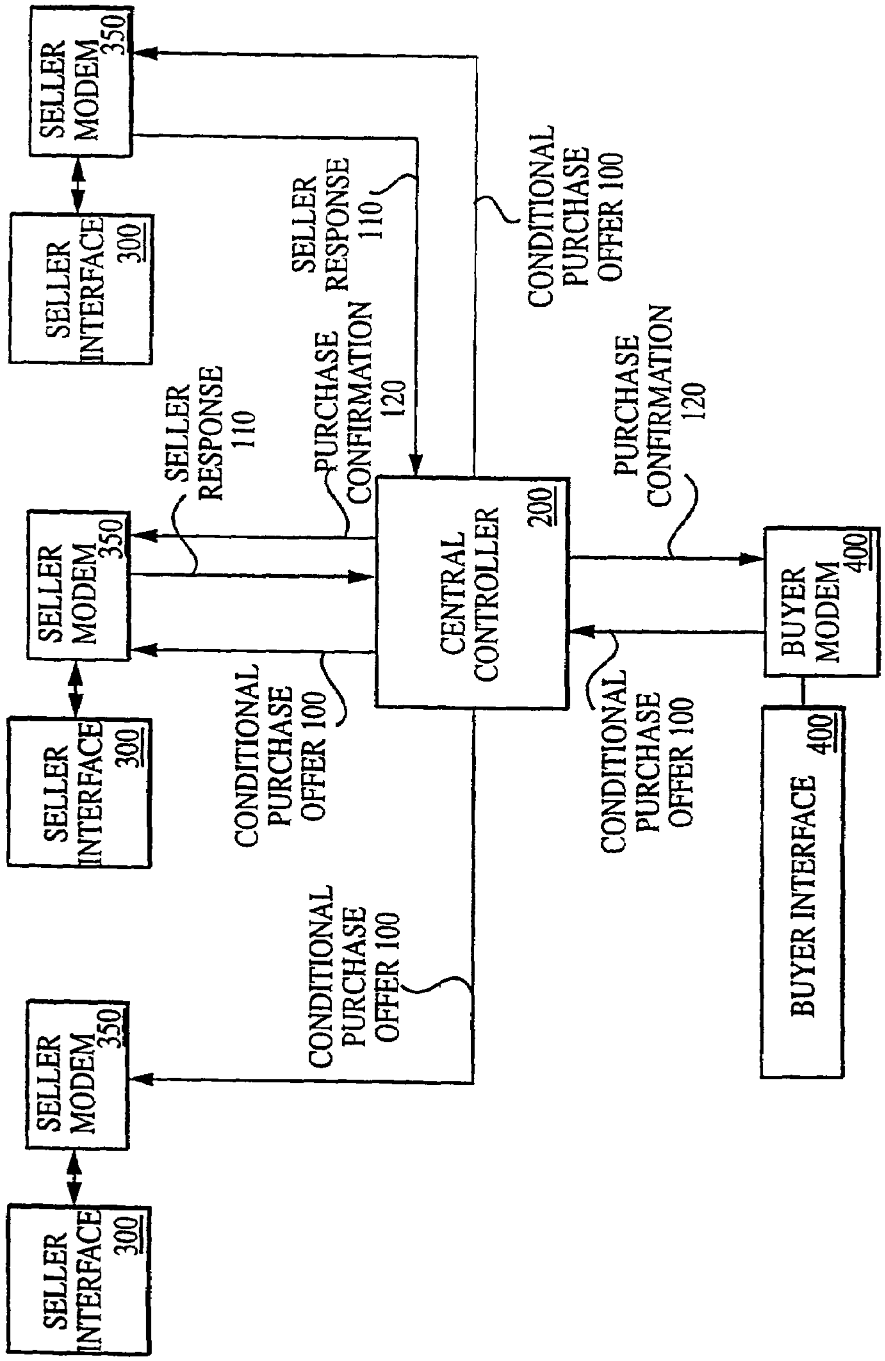
FIG. 6 is an illustration of a prior art method and apparatus for a cryptographically assisted commercial network system designed to facilitate buyer-driven conditional purchase offers.
Figure 7:
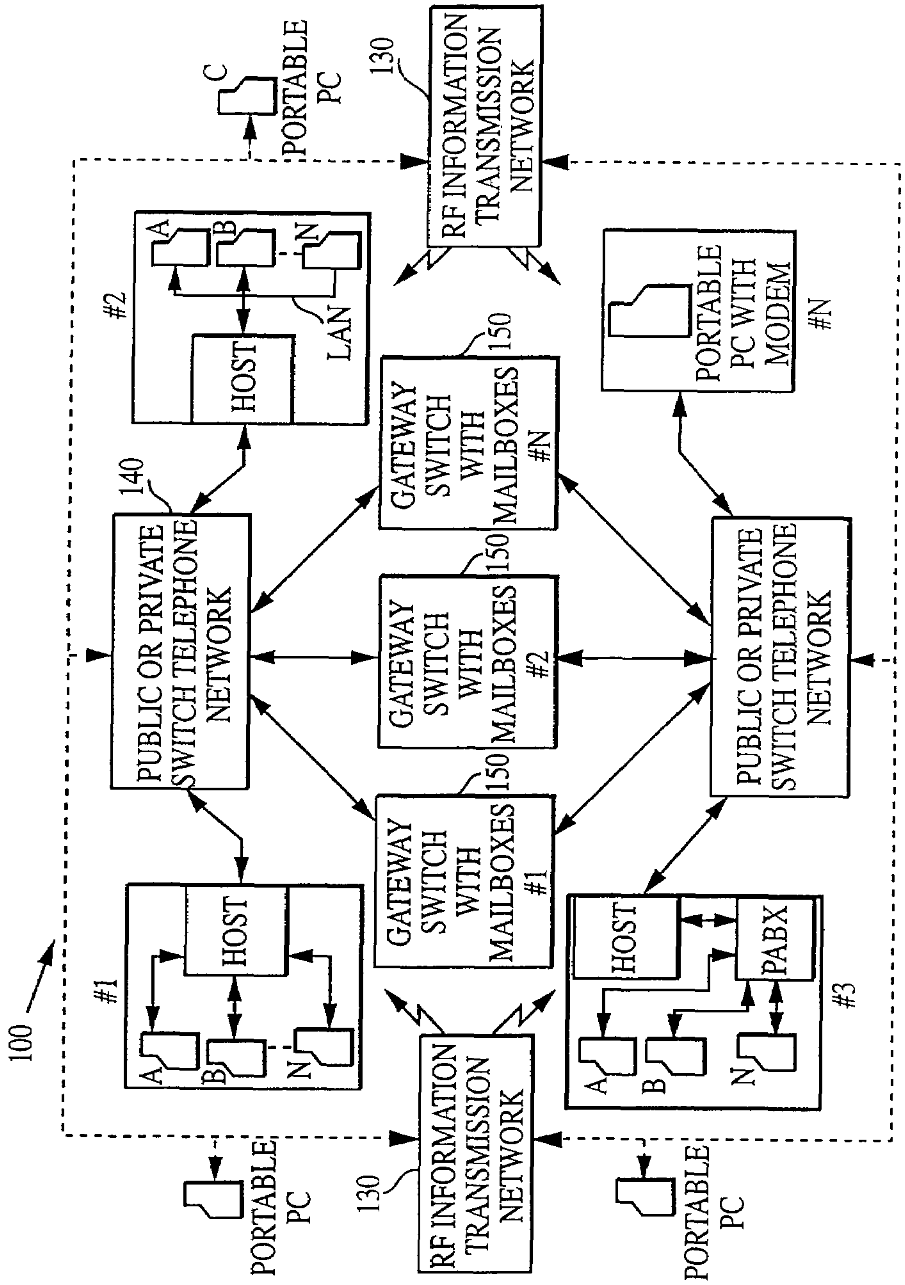
FIGS. 7-9 show a prior art radio frequency (RF) transmission system.
Figure 8:
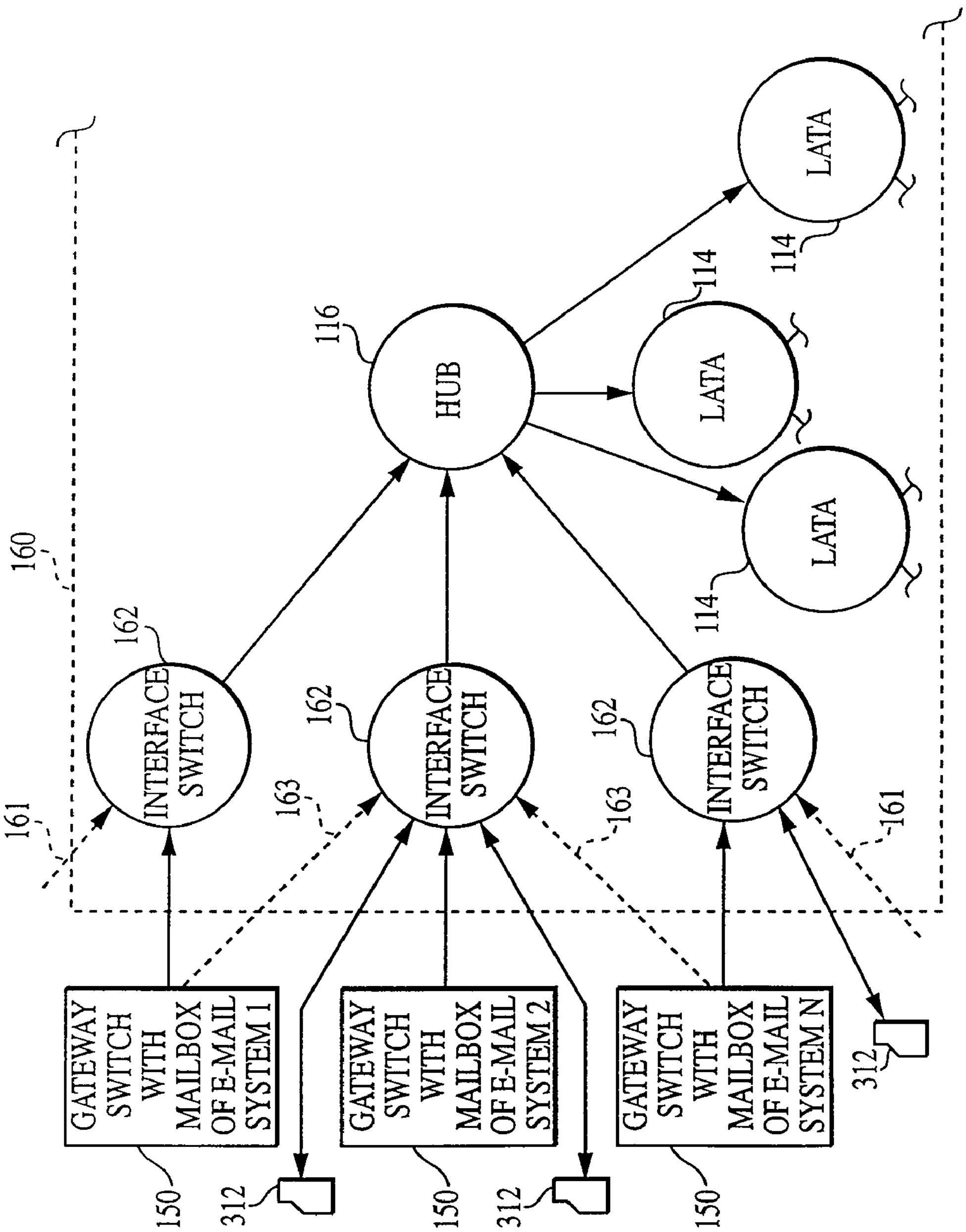
Figure 9:
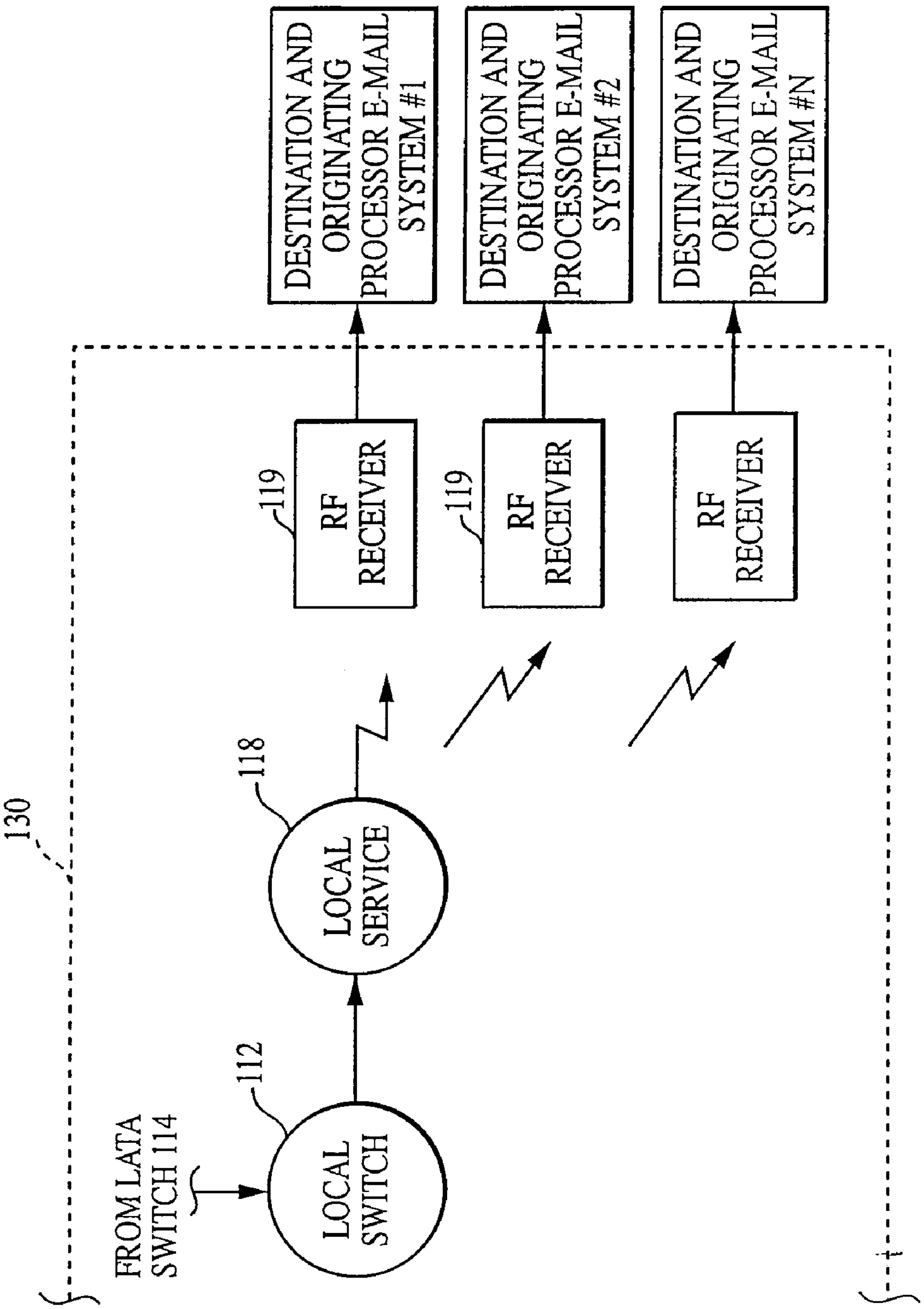
Figure 10:
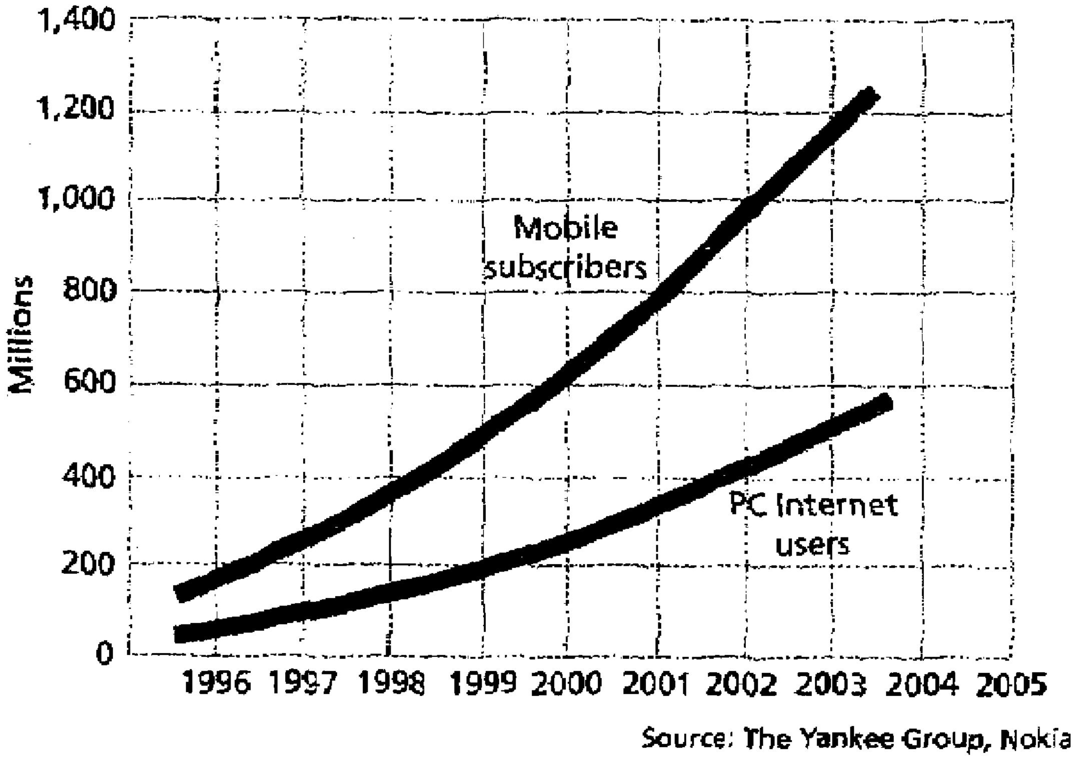
FIG. 10 is an illustration of Yankee Group projections for an installed base of PCs that will reach 500 million by 2003.

Internet use has grown on the strength of PC networks. According to Yankee Group projections, the installed base of PCs will reach 500 million by 2003, as FIG. 10 shows. This huge base is essential to continued growth in electronic commerce and other communications applications. Moreover, because these systems will have greater power and storage capability, as well as the best ever price-performance ratios, more powerful and sophisticated applications will likely emerge for desktop computing and the Internet.

Although these expectations are impressive, PCs still have two limiting characteristics. First, users must sit in front of them. Second, even portable-notebook PCs have to load software, dial into and connect with a network service provider, and await completion of the handshaking process before they can launch an Internet application. This sequence is understandable, but at best it seems a tolerable nuisance. Hence, the dominant applications are still those that are worth the trouble it takes for a user to follow this access sequence or, at least, to keep the computer and applications running.

The aggregate PC installation is substantial, but even more mobile communication devices are in use. The Gartner Group and other research firms project that by 2004, the installed base of mobile phones worldwide will exceed 1 billion more than twice the number of PCs. In addition, the number of other wireless mobile devices will also increase dramatically. Wireless PDA use will more than triple in the next three years. Unlike PCs, these wireless devices require no boot sequence, so people can use them as soon as they turn them on-making them attractive for quick-hit applications.

Figure 11:
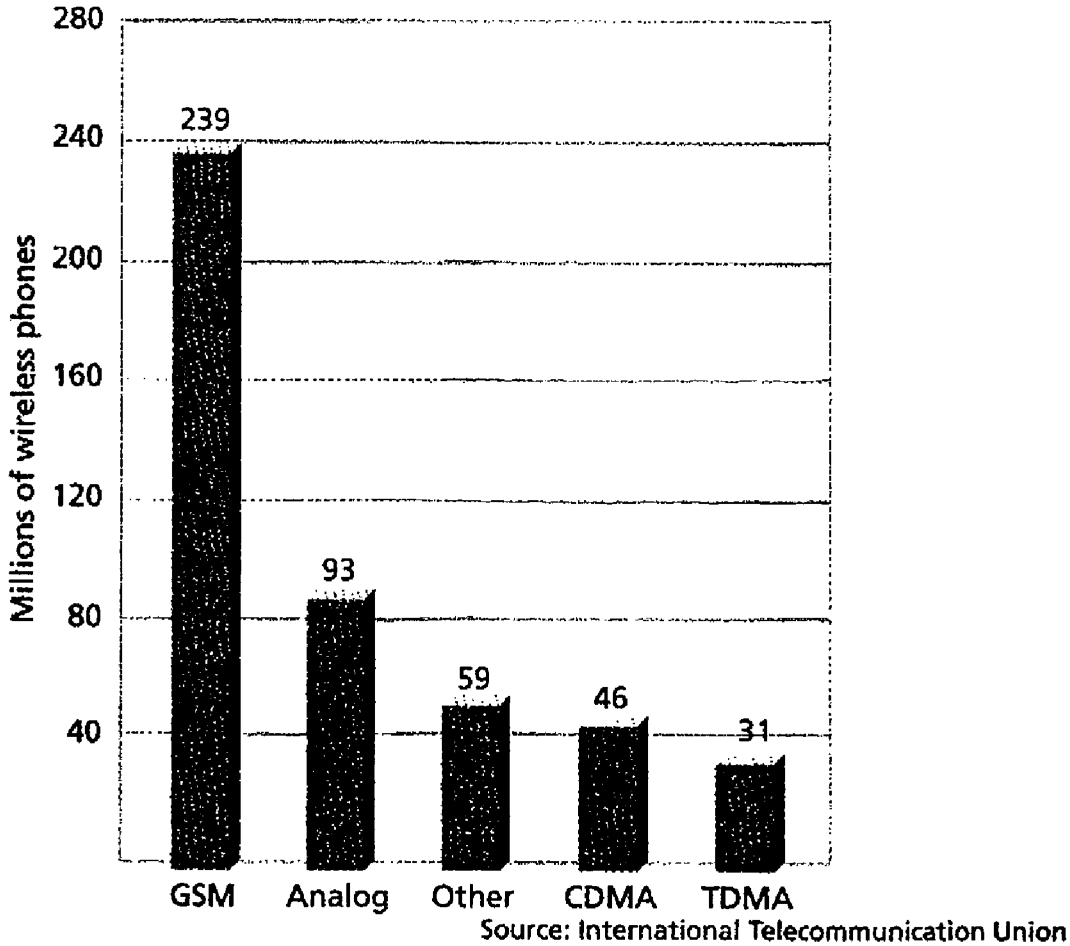
FIG. 11 shows that mobile network carriers have relied on a variety of incompatible wireless access standards.

Just as the transmission control protocol/Internet protocol and the general purpose browser were principal drivers of Internet growth, letting disparate devices interconnect and communicate, similar factors will simplify the interconnectivity and communication of heterogeneous wireless devices. As FIG. 11 shows, mobile network carriers have relied on a variety of incompatible wireless access standards. Recently, however, a common communications technology and uniform interface standard for presenting and delivering wireless services on mobile devices-wireless application protocol (WAP)—have emerged.

WAP specifications include a microbrowser; scripting similar to JavaScript; access functions; and layered communication specifications for sessions, transport, and security. These specifications enable interface-independent and interoperable applications. Most wireless handset and device manufacturers, as well as several service and infrastructure providers, have adopted the WAP standard.

Current access technologies, including TDMA (time division multiple access), CDMA (code division multiple access), and GSM (Global System for Mobile Communication), transmit at 9.6 to 19.2 Kbps. These speeds are dramatically slower than the dial-up rates of desktop PCs connecting to the Internet. Although m-commerce is possible at these bandwidth rates, the slow speeds are not conducive to creating widespread business or consumer participation.

3G (third-generation) wireless technology will also be available. In addition to having greater bandwidth rates, with speeds up to 2 Mbps, 3G will support multimedia transmission. Integrating voice, data, and one- or two-way video will let m-commerce run over any wireless device.

M-commerce applications fall into three main categories: transaction management, digital content delivery, and telemetry services. Users will increasingly initiate a wide range of business transactions from mobile devices. Online shopping sites tailored to mobile phones and PDAs including browsing, selection, purchase, payment, and delivery—have already emerged. These sites include all the necessary shopping features, such as online catalogs, shopping carts, and back office functions. Online booksellers are among the firms that have already implemented wireless shopping transactions. Another class of m-commerce transactions involves using wireless devices to initiate and pay for purchases and services in real time. These kinds of transactions will likely increase as users gain the capability—and become comfortable enough—to manage them. The highest m-commerce transaction volume will probably occur in micro transactions. When individuals reach for their e-cash—equipped mobile phones or PDAs-rather than coins—to settle transactions such as subway fees, widespread use of digital cash will be a reality.

Digital content delivery uses the wireless channel's distribution characteristics. These m-commerce activities include information browsing—instant retrieval of status information (weather, transit schedules, sports scores, ticket availability, and market prices)—and directory services. The CNN Wireless news subscription service and the UPS PDA-linked package tracking and locator service are representative of emerging content delivery services.

Digital products easily transport to and from wireless devices. Hence, downloading entertainment products—for example, MP3 music-is likely to become even more commonplace when 3G arrives. Transferring software, high resolution images, and full-motion advertising messages will also become common activities. The emergence of high-quality display screens and greater bandwidth will undoubtedly trigger the development of innovative video applications. Individuals will use wireless devices to access, retrieve, store, and display high-resolution video content for entertainment, product demonstration, and distance learning.

The transmission and receipt of status, sensing, and measurement information—telemetry services—form the basis for a wide range of new applications involving mobile devices. Innovations in this area let people use wireless phones and appliances to communicate with various devices from their homes, offices, or in the field. For instance, delivery drivers will "ping" intelligent dispensing machines or store computers to determine where their rolling inventory is needed most or which locations need immediate service. Similarly, users will transmit messages to activate remote recording devices or service systems.

Active m-commerce applications function only when someone directly initiates them by transmitting payment details, requesting information, receiving specific content, or retrieving status information. In contrast, passive applications occur without the user taking any action—for example, the automatic collection of toll charges with dedicated cash cards. Integrating digital cash into mobile devices would make these cash cards unnecessary. These wireless devices would facilitate and record payment of toll, mass-transit, fast-food, and other transactions without the user authorizing or entering identification information for each individual transaction. Users could arrange to have their cash chips update automatically by directing the wireless device to contact their money source and download additional digital cash whenever necessary.

Popular in Europe, short messages text messages, up to 160 characters in length, that show up on the recipient's display as they arrive—are examples of passive content delivery. As digital convergence becomes more commonplace, all forms of mail will passively go to wireless devices, including digitized voice mail, fax documents, and e-mail. Passive security, intrusion, and emergency telemetry services will refine the monitoring of facilities and individuals. Any unusual event or unacceptable condition will trigger user notification, regardless of location. Airlines are testing technology that will let them alert passengers, especially frequent fliers, to seat upgrades, schedule changes, and so on, through wireless devices. Some airlines already have prototype telemetry systems that transmit this kind of information to passengers as soon as they enter the airport or pass near a kiosk-like device.

Passive m-commerce telemetry is the foundation of still another form of interactive marketing. Stores will be able to market their products and services by transmitting promotional coupons and messages to passers by: "Come in and enjoy a complimentary cup of our new coffee blend," or "Get half off, if you make your purchase within the next 30 minutes." This type of marketing may give rise to a new challenge: managing m-junk messages without turning off your wireless device.

The technology to facilitate m-commerce is within reach, even as barriers to its development fall away. Applications and wireless devices promise to evolve together, each driving the introduction of innovative and powerful features in the other. The opportunity and challenge is for business to develop strategies that capitalize on the strengths of mobile commerce, thereby helping it to compete in an increasingly digital marketplace. The greatest challenge to structuring such a strategy may be creating the innovations that will meet the needs and expectations of consumers and commercial participants. Additional details regarding the above may be found in James A. Senn, The Emergence of M-Commerce, IEEE COMPUTER (December 2000), incorporated herein by reference and all references cited there incorporated herein by reference.

In accordance with one embodiment of the invention, the process begins as all tickets are checked in, for example, as the patrons enter the reserved seating area, such as a stadium or theater, through, for example, bar code readers, scanners, infrared readers, and/or manually or other method where the patron is checked in, either at the gate, seat or other location. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. The patron may check in either a predetermined time before or after the event begins. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seats for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, or other predetermined process.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or more means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. Optionally, a bidding process may be initiated that allows various patrons to bid against one another. Any standard bidding process may optionally be used. The patron, of course has the option to decline, and if so, the process continues and returns to the re-allocation process to attempt to locate another possible patron.

If the patron accepts, payment of money or other means may be effectuated on the spot via the wireless device, credit card, debit card, points, and the like, and the patron may now move to the other seat. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

In another embodiment of the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that have already purchased tickets in the vicinity of the stadium but were unable to get seats and/or may be in the vicinity of the stadium but were unable to get seats. Since the present invention re-allocates and/or sells tickets at any time prior to and/or after beginning of game time in accordance with one embodiment, the patron may be in the general vicinity of the stadium to take advantage of this embodiment of the invention or even at any location when being offered upgrades and/or seats well in advance of the game. For example, the present invention can upgrade or sell tickets to patrons well in advance of the game since it advantageously is permitted or has the authority to resell tickets either via ticket holders that do not show up during the game and/or, for example, season ticket holders that have authorized the stadium in advance to resell their tickets based on predetermined criteria, for example, when the season ticket holder notifies the stadium that they will not be present at next weeks game.

In one optional embodiment of the invention, the patron presents the usher with the confirmation number which the usher can enter into a wireless device using a local or private wireless network, or can simply use a walkie talkie or telephone to call the dispatcher to confirm the upgrade and/or new seats using the customer provided confirmation number. The dispatcher will have access to the system to enter the confirmation number to confirm the validity of the upgrade. Alternatively, a patron will retain their old ticket. The patron will give in the old ticket to the usher which is scanned or barcoded by the usher for immediate identification of new seats and used in place of, or in addition to, confirmation number.

Of course, the confirmation may optionally be made via customer name with an appropriate identification card or other information. Further, alternative methods may be used to verify that the confirmation number and/or ticket being used by the patron is valid. For example, the patron may be equipped with a printing device associated with the wireless device or download an actual ticket on line from home prior to the game for the new ticket or upgrade. Alternatively, the patron may be equipped with an identifier card, optionally including a bar code with a unique identifier relating to the patron's account information and profile that can be scanned for additional convenience. Alternatively, a wireless device may be used to securely store this type of identification and/or account information.

In at least one alternative embodiment of the invention, the patron may comprise optionally a corporate account that has a number of tickets, for example, season tickets. In this embodiment, the corporate account may have associated therewith a plurality of email addresses or other communication addresses to transmit the seat or upgrade offer to a number of potential patrons that may rotate their attendance at the games. In accordance with this optional embodiment, multiple emails can be stored for a single user/corporate account, and the system may transmit individual messages to all email addresses, or may only transmit messages to individual patrons for corporate account that individually advise the system that they are associated with a particular ticket/bar code for a particular game and will be/are present at a particular game.

In an alternative embodiment, patrons may enter the stadium and subsequently inform the system that they are present and interested in an upgrade via a kiosk where the patron can scan a bar code and enter their customer number to be eligible for upgrades during the game. The system is then able to transmit a message to the customer, assuming that the customer has pre-registered with the system with the appropriate contact information. Alternatively, or in addition to individual use of a kiosk(s), the customer sales office may have a kiosk or additional functionality to enter the customer name and/or customer account and scan in the bar coded ticket on the spot to register each patron as they enter the stadium or venue.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron upon entry in the stadium to help the patron decide the quality of the upgrade and whether to accept when an offer is received by the patron at a predetermined time. The graphical map may comprise a small booklet with a map of the stadium showing seat locations, and optionally a game schedule.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provides additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In alternative embodiments, patrons in the vicinity of the upgraded and re-allocated patrons may optionally be eligible for a dating or matching service where patrons register and provide profile information to the system and/or through a third service provider dating service. Once the system knows that the patrons will be coming to the game and/or have actually checked in to the stadium, the system can then arrange for the two, four, etc. patrons to meet each other by allocating and/or re-allocating seats to the patrons together. Thus, based on profile information, customer request and availability, the system is able to upgrade or sell tickets to patrons to maximize their chances of meeting someone at the game. This optional feature provides significant potential enjoyment for the patrons participating in this dating or connection program. In accordance with this embodiment, one possible sequence of acceptance steps involves profile matching the two patrons (or groups of patrons) based on predetermined profile information; transmitting a first message to the first patron regarding availability of the second patron and requesting a conditional acceptance form the first patron; transmitting a second message to the second patron indicating that the first patron has conditionally accepted and request the second patron to accept; and when the second patron accepts before the first patron has rescinded the conditional acceptance, finalizing the upgrade and/or seat allocation for the first and second patrons. This embodiment of the invention is a complete reverse from typical dating and/or matchmaking services which attempt to develop detailed algorithms for the matching process because of the significant decision that exists in determining who to spend valuable time with. In accordance with the invention, patrons are already present at the game, and therefore, half or more than half the effort is already done. The remainder is to actually meet the other person which can be accomplished with profile criteria, whether or not the algorithms are very sophisticated.

In one embodiment, the patrons that are being matched have their original seats maintained and not made available for other upgrades in the event the matching does not work out early on. In this embodiment, one or both the patrons can return to their original seat. Hopefully, there will not be a significant argument of who would need to return to their original seat if an upgrade is actually performed. In addition, in accordance with this embodiment, the seats that are selected do not necessarily have to be better seats in the classical sense. That is, seats further away from other ticket holders might be considered preferred when matching two individuals for the first time. Alternatively, couple that would prefer a little more privacy or quieter game might request to be moved to a more isolated area. Alternatively, families with small children might prefer to be moved to a less busy area as well during the game where the children might be able to freely move around. All these scenarios and/or alternatives are possible in view of the present invention. The advantage of performing a match in a public setting is that the patrons do not have to worry about leaving or ending the date, and also do not have to worry that the other person will have their home address.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like.

In addition, this feature also optionally permits the patrons that have participated in the program to rate one another for future dates. For example, one patron can rate the conversational benefits of the second patron, the appearance of the second patron, the overall short term versus long terms relationship goals of the patron, and the like. These ratings may then be taken into account in the algorithm for future seat assignments, re-allocations and/or upgrades in the future for the first and second patrons, and all other patrons will now benefit with the additional profile information of the first and second patrons. The matching service may be for amusement or work related networking purposes, for example, to meet an executive that the patron currently works with or wishes to work with/sell in the future.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like. In addition, the system advantageously and optionally provides the feature of allowing patrons to text message one another directly, and/or exchange pictures via wireless email, text messaging, and other wireless devices that provide the standard capability of exchanging pictures, such a T Mobile and/or Sprint.

In alternative embodiments, the ticket holder can call in via a voice to text message, text message and/or email and let the stadium know early that they are not coming. In this manner the ticket holder obtains the convenience of the stadium or venue reselling their tickets in advance, thereby providing the venue with additional time to maximize the resale of the ticket.

In alternative embodiments, when the patron enters the stadium, they have their ticket barcoded or other device that detects their presence can be used such as infrared, Bluetooth, etc., and then they can become eligible for an upgrade. The patron can register in advance that they want to receive upgrades by providing their name, message address, e.g., email, telephone text message address, etc., and optionally their credit card or other payment mechanism for upgrades that actually cost money as opposed to free upgrades. In alternative embodiments, the patron can register at the ticket booth when purchasing their original ticket. In this scenario, the stadium representative can enter this information on behalf of, and with the permission of, the patron since the patron may already be providing their credit card, debit card, etc. to purchase the original tickets. Alternatively or in addition, a kiosk may be provided where the patron can enter their original ticket, e.g., scan in their original ticket and provide their name and text message information in the stadium to register for a one time upgrade for the game after purchasing, for example, a regular admission ticket.

In alternative embodiments, an usher can verify that the patron should be upgraded by the patron providing the confirmation number that may be transmitted in real-time by the system, and/or by the patron using their original confirmation number or original ticket with barcode or other identification means, such as a smart card, infrared reader, etc. that represents original ticket and presenting same to the user. The usher then needs only to scan in the original ticket and the system will verify whether the patron associated with the original ticket is valid and whether the upgrade is valid.

In alternative embodiments, a warning message may be sent to the ticket holder that has not shown up to game warning them that if they do not respond within a certain time period that their seat will be re-allocated or re-assigned to another patron. Similarly, a release message may be sent to the ticket holder after their seat has actually been released and/or re-allocated, thereby notifying the patron that if they change their mind in attending the game, they will have to obtain an additional ticket. In alternative embodiments, the ticket holder that has their seat released and re-allocated can be themselves re-allocated a similar, worse or better seat, depending on, for example, their subscriber value and/or other criteria. For example, if the patron is provided a better seat, this will encourage them to more readily give up their seats in the future even if they are attending the game. On the other hand, if the patron is provided a worse seat, then this encourages them not to artificially give up or have their seat released when attending the game. Accordingly, the present invention is designed to deal with various behavioral patterns of specific ticket holders, and may optionally and advantageously be a ticket holder specific with respect to various criteria for re-assigning, releasing, selling and/or re-allocating tickets.

In alternative embodiments, the system transmits to the ticket holder a welcome message after being upgraded and after having being moved to a new upgraded seat location. In one embodiment, the system identifies that the patron has been successfully upgraded after the patron provides the usher with a confirmation number or original ticket, which is then verified by the usher and system.

In alternative embodiments, the system, after having identified which patrons have checked into the stadium and/or have been upgraded, transmits a trivia question and/or additional advertisements to all patrons attending the game. In alternative embodiments, the information is transmitted to both patrons that are attending the game and additional patrons that have registered in the past to receive information but that are not attending the game. The participants can, for example, answer trivia questions and respond with their wireless device. Depending on whether the patron is attending the game or not, the system may determine to offer or deal with each of the patrons differently. For example, for patrons at the game, winners may be successively determined and narrowed, as patrons successfully and unsuccessfully answer questions, round after round of questions in a "spelling bee" format. For patrons that are not attending the game, winners may be declared, or statistics provided to the broadcast station that can be aired on television. In yet additional alternative embodiments, instead of transmitting information/questions to the patrons via the wireless device, the information/questions are displayed on the stadium billboard for patrons at the game and/or on television for patrons that are watching the game on television. The patron can then merely respond via the device, e.g., the telephone accordingly via a voice-to-text system or via other mobile devices via text messaging.

In alternative embodiments, the present invention provides the advantage of additional advertising sponsorship to the venue. For example, in one embodiment, the venue is partitioned into different locations that may be assigned to different sponsors. In one embodiment, the sponsor that provides the most value may be assigned a certain number of premium seats that are not available to other sponsors.

For example, the sponsor may offer a discount on the upgrade if you are a Verizon or Verizon Wireless customer or they credit your cell account for each seat upgrade or you get say 30 free minutes, etc. In alternative embodiments, the present invention provides the advantage of one wireless provider to advertise on another wireless providers mobile phone or wireless device. For example, if Verizon Wireless is a sponsor of the upgrade system for a particular stadium, the present invention will still work with, for example, AT&T, SPRINT, and CINGULAR customers. An advertisement message sent with the upgrade offer may read on the AT&T phone, "brought to you by Verizon Wireless." In an alternative embodiment of the present invention, text messaging is optionally used for mobile phones to perform the message communication of the present invention. The user is only required, in one embodiment, to reply or respond with a "Yes" to accept the upgrade offer since the user has advantageously pre-registered with the system, thereby minimizing the required communication/input by the user. In an alternative embodiment, the user, instead of pre-registering with the system, is charged on their wireless or even regular telephone number bill when they accept the upgrade offer. Thus, the wireless system that either administers the user's regular or wireless account or the upgrade sponsor may be responsible for actually billing the customer in this alternative embodiment.

In the alternative embodiment when text messaging is optionally used alone or in combination with other communication methods, the system provides the additional advantage of maximizing bandwidth usage by not requiring use of bandwidth on the wireless voice system, thereby maximizing system resources.

In another alternative embodiment, the present invention optionally and advantageously provides a security and/or safety feature in the event of, for example, a minor event where a parent gets separated from a child, a disaster or other event that might require evacuation of the stadium. In one embodiment, the person needing help provides their name to an attendant that can search the system for the contact information of their companion/parent. The system can thereafter send an email and/or text message to the companion/parent regarding the status of that person and provide instructions for meeting that person or arranging help, authorizing medical procedures, and the like. In another embodiment, the person requiring help, e.g., a child provides the attendant or kiosk with their ticket which can, e.g., scan the bar code or other reader system. The system can either automatically provide a text message to the parent who can then reply to the child/attendant via the kiosk to meet the child.

Alternatively, the parent can be instructed to meet the child at a predetermined location, and to stop looking for the child because the child was found. Thus, for this example, the person who is lost or separated from their party can notify security or access a kiosk. Security can, for example, notify the parent that child is in safe custody, and should not search the stadium, and therefore, meet outside stadium in a pre-specified safe place.

In an alternative embodiment, if a child/person is separated, the security guard/kiosk can arrange the best place to meet, either in or outside the stadium, together based on an optional global positioning system (GPS). In addition, the party with the mobile device can be provided directions on where to go to meet their party from who they have been separated.

In an alternative embodiment, the present invention may also be used in a security, defense and/or safety setting to direct patrons in a stadium for an orderly evacuation or notify patrons regarding status of a safety related event via, for example, a broadcast message including text message, email and the like. In this manner, system communication resources may be most efficiently utilized by not over-utilizing the system via voice communication, unless completely necessary. For example, the message can be broadcast in the event of an impending hurricane. In this situation, patrons in different sections get different messages, for example, to exit the stadium out of gates/exits that are either less occupied or closest to the section the patrons are sitting in. Advantageously, the present invention has the patrons contact information, including optionally and advantageously text messaging, that can be broadcast or sent to different patrons. The advantage of text messaging is that the bandwidth is more efficiently used in the event of an emergency, and there are no busy signals as in a voice network. Further, the message is send, and if the network is at capacity, the system can automatically resend or the message will be placed in queue and sent as soon as capacity becomes available.

In another alternative embodiment of the invention, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction.

For instance, in sporting venues the bracelet ticket includes the machine readable information that comprises at least one of a bar code and radio frequency identifier used for security check in, and optionally check out. In this manner, the standard reading machines that can scan the bar code or RFID information can keep track of people that have checked into the sporting event and/or venue. Advantageously, the machine readable information on the bracelet can also be used by the venue in the event the patrons seat assignment is modified, for example, via an electronic ticket exchange or upgrade program. In this embodiment, the visible indicia are no longer valid for the actual seating that may be dynamically changed and only represents optionally an initial seat assignment. However, the machine readable information may be used as a code to reference the specific patron and assign that patron a new seat. Thus, when the ticket reader scans the ticket and actually identifies, for example, the bar code, this information can be used to reference the patron, update and/or confirm the patron's current seat via the reader used, for example, by ushers in the venue, kiosk, entrance to the venue, and the like.

In an alternative embodiment, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction. This information, as previously mentioned, may be visually cognizable for the patron and in combination, readable by electronic means if the bracelet includes a magnetic strip, bar code imprinting, or RF chip.

In an alternative embodiment of the present invention, the security bracelet and ticket combination of the present invention advantageously includes a bar code or other machine readable information such as a RFID device. When, for example, a child is separated form their parent, the parent can notify security and the seat number associated with the child. If the child attempts to leave with their bar code/identifier, the system detects the bar code/identifier as either being valid and identifying the child that is missing or being invalid and raising another red flag. In an alternative embodiment, the bar codes/identifiers associated between children and adults correspond such that the child identifier must be within a predetermined time and/or number of checking out identifiers from/within the adult identifier. If this does not occur, the system determines that the child is leaving without their parent, and possibly being abducted.

In an alternative embodiment, the system links one or more tickets/identifiers together and requires the tickets/identifiers to exit the venue or event within a predetermined time period from one another and/or within a predetermined number of tickets/identifiers that have exited the venue and/or event. In the event that one ticket/identifier exits the venue or event and the associated identifier does not, then an alarm or other indictor occurs, and the attendants will detain the patrons that have initiated the alarm to for security purposes.

In an alternative embodiment, the tickets are advantageously coded with designations such as adult, child and the like. In the event a child ticket/identifier exits the stadium before the associated adult and/or more that a predetermined time period and/or number of patrons exiting, the system can initiate an alarm so that an attendant can determine if a child has exited the venue or event without their parent or with a wrong parent potentially averting a kidnapping. In this embodiment, an additional combination is the use of the standard fast pass feature, for example, at theme parks, and the like, where the venue records predetermined events that the user of the card enters in a faster line. In this embodiment, if a child ticket/identifier is not associated with a parent ticket/identifier, for example, as described above, the child may be denied entry into the event or venue if not accompanied by their parent. In alternative embodiments, the venue/event sponsor or organizer associates tickets upon request from the patron. In addition, in another alternative embodiment, a kiosk is provided inside and/or outside the venue for, for example, parents to register their tickets and have them associated with their children's tickets to prevent the child from exiting the venue without them, for example, as described above.

In an alternative embodiment of the present invention, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In another alternative embodiment of the present invention, a security bracelet is advantageously utilized, for example, such as the security bracelet disclosed in U.S. application Ser. No. 10/680,207, filed on Oct. 8, 2003, to Abraham 1. Reifer, et al., and incorporated herein by reference, in the event of a reported event, security breach, abduction, and the like. In this embodiment, all patrons exiting the stadium must show their ticket and/or identifier so that the venue can check all patrons out of the stadium. Thus, for example, if two kidnappers come in the stadium, and want to use one bracelet for a child, the second kidnapper will be stranded in the stadium. In addition, if one kidnapper buys two tickets, then upon exit with the child and the additional ticket, a barcode/identifier will be exiting without ever having checked in, and then the alarm will go off as well.

In another alternative embodiment, the present invention provides a broadcast message to warn patrons of an event, such as an advertisement, sale and/or even a weather related event such as a hurricane that might require the venue to be evacuated. Advantageously, in at least one embodiment, the broadcast message comprises standard text messaging that optimizes or better utilizes capacity form the communication system. Thus, when using text messaging capabilities, the present invention efficiently transmits text messages to numerous subscribers regarding, for example, exit information, contacting and/or meeting additional parties that have been separated, and the like.

In an alternative embodiment of the present invention, the present invention optionally provides the capability to penetrate into secondary market with season ticket holders selling ahead of time the games they will not be attending. For example, the present invention optionally provides the feature for the season ticket holder and/or general ticket purchaser the ability to view in advance of the season and/or game the schedule, and to alert the venue and/or stadium of games and/or events they will not be attending, thereby permitting the stadium/venue to attempt to resell the tickets to other patrons. For example, in one embodiment of the invention, the patron is provided with a monthly schedule listing the events that may be attended. The patron, such as a season ticket holder, may then click or place an indicator on all games they will not be attending for the season in advance, thereby providing the stadium with the ability to resell tickets well in advance of the event. Once the patron completes identifying games that will not be attended, the system then compiles a list and transmits the list to the patron for an optional confirmation. This list is then used by the system to release seats well in advance of the game. In an alternative embodiment of the invention, registered users of the system for, for example, upgrades, may also be notified of seat availability for sales prior to the game/event. In an alternative of this embodiment, registered users may receive text messages, emails, and the like, notifying them advantageously of the availability of seats that heretofore have never been easily available to the public for sale, thereby allowing the venue to participate in secondary market ticket sales.

In one alternative embodiment of the present invention, the system/process of the present invention provides or operates as a middle person/broker between the ticket holder that is returning tickets to the venue, such as the season ticket holder, and a ticket sales system and/or company, such as tickets.com, by notifying the tickets company of the newly available seats via notification by the ticket holder, such as the season ticket holder of season ticket games not being attended.

In one alternative embodiment of the invention, the system and/or process transmits text messages, emails and the like, to offer tickets and/or seats and/or admittance to subscribers for events and/or games with empty seats even before game. Thus, the present invention allows the venue to participate in the secondary ticket sales market and the upgrade market, thereby increasing revenue and fan loyalty.

Of course, all of the embodiments of the present invention may be used for any reserved seating event, and/or venue that require tickets for entry thereof.

In another alternative embodiment of the present invention, the use of machine readable identifiers provides advantages for, for example, the upgrade program or ticket exchange of the present invention. For example, when the upgrade, re-allocation and/or electronic ticket is issued, the machine readable identifier, for example, the bar code, on the original ticket is invalidated, thereby preventing use of the invalidated ticket. Accordingly, when a new ticket holder purchases the ticket form the season ticket holder, the new purchaser will be issued a new machine readable identifier, and optionally a new paper ticket. The present invention advantageously is able to handle the issuance of a new ticket and invalidates the old ticket and optionally the old identifier that has, for example, been returned by the season ticket holder, thereby providing dynamic ticketing capability.

In an alternative embodiment of the present invention, the new patron obtains a new identifier such as a barcode, the old bar code of, for example, the season ticket holder is invalidated. In one embodiment of the invention, season ticket holders are offered to opt in the upgrade process. Various commercial incentives are possible for the season ticket holder to opt in the upgrade process, such as monetary compensation when their ticket is used for an upgrade and/or resold whether they express their intention not to go to the game prior to the game, and the like. Alternatively, season ticket holders may be offered that the cost of their season tickets will, for example, remain the same as the previous year or be reduced if they participate in the program. Therefore, the combination season ticket trade-in and upgrade program in one embodiment of the invention will be beneficial to season ticket holders by allowing them to trade when they already know that they have no intention of attending a game, and allow the season ticket holder to recoup some cost of the season tickets if they do not attend and their ticket is used as an upgrade. In addition, additional patrons of the event and/or sports team are permitted to attend the game in locations/seats that they might never have been able to obtain access to. Further, the venue/stadium/team maximize revenues by being able to place tickets on the secondary market when the ticket holder notifies the venue early enough that they are not attending the event, the venue also obtains additional revenue from upgrades when tickets are upgraded, and the venue obtains additional fan loyalty.

In another embodiment of the present invention, the system provides the ability to advertise via email, text messaging, and the like, for one wireless carrier on the wireless device that is using another wireless carrier. Since the user of the wireless device has requested the service, the user appropriately receives the communication from the ticketing system of the present invention, and therefore, also appropriately received the advertisement from the wireless carrier that is different than the wireless carrier that the user of the wireless may be using at that time.

In another alternative embodiment of the present invention, offers to purchase seats either during the game or even well in advance of the game are "pushed" or transmitted out to registered users that have supplied their wireless and/or Internet addresses. For example, patrons can register in advance for the upgrade and/or regular ticket offers to purchase admittance via various methods including the Internet. When seats band/or admittance becomes available, a broadcast message or other standard messages may be transmitted to the registered patrons to notify them of the seat availability. Thus, seat offers are "pushed" to registered users that have requested this service advantageously to a wireless device and/or other address including standard telephone communication, as well as additional optional advertisements. The system, in one alternative embodiment, provides the user the option when registering to accept certain types of advertisements to be received on their wireless device via email and/or text messaging. In other embodiments, the user does not have the option of which advertisements to receive.

Advantageously, in accordance with one alternative embodiment of the present invention, if a patron decides to attend an event such as a sporting event when the patron does not have time to wait to receive paper tickets (e.g., the patron is visiting in another city/location and does not have time to wait to receive tickets via mail and is on the go), the system of the present invention transmits a ticket to the patron via, for example, a wireless communication system and/or other standard electronic communication system such as the Internet, and the patron can present their ticket, for example, on their wireless device and show up to game.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Patrons then text message and/or email and/or answer questions via voice-to-text messaging their answers. The system can then display the overall number of answers that are correct and incorrect, display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another alternative embodiment of the present invention, the system uses a seat database to determine which of the reserved seats are currently in use. The system may integrate with the seat database system of a venue and/or stadium or optionally be used in parallel with the seat venue/stadium database. For example, prior to the event, the system may utilize the seat database of the venue to determine available seating and patrons that do not show up after a predetermined period of time. Alternatively, the present invention can operate using a separate database from the event/venue by copying or building a separate database used for the ticketing and/or upgrading according to the present invention. In this alternative, as patrons enter the venue, they are checked in directly to this separate database. At the time of the event, the system will be able to check-in patrons using either the identification system, e.g., bar code scanner, of the event or venue, or provide a separate identification system.

In alternative embodiments of the invention, the patron that knows they are attending the game but is going to be late can send in a HOLD message even prior to being provided a warning message that their seats are to be released if the patron does not respond to the message with the HOLD request. That is, in this embodiment, since the patron already knows well in advance that they are attending the game, but perhaps stuck in traffic, the patron can initiate the HOLD message before even being warned in advance of the possibility of their seat being released.

In another alternative embodiment, patrons that have registered with the system and optionally checked into the stadium and/or venue in advance and who also know that they would like an upgrade and/or ticket, may initiate their own upgrade request to the system to notify the system of their willingness to purchase an upgrade and/or new ticket for the event/venue. The system may then place these patrons on a higher priority since they have already expressed and intent and/or willingness to purchase the upgrade or ticket. The patron may notify the event and/or stadium of their willingness optionally well in advance of the game or near/after game time at a time which the patron commits or expresses an additional heightened desire to upgrade and/or purchase a ticket.

In alternative embodiments, the system includes the advantage of allowing patrons to register free for a predetermined period of time, for example, for the first year, without paying a yearly subscriber fee. Alternatively and/or in addition thereto, the system provides the patron with their first upgrade for free or for a reduced rate to further encourage the patron to register with the system and method of the present invention. Alternatively and/or in addition thereto, the system of the present invention offers the patron reduced and/or free concessions when purchasing a membership, ticket and/or upgrade to further encourage the patron to participate in the offers of the present invention.

In alternative embodiments of the present invention, the matching system and/or process, permits participants in the program to initiate a message to the system with the seat location and/or name of the patron that they would like to be matched with for a meeting, networking and/or socializing such as a date. In this embodiment, the system may the push the message to the other subscriber and assign new seats to the individuals that are to be matched. Alternatively, the system Need not require a specific confirmation that the second individual to be notified of the potential match is physically located near the first individual, but can rely on the first individual to provide that information. For example, the first individual may see a potential date in a restaurant, and may then send a message to the system with that person's name or address, that they would like to meet that other individual. In that situation, the second individual will receive a message of the possible match, and can respond and accept or reject the offer to meet. The second individual can then provide a meeting destination or the system can suggest a meeting place based on the first individual advising the system of their location, and the location of the second individual.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Advantageously, the multiple choice questions each have unique selections, such as a1, b1, c1 and d1 for question #1; a2, b2, c2, and d2 for question #2; a3, b3, c3 and d3 for question #3, and the like. In this embodiment, the actual timing of questions is not necessary since each question and answer is unique. Therefore, the speed of responding to the question is immaterial to the winner of the contest and/or correct answer. Also, in the event one patron answers the question late, there will be no confusion which question the patron is submitting an answer for. Patrons text message and/or email and/or answer questions via voice-to-text messaging their answers as indicated above using the unique set of answers, in one embodiment. In alternative embodiments, the first predetermined number of patrons that answer the question correctly are considered the winners.

The system can then display the overall number of answers that are correct and incorrect, e.g., a1 50%, b1 28%, c1 12% and d1 10%, and display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

As discussed above, one or more of the above alternative embodiments may be incorporated into the embodiments described above, and/or any of the embodiments discussed below. Furthermore, any of the embodiments of the present invention may be used for any reserved seating event.

In accordance with one observation of the present invention, mobile device and computer users increasingly face the management of many computing devices. One reason is the expansion of computing environments in the home and office, as printers, scanners, digital cameras, and other peripherals are integrated into networked environments. Another reason is the proliferation of mobile devices such as laptop and palm-sized computers, cellular phones, and pagers. Because these devices trade functionality for suitable form factors and low power consumption, they are necessarily "peripheral-poor" and must therefore establish connections to neighboring devices for storage, faxing, high-speed network access, and printing. It is easy to become frustrated when dealing with the configuration and interaction of such a multitude of devices. Service discovery technologies were developed to reduce this frustration and to simplify the use of mobile devices in a network by allowing them to be "discovered," configured, and used by other devices with a minimum of manual effort. Although most of these "service discovery suites" promise similar functionality—namely, reduced configuration hassles, improved device cooperation, and automated discovery of required services—they come at the problem from different philosophical and technical approaches. Since none of these technologies is a superset of the others and none is mature enough to dominate the market, interoperation among them will require bridging mechanisms. Five competing technologies are described that may be used in conjunction with the present invention, however, other technologies may also or alternatively be used.

Bluetooth is a low-power, short-range, wireless radio system being developed by the Bluetooth Special Interest Group, and industry consortium whose member companies include Ericsson, Nokia, and IBM. The radio has a range of 10 meters and provides up to seven 1-megabit-per-second links to other Bluetooth devices. Bluetooth operates in the 2.4-GHz industrial scientific and medical (ISM) band to maximize international acceptance and employs a frequency-hopping system to minimize interference. The low-level communications are detailed in the Bluetooth specification.

Bluetooth has a small form factor; complete systems can be as small as 2-cm square. The technology supports both isochronous and asynchronous services. A simple isochronous application might link a cellular phone and wireless headset, where the headset and base are both Bluetooth devices. More complicated applications include automatic discovery of wireless network connections and automatic synchronization of data between several Bluetooth devices.

Figure 12:
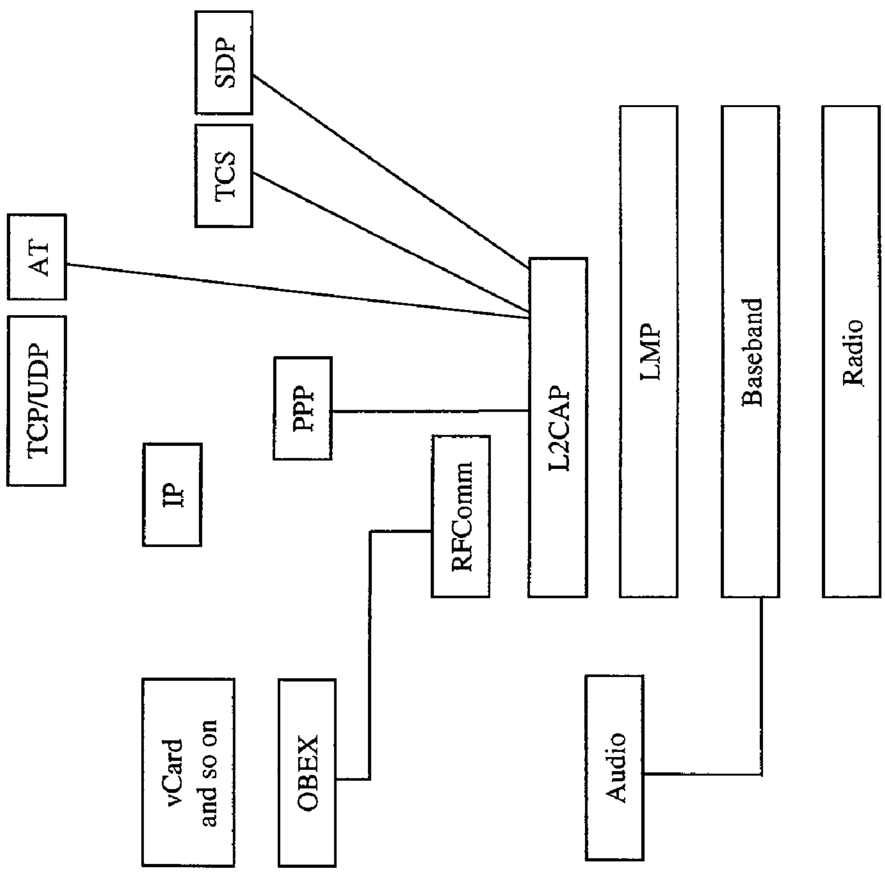
FIG. 12 shows the standard Bluetooth protocol stack.

FIG. 12 shows the Bluetooth protocol stack. At the bottom, the radio and baseband layers provide the short-range, frequency-hopping radio platform. The link manager protocol (LMP) handles data link setup and provides authentication and encryption services. The logical link control and adaptation protocol (L2CAP) supports multiplexed connectionless and connection-oriented communication over the LMP layer. L2CAP is proprietary, but other network protocols, such as IP, can be built on top of it. L2CAP is also used by higher level protocols. For example, FIG. 12 shows links to the Hayes-compatible AT (ATtention) protocol, which provides a standard interface for controlling remote cellular phones and modems; RFComm, which emulates an RS-232 serial interface; a simple object exchange protocol (OBEX), which enhances Bluetooth's interoperability with IrDA; and Bluetooth's service discovery protocol (SDP).

Groups of up to eight Bluetooth devices can form ad hoc networks called piconets to communicate, share services, and synchronize data. In each piconet, a master device coordinates the other Bluetooth devices (including setting the 1,600-hops-per-second frequency-hopping pattern). Individual devices can participate in more than one piconet at a time and can be in one of several states:

Standby—the device is conserving power and waiting to connect to another Bluetooth device.

Inquire—the device is searching for nearby Bluetooth devices.

Page—the device is connecting to another Bluetooth device.

Connected—the device is connected to another Bluetooth device.

Hold and park—the device is participating in a piconet with varying degrees of power savings.

The Bluetooth SDP provides a simple API for enumerating the devices in range and browsing available services. It also supports stop rules that limit the duration of searches or the number of devices returned. Client applications use the API to search for available services either by service classes, which uniquely identify types of devices (such as printers or storage devices), or by matching attributes (such as a model number or supported protocol). Attributes that describe the services offered by a Bluetooth device are stored as a service record and are maintained by the device's SDP server.

The distinction between service classes and descriptive attributes is not well defined, but service classes generally define broad device categories, such as Printer, ColorPrinter, and PostScriptPrinter, while attributes allow a finer level of description. Manufacturers must eventually standardize these service classes for maximal interoperability between Bluetooth devices.

Unlike higher level service discovery technologies such as Jini, Bluetooth's SDP does not provide a mechanism for using discovered services—specific actions required to use a service must be provided by a higher level protocol. However, it does define a standard attribute ProtocolDescriptorList, which enumerates appropriate protocols for communicating with a service.

Bluetooth devices provide data security through unique 48-bit identifiers, 128-bit authentication keys, and 8- to 128-bit encryption keys. Strong authentication is possible because no international restrictions prevent it, but Bluetooth devices must negotiate encryption strength to comply with laws restricting encryption. Note that Bluetooth devices must be paired to provide them with matching secret keys that will support authentication. Once paired, Bluetooth devices can authenticate each other and protect sensitive data from snooping. Regardless of encryption strength, Bluetooth's fast frequency-hopping scheme makes snooping difficult.

Jini is a service discovery and advertisement system that relies on mobile code and leverages the platform independence of the Java language. The current Jini implementation is based on TCP and UDP, but implementations based on other network protocols are certainly possible. The major requirements are reliable, stream-oriented communication and a multicast facility. Jini's language-centric approach allows a flexible definition of service; for example, a service can be implemented entirely in software and, after discovery, can be downloaded and executed entirely on the client. Examples of such algorithmic services might include an implementation of a proprietary algorithm for shading a polygon or formatting a document to meet an organizational standard. On the other hand, Jini also requires each device either to run a Java virtual machine or to associate itself with a device that can execute a JVM on its behalf. For example, a Jini "device chassis" might Jini-enable a number of "dumb" devices, making their services available to Jini clients.

Figure 13:
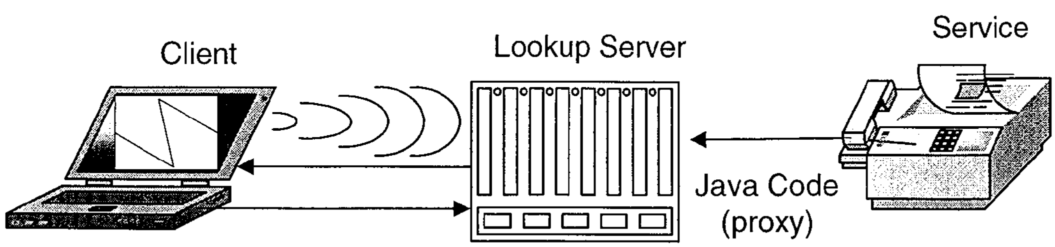
FIG. 13 illustrates the standard discovery and registration process for Jini clients and services.

Jini entities consist of services, look up servers that catalog available services, and clients that require services. A service can also be a client; for example, a telescope might provide pictures to a PDA as a service and look for printing services as a client. All service advertisements and requests go through a lookup server. FIG. 13 illustrates the discovery and registration process for Jini clients and services.

To register service availability or to discover services, a service or client must first locate one or more lookup servers by using a multicast request protocol. This request protocol terminates with the invocation of a unicast discovery protocol, which clients and services use to communicate with a specific lookup server. The unicast protocol culminates in the transfer of an instance of the ServiceRegistrar class, a "remote control" for the lookup server. A lookup server can use the multi-cast announcement protocol to announce its presence on the network. When a lookup server invokes this protocol, clients and services that have registered interest in receiving announcements of now lookup services are notified.

These three protocols are encapsulated in a set of Jini classes. For example, to find lookup services, a client or service need only create an instance of LookupDiscovery.

Jini uses Java's remote method invocation (RMI) facility for all interactions between either a client or a service and the lookup server). Once a lookup server has been discovered and an instance of ServiceRegistrar is available, services can register their availability, and clients can search for needed services by involving ServiceRegistrar methods.

Jini associates a proxy, or remote control object, with each service instance. A service advertises its availability by registering its object in one or more lookup servers via the register( ) method. This method takes several arguments, including an instance of Serviceitem, which contains a universally unique identifier for the service, its attribute set, and its remote control object. This object may either implement the service entirely (in the case of an algorithmic service such as the implementation of a polygon-shading algorithm), or provide methods for accessing the service over the network. The lease duration parameter of register( ) specifies the service's intended lifetime. The service is responsible for renewing the lease within the time specified to maintain its listing. The lookup server is free to adjust the lease time, which is returned in a ServiceRegistration object.

When a service first contacts a lookup server, the server generates a unique identifier for it; the service uses this ID in all future registrations. The service identifier lets clients request a specific service explicitly and recognize when services reported by different lookup servers are identical.

To use a service, a device must first secure an instance of the proxy object for it. From a client point of view, the location of the service proxied by this remote control object is unimportant, because the object encapsulates the location of the service and the protocol necessary to operate it.

Clients use the lookup( ) method in ServiceRegistrar to discover services. This method takes a single argument, an instance of ServiceTemplate. The ServiceTemplate constructor takes several arguments. The first is the service identifier. If the service identifier is null, then arrays of types (Java classes, typically interfaces) and attributes (attribute objects) are used to match services. A service matches if its class matches of the classes in the types array and if, for each of the attribute objects, and all non-null members match one of the service's registered attributes. The return value from lookup( ) is an instance of ServiceMatches, which contains an array of remote control objects for the services that match. Finally, the notify( ) method allows a client to request an asynchronous notification when services matching a ServiceTemplate instance become available. This method uses Jini's distributed events mechanism, which extends Java's infrastructure for eventing across JVMs.

Jini depends on Java's security model, which provides tools like digital certificates, encryptionm and control over mobile code activities such as opening and accepting socket connections, reading and writing to specific files, and using native methods Systems administrators can establish different policies depending on where the Java code originated (for example, the local file system or a remote machine).

Salutation is an architecture for service discovery under development by the Salutation Consortium, which includes members from both industry and academia. The consortium's goal is to build a royalty-free architecture for service advertisement and discovery that is independent of a particular network transport.

Figure 14:
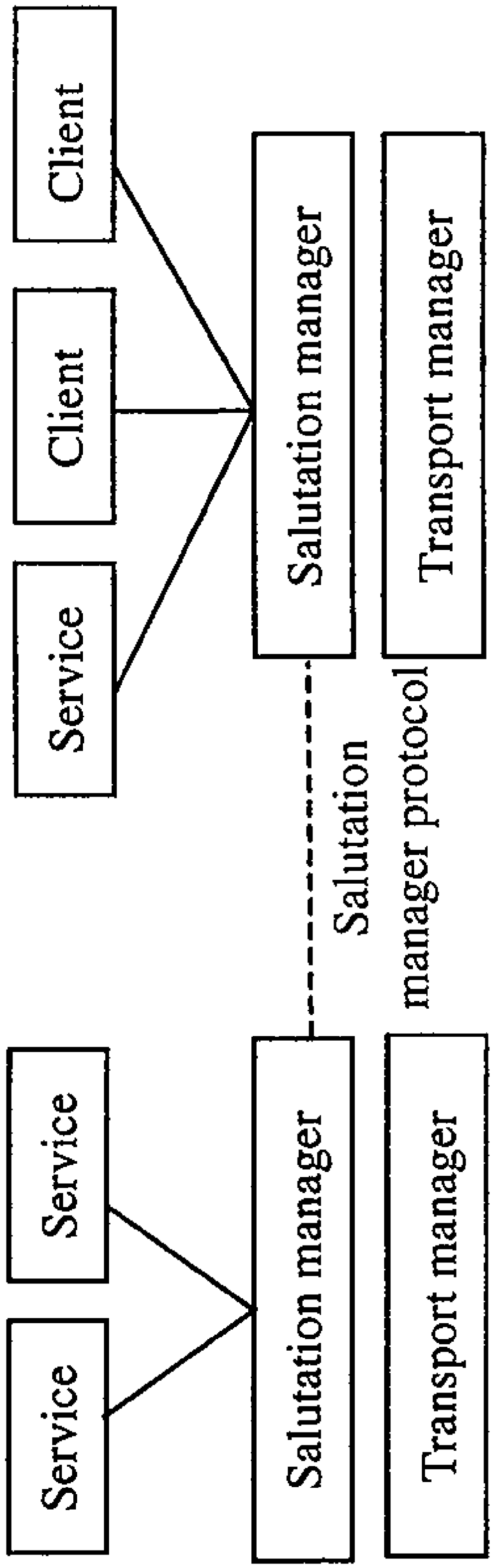
FIG. 14 shows the three fundamental components in the Salutation architecture: functional units, salutation managers, and transport managers.

FIG. 14 shows the three fundamental components in the Salutation architecture: functional units, salutation managers, and transport managers. From a client's point of view, a functional unit defines a service. Functional units already specified or under consideration by the Salutation Consortium include printing, faxing, and document storage. There is also work on a functional unit specification to allow discovery of Hewlett-Packard JetSend-enabled devices. The specifications define attributes that characterize a service (for example, in the case of a printer, double-sided capability, color, and so on).

The functional unit Doc Storage defines file attributes that can be used to find information in temporary or long-term storage. For, example, a client can search for operating system-specific drivers or software necessary to interact with a newly discovered device. The client simply queries a Salutation manager for the necessary Doc Storage functional unit, extracts the application or device driver and installs it, thus providing limited code mobility.

Salutation managers function as services brokers; they help clients find needed services and let services register their availability. Services and register and unregister functional units with the local Salutation manager by using the API calls slmRegisterCapabilities( ) and slmUnregisterCapabilities( ), respectively. A client can use the slmSearchCapability( ) call to determine if Salutation managers have registered specific functional units. Under the current version of the architecture, applications can query only the local Salutation manager. Future versions will allow remote Salutation managers to be specified. Once a functional unit is discovered, slmQueryCapability( ) can be used to verify that a functional unit has certain capabilities. The API also includes calls for initialization/version checking, availability checking, and communication between clients and services. (An API simulator is available at http://www.salutation.org/simulate.htm.)

Salutation managers fill a role similar to lookup servers in Jini, but they can also manage the connections between clients and services. A Salutation manager can operate in one of the three "personalities":

In native personality, Salutation managers are used only for discovery. They establish a connection between a client and service but perform no further operations on the data stream.

The emulated personality is similar to the native the connection, but in the case they transfer native data packets encapsulated in Salutation manager protocol format, providing a bridge when no common message protocol exists between client and service. The Salutation manager is ignorant of the semantic content of the data stream between client and service.

In Salutation personality, Salutation managers establish the connection between client and service and they also mandate the specific format of the data transferred. The Salutation architecture defines the data formats.

A transport manager isolates the implementation of the Salutation manager from particular transport-layer protocols and thereby gives Salutation network transport independence. To support a new network transport requires a new transport manager to be written, but does not require modifications to the Salutation manager. Like Jini (and UPnP), Salutation requires a network transport protocol that supports reliable, stream-oriented communication. Initial implementations are based on IP and IrDA because of their widespread use.

Transport managers also locate the Salutation managers on their respective network segments via either multicast, static configuration, or reference to a centralized directory. Discovery of other Salutation managers allows a particular Salutation managers to determine which functional units have been registered and to allow clients access to these remote services. Communication between Salutation managers is based on remote procedure call (RPC). This interaction between remote Salutation managers contrasts with other registry-based service discovery mechanisms (for example, Jini and Service Location Protocol), where clients would be responsible for locating remote registries. The Salutation specification currently does not address security issues.

A lightweight version of Salutation, called Salutation-Lite, has been developed for resource-limited devices. It is based primarily on IrDA to leverage the large number of infrared-capable devices. Salutation-Lite focuses primarily on service discovery. It uses the functional units OpEnvironment and Display to describe the operating system, processor class, amount of memory and display characteristics of palm-sized devices. By noting the particular characteristics of the device, servers can provide appropriate drivers and software wirelessly. Salutation-Lite implementations can be down-loaded free from the Salutation website at http://www.salutation.org.

UPnP is a proposed architecture for service advertisement and discovery supported by the UPnP Forum, headed by Microsoft. Unlike Jini, which depends on mobile code, UPnP aims to standardize the protocols used by devices to communicate, using XML. The UPnP specifications is still in an preliminary stage; major issues like security have not yet been addressed.

UPnP's device model is hierarchical. In a compound device (for example, a VCR/TV combo), the root device is discoverable, and a client (called a control point) can address the individual subdevices (for example, a tuner) independently. Virtual Web servers in the device act as entry points for interacting with and controlling it. Devices that don't speak UPnP directly are called bridge devices. They can be integrated into a UPnP network in a manner similar to the integration in a Jini device chassis: A bridge maps between UPnP and device-native protocols.

The UPnP specification described device addressing, service advertisement and discovery, device control, eventing, and presentation. The eventing facility allows clients to watch for significant changes in the state of a discovered service. It functions similarly to Jini's distributed event facility. Presentation allows a client to obtain a GUI for a discovered device's virtual Web servers. Several protocols support these functions:

AutoIP, a simple protocol that allows devices to dynamically claim IP addresses in the absence of a DHCP server;

Simple service discovery protocol (SSDP), the UPnP mechanism for service discovery and advertisement;

Simple object access protocol (SOAP), a protocol for remote procedure calls based on XML and HTTP that is used for device control after discovery; and Generic Event Notification Architecture (GENA), a UPnP subscription-based event notification service based on HTTP.

When devices are introduced into a network, they multicast "alive" messages to control points. When they wish to cancel availability of their services, they send "byebye" messages. In SSDP, each service has three associated IDs—service type, service name, and location—which are multicast when services are advertised. Any of these IDs can also be used to search for services.

Figure 15:
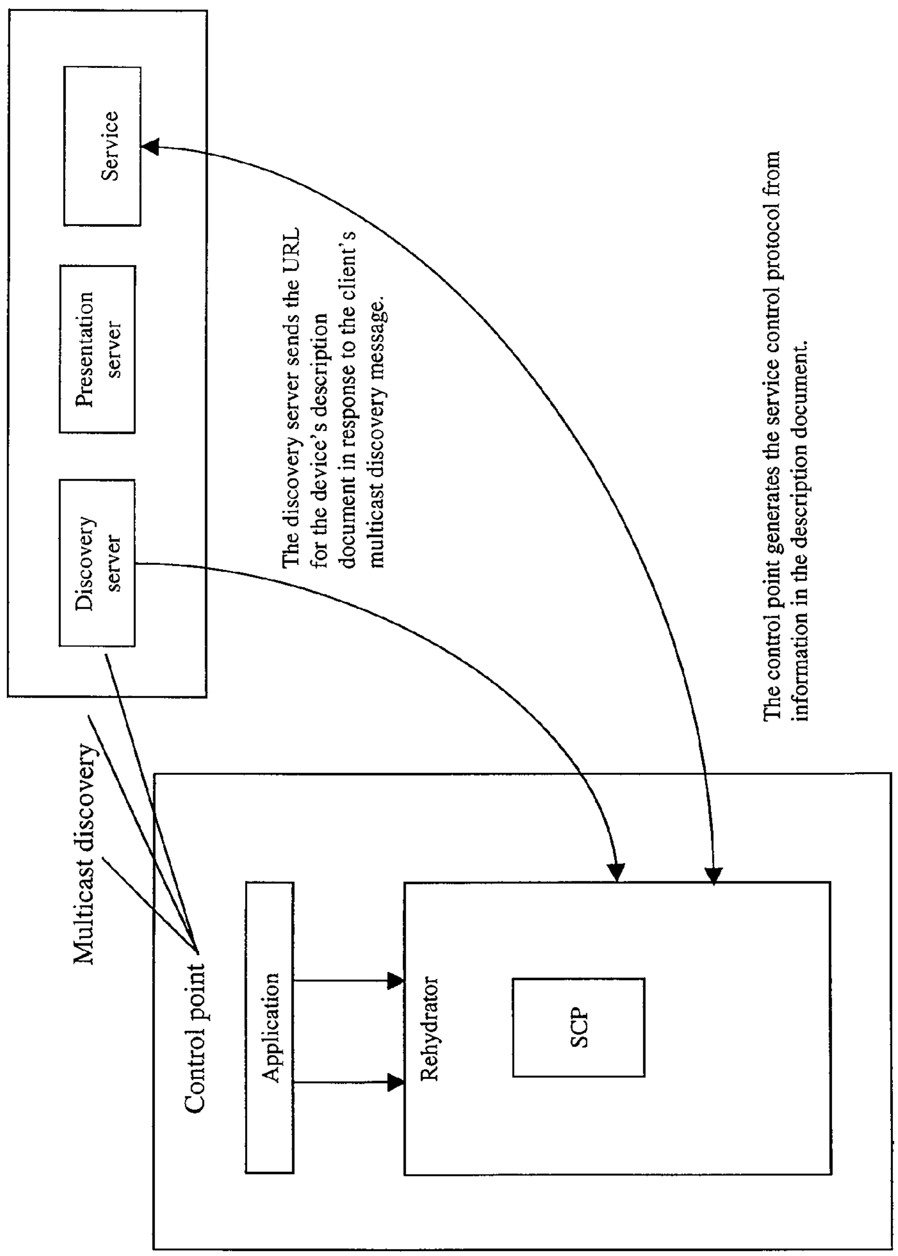
FIG. 15 is an illustration of a control point sending a multicast request to a network.

To search, a control point sends a UPD multicast request to the network, as shown in FIG. 15. Matching services send unicast responses to the client. These responses contain URLs, each pointing to a XML description document that describes a service. A description document contains several important items:

A presentation URL allows entry to a device's root page, which provides a GUI for device control.

A control URL is the entry point to the device's control server, which accepts device-specific commands to control the device.

An event subscription URL can be used by clients to subscribe to the device's event service. The client provides an event sink URL in the subscription request. Significant state changes in the device result in a notification to the client's event sink URL.

A service control protocol definition describes the protocol for interacting with the device.

The service control protocol (SCP) definition allows APIs to be converted to device-specific commands, shielding the application level from details of particular devices. After retrieving the description document, a UPnP component on the control point called the rehydrator is "plumbed" with a definition of the device's SCP. This component then sends device-specific commands via the device's control URL. SOAP is used for this interaction.

SSDP is similar to the Internet Engineering Task Force's service location protocol, but it lacks a query facility that can search for services by attributes. Further, SLP incorporates security measures and can interact with the IETF standards-track dynamic host configuration protocol (DHCP) and the lightweight directory protocol (LDAP). Finally, SSDP specifications currently limit discovery to a single subnet. Since UPnP does not use a registry, it is also likely to generate significantly more network traffic than SLP.

Figure 16:
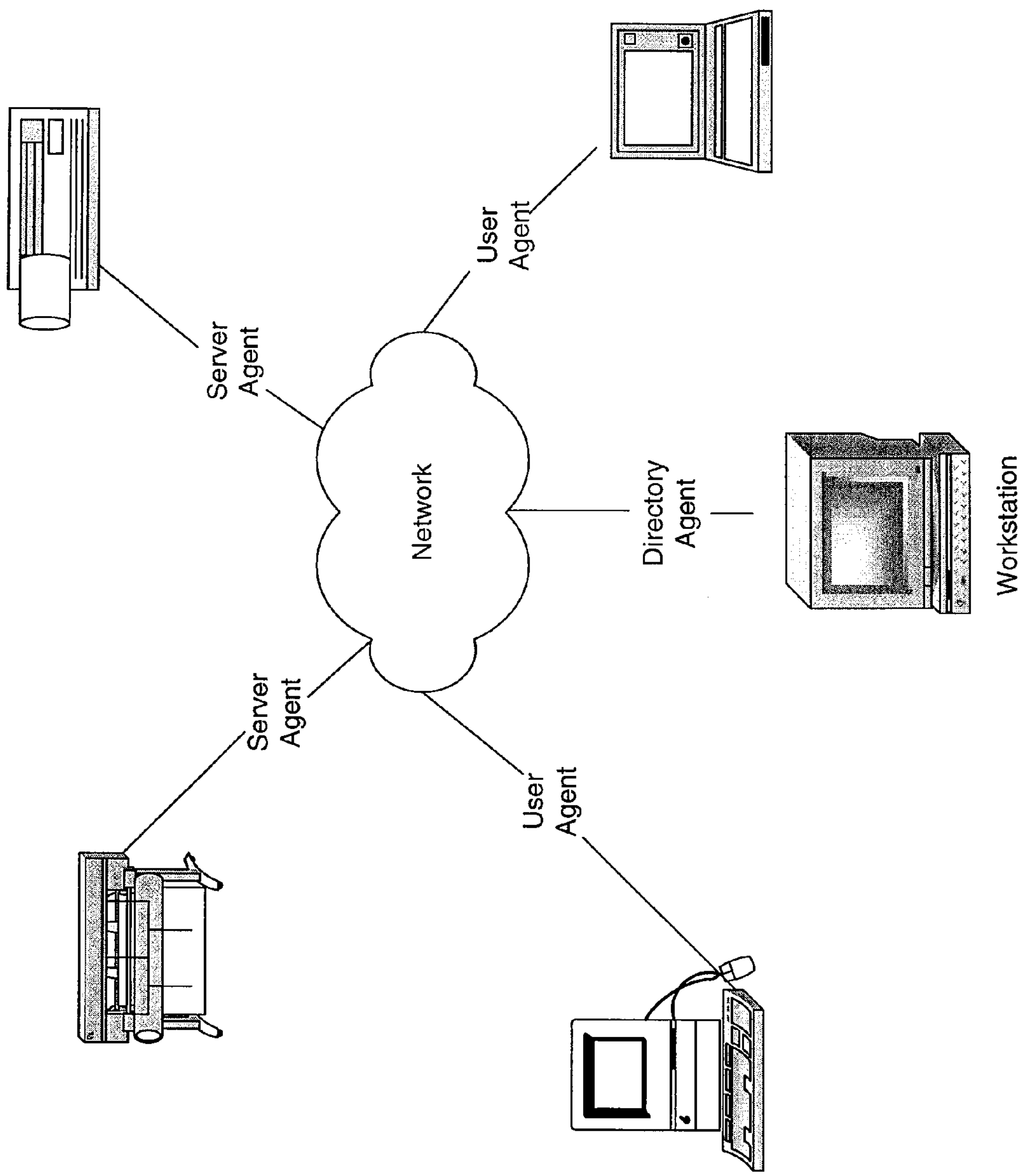
FIG. 16 is an illustration of a service location protocol (SLP) which is an IETF protocol for service discovery and advertisement.

Service location protocol (SLP) is an IETF protocol for service discovery and advertisement as illustrated in FIG. 16. It is currently at the "proposed standard" stage along the IETF standards track. Unlike Jini, Salutation, and UPnP, which all aspire to some degree of transport-level independence, SLP is designed solely for IP-based networks. It provides a set of C and Java bindings that provide service discovery and advertisement functions to application software.

SLP comprises three entities: service agents (SAs), user agents (UAs), and directory agents (DAs). SAs advertise the location and attributes of available services, while UAs discover the location and attributes of services needed by client software. UAs can discover services by issuing a directory-like query to the network. DAs cache information about available services. Unlike Jini, SLP can operate without directory servers. The presence of one or more DAs can substantially improve performance, however, by reducing the number of multicast messages and the amount of network bandwidth used. In fact, if DHCP is used to configure SLP agents with the location of DAs, then multicast is completely unnecessary. SLP also interoperates with LDAP, so services registered with an SLP DA can be automatically registered in an LDAP directory. This eliminates the need to reconfigure clients that already discover services using LDAP.

SLP has several mechanisms for discovering DAs:

In passive discovery, SAs and UAs listen for multicast announcements for DAs, which periodically repeat these advertisements.

In active discovery, SAs and UAs multicast SLP requests or use DHCP to discover DAs. When a DA is present, SAs and UAs use unicast communication to, respectively, register their services and find appropriate services.

In the absence of DAs, UAs multicast requests for service and receive unicast responses directly from the SAs that control matching services. This tends to increase bandwidth consumption, but provides a simpler model, appropriate for small networks (such as a home LAN).

SLP services are advertised through a service URL, which contains all information necessary to contact a service. Clients use the service URL to connect to the service. The protocol used between the client and server is outside the scope of the SLP specification. This separation is similar to Bluetooth, where the SDP does not specifically address how devices will communicate.

Service templates define an attribute set for each service type (a printer, for example). The attributes include a specification of the attribute types and information about default and allowed values; they are used to differentiate between services of the same type and to communicate configuration information to UAs.

SLP does not define the protocols for communication between clients and services, and so its security model concentrates on preventing the malicious propagation of false information about service locations. SAs can include digital signatures when registering so DAs and UAs can verify their identity. Digital signatures can also be required when DAs advertise their availability, allowing UAs and SAs to avoid rouge DAs (that is, those without a proper signature). As with Jini, setting up the security features of SLP requires some configuration effort, but the effort can be well worth it, particularly in open environments.

For service discovery to become pervasive, either a single service discovery technology must dominate or the most commonly used technologies must be made interoperable. Currently, bridging seems to be the most promising prospect for interoperability.

Implementations of certain low-level functions of service discovery (such as discovering registries) are interchangeable. For example, the Salutation Consortium uses SLP for service discovery beyond the local subnet. This lets the Salutation manager search for SLP DAs, and then use SLP to register functional units and search for requested services.

A Jini-SLP bridge has also been developed, which allows services lacking a JVM to participate in Jini system. The heart of the Jini-SLP bridge is a special SLP UA that registers the availability of "Jini-capable" SLP SAs. To do this, Jini-capable SLP services advertise the availability of a Jini driver factory. The UA discovers all SAs with driver factories and registers them with one or more Jini registered SAs, it downloads the driver factory from the lookup server and uses it to instantiate a Java object to drive the service. Note that the SLP SAs are not required to host a Java virtual machine—the Java code installed on the SAs is static. Similar schemes are possible for the other technologies; for example, it should be possible to Jini-enable UPnP services in this way.

Each service discovery technology has advantages and disadvantages. Currently, interoperability efforts are perhaps the most important force in service discovery, since it is very unlikely that device manufacturers will embrace multiple service discovery technologies on low-cost devices. Additional details regarding the above may be found in Golden G. Richard III, Service Advertisement and Discover, IEEE Internet Computing (September-October 2000), incorporated herein by reference and all references cited there incorporated herein by reference. Additional detail is provided herewith regarding Bluetooth protocol. The Bluetooth specifications define a radio frequency (RF) wireless communication interface and the associated set of communication protocols and usage profiles.

The link speed, communication range, and transmit power level for Bluetooth were chosen to support low-cost, power-efficient, single-chip implementations of the current technology. In fact, Bluetooth is the first attempt at making a single-chip radio that can operate in the 2.4-GHz ISM (industrial, scientific, and medical) RF band. While most early Bluetooth solutions are dual chip, vendors have recently announced single-chip versions as well. The Bluetooth specification consists of two parts: core and profiles.

Figure 17:
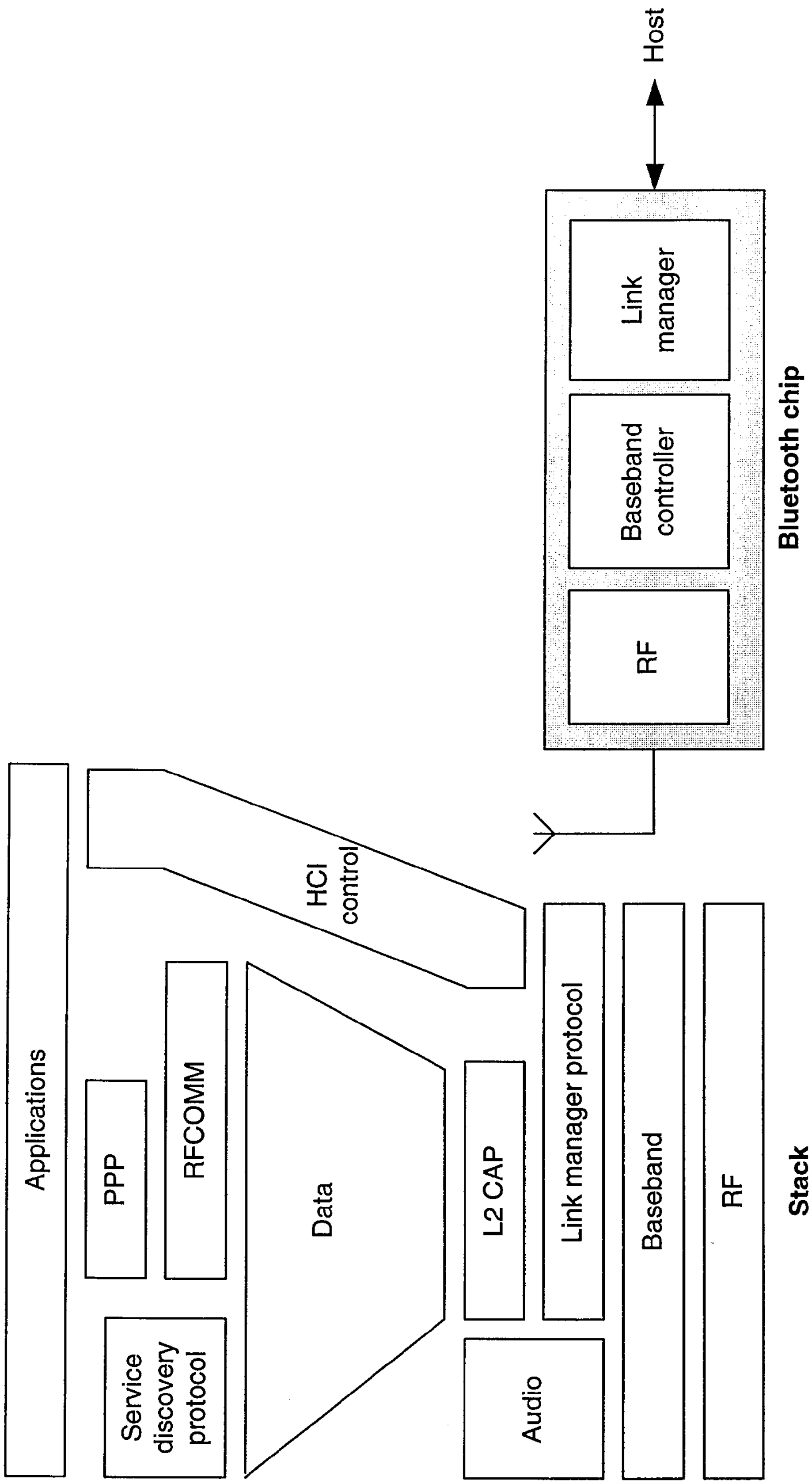
FIG. 17 is an illustration of the Bluetooth stack differing from the classical seven-layer networking model.

The core specification defines all layers of the Bluetooth protocol stack. As shown in FIG. 17, the Bluetooth stack differs from the classical seven-layer networking model in some ways. These differences are primarily to support ad hoc connectivity among participating nodes, while conserving power and accommodating devices that lack resources to support all layers of the classical networking stack.

The radio is the lowest layer. Its interface specification defines the characteristics of the radio front end, frequency bands, channel arrangements, permissible transmit power levels, and receiver sensitivity level. The next layer is the baseband, which carries out Bluetooth's physical (PITY) and media access control (MAC) processing. This includes tasks such as device discovery, link formation, and synchronous and asynchronous communication with peers. Bluetooth peers must exchange several control messages for the purpose of configuring and managing the baseband connections. These message definitions are part of the link manager protocol (LMP). The functional entity responsible for carrying out the processing associated with LMP is called the link manager.

Bluetooth is unique in offering the front-end RF processing integrated with the baseband module. On-chip integration lowers the cost of the network interface, and the small size makes it easy to embed Bluetooth chips in devices such as cell phones and PDAs. A Bluetooth chip can be connected to its host processor using USB, UART, or PC-card interfaces.

The Host Controller Interface (HCI) specification defines a standard interface-independent method of communicating with the Bluetooth chip. The software stack on the host processor communicates with the Bluetooth hardware using HCI commands. Since no hardware-specific knowledge is needed, the Bluetooth stack software can easily be ported from one Bluetooth chip to another. The HCI layer is part of the Bluetooth stack, but it does not constitute a peer-to-peer communication layer since the HCI command and response messages do not flow over the air link.

The logical link control and adaptation protocol (L2CAP) specification can be viewed as Bluetooth's link layer. Usually, L2CAP and layers above it are implemented in software. L2CAP delivers packets received from higher layers to the other end of the link. Bluetooth devices can establish an L2CAP connection as soon as they are in range of each other. A client device then needs to discover the services provided by the server device. The service discovery protocol (SDP) defines the means by which the client device can discover services as well as their attributes. The SDP design has been optimized for Bluetooth. It defines only the discovery mechanisms; the methods for accessing those services are outside its scope.

The RFCOMM specification defines a method of emulating the RS-232 cable connection on top of the Bluetooth airlink. RFCOMM supports legacy applications that use the COM port to communicate with the peer host. For example, point-to-point (PPP) protocols expect a serial line interface from the lower layer. Since PPP provides a packet-oriented interface to the higher layers, all packet-based network and transport protocols, including TCP/IP, can be supported on top of PPP. More efficient methods of running IP over Bluetooth are currently under development.

Vendors can use the services offered by the Bluetooth stack to create a variety of applications. Because interoperability is crucial to Bluetooth's operation, the Bluetooth SIG has defined profile specifications to support it. The profiles specify controller and stack parameter settings as well as the features and procedures required for interworking among Bluetooth devices. All vendor implementations of these profiles are expected to be interoperable. The Bluetooth certification authority uses the profiles to test and certify compliance, and grants use of the Bluetooth logo only to products that conform to the methods and procedures defined in the profiles.

The 2.4-GHz ISM band in which Bluetooth operates is globally available for license-free use. Europe and the United States allocate 83.5 MHz to this band, but Spain, France, and Japan allocate less. To accommodate these differences, 79 channels spaced 1 MHz apart are defined for Europe and the U.S., and 23 RF channels spaced 1 MHz apart are defined for Spain, France, and Japan. Efforts are under way to open up the full width of the spectrum in Spain and France, as well as in Japan so that Bluetooth devices would function worldwide.

Bluetooth is a frequency-hopping spread-spectrum system. This means that the radio hops through the full spectrum of 79 or 23 RF channels using a pseudorandom hopping sequence. The hopping rate of 1,600 hops per second provides good immunity against other sources of interference in the 2.4-GHz band. The link speed is 1 Mbps, which is easily achieved using a simple modulation technique (Gaussian Frequency Shift Keying, or GFSK). A more complex modulation technique could achieve a higher rate, but GFSK keeps the radio design simple and low cost.

The radio front end is usually the most costly part of a wireless network interface. In typical radio receivers, the RF filters, oscillators, and image-reject mixers process input signals at high frequencies. Such circuits require expensive materials. To keep costs down, Bluetooth recommends shifting the input signal to a lower intermediate frequency (IF, around 3 MHz), which allows on-chip construction of low-power filters using CMOS material. Shifting to low IF, however, creates new problems, such as reduced receiver sensitivity. Recommended receiver sensitivity for Bluetooth is −70 dBm or better. The comparable number for IEEE 802.11 Wireless LANs is about −90 dBm). Thus, for the same transmit power, the range for Bluetooth is shorter than it is for 802.11 WLAN.

A set of Bluetooth devices sharing a common channel is called a piconet. A piconet is a star-shaped configuration in which the device at the center performs the role of master and all other devices operate as slaves. Up to seven slaves can be active and served simultaneously by the master. If the master needs to communicate with more than seven devices, it can do so by first instructing active slave devices to switch to low-power park mode and then inviting other parked slaves to become active in the piconet. This juggling act can be repeated, which allows a master to serve a large number of slaves.

Most envisioned Bluetooth applications involve local communication among small groups of devices. A piconet configuration consisting of two, three, or up to eight devices is ideally suited to meet the communication needs of such applications. When many groups of devices need to be active simultaneously, each group can form a separate piconet. The slave nodes in each piconet stay synchronized with the master clock and hop according to a channel-hopping sequence that is a function of the master's node address. Since channel-hopping sequences are pseudorandom, the probability of collision among piconets is small. Piconets with overlapping coverage can coexist and operate independently. Nonetheless, when the degree of overlap is high, the performance of each piconet starts to degrade.

In some usage scenarios, however, devices in different piconets may need to communicate with each other. Bluetooth defines a structure called scatternet to facilitate interpiconet communication. A scatternet is formed by interconnecting multiple piconets. As shown on the right side of FIG. 17, the connections are formed by bridge nodes, which are members of two or more piconets. A bridge node participates in each member piconet on a time-sharing basis. After staying in a piconet for some time, the bridge can turn to another piconet by switching to its hopping sequence. By cycling through all member piconets, the bridge node can send and receive packets in each piconet and also forward packets from one piconet to another.

A bridge node can be a slave in both piconets or be a slave in one and a master in another. For example, consider a room full of people, where each person has a cell phone and a cordless headset. When users speak into their headsets, only the cell phones paired with their headsets should pick up the signal. In this example, each headset and cell phone pair constitutes a separate piconet. Now suppose these users also want to send text messages from their cell phones to one another. This will be possible only if all piconets are interconnected to form a large scatternet.

Bluetooth uses a procedure known as inquiry for discovering other devices; it uses paging to subsequently establish connections with them. Both inquiry and paging are asymmetric procedures. In other words, they involve the inquirer and the inquired (as well as the pager or the paged) devices to perform different actions. This implies that when two nodes set up a connection, each needs to start from a different initial state; otherwise, they would never discover each other. The profile specifications play an important role here, defining the required initial state for each device in all usage scenarios. A symmetric procedure for establishing connections is an ongoing topic of research.

The inquiry and paging are conceptually simple operations, but the frequency-hopping nature of the physical layer makes the low-level details quite complex. Two nodes cannot exchange messages until they agree to a common channel-hopping sequence as well as the correct phase within the chosen sequence. Bluetooth solves this problem simply by mandating the use of a specific inquiry-hopping sequence known to all devices. During inquiry, both nodes (one is the listener and the other is the sender) hop using the same sequence; but the sender hops faster than the listener, transmitting a signal on each channel and listening between transmissions for an answer. When more than one listener is present, their replies may collide. To avoid the collision, listeners defer their replies until expiration of a random back-off timer. Eventually the sender device collects some basic information from the listeners, such as the device address and the clock offsets. This information is subsequently used to page the selected listener device.

The communication steps during the paging procedure are similar, except that the paging message is unicast to a selected listener, so the listener need not back off before replying. The sender also has a better estimate of the listener's clock, which enables it to communicate with the listener almost instantaneously. Upon receiving an ACK for the paging message, the sender becomes the master and the listener becomes the slave of the newly formed piconet, and both nodes switch to the piconet's channel-hopping sequence. Later, if necessary, the master and slave roles can be swapped.

The steps for admitting a new slave into an existing piconet are slightly more complex. The master can either start discovering new nodes in its neighborhood and invite them to join the piconet or, instead, wait in scan (listen) state and be discovered by other nodes. With both options, communication in the original piconet must be suspended for the duration of the inquiry and paging process. The latency of admitting a new node into the piconet can be large if the master does not switch to the inquiry or scan modes frequently. This latency can be reduced only at the cost of some piconet capacity. The study of this trade-off is another topic of ongoing research.

Bluetooth offers different low-power modes for improving battery life. Piconets are formed on demand when communication among devices is ready to take place. At all other times, devices can be either turned off or programmed to wake up periodically to send or receive inquiry messages. When a piconet is active, the slaves stay powered on to communicate with the master. It is possible to switch a slave into a low-power mode whereby it sleeps most of the time and wakes up only periodically.

Three types of low-power modes have been defined:

Hold mode is used when a device should be put to sleep for a specified length of time. As described earlier, the master can put all its slaves in the hold mode to suspend activity in the current piconet while it searches for new members and invites them to join.

Sniff mode is used to put a slave in a low-duty cycle mode, whereby it wakes up periodically to communicate with the master.

Park mode is similar to the sniff mode, but it is used to stay synchronized with the master without being an active member of the piconet. The park mode enables the master to admit more than seven slaves in its piconet.

As soon as a piconet is formed, communication between the master and the slave nodes can begin. The piconet channel is divided into 625-microsecond intervals, called slots, where a different hop frequency is used for each slot. The channel is shared between the master and the slave nodes using a frequency-hop/time-division-duplex (FH/TDD) scheme whereby master-slave and slavemaster communications take turns. Slave-to-slave communication is not supported at the piconet layer. If two slaves need to communicate peer to peer, they can either form a separate piconet or use a higher layer protocol, such as IP over PPP, to relay the messages via the master. At a 1-Mbps link speed, a 625 microsecond slot time is equivalent to the transmission time of 625 bits. However, a single slot packet size in Bluetooth is only 366 bits. This reserves enough guard time to let the frequency synthesizers hop to the next channel frequency and stabilize. Discounting space for the headers leaves 30 bytes for the user payload.

To transmit real-time voice, an application must reserve a slot in both directions at regular intervals. In Bluetooth terminology, this is called a synchronous (SCO) link. An SCO link can transport telephone-grade voice. The speech coder generates 10 bytes every 1.25 milliseconds. Since a baseband packet can carry up to 30 bytes in each slot, only one slot in each direction is needed every 3.75 ms (or every sixth slot). The packet type that carries 30 voice bytes is called an HV3 packet. This packet is transmitted without coding or protection, and is not retransmitted if it is lost.

To cope with bit errors when the channel conditions are not perfect, some forward error correction (FEC) should be added to the voice payload. An HV2 packet carries 20 bytes of voice plus 10 bytes of redundant data (2/3 FEC code). Since 20 bytes of speech is generated in 2.5 ms, the SCO link should reserve one slot in each direction every 2.5 ms (or every fourth slot). To cope with extreme channel conditions, the baseband specification also defines an HV1 packet that carries only 10 bytes of speech and 20 bytes of FEC code. An HV 1 SCO link uses up the entire channel capacity. This means that all data transfer sessions will be suspended when an HV 1 SCO connection is in progress.

Data communication between a master-slave pair involves a different set of considerations. For example, the data payload must be protected by a cyclic redundancy check (CRC) so that the receiver can determine whether the received bits are in error. When losses occur, the baseband layer should retransmit the data. Furthermore, to make efficient use of the piconet channel, slots should be allocated on demand, instead of being reserved for the usage duration. A data path between a master-slave pair meeting all of these requirements is called an asynchronous data link (ACL). SCO links have priority over data, so ACLs can claim only unused slots. Only a single ACL can exist between a master and a slave.

The master is responsible for distributing available slots among all ACLs. This scheme has two advantages:

the master can ensure that the slave transmissions do not collide; and the slots can be allocated to satisfy the quality of service (QoS) requirement of each ACL. The master can grant more bandwidth to a slave by polling it more frequently or by changing the packet size.

The baseband specification does not mandate the use of any specific slot-allocation scheme. Chip vendors can choose any policy that fits their target applications. As with SCO packets, the payload size of singleslot ACL packets is limited to 30 bytes. After discounting space for the higher layer headers and the CRC, only 27 bytes are left to transport application data. When FEC is added, the available space goes down to 17 bytes. To improve channel efficiency, the baseband specification has defined multislot packets, which are three or five slots long and transmitted in consecutive slots. The transmitter stays fixed on a hop frequency during the length of packet transmission and skips over the missed hops after the transmission is complete. This reduces the effective channel-hopping rate, but increases the channel efficiency because of fewer hops. Although link speed is 1 Mbps, achievable aggregate throughput can range from 217.6 Kbps to 780.8 Kbps. The presence of an HV3 or HV2 SCO link significantly reduces the achievable through-put of an ACL.

Figure 18:
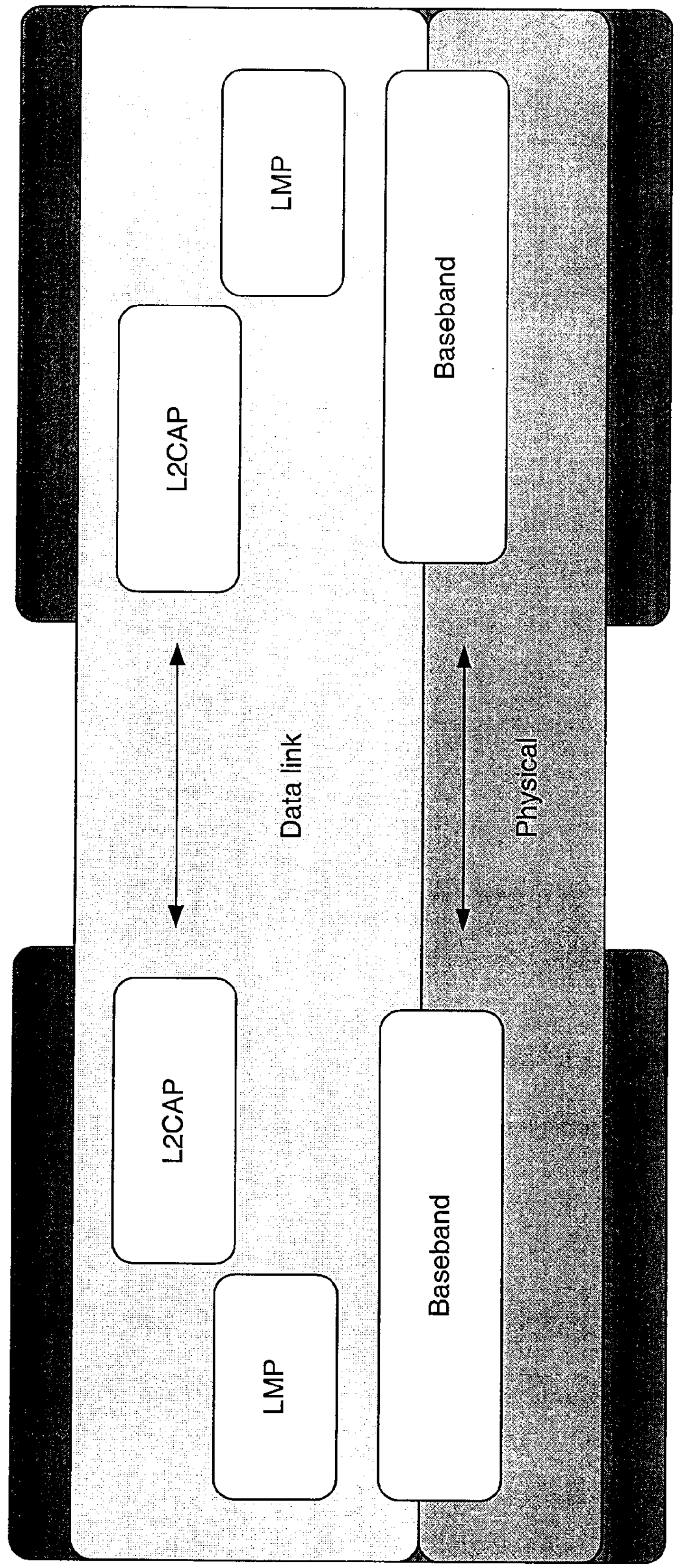
FIG. 18 is an illustration viewing standard L2CAP as the data plane of the Bluetooth link layer.

L2CAP can be viewed as the data plane of the Bluetooth link layer (see FIG. 18). Because the baseband packet size is too small for transporting higher layer packets, a thin layer is needed for exporting a bigger packet size to the higher layers. While a number of generic segmentation and reassembly protocols could be used or adapted for use over ACLs, the Bluetooth SIG instead defined L2CAP, which is highly optimized to work in conjunction with the baseband layer. For example, L2CAP does not support integrity checks because the baseband packets are already CRC protected. Likewise, it is assumed that the lower layer delivers packets both reliably and in sequence. These two assumptions significantly simplify the design of segmentation and reassembly logic. The only caveat is that L2CAP will not work if used over any media other than the Bluetooth baseband.

The multiplexing and demultiplexing of higher layer protocols is supported using channels, multiple instances of which can be created between any two L2CAP endpoints. Each higher layer protocol or data stream is carried in a different channel. The L2CAP channels are connection oriented in the sense that they require an explicit phase to establish the channel, during which both ends choose a local name (channel identifier) and communicate it to the other end. Subsequently, each packet sent over the channel is tagged with the channel identifier, which-within the context of the receiver-uniquely identifies the source as well as the protocol being transported over the channel. The L2CAP specification also defines a connectionless channel for supporting broadcast and multicast group communication, but this feature is not yet fully developed.

Both ends of a Bluetooth link must support compatible sets of protocols and applications to successfully exchange data. In some cases it may also be necessary to configure protocol and stack parameter settings before applications can be started. Such configuration settings cannot be chosen statically, since some parameters may require adjustment to match the features and services supported by the peer Bluetooth device.

Bluetooth's SDP provides a standard means for a Bluetooth device to query and discover services supported by a peer Bluetooth device. SDP is a client-server protocol. The server maintains a list junction with the baseband layer. For example, of service records, which describe the characteristics of services hosted at the server. By issuing SDP queries, a client can browse all available service records maintained at the server or retrieve specific attribute values from a service record.

In addition to defining query and response protocol formats, the SDP specification also defines a standard method for describing service attributes. Service attributes are represented using an <identifier, value> pair. The 1.1 Bluetooth specification defines some of the commonly used services, but developers have the freedom to define new subclasses of the standard services or to create new services on their own.

Since new service definitions do not require any coordination with the Bluetooth SIG numbering authority, it is necessary to ensure that two independently created service definitions do not conflict. Collisions are avoided by associating each service definition with a universally unique identifier (QUID) which is generated once at the time a service is defined. UUIDs of the services defined by the Bluetooth SIG are included in the assigned numbers document.

If the client already knows the QUID of the service it is looking for, it can query the SDP server for specific service attributes. Alternatively, the client can browse the list of available services and select from the list. These are the only two search options supported in SDP. Although other IP-based service discovery protocols, such as SLP and Jini, provide richer service description schema and more powerful search capabilities, the Bluetooth SDP has two advantages:

The majority of version-1.1-compliant Bluetooth devices will be non-IP devices. Requiring them to support IP only for the sake of supporting SLP would be costly.

SDP is optimized to run over L2CAP. Its limited search capabilities and non-text-based attribute-id and attribute-value descriptions lend an efficient and small footprint implementation for small devices.

SDP provides a mechanism only for retrieving service information from other devices. Methods of invoking those services are outside the scope of SDP. Before a device can establish the L2CAP channel, the link manager must carry out a number of baseband-specific actions, such as piconet creation, master-slave role assignments, and link configuration. These functions belong to the control plane of the Bluetooth link layer and require the link manager to exchange LMP messages over the air link. Depending on the operating environment, the link manager must adjust a number of piconet and link-specific parameters. For example, the peer-link controller can be instructed to switch to a low-power mode, adjust its power level, increase the packet size, and change the requested QoS on an ACL.

Security can also be configured using LMP messages. Before a data or voice exchange can begin, Bluetooth devices should be able to authenticate each other. Likewise, transmission over the air link must be encrypted to provide protection from eavesdroppers. Both objectives are easy to achieve when a security association already exists between a pair of devices. The link manager can use the shared secret key to verify the peer device's authenticity as well as to negotiate a link key for encryption. A typical session between two Bluetooth devices begins with the formation of a piconet, followed by the exchange of LMP messages first to authenticate and then to negotiate new encryption keys with the peer device. Only upon successful completion of the LMP handshake can further data exchange or voice communication take place.

The level of security built into the version 1.1 specifications is satisfactory so long as the initial security associations are computed in a secure fashion. The baseband and LMP specifications also define a method, called pairing, for creating a new security association between two devices when they pair for the first time. The method uses an out-of-band channel for creating a security association, which is then used as a seed to compute a cryptographically secure shared secret key. By out-of-band channel a user typing a randomly chosen PIN number on both devices is meant. The security of a pairing phase is limited by a user's ability to choose good PIN numbers. In scenarios when one device in the pair does not have a keypad, security can be further compromised if the chosen PIN is transmitted to the other device in clear text.

The ultimate objective of the Bluetooth specifications is to allow multivendor applications to interoperate. Different applications may run on different devices, and each device may use a protocol stack from one vendor and a Bluetooth chip from another. Yet interoperability among applications is achieved when different implementations comply with the same core and profiles specifications. At the lowest layer, Bluetooth chips from different vendors interoperate over the air link because all Bluetooth chips implement the baseband and LMP specifications. Bluetooth stacks, which can be implemented as either firmware or software, include the L2CAP, SDP, and RFCOMM layers. It is relatively easy to port a Bluetooth stack from one platform to another because the lowest layer of a Bluetooth stack interfaces with a Bluetooth chip via a standard HCI interface which is also a part of the 1.1 specifications.

Porting a Bluetooth application from one stack to another, however, is more difficult. The application can use any standard API to access IP, PPP OBEX, or RFCOMM layers of the Bluetooth stack, but there is no standard API to access the control functions provided by the Bluetooth stack. For example, if an application were to initiate a Bluetooth inquiry to discover other devices in its neighborhood, it must use an API specific to the stack vendor to access those functions. Additional details regarding the above may be found in Ron Schneiderman, Bluetooth's Slow Dawn, IEEE Spectrum (November 2000), incorporated herein by reference and all references cited there incorporated herein by reference.

Figure 19:
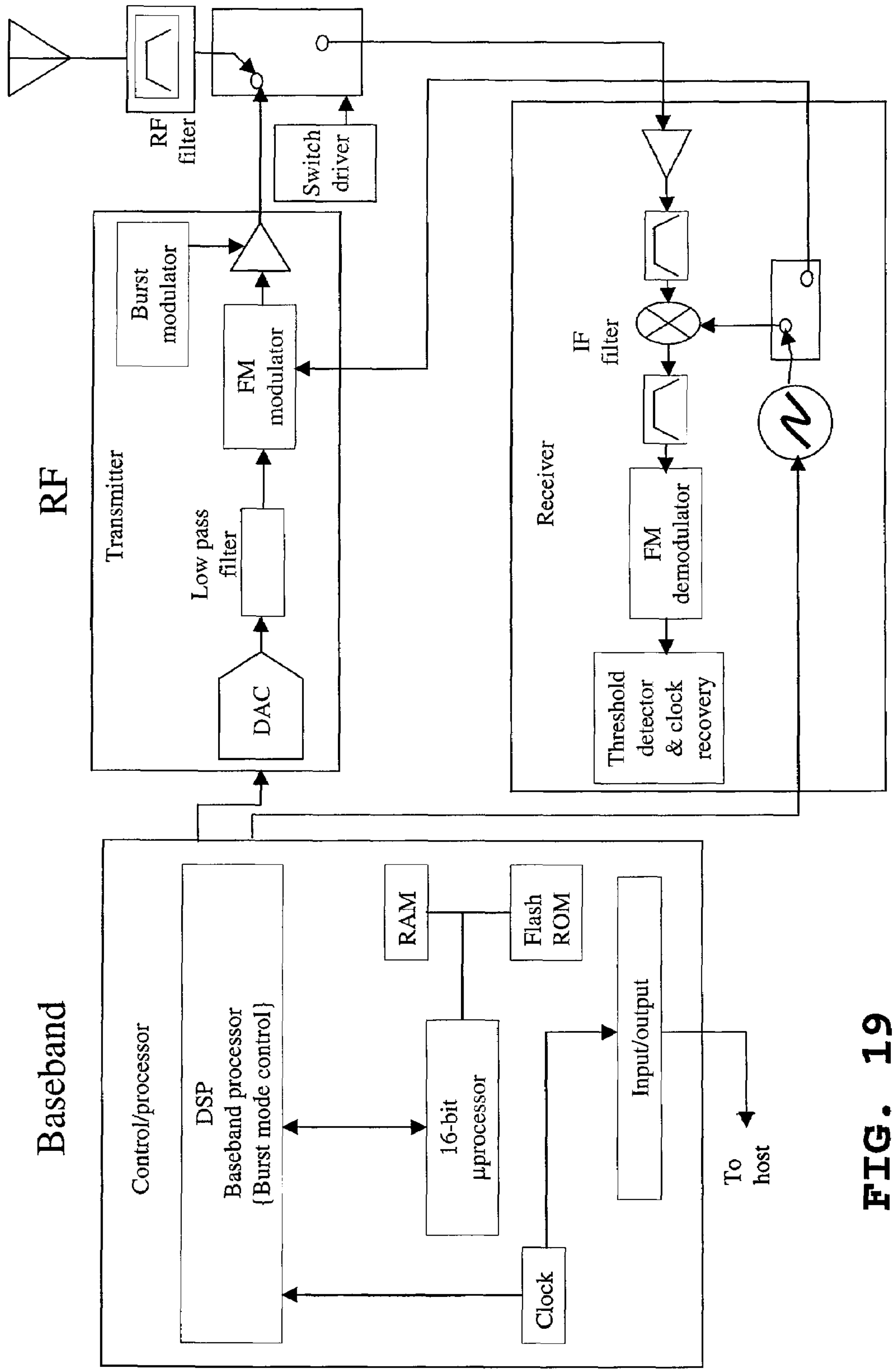
FIG. 19 is an illustration of a Bluetooth transmitter that upconverts the baseband information to the frequency-modulated carrier.

FIG. 19 is an illustration of a Bluetooth transmitter that upconverts the baseband information to the frequency-modulated carrier. Frequency hopping and bursting are performed at this level. Conversely, the Bluetooth receiver downconverts and demodulates the RF signal as illustrated in FIG. 19. The Bluetooth channels are each 1 MHz wide. Frequency hopping occurs over 79 channels.

Although originally thought of simply as a replacement for the unseemly nest of wires that connects PCs to keyboards and printers, Bluetooth quickly evolved into a system that will allow people to detect and communicate with each other through a variety of mainly portable devices without their users' intervention. Bluetooth-enabled devices will be able to "talk" to each other as they come into range, which is about 10 meters, although this figure can be extended to more than 100 meters by increasing the transmit power from a nominal 1 mW to as much as 100 mW.

With Bluetooth technology, you can send e-mail from the computer on your lap to the cellular phone in your briefcase. Your Bluetooth-linked cell phone or similarly equipped PDA can automatically synchronize with your desktop PC whenever you pass it within Bluetooth range. Or, you can have hands-free communications between a Bluetooth-enabled headset and a cell phone, or you can download images from a digital camera to a PC or cell phone.

Critical mass is critical to Bluetooth's success. Bluetooth technology is expected to make its debut in cell phones and PDAs, but then will move quickly into notebook and laptop computers, printers, scanners, digital cameras, household appliances, security/remote access, games, toys, and more. Ericsson, which started it all with the development of the Bluetooth concept, has already announced several Bluetooth products, including a headset, a PC Card for laptops and PDAs, and two Bluetooth cell phones. A Bluetooth keyboard and mouse are on the drawing board.

Nokia and Fujifilm are working on a mobile imaging technology they believe would enable Nokia to add a Bluetooth chip to its clamshell-shaped 9110 Communicator so that it could receive images taken on a Bluetooth-equipped Fujifilm digital camera. After the addition of a few lines of text, the received photographs can be sent to another Nokia Communicator, or to the Fujifilm Web service, where it can be viewed, printed, or burned into a CD-ROM. Finnish telecom operator Sonera has even demonstrated a Bluetooth-enabled vending machine-consumers buy products out of the machine by simply signaling an account code from a Bluetooth cell phone or PDA. The code would debit the user's account based on the code. Eventually, cell phones and PDAs are expected to be able to display personal bar codes, which can be read by a vending machine scanner.

The Gartner Group calls it the Supranet—the wireless connection of data and transactions between the hard-wire Internet, wireless devices such as cell phones and PDAs, and the "papernet," meaning the physical world of business cards and legal documents. Emerging seamless connections will deliver a whole host of new technologies, according to Gartner, with one of the first integral technologies to be tied to the Supranet being Bluetooth. By 2004, according to Gartner, 70 percent of new cell phones and 40 percent of the new PDAs will use wireless technology for direct access to Web content and enterprise networks. Gartner believes that Bluetooth is set to become a defining force in portable electronic products.

In what the Bluetooth community calls "unconscious" or "hidden" computing, Bluetooth-enabled products will automatically seek each other out and configure themselves into networks-most often, with just two nodes. Though small, such networks can be quite useful. They can forward e-mail received on a cellular phone in a person's pocket to the notebook or laptop computer in his or her briefcase; they can download data from a digital camera to a PC or cell phone; or they can alert their owners as they pass a Bluetooth-enabled vending machine. Bluetooth can serve as a means for connecting laptop computers or other devices to the public Internet in airport lounges and conference centers through permanent access points. It can also enable its user to exchange business cards with everyone passed on the street through a Bluetooth-enabled Palm—but not unless it has been given permission to identify the user to anyone or anything, which, according to a Merrill Lynch report on Bluetooth, "opens up whole new blind dating opportunities."

More than 2000 organizations have joined the Bluetooth Special Interest Group (SIG) and most of them are currently developing Bluetooth-enabled products under a specification developed by the group. The IEEE 802.15 Personal Area Network (PAN) Working Group, formed early last year, has made Bluetooth the foundation for a range of consumer network products, most of them portable. The PAN Working Group is currently developing a 1-Mb/s standard based on the work of the Bluetooth SIG, and hopes to define a "consumer-priced," 20-Mb/s or faster wireless personal area network that can be widely deployed for shortrange information transfer.

The principal issue with Bluetooth is interoperability. Few of these products have met the Special Interest Group's requirements for interoperability or been tested under actual use conditions. One reason is that the qualification program was launched before conformance-test systems had been validated and were available. Not surprisingly, Bluetooth components are coming out later than expected and manufacturing capacity is limited. Another obstacle: Bluetooth products must be tested at a qualified test facility to ensure compliance with the Bluetooth specification. But no qualification test facilities are currently listed on the official Bluetooth Web site, as required by the Bluetooth consortium. True, some test equipment has been delivered with Bluetooth test features-Teradyne's MicroWAVE6000 instrumentation suite, for example. But no "official" or validated test hardware was available to manufacturers as of early October. Since interoperability is the be-all and end-all of Bluetooth, there is no point in coming out with a product until the spec is finalized or until some other means is in place for verifying that the item has a very good chance of working with other Bluetooth products when they become available.

Few of those involved are more frustrated than the Special Interest Group's Promoter Group. It was formed late last year by 3Com, Lucent Technologies, Microsoft, and Motorola, and joined by SIG's original founders-Ericsson, IBM, Intel, Nokia, and Toshiba. Its charter is to lead the Special Interest Group's development of Bluetooth technology and promote interoperability among members' products. Investments of resources have been huge-Microsoft Corp., Redmond, Wash., for example, reportedly has at least 60 people working on Bluetooth issues at least some of the time. To help speed Bluetooth products to market, the Interest Group has created what amounts to an interim qualification program with somewhat relaxed interoperability testing.

Tests of Bluetooth products and devices are now being done against designated protocol test products called Blue Units. These are based on development kits designed by the Cadence Symbionics Group, Cambridge, UK (part of Cadence Design Systems, San Jose, Calif.) and available through Symbionics and Sweden's Ericsson Microelectronics AB, AU System, and Sigma ComTec. The development kits comprise baseband and radio boards, interfaces (universal serial bus ports, phone jacks, and RS-232-C ports), host software, accessories, and documentation. They were created to enable first-time Bluetooth design engineers to accelerate the development of prototype products and devices.

But Blue Units do not carry the weight of full compliance with the Bluetooth spec; they are simply test beds to be used to establish confidence in key Bluetooth protocols. While they can test a number of key functions, their use is limited to partial testing of the baseband and link manager software. Blue Units cannot, for example, be used to test the logical link control and adaptation protocol, which adapts upper-layer protocols over the baseband; nor can it test the service discovery protocol, which Bluetooth units use to learn about the capabilities of other Bluetooth units.

The tests a product manufacturer has to pass to qualify a product for a Bluetooth trademark are divided into four areas:

Radio frequency qualification testing.

Protocol conformance testing.

Profile conformance testing.

Profile interoperability testing.

Protocols describe how Bluetooth-enabled devices perform such basic tasks as service discovery, telephony signaling, and link management. Profiles specify which basic protocols and procedures are required for specific categories of Bluetooth devices and applications, like cordless telephones, headsets and faxing. Profiles are the primary means for achieving interoperability among Bluetooth-enabled devices.

Currently available profiles cover cordless telephony, intercoms, serial ports, headsets, fax machines, local-area network access, file transfer, and dial-up networking. One group, chaired by Philips Semiconductor, Sunnyvale, Calif., expects to complete a written specification on three audio and three video applications by mid-2001. More than simply replacing cables for wireless speakers using Bluetooth technology, the group aspires to create applications that will make audio/video equipment interoperable with assorted consumer electronic products, as in moving data between a Bluetooth-enabled cell phone and a PC, or remotely changing channels and controlling the volume on television sets. Bluetooth accessories, such as PC Cards and USB dongles (security devices), are treated differently: they may be submitted for complete qualification testing only when they are installed in a host product.

Other working groups within the Special Interest Group are writing profiles for printing, imaging, location positioning, human interface devices, and personal area networks. Medical, automotive, and some other Bluetooth applications will require additional product certification. Naturally, qualification requirements are expected to evolve as test equipment and procedures become available. In the meantime, designers must pass a series of tests based on four test reference categories established by the Bluetooth consortium. The categories range from merely informative, through self-testing, to full testing by a certified test facility using a validated reference test system. Since no validated test systems are yet available, the Special Interest Group is for the time being waiving the most rigorous category for manufacturers who pass the less strict of the categories and who successfully test their products against a Blue Unit.

Even that may not do the trick, though. The Category A [most rigorous] test gives a certain level of confidence that you will be interoperable with other Bluetooth devices," said Cedric Paillard, product marketing manager of Conexant Systems Inc. "It doesn't guarantee that you will be interoperable in the real world." Conexant acquired Ontario-based Philsar Semiconductor earlier this year to help speed its entry into the Bluetooth chip market. At some point, when the necessary tools are in place, Bluetooth products will show that they are interoperable with what is called a "Golden Unit"—a SIG-designated unit that has passed all the required qualification and conformance tests.

Because Bluetooth is still in its early development stages, test methodologies differ from those typical of more highly developed technologies. A Bluetooth application note suggests that Bluetooth test procedures may require manual intervention or custom software control, as opposed to mature technologies in which easy-to-use, one-button measurements are available. Part of the problem is that it has taken a long time for test houses to develop equipment with Bluetooth features, so that many Bluetooth designers have been forced to create their own test sequences and methods based on Bluetooth specifications.

A Bluetooth Design-Guide is essentially an application layer that may be added to Agilent's Advanced Design System. It contains system test benches and reference designs, such as an optimal low-intermediate frequency (IF) receiver, for part of the RF portion of the Bluetooth physical layer. The Tektronix CMU200 universal radio communications tester is a multi-standard test set for mobile phones with Bluetooth test features. Teradyne has shipped its MicroWAVE6000 instrumentation suite for testing Bluetooth radios and ICs to Ericsson, Oki, and Cambridge Silicon Radio, and has said it has several other customers lined up.

Qualification grants companies the worldwide right to incorporate Bluetooth wireless technology in their products, and to use the Bluetooth trademark; but even the trademark does not guarantee that a product complies fully with Bluetooth specifications. Passing the qualification program demonstrates a certain measure of compliance and interoperability, but as the Bluetooth SIG notes in its own literature-because products are not tested for every aspect of the Bluetooth specification, qualification does not guarantee compliance. In the final analysis, each manufacturer is responsible for ensuring that its products will intemperate with products from other Bluetooth manufacturers.

In accordance with one embodiment of the invention, an access Control and Session Management in the HTTP Environment is provided where a role-based access-control model is stored as LDAP objects in a security architecture. As the only ubiquitous public data network, the Internet offers business partners a communications channel that previously existed only in unique situations with private, special-purpose networks. Well-publicized security risks, however, have limited the deployment of business-to-business extranets, which typically use the Internet's public data network infrastructure. These risks extend behind firewalls to intranets, where any user gaining entry to a facility is often implicitly authenticated to access unprotected services by simply plugging a portable computer into an unused network port.

Role-based access controls (RBACs) and Web session management to protect against network security breaches in the HTTP environment is providede. The RBAC and session management services augment network-level security, such as firewalls, inherent in the deployment of any Web-based system with untrusted interfaces. The RBACs are implemented through the Internet Engineering Task Force's Lightweight Directory Access Protocol (for IETF documents relevant to LDAP and other Internet protocols. Session management is implemented through cryptographically secured, cookie-based ticket mechanisms.

Role-based access controls are not part of the typical Web server software set. The HTTP RFCs specify a "401:WWW- Authenticate" server response-essentially a logon challenge—for authentication and access control. The notion of a security realm applies: a typical security realm comprises a tree or subtree of URLs for a given server. Because each realm must map to unique URL prefixes, security realms are mutually exclusive. When a Web client requests a URL from a server, the server checks the URL against its list of realms for a prefix match. For each realm, there is a corresponding access control list (ACL) that specifies—either explicitly or through a set of rules—which users are allowed access to URLs in the realm, and which users are denied.

Secure realms are useful for gross access control to a Web site. But each realm requires authentication for access, so the user task of supplying a name and password quickly becomes burdensome. The need to differentiate user roles magnifies the problem: few businesses want to maintain distinct and largely redundant Web sites and content for each user role in their authorization base. An additional, more subtle problem arises with the need to dynamically generate content and control the visible link set (that is, those URLs that we know in advance a user is authorized to access, as in a search result). Given the issues of user complexity and Web site maintainability, secure realms are not feasible in the implementation of an RBAC security model, the approach described in this article shows how to address these issues by using network authentication services—such as LDAP, Sun Microsystems NIS, and Microsoft's NT domains-together with an RBAC model stored as LDAP objects and secured session ticket.

The problems of entity authentication, resource-access authorization, and session management are not unique to the HTTP environment. In custom client-server systems, sessions are explicitly maintained by persistent network connections and state information shared between client and server applications. the request-response-disconnect nature of HTTP precludes any shared, connection-oriented state between client and Web server, inso-far as that state is based on the protocol itself.

RFC 2109 describes a state management mechanism more generally known as a session ticket. RFCs 2068 and 2616 specify HTTP's basic authentication mechanism, which is simply a user-ID and password encoded in Base64 and included as part of the HTTP request headers. From a security viewpoint, Base64 is essentially cleartext. Unless transport layer security (TLS, RFC 2246) or secure sockets layer (SSL) encryption is used, this is not a secure method for authentication.

RFC 2595 recently proposed starting a TLS session to protect what would otherwise be cleartext password authentication for three Internet standard protocols. Following this proposal, a server would augment its advertised capability set to include a "start TLS" capability. A client would issue this start command, re-determine the servers capabilities, and then perform the authentication steps of the protocol with the transport layer encryption protecting the exchange. The message digest authentication proposed in RFC 2617 is a type of challenge-response authentication protocol that does not transmit any cleartext passwords.

Role-based access control provides a rich model for managing information and its accessors. Many other security models can be represented as subsets or simplifications of an RBAC model. A role-based access without hierarchical control is implemented where session termination is system-enforced instead of user-elected, and all users have a single role (both of these are constraints under $RBAC_2$). Furthermore, the notion of sessions is limited in the HTTP environment because of the single request-response nature of the protocol.

$RBAC_0$ includes:

U, a set of users

R, a set of roles

P, a set of permissions

PA, a many-to-many permission-to-role assignment relation

UA, a many-to-many user-to-role assignment relation

S, a function mapping a session to a set of roles, possibly dynamically

This was the approach used to implement LDAP-based RBAC. The permissions are treated like uninterpreted symbols in the model definition. The symbol interpretation service is implemented either as an application-level service-access meditation function—which was the case with the insurance company implementation—or as an HTTP server-request intercepts filtering function—which was the case in subsequent implementations. (It may also be possible to implement RBAC, (role hierarchies) using the object class hierarchy that is part of the X.500 schema employed by LDAP directory servers.)

Figure 20:
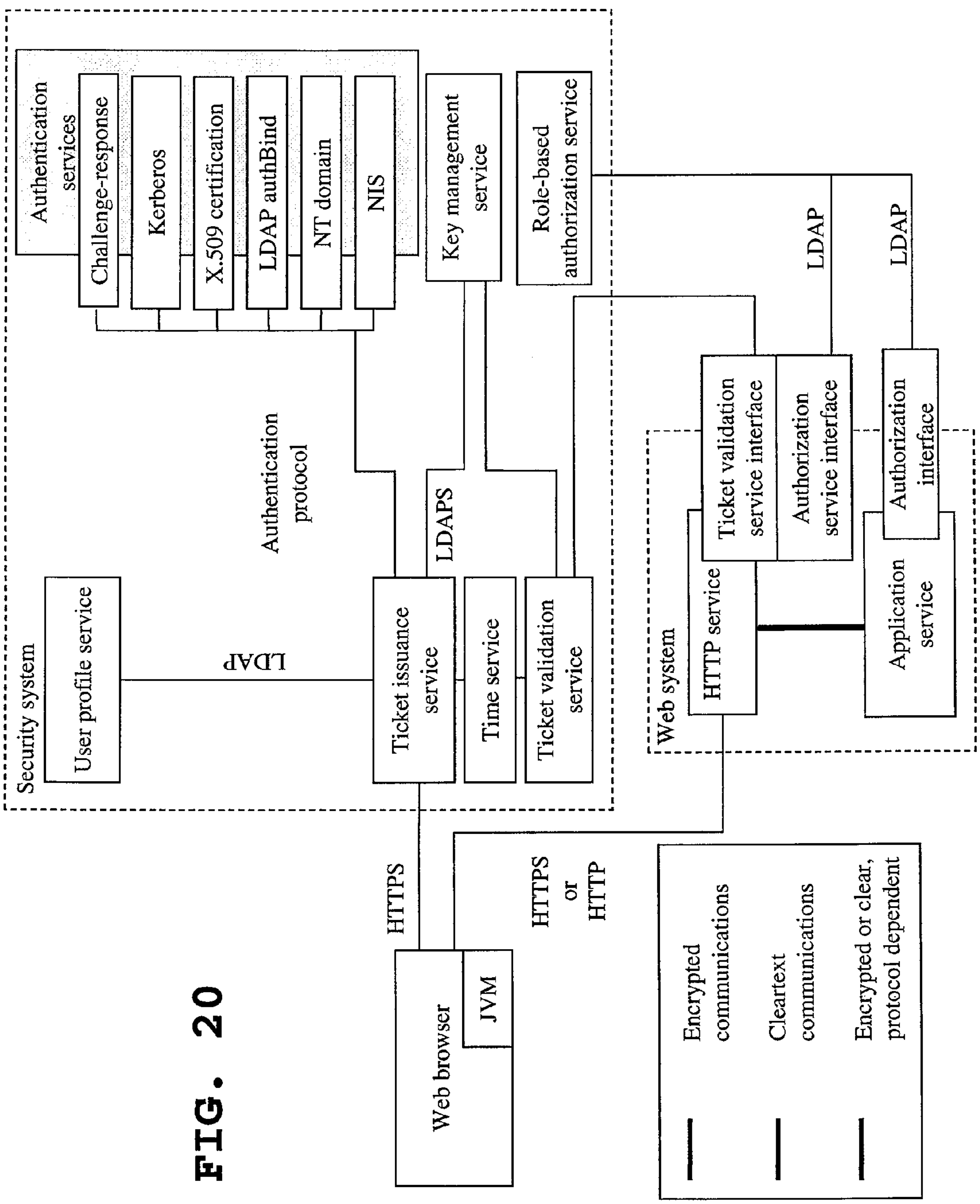
FIG. 20 illustrates one embodiment of the logical architecture for the security services, where authentication verifies a claimant's identity.

FIG. 20 illustrates one embodiment of the logical architecture for the security services. Other approaches are also possible. Authentication verifies a claimant's identity. The architecture in FIG. 20 shows authentication services as a configurable service element. In the fielded implementation, an LDAP bind operation with a simple password provided the back-end authentication service with parameters obtained from the user in an HTTP form submitted over TLS. FIG. 20 shows several other common authentication services that may already exist in an enterprise and could also be used. For a generic HTTP client, the authentication possibilities are limited to what can be accomplished with HTTP Basic Authentication or form submission. Form submission by the HTTP client causes the HTTP server to act as a proxy for the client in executing one of the authentication protocols. This implies that the client trusts the HTTP server in this proxy authentication role.

Session management services are shown in FIG. 20, and detailed below.

Time service. The session management services related to session duration and time-out require agreement on the time. Some authentication protocols also use time-varying sources, such as challenge-response types. The required precision of time measurement is usually on the order of a few minutes for session idle time-out. The network time protocol (RFC 1305) and simple network time protocol (RFC 2030) provide close synchronization of system clocks. User profile service. This service provides user attributes, particularly security roles and distinguished names. Other information that may be useful in the applications or content-tailoring environment may be provided, such as given name, common name, application preferences, and so on.

Ticket issuance service. This service h rants a session ticket to an authenticated user. The session ticket stores information about the Web site user in a tamper- and spoof-proof format and utilizes session tune-out in the normally stateless HTTP environment (for session ticket specifications, see Bellovin[2]).

The session ticket based on HTTP cookies is the only standards-based. scalable method for maintaining state in the HTTP environment. The ticket can be represented either as a single cookie within which a number of values have been catenated or as a collection of distinct cookies. In our fielded implementation, a set of related session tickets was used. For implementation purposes, this collection is referred to as the session ticket (in other words, it is a set of related cookies).

The session ticket comprises a payload, consisting of several distinct variables and their values:

- User_P: the client IP address to which the session ticket was issued. This is used in session ticket validation to detect source spoofing. Note that firewalls should not be configured to hide or rental) the requester address for this to the of use.
- User_ID: the username or distinguished name (DN) that was correctly authenticated to the site.
- Login_Expires: the session time-out and automatic logout function that Web browsers do not inherently support.
- Login_Expires_Absolute: the stated absolute expiration time of a session, even if it has not expired due to idleness time-out.
- Other attributes as required for the particular implementation.
- Ticket_MAC: a digital signature or message authentication code (MAC) computed against the catenation of the session ticket values.

Figure 21:
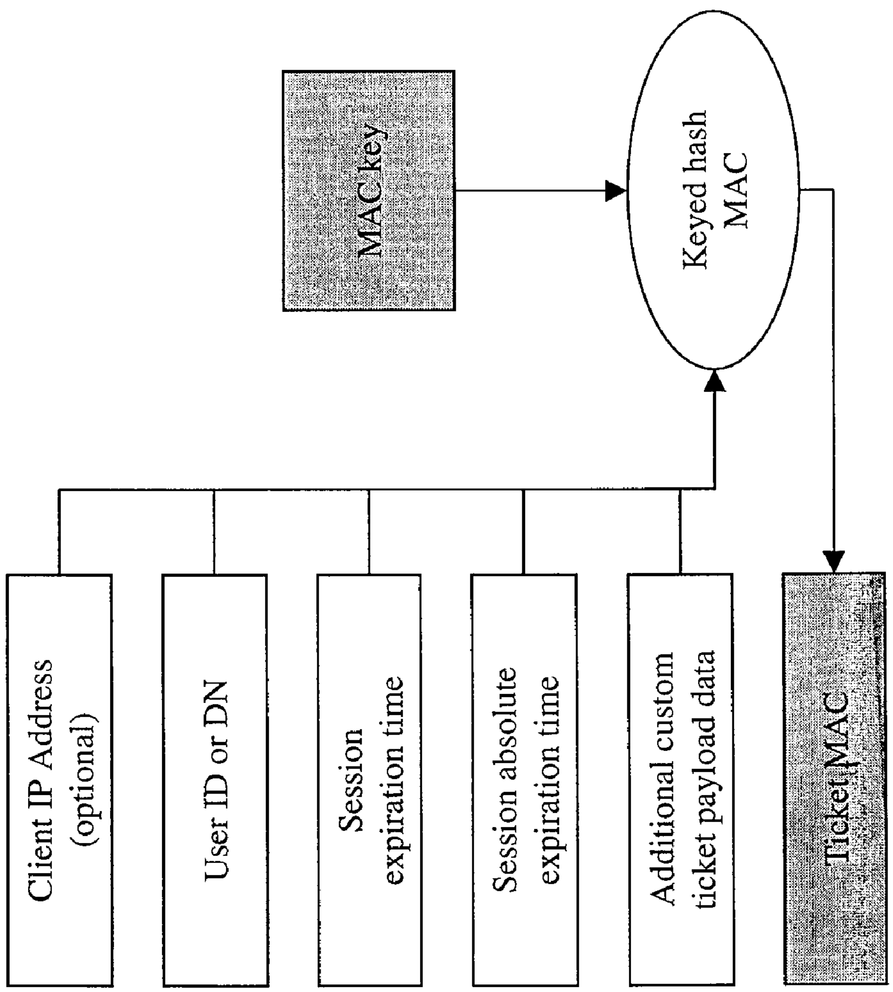
FIG. 21 is an illustration showing once the ticket arrives at the Web browser, it must be secured from tampering.

The server issues the session ticket after a successful authentication protocol execution, which in most cases transpires over an encrypted SSL connection between the Web client and the Web server. Once the ticket arrives at the Web browser, it must be secured from tampering, as shown in FIG. 21. A digital signature or Message Authentication Code (MAC) across the session ticket makes tampering detectable. If, for example, a user attempts to maliciously modify his role, the message represented by the session ticket will not be authentic.

The insurance company implementation used a hash-based MAC referred to as HMAC-SHA-1-160, as all 160 hits of the SHA-1 output are retained. Alternative implementations of the secured session ticket are possible using symmetric cookie encryption or public key methods for digital signature. This session ticket expiration time is determined by the earlier of the Login_Expires or Login_Expires_Absolute values in the secure session ticket. These values are determined at the time the session ticket is generated by adding the system configuration parameters of Session_Duration and Session_Duration_Absolute to the current time, obtained from the time service.

Figure 22:
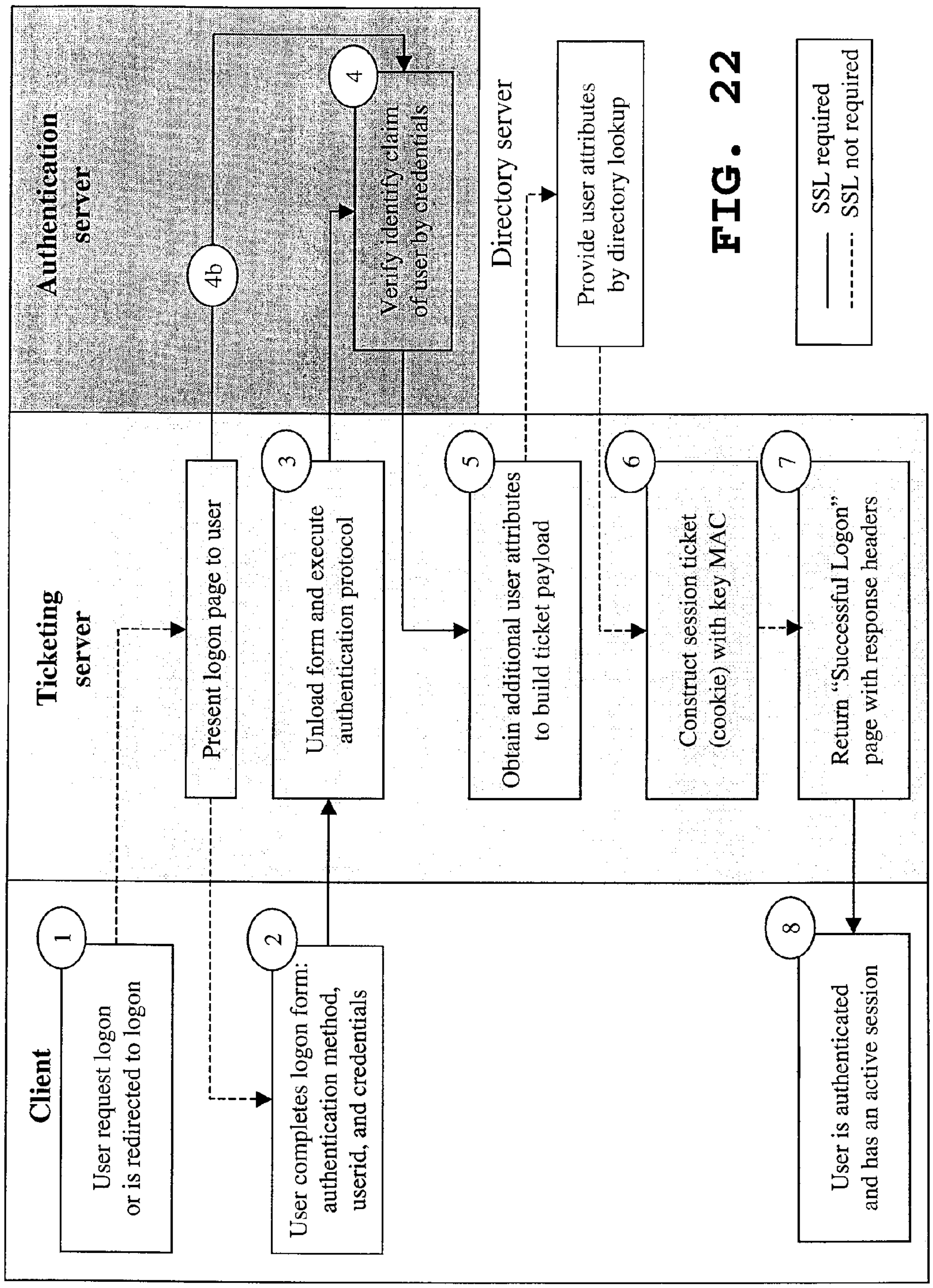
FIG. 22 illustrates the logic for implementing the ticket-issuance service and its interaction with the authentication and user profile services.

A valid session ticket is refreshed as it is used: this involves the update of the Login_Expires and Ticket_MAC values. The values are validated by a server and returned to the user in response to an HTTP request, which prevents ticket expiration while a user is active. Users would otherwise need to re-authenticate unnecessarily. FIG. 22 illustrates the logic for implementing the ticket-issuance service and its interaction whit the authentication and user profile services. Ticket validation service. After a ticket is issued, the HTTP server must validate it as presented in the request headers.

Three checks are performed to validate a session ticket transmitted from a browser user to a server:

The IP host address from which the session ticket was transmitted must match the User_IP value.

The Ticket_MAC value (as a cookie header) in the request from the browser user must match the result of the same server-side calculation performed on the presented session ticket using the MAC key (excluding the Ticket_MAC value).

The time provided by the time service must be earlier than the times specified in the ticket's Login_Expires and Login_Expires_Absolute values.

If a session ticket is not valid, the user is asked to reauthenticate and thereby establish a valid session. When a user successfully authenticates, the session ticket transitions state to "Valid and Not Expired." From this state, a number of possible transitions can be made:

A ticket refresh may retain the "Valid and Not Expired" state. This is most common event.

If the ticket is deleted (for example, the representative cookie tile is deleted, or the browser application execution terminated and restarted), it arrives in a "No Ticket" state.

If the ticket is tampered with or the machine IP address does not match the User_IP value, it arrives in an "Invalid Ticket_MAC" state.

If the ticket is presented after it has expired, it arrives in an "Expired" state.

A tampered and expired ticket arrives in the "Invalid and Expired" state.

From any invalid state, a transition back to the same state based on a failed reauthentication is possible. If reauthentication is successful, the state transitions back to "Valid and Not Expired."

The User_IP may have been established by a dynamic host configuration protocol (DHCP) service (RFC 2131); this occurs if sessions time out or expire in a much shorter time than a DHCIP address lease does. Session time-outs are usually in the range of 5 to 20 minutes, while DHCP leases tend to have durations of 24 to 72 hours (a few environments with very short leases provide exceptions to this). If a DHCP lease is lost and renewed with a different IP address while a session is active, then the user will need to re-authenticate. (In other words, the user will have been logged off by the address change; this would be true for any socket-based services in use as well).

The use of proxy servers raises another issue related to User_IP. In the case of many users and a single shared proxy, all users appear to have the same IP address—that of the proxy. This limits the effectiveness of User_IP in binding a session ticket to a particular host. In the case of many users and an array of proxy servers with different IP addresses, the User_IP generally will not match the actual IP address of the rotating proxies. In a case where you can control the proxy systems, one solution is to activate proxy generation of the Client IP HTTP request header and use this value instead of the host IP address.

The keyed message authentication code stored as the Ticket_MAC value requires the provision of some key management services. Key management services required for this approach are:

secure distribution of the MAC key to all servers requiring it, and

MAC key renewal or regeneration.

MAC key updates cause all currently valid session tickets to become invalid. This forces users to reauthenticate, which can be irksome if key updates are frequent. In practice, a nightly key update schedule is often adequate for typical business-oriented-as opposed to military or diplomatic-security policies. In a network of servers requiring MAC key knowledge and renewal, more elaborate key distribution methods are needed to protect the key during transmission.

The Authorization Service mediates user access to resources; its primary clients are HTTP servers and other network-based, LDAP-aware applications. When a user requests resources, the HTTP server asks the authorization service if the user is authorized for them. The response is either true or false, and the HTTP server or application processes the request accordingly. In this way, the HTTP server acts like an application access firewall, where filtering rules are based on an RBAC model accessed over LDAP.

LDAP is defined in several IETF documents. RFC 1487 (July 1993) was the earliest definition of a lightweight access protocol for X.500 directories. RFC 1777, released in March 1995, is known as LDAPv2 and remains the current draft standard. RFCs 2251 through 2256 are proposed standards and collectively constitute what is known as LDAPv3.

The LDAP RFCs describe a network protocol for communication between directory user agents (DUAs) and directory server agents (DSAs), supported by an underlying set of data structures referred to as a directory. The directory data structures are in accordance with the CCITT X.500 standards[5] and provide a simple, object-oriented organization. The objects are not complex and do not have any executable code attached to them; they often look like simple database rows with the exception that attributes or columns may be designated as required or allowed. Objects may be designated distinct classes, the attributes of which may be inherited by any object therein.

Using a compliant LDAP DSA and domains example. (a Netscape Directory Server in the implementation described here), the $RBAC_0$ model defined previously can be implemented by making two schema extensions. First, the default user object is subclassed to a new object class with at least one additional required attribute: securityRole. At this point, if the client has outer attribution requirements, those attributes are also definers for the new default user object.

Second, the object class securityRoleObject is defined. There is one instance of securityRoleObject for each defined role in the system. This collection of objects defines the relation PA, as described for $RBAC_0$ (a many-to-many permission-to-role assignment relation). In practice, PA may be represented as a Boolean matrix of dimensions corresponding to the number of roles (rows) and permissions (columns) in the system. Each securityRoleObject then corresponds to a row of the permission matrix.

Next, users are created in the LDAP directory using the new object class. This object class inherits all the usual attributes-e-mail address, fax number, street address, first name, last name, and so on-plus any additional new attributes the client requires. A typical distinguished name (DN) for a user would have the form uid=userid, o=organization, c=countryName.

After all of the information access functions are identified, user roles are defined. An instance of the object class securityRoleObject with an identifier that included the role name and true or false values for each attribute that matched an information-access function was created in the insurance company implementation.

Because HTTP cookies contain a return domain that may include a wild-card type of specification, it is possible to use this session ticket scheme for a single Web sign-oft (SWSO) capability. SWSO allows a user to authenticate once to the ticket-issuing service and obtain a session ticket that establishes the user's session and authentication throughout an entire DNS subdomain of hosts. An HTTP cookie contains a name, a value, a path, a domain, an expiration, and a secure-only attribute. By designating the domain to be, for example, *.computer.org, the cookie will be returned to any server in the subdomain of computer.org, such as www.computer.org, dlib.computer.org, ftp.computer.org, and so on. A single cession ticker thereby provides the user's authentication and session management across a number of hosts related by domain name.

The example outlined below describes how a user sees the interaction with Web-based systems employing this approach to security. The initial login form includes possibilities for authentication service selection and domains for SWSO; in practice, this login form would be simpler.

The following steps describe this hypothetical session, illustrating the user's view of the system's security aspects:

The user launches a Web browser and enters a URL, such as http://dlib.computer.org.

Any cookies representing session tickets from previous sessions have expired, so no cookies are presented in the request headers. (Expired cookies may be present in the request, but the user does not see this.)

The Web server examines the request headers looking; for a name-value pair. which serves as the session ticket. If the session ticket is invalid or expired. or if none is found. the user is redirected to an authentication HTML form, delivered over a secured SSL HTTP connection from the ticket-issuing server. This form may be delivered by the same Web server or by a different Web server dedicated to this purpose.

The user fills in the authentication form, entering a user-ID and password, domain selections, and authentication method selection. and submits the form to the ticket-issuing server.

The ticketing server operates as a proxy for execution of file selected authentication protocol with an authentication server.

The ticketing server prepares a ticket for the user's session. The user ID, DN, session expiration time, absolute expiration, and possibly a client IP address form the ticket payload. A keyed MAC value is computed against the payload and appended to it; the payload and its MAC are then delivered in the HTTP response headers as cookies. The return domain of tile cookies corresponds to the domain selections made earlier on the form (*.computer.org in this case). The user is now authenticated and has an active Welt session with all Weft servers in the *.computer.org domain.

The user is presented with the initial navigation screen of the Computer Society's Digital Library.

Subsequent requests against any server in the *.dlib.computer.org domain will have tile session ticket cookie values in the HTTP request headers. All Web servers will extract that header and validate it using the shared MAC key. The user does not need to re-authenticate until the session expires.

The session expires after some time, say 30 minutes. A valid MAC but expired ticket results in a re-authentication as described above. Now re-authenticated, the user continues using the Digital Library.

Finally, the user is done with the session, and instead of telling it time out, she logs out explicitly. The logout establishes a session ticket with the expiration time so that any re-use of the computer's currently running browser will require re-authentication.

A comprehensive approach to security must consider numerous potential attacks on network services. Relevant issues include security policy, information labeling, user administration, physical security, operation system confirmation and hardening, network topologies for service locations, firewall configuration and filtering rules, intrusion detection, penetration testing, and more. The following analysis of threats is restricted to those specific to the security services identified in tile service architecture presented here.

Both SHA and MD5 produce a fixed number of hits from an arbitrary size input: SHA produces 160 bits and MD5 produces 128 hits. The MAC can be defeated only by a forgery. To succeed, an attacker must find a useful hash collision-a computationally daunting task. To guard against this attack, the MAC key is regenerated daily, thus limiting the time available for calculating a useful hash collision to 24 hours. This interval may be reduced as computer power available to attackers increases.

The primary defenses against session ticket theft attacks arc the Login_Expires and User_IP elements. An attacker has only until the Login_Expires time to steal the session ticket and move it to another machine: in practice, this window of opportunity is usually between 5 and 20 minutes. (If the attacker were in possession of the victim's password, this session ticket theft attack would be unnecessary.)

The attackers machine must also engage in an IP address spoof so that it appears to have the same network IP address as the victim's machine. Since both machines are active at the same time, this routing issue poses an additional problem for the attacker. A successful session ticket theft requires that an attacker read a user's disk-based cookie tile, change the victim's IP address or take the victim's machine off the network, assume the victim's IP address oil a subnet such that the IP routing of the stolen address will operate correctly, and finally, access the Web-based resources while impersonating the victim. This is a relatively complicated attack, which would generally require physical proximity to the victim's network and execution within a short timespan.

This attack is very unlikely to succeed when the cookies are memory-resident, that is, if they are never written to the cookie file by the browser software. This memory-only cookie treatment by browsers is not guaranteed, however. If SSL is used only access to the ticket-issuance service and the session tickets are subsequently transmitted in cleartext over the network, the tickets are vulnerable to recovery by an eavesdropper. When the HTTP traffic is SSL-encrypted, successful eavesdropping to steal a session ticket is unlikely.

If an attacker tries a different approach, such as extending the Login_Expires attribute or changing the User_IP of the session ticket, this will be detected in a Ticket_MAC computation mismatch. (The attacker does not have access to the MAC key secret used in the signature-generation algorithm, as it is protected by a firewall and operating system security measures.) A Ticket_MAC mismatch causes the server to immediately request re-authentication with the correct user ID and password, and generates an auditable event. Similarly, if an authenticated user seeks to modify some signed attribute, this will also be detected by a Ticket_MAC mismatch.

The function that generates the session ticket is another point of attack. Direct execution of this function would allow all attacker to revive an expired session on a machine that an authenticated user has left unattended. This function is protected by operating system methods, application server methods, and Web server access controls. No unauthenticated or direct execution or viewing of the session ticket generator is permitted.

LDAP-based authentication and authorization services are also vulnerable to attack. This could involve repeated attempts to guess a user-ID and password for an LDAP bind with simple password operation. Discovery of a user's password would allow an attacker to impersonate an authorized user. An attacker might also discover a system administration account, and thereby be able to change security role definitions. Further, a user may seek to modify his security role attribute to gain greater access to resources.

Additional details regarding the above may be found in Kurt Gutzmann, Access Control and Session Management in the HTTP Environment, IEEE Internet Computer (January-February 2001), incorporated herein by reference and all references cited there incorporated herein by reference.

Figure 23:
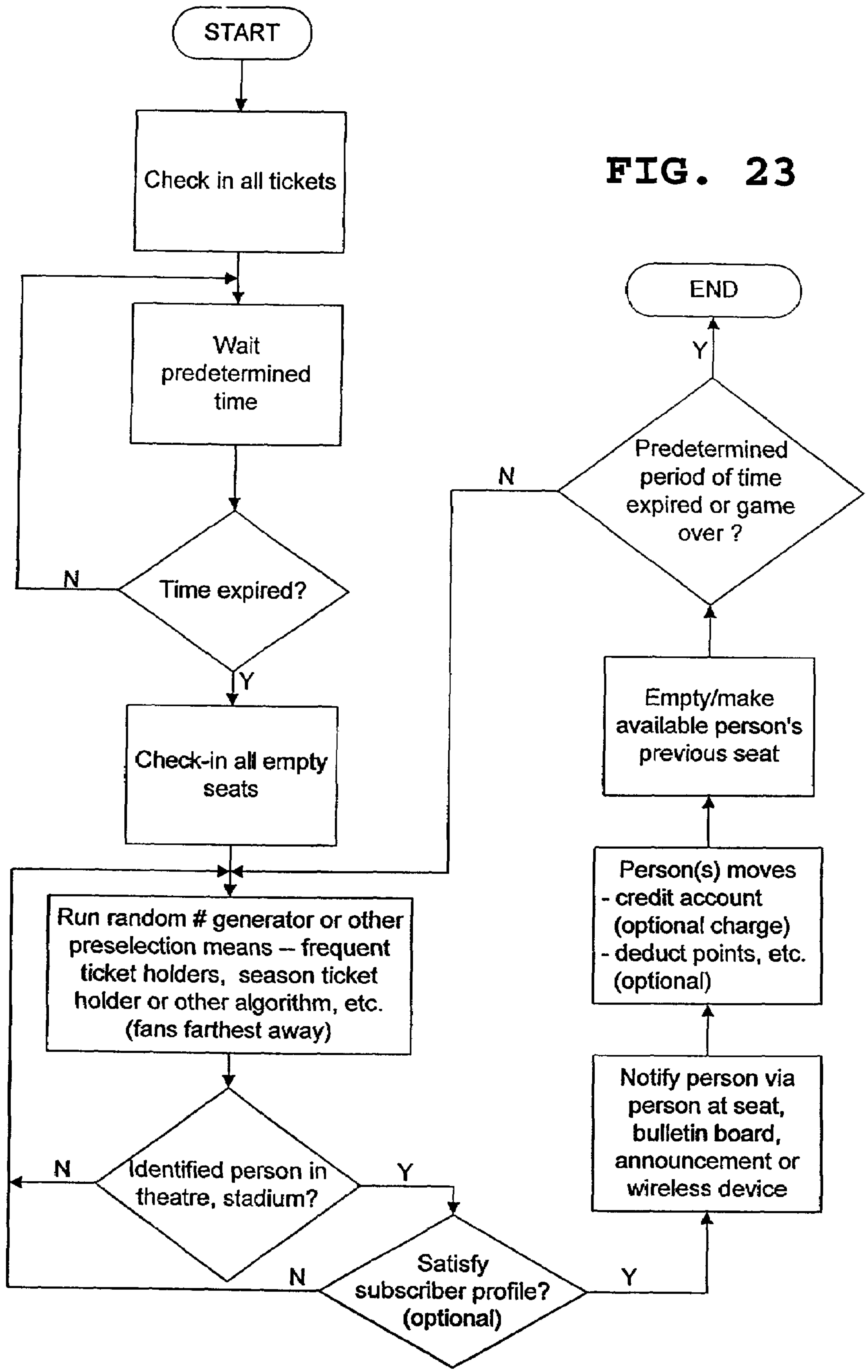
FIG. 23 is a flowchart of an embodiment of the invention that incorporates one or more of the architectures or communications methods described above.

FIG. 23 is a flowchart of a first embodiment of the invention that incorporates one or more of the architectures or communications methods described above. In FIG. 23, the process begins as all tickets are checked in, for example, as the patrons enter the reserved seating area, such as a stadium or theater, through, for example, bar code readers, scanners, infrared readers, and/or manually or other method where the patron is checked in, either at the gate, seat or other location. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. The patron may check in either a predetermined time before or after the event begins. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seats for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, or other predetermined process.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or more means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. Optionally, a bidding process may be initiated that allows various patrons to bid against one another. Any standard bidding process may optionally be used. The patron, of course has the option to decline, and if so, the process continues and returns to the re-allocation process to attempt to locate another possible patron.

If the patron accepts, payment of money or other means may be effectuated on the spot via the wireless device, credit card, debit card, points, and the like, and the patron may now move to the other seat. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium. The worker in the stadium may input the confirmation number received from the patron to determine the appropriate upgrade. In this embodiment, only confirmation numbers that are provided to the workers are input into the system, thereby reducing the amount of transactions in the system, as opposed to pushing, for example, an upgrade list to all workers in the stadium in accordance with another embodiment of the invention.

In accordance with the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that may be in the vicinity of the stadium but were unable to get seats. Since the present invention re-allocates and/or sells tickets very near to game time in accordance with one embodiment, the patron must be in the general vicinity of the stadium to take advantage of this embodiment of the invention.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron to help the patron decide the quality of the upgrade and whether to accept.

In one alternative embodiment, if the patron that has their ticket re-allocated in error, e.g., because the patron did not show up to the event based on the predetermined criteria but the patron was still planning on attending because they forgot about their seat being re-allocated, the system can re-allocate seats immediately upon the checking in of the patron and notify them that their seats have changed because they are late. In this situation, the stadium/venue might decide to further upgrade the patrons because of the mistake.

In accordance with one embodiment of the present invention, the process of the present invention specifically reserves seats of the highest or very high rating that are considered preferred, in the event a patron's seat is re-allocated prematurely or erroneously. In this situation, the patron who has had their seat re-allocated because they will likely receive an even better seat as a result of the mistaken (stadium or patron) or premature seat re-allocation.

In another embodiment of the present invention, as patrons are entering the venue or stadium, they are provided advantageously with a map of the stadium so patrons can analyze the potential upgrade to make a decision whether the upgraded seats are sufficiently good or of value to warrant the patron moving and/or paying for the additional upgrade. By handing the patron the map of the stadium, the process of the present invention is not required to transmit a detailed schematic to the patron's wireless device which would not normally be able to effectively permit the patron to evaluate the proposed upgrade seats. The map that is handed out may optionally include information for patrons on where to register for the upgrade and/or additional advertisement opportunities.

In one alternative embodiment, the patron that has purchased the ticket, for example, a season ticket holder, may advise the stadium that for a particular game, set of games or all games, they do not want their seats to be re-allocated, and perhaps, an additional fee is assessed for this type of patron. If the stadium provides the ability for the patron to selectively opt out of the seat re-allocation, the patron can, for example, connect to the system via the Internet, public switched telephone network, cellular network, and the like, and notify the system that they do not want their ticket re-allocated, for example, because they are coming late to the event. Other means of notifying the system and/or other reasons may be utilized in connection with the present invention.

In another alternative embodiment, the system provides patrons the ability to individually select when their tickets may be re-allocated. For example, one patron may prefer to only give up their ticket if they are late to the game by 15 minutes, while another patron may be willing to give up their ticket if they have not arrived 15 minutes before the game. In alternative embodiments, the stadium may provide incentives for the patron to have their ticket re-allocated prior to the game because it increases the stadiums chances of re-allocating/re-selling the ticket.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provide additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In an alternative embodiment, the system determines priority of re-allocation of seats based first upon patrons that have seats that may also be re-allocated. That is, the systems attempts to maximize the number of re-allocations by prioritizing the re-allocation based upon seats that may be re-allocated after already being re-allocated. For example, if front row seats in a stadium are available to be re-allocated, in this alternative embodiment, patrons that are in the next closest section for example on the field level would be upgraded first to those seats. Then, patrons with less preferred seats, for example, in the upper deck would be re-allocated to the seats that have now become available from the patrons that have been upgraded to the front row. Thus, using this alternative priority scheme, the present invention maximizes the re-allocation numbers. Of course, this priority algorithm may be combined with additional factors, for example, relating to subscriber/patron value. As described above, additional factors may be utilized in the algorithm to determine the subscriber or set of subscribers to offer the upgrade.

In alternative embodiments, patrons in the vicinity of the upgraded and re-allocated patrons may optionally rate the upgraded patron, for example, for appropriate behavior, wearing of excessively large hats, drunkenness behavior, and the like. These ratings may then be taken into account in the re-allocation algorithm for future upgrades to the patron.

In alternative embodiments, the patrons eligible for the upgrade may be notified using standard email communications over a wireless device, mobile telephone, and/or other standard communication means. For example, standard text-to-voice and/or voice-to-text communications may be used to contact the patron to evaluate whether an upgrade will be accepted and to actually accept the upgrade.

In another embodiment of the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that have already purchased tickets in the vicinity of the stadium but were unable to get seats and/or may be in the vicinity of the stadium but were unable to get seats. Since the present invention re-allocates and/or sells tickets at any time prior to and/or after beginning of game time in accordance with one embodiment, the patron may be in the general vicinity of the stadium to take advantage of this embodiment of the invention or even at any location when being offered upgrades and/or seats well in advance of the game. For example, the present invention can upgrade or sell tickets to patrons well in advance of the game since it advantageously is permitted or has the authority to resell tickets either via ticket holders that do not show up during the game and/or, for example, season ticket holders that have authorized the stadium in advance to resell their tickets based on predetermined criteria, for example, when the season ticket holder notifies the stadium that they will not be present at next weeks game.

In one optional embodiment of the invention, the patron presents the usher with the confirmation number which the usher can enter into a wireless device using a local or private wireless network, or can simply use a walkie talkie or telephone to call the dispatcher to confirm the upgrade and/or new seats using the customer provided confirmation number. The dispatcher will have access to the system to enter the confirmation number to confirm the validity of the upgrade. Alternatively, a patron will retain their old ticket. The patron will give in the old ticket to the usher which is scanned or barcoded by the usher for immediate identification of new seats and used in place of, or in addition to, confirmation number.

Of course, the confirmation may optionally be made via customer name with an appropriate identification card or other information. Further, alternative methods may be used to verify that the confirmation number and/or ticket being used by the patron is valid. For example, the patron may be equipped with a printing device associated with the wireless device or download an actual ticket on line from home prior to the game for the new ticket or upgrade. Alternatively, the patron may be equipped with an identifier card, optionally including a bar code with a unique identifier relating to the patron's account information and profile that can be scanned for additional convenience. Alternatively, a wireless device may be used to securely store this type of identification and/or account information.

In at least one alternative embodiment of the invention, the patron may comprise optionally a corporate account that has a number of tickets, for example, season tickets. In this embodiment, the corporate account may have associated therewith a plurality of email addresses or other communication addresses to transmit the seat or upgrade offer to a number of potential patrons that may rotate their attendance at the games. In accordance with this optional embodiment, multiple emails can be stored for a single user/corporate account, and the system may transmit individual messages to all email addresses, or may only transmit messages to individual patrons for corporate account that individually advise the system that they are associated with a particular ticket/bar code for a particular game and will be/are present at a particular game.

In an alternative embodiment, patrons may enter the stadium and subsequently inform the system that they are present and interested in an upgrade via a kiosk where the patron can scan a bar code and enter their customer number to be eligible for upgrades during the game. The system is then able to transmit a message to the customer, assuming that the customer has pre-registered with the system with the appropriate contact information. Alternatively, or in addition to individual use of a kiosk(s), the customer sales office may have a kiosk or additional functionality to enter the customer name and/or customer account and scan in the bar coded ticket on the spot to register each patron as they enter the stadium or venue.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron upon entry in the stadium to help the patron decide the quality of the upgrade and whether to accept when an offer is received by the patron at a predetermined time. The graphical map may comprise a small booklet with a map of the stadium showing seat locations, and optionally a game schedule.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provides additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In alternative embodiments, patrons in the vicinity of the upgraded and re-allocated patrons may optionally be eligible for a dating or matching service where patrons register and provide profile information to the system and/or through a third service provider dating service. Once the system knows that the patrons will be coming to the game and/or have actually checked in to the stadium, the system can then arrange for the two, four, etc. patrons to meet each other by allocating and/or re-allocating seats to the patrons together. Thus, based on profile information, customer request and availability, the system is able to upgrade or sell tickets to patrons to maximize their chances of meeting someone at the game. This optional feature provides significant potential enjoyment for the patrons participating in this dating or connection program. In accordance with this embodiment, one possible sequence of acceptance steps involves profile matching the two patrons (or groups of patrons) based on predetermined profile information; transmitting a first message to the first patron regarding availability of the second patron and requesting a conditional acceptance form the first patron; transmitting a second message to the second patron indicating that the first patron has conditionally accepted and request the second patron to accept; and when the second patron accepts before the first patron has rescinded the conditional acceptance, finalizing the upgrade and/or seat allocation for the first and second patrons. This embodiment of the invention is a complete reverse from typical dating and/or matchmaking services which attempt to develop detailed algorithms for the matching process because of the significant decision that exists in determining who to spend valuable time with. In accordance with the invention, patrons are already present at the game, and therefore, half or more than half the effort is already done. The remainder is to actually meet the other person which can be accomplished with profile criteria, whether or not the algorithms are very sophisticated.

In one embodiment, the patrons that are being matched have their original seats maintained and not made available for other upgrades in the event the matching does not work out early on. In this embodiment, one or both the patrons can return to their original seat. Hopefully, there will not be a significant argument of who would need to return to their original seat if an upgrade is actually performed. In addition, in accordance with this embodiment, the seats that are selected do not necessarily have to be better seats in the classical sense. That is, seats further away from other ticket holders might be considered preferred when matching two individuals for the first time. Alternatively, couple that would prefer a little more privacy or quieter game might request to be moved to a more isolated area. Alternatively, families with small children might prefer to be moved to a less busy area as well during the game where the children might be able to freely move around. All these scenarios and/or alternatives are possible in view of the present invention. The advantage of performing a match in a public setting is that the patrons do not have to worry about leaving or ending the date, and also do not have to worry that the other person will have their home address.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like.

In addition, this feature also optionally permits the patrons that have participated in the program to rate one another for future dates. For example, one patron can rate the conversational benefits of the second patron, the appearance of the second patron, the overall short term versus long terms relationship goals of the patron, and the like. These ratings may then be taken into account in the algorithm for future seat assignments, re-allocations and/or upgrades in the future for the first and second patrons, and all other patrons will now benefit with the additional profile information of the first and second patrons. The matching service may be for amusement or work related networking purposes, for example, to meet an executive that the patron currently works with or wishes to work with/sell in the future.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like. In addition, the system advantageously and optionally provides the feature of allowing patrons to text message one another directly, and/or exchange pictures via wireless email, text messaging, and other wireless devices that provide the standard capability of exchanging pictures, such a T Mobile and/or Sprint.

In alternative embodiments, the ticket holder can call in via a voice to text message, text message and/or email and let the stadium know early that they are not coming. In this manner the ticket holder obtains the convenience of the stadium or venue reselling their tickets in advance, thereby providing the venue with additional time to maximize the resale of the ticket.

In alternative embodiments, when the patron enters the stadium, they have their ticket barcoded or other device that detects their presence can be used such as infrared, Bluetooth, etc., and then they can become eligible for an upgrade. The patron can register in advance that they want to receive upgrades by providing their name, message address, e.g., email, telephone text message address, etc., and optionally their credit card or other payment mechanism for upgrades that actually cost money as opposed to free upgrades. In alternative embodiments, the patron can register at the ticket booth when purchasing their original ticket. In this scenario, the stadium representative can enter this information on behalf of, and with the permission of, the patron since the patron may already be providing their credit card, debit card, etc. to purchase the original tickets. Alternatively or in addition, a kiosk may be provided where the patron can enter their original ticket, e.g., scan in their original ticket and provide their name and text message information in the stadium to register for a one time upgrade for the game after purchasing, for example, a regular admission ticket.

In alternative embodiments, an usher can verify that the patron should be upgraded by the patron providing the confirmation number that may be transmitted in real-time by the system, and/or by the patron using their original confirmation number or original ticket with barcode or other identification means, such as a smart card, infrared reader, etc. that represents original ticket and presenting same to the user. The usher then needs only to scan in the original ticket and the system will verify whether the patron associated with the original ticket is valid and whether the upgrade is valid.

In alternative embodiments, a warning message may be sent to the ticket holder that has not shown up to game warning them that if they do not respond within a certain time period that their seat will be re-allocated or re-assigned to another patron. Similarly, a release message may be sent to the ticket holder after their seat has actually been released and/or re-allocated, thereby notifying the patron that if they change their mind in attending the game, they will have to obtain an additional ticket. In alternative embodiments, the ticket holder that has their seat released and re-allocated can be themselves re-allocated a similar, worse or better seat, depending on, for example, their subscriber value and/or other criteria. For example, if the patron is provided a better seat, this will encourage them to more readily give up their seats in the future even if they are attending the game. On the other hand, if the patron is provided a worse seat, then this encourages them not to artificially give up or have their seat released when attending the game. Accordingly, the present invention is designed to deal with various behavioral patterns of specific ticket holders, and may optionally and advantageously be a ticket holder specific with respect to various criteria for re-assigning, releasing, selling and/or re-allocating tickets.

In alternative embodiments, the system transmits to the ticket holder a welcome message after being upgraded and after having being moved to a new upgraded seat location. In one embodiment, the system identifies that the patron has been successfully upgraded after the patron provides the usher with a confirmation number or original ticket, which is then verified by the usher and system.

In alternative embodiments, the system, after having identified which patrons have checked into the stadium and/or have been upgraded, transmits a trivia question and/or additional advertisements to all patrons attending the game. In alternative embodiments, the information is transmitted to both patrons that are attending the game and additional patrons that have registered in the past to receive information but that are not attending the game. The participants can, for example, answer trivia questions and respond with their wireless device. Depending on whether the patron is attending the game or not, the system may determine to offer or deal with each of the patrons differently. For example, for patrons at the game, winners may be successively determined and narrowed, as patrons successfully and unsuccessfully answer questions, round after round of questions in a "spelling bee" format. For patrons that are not attending the game, winners may be declared, or statistics provided to the broadcast station that can be aired on television. In yet additional alternative embodiments, instead of transmitting information/questions to the patrons via the wireless device, the information/questions are displayed on the stadium billboard for patrons at the game and/or on television for patrons that are watching the game on television. The patron can then merely respond via the device, e.g., the telephone accordingly via a voice-to-text system or via other mobile devices via text messaging.

In alternative embodiments, the present invention provides the advantage of additional advertising sponsorship to the venue. For example, in one embodiment, the venue is partitioned into different locations that may be assigned to different sponsors. In one embodiment, the sponsor that provides the most value may be assigned a certain number of premium seats that are not available to other sponsors.

For example, the sponsor may offer a discount on the upgrade if you are a Verizon or Verizon Wireless customer or they credit your cell account for each seat upgrade or you get say 30 free minutes, etc. In alternative embodiments, the present invention provides the advantage of one wireless provider to advertise on another wireless providers mobile phone or wireless device. For example, if Verizon Wireless is a sponsor of the upgrade system for a particular stadium, the present invention will still work with, for example, AT&T, SPRINT, and CINGULAR customers. An advertisement message sent with the upgrade offer may read on the AT&T phone, "brought to you by Verizon Wireless." In an alternative embodiment of the present invention, text messaging is optionally used for mobile phones to perform the message communication of the present invention. The user is only required, in one embodiment, to reply or respond with a "Yes" to accept the upgrade offer since the user has advantageously pre-registered with the system, thereby minimizing the required communication/input by the user. In an alternative embodiment, the user, instead of pre-registering with the system, is charged on their wireless or even regular telephone number bill when they accept the upgrade offer. Thus, the wireless system that either administers the user's regular or wireless account or the upgrade sponsor may be responsible for actually billing the customer in this alternative embodiment.

In the alternative embodiment when text messaging is optionally used alone or in combination with other communication methods, the system provides the additional advantage of maximizing bandwidth usage by not requiring use of bandwidth on the wireless voice system, thereby maximizing system resources.

In another alternative embodiment, the present invention optionally and advantageously provides a security and/or safety feature in the event of, for example, a minor event where a parent gets separated from a child, a disaster or other event that might require evacuation of the stadium. In one embodiment, the person needing help provides their name to an attendant that can search the system for the contact information of their companion/parent. The system can thereafter send an email and/or text message to the companion/parent regarding the status of that person and provide instructions for meeting that person or arranging help, authorizing medical procedures, and the like. In another embodiment, the person requiring help, e.g., a child provides the attendant or kiosk with their ticket which can, e.g., scan the bar code or other reader system. The system can either automatically provide a text message to the parent who can then reply to the child/attendant via the kiosk to meet the child.

Alternatively, the parent can be instructed to meet the child at a predetermined location, and to stop looking for the child because the child was found. Thus, for this example, the person who is lost or separated from their party can notify security or access a kiosk. Security can, for example, notify the parent that child is in safe custody, and should not search the stadium, and therefore, meet outside stadium in a pre-specified safe place.

In an alternative embodiment, if a child/person is separated, the security guard/kiosk can arrange the best place to meet, either in or outside the stadium, together based on an optional global positioning system (GPS). In addition, the party with the mobile device can be provided directions on where to go to meet their party from who they have been separated.

In an alternative embodiment, the present invention may also be used in a security, defense and/or safety setting to direct patrons in a stadium for an orderly evacuation or notify patrons regarding status of a safety related event via, for example, a broadcast message including text message, email and the like. In this manner, system communication resources may be most efficiently utilized by not over-utilizing the system via voice communication, unless completely necessary. For example, the message can be broadcast in the event of an impending hurricane. In this situation, patrons in different sections get different messages, for example, to exit the stadium out of gates/exits that are either less occupied or closest to the section the patrons are sitting in. Advantageously, the present invention has the patrons contact information, including optionally and advantageously text messaging, that can be broadcast or sent to different patrons. The advantage of text messaging is that the bandwidth is more efficiently used in the event of an emergency, and there are no busy signals as in a voice network. Further, the message is send, and if the network is at capacity, the system can automatically resend or the message will be placed in queue and sent as soon as capacity becomes available.

In another alternative embodiment of the invention, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction.

For instance, in sporting venues the bracelet ticket includes the machine readable information that comprises at least one of a bar code and radio frequency identifier used for security check in, and optionally check out. In this manner, the standard reading machines that can scan the bar code or RFID information can keep track of people that have checked into the sporting event and/or venue. Advantageously, the machine readable information on the bracelet can also be used by the venue in the event the patrons seat assignment is modified, for example, via an electronic ticket exchange or upgrade program. In this embodiment, the visible indicia are no longer valid for the actual seating that may be dynamically changed and only represents optionally an initial seat assignment. However, the machine readable information may be used as a code to reference the specific patron and assign that patron a new seat. Thus, when the ticket reader scans the ticket and actually identifies, for example, the bar code, this information can be used to reference the patron, update and/or confirm the patron's current seat via the reader used, for example, by ushers in the venue, kiosk, entrance to the venue, and the like.

In an alternative embodiment, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction. This information, as previously mentioned, may be visually cognizable for the patron and in combination, readable by electronic means if the bracelet includes a magnetic strip, bar code imprinting, or RF chip.

In an alternative embodiment of the present invention, the security bracelet and ticket combination of the present invention advantageously includes a bar code or other machine readable information such as a RFID device. When, for example, a child is separated form their parent, the parent can notify security and the seat number associated with the child. If the child attempts to leave with their bar code/identifier, the system detects the bar code/identifier as either being valid and identifying the child that is missing or being invalid and raising another red flag. In an alternative embodiment, the bar codes/identifiers associated between children and adults correspond such that the child identifier must be within a predetermined time and/or number of checking out identifiers from/within the adult identifier. If this does not occur, the system determines that the child is leaving without their parent, and possibly being abducted.

In an alternative embodiment, the system links one or more tickets/identifiers together and requires the tickets/identifiers to exit the venue or event within a predetermined time period from one another and/or within a predetermined number of tickets/identifiers that have exited the venue and/or event. In the event that one ticket/identifier exits the venue or event and the associated identifier does not, then an alarm or other indictor occurs, and the attendants will detain the patrons that have initiated the alarm to for security purposes.

In an alternative embodiment, the tickets are advantageously coded with designations such as adult, child and the like. In the event a child ticket/identifier exits the stadium before the associated adult and/or more that a predetermined time period and/or number of patrons exiting, the system can initiate an alarm so that an attendant can determine if a child has exited the venue or event without their parent or with a wrong parent potentially averting a kidnapping. In this embodiment, an additional combination is the use of the standard fast pass feature, for example, at theme parks, and the like, where the venue records predetermined events that the user of the card enters in a faster line. In this embodiment, if a child ticket/identifier is not associated with a parent ticket/identifier, for example, as described above, the child may be denied entry into the event or venue if not accompanied by their parent. In alternative embodiments, the venue/event sponsor or organizer associates tickets upon request from the patron. In addition, in another alternative embodiment, a kiosk is provided inside and/or outside the venue for, for example, parents to register their tickets and have them associated with their children's tickets to prevent the child from exiting the venue without them, for example, as described above.

In an alternative embodiment of the present invention, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In another alternative embodiment of the present invention, a security bracelet is advantageously utilized, for example, such as the security bracelet disclosed in U.S. application Ser. No. 10/680,207, filed on Oct. 8, 2003, to Abraham I. Reifer, et al., and incorporated herein by reference, in the event of a reported event, security breach, abduction, and the like. In this embodiment, all patrons exiting the stadium must show their ticket and/or identifier so that the venue can check all patrons out of the stadium. Thus, for example, if two kidnappers come in the stadium, and want to use one bracelet for a child, the second kidnapper will be stranded in the stadium. In addition, if one kidnapper buys two tickets, then upon exit with the child and the additional ticket, a barcode/identifier will be exiting without ever having checked in, and then the alarm will go off as well.

In another alternative embodiment, the present invention provides a broadcast message to warn patrons of an event, such as an advertisement, sale and/or even a weather related event such as a hurricane that might require the venue to be evacuated. Advantageously, in at least one embodiment, the broadcast message comprises standard text messaging that optimizes or better utilizes capacity form the communication system. Thus, when using text messaging capabilities, the present invention efficiently transmits text messages to numerous subscribers regarding, for example, exit information, contacting and/or meeting additional parties that have been separated, and the like.

In an alternative embodiment of the present invention, the present invention optionally provides the capability to penetrate into secondary market with season ticket holders selling ahead of time the games they will not be attending. For example, the present invention optionally provides the feature for the season ticket holder and/or general ticket purchaser the ability to view in advance of the season and/or game the schedule, and to alert the venue and/or stadium of games and/or events they will not be attending, thereby permitting the stadium/venue to attempt to resell the tickets to other patrons. For example, in one embodiment of the invention, the patron is provided with a monthly schedule listing the events that may be attended. The patron, such as a season ticket holder, may then click or place an indicator on all games they will not be attending for the season in advance, thereby providing the stadium with the ability to resell tickets well in advance of the event. Once the patron completes identifying games that will not be attended, the system then compiles a list and transmits the list to the patron for an optional confirmation. This list is then used by the system to release seats well in advance of the game. In an alternative embodiment of the invention, registered users of the system for, for example, upgrades, may also be notified of seat availability for sales prior to the game/event. In an alternative of this embodiment, registered users may receive text messages, emails, and the like, notifying them advantageously of the availability of seats that heretofore have never been easily available to the public for sale, thereby allowing the venue to participate in secondary market ticket sales.

In one alternative embodiment of the present invention, the system/process of the present invention provides or operates as a middle person/broker between the ticket holder that is returning tickets to the venue, such as the season ticket holder, and a ticket sales system and/or company, such as tiickets.com, by notifying the tickets company of the newly available seats via notification by the ticket holder, such as the season ticket holder of season ticket games not being attended.

In one alternative embodiment of the invention, the system and/or process transmits text messages, emails and the like, to offer tickets and/or seats and/or admittance to subscribers for events and/or games with empty seats even before game. Thus, the present invention allows the venue to participate in the secondary ticket sales market and the upgrade market, thereby increasing revenue and fan loyalty.

Of course, all of the embodiments of the present invention may be used for any reserved seating event, and/or venue that require tickets for entry thereof.

In another alternative embodiment of the present invention, the use of machine readable identifiers provides advantages for, for example, the upgrade program or ticket exchange of the present invention. For example, when the upgrade, reallocation and/or electronic ticket is issued, the machine readable identifier, for example, the bar code, on the original ticket is invalidated, thereby preventing use of the invalidated ticket. Accordingly, when a new ticket holder purchases the ticket form the season ticket holder, the new purchaser will be issued a new machine readable identifier, and optionally a new paper ticket. The present invention advantageously is able to handle the issuance of a new ticket and invalidates the old ticket and optionally the old identifier that has, for example, been returned by the season ticket holder, thereby providing dynamic ticketing capability.

In an alternative embodiment of the present invention, the new patron obtains a new identifier such as a barcode, the old bar code of, for example, the season ticket holder is invalidated. In one embodiment of the invention, season ticket holders are offered to opt in the upgrade process. Various commercial incentives are possible for the season ticket holder to opt in the upgrade process, such as monetary compensation when their ticket is used for an upgrade and/or resold whether they express their intention not to go to the game prior to the game, and the like. Alternatively, season ticket holders may be offered that the cost of their season tickets will, for example, remain the same as the previous year or be reduced if they participate in the program. Therefore, the combination season ticket trade-in and upgrade program in one embodiment of the invention will be beneficial to season ticket holders by allowing them to trade when they already know that they have no intention of attending a game, and allow the season ticket holder to recoup some cost of the season tickets if they do not attend and their ticket is used as an upgrade. In addition, additional patrons of the event and/or sports team are permitted to attend the game in locations/seats that they might never have been able to obtain access to. Further, the venue/stadium/team maximize revenues by being able to place tickets on the secondary market when the ticket holder notifies the venue early enough that they are not attending the event, the venue also obtains additional revenue from upgrades when tickets are upgraded, and the venue obtains additional fan loyalty.

In another embodiment of the present invention, the system provides the ability to advertise via email, text messaging, and the like, for one wireless carrier on the wireless device that is using another wireless carrier. Since the user of the wireless device has requested the service, the user appropriately receives the communication from the ticketing system of the present invention, and therefore, also appropriately received the advertisement from the wireless carrier that is different than the wireless carrier that the user of the wireless may be using at that time.

In another alternative embodiment of the present invention, offers to purchase seats either during the game or even well in advance of the game are "pushed" or transmitted out to registered users that have supplied their wireless and/or Internet addresses. For example, patrons can register in advance for the upgrade and/or regular ticket offers to purchase admittance via various methods including the Internet. When seats band/or admittance becomes available, a broadcast message or other standard messages may be transmitted to the registered patrons to notify them of the seat availability. Thus, seat offers are "pushed" to registered users that have requested this service advantageously to a wireless device and/or other address including standard telephone communication, as well as additional optional advertisements. The system, in one alternative embodiment, provides the user the option when registering to accept certain types of advertisements to be received on their wireless device via email and/or text messaging. In other embodiments, the user does not have the option of which advertisements to receive.

Advantageously, in accordance with one alternative embodiment of the present invention, if a patron decides to attend an event such as a sporting event when the patron does not have time to wait to receive paper tickets (e.g., the patron is visiting in another city/location and does not have time to wait to receive tickets via mail and is on the go), the system of the present invention transmits a ticket to the patron via, for example, a wireless communication system and/or other standard electronic communication system such as the Internet, and the patron can present their ticket, for example, on their wireless device and show up to game.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Patrons then text message and/or email and/or answer questions via voice-to-text messaging their answers. The system can then display the overall number of answers that are correct and incorrect, display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game.

The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another alternative embodiment of the present invention, the system uses a seat database to determine which of the reserved seats are currently in use. The system may integrate with the seat database system of a venue and/or stadium or optionally be used in parallel with the seat venue/stadium database. For example, prior to the event, the system may utilize the seat database of the venue to determine available seating and patrons that do not show up after a predetermined period of time. Alternatively, the present invention can operate using a separate database from the event/venue by copying or building a separate database used for the ticketing and/or upgrading according to the present invention. In this alternative, as patrons enter the venue, they are checked in directly to this separate database. At the time of the event, the system will be able to check-in patrons using either the identification system, e.g., bar code scanner, of the event or venue, or provide a separate identification system.

In alternative embodiments of the invention, the patron that knows they are attending the game but is going to be late can send in a HOLD message even prior to being provided a warning message that their seats are to be released if the patron does not respond to the message with the HOLD request. That is, in this embodiment, since the patron already knows well in advance that they are attending the game, but perhaps stuck in traffic, the patron can initiate the HOLD message before even being warned in advance of the possibility of their seat being released.

In another alternative embodiment, patrons that have registered with the system and optionally checked into the stadium and/or venue in advance and who also know that they would like an upgrade and/or ticket, may initiate their own upgrade request to the system to notify the system of their willingness to purchase an upgrade and/or new ticket for the event/venue. The system may then place these patrons on a higher priority since they have already expressed and intent and/or willingness to purchase the upgrade or ticket. The patron may notify the event and/or stadium of their willingness optionally well in advance of the game or near/after game time at a time which the patron commits or expresses an additional heightened desire to upgrade and/or purchase a ticket.

In alternative embodiments, the system includes the advantage of allowing patrons to register free for a predetermined period of time, for example, for the first year, without paying a yearly subscriber fee. Alternatively and/or in addition thereto, the system provides the patron with their first upgrade for free or for a reduced rate to further encourage the patron to register with the system and method of the present invention. Alternatively and/or in addition thereto, the system of the present invention offers the patron reduced and/or free concessions when purchasing a membership, ticket and/or upgrade to further encourage the patron to participate in the offers of the present invention.

In alternative embodiments of the present invention, the matching system and/or process, permits participants in the program to initiate a message to the system with the seat location and/or name of the patron that they would like to be matched with for a meeting, networking and/or socializing such as a date. In this embodiment, the system may the push the message to the other subscriber and assign new seats to the individuals that are to be matched. Alternatively, the system Need not require a specific confirmation that the second individual to be notified of the potential match is physically located near the first individual, but can rely on the first individual to provide that information. For example, the first individual may see a potential date in a restaurant, and may then send a message to the system with that person's name or address, that they would like to meet that other individual. In that situation, the second individual will receive a message of the possible match, and can respond and accept or reject the offer to meet. The second individual can then provide a meeting destination or the system can suggest a meeting place based on the first individual advising the system of their location, and the location of the second individual.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Advantageously, the multiple choice questions each have unique selections, such as a1, b1, c1 and d1 for question #1; a2, b2, c2, and d2 for question #2; a3, b3, c3 and d3 for question #3, and the like. In this embodiment, the actual timing of questions is not necessary since each question and answer is unique. Therefore, the speed of responding to the question is immaterial to the winner of the contest and/or correct answer. Also, in the event one patron answers the question late, there will be no confusion which question the patron is submitting an answer for. Patrons text message and/or email and/or answer questions via voice-to-text messaging their answers as indicated above using the unique set of answers, in one embodiment. In alternative embodiments, the first predetermined number of patrons that answer the question correctly are considered the winners.

The system can then display the overall number of answers that are correct and incorrect, e.g., a1 50%, b1 28%, c1 12% and d1 10%, and display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another embodiment of the invention in connection with the seating upgrade and/or assignment system, an identifier and/or machine identifier such as a bar code, RFID, etc. optionally remains static for the user on the user's ticket and/or device that is provided for optional paperless ticketing. For example, the identifier will remain the same associated with the user, but the seat assignment, privileges, user characteristics, user preferences, and the like, may be dynamically changes. The system and method of the present invention will be updated so that the identifier can represent a dynamic seat assignment or other dynamic information, such as general admission to an associated event, or other event and/or venue, including, for example, a restaurant, bar, and the like.

In another embodiment of the present invention, the upgrades process and/or feature may be provided to users/patrons as a complimentary reward for fan loyalty, to reward the user but also market other goods/services and/or other advertising opportunities to be transmitted via the wireless device and/or mobile phone. In one embodiment of the invention, the system and/or method initially queries the user, for example, at the beginning of the trivia contest and/or tournament or at the beginning of the game, whether the user is present in the stadium or not. The system can then perform, for example, the trivia contest, and determine a winner(s) to award for example some form of reward. Furthermore, in another embodiment of the invention, based on the number of people responding that they are present at the game, the present invention advantageously provides a random upgrade to a predetermined number of patrons as an additional fan loyalty program and/or advertising sponsorship to one or more entities that sponsor the free upgrades.

In another embodiment of the invention, a system and/or method is provided that advantageously builds and/or acquires and/or collects mobile contact addresses of users in an efficient manner. For example, in accordance with the present invention, a user advantageously need only provide the communication network and telephone number, and the present invention builds a data address therefrom. This allows the mobile or wireless device user to still register for a service without specifically knowing their data address for, for example, data communication such as SMS messaging, text messaging, email, and the like. In one embodiment, the mobile user is provided a drop down menu where the user selects the communication network and provides their mobile phone number.

The present invention is particularly advantageous currently with the recent enactment by the Federal Communications Commission (FCC) number portability where mobile phone users are able to transfer their existing numbers to other networks. Accordingly, we have determined that a user's number will advantageously provide a mode of contact for the user even when the user decides to change communication networks.

In one embodiment of the invention, the software processes and system determines and builds the actual messaging address (email, text, SMS, and the like) to send messages to the mobile device by the user only selecting and/or providing the communications network and the telephone number. Thus, the present invention advantageously simplifies the process for mobile or wireless device users to register and/or provide contact information, and therefore, beneficially increases the number of individuals that can effectively and easily register for a communication service.

In another embodiment, the present invention facilitates the ability for potential users to signup for the service of receiving, for example, trivia, upgrades and/or text messages via a user sign up device or apparatus. In one embodiment, the user sign up sheet includes numbers and/or circles that can be filled in like a grid, where the user can fill in or cover the numbers that identify their portable number. In addition, the user can check off the specific network carrier from a list of network carriers, or simply enter their specific network carrier. The user sign up sheet may be done electronically via a computer and user interface as described above, or may initially be filled out by a user via, for example, a piece of paper and then later entered into the computer system of the present invention.

In another embodiment of the invention, the system and method of the present invention is capable of re-locating a patron via the mobile address that was previously provided, even if the patron has changed wireless carriers. For example, in one embodiment, with the recent feature of mobile phone portability by the FCC, we have determined that a significant number of mobile phone users are likely never to change their number/address, and therefore, the system and method of the present invention is able to send text messages and/or email to all network addresses using the telephone number of the user if the system suspects that the previously provided network by the user is no longer being used. In this embodiment, the user can optionally respond to the message and/or network broadcast message, confirming that one of the messages has been received.

In another embodiment of the message, whenever a user wants to contact a mobile phone, mobile wireless device or even computer based, via for example, an Internet based account, wants to contact another mobile wireless device user, the present invention provides a transmission device, for example, via the Internet or individual models/mobile phones used for each of the networks to broadcast the message on all networks. Advantageously, in accordance with this embodiment, since the user is likely to maintain the same telephone number, their data or text messaging address will be their telephone number and one of the few network addresses. This type of broadcast message can happen anytime, and even for voice communication when the user of the wireless device needs to receive a data, text and/or voice message.

In another alternative embodiment of the invention, as described previously, the invention may be used by a patron to obtain specific data or information regarding sports or venue related information of interest. For example, patrons may communicate with the system and forward a player jersey number or number of racecar during an event such as a baseball game, football game, racing event such as Nascar, to obtain additional information including current statistics and past statistics. The present invention can then optionally sent statistics throughout the game or event to the patron without the patron requesting, for example, at specific time intervals or after notable achievements during the event, such as a home run, touch down, $7^{th}$ inning stretch, half time, number of laps traveled, and the like.

Thus, the present invention includes many variations in the type of information a user may receive, whether specifically checked into a venue or registered for the service for a particular event. In addition, the present invention includes various processes and systems for ensuring delivery of messages to patrons that have requested the service or merely sending messages that a patron may be interested in receiving.

In another embodiment of the invention, the matching and/or networking system includes the ability to contact and/or notify the users to coordinate the meeting using any one of a plurality of communication methods including text messaging, email and/or instant messaging, with the additional advantage of transmitting pictures, video and/or other data that provides additional information regarding the other person that has been suggested for the match and/or network. In one implementation of this embodiment, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. For example, different message transmit and/or receive formats may be used depending on the system. The present invention beneficially parses the various different formats to obtain the necessary information for the communications described herein. In addition, the represent invention formats the messages for the different wireless devices so that the messages may be appropriately received even though different devices and/or communication networks have different messaging formats. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In accordance with another embodiment of the invention, the matching and/or networking system includes the option of permitting a subscriber to notify the system when they are ready for a potential meeting and/or match. Once the matching and/or networking system is notified of the subscriber requesting the match, the system is then capable of either tracking the user though a positioning system such as GPS, permitting the user to register at predetermined locations upon user initiation such as via Bluetooth, RFID, infrared, and the like. In accordance with this embodiment, the subscribers are not being constantly tracked, and therefore, maintain an additional level of privacy. In alternative embodiment, the present invention continuously tracks the subscribers without specifically requesting to be matched. In this alternative embodiment, the subscriber is provided with less privacy because they may be notified of a specific match even though they might not be interested in the match and/or meeting at that time.

In an alternative embodiment, the present invention provides subscribers with the ability to accept/reject the match before each of the subscribers receive personal information of the other and/or before the date/match has been arranged with at minimum a meeting location. In this embodiment, the invention requires that both users accept the match and/or date prior to notifying the subscribers of the contact information for each subscriber. Therefore, subscribers can optionally request additional information from the system of the present invention, even multiple times, to better understand the potential date and/or match before accepting, and importantly, before the other subscriber is provided contact information and/or a meeting location of the subscriber. In the embodiment where the present invention merely provides the meeting location, the present invention advantageously does not provide the subscribers contact information and/or other personal information before the match/date. Advantageously, in accordance with this embodiment of the invention, subscribers never receive personalized or personal contact information unless the subscribers, after meeting in person, agree to exchange such information.

In another embodiment of the invention, the dating and/or networking system provides subscribers the functionality to email, instant message and/or text message at least one additional piece of personal information and/or questions, optionally directly to each other or via the system anonymously, to obtain additional information that may be more relevant than the user profile or information from the user profile that was used to make the initial date/match.

In another embodiment of the dating and/or matching system of the present invention, the system optionally provides automatic and/or user initiated registration in a particular establishment and/or geographic location, which can be used instead of a location determination system such as GPS, or together with such system. This form of registration may be even more precise than GPS because it confirms a subscriber's presence within a specific store, establishment, entertainment establishment, restaurant, and the like. Thus, in these embodiments, the subscriber either initiates the registration as described above, or alternatively, if the subscriber optionally sets the wireless device to automatic registration based on the appearance at a predetermined registration area and/or location, the subscriber will be automatically registered to receive communications regarding a potential match/date.

In an alternative embodiment of the present invention, once the dating and/or matching system determines that a potential match/date has been detected, the system optionally notifies the different subscribers and asks whether they want to continue to participate in the matching/dating program. When both, some and/or all subscribers agree to participate, the present invention can forward to each subscriber automatically the information that each subscriber shares substantially in common and/or the information that was responsible for the match/date between the subscribers. In this embodiment of the invention, the subscribers will know immediately the information that should be most relevant in making the match/date and can determine whether to actually agree to either contact or send the other subscriber additional information and/or arrange to meet the subscriber at a pre-designated location.

In an alternative embodiment of the present invention, the present invention optionally includes the ability to recommend a potential meeting place for the subscribers to meet after determining that the subscribers have agreed to participate in the date/meeting. In this embodiment, the present invention advantageously determines the location based on, for example, subscriber preferences, geographic location that is preferential for at least one of the subscribers and/or both subscribers, predetermined location where, for example, a sponsor will receive patronage and/or provide a discount for the subscribers and/or actual pay the organizer of the dating/matching system an advertising fee to promote their sponsorship. Accordingly, the present invention advantageously determines not only a potential match/date, but advantageously suggests, recommends and/or determines a specific location and/or geographic location and/or restaurant, clothing store, zoo, museum, and/or other suitable location for the subscribers to meet and optionally based on geographic distance and/or location.

Additional dating and/or matching features and/or differentiators of the networking and/or dating system of the present invention include one or more of the following:

Wireless messaging platform supports interactive messaging

Wireless messaging platform provides simultaneous parallel applications to run without collision Multiple wireless initiatives or topics run without conflict Different initiatives or topics may be user specific or selectable While each initiative runs independently, there can be overlap in terms of customer base Platform is flexible to add/remove initiatives quickly and efficiently One wireless carrier/network can be a dating/matching sponsor and advertise on the wireless device and/or network of another wireless carrier/network Contact members to notify of the match/date to allow members to either directly contact each other or send additional information via, for example, text messaging, email, instant messaging, such as pictures, video, and the like Contact members or wait for request from members to participate in match/date initiative; can then automatically track member via GPS instead of constantly tracking member all the time, thereby increasing privacy of member Contact each subscriber that is being offered the date/match and obtain approval for the match prior to actually notifying potential members that match has been made Contact users after initial match has been conditionally approved, and provides users the capability to request additional information, such as personal information from the other member or other members which the requester still wants to know before finally accepting the date/match Members can register or "check-in" at predetermined locations and/or establishments which is one additional level of specificity, for example, with regard to the location where a member is that may be interested in matching; For example, two or more members may actually be in the same restaurant where they can be informed of one or more other subscribers being present; members can register via sending a message to the system via text message, email, RFID, Bluetooth, and the like, either by initiating a registration or automatically Contact members after initial match has been conditionally approved and exchange, optionally automatically, profile information that was significant in making the match/date and/or other important information regarding a match/date that a member may want to know before finally accepting the match/date and/or information the members may want to know that is geared particularly for a first date, e.g., likes/dislikes, common interests, favorite foods, wines, alcoholic beverages, and the like Contact members to suggest and/or recommend and/or arrange meeting place based on, for example, geographic location, common interests/sports, common food tastes, common beverage tastes, common entertainment preferences and/or sponsors willing to, or interested in, being utilized for the match/date for the suggestion and/or recommendation, and optionally providing the members a discount and/or compensating by the sponsor to the networking and/or dating system proprietor for the advertising and/or recommendation to visit that sponsor Wireless messaging platform includes a protocol conversion server functioning to interface with a variety of wireless networks having different messaging characteristics for both transmitting and receiving messages, and parsing the different message formats for the content from a received message, and transmitting a message to a plurality of different networks and/or devices having different messaging and/or interface capabilities and/or functionality Contact members with a wireless consent form indicating that the matching/dating system and/or the members participating in the match/date have generally consented to potential cohabitation optionally without any recourse to the other party. Alternatively, the members may be contacted with other types of informed consent forms with limited recourse for acts and/or aggressive acts that are clearly assaults, but not sexual related misconduct or sexual related crimes that are felonious in nature carrying a high penalty/sentence. Alternatively, members may be presented with consent forms that eliminate any criminal penalty, but do not foreclose the possibility of civil lawsuits for damages relating to torts, and the like As another alternative and/or in addition thereto, members may be presented with consent forms that eliminate any civil penalty, but do not foreclose the possibility of criminal lawsuits for criminal type activities, perhaps with the exception of the most severe sexual crimes such as rape and/or sexual assault that carry significant prison time.

For example, athletes, celebrities, high worth individuals, or even average individuals, male or female, may be interested in the wireless consent initiative because that allows them more flexibility to meet a variety of individuals without the worry of later being sued. In additional alternative embodiments, broadcast messages may be transmitted to numerous individual that may be interested in meeting and/or dating a celebrity or predetermined individual or individuals. In this embodiment, the optimum matching individual or individuals may be selected to meet with the celebrity, celebrities, and the like, while utilizing the informed consent feature of the present invention. In another alternative embodiment, an individual or individuals may be randomly selected as part of a match or date, based on a lottery or other competition to meet or date a specific individual or individuals.

Additional optional hardware and software requirements are as follows for one or more embodiments of the present invention:

System Capabilities

Platform supports interactive messaging

Platform provides simultaneous parallel applications to run without collision

Multiple wireless initiatives or topics run without conflict

Different initiatives or topics may be user specific or selectable

While each initiative runs independently, there can be overlap in terms of customer base Platform is flexible to add/remove initiatives quickly and efficiently Wireless Initiatives Interactive trivia with fans inside and outside of the stadium Targeted messaging, e.g., targeted advertising Broadcast messaging, e.g., general advertising Interactive messaging, e.g., with concessions Profiling for each initiative or topic, e.g., based on network operator Urgent and emergency messaging Specific initiative: discounts for concessions and/or memorabilia Specific initiative: invite patrons to different activities before, during or after game, e.g., player loyalty, family activities, etc.

Specific initiative: seating upgrade program

Specific initiative: messaging patrons in one section and separate messaging to patrons in another section Specific initiative: messaging parent of a missing child Special initiative: dating where patrons can keep their seats to return to them, or their seats are re-allocated. In alternative embodiments, the patrons switch seats instead of moving to empty seats, either for the entire game or only a portion thereof with other patrons for match making possibilities.

Functional Specifications

Front end for user signup and profiling-secure site—for example, modeled after www.mlb.com, include one or more of:

type of seats does the customer want for upgrade (decks and range of sections)

information for dating concession profile capability for additional profile information validate user by sending message to device upon sign up auto append of network information to phone number during signup login and password protected site frames on website or interface that can be easily configured to have look and feel, for example, of particular baseball team capability for space on screen for advertising opportunity that can easily be modified and relatively dynamic capability to handle lost passwords web page or interface where customers with season tickets can mark a calendar with the seats they want to keep and the ones they are interested in freeing up for early sale or upgrade.

The optional Front End of the present invention used for administration and setting up parameter for each application, optionally includes a secure site, with one or more of the following:

application email address and password minutes for all the configuration parameters and/or functionality number of threads for each application for upgrades, at least one of releasing customers old seat immediately, or it until the customer approves of the release, or holding the customer's seat for a predetermined portion or all of the game, for example, in the dating functionality)

set schedule for games section rating setup, and seat upgrade pricing revenue allocation model provide a number of retries if message send failure Concessions The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration.

Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

Concession Wireless Initiative

Purchased via cell phone

Web registration for preferences

Targeted concession offers

Confirmation that purchase is ready

Delivered to seat or ready for expedited pickup

Customer convenience: system identifies closest concessions to customer

Customer convenience: system determines concessions with short wait

Each concession labeled with a number for customer identification and fulfillment Customers can request menu, or register for each game to receive menu around game time via mobile device GPS can be used effectively to inform customer of closest concession stand to pickup order, and/or customer can provide section number and/or seat location for system to identify most convenient concession stand Most convenient concession stand can be determined based on one or more, or combination of, predetermined criteria, such as, closest concession location, shortest wait in line, specific item being ordered, and the like.

Interactive messaging, e.g., with concessions

Specific initiative: discounts for concessions and/or memorabilia

The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

In one alternative embodiment, the following message exchanges may be used:

First Message

"In Game" Concessions

Menu will be sent soon!

Reply with #, item short form and seating section

Ex: BE=beer

Reply 3BE for 3 beers

408SEC for section 408

Powered by NEXTEL

Second Message (paper menu?)

Menu

BE=Beer; CO=Coke; DCO=Diet Coke

HD=Hot Dog; BUR=Burger

TA=Taco/Salsa; PO=Popcorn

FF=French Fries; CH=Chips

PZ=Pretzel; PT=Peanut

LEM=Lemon Ice

Third Message

Order received!

Summary:

3 HD @ $3=$9

2 CO @ $3=$6

2 LEM @ $3.50=$7

Total=$22

Reply Y to ACCEPT

Credit Card charged

N to CANCEL

Fourth Message

Thank you for ordering!

Your order has been confirmed!

Confirm # REIF1001

Powered by: THE SPORTS AUTHORITY!

Fifth Message

ORDER READY

Bring Confirm # REIF1001 to Concession #33 by sect # 212

$2 off NIKE baseball gloves

Bring #NIKE305 and game ticket to

Any SPORTS AUTHORITY!

In another embodiment of the invention used in concessions initiative, the concession attendant receives the confirmation number or other identifying information from the customer when picking up the concessions. The concessions attendant enters the confirmation number or other identifying information when ready or optionally clicks on the order on the computer screen via a concessions interface associated therewith. From there, the order is then cleared from the system with respect to orders that require fulfillment, advantageously allowing the workers to streamline their work activities in the concessions. In an alternative embodiment, the concessions are actually delivered to the customer using the sutomer provided seating information, either provided by the customer through, for example, the wireless device or other registration and/or notification process, or even via a telephone call or automated attendant to associate with the order.

In another embodiment of the invention, the concessions menu is advantageously only delivered to customers that have entered the stadium via a location determination system, and/or checked into the stadium via a ticket reader/scanner. In alternative embodiments, all customers that have registered for the concessions service will receive an introductory message. Thus, customers that are not attending the game need only reply with a request to terminate the concessions service for that event and/or game.

In an alternative embodiment, the customer is advantageously directed to closest concessions via, for example, GPS chip in phone or by knowing where the customer sits at check in, or by having the customer input their seat location or location where they would like to pickup the concessions.

In another embodiment of the invention, we have determined that some mobile phones will utilize different transmit and receive addresses, and therefore, a user may not know how to appropriately register to be a subscriber for one or more wireless initiatives. For example, we have determined that some mobile phone networks utilize slightly different or different electronic addresses for the transmitting and receiving of electronic messages. For example, for the Research In Motion (RIM) Blackberry communication service, the mobile device is assigned a desktop email address. In one configuration of Blackberry, the mobile device only has one address. However, in the non-integrated configuration, the mobile device actually has a separate address when transmitting from the receive address.

In accordance with this embodiment of the invention, the user registers by providing their mobile phone number and optionally a network carrier for same. In this embodiment, the mobile phone user registers with their phone number and optionally wireless network provider. The registration system of the present invention then sends a message to the mobile device, requesting that the mobile device respond, optionally with a predetermined code and/or predetermined message. The mobile device then responds to the registration system, and the registration system corresponds the mobile device response with the original registered mobile address, thereby completing the registration process by ensuring that responses received from the mobile device can be mapped appropriately to the mobile subscriber. In the embodiment where the mobile user is requested to provide a predetermined code and/or message, the registration system uses the predetermined code to map the mobile phone response potentially having a different address with the transmit address provided by the user.

Dating, Matchmaking and/or Networking

In another embodiment of the invention, patrons are provided the opportunity to meet others in the venue or at a predesignated location near or away from the venue using standard matching rules. In one embodiment, the presence of the user is detected when entering the stadium, for example, via the ticket entrance systems. In another embodiment, the presence of the patron is detected or determined based on a message that is send to the user, for example, either right before, during or after the game. In this embodiment, the user can be prompted with a request whether they would like to participate in the matchmaking, dating and/or networking program.

For example, potential business or social partners may be selected or prompted for networking or dating. When the user responds yes, in this embodiment, their current seat is irrelevant if that seat is not to be released for another patron. Therefore, the system need only select a new set of seats for the networking and/or dating for the patrons, transmit the patrons the additional new seats via, for example, a wireless ticket, update the venue seating database for subsequent verification by the ushers when seating the patrons. The patrons may then proceed to the new location and have a meeting or date, and then return to their original seats if desired.

In another embodiment, a "burnt bridge" approach or feature is provided where the original seats for the patrons that are meeting are then released for other upgrade and/or networking programs. In this embodiment, the original seat of the patron must be known for example, via check-in procedure, registration for the program in advance for example over the web registration process or other registration process, or via the patron responding to the system with their wireless device of their current seat location. Alternate combinations or modifications of the above embodiments is also used.

Trivia

In the alternative embodiment of providing the user trivia information, based on registration and/or location, for example, while attending the game, watching the game at home, or any time prior to or after the game, the user may be provided with questions, as described above, to answer as part of a tournament and/or to be eligible for prizes, awards, and the like. In one embodiment, a section or portion of the users are targeted for the questions together, while other sections and/or portions of the users are targeted at a time period thereafter, for example, 1 minute later, to stagger the communication and transmission of data, thereby reducing congestion and/or unnecessary hardware to accomplish the transmission and acceptance of information to/from the patron.

In one embodiment, while all the questions are staggered over a predetermined period of time to the patrons, whether limited to patrons in the stadium, out of the stadium and/or both, the patrons are not notified whether their answer is correct until after all questions have been transmitted, and all patrons are provided the opportunity and/or sufficient time to respond. Once that predetermined time period has elapsed, the patrons will be notified whether their answer was correct, and whether they are still in the tournament. In optional embodiments, a predetermined time period will again elapse until new questions are sent and the tournament continues.

Optional Oracle or My SQL Database

In one embodiment of the invention, an Oracle or My SQL Database is used in connection with the present invention. In one embodiment, the result set is set to be proportionally with respect to the number of users and/or data that will be stored in the system. In another embodiment, the database is optionally partitioned for specific games and/or initiatives or groups of games and/or initiatives. The system is preferably thread safe when running the games and/or initiatives. The system is optionally integrated with Credit Card for payment, and/or integrated with the venue ticket system and/or point of sale system to optionally determine who came in and when into the venue. In another embodiment, the present invention maintains and updates financial balances for users, such as patrons and stadiums. In alternative embodiments, secure interaction with ushers and an interactive kiosk is provided.

The present invention optionally provides any standard algorithm for partitioning of group of seats and users, for example, for system resource allocation, load balancing and/or division of system functionality. In alternative embodiments, a local kiosk for the stadium and/or venue is provided where the user can enter information, such as register for one or more initiatives and/or programs. In alternative embodiments, the system of the present invention includes the capability of offering for sale seats which are not currently sold via messaging to wireless devices, such as text messaging to mobile phones, or other messaging and/or wireless communication to wireless devices, and consideration. In alternative embodiments of the invention, standard algorithms such as used in the airline industry may be used to overbook seats for the venue, and consideration.

In alternative embodiment of the invention, instant messaging or any type of communication method can be used in the present invention, include local and/or global networks, such as the Internet, LANs, WANs, WAP, 811.02a, 802.11b, 802.11g networks, and the like.

Messaging Software Requirements

Trivia and/or other messaging products/initiatives are Java applications that run in a J2EE application server and utilize a JDBC 2.0 compliant relational database. There are typically open source options available for system support. Currently for development and test environments we utilize are desktop environments running Windows 2000 with the open source options below. The draw back is that open source options typically don't provide formal system support approaches, although we have found the software to be very reliable and would recommend this approach for early stage pilots. Should the customer prefer purchase software options for these components are provided as well.

I. Server Software Specifications

Alternative A—Open Source Approach (1) Web/Application Server—Tomcat 4.1.18

(2) Database—MySQL 4.0

(3) Windows 2000 Server for each server

Alternative B—Purchased Product Approach (1) Application Server—Websphere Application Server 5.0

(2) Database—Oracle 9i DBMS (3) Windows 2000 Server for each server

II. Server Hardware Specifications (4) Each of the HW Servers specification:
- (i) 2xCPU—P4 2.4 GHz Xeon
- (ii) 2 GB RAM
- (iii) Monitor
- (iv) CD ROM
- (v) Floppy Drive
- (vi) Hard Drive depending on volume (see below)

III. Communication Specifications (5) POP3 Account and SMTP server accounts that can support number of active subscribers (6) Dedicated T1 access to POP3 and SMTP provider IV. Hardware and Software Sizing Configurations Phase 1:

1K-10K subscribers and players during the game

Two Servers

Server 1—runs Web/Application Server for the website and the Trivia Application

Server 2—runs the Database server (20 Gig)

Phase 2:

10K-25K subscribers and players during the game

Server 1—runs Application Server for the Website front end

Servers 2 and 3 (2 Servers)—run the Application Server for Trivia Application (two servers are used handle load balancing)

Server 4—runs the Database server (50 gig) (Level 1 RAID 2×50G Array)

(Server 5—used as a backup to server 4—depending upon Reliability requirements)

Phase 3:

25K-50K subscribers and players during the game

Server 1—runs Application Server to run the Website front end

Servers 2, 3, 4 and 5—run the Application Server for Trivia Application (four servers are used to handle load balancing with hardware and software clustering)

Server 6—Database Server—150 gig (Level 0+1 RAID 6*50G Array)

(Server 7—used as a backup to server 6—depending upon reliability requirements).

In one alternative embodiment, as part of the sign up for trivia the system optionally asks the general admission or season ticket holders to input their seats to simplify how the system obtains information where the patron is being seated when they come to the game. In an alternative embodiment, the system obtains this information from the stadium database system, kiosk where the patron can enter the information at the stadium and/or via the point of sales system by the service personnel or attendant that is selling the tickets. Using any of the above methods, once the system knows where the patron is/are seating when present at the game, the system can then target sections of the stadium for, for example, the trivia quiz or other service/offering to the patrons.

Examples of different sections that can be separately targeted include for baseball, behind first base line first, behind home plate second, first base line third—all lower deck; same sections for upper deck and bleachers. Other sports may include football, hockey, soccer, basketball, and the like. In accordance with this embodiment, targeting different sections over different periods of time, thereby preventing a long delay to receive answers once the question is transmitted, may minimize collusion among patrons.

Thus, by segmenting the stadium over a few minutes in accordance with one embodiment of the invention, the present invention may increase the window of transmission to, for example, 2 minutes or more for the first round. As the rounds get successively smaller, the present invention will transmit messages faster. The present invention also provides optional winners for different sections of the field. In addition, the section winners can further optionally compete against each other, for example, the first class seating winner can further compete against the bleachers winner, and the like.

As discussed above, one or more of the above alternative embodiments may be incorporated into the embodiments described above, and/or any of the embodiments discussed below. Furthermore, any of the embodiments of the present invention may be used for any reserved seating or other event admittance.

Figure 24:
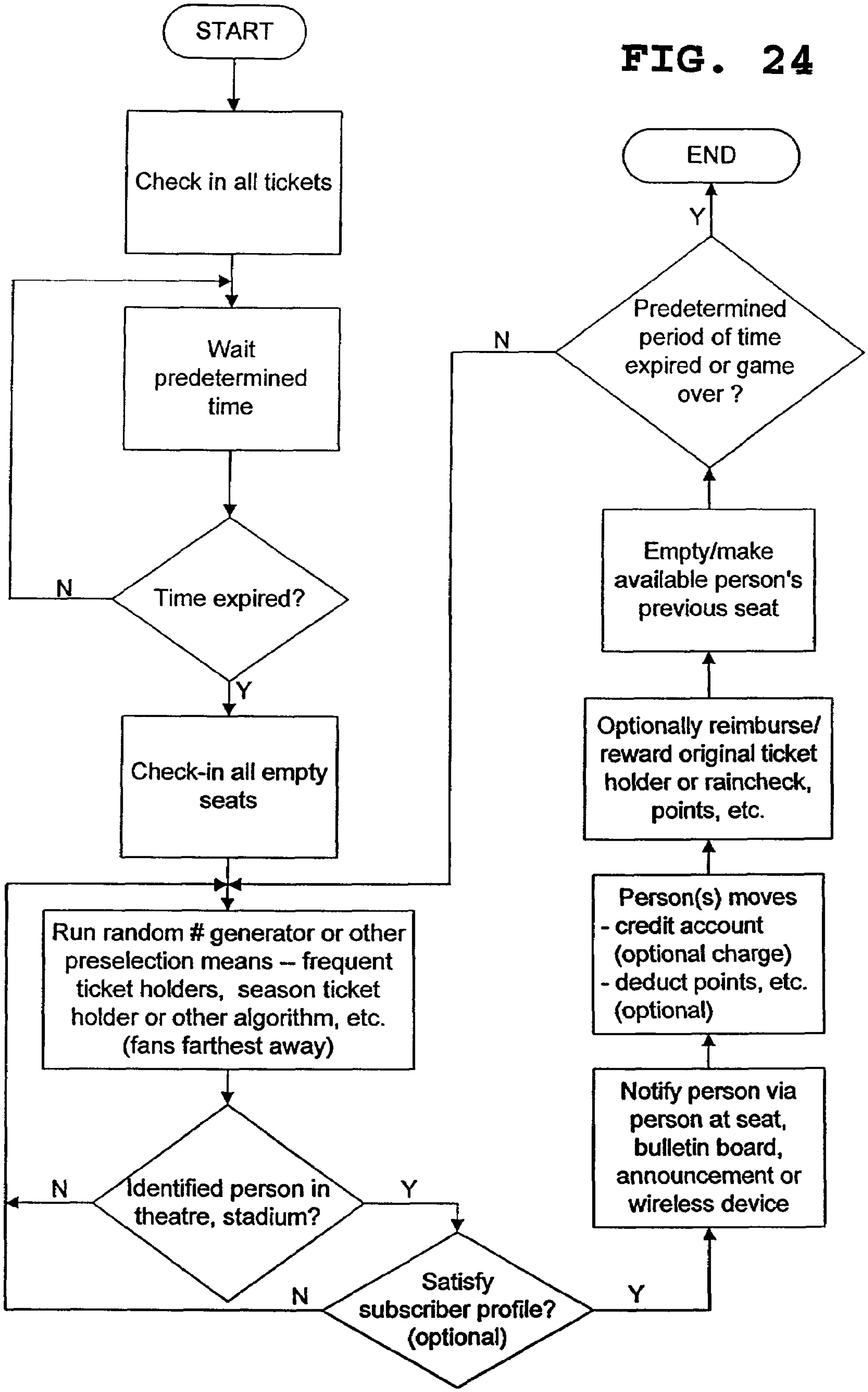
FIGS. 24-37 are flowcharts of various embodiments of the process of the present invention.

FIG. 24 is a flowchart of a second embodiment of the invention. In FIG. 24, the process begins as all tickets are checked in, for example, as the patrons enter the reserved seating area, such as a stadium or theater, through, for example, bar code readers, scanners, infrared readers, and/or manually or other method where the patron is checked in, either at the gate, seat or other location. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seats for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, or other predetermined process.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or more means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

If the patron accepts, payment of money or other means may be effectuated on the spot via the wireless device, credit card, debit card, points, and the like, and the patron may now move to the other seat. In addition, the original ticket holder is optionally reimbursed with award points, a percentage of the revenue, a flat fee, an additional event ticket that might also be upgradable, and/or any other means for rewarding the original ticket holder. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

In accordance with the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that may be in the vicinity of the stadium but were unable to get seats. Since the present invention re-allocates and/or sells tickets very near to game time in accordance with one embodiment, the patron must be in the general vicinity of the stadium to take advantage of this embodiment of the invention.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron to help the patron decide the quality of the upgrade and whether to accept.

In one alternative embodiment, if the patron that has their ticket re-allocated in error, e.g., because the patron did not show up to the event based on the predetermined criteria but the patron was still planning on attending because they forgot about their seat being re-allocated, the system can re-allocate seats immediately upon the checking in of the patron and notify them that their seats have changed because they are late. In this situation, the stadium/venue might decide to further upgrade the patrons because of the mistake.

In accordance with one embodiment of the present invention, the process of the present invention specifically reserves seats of the highest or very high rating that are considered preferred, in the event a patron's seat is re-allocated prematurely or erroneously. In this situation, the patron who has had their seat re-allocated because they will likely receive an even better seat as a result of the mistaken (stadium or patron) or premature seat re-allocation.

In another embodiment of the present invention, as patrons are entering the venue or stadium, they are provided advantageously with a map of the stadium so patrons can analyze the potential upgrade to make a decision whether the upgraded seats are sufficiently good or of value to warrant the patron moving and/or paying for the additional upgrade. By handing the patron the map of the stadium, the process of the present invention is not required to transmit a detailed schematic to the patron's wireless device which would not normally be able to effectively permit the patron to evaluate the proposed upgrade seats. The map that is handed out may optionally include information for patrons on where to register for the upgrade and/or additional advertisement opportunities.

In one alternative embodiment, the patron that has purchased the ticket, for example, a season ticket holder, may advise the stadium that for a particular game, set of games or all games, they do not want their seats to be re-allocated, and perhaps, an additional fee is assessed for this type of patron. If the stadium provides the ability for the patron to selectively opt out of the seat re-allocation, the patron can, for example, connect to the system via the Internet, public switched telephone network, cellular network, and the like, and notify the system that they do not want their ticket re-allocated, for example, because they are coming late to the event. Other means of notifying the system and/or other reasons may be utilized in connection with the present invention.

In another alternative embodiment, the system provides patrons the ability to individually select when their tickets may be re-allocated. For example, one patron may prefer to only give up their ticket if they are late to the game by 15 minutes, while another patron may be willing to give up their ticket if they have not arrived 15 minutes before the game. In alternative embodiments, the stadium may provide incentives for the patron to have their ticket re-allocated prior to the game because it increases the stadiums chances of re-allocating/re-selling the ticket.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provide additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In an alternative embodiment, the system determines priority of re-allocation of seats based first upon patrons that have seats that may also be re-allocated. That is, the systems attempts to maximize the number of re-allocations by prioritizing the re-allocation based upon seats that may be re-allocated after already being re-allocated. For example, if front row seats in a stadium are available to be re-allocated, in this alternative embodiment, patrons that are in the next closest section for example on the field level would be upgraded first to those seats. Then, patrons with less preferred seats, for example, in the upper deck would be re-allocated to the seats that have now become available from the patrons that have been upgraded to the front row. Thus, using this alternative priority scheme, the present invention maximizes the re-allocation numbers. Of course, this priority algorithm may be combined with additional factors, for example, relating to subscriber/patron value. As described above, additional factors may be utilized in the algorithm to determine the subscriber or set of subscribers to offer the upgrade.

In alternative embodiments, patrons in the vicinity of the upgraded and re-allocated patrons may optionally rate the upgraded patron, for example, for appropriate behavior, wearing of excessively large hats, drunkenness behavior, and the like. These ratings may then be taken into account in the re-allocation algorithm for future upgrades to the patron.

In alternative embodiments, the patrons eligible for the upgrade may be notified using standard email communications over a wireless device, mobile telephone, and/or other standard communication means. For example, standard textto-voice and/or voice-to-text communications may be used to contact the patron to evaluate whether an upgrade will be accepted and to actually accept the upgrade.

In another embodiment of the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that have already purchased tickets in the vicinity of the stadium but were unable to get seats and/or may be in the vicinity of the stadium but were unable to get seats. Since the present invention re-allocates and/or sells tickets at any time prior to and/or after beginning of game time in accordance with one embodiment, the patron may be in the general vicinity of the stadium to take advantage of this embodiment of the invention or even at any location when being offered upgrades and/or seats well in advance of the game. For example, the present invention can upgrade or sell tickets to patrons well in advance of the game since it advantageously is permitted or has the authority to resell tickets either via ticket holders that do not show up during the game and/or, for example, season ticket holders that have authorized the stadium in advance to resell their tickets based on predetermined criteria, for example, when the season ticket holder notifies the stadium that they will not be present at next weeks game.

In one optional embodiment of the invention, the patron presents the usher with the confirmation number which the usher can enter into a wireless device using a local or private wireless network, or can simply use a walkie talkie or telephone to call the dispatcher to confirm the upgrade and/or new seats using the customer provided confirmation number. The dispatcher will have access to the system to enter the confirmation number to confirm the validity of the upgrade. Alternatively, a patron will retain their old ticket. The patron will give in the old ticket to the usher which is scanned or barcoded by the usher for immediate identification of new seats and used in place of, or in addition to, confirmation number.

Of course, the confirmation may optionally be made via customer name with an appropriate identification card or other information. Further, alternative methods may be used to verify that the confirmation number and/or ticket being used by the patron is valid. For example, the patron may be equipped with a printing device associated with the wireless device or download an actual ticket on line from home prior to the game for the new ticket or upgrade. Alternatively, the patron may be equipped with an identifier card, optionally including a bar code with a unique identifier relating to the patron's account information and profile that can be scanned for additional convenience. Alternatively, a wireless device may be used to securely store this type of identification and/or account information.

In at least one alternative embodiment of the invention, the patron may comprise optionally a corporate account that has a number of tickets, for example, season tickets. In this embodiment, the corporate account may have associated therewith a plurality of email addresses or other communication addresses to transmit the seat or upgrade offer to a number of potential patrons that may rotate their attendance at the games. In accordance with this optional embodiment, multiple emails can be stored for a single user/corporate account, and the system may transmit individual messages to all email addresses, or may only transmit messages to individual patrons for corporate account that individually advise the system that they are associated with a particular ticket/bar code for a particular game and will be/are present at a particular game.

In an alternative embodiment, patrons may enter the stadium and subsequently inform the system that they are present and interested in an upgrade via a kiosk where the patron can scan a bar code and enter their customer number to be eligible for upgrades during the game. The system is then able to transmit a message to the customer, assuming that the customer has pre-registered with the system with the appropriate contact information. Alternatively, or in addition to individual use of a kiosk(s), the customer sales office may have a kiosk or additional functionality to enter the customer name and/or customer account and scan in the bar coded ticket on the spot to register each patron as they enter the stadium or venue.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron upon entry in the stadium to help the patron decide the quality of the upgrade and whether to accept when an offer is received by the patron at a predetermined time. The graphical map may comprise a small booklet with a map of the stadium showing seat locations, and optionally a game schedule.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provides additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In alternative embodiments, patrons in the vicinity of the upgraded and re-allocated patrons may optionally be eligible for a dating or matching service where patrons register and provide profile information to the system and/or through a third service provider dating service. Once the system knows that the patrons will be coming to the game and/or have actually checked in to the stadium, the system can then arrange for the two, four, etc. patrons to meet each other by allocating and/or re-allocating seats to the patrons together. Thus, based on profile information, customer request and availability, the system is able to upgrade or sell tickets to patrons to maximize their chances of meeting someone at the game. This optional feature provides significant potential enjoyment for the patrons participating in this dating or connection program. In accordance with this embodiment, one possible sequence of acceptance steps involves profile matching the two patrons (or groups of patrons) based on predetermined profile information; transmitting a first message to the first patron regarding availability of the second patron and requesting a conditional acceptance form the first patron; transmitting a second message to the second patron indicating that the first patron has conditionally accepted and request the second patron to accept; and when the second patron accepts before the first patron has rescinded the conditional acceptance, finalizing the upgrade and/or seat allocation for the first and second patrons. This embodiment of the invention is a complete reverse from typical dating and/or matchmaking services which attempt to develop detailed algorithms for the matching process because of the significant decision that exists in determining who to spend valuable time with. In accordance with the invention, patrons are already present at the game, and therefore, half or more than half the effort is already done. The remainder is to actually meet the other person which can be accomplished with profile criteria, whether or not the algorithms are very sophisticated.

In one embodiment, the patrons that are being matched have their original seats maintained and not made available for other upgrades in the event the matching does not work out early on. In this embodiment, one or both the patrons can return to their original seat. Hopefully, there will not be a significant argument of who would need to return to their original seat if an upgrade is actually performed. In addition, in accordance with this embodiment, the seats that are selected do not necessarily have to be better seats in the classical sense. That is, seats further away from other ticket holders might be considered preferred when matching two individuals for the first time. Alternatively, couple that would prefer a little more privacy or quieter game might request to be moved to a more isolated area. Alternatively, families with small children might prefer to be moved to a less busy area as well during the game where the children might be able to freely move around. All these scenarios and/or alternatives are possible in view of the present invention. The advantage of performing a match in a public setting is that the patrons do not have to worry about leaving or ending the date, and also do not have to worry that the other person will have their home address.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like.

In addition, this feature also optionally permits the patrons that have participated in the program to rate one another for future dates. For example, one patron can rate the conversational benefits of the second patron, the appearance of the second patron, the overall short term versus long terms relationship goals of the patron, and the like. These ratings may then be taken into account in the algorithm for future seat assignments, re-allocations and/or upgrades in the future for the first and second patrons, and all other patrons will now benefit with the additional profile information of the first and second patrons. The matching service may be for amusement or work related networking purposes, for example, to meet an executive that the patron currently works with or wishes to work with/sell in the future.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like. In addition, the system advantageously and optionally provides the feature of allowing patrons to text message one another directly, and/or exchange pictures via wireless email, text messaging, and other wireless devices that provide the standard capability of exchanging pictures, such a T Mobile and/or Sprint.

In alternative embodiments, the ticket holder can call in via a voice to text message, text message and/or email and let the stadium know early that they are not coming. In this manner the ticket holder obtains the convenience of the stadium or venue reselling their tickets in advance, thereby providing the venue with additional time to maximize the resale of the ticket.

In alternative embodiments, when the patron enters the stadium, they have their ticket barcoded or other device that detects their presence can be used such as infrared, Bluetooth, etc., and then they can become eligible for an upgrade. The patron can register in advance that they want to receive upgrades by providing their name, message address, e.g., email, telephone text message address, etc., and optionally their credit card or other payment mechanism for upgrades that actually cost money as opposed to free upgrades. In alternative embodiments, the patron can register at the ticket booth when purchasing their original ticket. In this scenario, the stadium representative can enter this information on behalf of, and with the permission of, the patron since the patron may already be providing their credit card, debit card, etc. to purchase the original tickets. Alternatively or in addition, a kiosk may be provided where the patron can enter their original ticket, e.g., scan in their original ticket and provide their name and text message information in the stadium to register for a one time upgrade for the game after purchasing, for example, a regular admission ticket.

In alternative embodiments, an usher can verify that the patron should be upgraded by the patron providing the confirmation number that may be transmitted in real-time by the system, and/or by the patron using their original confirmation number or original ticket with barcode or other identification means, such as a smart card, infrared reader, etc. that represents original ticket and presenting same to the user. The usher then needs only to scan in the original ticket and the system will verify whether the patron associated with the original ticket is valid and whether the upgrade is valid.

In alternative embodiments, a warning message may be sent to the ticket holder that has not shown up to game warning them that if they do not respond within a certain time period that their seat will be re-allocated or re-assigned to another patron. Similarly, a release message may be sent to the ticket holder after their seat has actually been released and/or re-allocated, thereby notifying the patron that if they change their mind in attending the game, they will have to obtain an additional ticket. In alternative embodiments, the ticket holder that has their seat released and re-allocated can be themselves re-allocated a similar, worse or better seat, depending on, for example, their subscriber value and/or other criteria. For example, if the patron is provided a better seat, this will encourage them to more readily give up their seats in the future even if they are attending the game. On the other hand, if the patron is provided a worse seat, then this encourages them not to artificially give up or have their seat released when attending the game. Accordingly, the present invention is designed to deal with various behavioral patterns of specific ticket holders, and may optionally and advantageously be a ticket holder specific with respect to various criteria for re-assigning, releasing, selling and/or re-allocating tickets.

In alternative embodiments, the system transmits to the ticket holder a welcome message after being upgraded and after having being moved to a new upgraded seat location. In one embodiment, the system identifies that the patron has been successfully upgraded after the patron provides the usher with a confirmation number or original ticket, which is then verified by the usher and system.

In alternative embodiments, the system, after having identified which patrons have checked into the stadium and/or have been upgraded, transmits a trivia question and/or additional advertisements to all patrons attending the game. In alternative embodiments, the information is transmitted to both patrons that are attending the game and additional patrons that have registered in the past to receive information but that are not attending the game. The participants can, for example, answer trivia questions and respond with their wireless device. Depending on whether the patron is attending the game or not, the system may determine to offer or deal with each of the patrons differently. For example, for patrons at the game, winners may be successively determined and narrowed, as patrons successfully and unsuccessfully answer questions, round after round of questions in a "spelling bee" format. For patrons that are not attending the game, winners may be declared, or statistics provided to the broadcast station that can be aired on television. In yet additional alternative embodiments, instead of transmitting information/questions to the patrons via the wireless device, the information/questions are displayed on the stadium billboard for patrons at the game and/or on television for patrons that are watching the game on television. The patron can then merely respond via the device, e.g., the telephone accordingly via a voice-to-text system or via other mobile devices via text messaging.

In alternative embodiments, the present invention provides the advantage of additional advertising sponsorship to the venue. For example, in one embodiment, the venue is partitioned into different locations that may be assigned to different sponsors. In one embodiment, the sponsor that provides the most value may be assigned a certain number of premium seats that are not available to other sponsors.

For example, the sponsor may offer a discount on the upgrade if you are a Verizon or Verizon Wireless customer or they credit your cell account for each seat upgrade or you get say 30 free minutes, etc. In alternative embodiments, the present invention provides the advantage of one wireless provider to advertise on another wireless providers mobile phone or wireless device. For example, if Verizon Wireless is a sponsor of the upgrade system for a particular stadium, the present invention will still work with, for example, AT&T, SPRINT, and CINGULAR customers. An advertisement message sent with the upgrade offer may read on the AT&T phone, "brought to you by Verizon Wireless." In an alternative embodiment of the present invention, text messaging is optionally used for mobile phones to perform the message communication of the present invention. The user is only required, in one embodiment, to reply or respond with a "Yes" to accept the upgrade offer since the user has advantageously pre-registered with the system, thereby minimizing the required communication/input by the user. In an alternative embodiment, the user, instead of pre-registering with the system, is charged on their wireless or even regular telephone number bill when they accept the upgrade offer. Thus, the wireless system that either administers the user's regular or wireless account or the upgrade sponsor may be responsible for actually billing the customer in this alternative embodiment.

In the alternative embodiment when text messaging is optionally used alone or in combination with other communication methods, the system provides the additional advantage of maximizing bandwidth usage by not requiring use of bandwidth on the wireless voice system, thereby maximizing system resources.

In another alternative embodiment, the present invention optionally and advantageously provides a security and/or safety feature in the event of, for example, a minor event where a parent gets separated from a child, a disaster or other event that might require evacuation of the stadium. In one embodiment, the person needing help provides their name to an attendant that can search the system for the contact information of their companion/parent. The system can thereafter send an email and/or text message to the companion/parent regarding the status of that person and provide instructions for meeting that person or arranging help, authorizing medical procedures, and the like. In another embodiment, the person requiring help, e.g., a child provides the attendant or kiosk with their ticket which can, e.g., scan the bar code or other reader system. The system can either automatically provide a text message to the parent who can then reply to the child/attendant via the kiosk to meet the child.

Alternatively, the parent can be instructed to meet the child at a predetermined location, and to stop looking for the child because the child was found. Thus, for this example, the person who is lost or separated from their party can notify security or access a kiosk. Security can, for example, notify the parent that child is in safe custody, and should not search the stadium, and therefore, meet outside stadium in a prespecified safe place.

In an alternative embodiment, if a child/person is separated, the security guard/kiosk can arrange the best place to meet, either in or outside the stadium, together based on an optional global positioning system (GPS). In addition, the party with the mobile device can be provided directions on where to go to meet their party from who they have been separated.

In an alternative embodiment, the present invention may also be used in a security, defense and/or safety setting to direct patrons in a stadium for an orderly evacuation or notify patrons regarding status of a safety related event via, for example, a broadcast message including text message, email and the like. In this manner, system communication resources may be most efficiently utilized by not over-utilizing the system via voice communication, unless completely necessary. For example, the message can be broadcast in the event of an impending hurricane. In this situation, patrons in different sections get different messages, for example, to exit the stadium out of gates/exits that are either less occupied or closest to the section the patrons are sitting in. Advantageously, the present invention has the patrons contact information, including optionally and advantageously text messaging, that can be broadcast or sent to different patrons. The advantage of text messaging is that the bandwidth is more efficiently used in the event of an emergency, and there are no busy signals as in a voice network. Further, the message is send, and if the network is at capacity, the system can automatically resend or the message will be placed in queue and sent as soon as capacity becomes available.

In another alternative embodiment of the invention, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction.

For instance, in sporting venues the bracelet ticket includes the machine readable information that comprises at least one of a bar code and radio frequency identifier used for security check in, and optionally check out. In this manner, the standard reading machines that can scan the bar code or RFID information can keep track of people that have checked into the sporting event and/or venue. Advantageously, the machine readable information on the bracelet can also be used by the venue in the event the patrons seat assignment is modified, for example, via an electronic ticket exchange or upgrade program. In this embodiment, the visible indicia are no longer valid for the actual seating that may be dynamically changed and only represents optionally an initial seat assignment. However, the machine readable information may be used as a code to reference the specific patron and assign that patron a new seat. Thus, when the ticket reader scans the ticket and actually identifies, for example, the bar code, this information can be used to reference the patron, update and/or confirm the patron's current seat via the reader used, for example, by ushers in the venue, kiosk, entrance to the venue, and the like.

In an alternative embodiment, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction. This information, as previously mentioned, may be visually cognizable for the patron and in combination, readable by electronic means if the bracelet includes a magnetic strip, bar code imprinting, or RF chip.

In an alternative embodiment of the present invention, the security bracelet and ticket combination of the present invention advantageously includes a bar code or other machine readable information such as a RFID device. When, for example, a child is separated form their parent, the parent can notify security and the seat number associated with the child. If the child attempts to leave with their bar code/identifier, the system detects the bar code/identifier as either being valid and identifying the child that is missing or being invalid and raising another red flag. In an alternative embodiment, the bar codes/identifiers associated between children and adults correspond such that the child identifier must be within a predetermined time and/or number of checking out identifiers from/within the adult identifier. If this does not occur, the system determines that the child is leaving without their parent, and possibly being abducted.

In an alternative embodiment, the system links one or more tickets/identifiers together and requires the tickets/identifiers to exit the venue or event within a predetermined time period from one another and/or within a predetermined number of tickets/identifiers that have exited the venue and/or event. In the event that one ticket/identifier exits the venue or event and the associated identifier does not, then an alarm or other indictor occurs, and the attendants will detain the patrons that have initiated the alarm to for security purposes.

In an alternative embodiment, the tickets are advantageously coded with designations such as adult, child and the like. In the event a child ticket/identifier exits the stadium before the associated adult and/or more that a predetermined time period and/or number of patrons exiting, the system can initiate an alarm so that an attendant can determine if a child has exited the venue or event without their parent or with a wrong parent potentially averting a kidnapping. In this embodiment, an additional combination is the use of the standard fast pass feature, for example, at theme parks, and the like, where the venue records predetermined events that the user of the card enters in a faster line. In this embodiment, if a child ticket/identifier is not associated with a parent ticket/identifier, for example, as described above, the child may be denied entry into the event or venue if not accompanied by their parent. In alternative embodiments, the venue/event sponsor or organizer associates tickets upon request from the patron. In addition, in another alternative embodiment, a kiosk is provided inside and/or outside the venue for, for example, parents to register their tickets and have them associated with their children's tickets to prevent the child from exiting the venue without them, for example, as described above.

In an alternative embodiment of the present invention, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In another alternative embodiment of the present invention, a security bracelet is advantageously utilized, for example, such as the security bracelet disclosed in U.S. application Ser. No. 10/680,207, filed on Oct. 8, 2003, to Abraham I. Reifer, et al., and incorporated herein by reference, in the event of a reported event, security breach, abduction, and the like. In this embodiment, all patrons exiting the stadium must show their ticket and/or identifier so that the venue can check all patrons out of the stadium. Thus, for example, if two kidnappers come in the stadium, and want to use one bracelet for a child, the second kidnapper will be stranded in the stadium. In addition, if one kidnapper buys two tickets, then upon exit with the child and the additional ticket, a barcode/identifier will be exiting without ever having checked in, and then the alarm will go off as well.

In another alternative embodiment, the present invention provides a broadcast message to warn patrons of an event, such as an advertisement, sale and/or even a weather related event such as a hurricane that might require the venue to be evacuated. Advantageously, in at least one embodiment, the broadcast message comprises standard text messaging that optimizes or better utilizes capacity form the communication system. Thus, when using text messaging capabilities, the present invention efficiently transmits text messages to numerous subscribers regarding, for example, exit information, contacting and/or meeting additional parties that have been separated, and the like.

In an alternative embodiment of the present invention, the present invention optionally provides the capability to penetrate into secondary market with season ticket holders selling ahead of time the games they will not be attending. For example, the present invention optionally provides the feature for the season ticket holder and/or general ticket purchaser the ability to view in advance of the season and/or game the schedule, and to alert the venue and/or stadium of games and/or events they will not be attending, thereby permitting the stadium/venue to attempt to resell the tickets to other patrons. For example, in one embodiment of the invention, the patron is provided with a monthly schedule listing the events that may be attended. The patron, such as a season ticket holder, may then click or place an indicator on all games they will not be attending for the season in advance, thereby providing the stadium with the ability to resell tickets well in advance of the event. Once the patron completes identifying games that will not be attended, the system then compiles a list and transmits the list to the patron for an optional confirmation. This list is then used by the system to release seats well in advance of the game. In an alternative embodiment of the invention, registered users of the system for, for example, upgrades, may also be notified of seat availability for sales prior to the game/event. In an alternative of this embodiment, registered users may receive text messages, emails, and the like, notifying them advantageously of the availability of seats that heretofore have never been easily available to the public for sale, thereby allowing the venue to participate in secondary market ticket sales.

In one alternative embodiment of the present invention, the system/process of the present invention provides or operates as a middle person/broker between the ticket holder that is returning tickets to the venue, such as the season ticket holder, and a ticket sales system and/or company, such as tickets.com, by notifying the tickets company of the newly available seats via notification by the ticket holder, such as the season ticket holder of season ticket games not being attended.

In one alternative embodiment of the invention, the system and/or process transmits text messages, emails and the like, to offer tickets and/or seats and/or admittance to subscribers for events and/or games with empty seats even before game. Thus, the present invention allows the venue to participate in the secondary ticket sales market and the upgrade market, thereby increasing revenue and fan loyalty.

Of course, all of the embodiments of the present invention may be used for any reserved seating event, and/or venue that require tickets for entry thereof.

In another alternative embodiment of the present invention, the use of machine readable identifiers provides advantages for, for example, the upgrade program or ticket exchange of the present invention. For example, when the upgrade, re-allocation and/or electronic ticket is issued, the machine readable identifier, for example, the bar code, on the original ticket is invalidated, thereby preventing use of the invalidated ticket. Accordingly, when a new ticket holder purchases the ticket form the season ticket holder, the new purchaser will be issued a new machine readable identifier, and optionally a new paper ticket. The present invention advantageously is able to handle the issuance of a new ticket and invalidates the old ticket and optionally the old identifier that has, for example, been returned by the season ticket holder, thereby providing dynamic ticketing capability.

In an alternative embodiment of the present invention, the new patron obtains a new identifier such as a barcode, the old bar code of, for example, the season ticket holder is invalidated. In one embodiment of the invention, season ticket holders are offered to opt in the upgrade process. Various commercial incentives are possible for the season ticket holder to opt in the upgrade process, such as monetary compensation when their ticket is used for an upgrade and/or resold whether they express their intention not to go to the game prior to the game, and the like. Alternatively, season ticket holders may be offered that the cost of their season tickets will, for example, remain the same as the previous year or be reduced if they participate in the program. Therefore, the combination season ticket trade-in and upgrade program in one embodiment of the invention will be beneficial to season ticket holders by allowing them to trade when they already know that they have no intention of attending a game, and allow the season ticket holder to recoup some cost of the season tickets if they do not attend and their ticket is used as an upgrade. In addition, additional patrons of the event and/or sports team are permitted to attend the game in locations/seats that they might never have been able to obtain access to. Further, the venue/stadium/team maximize revenues by being able to place tickets on the secondary market when the ticket holder notifies the venue early enough that they are not attending the event, the venue also obtains additional revenue from upgrades when tickets are upgraded, and the venue obtains additional fan loyalty.

In another embodiment of the present invention, the system provides the ability to advertise via email, text messaging, and the like, for one wireless carrier on the wireless device that is using another wireless carrier. Since the user of the wireless device has requested the service, the user appropriately receives the communication from the ticketing system of the present invention, and therefore, also appropriately received the advertisement from the wireless carrier that is different than the wireless carrier that the user of the wireless may be using at that time.

In another alternative embodiment of the present invention, offers to purchase seats either during the game or even well in advance of the game are "pushed" or transmitted out to registered users that have supplied their wireless and/or Internet addresses. For example, patrons can register in advance for the upgrade and/or regular ticket offers to purchase admittance via various methods including the Internet. When seats band/or admittance becomes available, a broadcast message or other standard messages may be transmitted to the registered patrons to notify them of the seat availability. Thus, seat offers are "pushed" to registered users that have requested this service advantageously to a wireless device and/or other address including standard telephone communication, as well as additional optional advertisements. The system, in one alternative embodiment, provides the user the option when registering to accept certain types of advertisements to be received on their wireless device via email and/or text messaging. In other embodiments, the user does not have the option of which advertisements to receive.

Advantageously, in accordance with one alternative embodiment of the present invention, if a patron decides to attend an event such as a sporting event when the patron does not have time to wait to receive paper tickets (e.g., the patron is visiting in another city/location and does not have time to wait to receive tickets via mail and is on the go), the system of the present invention transmits a ticket to the patron via, for example, a wireless communication system and/or other standard electronic communication system such as the Internet, and the patron can present their ticket, for example, on their wireless device and show up to game.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Patrons then text message and/or email and/or answer questions via voice-to-text messaging their answers. The system can then display the overall number of answers that are correct and incorrect, display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another alternative embodiment of the present invention, the system uses a seat database to determine which of the reserved seats are currently in use. The system may integrate with the seat database system of a venue and/or stadium or optionally be used in parallel with the seat venue/stadium database. For example, prior to the event, the system may utilize the seat database of the venue to determine available seating and patrons that do not show up after a predetermined period of time. Alternatively, the present invention can operate using a separate database from the event/venue by copying or building a separate database used for the ticketing and/or upgrading according to the present invention. In this alternative, as patrons enter the venue, they are checked in directly to this separate database. At the time of the event, the system will be able to check-in patrons using either the identification system, e.g., bar code scanner, of the event or venue, or provide a separate identification system.

In alternative embodiments of the invention, the patron that knows they are attending the game but is going to be late can send in a HOLD message even prior to being provided a warning message that their seats are to be released if the patron does not respond to the message with the HOLD request. That is, in this embodiment, since the patron already knows well in advance that they are attending the game, but perhaps stuck in traffic, the patron can initiate the HOLD message before even being warned in advance of the possibility of their seat being released.

In another alternative embodiment, patrons that have registered with the system and optionally checked into the stadium and/or venue in advance and who also know that they would like an upgrade and/or ticket, may initiate their own upgrade request to the system to notify the system of their willingness to purchase an upgrade and/or new ticket for the event/venue. The system may then place these patrons on a higher priority since they have already expressed and intent and/or willingness to purchase the upgrade or ticket. The patron may notify the event and/or stadium of their willingness optionally well in advance of the game or near/after game time at a time which the patron commits or expresses an additional heightened desire to upgrade and/or purchase a ticket.

In alternative embodiments, the system includes the advantage of allowing patrons to register free for a predetermined period of time, for example, for the first year, without paying a yearly subscriber fee. Alternatively and/or in addition thereto, the system provides the patron with their first upgrade for free or for a reduced rate to further encourage the patron to register with the system and method of the present invention. Alternatively and/or in addition thereto, the system of the present invention offers the patron reduced and/or free concessions when purchasing a membership, ticket and/or upgrade to further encourage the patron to participate in the offers of the present invention.

In alternative embodiments of the present invention, the matching system and/or process, permits participants in the program to initiate a message to the system with the seat location and/or name of the patron that they would like to be matched with for a meeting, networking and/or socializing such as a date. In this embodiment, the system may the push the message to the other subscriber and assign new seats to the individuals that are to be matched. Alternatively, the system Need not require a specific confirmation that the second individual to be notified of the potential match is physically located near the first individual, but can rely on the first individual to provide that information. For example, the first individual may see a potential date in a restaurant, and may then send a message to the system with that person's name or address, that they would like to meet that other individual. In that situation, the second individual will receive a message of the possible match, and can respond and accept or reject the offer to meet. The second individual can then provide a meeting destination or the system can suggest a meeting place based on the first individual advising the system of their location, and the location of the second individual.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Advantageously, the multiple choice questions each have unique selections, such as a1, b1, c1 and d1 for question #1; a2, b2, c2, and d2 for question #2; a3, b3, c3 and d3 for question #3, and the like. In this embodiment, the actual timing of questions is not necessary since each question and answer is unique. Therefore, the speed of responding to the question is immaterial to the winner of the contest and/or correct answer. Also, in the event one patron answers the question late, there will be no confusion which question the patron is submitting an answer for. Patrons text message and/or email and/or answer questions via voice-to-text messaging their answers as indicated above using the unique set of answers, in one embodiment. In alternative embodiments, the first predetermined number of patrons that answer the question correctly are considered the winners.

The system can then display the overall number of answers that are correct and incorrect, e.g., a1 50%, b1 28%, c1 12% and d1 10%, and display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another embodiment of the invention in connection with the seating upgrade and/or assignment system, an identifier and/or machine identifier such as a bar code, RFID, etc. optionally remains static for the user on the user's ticket and/or device that is provided for optional paperless ticketing. For example, the identifier will remain the same associated with the user, but the seat assignment, privileges, user characteristics, user preferences, and the like, may be dynamically changes. The system and method of the present invention will be updated so that the identifier can represent a dynamic seat assignment or other dynamic information, such as general admission to an associated event, or other event and/or venue, including, for example, a restaurant, bar, and the like.

In another embodiment of the present invention, the upgrades process and/or feature may be provided to users/patrons as a complimentary reward for fan loyalty, to reward the user but also market other goods/services and/or other advertising opportunities to be transmitted via the wireless device and/or mobile phone. In one embodiment of the invention, the system and/or method initially queries the user, for example, at the beginning of the trivia contest and/or tournament or at the beginning of the game, whether the user is present in the stadium or not. The system can then perform, for example, the trivia contest, and determine a winner(s) to award for example some form of reward.

Furthermore, in another embodiment of the invention, based on the number of people responding that they are present at the game, the present invention advantageously provides a random upgrade to a predetermined number of patrons as an additional fan loyalty program and/or advertising sponsorship to one or more entities that sponsor the free upgrades.

In another embodiment of the invention, a system and/or method is provided that advantageously builds and/or acquires and/or collects mobile contact addresses of users in an efficient manner. For example, in accordance with the present invention, a user advantageously need only provide the communication network and telephone number, and the present invention builds a data address therefrom. This allows the mobile or wireless device user to still register for a service without specifically knowing their data address for, for example, data communication such as SMS messaging, text messaging, email, and the like. In one embodiment, the mobile user is provided a drop down menu where the user selects the communication network and provides their mobile phone number.

The present invention is particularly advantageous currently with the recent enactment by the Federal Communications Commission (FCC) number portability where mobile phone users are able to transfer their existing numbers to other networks. Accordingly, we have determined that a user's number will advantageously provide a mode of contact for the user even when the user decides to change communication networks.

In one embodiment of the invention, the software processes and system determines and builds the actual messaging address (email, text, SMS, and the like) to send messages to the mobile device by the user only selecting and/or providing the communications network and the telephone number. Thus, the present invention advantageously simplifies the process for mobile or wireless device users to register and/or provide contact information, and therefore, beneficially increases the number of individuals that can effectively and easily register for a communication service.

In another embodiment, the present invention facilitates the ability for potential users to signup for the service of receiving, for example, trivia, upgrades and/or text messages via a user sign up device or apparatus. In one embodiment, the user sign up sheet includes numbers and/or circles that can be filled in like a grid, where the user can fill in or cover the numbers that identify their portable number. In addition, the user can check off the specific network carrier from a list of network carriers, or simply enter their specific network carrier. The user sign up sheet may be done electronically via a computer and user interface as described above, or may initially be filled out by a user via, for example, a piece of paper and then later entered into the computer system of the present invention.

In another embodiment of the invention, the system and method of the present invention is capable of re-locating a patron via the mobile address that was previously provided, even if the patron has changed wireless carriers. For example, in one embodiment, with the recent feature of mobile phone portability by the FCC, we have determined that a significant number of mobile phone users are likely never to change their number/address, and therefore, the system and method of the present invention is able to send text messages and/or email to all network addresses using the telephone number of the user if the system suspects that the previously provided network by the user is no longer being used. In this embodiment, the user can optionally respond to the message and/or network broadcast message, confirming that one of the messages has been received.

In another embodiment of the message, whenever a user wants to contact a mobile phone, mobile wireless device or even computer based, via for example, an Internet based account, wants to contact another mobile wireless device user, the present invention provides a transmission device, for example, via the Internet or individual models/mobile phones used for each of the networks to broadcast the message on all networks. Advantageously, in accordance with this embodiment, since the user is likely to maintain the same telephone number, their data or text messaging address will be their telephone number and one of the few network addresses. This type of broadcast message can happen anytime, and even for voice communication when the user of the wireless device needs to receive a data, text and/or voice message.

In another alternative embodiment of the invention, as described previously, the invention may be used by a patron to obtain specific data or information regarding sports or venue related information of interest. For example, patrons may communicate with the system and forward a player jersey number or number of racecar during an event such as a baseball game, football game, racing event such as Nascar, to obtain additional information including current statistics and past statistics. The present invention can then optionally sent statistics throughout the game or event to the patron without the patron requesting, for example, at specific time intervals or after notable achievements during the event, such as a home run, touch down, $7^{th}$ inning stretch, half time, number of laps traveled, and the like.

Thus, the present invention includes many variations in the type of information a user may receive, whether specifically checked into a venue or registered for the service for a particular event. In addition, the present invention includes various processes and systems for ensuring delivery of messages to patrons that have requested the service or merely sending messages that a patron may be interested in receiving.

In another embodiment of the invention, the matching and/or networking system includes the ability to contact and/or notify the users to coordinate the meeting using any one of a plurality of communication methods including text messaging, email and/or instant messaging, with the additional advantage of transmitting pictures, video and/or other data that provides additional information regarding the other person that has been suggested for the match and/or network. In one implementation of this embodiment, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. For example, different message transmit and/or receive formats may be used depending on the system. The present invention beneficially parses the various different formats to obtain the necessary information for the communications described herein. In addition, the present invention formats the messages for the different wireless devices so that the messages may be appropriately received even though different devices and/or communication networks have different messaging formats. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In accordance with another embodiment of the invention, the matching and/or networking system includes the option of permitting a subscriber to notify the system when they are ready for a potential meeting and/or match. Once the matching and/or networking system is notified of the subscriber requesting the match, the system is then capable of either tracking the user though a positioning system such as GPS, permitting the user to register at predetermined locations upon user initiation such as via Bluetooth, RFID, infrared, and the like. In accordance with this embodiment, the subscribers are not being constantly tracked, and therefore, maintain an additional level of privacy. In alternative embodiment, the present invention continuously tracks the subscribers without specifically requesting to be matched. In this alternative embodiment, the subscriber is provided with less privacy because they may be notified of a specific match even though they might not be interested in the match and/or meeting at that time.

In an alternative embodiment, the present invention provides subscribers with the ability to accept/reject the match before each of the subscribers receive personal information of the other and/or before the date/match has been arranged with at minimum a meeting location. In this embodiment, the invention requires that both users accept the match and/or date prior to notifying the subscribers of the contact information for each subscriber. Therefore, subscribers can optionally request additional information from the system of the present invention, even multiple times, to better understand the potential date and/or match before accepting, and importantly, before the other subscriber is provided contact information and/or a meeting location of the subscriber. In the embodiment where the present invention merely provides the meeting location, the present invention advantageously does not provide the subscribers contact information and/or other personal information before the match/date. Advantageously, in accordance with this embodiment of the invention, subscribers never receive personalized or personal contact information unless the subscribers, after meeting in person, agree to exchange such information.

In another embodiment of the invention, the dating and/or networking system provides subscribers the functionality to email, instant message and/or text message at least one additional piece of personal information and/or questions, optionally directly to each other or via the system anonymously, to obtain additional information that may be more relevant than the user profile or information from the user profile that was used to make the initial date/match.

In another embodiment of the dating and/or matching system of the present invention, the system optionally provides automatic and/or user initiated registration in a particular establishment and/or geographic location, which can be used instead of a location determination system such as GPS, or together with such system. This form of registration may be even more precise than GPS because it confirms a subscriber's presence within a specific store, establishment, entertainment establishment, restaurant, and the like. Thus, in these embodiments, the subscriber either initiates the registration as described above, or alternatively, if the subscriber optionally sets the wireless device to automatic registration based on the appearance at a predetermined registration area and/or location, the subscriber will be automatically registered to receive communications regarding a potential match/date.

In an alternative embodiment of the present invention, once the dating and/or matching system determines that a potential match/date has been detected, the system optionally notifies the different subscribers and asks whether they want to continue to participate in the matching/dating program. When both, some and/or all subscribers agree to participate, the present invention can forward to each subscriber automatically the information that each subscriber shares substantially in common and/or the information that was responsible for the match/date between the subscribers. In this embodiment of the invention, the subscribers will know immediately the information that should be most relevant in making the match/date and can determine whether to actually agree to either contact or send the other subscriber additional information and/or arrange to meet the subscriber at a pre-designated location.

In an alternative embodiment of the present invention, the present invention optionally includes the ability to recommend a potential meeting place for the subscribers to meet after determining that the subscribers have agreed to participate in the date/meeting. In this embodiment, the present invention advantageously determines the location based on, for example, subscriber preferences, geographic location that is preferential for at least one of the subscribers and/or both subscribers, predetermined location where, for example, a sponsor will receive patronage and/or provide a discount for the subscribers and/or actual pay the organizer of the dating/matching system an advertising fee to promote their sponsorship. Accordingly, the present invention advantageously determines not only a potential match/date, but advantageously suggests, recommends and/or determines a specific location and/or geographic location and/or restaurant, clothing store, zoo, museum, and/or other suitable location for the subscribers to meet and optionally based on geographic distance and/or location.

Additional dating and/or matching features and/or differentiators of the networking and/or dating system of the present invention include one or more fo the following:

Wireless messaging platform supports interactive messaging

Wireless messaging platform provides simultaneous parallel applications to run without collision Multiple wireless initiatives or topics run without conflict Different initiatives or topics may be user specific or selectable While each initiative runs independently, there can be overlap in terms of customer base Platform is flexible to add/remove initiatives quickly and efficiently One wireless carrier/network can be a dating/matching sponsor and advertise on the wireless device and/or network of another wireless carrier/network Contact members to notify of the match/date to allow members to either directly contact each other or send additional information via, for example, text messaging, email, instant messaging, such as pictures, video, and the like Contact members or wait for request from members to participate in match/date initiative; can then automatically track member via GPS instead of constantly tracking member all the time, thereby increasing privacy of member Contact each subscriber that is being offered the date/match and obtain approval for the match prior to actually notifying potential members that match has been made Contact users after initial match has been conditionally approved, and provides users the capability to request additional information, such as personal information from the other member or other members which the requester still wants to know before finally accepting the date/match Members can register or "check-in" at predetermined locations and/or establishments which is one additional level of specificity, for example, with regard to the location where a member is that may be interested in matching; For example, two or more members may actually be in the same restaurant where they can be informed of one or more other subscribers being present; members can register via sending a message to the system via text message, email, RFID, Bluetooth, and the like, either by initiating a registration or automatically Contact members after initial match has been conditionally approved and exchange, optionally automatically, profile information that was significant in making the match/date and/or other important information regarding a match/date that a member may want to know before finally accepting the match/date and/or information the members may want to know that is geared particularly for a first date, e.g., likes/dislikes, common interests, favorite foods, wines, alcoholic beverages, and the like Contact members to suggest and/or recommend and/or arrange meeting place based on, for example, geographic location, common interests/sports, common food tastes, common beverage tastes, common entertainment preferences and/or sponsors willing to, or interested in, being utilized for the match/date for the suggestion and/or recommendation, and optionally providing the members a discount and/or compensating by the sponsor to the networking and/or dating system proprietor for the advertising and/or recommendation to visit that sponsor Wireless messaging platform includes a protocol conversion server functioning to interface with a variety of wireless networks having different messaging characteristics for both transmitting and receiving messages, and parsing the different message formats for the content from a received message, and transmitting a message to a plurality of different networks and/or devices having different messaging and/or interface capabilities and/or functionality Contact members with a wireless consent form indicating that the matching/dating system and/or the members participating in the match/date have generally consented to potential cohabitation optionally without any recourse to the other party. Alternatively, the members may be contacted with other types of informed consent forms with limited recourse for acts and/or aggressive acts that are clearly assaults, but not sexual related misconduct or sexual related crimes that are felonious in nature carrying a high penalty/sentence. Alternatively, members may be presented with consent forms that eliminate any criminal penalty, but do not foreclose the possibility of civil lawsuits for damages relating to torts, and the like As another alternative and/or in addition thereto, members may be presented with consent forms that eliminate any civil penalty, but do not foreclose the possibility of criminal lawsuits for criminal type activities, perhaps with the exception of the most severe sexual crimes such as rape and/or sexual assault that carry significant prison time.

For example, athletes, celebrities, high worth individuals, or even average individuals, male or female, may be interested in the wireless consent initiative because that allows them more flexibility to meet a variety of individuals without the worry of later being sued. In additional alternative embodiments, broadcast messages may be transmitted to numerous individual that may be interested in meeting and/or dating a celebrity or predetermined individual or individuals. In this embodiment, the optimum matching individual or individuals may be selected to meet with the celebrity, celebrities, and the like, while utilizing the informed consent feature of the present invention. In another alternative embodiment, an individual or individuals may be randomly selected as part of a match or date, based on a lottery or other competition to meet or date a specific individual or individuals.

Additional optional hardware and software requirements are as follows for one or more embodiments of the present invention:

System Capabilities

Platform supports interactive messaging

Platform provides simultaneous parallel applications to run without collision

Multiple wireless initiatives or topics run without conflict

Different initiatives or topics may be user specific or selectable

While each initiative runs independently, there can be overlap in terms of customer base Platform is flexible to add/remove initiatives quickly and efficiently Wireless Initiatives Interactive trivia with fans inside and outside of the stadium Targeted messaging, e.g., targeted advertising Broadcast messaging, e.g., general advertising Interactive messaging, e.g., with concessions Profiling for each initiative or topic, e.g., based on network operator Urgent and emergency messaging Specific initiative: discounts for concessions and/or memorabilia Specific initiative: invite patrons to different activities before, during or after game, e.g., player loyalty, family activities, etc.

Specific initiative: seating upgrade program

Specific initiative: messaging patrons in one section and separate messaging to patrons in another section Specific initiative: messaging parent of a missing child Special initiative: dating where patrons can keep their seats to return to them, or their seats are re-allocated. In alternative embodiments, the patrons switch seats instead of moving to empty seats, either for the entire game or only a portion thereof with other patrons for match making possibilities.

Functional Specifications

Front end for user signup and profiling—secure site—for example, modeled after www.mlb.com, include one or more of:

type of seats does the customer want for upgrade (decks and range of sections)

information for dating concession profile capability for additional profile information validate user by sending message to device upon sign up auto append of network information to phone number during signup login and password protected site frames on website or interface that can be easily configured to have look and feel, for example, of particular baseball team capability for space on screen for advertising opportunity that can easily be modified and relatively dynamic capability to handle lost passwords web page or interface where customers with season tickets can mark a calendar with the seats they want to keep and the ones they are interested in freeing up for early sale or upgrade.

The optional Front End of the present invention used for administration and setting up parameter for each application, optionally includes a secure site, with one or more of the following:

application email address and password minutes for all the configuration parameters and/or functionality number of threads for each application for upgrades, at least one of releasing customers old seat immediately, or it until the customer approves of the release, or holding the customer's seat for a predetermined portion or all of the game, for example, in the dating functionality)

set schedule for games section rating setup, and seat upgrade pricing revenue allocation model provide a number of retries if message send failure Concessions The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

Concession Wireless Initiative

Purchased via cell phone

Web registration for preferences

Targeted concession offers

Confirmation that purchase is ready

Delivered to seat or ready for expedited pickup

Customer convenience: system identifies closest concessions to customer

Customer convenience: system determines concessions with short wait

Each concession labeled with a number for customer identification and fulfillment Customers can request menu, or register for each game to receive menu around game time via mobile device GPS can be used effectively to inform customer of closest concession stand to pickup order, and/or customer can provide section number and/or seat location for system to identify most convenient concession stand Most convenient concession stand can be determined based on one or more, or combination of, predetermined criteria, such as, closest concession location, shortest wait in line, specific item being ordered, and the like.

Interactive messaging, e.g., with concessions

Specific initiative: discounts for concessions and/or memorabilia

The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

In one alternative embodiment, the following message exchanges may be used:

First Message

"In Game" Concessions

Menu will be sent soon!

Reply with #, item short form and seating section

Ex: BE=beer

Reply 3BE for 3 beers 408SEC for section 408

Powered by NEXTEL

Second Message (paper menu?)

Menu

BE=Beer; CO=Coke; DCO=Diet Coke

HD=Hot Dog; BUR=Burger

TA=Taco/Salsa; PO=Popcorn

FF=French Fries; CH=Chips

PZ=Pretzel; PT=Peanut

LEM=Lemon Ice

Third Message

Order received!

Summary:

3 HD @ $3=$9

2CO @ $3=$6

2 LEM @ $3.50=$7

Total=$22

Reply Y to ACCEPT

Credit Card charged

N to CANCEL

Fourth Message

Thank you for ordering!

Your order has been confirmed!

Confirm # REIF1001

Powered by: THE SPORTS AUTHORITY!

Fifth Message

ORDER READY

Bring Confirm # REIF1001 to Concession # 33 by sect # 212

$2 off NIKE baseball gloves

Bring #NIKE305 and game ticket to

Any SPORTS AUTHORITY!

In another embodiment of the invention used in concessions initiative, the concession attendant receives the confirmation number or other identifying information from the customer when picking up the concessions. The concessions attendant enters the confirmation number or other identifying information when ready or optionally clicks on the order on the computer screen via a concessions interface associated therewith. From there, the order is then cleared from the system with respect to orders that require fulfillment, advantageously allowing the workers to streamline their work activities in the concessions. In an alternative embodiment, the concessions are actually delivered to the customer using the sutomer provided seating information, either provided by the customer through, for example, the wireless device or other registration and/or notification process, or even via a telephone call or automated attendant to associate with the order.

In another embodiment of the invention, the concessions menu is advantageously only delivered to customers that have entered the stadium via a location determination system, and/or checked into the stadium via a ticket reader/scanner. In alternative embodiments, all customers that have registered for the concessions service will receive an introductory message. Thus, customers that are not attending the game need only reply with a request to terminate the concessions service for that event and/or game.

In an alternative embodiment, the customer is advantageously directed to closest concessions via, for example, GPS chip in phone or by knowing where the customer sits at check in, or by having the customer input their seat location or location where they would like to pickup the concessions.

In another embodiment of the invention, we have determined that some mobile phones will utilize different transmit and receive addresses, and therefore, a user may not know how to appropriately register to be a subscriber for one or more wireless initiatives. For example, we have determined that some mobile phone networks utilize slightly different or different electronic addresses for the transmitting and receiving of electronic messages. For example, for the Research In Motion (RIM) Blackberry communication service, the mobile device is assigned a desktop email address. In one configuration of Blackberry, the mobile device only has one address. However, in the non-integrated configuration, the mobile device actually has a separate address when transmitting from the receive address.

In accordance with this embodiment of the invention, the user registers by providing their mobile phone number and optionally a network carrier for same. In this embodiment, the mobile phone user registers with their phone number and optionally wireless network provider. The registration system of the present invention then sends a message to the mobile device, requesting that the mobile device respond, optionally with a predetermined code and/or predetermined message. The mobile device then responds to the registration system, and the registration system corresponds the mobile device response with the original registered mobile address, thereby completing the registration process by ensuring that responses received from the mobile device can be mapped appropriately to the mobile subscriber. In the embodiment where the mobile user is requested to provide a predetermined code and/or message, the registration system uses the predetermined code to map the mobile phone response potentially having a different address with the transmit address provided by the user.

Dating, Matchmaking and/or Networking

In another embodiment of the invention, patrons are provided the opportunity to meet others in the venue or at a predesignated location near or away from the venue using standard matching rules. In one embodiment, the presence of the user is detected when entering the stadium, for example, via the ticket entrance systems. In another embodiment, the presence of the patron is detected or determined based on a message that is send to the user, for example, either right before, during or after the game. In this embodiment, the user can be prompted with a request whether they would like to participate in the matchmaking, dating and/or networking program.

For example, potential business or social partners may be selected or prompted for networking or dating. When the user responds yes, in this embodiment, their current seat is irrelevant if that seat is not to be released for another patron. Therefore, the system need only select a new set of seats for the networking and/or dating for the patrons, transmit the patrons the additional new seats via, for example, a wireless ticket, update the venue seating database for subsequent verification by the ushers when seating the patrons. The patrons may then proceed to the new location and have a meeting or date, and then return to their original seats if desired.

In another embodiment, a "burnt bridge" approach or feature is provided where the original seats for the patrons that are meeting are then released for other upgrade and/or networking programs. In this embodiment, the original seat of the patron must be known for example, via check-in procedure, registration for the program in advance for example over the web registration process or other registration process, or via the patron responding to the system with their wireless device of their current seat location. Alternate combinations or modifications of the above embodiments is also used.

Trivia

In the alternative embodiment of providing the user trivia information, based on registration and/or location, for example, while attending the game, watching the game at home, or any time prior to or after the game, the user may be provided with questions, as described above, to answer as part of a tournament and/or to be eligible for prizes, awards, and the like. In one embodiment, a section or portion of the users are targeted for the questions together, while other sections and/or portions of the users are targeted at a time period thereafter, for example, 1 minute later, to stagger the communication and transmission of data, thereby reducing congestion and/or unnecessary hardware to accomplish the transmission and acceptance of information to/from the patron.

In one embodiment, while all the questions are staggered over a predetermined period of time to the patrons, whether limited to patrons in the stadium, out of the stadium and/or both, the patrons are not notified whether their answer is correct until after all questions have been transmitted, and all patrons are provided the opportunity and/or sufficient time to respond. Once that predetermined time period has elapsed, the patrons will be notified whether their answer was correct, and whether they are still in the tournament. In optional embodiments, a predetermined time period will again elapse until new questions are sent and the tournament continues.

Optional Oracle or My SQL Database

In one embodiment of the invention, an Oracle or My SQL Database is used in connection with the present invention. In one embodiment, the result set is set to be proportionally with respect to the number of users and/or data that will be stored in the system. In another embodiment, the database is optionally partitioned for specific games and/or initiatives or groups of games and/or initiatives. The system is preferably thread safe when running the games and/or initiatives. The system is optionally integrated with Credit Card for payment, and/or integrated with the venue ticket system and/or point of sale system to optionally determine who came in and when into the venue. In another embodiment, the present invention maintains and updates financial balances for users, such as patrons and stadiums. In alternative embodiments, secure interaction with ushers and an interactive kiosk is provided.

The present invention optionally provides any standard algorithm for partitioning of group of seats and users, for example, for system resource allocation, load balancing and/or division of system functionality. In alternative embodiments, a local kiosk for the stadium and/or venue is provided where the user can enter information, such as register for one or more initiatives and/or programs. In alternative embodiments, the system of the present invention includes the capability of offering for sale seats which are not currently sold via messaging to wireless devices, such as text messaging to mobile phones, or other messaging and/or wireless communication to wireless devices, and consideration. In alternative embodiments of the invention, standard algorithms such as used in the airline industry may be used to overbook seats for the venue, and consideration.

In alternative embodiment of the invention, instant messaging or any type of communication method can be used in the present invention, include local and/or global networks, such as the Internet, LANs, WANs, WAP, 811.02a, 802.11b, 802.11g networks, and the like.

Messaging Software Requirements

Trivia and/or other messaging products/initiatives are Java applications that run in a J2EE application server and utilize a JDBC 2.0 compliant relational database. There are typically open source options available for system support. Currently for development and test environments we utilize are desktop environments running Windows 2000 with the open source options below. The draw back is that open source options typically don't provide formal system support approaches, although we have found the software to be very reliable and would recommend this approach for early stage pilots. Should the customer prefer purchase software options for these components are provided as well.

I. Server Software Specifications

Alternative A—Open Source Approach (1) Web/Application Server—Tomcat 4.1.18

(2) Database—MySQL 4.0

(3) Windows 2000 Server for each server

Alternative B—Purchased Product Approach (1) Application Server—Websphere Application Server 5.0

(2) Database—Oracle 9i DBMS (3) Windows 2000 Server for each server

II. Server Hardware Specifications (4) Each of the HW Servers specification:
- (i) 2xCPU—P4 2.4 GHz Xeon
- (ii) 2 GB RAM
- (iii) Monitor
- (iv) CD ROM
- (v) Floppy Drive
- (vi) Hard Drive depending on volume (see below)

III. Communication Specifications (5) POP3 Account and SMTP server accounts that can support number of active subscribers (6) Dedicated T1 access to POP3 and SMTP provider IV. Hardware and Software Sizing Configurations Phase 1:

1K-10K subscribers and players during the game

Two Servers

Server 1—runs Web/Application Server for the website and the Trivia Application

Server 2—runs the Database server (20 Gig)

Phase 2:

10K-25K subscribers and players during the game

Server 1—runs Application Server for the Website front end

Servers 2 and 3 (2 Servers)—run the Application Server for Trivia Application (two servers are used handle load balancing)

Server 4—runs the Database server (50 gig) (Level 1 RAID 2×50G Array)

(Server 5—used as a backup to server 4—depending upon Reliability requirements)

Phase 3:

25K-50K subscribers and players during the game

Server 1—runs Application Server to run the Website front end

Servers 2, 3, 4 and 5—run the Application Server for Trivia Application (four servers are used to handle load balancing with hardware and software clustering)

Server 6—Database Server—150 gig (Level 0+1 RAID 6*50G Array)

(Server 7—used as a backup to server 6—depending upon reliability requirements).

In one alternative embodiment, as part of the sign up for trivia the system optionally asks the general admission or season ticket holders to input their seats to simplify how the system obtains information where the patron is being seated when they come to the game. In an alternative embodiment, the system obtains this information from the stadium database system, kiosk where the patron can enter the information at the stadium and/or via the point of sales system by the service personnel or attendant that is selling the tickets. Using any of the above methods, once the system knows where the patron is/are seating when present at the game, the system can then target sections of the stadium for, for example, the trivia quiz or other service/offering to the patrons.

Examples of different sections that can be separately targeted include for baseball, behind first base line first, behind home plate second, first base line third—all lower deck; same sections for upper deck and bleachers. Other sports may include football, hockey, soccer, basketball, and the like. In accordance with this embodiment, targeting different sections over different periods of time, thereby preventing a long delay to receive answers once the question is transmitted, may minimize collusion among patrons.

Thus, by segmenting the stadium over a few minutes in accordance with one embodiment of the invention, the present invention may increase the window of transmission to, for example, 2 minutes or more for the first round. As the rounds get successively smaller, the present invention will transmit messages faster. The present invention also provides optional winners for different sections of the field. In addition, the section winners can further optionally compete against each other, for example, the first class seating winner can further compete against the bleachers winner, and the like.

As discussed above, one or more of the above alternative embodiments may be incorporated into the embodiments described above, and/or any of the embodiments discussed below. Furthermore, any of the embodiments of the present invention may be used for any reserved seating event.

Figure 25:
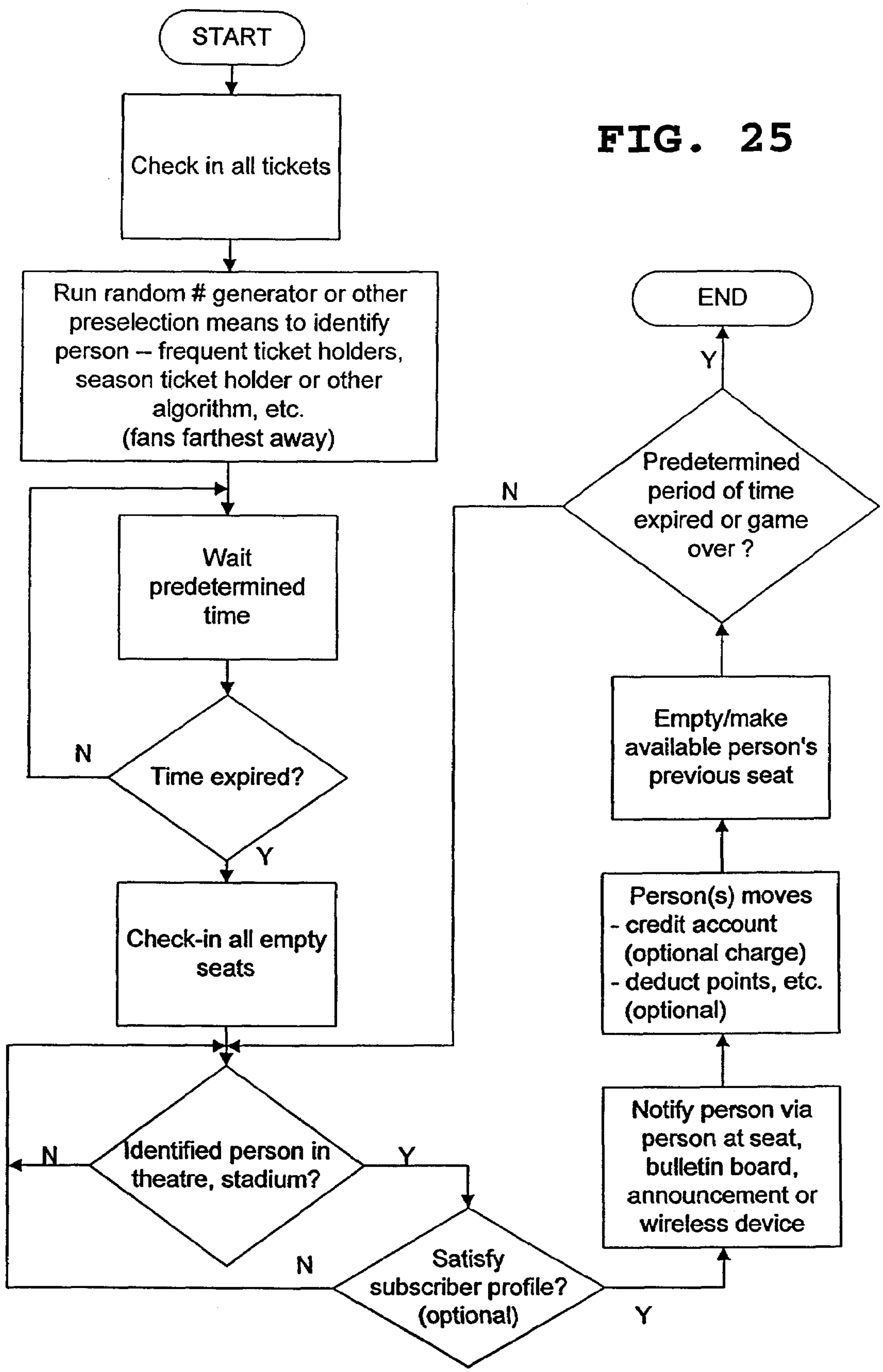

FIG. 25 is a flowchart of a third embodiment of the invention. In FIG. 25, the process begins as all tickets are checked in, for example, as the patrons enter the reserved seating area, such as a stadium or theater, through, for example, bar code readers, scanners, infrared readers, and/or manually or other method where the patron is checked in, either at the gate, seat or other location. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The seat re-allocation process is used to re-assign seats for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, or other predetermined process. Simultaneously or subsequently, the check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or more means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

If the patron accepts, payment of money or other means may be effectuated on the spot via the wireless device, credit card, debit card, points, and the like, and the patron may now move to the other seat. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

In accordance with the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that may be in the vicinity of the stadium but were unable to get seats. Since the present invention re-allocates and/or sells tickets very near to game time in accordance with one embodiment, the patron must be in the general vicinity of the stadium to take advantage of this embodiment of the invention.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron to help the patron decide the quality of the upgrade and whether to accept.

In one alternative embodiment, if the patron that has their ticket re-allocated in error, e.g., because the patron did not show up to the event based on the predetermined criteria but the patron was still planning on attending because they forgot about their seat being re-allocated, the system can re-allocate seats immediately upon the checking in of the patron and notify them that their seats have changed because they are late. In this situation, the stadium/venue might decide to further upgrade the patrons because of the mistake.

In accordance with one embodiment of the present invention, the process of the present invention specifically reserves seats of the highest or very high rating that are considered preferred, in the event a patron's seat is re-allocated prematurely or erroneously. In this situation, the patron who has had their seat re-allocated because they will likely receive an even better seat as a result of the mistaken (stadium or patron) or premature seat re-allocation.

In another embodiment of the present invention, as patrons are entering the venue or stadium, they are provided advantageously with a map of the stadium so patrons can analyze the potential upgrade to make a decision whether the upgraded seats are sufficiently good or of value to warrant the patron moving and/or paying for the additional upgrade. By handing the patron the map of the stadium, the process of the present invention is not required to transmit a detailed schematic to the patron's wireless device which would not normally be able to effectively permit the patron to evaluate the proposed upgrade seats. The map that is handed out may optionally include information for patrons on where to register for the upgrade and/or additional advertisement opportunities.

In one alternative embodiment, the patron that has purchased the ticket, for example, a season ticket holder, may advise the stadium that for a particular game, set of games or all games, they do not want their seats to be re-allocated, and perhaps, an additional fee is assessed for this type of patron. If the stadium provides the ability for the patron to selectively opt out of the seat re-allocation, the patron can, for example, connect to the system via the Internet, public switched telephone network, cellular network, and the like, and notify the system that they do not want their ticket re-allocated, for example, because they are coming late to the event. Other means of notifying the system and/or other reasons may be utilized in connection with the present invention.

In another alternative embodiment, the system provides patrons the ability to individually select when their tickets may be re-allocated. For example, one patron may prefer to only give up their ticket if they are late to the game by 15 minutes, while another patron may be willing to give up their ticket if they have not arrived 15 minutes before the game. In alternative embodiments, the stadium may provide incentives for the patron to have their ticket re-allocated prior to the game because it increases the stadiums chances of re-allocating/re-selling the ticket.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provide additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In an alternative embodiment, the system determines priority of re-allocation of seats based first upon patrons that have seats that may also be re-allocated. That is, the systems attempts to maximize the number of re-allocations by prioritizing the re-allocation based upon seats that may be re-allocated after already being re-allocated. For example, if front row seats in a stadium are available to be re-allocated, in this alternative embodiment, patrons that are in the next closest section for example on the field level would be upgraded first to those seats. Then, patrons with less preferred seats, for example, in the upper deck would be re-allocated to the seats that have now become available from the patrons that have been upgraded to the front row. Thus, using this alternative priority scheme, the present invention maximizes the re-allocation numbers. Of course, this priority algorithm may be combined with additional factors, for example, relating to subscriber/patron value. As described above, additional factors may be utilized in the algorithm to determine the subscriber or set of subscribers to offer the upgrade.

In alternative embodiments, patrons in the vicinity of the upgraded and re-allocated patrons may optionally rate the upgraded patron, for example, for appropriate behavior, wearing of excessively large hats, drunkenness behavior, and the like. These ratings may then be taken into account in the re-allocation algorithm for future upgrades to the patron.

In alternative embodiments, the patrons eligible for the upgrade may be notified using standard email communications over a wireless device, mobile telephone, and/or other standard communication means. For example, standard text-to-voice and/or voice-to-text communications may be used to contact the patron to evaluate whether an upgrade will be accepted and to actually accept the upgrade.

In another embodiment of the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that have already purchased tickets in the vicinity of the stadium but were unable to get seats and/or may be in the vicinity of the stadium but were unable to get seats. Since the present invention re-allocates and/or sells tickets at any time prior to and/or after beginning of game time in accordance with one embodiment, the patron may be in the general vicinity of the stadium to take advantage of this embodiment of the invention or even at any location when being offered upgrades and/or seats well in advance of the game. For example, the present invention can upgrade or sell tickets to patrons well in advance of the game since it advantageously is permitted or has the authority to resell tickets either via ticket holders that do not show up during the game and/or, for example, season ticket holders that have authorized the stadium in advance to resell their tickets based on predetermined criteria, for example, when the season ticket holder notifies the stadium that they will not be present at next weeks game.

In one optional embodiment of the invention, the patron presents the usher with the confirmation number which the usher can enter into a wireless device using a local or private wireless network, or can simply use a walkie talkie or telephone to call the dispatcher to confirm the upgrade and/or new seats using the customer provided confirmation number. The dispatcher will have access to the system to enter the confirmation number to confirm the validity of the upgrade. Alternatively, a patron will retain their old ticket. The patron will give in the old ticket to the usher which is scanned or barcoded by the usher for immediate identification of new seats and used in place of, or in addition to, confirmation number.

Of course, the confirmation may optionally be made via customer name with an appropriate identification card or other information. Further, alternative methods may be used to verify that the confirmation number and/or ticket being used by the patron is valid. For example, the patron may be equipped with a printing device associated with the wireless device or download an actual ticket on line from home prior to the game for the new ticket or upgrade. Alternatively, the patron may be equipped with an identifier card, optionally including a bar code with a unique identifier relating to the patron's account information and profile that can be scanned for additional convenience. Alternatively, a wireless device may be used to securely store this type of identification and/or account information.

In at least one alternative embodiment of the invention, the patron may comprise optionally a corporate account that has a number of tickets, for example, season tickets. In this embodiment, the corporate account may have associated therewith a plurality of email addresses or other communication addresses to transmit the seat or upgrade offer to a number of potential patrons that may rotate their attendance at the games. In accordance with this optional embodiment, multiple emails can be stored for a single user/corporate account, and the system may transmit individual messages to all email addresses, or may only transmit messages to individual patrons for corporate account that individually advise the system that they are associated with a particular ticket/bar code for a particular game and will be/are present at a particular game.

In an alternative embodiment, patrons may enter the stadium and subsequently inform the system that they are present and interested in an upgrade via a kiosk where the patron can scan a bar code and enter their customer number to be eligible for upgrades during the game. The system is then able to transmit a message to the customer, assuming that the customer has pre-registered with the system with the appropriate contact information. Alternatively, or in addition to individual use of a kiosk(s), the customer sales office may have a kiosk or additional functionality to enter the customer name and/or customer account and scan in the bar coded ticket on the spot to register each patron as they enter the stadium or venue.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron upon entry in the stadium to help the patron decide the quality of the upgrade and whether to accept when an offer is received by the patron at a predetermined time. The graphical map may comprise a small booklet with a map of the stadium showing seat locations, and optionally a game schedule.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provides additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In alternative embodiments, patrons in the vicinity of the upgraded and re-allocated patrons may optionally be eligible for a dating or matching service where patrons register and provide profile information to the system and/or through a third service provider dating service. Once the system knows that the patrons will be coming to the game and/or have actually checked in to the stadium, the system can then arrange for the two, four, etc. patrons to meet each other by allocating and/or re-allocating seats to the patrons together. Thus, based on profile information, customer request and availability, the system is able to upgrade or sell tickets to patrons to maximize their chances of meeting someone at the game. This optional feature provides significant potential enjoyment for the patrons participating in this dating or connection program. In accordance with this embodiment, one possible sequence of acceptance steps involves profile matching the two patrons (or groups of patrons) based on predetermined profile information; transmitting a first message to the first patron regarding availability of the second patron and requesting a conditional acceptance form the first patron;

transmitting a second message to the second patron indicating that the first patron has conditionally accepted and request the second patron to accept; and when the second patron accepts before the first patron has rescinded the conditional acceptance, finalizing the upgrade and/or seat allocation for the first and second patrons. This embodiment of the invention is a complete reverse from typical dating and/or matchmaking services which attempt to develop detailed algorithms for the matching process because of the significant decision that exists in determining who to spend valuable time with. In accordance with the invention, patrons are already present at the game, and therefore, half or more than half the effort is already done. The remainder is to actually meet the other person which can be accomplished with profile criteria, whether or not the algorithms are very sophisticated.

In one embodiment, the patrons that are being matched have their original seats maintained and not made available for other upgrades in the event the matching does not work out early on. In this embodiment, one or both the patrons can return to their original seat. Hopefully, there will not be a significant argument of who would need to return to their original seat if an upgrade is actually performed. In addition, in accordance with this embodiment, the seats that are selected do not necessarily have to be better seats in the classical sense. That is, seats further away from other ticket holders might be considered preferred when matching two individuals for the first time. Alternatively, couple that would prefer a little more privacy or quieter game might request to be moved to a more isolated area. Alternatively, families with small children might prefer to be moved to a less busy area as well during the game where the children might be able to freely move around. All these scenarios and/or alternatives are possible in view of the present invention. The advantage of performing a match in a public setting is that the patrons do not have to worry about leaving or ending the date, and also do not have to worry that the other person will have their home address.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like.

In addition, this feature also optionally permits the patrons that have participated in the program to rate one another for future dates. For example, one patron can rate the conversational benefits of the second patron, the appearance of the second patron, the overall short term versus long terms relationship goals of the patron, and the like. These ratings may then be taken into account in the algorithm for future seat assignments, re-allocations and/or upgrades in the future for the first and second patrons, and all other patrons will now benefit with the additional profile information of the first and second patrons. The matching service may be for amusement or work related networking purposes, for example, to meet an executive that the patron currently works with or wishes to work with/sell in the future.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like. In addition, the system advantageously and optionally provides the feature of allowing patrons to text message one another directly, and/or exchange pictures via wireless email, text messaging, and other wireless devices that provide the standard capability of exchanging pictures, such a T Mobile and/or Sprint.

In alternative embodiments, the ticket holder can call in via a voice to text message, text message and/or email and let the stadium know early that they are not coming. In this manner the ticket holder obtains the convenience of the stadium or venue reselling their tickets in advance, thereby providing the venue with additional time to maximize the resale of the ticket.

In alternative embodiments, when the patron enters the stadium, they have their ticket barcoded or other device that detects their presence can be used such as infrared, Bluetooth, etc., and then they can become eligible for an upgrade. The patron can register in advance that they want to receive upgrades by providing their name, message address, e.g., email, telephone text message address, etc., and optionally their credit card or other payment mechanism for upgrades that actually cost money as opposed to free upgrades. In alternative embodiments, the patron can register at the ticket booth when purchasing their original ticket. In this scenario, the stadium representative can enter this information on behalf of, and with the permission of, the patron since the patron may already be providing their credit card, debit card, etc. to purchase the original tickets. Alternatively or in addition, a kiosk may be provided where the patron can enter their original ticket, e.g., scan in their original ticket and provide their name and text message information in the stadium to register for a one time upgrade for the game after purchasing, for example, a regular admission ticket.

In alternative embodiments, an usher can verify that the patron should be upgraded by the patron providing the confirmation number that may be transmitted in real-time by the system, and/or by the patron using their original confirmation number or original ticket with barcode or other identification means, such as a smart card, infrared reader, etc. that represents original ticket and presenting same to the user. The usher then needs only to scan in the original ticket and the system will verify whether the patron associated with the original ticket is valid and whether the upgrade is valid.

In alternative embodiments, a warning message may be sent to the ticket holder that has not shown up to game warning them that if they do not respond within a certain time period that their seat will be re-allocated or re-assigned to another patron. Similarly, a release message may be sent to the ticket holder after their seat has actually been released and/or re-allocated, thereby notifying the patron that if they change their mind in attending the game, they will have to obtain an additional ticket. In alternative embodiments, the ticket holder that has their seat released and re-allocated can be themselves re-allocated a similar, worse or better seat, depending on, for example, their subscriber value and/or other criteria. For example, if the patron is provided a better seat, this will encourage them to more readily give up their seats in the future even if they are attending the game. On the other hand, if the patron is provided a worse seat, then this encourages them not to artificially give up or have their seat released when attending the game. Accordingly, the present invention is designed to deal with various behavioral patterns of specific ticket holders, and may optionally and advantageously be a ticket holder specific with respect to various criteria for re-assigning, releasing, selling and/or re-allocating tickets.

In alternative embodiments, the system transmits to the ticket holder a welcome message after being upgraded and after having being moved to a new upgraded seat location. In one embodiment, the system identifies that the patron has been successfully upgraded after the patron provides the usher with a confirmation number or original ticket, which is then verified by the usher and system.

In alternative embodiments, the system, after having identified which patrons have checked into the stadium and/or have been upgraded, transmits a trivia question and/or additional advertisements to all patrons attending the game. In alternative embodiments, the information is transmitted to both patrons that are attending the game and additional patrons that have registered in the past to receive information but that are not attending the game. The participants can, for example, answer trivia questions and respond with their wireless device. Depending on whether the patron is attending the game or not, the system may determine to offer or deal with each of the patrons differently. For example, for patrons at the game, winners may be successively determined and narrowed, as patrons successfully and unsuccessfully answer questions, round after round of questions in a "spelling bee" format. For patrons that are not attending the game, winners may be declared, or statistics provided to the broadcast station that can be aired on television. In yet additional alternative embodiments, instead of transmitting information/questions to the patrons via the wireless device, the information/questions are displayed on the stadium billboard for patrons at the game and/or on television for patrons that are watching the game on television. The patron can then merely respond via the device, e.g., the telephone accordingly via a voice-to-text system or via other mobile devices via text messaging.

In alternative embodiments, the present invention provides the advantage of additional advertising sponsorship to the venue. For example, in one embodiment, the venue is partitioned into different locations that may be assigned to different sponsors. In one embodiment, the sponsor that provides the most value may be assigned a certain number of premium seats that are not available to other sponsors.

For example, the sponsor may offer a discount on the upgrade if you are a Verizon or Verizon Wireless customer or they credit your cell account for each seat upgrade or you get say 30 free minutes, etc. In alternative embodiments, the present invention provides the advantage of one wireless provider to advertise on another wireless providers mobile phone or wireless device. For example, if Verizon Wireless is a sponsor of the upgrade system for a particular stadium, the present invention will still work with, for example, AT&T, SPRINT, and CINGULAR customers. An advertisement message sent with the upgrade offer may read on the AT&T phone, "brought to you by Verizon Wireless." In an alternative embodiment of the present invention, text messaging is optionally used for mobile phones to perform the message communication of the present invention. The user is only required, in one embodiment, to reply or respond with a "Yes" to accept the upgrade offer since the user has advantageously pre-registered with the system, thereby minimizing the required communication/input by the user. In an alternative embodiment, the user, instead of pre-registering with the system, is charged on their wireless or even regular telephone number bill when they accept the upgrade offer. Thus, the wireless system that either administers the user's regular or wireless account or the upgrade sponsor may be responsible for actually billing the customer in this alternative embodiment.

In the alternative embodiment when text messaging is optionally used alone or in combination with other communication methods, the system provides the additional advantage of maximizing bandwidth usage by not requiring use of bandwidth on the wireless voice system, thereby maximizing system resources.

In another alternative embodiment, the present invention optionally and advantageously provides a security and/or safety feature in the event of, for example, a minor event where a parent gets separated from a child, a disaster or other event that might require evacuation of the stadium. In one embodiment, the person needing help provides their name to an attendant that can search the system for the contact information of their companion/parent. The system can thereafter send an email and/or text message to the companion/parent regarding the status of that person and provide instructions for meeting that person or arranging help, authorizing medical procedures, and the like. In another embodiment, the person requiring help, e.g., a child provides the attendant or kiosk with their ticket which can, e.g., scan the bar code or other reader system. The system can either automatically provide a text message to the parent who can then reply to the child/attendant via the kiosk to meet the child.

Alternatively, the parent can be instructed to meet the child at a predetermined location, and to stop looking for the child because the child was found. Thus, for this example, the person who is lost or separated from their party can notify security or access a kiosk. Security can, for example, notify the parent that child is in safe custody, and should not search the stadium, and therefore, meet outside stadium in a prespecified safe place.

In an alternative embodiment, if a child/person is separated, the security guard/kiosk can arrange the best place to meet, either in or outside the stadium, together based on an optional global positioning system (GPS). In addition, the party with the mobile device can be provided directions on where to go to meet their party from who they have been separated.

In an alternative embodiment, the present invention may also be used in a security, defense and/or safety setting to direct patrons in a stadium for an orderly evacuation or notify patrons regarding status of a safety related event via, for example, a broadcast message including text message, email and the like. In this manner, system communication resources may be most efficiently utilized by not over-utilizing the system via voice communication, unless completely necessary. For example, the message can be broadcast in the event of an impending hurricane. In this situation, patrons in different sections get different messages, for example, to exit the stadium out of gates/exits that are either less occupied or closest to the section the patrons are sitting in. Advantageously, the present invention has the patrons contact information, including optionally and advantageously text messaging, that can be broadcast or sent to different patrons. The advantage of text messaging is that the bandwidth is more efficiently used in the event of an emergency, and there are no busy signals as in a voice network. Further, the message is send, and if the network is at capacity, the system can automatically resend or the message will be placed in queue and sent as soon as capacity becomes available.

In another alternative embodiment of the invention, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction.

For instance, in sporting venues the bracelet ticket includes the machine readable information that comprises at least one of a bar code and radio frequency identifier used for security check in, and optionally check out. In this manner, the standard reading machines that can scan the bar code or RFID information can keep track of people that have checked into the sporting event and/or venue. Advantageously, the machine readable information on the bracelet can also be used by the venue in the event the patrons seat assignment is modified, for example, via an electronic ticket exchange or upgrade program. In this embodiment, the visible indicia are no longer valid for the actual seating that may be dynamically changed and only represents optionally an initial seat assignment. However, the machine readable information may be used as a code to reference the specific patron and assign that patron a new seat. Thus, when the ticket reader scans the ticket and actually identifies, for example, the bar code, this information can be used to reference the patron, update and/or confirm the patron's current seat via the reader used, for example, by ushers in the venue, kiosk, entrance to the venue, and the like.

In an alternative embodiment, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction. This information, as previously mentioned, may be visually cognizable for the patron and in combination, readable by electronic means if the bracelet includes a magnetic strip, bar code imprinting, or RF chip.

In an alternative embodiment of the present invention, the security bracelet and ticket combination of the present invention advantageously includes a bar code or other machine readable information such as a RFID device. When, for example, a child is separated form their parent, the parent can notify security and the seat number associated with the child. If the child attempts to leave with their bar code/identifier, the system detects the bar code/identifier as either being valid and identifying the child that is missing or being invalid and raising another red flag. In an alternative embodiment, the bar codes/identifiers associated between children and adults correspond such that the child identifier must be within a predetermined time and/or number of checking out identifiers from/within the adult identifier. If this does not occur, the system determines that the child is leaving without their parent, and possibly being abducted.

In an alternative embodiment, the system links one or more tickets/identifiers together and requires the tickets/identifiers to exit the venue or event within a predetermined time period from one another and/or within a predetermined number of tickets/identifiers that have exited the venue and/or event. In the event that one ticket/identifier exits the venue or event and the associated identifier does not, then an alarm or other indictor occurs, and the attendants will detain the patrons that have initiated the alarm to for security purposes.

In an alternative embodiment, the tickets are advantageously coded with designations such as adult, child and the like. In the event a child ticket/identifier exits the stadium before the associated adult and/or more that a predetermined time period and/or number of patrons exiting, the system can initiate an alarm so that an attendant can determine if a child has exited the venue or event without their parent or with a wrong parent potentially averting a kidnapping. In this embodiment, an additional combination is the use of the standard fast pass feature, for example, at theme parks, and the like, where the venue records predetermined events that the user of the card enters in a faster line. In this embodiment, if a child ticket/identifier is not associated with a parent ticket/identifier, for example, as described above, the child may be denied entry into the event or venue if not accompanied by their parent. In alternative embodiments, the venue/event sponsor or organizer associates tickets upon request from the patron. In addition, in another alternative embodiment, a kiosk is provided inside and/or outside the venue for, for example, parents to register their tickets and have them associated with their children's tickets to prevent the child from exiting the venue without them, for example, as described above.

In an alternative embodiment of the present invention, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In another alternative embodiment of the present invention, a security bracelet is advantageously utilized, for example, such as the security bracelet disclosed in U.S. application Ser. No. 10/680,207, filed on Oct. 8, 2003, to Abraham I. Reifer, et al., and incorporated herein by reference, in the event of a reported event, security breach, abduction, and the like. In this embodiment, all patrons exiting the stadium must show their ticket and/or identifier so that the venue can check all patrons out of the stadium. Thus, for example, if two kidnappers come in the stadium, and want to use one bracelet for a child, the second kidnapper will be stranded in the stadium. In addition, if one kidnapper buys two tickets, then upon exit with the child and the additional ticket, a barcode/identifier will be exiting without ever having checked in, and then the alarm will go off as well.

In another alternative embodiment, the present invention provides a broadcast message to warn patrons of an event, such as an advertisement, sale and/or even a weather related event such as a hurricane that might require the venue to be evacuated. Advantageously, in at least one embodiment, the broadcast message comprises standard text messaging that optimizes or better utilizes capacity form the communication system. Thus, when using text messaging capabilities, the present invention efficiently transmits text messages to numerous subscribers regarding, for example, exit information, contacting and/or meeting additional parties that have been separated, and the like.

In an alternative embodiment of the present invention, the present invention optionally provides the capability to penetrate into secondary market with season ticket holders selling ahead of time the games they will not be attending. For example, the present invention optionally provides the feature for the season ticket holder and/or general ticket purchaser the ability to view in advance of the season and/or game the schedule, and to alert the venue and/or stadium of games and/or events they will not be attending, thereby permitting the stadium/venue to attempt to resell the tickets to other patrons. For example, in one embodiment of the invention, the patron is provided with a monthly schedule listing the events that may be attended. The patron, such as a season ticket holder, may then click or place an indicator on all games they will not be attending for the season in advance, thereby providing the stadium with the ability to resell tickets well in advance of the event. Once the patron completes identifying games that will not be attended, the system then compiles a list and transmits the list to the patron for an optional confirmation. This list is then used by the system to release seats well in advance of the game. In an alternative embodiment of the invention, registered users of the system for, for example, upgrades, may also be notified of seat availability for sales prior to the game/event. In an alternative of this embodiment, registered users may receive text messages, emails, and the like, notifying them advantageously of the availability of seats that heretofore have never been easily available to the public for sale, thereby allowing the venue to participate in secondary market ticket sales.

In one alternative embodiment of the present invention, the system/process of the present invention provides or operates as a middle person/broker between the ticket holder that is returning tickets to the venue, such as the season ticket holder, and a ticket sales system and/or company, such as tickets.com, by notifying the tickets company of the newly available seats via notification by the ticket holder, such as the season ticket holder of season ticket games not being attended.

In one alternative embodiment of the invention, the system and/or process transmits text messages, emails and the like, to offer tickets and/or seats and/or admittance to subscribers for events and/or games with empty seats even before game. Thus, the present invention allows the venue to participate in the secondary ticket sales market and the upgrade market, thereby increasing revenue and fan loyalty.

Of course, all of the embodiments of the present invention may be used for any reserved seating event, and/or venue that require tickets for entry thereof.

In another alternative embodiment of the present invention, the use of machine readable identifiers provides advantages for, for example, the upgrade program or ticket exchange of the present invention. For example, when the upgrade, reallocation and/or electronic ticket is issued, the machine readable identifier, for example, the bar code, on the original ticket is invalidated, thereby preventing use of the invalidated ticket. Accordingly, when a new ticket holder purchases the ticket form the season ticket holder, the new purchaser will be issued a new machine readable identifier, and optionally a new paper ticket. The present invention advantageously is able to handle the issuance of a new ticket and invalidates the old ticket and optionally the old identifier that has, for example, been returned by the season ticket holder, thereby providing dynamic ticketing capability.

In an alternative embodiment of the present invention, the new patron obtains a new identifier such as a barcode, the old bar code of, for example, the season ticket holder is invalidated. In one embodiment of the invention, season ticket holders are offered to opt in the upgrade process. Various commercial incentives are possible for the season ticket holder to opt in the upgrade process, such as monetary compensation when their ticket is used for an upgrade and/or resold whether they express their intention not to go to the game prior to the game, and the like. Alternatively, season ticket holders may be offered that the cost of their season tickets will, for example, remain the same as the previous year or be reduced if they participate in the program. Therefore, the combination season ticket trade-in and upgrade program in one embodiment of the invention will be beneficial to season ticket holders by allowing them to trade when they already know that they have no intention of attending a game, and allow the season ticket holder to recoup some cost of the season tickets if they do not attend and their ticket is used as an upgrade. In addition, additional patrons of the event and/or sports team are permitted to attend the game in locations/seats that they might never have been able to obtain access to. Further, the venue/stadium/team maximize revenues by being able to place tickets on the secondary market when the ticket holder notifies the venue early enough that they are not attending the event, the venue also obtains additional revenue from upgrades when tickets are upgraded, and the venue obtains additional fan loyalty.

In another embodiment of the present invention, the system provides the ability to advertise via email, text messaging, and the like, for one wireless carrier on the wireless device that is using another wireless carrier. Since the user of the wireless device has requested the service, the user appropriately receives the communication from the ticketing system of the present invention, and therefore, also appropriately received the advertisement from the wireless carrier that is different than the wireless carrier that the user of the wireless may be using at that time.

In another alternative embodiment of the present invention, offers to purchase seats either during the game or even well in advance of the game are "pushed" or transmitted out to registered users that have supplied their wireless and/or Internet addresses. For example, patrons can register in advance for the upgrade and/or regular ticket offers to purchase admittance via various methods including the Internet. When seats band/or admittance becomes available, a broadcast message or other standard messages may be transmitted to the registered patrons to notify them of the seat availability. Thus, seat offers are "pushed" to registered users that have requested this service advantageously to a wireless device and/or other address including standard telephone communication, as well as additional optional advertisements. The system, in one alternative embodiment, provides the user the option when registering to accept certain types of advertisements to be received on their wireless device via email and/or text messaging. In other embodiments, the user does not have the option of which advertisements to receive.

Advantageously, in accordance with one alternative embodiment of the present invention, if a patron decides to attend an event such as a sporting event when the patron does not have time to wait to receive paper tickets (e.g., the patron is visiting in another city/location and does not have time to wait to receive tickets via mail and is on the go), the system of the present invention transmits a ticket to the patron via, for example, a wireless communication system and/or other standard electronic communication system such as the Internet, and the patron can present their ticket, for example, on their wireless device and show up to game.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Patrons then text message and/or email and/or answer questions via voice-to-text messaging their answers. The system can then display the overall number of answers that are correct and incorrect, display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game.

The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another alternative embodiment of the present invention, the system uses a seat database to determine which of the reserved seats are currently in use. The system may integrate with the seat database system of a venue and/or stadium or optionally be used in parallel with the seat venue/stadium database. For example, prior to the event, the system may utilize the seat database of the venue to determine available seating and patrons that do not show up after a predetermined period of time. Alternatively, the present invention can operate using a separate database from the event/venue by copying or building a separate database used for the ticketing and/or upgrading according to the present invention. In this alternative, as patrons enter the venue, they are checked in directly to this separate database. At the time of the event, the system will be able to check-in patrons using either the identification system, e.g., bar code scanner, of the event or venue, or provide a separate identification system.

In alternative embodiments of the invention, the patron that knows they are attending the game but is going to be late can send in a HOLD message even prior to being provided a warning message that their seats are to be released if the patron does not respond to the message with the HOLD request. That is, in this embodiment, since the patron already knows well in advance that they are attending the game, but perhaps stuck in traffic, the patron can initiate the HOLD message before even being warned in advance of the possibility of their seat being released.

In another alternative embodiment, patrons that have registered with the system and optionally checked into the stadium and/or venue in advance and who also know that they would like an upgrade and/or ticket, may initiate their own upgrade request to the system to notify the system of their willingness to purchase an upgrade and/or new ticket for the event/venue. The system may then place these patrons on a higher priority since they have already expressed and intent and/or willingness to purchase the upgrade or ticket. The patron may notify the event and/or stadium of their willingness optionally well in advance of the game or near/after game time at a time which the patron commits or expresses an additional heightened desire to upgrade and/or purchase a ticket.

In alternative embodiments, the system includes the advantage of allowing patrons to register free for a predetermined period of time, for example, for the first year, without paying a yearly subscriber fee. Alternatively and/or in addition thereto, the system provides the patron with their first upgrade for free or for a reduced rate to further encourage the patron to register with the system and method of the present invention. Alternatively and/or in addition thereto, the system of the present invention offers the patron reduced and/or free concessions when purchasing a membership, ticket and/or upgrade to further encourage the patron to participate in the offers of the present invention.

In alternative embodiments of the present invention, the matching system and/or process, permits participants in the program to initiate a message to the system with the seat location and/or name of the patron that they would like to be matched with for a meeting, networking and/or socializing such as a date. In this embodiment, the system may the push the message to the other subscriber and assign new seats to the individuals that are to be matched. Alternatively, the system Need not require a specific confirmation that the second individual to be notified of the potential match is physically located near the first individual, but can rely on the first individual to provide that information. For example, the first individual may see a potential date in a restaurant, and may then send a message to the system with that person's name or address, that they would like to meet that other individual. In that situation, the second individual will receive a message of the possible match, and can respond and accept or reject the offer to meet. The second individual can then provide a meeting destination or the system can suggest a meeting place based on the first individual advising the system of their location, and the location of the second individual.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Advantageously, the multiple choice questions each have unique selections, such as a1, b1, c1 and d1 for question #1; a2, b2, c2, and d2 for question #2; a3, b3, c3 and d3 for question #3, and the like. In this embodiment, the actual timing of questions is not necessary since each question and answer is unique. Therefore, the speed of responding to the question is immaterial to the winner of the contest and/or correct answer. Also, in the event one patron answers the question late, there will be no confusion which question the patron is submitting an answer for. Patrons text message and/or email and/or answer questions via voice-to-text messaging their answers as indicated above using the unique set of answers, in one embodiment. In alternative embodiments, the first predetermined number of patrons that answer the question correctly are considered the winners.

The system can then display the overall number of answers that are correct and incorrect, e.g., a1 50%, b1 28%, c1 12% and d1 10%, and display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another embodiment of the invention in connection with the seating upgrade and/or assignment system, an identifier and/or machine identifier such as a bar code, RFID, etc. optionally remains static for the user on the user's ticket and/or device that is provided for optional paperless ticketing. For example, the identifier will remain the same associated with the user, but the seat assignment, privileges, user characteristics, user preferences, and the like, may be dynamically changes. The system and method of the present invention will be updated so that the identifier can represent a dynamic seat assignment or other dynamic information, such as general admission to an associated event, or other event and/or venue, including, for example, a restaurant, bar, and the like.

In another embodiment of the present invention, the upgrades process and/or feature may be provided to users/patrons as a complimentary reward for fan loyalty, to reward the user but also market other goods/services and/or other advertising opportunities to be transmitted via the wireless device and/or mobile phone. In one embodiment of the invention, the system and/or method initially queries the user, for example, at the beginning of the trivia contest and/or tournament or at the beginning of the game, whether the user is present in the stadium or not. The system can then perform, for example, the trivia contest, and determine a winner(s) to award for example some form of reward. Furthermore, in another embodiment of the invention, based on the number of people responding that they are present at the game, the present invention advantageously provides a random upgrade to a predetermined number of patrons as an additional fan loyalty program and/or advertising sponsorship to one or more entities that sponsor the free upgrades.

In another embodiment of the invention, a system and/or method is provided that advantageously builds and/or acquires and/or collects mobile contact addresses of users in an efficient manner. For example, in accordance with the present invention, a user advantageously need only provide the communication network and telephone number, and the present invention builds a data address therefrom. This allows the mobile or wireless device user to still register for a service without specifically knowing their data address for, for example, data communication such as SMS messaging, text messaging, email, and the like. In one embodiment, the mobile user is provided a drop down menu where the user selects the communication network and provides their mobile phone number.

The present invention is particularly advantageous currently with the recent enactment by the Federal Communications Commission (FCC) number portability where mobile phone users are able to transfer their existing numbers to other networks. Accordingly, we have determined that a user's number will advantageously provide a mode of contact for the user even when the user decides to change communication networks.

In one embodiment of the invention, the software processes and system determines and builds the actual messaging address (email, text, SMS, and the like) to send messages to the mobile device by the user only selecting and/or providing the communications network and the telephone number. Thus, the present invention advantageously simplifies the process for mobile or wireless device users to register and/or provide contact information, and therefore, beneficially increases the number of individuals that can effectively and easily register for a communication service.

In another embodiment, the present invention facilitates the ability for potential users to signup for the service of receiving, for example, trivia, upgrades and/or text messages via a user sign up device or apparatus. In one embodiment, the user sign up sheet includes numbers and/or circles that can be filled in like a grid, where the user can fill in or cover the numbers that identify their portable number. In addition, the user can check off the specific network carrier from a list of network carriers, or simply enter their specific network carrier. The user sign up sheet may be done electronically via a computer and user interface as described above, or may initially be filled out by a user via, for example, a piece of paper and then later entered into the computer system of the present invention.

In another embodiment of the invention, the system and method of the present invention is capable of re-locating a patron via the mobile address that was previously provided, even if the patron has changed wireless carriers. For example, in one embodiment, with the recent feature of mobile phone portability by the FCC, we have determined that a significant number of mobile phone users are likely never to change their number/address, and therefore, the system and method of the present invention is able to send text messages and/or email to all network addresses using the telephone number of the user if the system suspects that the previously provided network by the user is no longer being used. In this embodiment, the user can optionally respond to the message and/or network broadcast message, confirming that one of the messages has been received.

In another embodiment of the message, whenever a user wants to contact a mobile phone, mobile wireless device or even computer based, via for example, an Internet based account, wants to contact another mobile wireless device user, the present invention provides a transmission device, for example, via the Internet or individual models/mobile phones used for each of the networks to broadcast the message on all networks. Advantageously, in accordance with this embodiment, since the user is likely to maintain the same telephone number, their data or text messaging address will be their telephone number and one of the few network addresses. This type of broadcast message can happen anytime, and even for voice communication when the user of the wireless device needs to receive a data, text and/or voice message.

In another alternative embodiment of the invention, as described previously, the invention may be used by a patron to obtain specific data or information regarding sports or venue related information of interest. For example, patrons may communicate with the system and forward a player jersey number or number of racecar during an event such as a baseball game, football game, racing event such as Nascar, to obtain additional information including current statistics and past statistics. The present invention can then optionally sent statistics throughout the game or event to the patron without the patron requesting, for example, at specific time intervals or after notable achievements during the event, such as a home run, touch down, $7^{th}$ inning stretch, half time, number of laps traveled, and the like.

Thus, the present invention includes many variations in the type of information a user may receive, whether specifically checked into a venue or registered for the service for a particular event. In addition, the present invention includes various processes and systems for ensuring delivery of messages to patrons that have requested the service or merely sending messages that a patron may be interested in receiving.

In another embodiment of the invention, the matching and/or networking system includes the ability to contact and/or notify the users to coordinate the meeting using any one of a plurality of communication methods including text messaging, email and/or instant messaging, with the additional advantage of transmitting pictures, video and/or other data that provides additional information regarding the other person that has been suggested for the match and/or network. In one implementation of this embodiment, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. For example, different message transmit and/or receive formats may be used depending on the system. The present invention beneficially parses the various different formats to obtain the necessary information for the communications described herein. In addition, the present invention formats the messages for the different wireless devices so that the messages may be appropriately received even though different devices and/or communication networks have different messaging formats. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In accordance with another embodiment of the invention, the matching and/or networking system includes the option of permitting a subscriber to notify the system when they are ready for a potential meeting and/or match. Once the matching and/or networking system is notified of the subscriber requesting the match, the system is then capable of either tracking the user though a positioning system such as GPS, permitting the user to register at predetermined locations upon user initiation such as via Bluetooth, RFID, infrared, and the like. In accordance with this embodiment, the subscribers are not being constantly tracked, and therefore, maintain an additional level of privacy. In alternative embodiment, the present invention continuously tracks the subscribers without specifically requesting to be matched. In this alternative embodiment, the subscriber is provided with less privacy because they may be notified of a specific match even though they might not be interested in the match and/or meeting at that time.

In an alternative embodiment, the present invention provides subscribers with the ability to accept/reject the match before each of the subscribers receive personal information of the other and/or before the date/match has been arranged with at minimum a meeting location. In this embodiment, the invention requires that both users accept the match and/or date prior to notifying the subscribers of the contact information for each subscriber. Therefore, subscribers can optionally request additional information from the system of the present invention, even multiple times, to better understand the potential date and/or match before accepting, and importantly, before the other subscriber is provided contact information and/or a meeting location of the subscriber. In the embodiment where the present invention merely provides the meeting location, the present invention advantageously does not provide the subscribers contact information and/or other personal information before the match/date. Advantageously, in accordance with this embodiment of the invention, subscribers never receive personalized or personal contact information unless the subscribers, after meeting in person, agree to exchange such information.

In another embodiment of the invention, the dating and/or networking system provides subscribers the functionality to email, instant message and/or text message at least one additional piece of personal information and/or questions, optionally directly to each other or via the system anonymously, to obtain additional information that may be more relevant than the user profile or information from the user profile that was used to make the initial date/match.

In another embodiment of the dating and/or matching system of the present invention, the system optionally provides automatic and/or user initiated registration in a particular establishment and/or geographic location, which can be used instead of a location determination system such as GPS, or together with such system. This form of registration may be even more precise than GPS because it confirms a subscriber's presence within a specific store, establishment, entertainment establishment, restaurant, and the like. Thus, in these embodiments, the subscriber either initiates the registration as described above, or alternatively, if the subscriber optionally sets the wireless device to automatic registration based on the appearance at a predetermined registration area and/or location, the subscriber will be automatically registered to receive communications regarding a potential match/date.

In an alternative embodiment of the present invention, once the dating and/or matching system determines that a potential match/date has been detected, the system optionally notifies the different subscribers and asks whether they want to continue to participate in the matching/dating program. When both, some and/or all subscribers agree to participate, the present invention can forward to each subscriber automatically the information that each subscriber shares substantially in common and/or the information that was responsible for the match/date between the subscribers. In this embodiment of the invention, the subscribers will know immediately the information that should be most relevant in making the match/date and can determine whether to actually agree to either contact or send the other subscriber additional information and/or arrange to meet the subscriber at a pre-designated location.

In an alternative embodiment of the present invention, the present invention optionally includes the ability to recommend a potential meeting place for the subscribers to meet after determining that the subscribers have agreed to participate in the date/meeting. In this embodiment, the present invention advantageously determines the location based on, for example, subscriber preferences, geographic location that is preferential for at least one of the subscribers and/or both subscribers, predetermined location where, for example, a sponsor will receive patronage and/or provide a discount for the subscribers and/or actual pay the organizer of the dating/matching system an advertising fee to promote their sponsorship. Accordingly, the present invention advantageously determines not only a potential match/date, but advantageously suggests, recommends and/or determines a specific location and/or geographic location and/or restaurant, clothing store, zoo, museum, and/or other suitable location for the subscribers to meet and optionally based on geographic distance and/or location.

Additional dating and/or matching features and/or differentiators of the networking and/or dating system of the present invention include one or more of the following:

Wireless messaging platform supports interactive messaging

Wireless messaging platform provides simultaneous parallel applications to run without collision Multiple wireless initiatives or topics run without conflict Different initiatives or topics may be user specific or selectable While each initiative runs independently, there can be overlap in terms of customer base Platform is flexible to add/remove initiatives quickly and efficiently One wireless carrier/network can be a dating/matching sponsor and advertise on the wireless device and/or network of another wireless carrier/network Contact members to notify of the match/date to allow members to either directly contact each other or send additional information via, for example, text messaging, email, instant messaging, such as pictures, video, and the like Contact members or wait for request from members to participate in match/date initiative; can then automatically track member via GPS instead of constantly tracking member all the time, thereby increasing privacy of member Contact each subscriber that is being offered the date/match and obtain approval for the match prior to actually notifying potential members that match has been made Contact users after initial match has been conditionally approved, and provides users the capability to request additional information, such as personal information from the other member or other members which the requestor still wants to know before finally accepting the date/match Members can register or "check-in" at predetermined locations and/or establishments which is one additional level of specificity, for example, with regard to the location where a member is that may be interested in matching; For example, two or more members may actually be in the same restaurant where they can be informed of one or more other subscribers being present; members can register via sending a message to the system via text message, email, RFID, Bluetooth, and the like, either by initiating a registration or automatically Contact members after initial match has been conditionally approved and exchange, optionally automatically, profile information that was significant in making the match/date and/or other important information regarding a match/date that a member may want to know before finally accepting the match/date and/or information the members may want to know that is geared particularly for a first date, e.g., likes/dislikes, common interests, favorite foods, wines, alcoholic beverages, and the like Contact members to suggest and/or recommend and/or arrange meeting place based on, for example, geographic location, common interests/sports, common food tastes, common beverage tastes, common entertainment preferences and/or sponsors willing to, or interested in, being utilized for the match/date for the suggestion and/or recommendation, and optionally providing the members a discount and/or compensating by the sponsor to the networking and/or dating system proprietor for the advertising and/or recommendation to visit that sponsor Wireless messaging platform includes a protocol conversion server functioning to interface with a variety of wireless networks having different messaging characteristics for both transmitting and receiving messages, and parsing the different message formats for the content from a received message, and transmitting a message to a plurality of different networks and/or devices having different messaging and/or interface capabilities and/or functionality Contact members with a wireless consent form indicating that the matching/dating system and/or the members participating in the match/date have generally consented to potential cohabitation optionally without any recourse to the other party. Alternatively, the members may be contacted with other types of informed consent forms with limited recourse for acts and/or aggressive acts that are clearly assaults, but not sexual related misconduct or sexual related crimes that are felonious in nature carrying a high penalty/sentence. Alternatively, members may be presented with consent forms that eliminate any criminal penalty, but do not foreclose the possibility of civil lawsuits for damages relating to torts, and the like As another alternative and/or in addition thereto, members may be presented with consent forms that eliminate any civil penalty, but do not foreclose the possibility of criminal lawsuits for criminal type activities, perhaps with the exception of the most severe sexual crimes such as rape and/or sexual assault that carry significant prison time.

For example, athletes, celebrities, high worth individuals, or even average individuals, male or female, may be interested in the wireless consent initiative because that allows them more flexibility to meet a variety of individuals without the worry of later being sued. In additional alternative embodiments, broadcast messages may be transmitted to numerous individual that may be interested in meeting and/or dating a celebrity or predetermined individual or individuals. In this embodiment, the optimum matching individual or individuals may be selected to meet with the celebrity, celebrities, and the like, while utilizing the informed consent feature of the present invention. In another alternative embodiment, an individual or individuals may be randomly selected as part of a match or date, based on a lottery or other competition to meet or date a specific individual or individuals.

Additional optional hardware and software requirements are as follows for one or more embodiments of the present invention:

System Capabilities

Platform supports interactive messaging

Platform provides simultaneous parallel applications to run without collision

Multiple wireless initiatives or topics run without conflict

Different initiatives or topics may be user specific or selectable

While each initiative runs independently, there can be overlap in terms of customer base Platform is flexible to add/remove initiatives quickly and efficiently Wireless Initiatives Interactive trivia with fans inside and outside of the stadium Targeted messaging, e.g., targeted advertising Broadcast messaging, e.g., general advertising Interactive messaging, e.g., with concessions Profiling for each initiative or topic, e.g., based on network operator Urgent and emergency messaging Specific initiative: discounts for concessions and/or memorabilia Specific initiative: invite patrons to different activities before, during or after game, e.g., player loyalty, family activities, etc.

Specific initiative: seating upgrade program

Specific initiative: messaging patrons in one section and separate messaging to patrons in another section Specific initiative: messaging parent of a missing child Special initiative: dating where patrons can keep their seats to return to them, or their seats are re-allocated. In alternative embodiments, the patrons switch seats instead of moving to empty seats, either for the entire game or only a portion thereof with other patrons for match making possibilities.

Functional Specifications

Front end for user signup and profiling-secure site—for example, modeled after www.mlb.com, include one or more of:

type of seats does the customer want for upgrade (decks and range of sections)

information for dating concession profile capability for additional profile information validate user by sending message to device upon sign up auto append of network information to phone number during signup login and password protected site frames on website or interface that can be easily configured to have look and feel, for example, of particular baseball team capability for space on screen for advertising opportunity that can easily be modified and relatively dynamic capability to handle lost passwords web page or interface where customers with season tickets can mark a calendar with the seats they want to keep and the ones they are interested in freeing up for early sale or upgrade.

The optional Front End of the present invention used for administration and setting up parameter for each application, optionally includes a secure site, with one or more of the following:

application email address and password minutes for all the configuration parameters and/or functionality number of threads for each application for upgrades, at least one of releasing customers old seat immediately, or it until the customer approves of the release, or holding the customer's seat for a predetermined portion or all of the game, for example, in the dating functionality)

set schedule for games section rating setup, and seat upgrade pricing revenue allocation model provide a number of retries if message send failure Concessions The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

Concession Wireless Initiative

Purchased via cell phone

Web registration for preferences

Targeted concession offers

Confirmation that purchase is ready

Delivered to seat or ready for expedited pickup

Customer convenience: system identifies closest concessions to customer

Customer convenience: system determines concessions with short wait

Each concession labeled with a number for customer identification and fulfillment Customers can request menu, or register for each game to receive menu around game time via mobile device GPS can be used effectively to inform customer of closest concession stand to pickup order, and/or customer can provide section number and/or seat location for system to identify most convenient concession stand Most convenient concession stand can be determined based on one or more, or combination of, predetermined criteria, such as, closest concession location, shortest wait in line, specific item being ordered, and the like.

Interactive messaging, e.g., with concessions

Specific initiative: discounts for concessions and/or memorabilia

The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order? (a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

In one alternative embodiment, the following message exchanges may be used:

First Message

"In Game" Concessions

Menu will be sent soon!

Reply with #, item short form and seating section

Ex: BE=beer

Reply 3BE for 3 beers

408SEC for section 408

Powered by NEXTEL

Second Message (paper menu?)

Menu

BE=Beer; CO=Coke; DCO=Diet Coke

HD=Hot Dog; BUR=Burger

TA=Taco/Salsa; PO=Popcorn

FF=French Fries; CH=Chips

PZ=Pretzel; PT=Peanut

LEM=Lemon Ice

Third Message

Order received!

Summary:

3 HD @ $3=$9

2 CO @ $3=$6

2 LEM @ $3.50=$7

Total=$22

Reply Y to ACCEPT

Credit Card charged

N to CANCEL

Fourth Message

Thank you for ordering!

Your order has been confirmed!

Confirm # REIF1001

Powered by: THE SPORTS AUTHORITY!

Fifth Message

ORDER READY

Bring Confirm # REIF1001 to Concession # 33 by sect # 212

$2 off NIKE baseball gloves

Bring #NIKE305 and game ticket to

Any SPORTS AUTHORITY!

In another embodiment of the invention used in concessions initiative, the concession attendant receives the confirmation number or other identifying information from the customer when picking up the concessions. The concessions attendant enters the confirmation number or other identifying information when ready or optionally clicks on the order on the computer screen via a concessions interface associated therewith. From there, the order is then cleared from the system with respect to orders that require fulfillment, advantageously allowing the workers to streamline their work activities in the concessions. In an alternative embodiment, the concessions are actually delivered to the customer using the sutomer provided seating information, either provided by the customer through, for example, the wireless device or other registration and/or notification process, or even via a telephone call or automated attendant to associate with the order.

In another embodiment of the invention, the concessions menu is advantageously only delivered to customers that have entered the stadium via a location determination system, and/or checked into the stadium via a ticket reader/scanner. In alternative embodiments, all customers that have registered for the concessions service will receive an introductory message. Thus, customers that are not attending the game need only reply with a request to terminate the concessions service for that event and/or game.

In an alternative embodiment, the customer is advantageously directed to closest concessions via, for example, GPS chip in phone or by knowing where the customer sits at check in, or by having the customer input their seat location or location where they would like to pickup the concessions.

In another embodiment of the invention, we have determined that some mobile phones will utilize different transmit and receive addresses, and therefore, a user may not know how to appropriately register to be a subscriber for one or more wireless initiatives. For example, we have determined that some mobile phone networks utilize slightly different or different electronic addresses for the transmitting and receiving of electronic messages. For example, for the Research In Motion (RIM) Blackberry communication service, the mobile device is assigned a desktop email address. In one configuration of Blackberry, the mobile device only has one address. However, in the non-integrated configuration, the mobile device actually has a separate address when transmitting from the receive address.

In accordance with this embodiment of the invention, the user registers by providing their mobile phone number and optionally a network carrier for same. In this embodiment, the mobile phone user registers with their phone number and optionally wireless network provider. The registration system of the present invention then sends a message to the mobile device, requesting that the mobile device respond, optionally with a predetermined code and/or predetermined message. The mobile device then responds to the registration system, and the registration system corresponds the mobile device response with the original registered mobile address, thereby completing the registration process by ensuring that responses received from the mobile device can be mapped appropriately to the mobile subscriber. In the embodiment where the mobile user is requested to provide a predetermined code and/or message, the registration system uses the predetermined code to map the mobile phone response potentially having a different address with the transmit address provided by the user.

Dating, Matchmaking and/or Networking

In another embodiment of the invention, patrons are provided the opportunity to meet others in the venue or at a predesignated location near or away from the venue using standard matching rules. In one embodiment, the presence of the user is detected when entering the stadium, for example, via the ticket entrance systems. In another embodiment, the presence of the patron is detected or determined based on a message that is send to the user, for example, either right before, during or after the game. In this embodiment, the user can be prompted with a request whether they would like to participation the matchmaking, dating and/or networking program.

For example, potential business or social partners may be selected or prompted for networking or dating. When the user responds yes, in this embodiment, their current seat is irrelevant if that seat is not to be released for another patron. Therefore, the system need only select a new set of seats for the networking and/or dating for the patrons, transmit the patrons the additional new seats via, for example, a wireless ticket, update the venue seating database for subsequent verification by the ushers when seating the patrons. The patrons may then proceed to the new location and have a meeting or date, and then return to their original seats if desired.

In another embodiment, a “burnt bridge” approach or feature is provided where the original seats for the patrons that are meeting are then released for other upgrade and/or networking programs. In this embodiment, the original seat of the patron must be known for example, via check-in procedure, registration for the program in advance for example over the web registration process or other registration process, or via the patron responding to the system with their wireless device of their current seat location. Alternate combinations or modifications of the above embodiments is also used.

Trivia

In the alternative embodiment of providing the user trivia information, based on registration and/or location, for example, while attending the game, watching the game at home, or any time prior to or after the game, the user may be provided with questions, as described above, to answer as part of a tournament and/or to be eligible for prizes, awards, and the like. In one embodiment, a section or portion of the users are targeted for the questions together, while other sections and/or portions of the users are targeted at a time period thereafter, for example, 1 minute later, to stagger the communication and transmission of data, thereby reducing congestion and/or unnecessary hardware to accomplish the transmission and acceptance of information to/from the patron.

In one embodiment, while all the questions are staggered over a predetermined period of time to the patrons, whether limited to patrons in the stadium, out of the stadium and/or both, the patrons are not notified whether their answer is correct until after all questions have been transmitted, and all patrons are provided the opportunity and/or sufficient time to respond. Once that predetermined time period has elapsed, the patrons will be notified whether their answer was correct, and whether they are still in the tournament. In optional embodiments, a predetermined time period will again elapse until new questions are sent and the tournament continues.

Optional Oracle or My SQL Database

In one embodiment of the invention, an Oracle or My SQL Database is used in connection with the present invention. In one embodiment, the result set is set to be proportionally with respect to the number of users and/or data that will be stored in the system. In another embodiment, the database is optionally partitioned for specific games and/or initiatives or groups of games and/or initiatives. The system is preferably thread safe when running the games and/or initiatives. The system is optionally integrated with Credit Card for payment, and/or integrated with the venue ticket system and/or point of sale system to optionally determine who came in and when into the venue. In another embodiment, the present invention maintains and updates financial balances for users, such as patrons and stadiums. In alternative embodiments, secure interaction with ushers and an interactive kiosk is provided.

The present invention optionally provides any standard algorithm for partitioning of group of seats and users, for example, for system resource allocation, load balancing and/or division of system functionality. In alternative embodiments, a local kiosk for the stadium and/or venue is provided where the user can enter information, such as register for one or more initiatives and/or programs. In alternative embodiments, the system of the present invention includes the capability of offering for sale seats which are not currently sold via messaging to wireless devices, such as text messaging to mobile phones, or other messaging and/or wireless communication to wireless devices, and consideration. In alternative embodiments of the invention, standard algorithms such as used in the airline industry may be used to overbook seats for the venue, and consideration.

In alternative embodiment of the invention, instant messaging or any type of communication method can be used in the present invention, include local and/or global networks, such as the Internet, LANs, WANs, WAP, 811.02a, 802.11b, 802.11g networks, and the like.

Messaging Software Requirements

Trivia and/or other messaging products/initiatives are Java applications that run in a J2EE application server and utilize a JDBC 2.0 compliant relational database. There are typically open source options available for system support. Currently for development and test environments we utilize are desktop environments running Windows 2000 with the open source options below. The draw back is that open source options typically don't provide formal system support approaches, although we have found the software to be very reliable and would recommend this approach for early stage pilots. Should the customer prefer purchase software options for these components are provided as well.

I. Server Software Specifications

Alternative A—Open Source Approach (1) Web/Application Server—Tomcat 4.1.18

(2) Database—MySQL 4.0

(3) Windows 2000 Server for each server

Alternative B—Purchased Product Approach (1) Application Server—Websphere Application Server 5.0

(2) Database—Oracle 9i DBMS (3) Windows 2000 Server for each server

II. Server Hardware Specifications (4) Each of the HW Servers specification:
- (i) 2xCPU—P4 2.4 GHz Xeon
- (ii) 2 GB RAM
- (iii) Monitor
- (iv) CD ROM
- (v) Floppy Drive
- (vi) Hard Drive depending on volume (see below)

III. Communication Specifications (5) POP3 Account and SMTP server accounts that can support number of active subscribers (6) Dedicated T1 access to POP3 and SMTP provider IV. Hardware and Software Sizing Configurations Phase 1:

1K-10K subscribers and players during the game

Two Servers

Server 1—runs Web/Application Server for the website and the Trivia Application

Server 2—runs the Database server (20 Gig)

Phase 2:

10K-25K subscribers and players during the game

Server 1—runs Application Server for the Website front end

Servers 2 and 3 (2 Servers)—run the Application Server for Trivia Application (two servers are used handle load balancing)

Server 4—runs the Database server (50 gig) (Level 1 RAID 2×50G Array)

(Server 5—used as a backup to server 4—depending upon Reliability requirements)

Phase 3:

25K-50K subscribers and players during the game

Server 1—runs Application Server to run the Website front end

Servers 2, 3, 4 and 5—run the Application Server for Trivia Application (four servers are used to handle load balancing with hardware and software clustering)

Server 6—Database Server—150 gig (Level 0+1 RAID 6*50G Array)

(Server 7—used as a backup to server 6—depending upon reliability requirements).

In one alternative embodiment, as part of the sign up for trivia the system optionally asks the general admission or season ticket holders to input their seats to simplify how the system obtains information where the patron is being seated when they come to the game. In an alternative embodiment, the system obtains this information from the stadium database system, kiosk where the patron can enter the information at the stadium and/or via the point of sales system by the service personnel or attendant that is selling the tickets. Using any of the above methods, once the system knows where the patron is/are seating when present at the game, the system can then target sections of the stadium for, for example, the trivia quiz or other service/offering to the patrons.

Examples of different sections that can be separately targeted include for baseball, behind first base line first, behind home plate second, first base line third—all lower deck; same sections for upper deck and bleachers. Other sports may include football, hockey, soccer, basketball, and the like. In accordance with this embodiment, targeting different sections over different periods of time, thereby preventing a long delay to receive answers once the question is transmitted, may minimize collusion among patrons.

Thus, by segmenting the stadium over a few minutes in accordance with one embodiment of the invention, the present invention may increase the window of transmission to, for example, 2 minutes or more for the first round. As the rounds get successively smaller, the present invention will transmit messages faster. The present invention also provides optional winners for different sections of the field. In addition, the section winners can further optionally compete against each other, for example, the first class seating winner can further compete against the bleachers winner, and the like.

As discussed above, one or more of the above alternative embodiments may be incorporated into the embodiments described above, and/or any of the embodiments discussed below. Furthermore, any of the embodiments of the present invention may be used for any reserved seating event.

Figure 26:
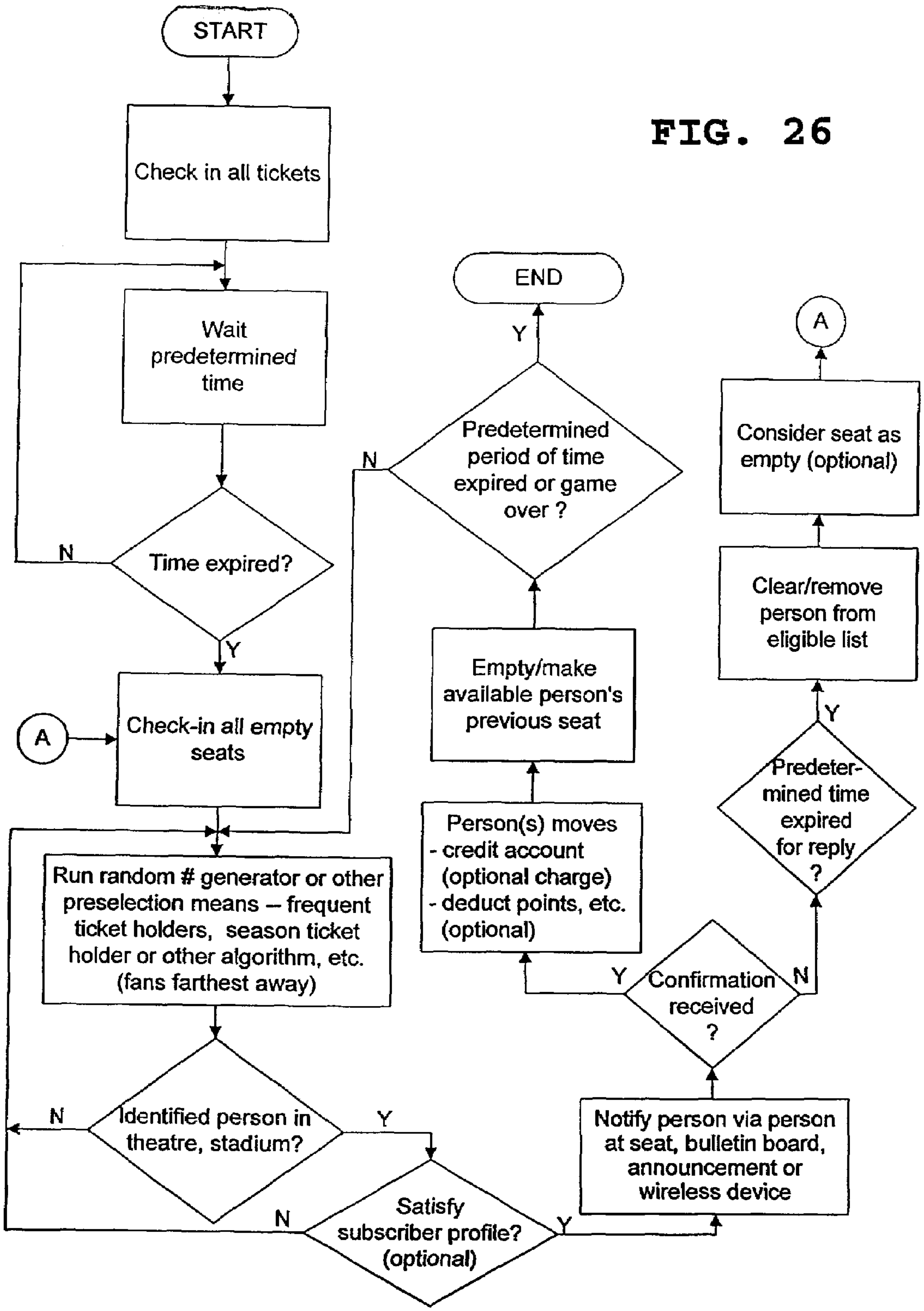

FIG. 26 is a flowchart of a fourth embodiment of the invention. In FIG. 26, the process begins as all tickets are checked in, for example, as the patrons enter the reserved seating area, such as a stadium or theater, through, for example, bar code readers, scanners, infrared readers, and/or manually or other method where the patron is checked in, either at the gate, seat or other location. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seats for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, or other predetermined process.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or more means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

If no confirmation is received from the patron for a predetermined period of time, the re-allocation process continues to wait until the predetermined period of time has expired. Once the predetermined period of time has expired and there is no response received from the patron provided with the option of changing their seat, the patron is cleared or removed from the eligible list, and the seat is considered or assigned empty status for the re-allocation algorithm to be again implemented.

If the patron accepts and a confirmation is received, payment of money or other means may be effectuated on the spot via the wireless device, credit card, debit card, points, and the like, and the patron may now move to the other seat. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

Of course, the re-allocation algorithm does not have to be run or implemented one patron at a time, but may be run to re-allocate or re-assign a plurality of patrons. If one patron or higher priority patron does not accept, then the next already generated patron may be queried to determine whether the next patron desires the seat re-allocation. Further, the system optionally downloads instructions on how to get to the new location, and can provide step-by-step instructions using an optional standard global positioning system (GPS) incorporated in, or as a separate accessory to, the wireless device.

In accordance with the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that may be in the vicinity of the stadium but were unable to get seats. Since the present invention re-allocates and/or sells tickets very near to game time in accordance with one embodiment, the patron must be in the general vicinity of the stadium to take advantage of this embodiment of the invention.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron to help the patron decide the quality of the upgrade and whether to accept.

In one alternative embodiment, if the patron that has their ticket re-allocated in error, e.g., because the patron did not show up to the event based on the predetermined criteria but the patron was still planning on attending because they forgot about their seat being re-allocated, the system can re-allocate seats immediately upon the checking in of the patron and notify them that their seats have changed because they are late. In this situation, the stadium/venue might decide to further upgrade the patrons because of the mistake.

In accordance with one embodiment of the present invention, the process of the present invention specifically reserves seats of the highest or very high rating that are considered preferred, in the event a patron's seat is re-allocated prematurely or erroneously. In this situation, the patron who has had their seat re-allocated because they will likely receive an even better seat as a result of the mistaken (stadium or patron) or premature seat re-allocation.

In another embodiment of the present invention, as patrons are entering the venue or stadium, they are provided advantageously with a map of the stadium so patrons can analyze the potential upgrade to make a decision whether the upgraded seats are sufficiently good or of value to warrant the patron moving and/or paying for the additional upgrade. By handing the patron the map of the stadium, the process of the present invention is not required to transmit a detailed schematic to the patron's wireless device which would not normally be able to effectively permit the patron to evaluate the proposed upgrade seats. The map that is handed out may optionally include information for patrons on where to register for the upgrade and/or additional advertisement opportunities.

In one alternative embodiment, the patron that has purchased the ticket, for example, a season ticket holder, may advise the stadium that for a particular game, set of games or all games, they do not want their seats to be re-allocated, and perhaps, an additional fee is assessed for this type of patron. If the stadium provides the ability for the patron to selectively opt out of the seat re-allocation, the patron can, for example, connect to the system via the Internet, public switched telephone network, cellular network, and the like, and notify the system that they do not want their ticket re-allocated, for example, because they are coming late to the event. Other means of notifying the system and/or other reasons may be utilized in connection with the present invention.

In another alternative embodiment, the system provides patrons the ability to individually select when their tickets may be re-allocated. For example, one patron may prefer to only give up their ticket if they are late to the game by 15 minutes, while another patron may be willing to give up their ticket if they have not arrived 15 minutes before the game. In alternative embodiments, the stadium may provide incentives for the patron to have their ticket re-allocated prior to the game because it increases the stadiums chances of re-allocating/re-selling the ticket.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provide additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In an alternative embodiment, the system determines priority of re-allocation of seats based first upon patrons that have seats that may also be re-allocated. That is, the systems attempts to maximize the number of re-allocations by prioritizing the re-allocation based upon seats that may be re-allocated after already being re-allocated. For example, if front row seats in a stadium are available to be re-allocated, in this alternative embodiment, patrons that are in the next closest section for example on the field level would be upgraded first to those seats. Then, patrons with less preferred seats, for example, in the upper deck would be re-allocated to the seats that have now become available from the patrons that have been upgraded to the front row. Thus, using this alternative priority scheme, the present invention maximizes the re-allocation numbers. Of course, this priority algorithm may be combined with additional factors, for example, relating to subscriber/patron value. As described above, additional factors may be utilized in the algorithm to determine the subscriber or set of subscribers to offer the upgrade.

In alternative embodiments, patrons in the vicinity of the upgraded and re-allocated patrons may optionally rate the upgraded patron, for example, for appropriate behavior, wearing of excessively large hats, drunkenness behavior, and the like. These ratings may then be taken into account in the re-allocation algorithm for future upgrades to the patron.

In alternative embodiments, the patrons eligible for the upgrade may be notified using standard email communications over a wireless device, mobile telephone, and/or other standard communication means. For example, standard text-to-voice and/or voice-to-text communications may be used to contact the patron to evaluate whether an upgrade will be accepted and to actually accept the upgrade.

In another embodiment of the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that have already purchased tickets in the vicinity of the stadium but were unable to get seats and/or may be in the vicinity of the stadium but were unable to get seats. Since the present invention re-allocates and/or sells tickets at any time prior to and/or after beginning of game time in accordance with one embodiment, the patron may be in the general vicinity of the stadium to take advantage of this embodiment of the invention or even at any location when being offered upgrades and/or seats well in advance of the game. For example, the present invention can upgrade or sell tickets to patrons well in advance of the game since it advantageously is permitted or has the authority to resell tickets either via ticket holders that do not show up during the game and/or, for example, season ticket holders that have authorized the stadium in advance to resell their tickets based on predetermined criteria, for example, when the season ticket holder notifies the stadium that they will not be present at next weeks game.

In one optional embodiment of the invention, the patron presents the usher with the confirmation number which the usher can enter into a wireless device using a local or private wireless network, or can simply use a walkie talkie or telephone to call the dispatcher to confirm the upgrade and/or new seats using the customer provided confirmation number. The dispatcher will have access to the system to enter the confirmation number to confirm the validity of the upgrade. Alternatively, a patron will retain their old ticket. The patron will give in the old ticket to the usher which is scanned or barcoded by the usher for immediate identification of new seats and used in place of, or in addition to, confirmation number.

Of course, the confirmation may optionally be made via customer name with an appropriate identification card or other information. Further, alternative methods may be used to verify that the confirmation number and/or ticket being used by the patron is valid. For example, the patron may be equipped with a printing device associated with the wireless device or download an actual ticket on line from home prior to the game for the new ticket or upgrade. Alternatively, the patron may be equipped with an identifier card, optionally including a bar code with a unique identifier relating to the patron's account information and profile that can be scanned for additional convenience. Alternatively, a wireless device may be used to securely store this type of identification and/or account information.

In at least one alternative embodiment of the invention, the patron may comprise optionally a corporate account that has a number of tickets, for example, season tickets. In this embodiment, the corporate account may have associated therewith a plurality of email addresses or other communication addresses to transmit the seat or upgrade offer to a number of potential patrons that may rotate their attendance at the games. In accordance with this optional embodiment, multiple emails can be stored for a single user/corporate account, and the system may transmit individual messages to all email addresses, or may only transmit messages to individual patrons for corporate account that individually advise the system that they are associated with a particular ticket/bar code for a particular game and will be/are present at a particular game.

In an alternative embodiment, patrons may enter the stadium and subsequently inform the system that they are present and interested in an upgrade via a kiosk where the patron can scan a bar code and enter their customer number to be eligible for upgrades during the game. The system is then able to transmit a message to the customer, assuming that the customer has pre-registered with the system with the appropriate contact information. Alternatively, or in addition to individual use of a kiosk(s), the customer sales office may have a kiosk or additional functionality to enter the customer name and/or customer account and scan in the bar coded ticket on the spot to register each patron as they enter the stadium or venue.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron upon entry in the stadium to help the patron decide the quality of the upgrade and whether to accept when an offer is received by the patron at a predetermined time. The graphical map may comprise a small booklet with a map of the stadium showing seat locations, and optionally a game schedule.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provides additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In alternative embodiments, patrons in the vicinity of the upgraded and re-allocated patrons may optionally be eligible for a dating or matching service where patrons register and provide profile information to the system and/or through a third service provider dating service. Once the system knows that the patrons will be coming to the game and/or have actually checked in to the stadium, the system can then arrange for the two, four, etc. patrons to meet each other by allocating and/or re-allocating seats to the patrons together. Thus, based on profile information, customer request and availability, the system is able to upgrade or sell tickets to patrons to maximize their chances of meeting someone at the game. This optional feature provides significant potential enjoyment for the patrons participating in this dating or connection program. In accordance with this embodiment, one possible sequence of acceptance steps involves profile matching the two patrons (or groups of patrons) based on predetermined profile information; transmitting a first message to the first patron regarding availability of the second patron and requesting a conditional acceptance form the first patron; transmitting a second message to the second patron indicating that the first patron has conditionally accepted and request the second patron to accept; and when the second patron accepts before the first patron has rescinded the conditional acceptance, finalizing the upgrade and/or seat allocation for the first and second patrons. This embodiment of the invention is a complete reverse from typical dating and/or matchmaking services which attempt to develop detailed algorithms for the matching process because of the significant decision that exists in determining who to spend valuable time with. In accordance with the invention, patrons are already present at the game, and therefore, half or more than half the effort is already done. The remainder is to actually meet the other person which can be accomplished with profile criteria, whether or not the algorithms are very sophisticated.

In one embodiment, the patrons that are being matched have their original seats maintained and not made available for other upgrades in the event the matching does not work out early on. In this embodiment, one or both the patrons can return to their original seat. Hopefully, there will not be a significant argument of who would need to return to their original seat if an upgrade is actually performed. In addition, in accordance with this embodiment, the seats that are selected do not necessarily have to be better seats in the classical sense. That is, seats further away from other ticket holders might be considered preferred when matching two individuals for the first time. Alternatively, couple that would prefer a little more privacy or quieter game might request to be moved to a more isolated area. Alternatively, families with small children might prefer to be moved to a less busy area as well during the game where the children might be able to freely move around. All these scenarios and/or alternatives are possible in view of the present invention. The advantage of performing a match in a public setting is that the patrons do not have to worry about leaving or ending the date, and also do not have to worry that the other person will have their home address.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like.

In addition, this feature also optionally permits the patrons that have participated in the program to rate one another for future dates. For example, one patron can rate the conversational benefits of the second patron, the appearance of the second patron, the overall short term versus long terms relationship goals of the patron, and the like. These ratings may then be taken into account in the algorithm for future seat assignments, re-allocations and/or upgrades in the future for the first and second patrons, and all other patrons will now benefit with the additional profile information of the first and second patrons. The matching service may be for amusement or work related networking purposes, for example, to meet an executive that the patron currently works with or wishes to work with/sell in the future.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like. In addition, the system advantageously and optionally provides the feature of allowing patrons to text message one another directly, and/or exchange pictures via wireless email, text messaging, and other wireless devices that provide the standard capability of exchanging pictures, such a T Mobile and/or Sprint.

In alternative embodiments, the ticket holder can call in via a voice to text message, text message and/or email and let the stadium know early that they are not coming. In this manner the ticket holder obtains the convenience of the stadium or venue reselling their tickets in advance, thereby providing the venue with additional time to maximize the resale of the ticket.

In alternative embodiments, when the patron enters the stadium, they have their ticket barcoded or other device that detects their presence can be used such as infrared, Bluetooth, etc., and then they can become eligible for an upgrade. The patron can register in advance that they want to receive upgrades by providing their name, message address, e.g., email, telephone text message address, etc., and optionally their credit card or other payment mechanism for upgrades that actually cost money as opposed to free upgrades. In alternative embodiments, the patron can register at the ticket booth when purchasing their original ticket. In this scenario, the stadium representative can enter this information on behalf of, and with the permission of, the patron since the patron may already be providing their credit card, debit card, etc. to purchase the original tickets. Alternatively or in addition, a kiosk may be provided where the patron can enter their original ticket, e.g., scan in their original ticket and provide their name and text message information in the stadium to register for a one time upgrade for the game after purchasing, for example, a regular admission ticket.

In alternative embodiments, an usher can verify that the patron should be upgraded by the patron providing the confirmation number that may be transmitted in real-time by the system, and/or by the patron using their original confirmation number or original ticket with barcode or other identification means, such as a smart card, infrared reader, etc. that represents original ticket and presenting same to the user. The usher then needs only to scan in the original ticket and the system will verify whether the patron associated with the original ticket is valid and whether the upgrade is valid.

In alternative embodiments, a warning message may be sent to the ticket holder that has not shown up to game warning them that if they do not respond within a certain time period that their seat will be re-allocated or re-assigned to another patron. Similarly, a release message may be sent to the ticket holder after their seat has actually been released and/or re-allocated, thereby notifying the patron that if they change their mind in attending the game, they will have to obtain an additional ticket. In alternative embodiments, the ticket holder that has their seat released and re-allocated can be themselves re-allocated a similar, worse or better seat, depending on, for example, their subscriber value and/or other criteria. For example, if the patron is provided a better seat, this will encourage them to more readily give up their seats in the future even if they are attending the game. On the other hand, if the patron is provided a worse seat, then this encourages them not to artificially give up or have their seat released when attending the game. Accordingly, the present invention is designed to deal with various behavioral patterns of specific ticket holders, and may optionally and advantageously be a ticket holder specific with respect to various criteria for re-assigning, releasing, selling and/or re-allocating tickets.

In alternative embodiments, the system transmits to the ticket holder a welcome message after being upgraded and after having being moved to a new upgraded seat location. In one embodiment, the system identifies that the patron has been successfully upgraded after the patron provides the usher with a confirmation number or original ticket, which is then verified by the usher and system.

In alternative embodiments, the system, after having identified which patrons have checked into the stadium and/or have been upgraded, transmits a trivia question and/or additional advertisements to all patrons attending the game. In alternative embodiments, the information is transmitted to both patrons that are attending the game and additional patrons that have registered in the past to receive information but that are not attending the game. The participants can, for example, answer trivia questions and respond with their wireless device. Depending on whether the patron is attending the game or not, the system may determine to offer or deal with each of the patrons differently. For example, for patrons at the game, winners may be successively determined and narrowed, as patrons successfully and unsuccessfully answer questions, round after round of questions in a "spelling bee" format. For patrons that are not attending the game, winners may be declared, or statistics provided to the broadcast station that can be aired on television. In yet additional alternative embodiments, instead of transmitting information/questions to the patrons via the wireless device, the information/questions are displayed on the stadium billboard for patrons at the game and/or on television for patrons that are watching the game on television. The patron can then merely respond via the device, e.g., the telephone accordingly via a voice-to-text system or via other mobile devices via text messaging.

In alternative embodiments, the present invention provides the advantage of additional advertising sponsorship to the venue. For example, in one embodiment, the venue is partitioned into different locations that may be assigned to different sponsors. In one embodiment, the sponsor that provides the most value may be assigned a certain number of premium seats that are not available to other sponsors.

For example, the sponsor may offer a discount on the upgrade if you are a Verizon or Verizon Wireless customer or they credit your cell account for each seat upgrade or you get say 30 free minutes, etc. In alternative embodiments, the present invention provides the advantage of one wireless provider to advertise on another wireless providers mobile phone or wireless device. For example, if Verizon Wireless is a sponsor of the upgrade system for a particular stadium, the present invention will still work with, for example, AT&T, SPRINT, and CINGULAR customers. An advertisement message sent with the upgrade offer may read on the AT&T phone, "brought to you by Verizon Wireless." In an alternative embodiment of the present invention, text messaging is optionally used for mobile phones to perform the message communication of the present invention. The user is only required, in one embodiment, to reply or respond with a "Yes" to accept the upgrade offer since the user has advantageously pre-registered with the system, thereby minimizing the required communication/input by the user. In an alternative embodiment, the user, instead of pre-registering with the system, is charged on their wireless or even regular telephone number bill when they accept the upgrade offer. Thus, the wireless system that either administers the user's regular or wireless account or the upgrade sponsor may be responsible for actually billing the customer in this alternative embodiment.

In the alternative embodiment when text messaging is optionally used alone or in combination with other communication methods, the system provides the additional advantage of maximizing bandwidth usage by not requiring use of bandwidth on the wireless voice system, thereby maximizing system resources.

In another alternative embodiment, the present invention optionally and advantageously provides a security and/or safety feature in the event of, for example, a minor event where a parent gets separated from a child, a disaster or other event that might require evacuation of the stadium. In one embodiment, the person needing help provides their name to an attendant that can search the system for the contact information of their companion/parent. The system can thereafter send an email and/or text message to the companion/parent regarding the status of that person and provide instructions for meeting that person or arranging help, authorizing medical procedures, and the like. In another embodiment, the person requiring help, e.g., a child provides the attendant or kiosk with their ticket which can, e.g., scan the bar code or other reader system. The system can either automatically provide a text message to the parent who can then reply to the child/attendant via the kiosk to meet the child.

Alternatively, the parent can be instructed to meet the child at a predetermined location, and to stop looking for the child because the child was found. Thus, for this example, the person who is lost or separated from their party can notify security or access a kiosk. Security can, for example, notify the parent that child is in safe custody, and should not search the stadium, and therefore, meet outside stadium in a pre-specified safe place.

In an alternative embodiment, if a child/person is separated, the security guard/kiosk can arrange the best place to meet, either in or outside the stadium, together based on an optional global positioning system (GPS). In addition, the party with the mobile device can be provided directions on where to go to meet their party from who they have been separated.

In an alternative embodiment, the present invention may also be used in a security, defense and/or safety setting to direct patrons in a stadium for an orderly evacuation or notify patrons regarding status of a safety related event via, for example, a broadcast message including text message, email and the like. In this manner, system communication resources may be most efficiently utilized by not over-utilizing the system via voice communication, unless completely necessary. For example, the message can be broadcast in the event of an impending hurricane. In this situation, patrons in different sections get different messages, for example, to exit the stadium out of gates/exits that are either less occupied or closest to the section the patrons are sitting in. Advantageously, the present invention has the patrons contact information, including optionally and advantageously text messaging, that can be broadcast or sent to different patrons. The advantage of text messaging is that the bandwidth is more efficiently used in the event of an emergency, and there are no busy signals as in a voice network. Further, the message is send, and if the network is at capacity, the system can automatically resend or the message will be placed in queue and sent as soon as capacity becomes available.

In another alternative embodiment of the invention, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction.

For instance, in sporting venues the bracelet ticket includes the machine readable information that comprises at least one of a bar code and radio frequency identifier used for security check in, and optionally check out. In this manner, the standard reading machines that can scan the bar code or RFID information can keep track of people that have checked into the sporting event and/or venue. Advantageously, the machine readable information on the bracelet can also be used by the venue in the event the patrons seat assignment is modified, for example, via an electronic ticket exchange or upgrade program. In this embodiment, the visible indicia are no longer valid for the actual seating that may be dynamically changed and only represents optionally an initial seat assignment. However, the machine readable information may be used as a code to reference the specific patron and assign that patron a new seat. Thus, when the ticket reader scans the ticket and actually identifies, for example, the bar code, this information can be used to reference the patron, update and/or confirm the patron's current seat via the reader used, for example, by ushers in the venue, kiosk, entrance to the venue, and the like.

In an alternative embodiment, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction. This information, as previously mentioned, may be visually cognizable for the patron and in combination, readable by electronic means if the bracelet includes a magnetic strip, bar code imprinting, or RF chip.

In an alternative embodiment of the present invention, the security bracelet and ticket combination of the present invention advantageously includes a bar code or other machine readable information such as a RFID device. When, for example, a child is separated form their parent, the parent can notify security and the seat number associated with the child. If the child attempts to leave with their bar code/identifier, the system detects the bar code/identifier as either being valid and identifying the child that is missing or being invalid and raising another red flag. In an alternative embodiment, the bar codes/identifiers associated between children and adults correspond such that the child identifier must be within a predetermined time and/or number of checking out identifiers from/within the adult identifier. If this does not occur, the system determines that the child is leaving without their parent, and possibly being abducted.

In an alternative embodiment, the system links one or more tickets/identifiers together and requires the tickets/identifiers to exit the venue or event within a predetermined time period from one another and/or within a predetermined number of tickets/identifiers that have exited the venue and/or event. In the event that one ticket/identifier exits the venue or event and the associated identifier does not, then an alarm or other indictor occurs, and the attendants will detain the patrons that have initiated the alarm to for security purposes.

In an alternative embodiment, the tickets are advantageously coded with designations such as adult, child and the like. In the event a child ticket/identifier exits the stadium before the associated adult and/or more that a predetermined time period and/or number of patrons exiting, the system can initiate an alarm so that an attendant can determine if a child has exited the venue or event without their parent or with a wrong parent potentially averting a kidnapping. In this embodiment, an additional combination is the use of the standard fast pass feature, for example, at theme parks, and the like, where the venue records predetermined events that the user of the card enters in a faster line. In this embodiment, if a child ticket/identifier is not associated with a parent ticket/identifier, for example, as described above, the child may be denied entry into the event or venue if not accompanied by their parent. In alternative embodiments, the venue/event sponsor or organizer associates tickets upon request from the patron. In addition, in another alternative embodiment, a kiosk is provided inside and/or outside the venue for, for example, parents to register their tickets and have them associated with their children's tickets to prevent the child from exiting the venue without them, for example, as described above.

In an alternative embodiment of the present invention, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In another alternative embodiment of the present invention, a security bracelet is advantageously utilized, for example, such as the security bracelet disclosed in U.S. application Ser. No. 10/680,207, filed on Oct. 8, 2003, to Abraham I. Reifer, et al., and incorporated herein by reference, in the event of a reported event, security breach, abduction, and the like. In this embodiment, all patrons exiting the stadium must show their ticket and/or identifier so that the venue can check all patrons out of the stadium. Thus, for example, if two kidnappers come in the stadium, and want to use one bracelet for a child, the second kidnapper will be stranded in the stadium. In addition, if one kidnapper buys two tickets, then upon exit with the child and the additional ticket, a barcode/identifier will be exiting without ever having checked in, and then the alarm will go off as well.

In another alternative embodiment, the present invention provides a broadcast message to warn patrons of an event, such as an advertisement, sale and/or even a weather related event such as a hurricane that might require the venue to be evacuated. Advantageously, in at least one embodiment, the broadcast message comprises standard text messaging that optimizes or better utilizes capacity form the communication system. Thus, when using text messaging capabilities, the present invention efficiently transmits text messages to numerous subscribers regarding, for example, exit information, contacting and/or meeting additional parties that have been separated, and the like.

In an alternative embodiment of the present invention, the present invention optionally provides the capability to penetrate into secondary market with season ticket holders selling ahead of time the games they will not be attending. For example, the present invention optionally provides the feature for the season ticket holder and/or general ticket purchaser the ability to view in advance of the season and/or game the schedule, and to alert the venue and/or stadium of games and/or events they will not be attending, thereby permitting the stadium/venue to attempt to resell the tickets to other patrons. For example, in one embodiment of the invention, the patron is provided with a monthly schedule listing the events that may be attended. The patron, such as a season ticket holder, may then click or place an indicator on all games they will not be attending for the season in advance, thereby providing the stadium with the ability to resell tickets well in advance of the event. Once the patron completes identifying games that will not be attended, the system then compiles a list and transmits the list to the patron for an optional confirmation. This list is then used by the system to release seats well in advance of the game. In an alternative embodiment of the invention, registered users of the system for, for example, upgrades, may also be notified of seat availability for sales prior to the game/event. In an alternative of this embodiment, registered users may receive text messages, emails, and the like, notifying them advantageously of the availability of seats that heretofore have never been easily available to the public for sale, thereby allowing the venue to participate in secondary market ticket sales.

In one alternative embodiment of the present invention, the system/process of the present invention provides or operates as a middle person/broker between the ticket holder that is returning tickets to the venue, such as the season ticket holder, and a ticket sales system and/or company, such as tickets.com, by notifying the tickets company of the newly available seats via notification by the ticket holder, such as the season ticket holder of season ticket games not being attended.

In one alternative embodiment of the invention, the system and/or process transmits text messages, emails and the like, to offer tickets and/or seats and/or admittance to subscribers for events and/or games with empty seats even before game. Thus, the present invention allows the venue to participate in the secondary ticket sales market and the upgrade market, thereby increasing revenue and fan loyalty.

Of course, all of the embodiments of the present invention may be used for any reserved seating event, and/or venue that require tickets for entry thereof.

In another alternative embodiment of the present invention, the use of machine readable identifiers provides advantages for, for example, the upgrade program or ticket exchange of the present invention. For example, when the upgrade, re-allocation and/or electronic ticket is issued, the machine readable identifier, for example, the bar code, on the original ticket is invalidated, thereby preventing use of the invalidated ticket. Accordingly, when a new ticket holder purchases the ticket form the season ticket holder, the new purchaser will be issued a new machine readable identifier, and optionally a new paper ticket. The present invention advantageously is able to handle the issuance of a new ticket and invalidates the old ticket and optionally the old identifier that has, for example, been returned by the season ticket holder, thereby providing dynamic ticketing capability.

In an alternative embodiment of the present invention, the new patron obtains a new identifier such as a barcode, the old bar code of, for example, the season ticket holder is invalidated. In one embodiment of the invention, season ticket holders are offered to opt in the upgrade process. Various commercial incentives are possible for the season ticket holder to opt in the upgrade process, such as monetary compensation when their ticket is used for an upgrade and/or resold whether they express their intention not to go to the game prior to the game, and the like. Alternatively, season ticket holders may be offered that the cost of their season tickets will, for example, remain the same as the previous year or be reduced if they participate in the program. Therefore, the combination season ticket trade-in and upgrade program in one embodiment of the invention will be beneficial to season ticket holders by allowing them to trade when they already know that they have no intention of attending a game, and allow the season ticket holder to recoup some cost of the season tickets if they do not attend and their ticket is used as an upgrade. In addition, additional patrons of the event and/or sports team are permitted to attend the game in locations/seats that they might never have been able to obtain access to. Further, the venue/stadium/team maximize revenues by being able to place tickets on the secondary market when the ticket holder notifies the venue early enough that they are not attending the event, the venue also obtains additional revenue from upgrades when tickets are upgraded, and the venue obtains additional fan loyalty.

In another embodiment of the present invention, the system provides the ability to advertise via email, text messaging, and the like, for one wireless carrier on the wireless device that is using another wireless carrier. Since the user of the wireless device has requested the service, the user appropriately receives the communication from the ticketing system of the present invention, and therefore, also appropriately received the advertisement from the wireless carrier that is different than the wireless carrier that the user of the wireless may be using at that time.

In another alternative embodiment of the present invention, offers to purchase seats either during the game or even well in advance of the game are "pushed" or transmitted out to registered users that have supplied their wireless and/or Internet addresses. For example, patrons can register in advance for the upgrade and/or regular ticket offers to purchase admittance via various methods including the Internet. When seats band/or admittance becomes available, a broadcast message or other standard messages may be transmitted to the registered patrons to notify them of the seat availability. Thus, seat offers are "pushed" to registered users that have requested this service advantageously to a wireless device and/or other address including standard telephone communication, as well as additional optional advertisements. The system, in one alternative embodiment, provides the user the option when registering to accept certain types of advertisements to be received on their wireless device via email and/or text messaging. In other embodiments, the user does not have the option of which advertisements to receive.

Advantageously, in accordance with one alternative embodiment of the present invention, if a patron decides to attend an event such as a sporting event when the patron does not have time to wait to receive paper tickets (e.g., the patron is visiting in another city/location and does not have time to wait to receive tickets via mail and is on the go), the system of the present invention transmits a ticket to the patron via, for example, a wireless communication system and/or other standard electronic communication system such as the Internet, and the patron can present their ticket, for example, on their wireless device and show up to game.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Patrons then text message and/or email and/or answer questions via voice-to-text messaging their answers. The system can then display the overall number of answers that are correct and incorrect, display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another alternative embodiment of the present invention, the system uses a seat database to determine which of the reserved seats are currently in use. The system may integrate with the seat database system of a venue and/or stadium or optionally be used in parallel with the seat venue/stadium database. For example, prior to the event, the system may utilize the seat database of the venue to determine available seating and patrons that do not show up after a predetermined period of time. Alternatively, the present invention can operate using a separate database from the event/venue by copying or building a separate database used for the ticketing and/or upgrading according to the present invention. In this alternative, as patrons enter the venue, they are checked in directly to this separate database. At the time of the event, the system will be able to check-in patrons using either the identification system, e.g., bar code scanner, of the event or venue, or provide a separate identification system.

In alternative embodiments of the invention, the patron that knows they are attending the game but is going to be late can send in a HOLD message even prior to being provided a warning message that their seats are to be released if the patron does not respond to the message with the HOLD request. That is, in this embodiment, since the patron already knows well in advance that they are attending the game, but perhaps stuck in traffic, the patron can initiate the HOLD message before even being warned in advance of the possibility of their seat being released.

In another alternative embodiment, patrons that have registered with the system and optionally checked into the stadium and/or venue in advance and who also know that they would like an upgrade and/or ticket, may initiate their own upgrade request to the system to notify the system of their willingness to purchase an upgrade and/or new ticket for the event/venue. The system may then place these patrons on a higher priority since they have already expressed and intent and/or willingness to purchase the upgrade or ticket. The patron may notify the event and/or stadium of their willingness optionally well in advance of the game or near/after game time at a time which the patron commits or expresses an additional heightened desire to upgrade and/or purchase a ticket.

In alternative embodiments, the system includes the advantage of allowing patrons to register free for a predetermined period of time, for example, for the first year, without paying a yearly subscriber fee. Alternatively and/or in addition thereto, the system provides the patron with their first upgrade for free or for a reduced rate to further encourage the patron to register with the system and method of the present invention. Alternatively and/or in addition thereto, the system of the present invention offers the patron reduced and/or free concessions when purchasing a membership, ticket and/or upgrade to further encourage the patron to participate in the offers of the present invention.

In alternative embodiments of the present invention, the matching system and/or process, permits participants in the program to initiate a message to the system with the seat location and/or name of the patron that they would like to be matched with for a meeting, networking and/or socializing such as a date. In this embodiment, the system may the push the message to the other subscriber and assign new seats to the individuals that are to be matched. Alternatively, the system Need not require a specific confirmation that the second individual to be notified of the potential match is physically located near the first individual, but can rely on the first individual to provide that information. For example, the first individual may see a potential date in a restaurant, and may then send a message to the system with that person's name or address, that they would like to meet that other individual. In that situation, the second individual will receive a message of the possible match, and can respond and accept or reject the offer to meet. The second individual can then provide a meeting destination or the system can suggest a meeting place based on the first individual advising the system of their location, and the location of the second individual.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Advantageously, the multiple choice questions each have unique selections, such as a1, b1, c1 and d1 for question #1; a2, b2, c2, and d2 for question #2; a3, b3, c3 and d3 for question #3, and the like. In this embodiment, the actual timing of questions is not necessary since each question and answer is unique. Therefore, the speed of responding to the question is immaterial to the winner of the contest and/or correct answer. Also, in the event one patron answers the question late, there will be no confusion which question the patron is submitting an answer for. Patrons text message and/or email and/or answer questions via voice-to-text messaging their answers as indicated above using the unique set of answers, in one embodiment. In alternative embodiments, the first predetermined number of patrons that answer the question correctly are considered the winners.

The system can then display the overall number of answers that are correct and incorrect, e.g., a1 50%, b1 28%, c1 12% and d1 10%, and display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another embodiment of the invention in connection with the seating upgrade and/or assignment system, an identifier and/or machine identifier such as a bar code, RFID, etc. optionally remains static for the user on the user's ticket and/or device that is provided for optional paperless ticketing. For example, the identifier will remain the same associated with the user, but the seat assignment, privileges, user characteristics, user preferences, and the like, may be dynamically changes. The system and method of the present invention will be updated so that the identifier can represent a dynamic seat assignment or other dynamic information, such as general admission to an associated event, or other event and/or venue, including, for example, a restaurant, bar, and the like.

In another embodiment of the present invention, the upgrades process and/or feature may be provided to users/patrons as a complimentary reward for fan loyalty, to reward the user but also market other goods/services and/or other advertising opportunities to be transmitted via the wireless device and/or mobile phone. In one embodiment of the invention, the system and/or method initially queries the user, for example, at the beginning of the trivia contest and/or tournament or at the beginning of the game, whether the user is present in the stadium or not. The system can then perform, for example, the trivia contest, and determine a winner(s) to award for example some form of reward. Furthermore, in another embodiment of the invention, based on the number of people responding that they are present at the game, the present invention advantageously provides a random upgrade to a predetermined number of patrons as an additional fan loyalty program and/or advertising sponsorship to one or more entities that sponsor the free upgrades.

In another embodiment of the invention, a system and/or method is provided that advantageously builds and/or acquires and/or collects mobile contact addresses of users in an efficient manner. For example, in accordance with the present invention, a user advantageously need only provide the communication network and telephone number, and the present invention builds a data address therefrom. This allows the mobile or wireless device user to still register for a service without specifically knowing their data address for, for example, data communication such as SMS messaging, text messaging, email, and the like. In one embodiment, the mobile user is provided a drop down menu where the user selects the communication network and provides their mobile phone number.

The present invention is particularly advantageous currently with the recent enactment by the Federal Communications Commission (FCC) number portability where mobile phone users are able to transfer their existing numbers to other networks. Accordingly, we have determined that a user's number will advantageously provide a mode of contact for the user even when the user decides to change communication networks.

In one embodiment of the invention, the software processes and system determines and builds the actual messaging address (email, text, SMS, and the like) to send messages to the mobile device by the user only selecting and/or providing the communications network and the telephone number. Thus, the present invention advantageously simplifies the process for mobile or wireless device users to register and/or provide contact information, and therefore, beneficially increases the number of individuals that can effectively and easily register for a communication service.

In another embodiment, the present invention facilitates the ability for potential users to signup for the service of receiving, for example, trivia, upgrades and/or text messages via a user sign up device or apparatus. In one embodiment, the user sign up sheet includes numbers and/or circles that can be filled in like a grid, where the user can fill in or cover the numbers that identify their portable number. In addition, the user can check off the specific network carrier from a list of network carriers, or simply enter their specific network carrier. The user sign up sheet may be done electronically via a computer and user interface as described above, or may initially be filled out by a user via, for example, a piece of paper and then later entered into the computer system of the present invention.

In another embodiment of the invention, the system and method of the present invention is capable of re-locating a patron via the mobile address that was previously provided, even if the patron has changed wireless carriers. For example, in one embodiment, with the recent feature of mobile phone portability by the FCC, we have determined that a significant number of mobile phone users are likely never to change their number/address, and therefore, the system and method of the present invention is able to send text messages and/or email to all network addresses using the telephone number of the user if the system suspects that the previously provided network by the user is no longer being used. In this embodiment, the user can optionally respond to the message and/or network broadcast message, confirming that one of the messages has been received.

In another embodiment of the message, whenever a user wants to contact a mobile phone, mobile wireless device or even computer based, via for example, an Internet based account, wants to contact another mobile wireless device user, the present invention provides a transmission device, for example, via the Internet or individual models/mobile phones used for each of the networks to broadcast the message on all networks. Advantageously, in accordance with this embodiment, since the user is likely to maintain the same telephone number, their data or text messaging address will be their telephone number and one of the few network addresses. This type of broadcast message can happen anytime, and even for voice communication when the user of the wireless device needs to receive a data, text and/or voice message.

In another alternative embodiment of the invention, as described previously, the invention may be used by a patron to obtain specific data or information regarding sports or venue related information of interest. For example, patrons may communicate with the system and forward a player jersey number or number of racecar during an event such as a baseball game, football game, racing event such as Nascar, to obtain additional information including current statistics and past statistics. The present invention can then optionally sent statistics throughout the game or event to the patron without the patron requesting, for example, at specific time intervals or after notable achievements during the event, such as a home run, touch down, $7^{th}$ inning stretch, half time, number of laps traveled, and the like.

Thus, the present invention includes many variations in the type of information a user may receive, whether specifically checked into a venue or registered for the service for a particular event. In addition, the present invention includes various processes and systems for ensuring delivery of messages to patrons that have requested the service or merely sending messages that a patron may be interested in receiving.

In another embodiment of the invention, the matching and/or networking system includes the ability to contact and/or notify the users to coordinate the meeting using any one of a plurality of communication methods including text messaging, email and/or instant messaging, with the additional advantage of transmitting pictures, video and/or other data that provides additional information regarding the other person that has been suggested for the match and/or network. In one implementation of this embodiment, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. For example, different message transmit and/or receive formats may be used depending on the system. The present invention beneficially parses the various different formats to obtain the necessary information for the communications described herein. In addition, the represent invention formats the messages for the different wireless devices so that the messages may be appropriately received even though different devices and/or communication networks have different messaging formats. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In accordance with another embodiment of the invention, the matching and/or networking system includes the option of permitting a subscriber to notify the system when they are ready for a potential meeting and/or match. Once the matching and/or networking system is notified of the subscriber requesting the match, the system is then capable of either tracking the user though a positioning system such as GPS, permitting the user to register at predetermined locations upon user initiation such as via Bluetooth, RFID, infrared, and the like. In accordance with this embodiment, the subscribers are not being constantly tracked, and therefore, maintain an additional level of privacy. In alternative embodiment, the present invention continuously tracks the subscribers without specifically requesting to be matched. In this alternative embodiment, the subscriber is provided with less privacy because they may be notified of a specific match even though they might not be interested in the match and/or meeting at that time.

In an alternative embodiment, the present invention provides subscribers with the ability to accept/reject the match before each of the subscribers receive personal information of the other and/or before the date/match has been arranged with at minimum a meeting location. In this embodiment, the invention requires that both users accept the match and/or date prior to notifying the subscribers of the contact information for each subscriber. Therefore, subscribers can optionally request additional information from the system of the present invention, even multiple times, to better understand the potential date and/or match before accepting, and importantly, before the other subscriber is provided contact information and/or a meeting location of the subscriber. In the embodiment where the present invention merely provides the meeting location, the present invention advantageously does not provide the subscribers contact information and/or other personal information before the match/date. Advantageously, in accordance with this embodiment of the invention, subscribers never receive personalized or personal contact information unless the subscribers, after meeting in person, agree to exchange such information.

In another embodiment of the invention, the dating and/or networking system provides subscribers the functionality to email, instant message and/or text message at least one additional piece of personal information and/or questions, optionally directly to each other or via the system anonymously, to obtain additional information that may be more relevant than the user profile or information from the user profile that was used to make the initial date/match.

In another embodiment of the dating and/or matching system of the present invention, the system optionally provides automatic and/or user initiated registration in a particular establishment and/or geographic location, which can be used instead of a location determination system such as GPS, or together with such system. This form of registration may be even more precise than GPS because it confirms a subscriber's presence within a specific store, establishment, entertainment establishment, restaurant, and the like. Thus, in these embodiments, the subscriber either initiates the registration as described above, or alternatively, if the subscriber optionally sets the wireless device to automatic registration based on the appearance at a predetermined registration area and/or location, the subscriber will be automatically registered to receive communications regarding a potential match/date.

In an alternative embodiment of the present invention, once the dating and/or matching system determines that a potential match/date has been detected, the system optionally notifies the different subscribers and asks whether they want to continue to participate in the matching/dating program. When both, some and/or all subscribers agree to participate, the present invention can forward to each subscriber automatically the information that each subscriber shares substantially in common and/or the information that was responsible for the match/date between the subscribers. In this embodiment of the invention, the subscribers will know immediately the information that should be most relevant in making the match/date and can determine whether to actually agree to either contact or send the other subscriber additional information and/or arrange to meet the subscriber at a pre-designated location.

In an alternative embodiment of the present invention, the present invention optionally includes the ability to recommend a potential meeting place for the subscribers to meet after determining that the subscribers have agreed to participate in the date/meeting. In this embodiment, the present invention advantageously determines the location based on, for example, subscriber preferences, geographic location that is preferential for at least one of the subscribers and/or both subscribers, predetermined location where, for example, a sponsor will receive patronage and/or provide a discount for the subscribers and/or actual pay the organizer of the dating/matching system an advertising fee to promote their sponsorship. Accordingly, the present invention advantageously determines not only a potential match/date, but advantageously suggests, recommends and/or determines a specific location and/or geographic location and/or restaurant, clothing store, zoo, museum, and/or other suitable location for the subscribers to meet and optionally based on geographic distance and/or location.

Additional dating and/or matching features and/or differentiators of the networking and/or dating system of the present invention include one or more fo the following:

Wireless messaging platform supports interactive messaging

Wireless messaging platform provides simultaneous parallel applications to run without collision Multiple wireless initiatives or topics run without conflict Different initiatives or topics may be user specific or selectable While each initiative runs independently, there can be overlap in terms of customer base Platform is flexible to add/remove initiatives quickly and efficiently One wireless carrier/network can be a dating/matching sponsor and advertise on the wireless device and/or network of another wireless carrier/network Contact members to notify of the match/date to allow members to either directly contact each other or send additional information via, for example, text messaging, email, instant messaging, such as pictures, video, and the like Contact members or wait for request from members to participate in match/date initiative; can then automatically track member via GPS instead of constantly tracking member all the time, thereby increasing privacy of member Contact each subscriber that is being offered the date/match and obtain approval for the match prior to actually notifying potential members that match has been made Contact users after initial match has been conditionally approved, and provides users the capability to request additional information, such as personal information from the other member or other members which the requestor still wants to know before finally accepting the date/match Members can register or "check-in" at predetermined locations and/or establishments which is one additional level of specificity, for example, with regard to the location where a member is that may be interested in matching; For example, two or more members may actually be in the same restaurant where they can be informed of one or more other subscribers being present; members can register via sending a message to the system via text message, email, RFID, Bluetooth, and the like, either by initiating a registration or automatically Contact members after initial match has been conditionally approved and exchange, optionally automatically, profile information that was significant in making the match/date and/or other important information regarding a match/date that a member may want to know before finally accepting the match/date and/or information the members may want to know that is geared particularly for a first date, e.g., likes/dislikes, common interests, favorite foods, wines, alcoholic beverages, and the like Contact members to suggest and/or recommend and/or arrange meeting place based on, for example, geographic location, common interests/sports, common food tastes, common beverage tastes, common entertainment preferences and/or sponsors willing to, or interested in, being utilized for the match/date for the suggestion and/or recommendation, and optionally providing the members a discount and/or compensating by the sponsor to the networking and/or dating system proprietor for the advertising and/or recommendation to visit that sponsor Wireless messaging platform includes a protocol conversion server functioning to interface with a variety of wireless networks having different messaging characteristics for both transmitting and receiving messages, and parsing the different message formats for the content from a received message, and transmitting a message to a plurality of different networks and/or devices having different messaging and/or interface capabilities and/or functionality Contact members with a wireless consent form indicating that the matching/dating system and/or the members participating in the match/date have generally consented to potential cohabitation optionally without any recourse to the other party. Alternatively, the members may be contacted with other types of informed consent forms with limited recourse for acts and/or aggressive acts that are clearly assaults, but not sexual related misconduct or sexual related crimes that are felonious in nature carrying a high penalty/sentence. Alternatively, members may be presented with consent forms that eliminate any criminal penalty, but do not foreclose the possibility of civil lawsuits for damages relating to torts, and the like As another alternative and/or in addition thereto, members may be presented with consent forms that eliminate any civil penalty, but do not foreclose the possibility of criminal lawsuits for criminal type activities, perhaps with the exception of the most severe sexual crimes such as rape and/or sexual assault that carry significant prison time.

For example, athletes, celebrities, high worth individuals, or even average individuals, male or female, may be interested in the wireless consent initiative because that allows them more flexibility to meet a variety of individuals without the worry of later being sued. In additional alternative embodiments, broadcast messages may be transmitted to numerous individual that may be interested in meeting and/or dating a celebrity or predetermined individual or individuals. In this embodiment, the optimum matching individual or individuals may be selected to meet with the celebrity, celebrities, and the like, while utilizing the informed consent feature of the present invention. In another alternative embodiment, an individual or individuals may be randomly selected as part of a match or date, based on a lottery or other competition to meet or date a specific individual or individuals.

Additional optional hardware and software requirements are as follows for one or more embodiments of the present invention:

System Capabilities

Platform supports interactive messaging

Platform provides simultaneous parallel applications to run without collision

Multiple wireless initiatives or topics run without conflict

Different initiatives or topics may be user specific or selectable

While each initiative runs independently, there can be overlap in terms of customer base Platform is flexible to add/remove initiatives quickly and efficiently Wireless Initiatives Interactive trivia with fans inside and outside of the stadium Targeted messaging, e.g., targeted advertising Broadcast messaging, e.g., general advertising Interactive messaging, e.g., with concessions Profiling for each initiative or topic, e.g., based on network operator Urgent and emergency messaging Specific initiative: discounts for concessions and/or memorabilia Specific initiative: invite patrons to different activities before, during or after game, e.g., player loyalty, family activities, etc.

Specific initiative: seating upgrade program

Specific initiative: messaging patrons in one section and separate messaging to patrons in another section Specific initiative: messaging parent of a missing child Special initiative: dating where patrons can keep their seats to return to them, or their seats are re-allocated. In alternative embodiments, the patrons switch seats instead of moving to empty seats, either for the entire game or only a portion thereof with other patrons for match making possibilities.

Functional Specifications

Front end for user signup and profiling-secure site—for example, modeled after www.mlb.com, include one or more of:

type of seats does the customer want for upgrade (decks and range of sections)

information for dating concession profile capability for additional profile information validate user by sending message to device upon sign up auto append of network information to phone number during signup login and password protected site frames on website or interface that can be easily configured to have look and feel, for example, of particular baseball team capability for space on screen for advertising opportunity that can easily be modified and relatively dynamic capability to handle lost passwords web page or interface where customers with season tickets can mark a calendar with the seats they want to keep and the ones they are interested in freeing up for early sale or upgrade.

The optional Front End of the present invention used for administration and setting up parameter for each application, optionally includes a secure site, with one or more of the following:

application email address and password minutes for all the configuration parameters and/or functionality number of threads for each application for upgrades, at least one of releasing customers old seat immediately, or it until the customer approves of the release, or holding the customer's seat for a predetermined portion or all of the game, for example, in the dating functionality)

set schedule for games section rating setup, and seat upgrade pricing revenue allocation model provide a number of retries if message send failure Concessions The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

Concession Wireless Initiative

Purchased via cell phone

Web registration for preferences

Targeted concession offers

Confirmation that purchase is ready

Delivered to seat or ready for expedited pickup

Customer convenience: system identifies closest concessions to customer

Customer convenience: system determines concessions with short wait

Each concession labeled with a number for customer identification and fulfillment Customers can request menu, or register for each game to receive menu around game time via mobile device GPS can be used effectively to inform customer of closest concession stand to pickup order, and/or customer can provide section number and/or seat location for system to identify most convenient concession stand Most convenient concession stand can be determined based on one or more, or combination of, predetermined criteria, such as, closest concession location, shortest wait in line, specific item being ordered, and the like.

Interactive messaging, e.g., with concessions

Specific initiative: discounts for concessions and/or memorabilia

The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

In one alternative embodiment, the following message exchanges may be used:

First Message

"In Game" Concessions

Menu will be sent soon!

Reply with #, item short form and seating section

Ex: BE=beer

Reply 3BE for 3 beers

408SEC for section 408

Powered by NEXTEL

Second Message (paper menu?)

Menu

BE=Beer; CO=Coke; DCO=Diet Coke

HD=Hot Dog; BUR=Burger

TA=Taco/Salsa; PO=Popcorn

FF=French Fries; CH=Chips

PZ=Pretzel; PT=Peanut

LEM=Lemon Ice

Third Message

Order received!

Summary:

3 HD @ $3=$9

2 CO @ $3=$6

2 LEM @ $3.50=$7

Total=$22

Reply Y to ACCEPT

Credit Card charged

N to CANCEL

Fourth Message

Thank you for ordering!

Your order has been confirmed!

Confirm # REIF1001

Powered by: THE SPORTS AUTHORITY!

Fifth Message

ORDER READY

Bring Confirm # REIF1001 to Concession # 33 by sect # 212

$2 off NIKE baseball gloves

Bring #NIKE305 and game ticket to

Any SPORTS AUTHORITY!

In another embodiment of the invention used in concessions initiative, the concession attendant receives the confirmation number or other identifying information from the customer when picking up the concessions. The concessions attendant enters the confirmation number or other identifying information when ready or optionally clicks on the order on the computer screen via a concessions interface associated therewith. From there, the order is then cleared from the system with respect to orders that require fulfillment, advantageously allowing the workers to streamline their work activities in the concessions. In an alternative embodiment, the concessions are actually delivered to the customer using the sutomer provided seating information, either provided by the customer through, for example, the wireless device or other registration and/or notification process, or even via a telephone call or automated attendant to associate with the order.

In another embodiment of the invention, the concessions menu is advantageously only delivered to customers that have entered the stadium via a location determination system, and/or checked into the stadium via a ticket reader/scanner. In alternative embodiments, all customers that have registered for the concessions service will receive an introductory message. Thus, customers that are not attending the game need only reply with a request to terminate the concessions service for that event and/or game.

In an alternative embodiment, the customer is advantageously directed to closest concessions via, for example, GPS chip in phone or by knowing where the customer sits at check in, or by having the customer input their seat location or location where they would like to pickup the concessions.

In another embodiment of the invention, we have determined that some mobile phones will utilize different transmit and receive addresses, and therefore, a user may not know how to appropriately register to be a subscriber for one or more wireless initiatives. For example, we have determined that some mobile phone networks utilize slightly different or different electronic addresses for the transmitting and receiving of electronic messages. For example, for the Research In Motion (RIM) Blackberry communication service, the mobile device is assigned a desktop email address. In one configuration of Blackberry, the mobile device only has one address. However, in the non-integrated configuration, the mobile device actually has a separate address when transmitting from the receive address.

In accordance with this embodiment of the invention, the user registers by providing their mobile phone number and optionally a network carrier for same. In this embodiment, the mobile phone user registers with their phone number and optionally wireless network provider. The registration system of the present invention then sends a message to the mobile device, requesting that the mobile device respond, optionally with a predetermined code and/or predetermined message. The mobile device then responds to the registration system, and the registration system corresponds the mobile device response with the original registered mobile address, thereby completing the registration process by ensuring that responses received from the mobile device can be mapped appropriately to the mobile subscriber. In the embodiment where the mobile user is requested to provide a predetermined code and/or message, the registration system uses the predetermined code to map the mobile phone response potentially having a different address with the transmit address provided by the user.

Dating, Matchmaking and/or Networking

In another embodiment of the invention, patrons are provided the opportunity to meet others in the venue or at a predesignated location near or away from the venue using standard matching rules. In one embodiment, the presence of the user is detected when entering the stadium, for example, via the ticket entrance systems. In another embodiment, the presence of the patron is detected or determined based on a message that is send to the user, for example, either right before, during or after the game. In this embodiment, the user can be prompted with a request whether they would like to participate in the matchmaking, dating and/or networking program.

For example, potential business or social partners may be selected or prompted for networking or dating. When the user responds yes, in this embodiment, their current seat is irrelevant if that seat is not to be released for another patron. Therefore, the system need only select a new set of seats for the networking and/or dating for the patrons, transmit the patrons the additional new seats via, for example, a wireless ticket, update the venue seating database for subsequent verification by the ushers when seating the patrons. The patrons may then proceed to the new location and have a meeting or date, and then return to their original seats if desired.

In another embodiment, a "burnt bridge" approach or feature is provided where the original seats for the patrons that are meeting are then released for other upgrade and/or networking programs. In this embodiment, the original seat of the patron must be known for example, via check-in procedure, registration for the program in advance for example over the web registration process or other registration process, or via the patron responding to the system with their wireless device of their current seat location. Alternate combinations or modifications of the above embodiments is also used.

Trivia

In the alternative embodiment of providing the user trivia information, based on registration and/or location, for example, while attending the game, watching the game at home, or any time prior to or after the game, the user may be provided with questions, as described above, to answer as part of a tournament and/or to be eligible for prizes, awards, and the like. In one embodiment, a section or portion of the users are targeted for the questions together, while other sections and/or portions of the users are targeted at a time period thereafter, for example, 1 minute later, to stagger the communication and transmission of data, thereby reducing congestion and/or unnecessary hardware to accomplish the transmission and acceptance of information to/from the patron.

In one embodiment, while all the questions are staggered over a predetermined period of time to the patrons, whether limited to patrons in the stadium, out of the stadium and/or both, the patrons are not notified whether their answer is correct until after all questions have been transmitted, and all patrons are provided the opportunity and/or sufficient time to respond. Once that predetermined time period has elapsed, the patrons will be notified whether their answer was correct, and whether they are still in the tournament. In optional embodiments, a predetermined time period will again elapse until new questions are sent and the tournament continues.

Optional Oracle or My SQL Database

In one embodiment of the invention, an Oracle or My SQL Database is used in connection with the present invention. In one embodiment, the result set is set to be proportionally with respect to the number of users and/or data that will be stored in the system. In another embodiment, the database is optionally partitioned for specific games and/or initiatives or groups of games and/or initiatives. The system is preferably thread safe when running the games and/or initiatives. The system is optionally integrated with Credit Card for payment, and/or integrated with the venue ticket system and/or point of sale system to optionally determine who came in and when into the venue. In another embodiment, the present invention maintains and updates financial balances for users, such as patrons and stadiums. In alternative embodiments, secure interaction with ushers and an interactive kiosk is provided.

The present invention optionally provides any standard algorithm for partitioning of group of seats and users, for example, for system resource allocation, load balancing and/or division of system functionality. In alternative embodiments, a local kiosk for the stadium and/or venue is provided where the user can enter information, such as register for one or more initiatives and/or programs. In alternative embodiments, the system of the present invention includes the capability of offering for sale seats which are not currently sold via messaging to wireless devices, such as text messaging to mobile phones, or other messaging and/or wireless communication to wireless devices, and consideration. In alternative embodiments of the invention, standard algorithms such as used in the airline industry may be used to overbook seats for the venue, and consideration.

In alternative embodiment of the invention, instant messaging or any type of communication method can be used in the present invention, include local and/or global networks, such as the Internet, LANs, WANS, WAP, 811.02a, 802.11b, 802.11g networks, and the like.

Messaging Software Requirements

Trivia and/or other messaging products/initiatives are Java applications that run in a J2EE application server and utilize a JDBC 2.0 compliant relational database. There are typically open source options available for system support. Currently for development and test environments we utilize are desktop environments running Windows 2000 with the open source options below. The draw back is that open source options typically don't provide formal system support approaches, although we have found the software to be very reliable and would recommend this approach for early stage pilots. Should the customer prefer purchase software options for these components are provided as well.

I. Server Software Specifications

Alternative A—Open Source Approach (1) Web/Application Server—Tomcat 4.1.18

(2) Database—MySQL 4.0

(3) Windows 2000 Server for each server

Alternative B—Purchased Product Approach (1) Application Server—Websphere Application Server 5.0

(2) Database—Oracle 9i DBMS (3) Windows 2000 Server for each server

II. Server Hardware Specifications (4) Each of the HW Servers specification:
- (i) 2xCPU—P4 2.4 GHz Xeon
- (ii) 2 GB RAM
- (iii) Monitor
- (iv) CD ROM
- (v) Floppy Drive
- (vi) Hard Drive depending on volume (see below)

III. Communication Specifications (5) POP3 Account and SMTP server accounts that can support number of active subscribers (6) Dedicated T1 access to POP3 and SMTP provider IV. Hardware and Software Sizing Configurations Phase 1:

1K-10K subscribers and players during the game

Two Servers

Server 1—runs Web/Application Server for the website and the Trivia Application

Server 2—runs the Database server (20 Gig)

Phase 2:

10K-25K subscribers and players during the game

Server 1—runs Application Server for the Website front end

Servers 2 and 3 (2 Servers)—run the Application Server for Trivia Application (two servers are used handle load balancing)

Server 4—runs the Database server (50 gig) (Level 1 RAID 2×50G Array)

(Server 5—used as a backup to server 4—depending upon Reliability requirements)

Phase 3:

25K-50K subscribers and players during the game

Server 1—runs Application Server to run the Website front end

Servers 2, 3, 4 and 5—run the Application Server for Trivia Application (four servers are used to handle load balancing with hardware and software clustering)

Server 6—Database Server—150 gig (Level 0+1 RAID 6*50G Array)

(Server 7—used as a backup to server 6—depending upon reliability requirements).

In one alternative embodiment, as part of the sign up for trivia the system optionally asks the general admission or season ticket holders to input their seats to simplify how the system obtains information where the patron is being seated when they come to the game. In an alternative embodiment, the system obtains this information from the stadium database system, kiosk where the patron can enter the information at the stadium and/or via the point of sales system by the service personnel or attendant that is selling the tickets. Using any of the above methods, once the system knows where the patron is/are seating when present at the game, the system can then target sections of the stadium for, for example, the trivia quiz or other service/offering to the patrons.

Examples of different sections that can be separately targeted include for baseball, behind first base line first, behind home plate second, first base line third—all lower deck; same sections for upper deck and bleachers. Other sports may include football, hockey, soccer, basketball, and the like. In accordance with this embodiment, targeting different sections over different periods of time, thereby preventing a long delay to receive answers once the question is transmitted, may minimize collusion among patrons.

Thus, by segmenting the stadium over a few minutes in accordance with one embodiment of the invention, the present invention may increase the window of transmission to, for example, 2 minutes or more for the first round. As the rounds get successively smaller, the present invention will transmit messages faster. The present invention also provides optional winners for different sections of the field. In addition, the section winners can further optionally compete against each other, for example, the first class seating winner can further compete against the bleachers winner, and the like.

As discussed above, one or more of the above alternative embodiments may be incorporated into the embodiments described above, and/or any of the embodiments discussed below. Furthermore, any of the embodiments of the present invention may be used for any reserved seating event.

Figure 27:
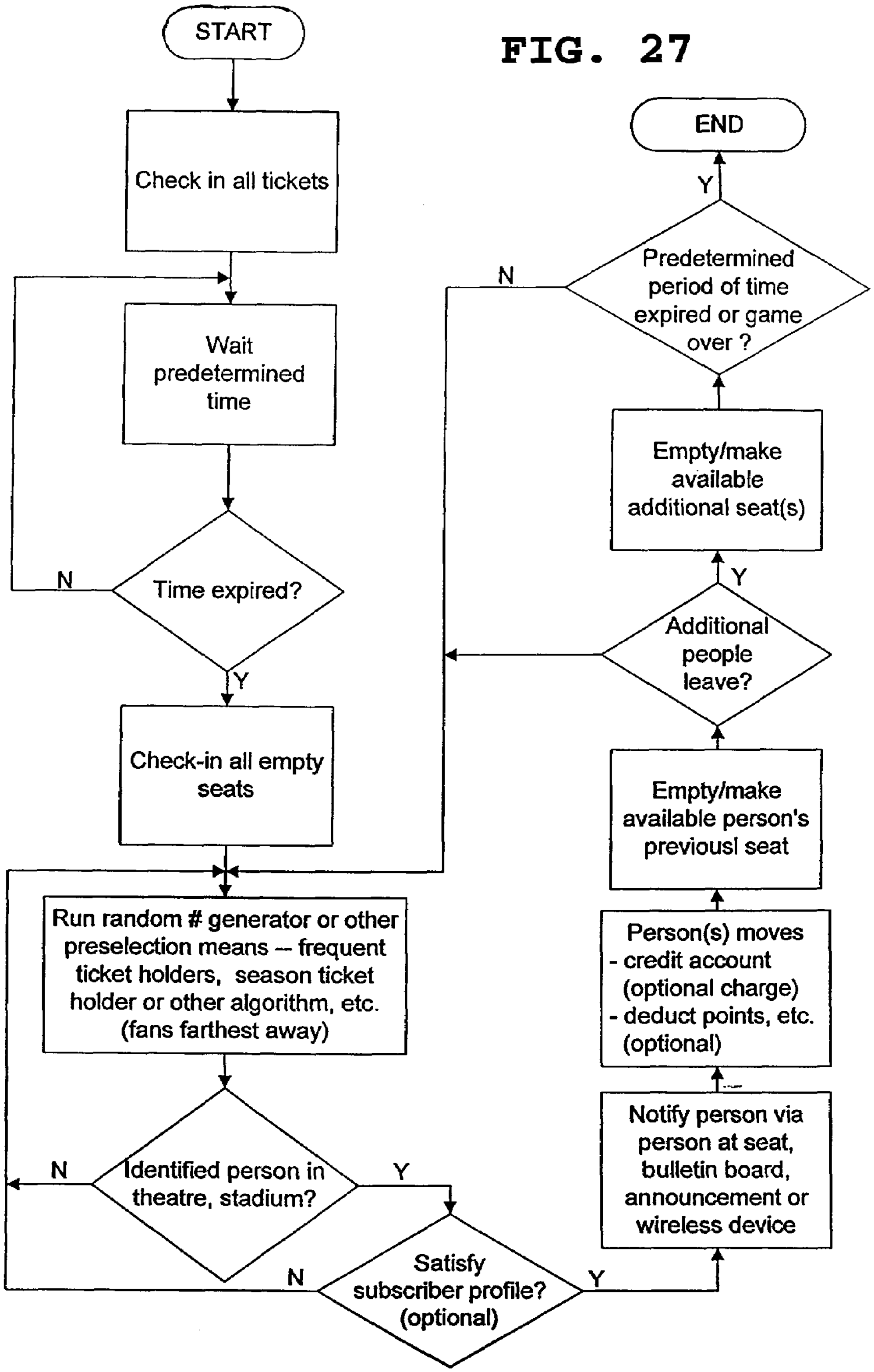

FIG. 27 is a flowchart of a fifth embodiment of the invention. In FIG. 27, the process begins as all tickets are checked in, for example, as the patrons enter the reserved seating area, such as a stadium or theater, through, for example, bar code readers, scanners, infrared readers, and/or manually or other method where the patron is checked in, either at the gate, seat or other location. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seats for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, or other predetermined process.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or more means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

If the patron accepts, payment of money or other means may be effectuated on the spot via the wireless device, credit card, debit card, points, and the like, and the patron may now move to the other seat. The patron's seat may then optionally be made available as an empty seat to the re-allocation process. The process then optionally determines whether there have been additional vacancies, for example, just prior to the event, during the event or as a result of predetermined processes, and empties and/or makes available these additional seats for the event. For example, if standard smart card, standard scanner, standard bluetooth, wireless, or other technology is used in the present invention, additional seats may be made available as patrons leave the event early, for example if diverted for an urgent business meeting, and the like. These additional seats may provide additional opportunities for patron satisfaction, revenue (theater or patrons), advertising, advertising sponsorship for banner advertising on the wireless device and/or in the theater, and the like. Thus, scanners posted at strategic locations, for example, at the exit of the theater or stadium will confirm that the patron is leaving, and optionally prompt the patron to confirm that they do not plan on returning. This embodiment may optionally be used in other embodiments of the present invention, and vice versa.

If a predetermined period of time has not expired, then the re-allocation process may be run again to optionally continuously re-allocate seats while advantageously including the additional seats. The patron may optionally store the upgraded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

In accordance with the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that may be in the vicinity of the stadium but were unable to get seats. Since the present invention re-allocates and/or sells tickets very near to game time in accordance with one embodiment, the patron must be in the general vicinity of the stadium to take advantage of this embodiment of the invention.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron to help the patron decide the quality of the upgrade and whether to accept.

In one alternative embodiment, if the patron that has their ticket re-allocated in error, e.g., because the patron did not show up to the event based on the predetermined criteria but the patron was still planning on attending because they forgot about their seat being re-allocated, the system can re-allocate seats immediately upon the checking in of the patron and notify them that their seats have changed because they are late. In this situation, the stadium/venue might decide to further upgrade the patrons because of the mistake.

In accordance with one embodiment of the present invention, the process of the present invention specifically reserves seats of the highest or very high rating that are considered preferred, in the event a patron's seat is re-allocated prematurely or erroneously. In this situation, the patron who has had their seat re-allocated because they will likely receive an even better seat as a result of the mistaken (stadium or patron) or premature seat re-allocation.

In another embodiment of the present invention, as patrons are entering the venue or stadium, they are provided advantageously with a map of the stadium so patrons can analyze the potential upgrade to make a decision whether the upgraded seats are sufficiently good or of value to warrant the patron moving and/or paying for the additional upgrade. By handing the patron the map of the stadium, the process of the present invention is not required to transmit a detailed schematic to the patron's wireless device which would not normally be able to effectively permit the patron to evaluate the proposed upgrade seats. The map that is handed out may optionally include information for patrons on where to register for the upgrade and/or additional advertisement opportunities.

In one alternative embodiment, the patron that has purchased the ticket, for example, a season ticket holder, may advise the stadium that for a particular game, set of games or all games, they do not want their seats to be re-allocated, and perhaps, an additional fee is assessed for this type of patron. If the stadium provides the ability for the patron to selectively opt out of the seat re-allocation, the patron can, for example, connect to the system via the Internet, public switched telephone network, cellular network, and the like, and notify the system that they do not want their ticket re-allocated, for example, because they are coming late to the event. Other means of notifying the system and/or other reasons may be utilized in connection with the present invention.

In another alternative embodiment, the system provides patrons the ability to individually select when their tickets may be re-allocated. For example, one patron may prefer to only give up their ticket if they are late to the game by 15 minutes, while another patron may be willing to give up their ticket if they have not arrived 15 minutes before the game. In alternative embodiments, the stadium may provide incentives for the patron to have their ticket re-allocated prior to the game because it increases the stadiums chances of re-allocating/re-selling the ticket.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provide additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In an alternative embodiment, the system determines priority of re-allocation of seats based first upon patrons that have seats that may also be re-allocated. That is, the systems attempts to maximize the number of re-allocations by prioritizing the re-allocation based upon seats that may be re-allocated after already being re-allocated. For example, if front row seats in a stadium are available to be re-allocated, in this alternative embodiment, patrons that are in the next closest section for example on the field level would be upgraded first to those seats. Then, patrons with less preferred seats, for example, in the upper deck would be re-allocated to the seats that have now become available from the patrons that have been upgraded to the front row. Thus, using this alternative priority scheme, the present invention maximizes the re-allocation numbers. Of course, this priority algorithm may be combined with additional factors, for example, relating to subscriber/patron value. As described above, additional factors may be utilized in the algorithm to determine the subscriber or set of subscribers to offer the upgrade.

In alternative embodiments, patrons in the vicinity of the upgraded and re-allocated patrons may optionally rate the upgraded patron, for example, for appropriate behavior, wearing of excessively large hats, drunkenness behavior, and the like. These ratings may then be taken into account in the re-allocation algorithm for future upgrades to the patron.

In alternative embodiments, the patrons eligible for the upgrade may be notified using standard email communications over a wireless device, mobile telephone, and/or other standard communication means. For example, standard text-to-voice and/or voice-to-text communications may be used to contact the patron to evaluate whether an upgrade will be accepted and to actually accept the upgrade.

In another embodiment of the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that have already purchased tickets in the vicinity of the stadium but were unable to get seats and/or may be in the vicinity of the stadium but were unable to get seats. Since the present invention re-allocates and/or sells tickets at any time prior to and/or after beginning of game time in accordance with one embodiment, the patron may be in the general vicinity of the stadium to take advantage of this embodiment of the invention or even at any location when being offered upgrades and/or seats well in advance of the game. For example, the present invention can upgrade or sell tickets to patrons well in advance of the game since it advantageously is permitted or has the authority to resell tickets either via ticket holders that do not show up during the game and/or, for example, season ticket holders that have authorized the stadium in advance to resell their tickets based on predetermined criteria, for example, when the season ticket holder notifies the stadium that they will not be present at next weeks game.

In one optional embodiment of the invention, the patron presents the usher with the confirmation number which the usher can enter into a wireless device using a local or private wireless network, or can simply use a walkie talkie or telephone to call the dispatcher to confirm the upgrade and/or new seats using the customer provided confirmation number. The dispatcher will have access to the system to enter the confirmation number to confirm the validity of the upgrade. Alternatively, a patron will retain their old ticket. The patron will give in the old ticket to the usher which is scanned or barcoded by the usher for immediate identification of new seats and used in place of, or in addition to, confirmation number.

Of course, the confirmation may optionally be made via customer name with an appropriate identification card or other information. Further, alternative methods may be used to verify that the confirmation number and/or ticket being used by the patron is valid. For example, the patron may be equipped with a printing device associated with the wireless device or download an actual ticket on line from home prior to the game for the new ticket or upgrade. Alternatively, the patron may be equipped with an identifier card, optionally including a bar code with a unique identifier relating to the patron's account information and profile that can be scanned for additional convenience. Alternatively, a wireless device may be used to securely store this type of identification and/or account information.

In at least one alternative embodiment of the invention, the patron may comprise optionally a corporate account that has a number of tickets, for example, season tickets. In this embodiment, the corporate account may have associated therewith a plurality of email addresses or other communication addresses to transmit the seat or upgrade offer to a number of potential patrons that may rotate their attendance at the games. In accordance with this optional embodiment, multiple emails can be stored for a single user/corporate account, and the system may transmit individual messages to all email addresses, or may only transmit messages to individual patrons for corporate account that individually advise the system that they are associated with a particular ticket/bar code for a particular game and will be/are present at a particular game.

In an alternative embodiment, patrons may enter the stadium and subsequently inform the system that they are present and interested in an upgrade via a kiosk where the patron can scan a bar code and enter their customer number to be eligible for upgrades during the game. The system is then able to transmit a message to the customer, assuming that the customer has pre-registered with the system with the appropriate contact information. Alternatively, or in addition to individual use of a kiosk(s), the customer sales office may have a kiosk or additional functionality to enter the customer name and/or customer account and scan in the bar coded ticket on the spot to register each patron as they enter the stadium or venue.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron upon entry in the stadium to help the patron decide the quality of the upgrade and whether to accept when an offer is received by the patron at a predetermined time. The graphical map may comprise a small booklet with a map of the stadium showing seat locations, and optionally a game schedule.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provides additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In alternative embodiments, patrons in the vicinity of the upgraded and re-allocated patrons may optionally be eligible for a dating or matching service where patrons register and provide profile information to the system and/or through a third service provider dating service. Once the system knows that the patrons will be coming to the game and/or have actually checked in to the stadium, the system can then arrange for the two, four, etc. patrons to meet each other by allocating and/or re-allocating seats to the patrons together. Thus, based on profile information, customer request and availability, the system is able to upgrade or sell tickets to patrons to maximize their chances of meeting someone at the game. This optional feature provides significant potential enjoyment for the patrons participating in this dating or connection program. In accordance with this embodiment, one possible sequence of acceptance steps involves profile matching the two patrons (or groups of patrons) based on predetermined profile information; transmitting a first message to the first patron regarding availability of the second patron and requesting a conditional acceptance form the first patron; transmitting a second message to the second patron indicating that the first patron has conditionally accepted and request the second patron to accept; and when the second patron accepts before the first patron has rescinded the conditional acceptance, finalizing the upgrade and/or seat allocation for the first and second patrons. This embodiment of the invention is a complete reverse from typical dating and/or matchmaking services which attempt to develop detailed algorithms for the matching process because of the significant decision that exists in determining who to spend valuable time with. In accordance with the invention, patrons are already present at the game, and therefore, half or more than half the effort is already done. The remainder is to actually meet the other person which can be accomplished with profile criteria, whether or not the algorithms are very sophisticated.

In one embodiment, the patrons that are being matched have their original seats maintained and not made available for other upgrades in the event the matching does not work out early on. In this embodiment, one or both the patrons can return to their original seat. Hopefully, there will not be a significant argument of who would need to return to their original seat if an upgrade is actually performed. In addition, in accordance with this embodiment, the seats that are selected do not necessarily have to be better seats in the classical sense. That is, seats further away from other ticket holders might be considered preferred when matching two individuals for the first time. Alternatively, couple that would prefer a little more privacy or quieter game might request to be moved to a more isolated area. Alternatively, families with small children might prefer to be moved to a less busy area as well during the game where the children might be able to freely move around. All these scenarios and/or alternatives are possible in view of the present invention. The advantage of performing a match in a public setting is that the patrons do not have to worry about leaving or ending the date, and also do not have to worry that the other person will have their home address.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like.

In addition, this feature also optionally permits the patrons that have participated in the program to rate one another for future dates. For example, one patron can rate the conversational benefits of the second patron, the appearance of the second patron, the overall short term versus long terms relationship goals of the patron, and the like. These ratings may then be taken into account in the algorithm for future seat assignments, re-allocations and/or upgrades in the future for the first and second patrons, and all other patrons will now benefit with the additional profile information of the first and second patrons. The matching service may be for amusement or work related networking purposes, for example, to meet an executive that the patron currently works with or wishes to work with/sell in the future.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like. In addition, the system advantageously and optionally provides the feature of allowing patrons to text message one another directly, and/or exchange pictures via wireless email, text messaging, and other wireless devices that provide the standard capability of exchanging pictures, such a T Mobile and/or Sprint.

In alternative embodiments, the ticket holder can call in via a voice to text message, text message and/or email and let the stadium know early that they are not coming. In this manner the ticket holder obtains the convenience of the stadium or venue reselling their tickets in advance, thereby providing the venue with additional time to maximize the resale of the ticket.

In alternative embodiments, when the patron enters the stadium, they have their ticket barcoded or other device that detects their presence can be used such as infrared, Bluetooth, etc., and then they can become eligible for an upgrade. The patron can register in advance that they want to receive upgrades by providing their name, message address, e.g., email, telephone text message address, etc., and optionally their credit card or other payment mechanism for upgrades that actually cost money as opposed to free upgrades. In alternative embodiments, the patron can register at the ticket booth when purchasing their original ticket. In this scenario, the stadium representative can enter this information on behalf of, and with the permission of, the patron since the patron may already be providing their credit card, debit card, etc. to purchase the original tickets. Alternatively or in addition, a kiosk may be provided where the patron can enter their original ticket, e.g., scan in their original ticket and provide their name and text message information in the stadium to register for a one time upgrade for the game after purchasing, for example, a regular admission ticket.

In alternative embodiments, an usher can verify that the patron should be upgraded by the patron providing the confirmation number that may be transmitted in real-time by the system, and/or by the patron using their original confirmation number or original ticket with barcode or other identification means, such as a smart card, infrared reader, etc. that represents original ticket and presenting same to the user. The usher then needs only to scan in the original ticket and the system will verify whether the patron associated with the original ticket is valid and whether the upgrade is valid.

In alternative embodiments, a warning message may be sent to the ticket holder that has not shown up to game warning them that if they do not respond within a certain time period that their seat will be re-allocated or re-assigned to another patron. Similarly, a release message may be sent to the ticket holder after their seat has actually been released and/or re-allocated, thereby notifying the patron that if they change their mind in attending the game, they will have to obtain an additional ticket. In alternative embodiments, the ticket holder that has their seat released and re-allocated can be themselves re-allocated a similar, worse or better seat, depending on, for example, their subscriber value and/or other criteria. For example, if the patron is provided a better seat, this will encourage them to more readily give up their seats in the future even if they are attending the game. On the other hand, if the patron is provided a worse seat, then this encourages them not to artificially give up or have their seat released when attending the game. Accordingly, the present invention is designed to deal with various behavioral patterns of specific ticket holders, and may optionally and advantageously be a ticket holder specific with respect to various criteria for re-assigning, releasing, selling and/or re-allocating tickets.

In alternative embodiments, the system transmits to the ticket holder a welcome message after being upgraded and after having being moved to a new upgraded seat location. In one embodiment, the system identifies that the patron has been successfully upgraded after the patron provides the usher with a confirmation number or original ticket, which is then verified by the usher and system.

In alternative embodiments, the system, after having identified which patrons have checked into the stadium and/or have been upgraded, transmits a trivia question and/or additional advertisements to all patrons attending the game. In alternative embodiments, the information is transmitted to both patrons that are attending the game and additional patrons that have registered in the past to receive information but that are not attending the game. The participants can, for example, answer trivia questions and respond with their wireless device. Depending on whether the patron is attending the game or not, the system may determine to offer or deal with each of the patrons differently. For example, for patrons at the game, winners may be successively determined and narrowed, as patrons successfully and unsuccessfully answer questions, round after round of questions in a "spelling bee" format. For patrons that are not attending the game, winners may be declared, or statistics provided to the broadcast station that can be aired on television. In yet additional alternative embodiments, instead of transmitting information/questions to the patrons via the wireless device, the information/questions are displayed on the stadium billboard for patrons at the game and/or on television for patrons that are watching the game on television. The patron can then merely respond via the device, e.g., the telephone accordingly via a voice-to-text system or via other mobile devices via text messaging.

In alternative embodiments, the present invention provides the advantage of additional advertising sponsorship to the venue. For example, in one embodiment, the venue is partitioned into different locations that may be assigned to different sponsors. In one embodiment, the sponsor that provides the most value may be assigned a certain number of premium seats that are not available to other sponsors.

For example, the sponsor may offer a discount on the upgrade if you are a Verizon or Verizon Wireless customer or they credit your cell account for each seat upgrade or you get say 30 free minutes, etc. In alternative embodiments, the present invention provides the advantage of one wireless provider to advertise on another wireless providers mobile phone or wireless device. For example, if Verizon Wireless is a sponsor of the upgrade system for a particular stadium, the present invention will still work with, for example, AT&T, SPRINT, and CINGULAR customers. An advertisement message sent with the upgrade offer may read on the AT&T phone, "brought to you by Verizon Wireless." In an alternative embodiment of the present invention, text messaging is optionally used for mobile phones to perform the message communication of the present invention. The user is only required, in one embodiment, to reply or respond with a "Yes" to accept the upgrade offer since the user has advantageously pre-registered with the system, thereby minimizing the required communication/input by the user. In an alternative embodiment, the user, instead of pre-registering with the system, is charged on their wireless or even regular telephone number bill when they accept the upgrade offer. Thus, the wireless system that either administers the user's regular or wireless account or the upgrade sponsor may be responsible for actually billing the customer in this alternative embodiment.

In the alternative embodiment when text messaging is optionally used alone or in combination with other communication methods, the system provides the additional advantage of maximizing bandwidth usage by not requiring use of bandwidth on the wireless voice system, thereby maximizing system resources.

In another alternative embodiment, the present invention optionally and advantageously provides a security and/or safety feature in the event of, for example, a minor event where a parent gets separated from a child, a disaster or other event that might require evacuation of the stadium. In one embodiment, the person needing help provides their name to an attendant that can search the system for the contact information of their companion/parent. The system can thereafter send an email and/or text message to the companion/parent regarding the status of that person and provide instructions for meeting that person or arranging help, authorizing medical procedures, and the like. In another embodiment, the person requiring help, e.g., a child provides the attendant or kiosk with their ticket which can, e.g., scan the bar code or other reader system. The system can either automatically provide a text message to the parent who can then reply to the child/attendant via the kiosk to meet the child.

Alternatively, the parent can be instructed to meet the child at a predetermined location, and to stop looking for the child because the child was found. Thus, for this example, the person who is lost or separated from their party can notify security or access a kiosk. Security can, for example, notify the parent that child is in safe custody, and should not search the stadium, and therefore, meet outside stadium in a pre-specified safe place.

In an alternative embodiment, if a child/person is separated, the security guard/kiosk can arrange the best place to meet, either in or outside the stadium, together based on an optional global positioning system (GPS). In addition, the party with the mobile device can be provided directions on where to go to meet their party from who they have been separated.

In an alternative embodiment, the present invention may also be used in a security, defense and/or safety setting to direct patrons in a stadium for an orderly evacuation or notify patrons regarding status of a safety related event via, for example, a broadcast message including text message, email and the like. In this manner, system communication resources may be most efficiently utilized by not over-utilizing the system via voice communication, unless completely necessary. For example, the message can be broadcast in the event of an impending hurricane. In this situation, patrons in different sections get different messages, for example, to exit the stadium out of gates/exits that are either less occupied or closest to the section the patrons are sitting in. Advantageously, the present invention has the patrons contact information, including optionally and advantageously text messaging, that can be broadcast or sent to different patrons. The advantage of text messaging is that the bandwidth is more efficiently used in the event of an emergency, and there are no busy signals as in a voice network. Further, the message is send, and if the network is at capacity, the system can automatically resend or the message will be placed in queue and sent as soon as capacity becomes available.

In another alternative embodiment of the invention, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction.

For instance, in sporting venues the bracelet ticket includes the machine readable information that comprises at least one of a bar code and radio frequency identifier used for security check in, and optionally check out. In this manner, the standard reading machines that can scan the bar code or RFID information can keep track of people that have checked into the sporting event and/or venue. Advantageously, the machine readable information on the bracelet can also be used by the venue in the event the patrons seat assignment is modified, for example, via an electronic ticket exchange or upgrade program. In this embodiment, the visible indicia are no longer valid for the actual seating that may be dynamically changed and only represents optionally an initial seat assignment. However, the machine readable information may be used as a code to reference the specific patron and assign that patron a new seat. Thus, when the ticket reader scans the ticket and actually identifies, for example, the bar code, this information can be used to reference the patron, update and/or confirm the patron's current seat via the reader used, for example, by ushers in the venue, kiosk, entrance to the venue, and the like.

In an alternative embodiment, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction. This information, as previously mentioned, may be visually cognizable for the patron and in combination, readable by electronic means if the bracelet includes a magnetic strip, bar code imprinting, or RF chip.

In an alternative embodiment of the present invention, the security bracelet and ticket combination of the present invention advantageously includes a bar code or other machine readable information such as a RFID device. When, for example, a child is separated form their parent, the parent can notify security and the seat number associated with the child. If the child attempts to leave with their bar code/identifier, the system detects the bar code/identifier as either being valid and identifying the child that is missing or being invalid and raising another red flag. In an alternative embodiment, the bar codes/identifiers associated between children and adults correspond such that the child identifier must be within a predetermined time and/or number of checking out identifiers from/within the adult identifier. If this does not occur, the system determines that the child is leaving without their parent, and possibly being abducted.

In an alternative embodiment, the system links one or more tickets/identifiers together and requires the tickets/identifiers to exit the venue or event within a predetermined time period from one another and/or within a predetermined number of tickets/identifiers that have exited the venue and/or event. In the event that one ticket/identifier exits the venue or event and the associated identifier does not, then an alarm or other indictor occurs, and the attendants will detain the patrons that have initiated the alarm to for security purposes.

In an alternative embodiment, the tickets are advantageously coded with designations such as adult, child and the like. In the event a child ticket/identifier exits the stadium before the associated adult and/or more that a predetermined time period and/or number of patrons exiting, the system can initiate an alarm so that an attendant can determine if a child has exited the venue or event without their parent or with a wrong parent potentially averting a kidnapping. In this embodiment, an additional combination is the use of the standard fast pass feature, for example, at theme parks, and the like, where the venue records predetermined events that the user of the card enters in a faster line. In this embodiment, if a child ticket/identifier is not associated with a parent ticket/identifier, for example, as described above, the child may be denied entry into the event or venue if not accompanied by their parent. In alternative embodiments, the venue/event sponsor or organizer associates tickets upon request from the patron. In addition, in another alternative embodiment, a kiosk is provided inside and/or outside the venue for, for example, parents to register their tickets and have them associated with their children's tickets to prevent the child from exiting the venue without them, for example, as described above.

In an alternative embodiment of the present invention, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In another alternative embodiment of the present invention, a security bracelet is advantageously utilized, for example, such as the security bracelet disclosed in U.S. application Ser. No. 10/680,207, filed on Oct. 8, 2003, to Abraham I. Reifer, et al., and incorporated herein by reference, in the event of a reported event, security breach, abduction, and the like. In this embodiment, all patrons exiting the stadium must show their ticket and/or identifier so that the venue can check all patrons out of the stadium. Thus, for example, if two kidnappers come in the stadium, and want to use one bracelet for a child, the second kidnapper will be stranded in the stadium. In addition, if one kidnapper buys two tickets, then upon exit with the child and the additional ticket, a barcode/identifier will be exiting without ever having checked in, and then the alarm will go off as well.

In another alternative embodiment, the present invention provides a broadcast message to warn patrons of an event, such as an advertisement, sale and/or even a weather related event such as a hurricane that might require the venue to be evacuated. Advantageously, in at least one embodiment, the broadcast message comprises standard text messaging that optimizes or better utilizes capacity form the communication system. Thus, when using text messaging capabilities, the present invention efficiently transmits text messages to numerous subscribers regarding, for example, exit information, contacting and/or meeting additional parties that have been separated, and the like.

In an alternative embodiment of the present invention, the present invention optionally provides the capability to penetrate into secondary market with season ticket holders selling ahead of time the games they will not be attending. For example, the present invention optionally provides the feature for the season ticket holder and/or general ticket purchaser the ability to view in advance of the season and/or game the schedule, and to alert the venue and/or stadium of games and/or events they will not be attending, thereby permitting the stadium/venue to attempt to resell the tickets to other patrons. For example, in one embodiment of the invention, the patron is provided with a monthly schedule listing the events that may be attended. The patron, such as a season ticket holder, may then click or place an indicator on all games they will not be attending for the season in advance, thereby providing the stadium with the ability to resell tickets well in advance of the event. Once the patron completes identifying games that will not be attended, the system then compiles a list and transmits the list to the patron for an optional confirmation. This list is then used by the system to release seats well in advance of the game. In an alternative embodiment of the invention, registered users of the system for, for example, upgrades, may also be notified of seat availability for sales prior to the game/event. In an alternative of this embodiment, registered users may receive text messages, emails, and the like, notifying them advantageously of the availability of seats that heretofore have never been easily available to the public for sale, thereby allowing the venue to participate in secondary market ticket sales.

In one alternative embodiment of the present invention, the system/process of the present invention provides or operates as a middle person/broker between the ticket holder that is returning tickets to the venue, such as the season ticket holder, and a ticket sales system and/or company, such as tickets.com, by notifying the tickets company of the newly available seats via notification by the ticket holder, such as the season ticket holder of season ticket games not being attended.

In one alternative embodiment of the invention, the system and/or process transmits text messages, emails and the like, to offer tickets and/or seats and/or admittance to subscribers for events and/or games with empty seats even before game. Thus, the present invention allows the venue to participate in the secondary ticket sales market and the upgrade market, thereby increasing revenue and fan loyalty.

Of course, all of the embodiments of the present invention may be used for any reserved seating event, and/or venue that require tickets for entry thereof.

In another alternative embodiment of the present invention, the use of machine readable identifiers provides advantages for, for example, the upgrade program or ticket exchange of the present invention. For example, when the upgrade, reallocation and/or electronic ticket is issued, the machine readable identifier, for example, the bar code, on the original ticket is invalidated, thereby preventing use of the invalidated ticket. Accordingly, when a new ticket holder purchases the ticket form the season ticket holder, the new purchaser will be issued a new machine readable identifier, and optionally a new paper ticket. The present invention advantageously is able to handle the issuance of a new ticket and invalidates the old ticket and optionally the old identifier that has, for example, been returned by the season ticket holder, thereby providing dynamic ticketing capability.

In an alternative embodiment of the present invention, the new patron obtains a new identifier such as a barcode, the old bar code of, for example, the season ticket holder is invalidated. In one embodiment of the invention, season ticket holders are offered to opt in the upgrade process. Various commercial incentives are possible for the season ticket holder to opt in the upgrade process, such as monetary compensation when their ticket is used for an upgrade and/or resold whether they express their intention not to go to the game prior to the game, and the like. Alternatively, season ticket holders may be offered that the cost of their season tickets will, for example, remain the same as the previous year or be reduced if they participate in the program. Therefore, the combination season ticket trade-in and upgrade program in one embodiment of the invention will be beneficial to season ticket holders by allowing them to trade when they already know that they have no intention of attending a game, and allow the season ticket holder to recoup some cost of the season tickets if they do not attend and their ticket is used as an upgrade. In addition, additional patrons of the event and/or sports team are permitted to attend the game in locations/seats that they might never have been able to obtain access to. Further, the venue/stadium/team maximize revenues by being able to place tickets on the secondary market when the ticket holder notifies the venue early enough that they are not attending the event, the venue also obtains additional revenue from upgrades when tickets are upgraded, and the venue obtains additional fan loyalty.

In another embodiment of the present invention, the system provides the ability to advertise via email, text messaging, and the like, for one wireless carrier on the wireless device that is using another wireless carrier. Since the user of the wireless device has requested the service, the user appropriately receives the communication from the ticketing system of the present invention, and therefore, also appropriately received the advertisement from the wireless carrier that is different than the wireless carrier that the user of the wireless may be using at that time.

In another alternative embodiment of the present invention, offers to purchase seats either during the game or even well in advance of the game are "pushed" or transmitted out to registered users that have supplied their wireless and/or Internet addresses. For example, patrons can register in advance for the upgrade and/or regular ticket offers to purchase admittance via various methods including the Internet. When seats band/or admittance becomes available, a broadcast message or other standard messages may be transmitted to the registered patrons to notify them of the seat availability. Thus, seat offers are "pushed" to registered users that have requested this service advantageously to a wireless device and/or other address including standard telephone communication, as well as additional optional advertisements. The system, in one alternative embodiment, provides the user the option when registering to accept certain types of advertisements to be received on their wireless device via email and/or text messaging. In other embodiments, the user does not have the option of which advertisements to receive.

Advantageously, in accordance with one alternative embodiment of the present invention, if a patron decides to attend an event such as a sporting event when the patron does not have time to wait to receive paper tickets (e.g., the patron is visiting in another city/location and does not have time to wait to receive tickets via mail and is on the go), the system of the present invention transmits a ticket to the patron via, for example, a wireless communication system and/or other standard electronic communication system such as the Internet, and the patron can present their ticket, for example, on their wireless device and show up to game.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Patrons then text message and/or email and/or answer questions via voice-to-text messaging their answers. The system can then display the overall number of answers that are correct and incorrect, display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another alternative embodiment of the present invention, the system uses a seat database to determine which of the reserved seats are currently in use. The system may integrate with the seat database system of a venue and/or stadium or optionally be used in parallel with the seat venue/stadium database. For example, prior to the event, the system may utilize the seat database of the venue to determine available seating and patrons that do not show up after a predetermined period of time. Alternatively, the present invention can operate using a separate database from the event/venue by copying or building a separate database used for the ticketing and/or upgrading according to the present invention. In this alternative, as patrons enter the venue, they are checked in directly to this separate database. At the time of the event, the system will be able to check-in patrons using either the identification system, e.g., bar code scanner, of the event or venue, or provide a separate identification system.

In alternative embodiments of the invention, the patron that knows they are attending the game but is going to be late can send in a HOLD message even prior to being provided a warning message that their seats are to be released if the patron does not respond to the message with the HOLD request. That is, in this embodiment, since the patron already knows well in advance that they are attending the game, but perhaps stuck in traffic, the patron can initiate the HOLD message before even being warned in advance of the possibility of their seat being released.

In another alternative embodiment, patrons that have registered with the system and optionally checked into the stadium and/or venue in advance and who also know that they would like an upgrade and/or ticket, may initiate their own upgrade request to the system to notify the system of their willingness to purchase an upgrade and/or new ticket for the event/venue. The system may then place these patrons on a higher priority since they have already expressed and intent and/or willingness to purchase the upgrade or ticket. The patron may notify the event and/or stadium of their willingness optionally well in advance of the game or near/after game time at a time which the patron commits or expresses an additional heightened desire to upgrade and/or purchase a ticket.

In alternative embodiments, the system includes the advantage of allowing patrons to register free for a predetermined period of time, for example, for the first year, without paying a yearly subscriber fee. Alternatively and/or in addition thereto, the system provides the patron with their first upgrade for free or for a reduced rate to further encourage the patron to register with the system and method of the present invention. Alternatively and/or in addition thereto, the system of the present invention offers the patron reduced and/or free concessions when purchasing a membership, ticket and/or upgrade to further encourage the patron to participate in the offers of the present invention.

In alternative embodiments of the present invention, the matching system and/or process, permits participants in the program to initiate a message to the system with the seat location and/or name of the patron that they would like to be matched with for a meeting, networking and/or socializing such as a date. In this embodiment, the system may the push the message to the other subscriber and assign new seats to the individuals that are to be matched. Alternatively, the system need not require a specific confirmation that the second individual to be notified of the potential match is physically located near the first individual, but can rely on the first individual to provide that information. For example, the first individual may see a potential date in a restaurant, and may then send a message to the system with that person's name or address, that they would like to meet that other individual. In that situation, the second individual will receive a message of the possible match, and can respond and accept or reject the offer to meet. The second individual can then provide a meeting destination or the system can suggest a meeting place based on the first individual advising the system of their location, and the location of the second individual.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Advantageously, the multiple choice questions each have unique selections, such as a1, b1, c1 and d1 for question #1; a2, b2, c2, and d2 for question #2; a3, b3, c3 and d3 for question #3, and the like. In this embodiment, the actual timing of questions is not necessary since each question and answer is unique. Therefore, the speed of responding to the question is immaterial to the winner of the contest and/or correct answer. Also, in the event one patron answers the question late, there will be no confusion which question the patron is submitting an answer for. Patrons text message and/or email and/or answer questions via voice-to-text messaging their answers as indicated above using the unique set of answers, in one embodiment. In alternative embodiments, the first predetermined number of patrons that answer the question correctly are considered the winners.

The system can then display the overall number of answers that are correct and incorrect, e.g., a1 50%, b1 28%, c1 12% and d1 10%, and display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another embodiment of the invention in connection with the seating upgrade and/or assignment system, an identifier and/or machine identifier such as a bar code, RFID, etc. optionally remains static for the user on the user's ticket and/or device that is provided for optional paperless ticketing. For example, the identifier will remain the same associated with the user, but the seat assignment, privileges, user characteristics, user preferences, and the like, may be dynamically changes. The system and method of the present invention will be updated so that the identifier can represent a dynamic seat assignment or other dynamic information, such as general admission to an associated event, or other event and/or venue, including, for example, a restaurant, bar, and the like.

In another embodiment of the present invention, the upgrades process and/or feature may be provided to users/patrons as a complimentary reward for fan loyalty, to reward the user but also market other goods/services and/or other advertising opportunities to be transmitted via the wireless device and/or mobile phone. In one embodiment of the invention, the system and/or method initially queries the user, for example, at the beginning of the trivia contest and/or tournament or at the beginning of the game, whether the user is present in the stadium or not. The system can then perform, for example, the trivia contest, and determine a winner(s) to award for example some form of reward. Furthermore, in another embodiment of the invention, based on the number of people responding that they are present at the game, the present invention advantageously provides a random upgrade to a predetermined number of patrons as an additional fan loyalty program and/or advertising sponsorship to one or more entities that sponsor the free upgrades.

In another embodiment of the invention, a system and/or method is provided that advantageously builds and/or acquires and/or collects mobile contact addresses of users in an efficient manner. For example, in accordance with the present invention, a user advantageously need only provide the communication network and telephone number, and the present invention builds a data address therefrom. This allows the mobile or wireless device user to still register for a service without specifically knowing their data address for, for example, data communication such as SMS messaging, text messaging, email, and the like. In one embodiment, the mobile user is provided a drop down menu where the user selects the communication network and provides their mobile phone number.

The present invention is particularly advantageous currently with the recent enactment by the Federal Communications Commission (FCC) number portability where mobile phone users are able to transfer their existing numbers to other networks. Accordingly, we have determined that a user's number will advantageously provide a mode of contact for the user even when the user decides to change communication networks.

In one embodiment of the invention, the software processes and system determines and builds the actual messaging address (email, text, SMS, and the like) to send messages to the mobile device by the user only selecting and/or providing the communications network and the telephone number. Thus, the present invention advantageously simplifies the process for mobile or wireless device users to register and/or provide contact information, and therefore, beneficially increases the number of individuals that can effectively and easily register for a communication service.

In another embodiment, the present invention facilitates the ability for potential users to signup for the service of receiving, for example, trivia, upgrades and/or text messages via a user sign up device or apparatus. In one embodiment, the user sign up sheet includes numbers and/or circles that can be filled in like a grid, where the user can fill in or cover the numbers that identify their portable number. In addition, the user can check off the specific network carrier from a list of network carriers, or simply enter their specific network carrier. The user sign up sheet may be done electronically via a computer and user interface as described above, or may initially be filled out by a user via, for example, a piece of paper and then later entered into the computer system of the present invention.

In another embodiment of the invention, the system and method of the present invention is capable of re-locating a patron via the mobile address that was previously provided, even if the patron has changed wireless carriers. For example, in one embodiment, with the recent feature of mobile phone portability by the FCC, we have determined that a significant number of mobile phone users are likely never to change their number/address, and therefore, the system and method of the present invention is able to send text messages and/or email to all network addresses using the telephone number of the user if the system suspects that the previously provided network by the user is no longer being used. In this embodiment, the user can optionally respond to the message and/or network broadcast message, confirming that one of the messages has been received.

In another embodiment of the message, whenever a user wants to contact a mobile phone, mobile wireless device or even computer based, via for example, an Internet based account, wants to contact another mobile wireless device user, the present invention provides a transmission device, for example, via the Internet or individual models/mobile phones used for each of the networks to broadcast the message on all networks. Advantageously, in accordance with this embodiment, since the user is likely to maintain the same telephone number, their data or text messaging address will be their telephone number and one of the few network addresses. This type of broadcast message can happen anytime, and even for voice communication when the user of the wireless device needs to receive a data, text and/or voice message.

In another alternative embodiment of the invention, as described previously, the invention may be used by a patron to obtain specific data or information regarding sports or venue related information of interest. For example, patrons may communicate with the system and forward a player jersey number or number of racecar during an event such as a baseball game, football game, racing event such as Nascar, to obtain additional information including current statistics and past statistics. The present invention can then optionally sent statistics throughout the game or event to the patron without the patron requesting, for example, at specific time intervals or after notable achievements during the event, such as a home run, touch down, $7^{th}$ inning stretch, half time, number of laps traveled, and the like.

Thus, the present invention includes many variations in the type of information a user may receive, whether specifically checked into a venue or registered for the service for a particular event. In addition, the present invention includes various processes and systems for ensuring delivery of messages to patrons that have requested the service or merely sending messages that a patron may be interested in receiving.

In another embodiment of the invention, the matching and/or networking system includes the ability to contact and/or notify the users to coordinate the meeting using any one of a plurality of communication methods including text messaging, email and/or instant messaging, with the additional advantage of transmitting pictures, video and/or other data that provides additional information regarding the other person that has been suggested for the match and/or network. In one implementation of this embodiment, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. For example, different message transmit and/or receive formats may be used depending on the system. The present invention beneficially parses the various different formats to obtain the necessary information for the communications described herein. In addition, the represent invention formats the messages for the different wireless devices so that the messages may be appropriately received even though different devices and/or communication networks have different messaging formats. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In accordance with another embodiment of the invention, the matching and/or networking system includes the option of permitting a subscriber to notify the system when they are ready for a potential meeting and/or match. Once the matching and/or networking system is notified of the subscriber requesting the match, the system is then capable of either tracking the user though a positioning system such as GPS, permitting the user to register at predetermined locations upon user initiation such as via Bluetooth, RFID, infrared, and the like. In accordance with this embodiment, the subscribers are not being constantly tracked, and therefore, maintain an additional level of privacy. In alternative embodiment, the present invention continuously tracks the subscribers without specifically requesting to be matched. In this alternative embodiment, the subscriber is provided with less privacy because they may be notified of a specific match even though they might not be interested in the match and/or meeting at that time.

In an alternative embodiment, the present invention provides subscribers with the ability to accept/reject the match before each of the subscribers receive personal information of the other and/or before the date/match has been arranged with at minimum a meeting location. In this embodiment, the invention requires that both users accept the match and/or date prior to notifying the subscribers of the contact information for each subscriber. Therefore, subscribers can optionally request additional information from the system of the present invention, even multiple times, to better understand the potential date and/or match before accepting, and importantly, before the other subscriber is provided contact information and/or a meeting location of the subscriber. In the embodiment where the present invention merely provides the meeting location, the present invention advantageously does not provide the subscribers contact information and/or other personal information before the match/date. Advantageously, in accordance with this embodiment of the invention, subscribers never receive personalized or personal contact information unless the subscribers, after meeting in person, agree to exchange such information.

In another embodiment of the invention, the dating and/or networking system provides subscribers the functionality to email, instant message and/or text message at least one additional piece of personal information and/or questions, optionally directly to each other or via the system anonymously, to obtain additional information that may be more relevant than the user profile or information from the user profile that was used to make the initial date/match.

In another embodiment of the dating and/or matching system of the present invention, the system optionally provides automatic and/or user initiated registration in a particular establishment and/or geographic location, which can be used instead of a location determination system such as GPS, or together with such system. This form of registration may be even more precise than GPS because it confirms a subscriber's presence within a specific store, establishment, entertainment establishment, restaurant, and the like. Thus, in these embodiments, the subscriber either initiates the registration as described above, or alternatively, if the subscriber optionally sets the wireless device to automatic registration based on the appearance at a predetermined registration area and/or location, the subscriber will be automatically registered to receive communications regarding a potential match/date.

In an alternative embodiment of the present invention, once the dating and/or matching system determines that a potential match/date has been detected, the system optionally notifies the different subscribers and asks whether they want to continue to participate in the matching/dating program. When both, some and/or all subscribers agree to participate, the present invention can forward to each subscriber automatically the information that each subscriber shares substantially in common and/or the information that was responsible for the match/date between the subscribers. In this embodiment of the invention, the subscribers will know immediately the information that should be most relevant in making the match/date and can determine whether to actually agree to either contact or send the other subscriber additional information and/or arrange to meet the subscriber at a pre-designated location.

In an alternative embodiment of the present invention, the present invention optionally includes the ability to recommend a potential meeting place for the subscribers to meet after determining that the subscribers have agreed to participate in the date/meeting. In this embodiment, the present invention advantageously determines the location based on, for example, subscriber preferences, geographic location that is preferential for at least one of the subscribers and/or both subscribers, predetermined location where, for example, a sponsor will receive patronage and/or provide a discount for the subscribers and/or actual pay the organizer of the dating/matching system an advertising fee to promote their sponsorship. Accordingly, the present invention advantageously determines not only a potential match/date, but advantageously suggests, recommends and/or determines a specific location and/or geographic location and/or restaurant, clothing store, zoo, museum, and/or other suitable location for the subscribers to meet and optionally based on geographic distance and/or location.

Additional dating and/or matching features and/or differentiators of the networking and/or dating system of the present invention include one or more fo the following:

Wireless messaging platform supports interactive messaging

Wireless messaging platform provides simultaneous parallel applications to run without collision Multiple wireless initiatives or topics run without conflict Different initiatives or topics may be user specific or selectable While each initiative runs independently, there can be overlap in terms of customer base Platform is flexible to add/remove initiatives quickly and efficiently One wireless carrier/network can be a dating/matching sponsor and advertise on the wireless device and/or network of another wireless carrier/network Contact members to notify of the match/date to allow members to either directly contact each other or send additional information via, for example, text messaging, email, instant messaging, such as pictures, video, and the like Contact members or wait for request from members to participate in match/date initiative; can then automatically track member via GPS instead of constantly tracking member all the time, thereby increasing privacy of member Contact each subscriber that is being offered the date/match and obtain approval for the match prior to actually notifying potential members that match has been made Contact users after initial match has been conditionally approved, and provides users the capability to request additional information, such as personal information from the other member or other members which the requestor still wants to know before finally accepting the date/match Members can register or "check-in" at predetermined locations and/or establishments which is one additional level of specificity, for example, with regard to the location where a member is that may be interested in matching; For example, two or more members may actually be in the same restaurant where they can be informed of one or more other subscribers being present; members can register via sending a message to the system via text message, email, RFID, Bluetooth, and the like, either by initiating a registration or automatically Contact members after initial match has been conditionally approved and exchange, optionally automatically, profile information that was significant in making the match/date and/or other important information regarding a match/date that a member may want to know before finally accepting the match/date and/or information the members may want to know that is geared particularly for a first date, e.g., likes/dislikes, common interests, favorite foods, wines, alcoholic beverages, and the like Contact members to suggest and/or recommend and/or arrange meeting place based on, for example, geographic location, common interests/sports, common food tastes, common beverage tastes, common entertainment preferences and/or sponsors willing to, or interested in, being utilized for the match/date for the suggestion and/or recommendation, and optionally providing the members a discount and/or compensating by the sponsor to the networking and/or dating system proprietor for the advertising and/or recommendation to visit that sponsor Wireless messaging platform includes a protocol conversion server functioning to interface with a variety of wireless networks having different messaging characteristics for both transmitting and receiving messages, and parsing the different message formats for the content from a received message, and transmitting a message to a plurality of different networks and/or devices having different messaging and/or interface capabilities and/or functionality Contact members with a wireless consent form indicating that the matching/dating system and/or the members participating in the match/date have generally consented to potential cohabitation optionally without any recourse to the other party. Alternatively, the members may be contacted with other types of informed consent forms with limited recourse for acts and/or aggressive acts that are clearly assaults, but not sexual related misconduct or sexual related crimes that are felonious in nature carrying a high penalty/sentence. Alternatively, members may be presented with consent forms that eliminate any criminal penalty, but do not foreclose the possibility of civil lawsuits for damages relating to torts, and the like As another alternative and/or in addition thereto, members may be presented with consent forms that eliminate any civil penalty, but do not foreclose the possibility of criminal lawsuits for criminal type activities, perhaps with the exception of the most severe sexual crimes such as rape and/or sexual assault that carry significant prison time.

For example, athletes, celebrities, high worth individuals, or even average individuals, male or female, may be interested in the wireless consent initiative because that allows them more flexibility to meet a variety of individuals without the worry of later being sued. In additional alternative embodiments, broadcast messages may be transmitted to numerous individual that may be interested in meeting and/or dating a celebrity or predetermined individual or individuals. In this embodiment, the optimum matching individual or individuals may be selected to meet with the celebrity, celebrities, and the like, while utilizing the informed consent feature of the present invention. In another alternative embodiment, an individual or individuals may be randomly selected as part of a match or date, based on a lottery or other competition to meet or date a specific individual or individuals.

Additional optional hardware and software requirements are as follows for one or more embodiments of the present invention:

System Capabilities

Platform supports interactive messaging

Platform provides simultaneous parallel applications to run without collision

Multiple wireless initiatives or topics run without conflict

Different initiatives or topics may be user specific or selectable

While each initiative runs independently, there can be overlap in terms of customer base Platform is flexible to add/remove initiatives quickly and efficiently Wireless Initiatives Interactive trivia with fans inside and outside of the stadium Targeted messaging, e.g., targeted advertising Broadcast messaging, e.g., general advertising Interactive messaging, e.g., with concessions Profiling for each initiative or topic, e.g., based on network operator Urgent and emergency messaging Specific initiative: discounts for concessions and/or memorabilia Specific initiative: invite patrons to different activities before, during or after game, e.g., player loyalty, family activities, etc.

Specific initiative: seating upgrade program

Specific initiative: messaging patrons in one section and separate messaging to patrons in another section Specific initiative: messaging parent of a missing child Special initiative: dating where patrons can keep their seats to return to them, or their seats are re-allocated. In alternative embodiments, the patrons switch seats instead of moving to empty seats, either for the entire game or only a portion thereof with other patrons for match making possibilities.

Functional Specifications

Front end for user signup and profiling-secure site—for example, modeled after www.mlb.com, include one or more of:

type of seats does the customer want for upgrade (decks and range of sections)

information for dating concession profile capability for additional profile information validate user by sending message to device upon sign up auto append of network information to phone number during signup login and password protected site frames on website or interface that can be easily configured to have look and feel, for example, of particular baseball team capability for space on screen for advertising opportunity that can easily be modified and relatively dynamic capability to handle lost passwords web page or interface where customers with season tickets can mark a calendar with the seats they want to keep and the ones they are interested in freeing up for early sale or upgrade.

The optional Front End of the present invention used for administration and setting up parameter for each application, optionally includes a secure site, with one or more of the following:

application email address and password minutes for all the configuration parameters and/or functionality number of threads for each application for upgrades, at least one of releasing customers old seat immediately, or it until the customer approves of the release, or holding the customer's seat for a predetermined portion or all of the game, for example, in the dating functionality)

set schedule for games section rating setup, and seat upgrade pricing revenue allocation model provide a number of retries if message send failure Concessions The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; I beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

Concession Wireless Initiative

Purchased via cell phone

Web registration for preferences

Targeted concession offers

Confirmation that purchase is ready

Delivered to seat or ready for expedited pickup

Customer convenience: system identifies closest concessions to customer

Customer convenience: system determines concessions with short wait

Each concession labeled with a number for customer identification and fulfillment Customers can request menu, or register for each game to receive menu around game time via mobile device GPS can be used effectively to inform customer of closest concession stand to pickup order, and/or customer can provide section number and/or seat location for system to identify most convenient concession stand Most convenient concession stand can be determined based on one or more, or combination of, predetermined criteria, such as, closest concession location, shortest wait in line, specific item being ordered, and the like.

Interactive messaging, e.g., with concessions

Specific initiative: discounts for concessions and/or memorabilia

The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

In one alternative embodiment, the following message exchanges may be used:

First Message

"In Game" Concessions

Menu will be sent soon!

Reply with #, item short form and seating section

Ex: BE=beer

Reply 3BE for 3 beers

408SEC for section 408

Powered by NEXTEL

Second Message (paper menu?)

Menu

BE=Beer; CO=Coke; DCO=Diet Coke

HD=Hot Dog; BUR=Burger

TA=Taco/Salsa; PO=Popcorn

FF=French Fries; CH=Chips

PZ=Pretzel; PT=Peanut

LEM=Lemon Ice

Third Message

Order received!

Summary:

3 HD @ $3=$9

2 CO @ $3=$6

2 LEM @ $3.50=$7

Total=$22

Reply Y to ACCEPT

Credit Card charged

N to CANCEL

Fourth Message

Thank you for ordering!

Your order has been confirmed!

Confirm # REIF1001

Powered by: THE SPORTS AUTHORITY!

Fifth Message

ORDER READY

Bring Confirm # REIF1001 to Concession # 33 by sect # 212

$2 off NIKE baseball gloves

Bring #NIKE305 and game ticket to

Any SPORTS AUTHORITY!

In another embodiment of the invention used in concessions initiative, the concession attendant receives the confirmation number or other identifying information from the customer when picking up the concessions. The concessions attendant enters the confirmation number or other identifying information when ready or optionally clicks on the order on the computer screen via a concessions interface associated therewith. From there, the order is then cleared from the system with respect to orders that require fulfillment, advantageously allowing the workers to streamline their work activities in the concessions. In an alternative embodiment, the concessions are actually delivered to the customer using the sutomer provided seating information, either provided by the customer through, for example, the wireless device or other registration and/or notification process, or even via a telephone call or automated attendant to associate with the order.

In another embodiment of the invention, the concessions menu is advantageously only delivered to customers that have entered the stadium via a location determination system, and/or checked into the stadium via a ticket reader/scanner. In alternative embodiments, all customers that have registered for the concessions service will receive an introductory message. Thus, customers that are not attending the game need only reply with a request to terminate the concessions service for that event and/or game.

In an alternative embodiment, the customer is advantageously directed to closest concessions via, for example, GPS chip in phone or by knowing where the customer sits at check in, or by having the customer input their seat location or location where they would like to pickup the concessions.

In another embodiment of the invention, we have determined that some mobile phones will utilize different transmit and receive addresses, and therefore, a user may not know how to appropriately register to be a subscriber for one or more wireless initiatives. For example, we have determined that some mobile phone networks utilize slightly different or different electronic addresses for the transmitting and receiving of electronic messages. For example, for the Research In Motion (RIM) Blackberry communication service, the mobile device is assigned a desktop email address. In one configuration of Blackberry, the mobile device only has one address. However, in the non-integrated configuration, the mobile device actually has a separate address when transmitting from the receive address.

In accordance with this embodiment of the invention, the user registers by providing their mobile phone number and optionally a network carrier for same. In this embodiment, the mobile phone user registers with their phone number and optionally wireless network provider. The registration system of the present invention then sends a message to the mobile device, requesting that the mobile device respond, optionally with a predetermined code and/or predetermined message. The mobile device then responds to the registration system, and the registration system corresponds the mobile device response with the original registered mobile address, thereby completing the registration process by ensuring that responses received from the mobile device can be mapped appropriately to the mobile subscriber. In the embodiment where the mobile user is requested to provide a predetermined code and/or message, the registration system uses the predetermined code to map the mobile phone response potentially having a different address with the transmit address provided by the user.

Dating, Matchmaking and/or Networking

In another embodiment of the invention, patrons are provided the opportunity to meet others in the venue or at a predesignated location near or away from the venue using standard matching rules. In one embodiment, the presence of the user is detected when entering the stadium, for example, via the ticket entrance systems. In another embodiment, the presence of the patron is detected or determined based on a message that is send to the user, for example, either right before, during or after the game. In this embodiment, the user can be prompted with a request whether they would like to participate in the matchmaking, dating and/or networking program.

For example, potential business or social partners may be selected or prompted for networking or dating. When the user responds yes, in this embodiment, their current seat is irrelevant if that seat is not to be released for another patron. Therefore, the system need only select a new set of seats for the networking and/or dating for the patrons, transmit the patrons the additional new seats via, for example, a wireless ticket, update the venue seating database for subsequent verification by the ushers when seating the patrons. The patrons may then proceed to the new location and have a meeting or date, and then return to their original seats if desired.

In another embodiment, a "burnt bridge" approach or feature is provided where the original seats for the patrons that are meeting are then released for other upgrade and/or networking programs. In this embodiment, the original seat of the patron must be known for example, via check-in procedure, registration for the program in advance for example over the web registration process or other registration process, or via the patron responding to the system with their wireless device of their current seat location. Alternate combinations or modifications of the above embodiments is also used.

Trivia

In the alternative embodiment of providing the user trivia information, based on registration and/or location, for example, while attending the game, watching the game at home, or any time prior to or after the game, the user may be provided with questions, as described above, to answer as part of a tournament and/or to be eligible for prizes, awards, and the like. In one embodiment, a section or portion of the users are targeted for the questions together, while other sections and/or portions of the users are targeted at a time period thereafter, for example, 1 minute later, to stagger the communication and transmission of data, thereby reducing congestion and/or unnecessary hardware to accomplish the transmission and acceptance of information to/from the patron.

In one embodiment, while all the questions are staggered over a predetermined period of time to the patrons, whether limited to patrons in the stadium, out of the stadium and/or both, the patrons are not notified whether their answer is correct until after all questions have been transmitted, and all patrons are provided the opportunity and/or sufficient time to respond. Once that predetermined time period has elapsed, the patrons will be notified whether their answer was correct, and whether they are still in the tournament. In optional embodiments, a predetermined time period will again elapse until new questions are sent and the tournament continues.

Optional Oracle or My SQL Database

In one embodiment of the invention, an Oracle or My SQL Database is used in connection with the present invention. In one embodiment, the result set is set to be proportionally with respect to the number of users and/or data that will be stored in the system. In another embodiment, the database is optionally partitioned for specific games and/or initiatives or groups of games and/or initiatives. The system is preferably thread safe when running the games and/or initiatives. The system is optionally integrated with Credit Card for payment, and/or integrated with the venue ticket system and/or point of sale system to optionally determine who came in and when into the venue. In another embodiment, the present invention maintains and updates financial balances for users, such as patrons and stadiums. In alternative embodiments, secure interaction with ushers and an interactive kiosk is provided.

The present invention optionally provides any standard algorithm for partitioning of group of seats and users, for example, for system resource allocation, load balancing and/or division of system functionality. In alternative embodiments, a local kiosk for the stadium and/or venue is provided where the user can enter information, such as register for one or more initiatives and/or programs. In alternative embodiments, the system of the present invention includes the capability of offering for sale seats which are not currently sold via messaging to wireless devices, such as text messaging to mobile phones, or other messaging and/or wireless communication to wireless devices, and consideration. In alternative embodiments of the invention, standard algorithms such as used in the airline industry may be used to overbook seats for the venue, and consideration.

In alternative embodiment of the invention, instant messaging or any type of communication method can be used in the present invention, include local and/or global networks, such as the Internet, LANs, WANs, WAP, 811.02a, 802.11b, 802.11g networks, and the like.

Messaging Software Requirements

Trivia and/or other messaging products/initiatives are Java applications that run in a J2EE application server and utilize a JDBC 2.0 compliant relational database. There are typically open source options available for system support. Currently for development and test environments we utilize are desktop environments running Windows 2000 with the open source options below. The draw back is that open source options typically don't provide formal system support approaches, although we have found the software to be very reliable and would recommend this approach for early stage pilots. Should the customer prefer purchase software options for these components are provided as well.

I. Server Software Specifications

Alternative A—Open Source Approach (1) Web/Application Server—Tomcat 4.1.18

(2) Database—MySQL 4.0

(3) Windows 2000 Server for each server

Alternative B—Purchased Product Approach (1) Application Server—Websphere Application Server 5.0

(2) Database—Oracle 9i DBMS (3) Windows 2000 Server for each server

II. Server Hardware Specifications (4) Each of the HW Servers specification:
- (i) 2xCPU—P4 2.4 GHz Xeon
- (ii) 2 GB RAM
- (iii) Monitor
- (iv) CD ROM
- (v) Floppy Drive
- (vi) Hard Drive depending on volume (see below)

III. Communication Specifications (5) POP3 Account and SMTP server accounts that can support number of active subscribers (6) Dedicated T1 access to POP3 and SMTP provider IV. Hardware and Software Sizing Configurations Phase 1:

1K-10K subscribers and players during the game

Two Servers

Server 1—runs Web/Application Server for the website and the Trivia Application

Server 2—runs the Database server (20 Gig)

Phase 2:

10K-25K subscribers and players during the game

Server 1—runs Application Server for the Website front end

Servers 2 and 3 (2 Servers)—run the Application Server for Trivia Application (two servers are used handle load balancing)

Server 4—runs the Database server (50 gig) (Level 1 RAID 2×50G Array)

(Server 5—used as a backup to server 4—depending upon Reliability requirements)

Phase3:

25K-50K subscribers and players during the game

Server 1—runs Application Server to run the Website front end

Servers 2, 3, 4 and 5—run the Application Server for Trivia Application (four servers are used to handle load balancing with hardware and software clustering)

Server 6—Database Server—150 gig (Level 0+1 RAID 6*50G Array)

(Server 7—used as a backup to server 6—depending upon reliability requirements).

In one alternative embodiment, as part of the sign up for trivia the system optionally asks the general admission or season ticket holders to input their seats to simplify how the system obtains information where the patron is being seated when they come to the game. In an alternative embodiment, the system obtains this information from the stadium database system, kiosk where the patron can enter the information at the stadium and/or via the point of sales system by the service personnel or attendant that is selling the tickets. Using any of the above methods, once the system knows where the patron is/are seating when present at the game, the system can then target sections of the stadium for, for example, the trivia quiz or other service/offering to the patrons.

Examples of different sections that can be separately targeted include for baseball, behind first base line first, behind home plate second, first base line third—all lower deck; same sections for upper deck and bleachers. Other sports may include football, hockey, soccer, basketball, and the like. In accordance with this embodiment, targeting different sections over different periods of time, thereby preventing a long delay to receive answers once the question is transmitted, may minimize collusion among patrons.

Thus, by segmenting the stadium over a few minutes in accordance with one embodiment of the invention, the present invention may increase the window of transmission to, for example, 2 minutes or more for the first round. As the rounds get successively smaller, the present invention will transmit messages faster. The present invention also provides optional winners for different sections of the field. In addition, the section winners can further optionally compete against each other, for example, the first class seating winner can further compete against the bleachers winner, and the like.

As discussed above, one or more of the above alternative embodiments may be incorporated into the embodiments described above, and/or any of the embodiments discussed below. Furthermore, any of the embodiments of the present invention may be used for any reserved seating event.

Figure 28:
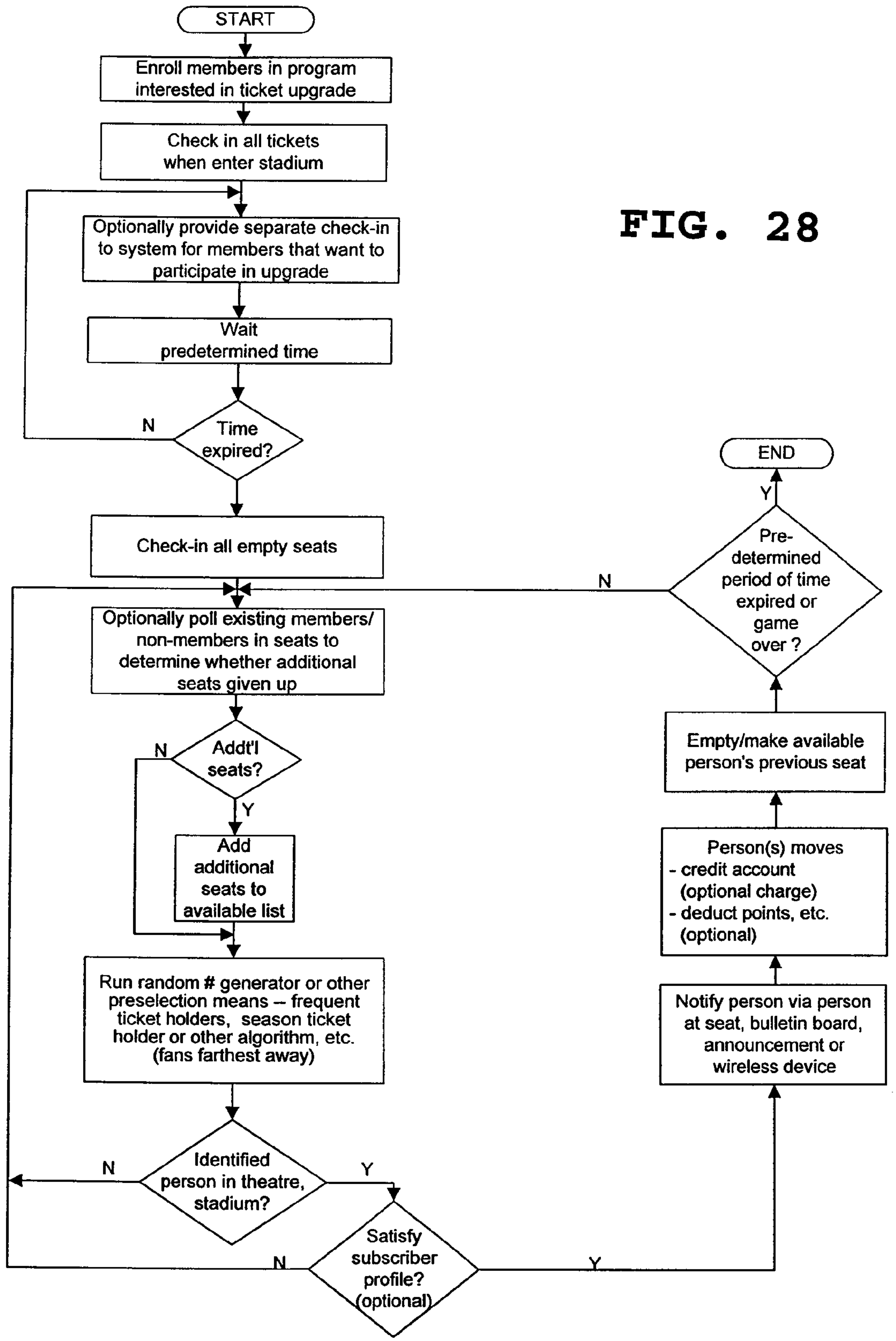

FIG. 28 is a flowchart of a sixth embodiment of the invention. In FIG. 28, the process begins by enrolling members in the program that are interested in the ticket upgrade. Tickets are checked in, for example, as the patrons enter the reserved seating area, such as a stadium or theater, through, for example, bar code readers, scanners, infrared readers, and/or manually or other method where the patron is checked in, either at the gate, seat or other location. An optional separate check in area is provided for patrons that want to participate in the upgrade program. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. The patron may check in either a predetermined time before or after the event begins. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seats for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, a standard bidding process, or other predetermined process.

An optional polling process to poll existing members and non-members in seats to whether additional seats are available. That is, in another optional embodiment of the present invention, non-members may also make their seats available for re-allocation/re-sale at any point in the process. In this additional polling process, the next step is to determine whether additional seats have been made available. If additional seats have been made available, then these additional seats are added to the list of available seats.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or more means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. Optionally, a bidding process may be initiated that allows various patrons to bid against one another. Any standard bidding process may optionally be used. The patron, of course has the option to decline, and if so, the process continues and returns to the re-allocation process to attempt to locate another possible patron.

If the patron accepts, payment of money or other means may be effectuated on the spot via the wireless device, credit card, debit card, points, and the like, and the patron may now move to the other seat. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

In accordance with the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that may be in the vicinity of the stadium but were unable to get seats. Since the present invention re-allocates and/or sells tickets very near to game time in accordance with one embodiment, the patron must be in the general vicinity of the stadium to take advantage of this embodiment of the invention.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron to help the patron decide the quality of the upgrade and whether to accept.

In one alternative embodiment, if the patron that has their ticket re-allocated in error, e.g., because the patron did not show up to the event based on the predetermined criteria but the patron was still planning on attending because they forgot about their seat being re-allocated, the system can re-allocate seats immediately upon the checking in of the patron and notify them that their seats have changed because they are late. In this situation, the stadium/venue might decide to further upgrade the patrons because of the mistake.

In accordance with one embodiment of the present invention, the process of the present invention specifically reserves seats of the highest or very high rating that are considered preferred, in the event a patron's seat is re-allocated prematurely or erroneously. In this situation, the patron who has had their seat re-allocated because they will likely receive an even better seat as a result of the mistaken (stadium or patron) or premature seat re-allocation.

In another embodiment of the present invention, as patrons are entering the venue or stadium, they are provided advantageously with a map of the stadium so patrons can analyze the potential upgrade to make a decision whether the upgraded seats are sufficiently good or of value to warrant the patron moving and/or paying for the additional upgrade. By handing the patron the map of the stadium, the process of the present invention is not required to transmit a detailed schematic to the patron's wireless device which would not normally be able to effectively permit the patron to evaluate the proposed upgrade seats. The map that is handed out may optionally include information for patrons on where to register for the upgrade and/or additional advertisement opportunities.

In one alternative embodiment, the patron that has purchased the ticket, for example, a season ticket holder, may advise the stadium that for a particular game, set of games or all games, they do not want their seats to be re-allocated, and perhaps, an additional fee is assessed for this type of patron. If the stadium provides the ability for the patron to selectively opt out of the seat re-allocation, the patron can, for example, connect to the system via the Internet, public switched telephone network, cellular network, and the like, and notify the system that they do not want their ticket re-allocated, for example, because they are coming late to the event. Other means of notifying the system and/or other reasons may be utilized in connection with the present invention.

In another alternative embodiment, the system provides patrons the ability to individually select when their tickets may be re-allocated. For example, one patron may prefer to only give up their ticket if they are late to the game by 15 minutes, while another patron may be willing to give up their ticket if they have not arrived 15 minutes before the game. In alternative embodiments, the stadium may provide incentives for the patron to have their ticket re-allocated prior to the game because it increases the stadiums chances of re-allocating/re-selling the ticket.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provide additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In an alternative embodiment, the system determines priority of re-allocation of seats based first upon patrons that have seats that may also be re-allocated. That is, the systems attempts to maximize the number of re-allocations by prioritizing the re-allocation based upon seats that may be re-allocated after already being re-allocated. For example, if front row seats in a stadium are available to be re-allocated, in this alternative embodiment, patrons that are in the next closest section for example on the field level would be upgraded first to those seats. Then, patrons with less preferred seats, for example, in the upper deck would be re-allocated to the seats that have now become available from the patrons that have been upgraded to the front row. Thus, using this alternative priority scheme, the present invention maximizes the re-allocation numbers. Of course, this priority algorithm may be combined with additional factors, for example, relating to subscriber/patron value. As described above, additional factors may be utilized in the algorithm to determine the subscriber or set of subscribers to offer the upgrade.

In alternative embodiments, patrons in the vicinity of the upgraded and re-allocated patrons may optionally rate the upgraded patron, for example, for appropriate behavior, wearing of excessively large hats, drunkenness behavior, and the like. These ratings may then be taken into account in the re-allocation algorithm for future upgrades to the patron.

In alternative embodiments, the patrons eligible for the upgrade may be notified using standard email communications over a wireless device, mobile telephone, and/or other standard communication means. For example, standard text-to-voice and/or voice-to-text communications may be used to contact the patron to evaluate whether an upgrade will be accepted and to actually accept the upgrade.

In another embodiment of the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that have already purchased tickets in the vicinity of the stadium but were unable to get seats and/or may be in the vicinity of the stadium but were unable to get seats. Since the present invention re-allocates and/or sells tickets at any time prior to and/or after beginning of game time in accordance with one embodiment, the patron may be in the general vicinity of the stadium to take advantage of this embodiment of the invention or even at any location when being offered upgrades and/or seats well in advance of the game. For example, the present invention can upgrade or sell tickets to patrons well in advance of the game since it advantageously is permitted or has the authority to resell tickets either via ticket holders that do not show up during the game and/or, for example, season ticket holders that have authorized the stadium in advance to resell their tickets based on predetermined criteria, for example, when the season ticket holder notifies the stadium that they will not be present at next weeks game.

In one optional embodiment of the invention, the patron presents the usher with the confirmation number which the usher can enter into a wireless device using a local or private wireless network, or can simply use a walkie talkie or telephone to call the dispatcher to confirm the upgrade and/or new seats using the customer provided confirmation number. The dispatcher will have access to the system to enter the confirmation number to confirm the validity of the upgrade. Alternatively, a patron will retain their old ticket. The patron will give in the old ticket to the usher which is scanned or barcoded by the usher for immediate identification of new seats and used in place of, or in addition to, confirmation number.

Of course, the confirmation may optionally be made via customer name with an appropriate identification card or other information. Further, alternative methods may be used to verify that the confirmation number and/or ticket being used by the patron is valid. For example, the patron may be equipped with a printing device associated with the wireless device or download an actual ticket on line from home prior to the game for the new ticket or upgrade. Alternatively, the patron may be equipped with an identifier card, optionally including a bar code with a unique identifier relating to the patron's account information and profile that can be scanned for additional convenience. Alternatively, a wireless device may be used to securely store this type of identification and/or account information.

In at least one alternative embodiment of the invention, the patron may comprise optionally a corporate account that has a number of tickets, for example, season tickets. In this embodiment, the corporate account may have associated therewith a plurality of email addresses or other communication addresses to transmit the seat or upgrade offer to a number of potential patrons that may rotate their attendance at the games. In accordance with this optional embodiment, multiple emails can be stored for a single user/corporate account, and the system may transmit individual messages to all email addresses, or may only transmit messages to individual patrons for corporate account that individually advise the system that they are associated with a particular ticket/bar code for a particular game and will be/are present at a particular game.

In an alternative embodiment, patrons may enter the stadium and subsequently inform the system that they are present and interested in an upgrade via a kiosk where the patron can scan a bar code and enter their customer number to be eligible for upgrades during the game. The system is then able to transmit a message to the customer, assuming that the customer has pre-registered with the system with the appropriate contact information. Alternatively, or in addition to individual use of a kiosk(s), the customer sales office may have a kiosk or additional functionality to enter the customer name and/or customer account and scan in the bar coded ticket on the spot to register each patron as they enter the stadium or venue.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron upon entry in the stadium to help the patron decide the quality of the upgrade and whether to accept when an offer is received by the patron at a predetermined time. The graphical map may comprise a small booklet with a map of the stadium showing seat locations, and optionally a game schedule.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provides additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In alternative embodiments, patrons in the vicinity of the upgraded and re-allocated patrons may optionally be eligible for a dating or matching service where patrons register and provide profile information to the system and/or through a third service provider dating service. Once the system knows that the patrons will be coming to the game and/or have actually checked in to the stadium, the system can then arrange for the two, four, etc. patrons to meet each other by allocating and/or re-allocating seats to the patrons together. Thus, based on profile information, customer request and availability, the system is able to upgrade or sell tickets to patrons to maximize their chances of meeting someone at the game. This optional feature provides significant potential enjoyment for the patrons participating in this dating or connection program. In accordance with this embodiment, one possible sequence of acceptance steps involves profile matching the two patrons (or groups of patrons) based on predetermined profile information; transmitting a first message to the first patron regarding availability of the second patron and requesting a conditional acceptance form the first patron; transmitting a second message to the second patron indicating that the first patron has conditionally accepted and request the second patron to accept; and when the second patron accepts before the first patron has rescinded the conditional acceptance, finalizing the upgrade and/or seat allocation for the first and second patrons. This embodiment of the invention is a complete reverse from typical dating and/or matchmaking services which attempt to develop detailed algorithms for the matching process because of the significant decision that exists in determining who to spend valuable time with. In accordance with the invention, patrons are already present at the game, and therefore, half or more than half the effort is already done. The remainder is to actually meetithe other person which can be accomplished with profile criteria, whether or not the algorithms are very sophisticated.

In one embodiment, the patrons that are being matched have their original seats maintained and not made available for other upgrades in the event the matching does not work out early on. In this embodiment, one or both the patrons can return to their original seat. Hopefully, there will not be a significant argument of who would need to return to their original seat if an upgrade is actually performed. In addition, in accordance with this embodiment, the seats that are selected do not necessarily have to be better seats in the classical sense. That is, seats further away from other ticket holders might be considered preferred when matching two individuals for the first time. Alternatively, couple that would prefer a little more privacy or quieter game might request to be moved to a more isolated area. Alternatively, families with small children might prefer to be moved to a less busy area as well during the game where the children might be able to freely move around. All these scenarios and/or alternatives are possible in view of the present invention. The advantage of performing a match in a public setting is that the patrons do not have to worry about leaving or ending the date, and also do not have to worry that the other person will have their home address.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like.

In addition, this feature also optionally permits the patrons that have participated in the program to rate one another for future dates. For example, one patron can rate the conversational benefits of the second patron, the appearance of the second patron, the overall short term versus long terms relationship goals of the patron, and the like. These ratings may then be taken into account in the algorithm for future seat assignments, re-allocations and/or upgrades in the future for the first and second patrons, and all other patrons will now benefit with the additional profile information of the first and second patrons. The matching service may be for amusement or work related networking purposes, for example, to meet an executive that the patron currently works with or wishes to work with/sell in the future.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like. In addition, the system advantageously and optionally provides the feature of allowing patrons to text message one another directly, and/or exchange pictures via wireless email, text messaging, and other wireless devices that provide the standard capability of exchanging pictures, such a T Mobile and/or Sprint.

In alternative embodiments, the ticket holder can call in via a voice to text message, text message and/or email and let the stadium know early that they are not coming. In this manner the ticket holder obtains the convenience of the stadium or venue reselling their tickets in advance, thereby providing the venue with additional time to maximize the resale of the ticket.

In alternative embodiments, when the patron enters the stadium, they have their ticket barcoded or other device that detects their presence can be used such as infrared, Bluetooth, etc., and then they can become eligible for an upgrade. The patron can register in advance that they want to receive upgrades by providing their name, message address, e.g., email, telephone text message address, etc., and optionally their credit card or other payment mechanism for upgrades that actually cost money as opposed to free upgrades. In alternative embodiments, the patron can register at the ticket booth when purchasing their original ticket. In this scenario, the stadium representative can enter this information on behalf of, and with the permission of, the patron since the patron may already be providing their credit card, debit card, etc. to purchase the original tickets. Alternatively or in addition, a kiosk may be provided where the patron can enter their original ticket, e.g., scan in their original ticket and provide their name and text message information in the stadium to register for a one time upgrade for the game after purchasing, for example, a regular admission ticket.

In alternative embodiments, an usher can verify that the patron should be upgraded by the patron providing the confirmation number that may be transmitted in real-time by the system, and/or by the patron using their original confirmation number or original ticket with barcode or other identification means, such as a smart card, infrared reader, etc. that represents original ticket and presenting same to the user. The usher then needs only to scan in the original ticket and the system will verify whether the patron associated with the original ticket is valid and whether the upgrade is valid.

In alternative embodiments, a warning message may be sent to the ticket holder that has not shown up to game warning them that if they do not respond within a certain time period that their seat will be re-allocated or re-assigned to another patron. Similarly, a release message may be sent to the ticket holder after their seat has actually been released and/or re-allocated, thereby notifying the patron that if they change their mind in attending the game, they will have to obtain an additional ticket. In alternative embodiments, the ticket holder that has their seat released and re-allocated can be themselves re-allocated a similar, worse or better seat, depending on, for example, their subscriber value and/or other criteria. For example, if the patron is provided a better seat, this will encourage them to more readily give up their seats in the future even if they are attending the game. On the other hand, if the patron is provided a worse seat, then this encourages them not to artificially give up or have their seat released when attending the game. Accordingly, the present invention is designed to deal with various behavioral patterns of specific ticket holders, and may optionally and advantageously be a ticket holder specific with respect to various criteria for re-assigning, releasing, selling and/or re-allocating tickets.

In alternative embodiments, the system transmits to the ticket holder a welcome message after being upgraded and after having being moved to a new upgraded seat location. In one embodiment, the system identifies that the patron has been successfully upgraded after the patron provides the usher with a confirmation number or original ticket, which is then verified by the usher and system.

In alternative embodiments, the system, after having identified which patrons have checked into the stadium and/or have been upgraded, transmits a trivia question and/or additional advertisements to all patrons attending the game. In alternative embodiments, the information is transmitted to both patrons that are attending the game and additional patrons that have registered in the past to receive information but that are not attending the game. The participants can, for example, answer trivia questions and respond with their wireless device. Depending on whether the patron is attending the game or not, the system may determine to offer or deal with each of the patrons differently. For example, for patrons at the game, winners may be successively determined and narrowed, as patrons successfully and unsuccessfully answer questions, round after round of questions in a "spelling bee" format. For patrons that are not attending the game, winners may be declared, or statistics provided to the broadcast station that can be aired on television. In yet additional alternative embodiments, instead of transmitting information/questions to the patrons via the wireless device, the information/questions are displayed on the stadium billboard for patrons at the game and/or on television for patrons that are watching the game on television. The patron can then merely respond via the device, e.g., the telephone accordingly via a voice-to-text system or via other mobile devices via text messaging.

In alternative embodiments, the present invention provides the advantage of additional advertising sponsorship to the venue. For example, in one embodiment, the venue is partitioned into different locations that may be assigned to different sponsors. In one embodiment, the sponsor that provides the most value may be assigned a certain number of premium seats that are not available to other sponsors.

For example, the sponsor may offer a discount on the upgrade if you are a Verizon or Verizon Wireless customer or they credit your cell account for each seat upgrade or you get say 30 free minutes, etc. In alternative embodiments, the present invention provides the advantage of one wireless provider to advertise on another wireless providers mobile phone or wireless device. For example, if Verizon Wireless is a sponsor of the upgrade system for a particular stadium, the present invention will still work with, for example, AT&T, SPRINT, and CINGULAR customers. An advertisement message sent with the upgrade offer may read on the AT&T phone, "brought to you by Verizon Wireless." In an alternative embodiment of the present invention, text messaging is optionally used for mobile phones to perform the message communication of the present invention. The user is only required, in one embodiment, to reply or respond with a "Yes" to accept the upgrade offer since the user has advantageously pre-registered with the system, thereby minimizing the required communication/input by the user. In an alternative embodiment, the user, instead of pre-registering with the system, is charged on their wireless or even regular telephone number bill when they accept the upgrade offer. Thus, the wireless system that either administers the user's regular or wireless account or the upgrade sponsor may be responsible for actually billing the customer in this alternative embodiment.

In the alternative embodiment when text messaging is optionally used alone or in combination with other communication methods, the system provides the additional advantage of maximizing bandwidth usage by not requiring use of bandwidth on the wireless voice system, thereby maximizing system resources.

In another alternative embodiment, the present invention optionally and advantageously provides a security and/or safety feature in the event of, for example, a minor event where a parent gets separated from a child, a disaster or other event that might require evacuation of the stadium. In one embodiment, the person needing help provides their name to an attendant that can search the system for the contact information of their companion/parent. The system can thereafter send an email and/or text message to the companion/parent regarding the status of that person and provide instructions for meeting that person or arranging help, authorizing medical procedures, and the like. In another embodiment, the person requiring help, e.g., a child provides the attendant or kiosk with their ticket which can, e.g., scan the bar code or other reader system. The system can either automatically provide a text message to the parent who can then reply to the child/attendant via the kiosk to meet the child.

Alternatively, the parent can be instructed to meet the child at a predetermined location, and to stop looking for the child because the child was found. Thus, for this example, the person who is lost or separated from their party can notify security or access a kiosk. Security can, for example, notify the parent that child is in safe custody, and should not search the stadium, and therefore, meet outside stadium in a prespecified safe place.

In an alternative embodiment, if a child/person is separated, the security guard/kiosk can arrange the best place to meet, either in or outside the stadium, together based on an optional global positioning system (GPS). In addition, the party with the mobile device can be provided directions on where to go to meet their party from who they have been separated.

In an alternative embodiment, the present invention may also be used in a security, defense and/or safety setting to direct patrons in a stadium for an orderly evacuation or notify patrons regarding status of a safety related event via, for example, a broadcast message including text message, email and the like. In this manner, system communication resources may be most efficiently utilized by not over-utilizing the system via voice communication, unless completely necessary. For example, the message can be broadcast in the event of an impending hurricane. In this situation, patrons in different sections get different messages, for example, to exit the stadium out of gates/exits that are either less occupied or closest to the section the patrons are sitting in. Advantageously, the present invention has the patrons contact information, including optionally and advantageously text messaging, that can be broadcast or sent to different patrons. The advantage of text messaging is that the bandwidth is more efficiently used in the event of an emergency, and there are no busy signals as in a voice network. Further, the message is send, and if the network is at capacity, the system can automatically resend or the message will be placed in queue and sent as soon as capacity becomes available.

In another alternative embodiment of the invention, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction.

For instance, in sporting venues the bracelet ticket includes the machine readable information that comprises at least one of a bar code and radio frequency identifier used for security check in, and optionally check out. In this manner, the standard reading machines that can scan the bar code or RFID information can keep track of people that have checked into the sporting event and/or venue. Advantageously, the machine readable information on the bracelet can also be used by the venue in the event the patrons seat assignment is modified, for example, via an electronic ticket exchange or upgrade program. In this embodiment, the visible indicia are no longer valid for the actual seating that may be dynamically changed and only represents optionally an initial seat assignment. However, the machine readable information may be used as a code to reference the specific patron and assign that patron a new seat. Thus, when the ticket reader scans the ticket and actually identifies, for example, the bar code, this information can be used to reference the patron, update and/or confirm the patron's current seat via the reader used, for example, by ushers in the venue, kiosk, entrance to the venue, and the like.

In an alternative embodiment, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction. This information, as previously mentioned, may be visually cognizable for the patron and in combination, readable by electronic means if the bracelet includes a magnetic strip, bar code imprinting, or RF chip.

In an alternative embodiment of the present invention, the security bracelet and ticket combination of the present invention advantageously includes a bar code or other machine readable information such as a RFID device. When, for example, a child is separated form their parent, the parent can notify security and the seat number associated with the child. If the child attempts to leave with their bar code/identifier, the system detects the bar code/identifier as either being valid and identifying the child that is missing or being invalid and raising another red flag. In an alternative embodiment, the bar codes/identifiers associated between children and adults correspond such that the child identifier must be within a predetermined time and/or number of checking out identifiers from/within the adult identifier. If this does not occur, the system determines that the child is leaving without their parent, and possibly being abducted.

In an alternative embodiment, the system links one or more tickets/identifiers together and requires the tickets/identifiers to exit the venue or event within a predetermined time period from one another and/or within a predetermined number of tickets/identifiers that have exited the venue and/or event. In the event that one ticket/identifier exits the venue or event and the associated identifier does not, then an alarm or other indictor occurs, and the attendants will detain the patrons that have initiated the alarm to for security purposes.

In an alternative embodiment, the tickets are advantageously coded with designations such as adult, child and the like. In the event a child ticket/identifier exits the stadium before the associated adult and/or more that a predetermined time period and/or number of patrons exiting, the system can initiate an alarm so that an attendant can determine if a child has exited the venue or event without their parent or with a wrong parent potentially averting a kidnapping. In this embodiment, an additional combination is the use of the standard fast pass feature, for example, at theme parks, and the like, where the venue records predetermined events that the user of the card enters in a faster line. In this embodiment, if a child ticket/identifier is not associated with a parent ticket/identifier, for example, as described above, the child may be denied entry into the event or venue if not accompanied by their parent. In alternative embodiments, the venue/event sponsor or organizer associates tickets upon request from the patron. In addition, in another alternative embodiment, a kiosk is provided inside and/or outside the venue for, for example, parents to register their tickets and have them associated with their children's tickets to prevent the child from exiting the venue without them, for example, as described above.

In an alternative embodiment of the present invention, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In another alternative embodiment of the present invention, a security bracelet is advantageously utilized, for example, such as the security bracelet disclosed in U.S. application Ser. No. 10/680,207, filed on Oct. 8, 2003, to Abraham I. Reifer, et al., and incorporated herein by reference, in the event of a reported event, security breach, abduction, and the like. In this embodiment, all patrons exiting the stadium must show their ticket and/or identifier so that the venue can check all patrons out of the stadium. Thus, for example, if two kidnappers come in the stadium, and want to use one bracelet for a child, the second kidnapper will be stranded in the stadium. In addition, if one kidnapper buys two tickets, then upon exit with the child and the additional ticket, a barcode/identifier will be exiting without ever having checked in, and then the alarm will go off as well.

In another alternative embodiment, the present invention provides a broadcast message to warn patrons of an event, such as an advertisement, sale and/or even a weather related event such as a hurricane that might require the venue to be evacuated. Advantageously, in at least one embodiment, the broadcast message comprises standard text messaging that optimizes or better utilizes capacity form the communication system. Thus, when using text messaging capabilities, the present invention efficiently transmits text messages to numerous subscribers regarding, for example, exit information, contacting and/or meeting additional parties that have been separated, and the like. In an alternative embodiment of the present invention, the present invention optionally provides the capability to penetrate into secondary market with season ticket holders selling ahead of time the games they will not be attending.

For example, the present invention optionally provides the feature for the season ticket holder and/or general ticket purchaser the ability to view in advance of the season and/or game the schedule, and to alert the venue and/or stadium of games and/or events they will not be attending, thereby permitting the stadium/venue to attempt to resell the tickets to other patrons. For example, in one embodiment of the invention, the patron is provided with a monthly schedule listing the events that may be attended. The patron, such as a season ticket holder, may then click or place an indicator on all games they will not be attending for the season in advance, thereby providing the stadium with the ability to resell tickets well in advance of the event. Once the patron completes identifying games that will not be attended, the system then compiles a list and transmits the list to the patron for an optional confirmation. This list is then used by the system to release seats well in advance of the game. In an alternative embodiment of the invention, registered users of the system for, for example, upgrades, may also be notified of seat availability for sales prior to the game/event. In an alternative of this embodiment, registered users may receive text messages, emails, and the like, notifying them advantageously of the availability of seats that heretofore have never been easily available to the public for sale, thereby allowing the venue to participate in secondary market ticket sales.

In one alternative embodiment of the present invention, the system/process of the present invention provides or operates as a middle person/broker between the ticket holder that is returning tickets to the venue, such as the season ticket holder, and a ticket sales system and/or company, such as tickets.com, by notifying the tickets company of the newly available seats via notification by the ticket holder, such as the season ticket holder of season ticket games not being attended.

In one alternative embodiment of the invention, the system and/or process transmits text messages, emails and the like, to offer tickets and/or seats and/or admittance to subscribers for events and/or games with empty seats even before game. Thus, the present invention allows the venue to participate in the secondary ticket sales market and the upgrade market, thereby increasing revenue and fan loyalty.

Of course, all of the embodiments of the present invention may be used for any reserved seating event, and/or venue that require tickets for entry thereof.

In another alternative embodiment of the present invention, the use of machine readable identifiers provides advantages for, for example, the upgrade program or ticket exchange of the present invention. For example, when the upgrade, reallocation and/or electronic ticket is issued, the machine readable identifier, for example, the bar code, on the original ticket is invalidated, thereby preventing use of the invalidated ticket. Accordingly, when a new ticket holder purchases the ticket form the season ticket holder, the new purchaser will be issued a new machine readable identifier, and optionally a new paper ticket. The present invention advantageously is able to handle the issuance of a new ticket and invalidates the old ticket and optionally the old identifier that has, for example, been returned by the season ticket holder, thereby providing dynamic ticketing capability.

In an alternative embodiment of the present invention, the new patron obtains a new identifier such as a barcode, the old bar code of, for example, the season ticket holder is invalidated. In one embodiment of the invention, season ticket holders are offered to opt in the upgrade process. Various commercial incentives are possible for the season ticket holder to opt in the upgrade process, such as monetary compensation when their ticket is used for an upgrade and/or resold whether they express their intention not to go to the game prior to the game, and the like. Alternatively, season ticket holders may be offered that the cost of their season tickets will, for example, remain the same as the previous year or be reduced if they participate in the program. Therefore, the combination season ticket trade-in and upgrade program in one embodiment of the invention will be beneficial to season ticket holders by allowing them to trade when they already know that they have no intention of attending a game, and allow the season ticket holder to recoup some cost of the season tickets if they do not attend and their ticket is used as an upgrade. In addition, additional patrons of the event and/or sports team are permitted to attend the game in locations/seats that they might never have been able to obtain access to. Further, the venue/stadium/team maximize revenues by being able to place tickets on the secondary market when the ticket holder notifies the venue early enough that they are not attending the event, the venue also obtains additional revenue from upgrades when tickets are upgraded, and the venue obtains additional fan loyalty.

In another embodiment of the present invention, the system provides the ability to advertise via email, text messaging, and the like, for one wireless carrier on the wireless device that is using another wireless carrier. Since the user of the wireless device has requested the service, the user appropriately receives the communication from the ticketing system of the present invention, and therefore, also appropriately received the advertisement from the wireless carrier that is different than the wireless carrier that the user of the wireless may be using at that time.

In another alternative embodiment of the present invention, offers to purchase seats either during the game or even well in advance of the game are "pushed" or transmitted out to registered users that have supplied their wireless and/or Internet addresses. For example, patrons can register in advance for the upgrade and/or regular ticket offers to purchase admittance via various methods including the Internet. When seats band/or admittance becomes available, a broadcast message or other standard messages may be transmitted to the registered patrons to notify them of the seat availability. Thus, seat offers are "pushed" to registered users that have requested this service advantageously to a wireless device and/or other address including standard telephone communication, as well as additional optional advertisements. The system, in one alternative embodiment, provides the user the option when registering to accept certain types of advertisements to be received on their wireless device via email and/or text messaging. In other embodiments, the user does not have the option of which advertisements to receive.

Advantageously, in accordance with one alternative embodiment of the present invention, if a patron decides to attend an event such as a sporting event when the patron does not have time to wait to receive paper tickets (e.g., the patron is visiting in another city/location and does not have time to wait to receive tickets via mail and is on the go), the system of the present invention transmits a ticket to the patron via, for example, a wireless communication system and/or other standard electronic communication system such as the Internet, and the patron can present their ticket, for example, on their wireless device and show up to game.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Patrons then text message and/or email and/or answer questions via voice-to-text messaging their answers. The system can then display the overall number of answers that are correct and incorrect, display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another alternative embodiment of the present invention, the system uses a seat database to determine which of the reserved seats are currently in use. The system may integrate with the seat database system of a venue and/or stadium or optionally be used in parallel with the seat venue/stadium database. For example, prior to the event, the system may utilize the seat database of the venue to determine available seating and patrons that do not show up after a predetermined period of time. Alternatively, the present invention can operate using a separate database from the event/venue by copying or building a separate database used for the ticketing and/or upgrading according to the present invention. In this alternative, as patrons enter the venue, they are checked in directly to this separate database. At the time of the event, the system will be able to check-in patrons using either the identification system, e.g., bar code scanner, of the event or venue, or provide a separate identification system.

In alternative embodiments of the invention, the patron that knows they are attending the game but is going to be late can send in a HOLD message even prior to being provided a warning message that their seats are to be released if the patron does not respond to the message with the HOLD request. That is, in this embodiment, since the patron already knows well in advance that they are attending the game, but perhaps stuck in traffic, the patron can initiate the HOLD message before even being warned in advance of the possibility of their seat being released.

In another alternative embodiment, patrons that have registered with the system and optionally checked into the stadium and/or venue in advance and who also know that they would like an upgrade and/or ticket, may initiate their own upgrade request to the system to notify the system of their willingness to purchase an upgrade and/or new ticket for the event/venue. The system may then place these patrons on a higher priority since they have already expressed and intent and/or willingness to purchase the upgrade or ticket. The patron may notify the event and/or stadium of their willingness optionally well in advance of the game or near/after game time at a time which the patron commits or expresses an additional heightened desire to upgrade and/or purchase a ticket.

In alternative embodiments, the system includes the advantage of allowing patrons to register free for a predetermined period of time, for example, for the first year, without paying a yearly subscriber fee. Alternatively and/or in addition thereto, the system provides the patron with their first upgrade for free or for a reduced rate to further encourage the patron to register with the system and method of the present invention. Alternatively and/or in addition thereto, the system of the present invention offers the patron reduced and/or free concessions when purchasing a membership, ticket and/or upgrade to further encourage the patron to participate in the offers of the present invention.

In alternative embodiments of the present invention, the matching system and/or process, permits participants in the program to initiate a message to the system with the seat location and/or name of the patron that they would like to be matched with for a meeting, networking and/or socializing such as a date. In this embodiment, the system may the push the message to the other subscriber and assign new seats to the individuals that are to be matched. Alternatively, the system Need not require a specific confirmation that the second individual to be notified of the potential match is physically located near the first individual, but can rely on the first individual to provide that information. For example, the first individual may see a potential date in a restaurant, and may then send a message to the system with that person's name or address, that they would like to meet that other individual. In that situation, the second individual will receive a message of the possible match, and can respond and accept or reject the offer to meet. The second individual can then provide a meeting destination or the system can suggest a meeting place based on the first individual advising the system of their location, and the location of the second individual.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Advantageously, the multiple choice questions each have unique selections, such as a1, b1, c1 and d1 for question #1; a2, b2, c2, and d2 for question #2; a3, b3, c3 and d3 for question #3, and the like. In this embodiment, the actual timing of questions is not necessary since each question and answer is unique. Therefore, the speed of responding to the question is immaterial to the winner of the contest and/or correct answer. Also, in the event one patron answers the question late, there will be no confusion which question the patron is submitting an answer for. Patrons text message and/or email and/or answer questions via voice-to-text messaging their answers as indicated above using the unique set of answers, in one embodiment. In alternative embodiments, the first predetermined number of patrons that answer the question correctly are considered the winners.

The system can then display the overall number of answers that are correct and incorrect, e.g., a1 50%, b1 28%, c1 12% and d1 10%, and display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another embodiment of the invention in connection with the seating upgrade and/or assignment system, an identifier and/or machine identifier such as a bar code, RFID, etc. optionally remains static for the user on the user's ticket and/or device that is provided for optional paperless ticketing. For example, the identifier will remain the same associated with the user, but the seat assignment, privileges, user characteristics, user preferences, and the like, may be dynamically changes. The system and method of the present invention will be updated so that the identifier can represent a dynamic seat assignment or other dynamic information, such as general admission to an associated event, or other event and/or venue, including, for example, a restaurant, bar, and the like.

In another embodiment of the present invention, the upgrades process and/or feature may be provided to users/patrons as a complimentary reward for fan loyalty, to reward the user but also market other goods/services and/or other advertising opportunities to be transmitted via the wireless device and/or mobile phone. In one embodiment of the invention, the system and/or method initially queries the user, for example, at the beginning of the trivia contest and/or tournament or at the beginning of the game, whether the user is present in the stadium or not. The system can then perform, for example, the trivia contest, and determine a winner(s) to award for example some form of reward. Furthermore, in another embodiment of the invention, based on the number of people responding that they are present at the game, the present invention advantageously provides a random upgrade to a predetermined number of patrons as an additional fan loyalty program and/or advertising sponsorship to one or more entities that sponsor the free upgrades.

In another embodiment of the invention, a system and/or method is provided that advantageously builds and/or acquires and/or collects mobile contact addresses of users in an efficient manner. For example, in accordance with the present invention, a user advantageously need only provide the communication network and telephone number, and the present invention builds a data address therefrom. This allows the mobile or wireless device user to still register for a service without specifically knowing their data address for, for example, data communication such as SMS messaging, text messaging, email, and the like. In one embodiment, the mobile user is provided a drop down menu where the user selects the communication network and provides their mobile phone number.

The present invention is particularly advantageous currently with the recent enactment by the Federal Communications Commission (FCC) number portability where mobile phone users are able to transfer their existing numbers to other networks. Accordingly, we have determined that a user's number will advantageously provide a mode of contact for the user even when the user decides to change communication networks.

In one embodiment of the invention, the software processes and system determines and builds the actual messaging address (email, text, SMS, and the like) to send messages to the mobile device by the user only selecting and/or providing the communications network and the telephone number. Thus, the present invention advantageously simplifies the process for mobile or wireless device users to register and/or provide contact information, and therefore, beneficially increases the number of individuals that can effectively and easily register for a communication service.

In another embodiment, the present invention facilitates the ability for potential users to signup for the service of receiving, for example, trivia, upgrades and/or text messages via a user sign up device or apparatus. In one embodiment, the user sign up sheet includes numbers and/or circles that can be filled in like a grid, where the user can fill in or cover the numbers that identify their portable number. In addition, the user can check off the specific network carrier from a list of network carriers, or simply enter their specific network carrier. The user sign up sheet may be done electronically via a computer and user interface as described above, or may initially be filled out by a user via, for example, a piece of paper and then later entered into the computer system of the present invention.

In another embodiment of the invention, the system and method of the present invention is capable of re-locating a patron via the mobile address that was previously provided, even if the patron has changed wireless carriers. For example, in one embodiment, with the recent feature of mobile phone portability by the FCC, we have determined that a significant number of mobile phone users are likely never to change their number/address, and therefore, the system and method of the present invention is able to send text messages and/or email to all network addresses using the telephone number of the user if the system suspects that the previously provided network by the user is no longer being used. In this embodiment, the user can optionally respond to the message and/or network broadcast message, confirming that one of the messages has been received.

In another embodiment of the message, whenever a user wants to contact a mobile phone, mobile wireless device or even computer based, via for example, an Internet based account, wants to contact another mobile wireless device user, the present invention provides a transmission device, for example, via the Internet or individual models/mobile phones used for each of the networks to broadcast the message on all networks. Advantageously, in accordance with this embodiment, since the user is likely to maintain the same telephone number, their data or text messaging address will be their telephone number and one of the few network addresses. This type of broadcast message can happen anytime, and even for voice communication when the user of the wireless device needs to receive a data, text and/or voice message.

In another alternative embodiment of the invention, as described previously, the invention may be used by a patron to obtain specific data or information regarding sports or venue related information of interest. For example, patrons may communicate with the system and forward a player jersey number or number of racecar during an event such as a baseball game, football game, racing event such as Nascar, to obtain additional information including current statistics and past statistics. The present invention can then optionally sent statistics throughout the game or event to the patron without the patron requesting, for example, at specific time intervals or after notable achievements during the event, such as a home run, touch down, $7^{th}$ inning stretch, half time, number of laps traveled, and the like.

Thus, the present invention includes many variations in the type of information a user may receive, whether specifically checked into a venue or registered for the service for a particular event. In addition, the present invention includes various processes and systems for ensuring delivery of messages to patrons that have requested the service or merely sending messages that a patron may be interested in receiving.

In another embodiment of the invention, the matching and/or networking system includes the ability to contact and/or notify the users to coordinate the meeting using any one of a plurality of communication methods including text messaging, email and/or instant messaging, with the additional advantage of transmitting pictures, video and/or other data that provides additional information regarding the other person that has been suggested for the match and/or network. In one implementation of this embodiment, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. For example, different message transmit and/or receive formats may be used depending on the system. The present invention beneficially parses the various different formats to obtain the necessary information for the communications described herein. In addition, the present invention formats the messages for the different wireless devices so that the messages may be appropriately received even though different devices and/or communication networks have different messaging formats. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In accordance with another embodiment of the invention, the matching and/or networking system includes the option of permitting a subscriber to notify the system when they are ready for a potential meeting and/or match. Once the matching and/or networking system is notified of the subscriber requesting the match, the system is then capable of either tracking the user though a positioning system such as GPS, permitting the user to register at predetermined locations upon user initiation such as via Bluetooth, RFID, infrared, and the like. In accordance with this embodiment, the subscribers are not being constantly tracked, and therefore, maintain an additional level of privacy. In alternative embodiment, the present invention continuously tracks the subscribers without specifically requesting to be matched. In this alternative embodiment, the subscriber is provided with less privacy because they may be notified of a specific match even though they might not be interested in the match and/or meeting at that time.

In an alternative embodiment, the present invention provides subscribers with the ability to accept/reject the match before each of the subscribers receive personal information of the other and/or before the date/match has been arranged with at minimum a meeting location. In this embodiment, the invention requires that both users accept the match and/or date prior to notifying the subscribers of the contact information for each subscriber. Therefore, subscribers can optionally request additional information from the system of the present invention, even multiple times, to better understand the potential date and/or match before accepting, and importantly, before the other subscriber is provided contact information and/or a meeting location of the subscriber. In the embodiment where the present invention merely provides the meeting location, the present invention advantageously does not provide the subscribers contact information and/or other personal information before the match/date. Advantageously, in accordance with this embodiment of the invention, subscribers never receive personalized or personal contact information unless the subscribers, after meeting in person, agree to exchange such information.

In another embodiment of the invention, the dating and/or networking system provides subscribers the functionality to email, instant message and/or text message at least one additional piece of personal information and/or questions, optionally directly to each other or via the system anonymously, to obtain additional information that may be more relevant than the user profile or information from the user profile that was used to make the initial date/match.

In another embodiment of the dating and/or matching system of the present invention, the system optionally provides automatic and/or user initiated registration in a particular establishment and/or geographic location, which can be used instead of a location determination system such as GPS, or together with such system. This form of registration may be even more precise than GPS because it confirms a subscriber's presence within a specific store, establishment, entertainment establishment, restaurant, and the like. Thus, in these embodiments, the subscriber either initiates the registration as described above, or alternatively, if the subscriber optionally sets the wireless device to automatic registration based on the appearance at a predetermined registration area and/or location, the subscriber will be automatically registered to receive communications regarding a potential match/date.

In an alternative embodiment of the present invention, once the dating and/or matching system determines that a potential match/date has been detected, the system optionally notifies the different subscribers and asks whether they want to continue to participate in the matching/dating program. When both, some and/or all subscribers agree to participate, the present invention can forward to each subscriber automatically the information that each subscriber shares substantially in common and/or the information that was responsible for the match/date between the subscribers. In this embodiment of the invention, the subscribers will know immediately the information that should be most relevant in making the match/date and can determine whether to actually agree to either contact or send the other subscriber additional information and/or arrange to meet the subscriber at a pre-designated location.

In an alternative embodiment of the present invention, the present invention optionally includes the ability to recommend a potential meeting place for the subscribers to meet after determining that the subscribers have agreed to participate in the date/meeting. In this embodiment, the present invention advantageously determines the location based on, for example, subscriber preferences, geographic location that is preferential for at least one of the subscribers and/or both subscribers, predetermined location where, for example, a sponsor will receive patronage and/or provide a discount for the subscribers and/or actual pay the organizer of the dating/matching system an advertising fee to promote their sponsorship. Accordingly, the present invention advantageously determines not only a potential match/date, but advantageously suggests, recommends and/or determines a specific location and/or geographic location and/or restaurant, clothing store, zoo, museum, and/or other suitable location for the subscribers to meet and optionally based on geographic distance and/or location.

Additional dating and/or matching features and/or differentiators of the networking and/or dating system of the present invention include one or more fo the following:

Wireless messaging platform supports interactive messaging

Wireless messaging platform provides simultaneous parallel applications to run without collision Multiple wireless initiatives or topics run without conflict Different initiatives or topics may be user specific or selectable While each initiative runs independently, there can be overlap in terms of customer base Platform is flexible to add/remove initiatives quickly and efficiently One wireless carrier/network can be a dating/matching sponsor and advertise on the wireless device and/or network of another wireless carrier/network Contact members to notify of the match/date to allow members to either directly contact each other or send additional information via, for example, text messaging, email, instant messaging, such as pictures, video, and the like Contact members or wait for request from members to participate in match/date initiative; can then automatically track member via GPS instead of constantly tracking member all the time, thereby increasing privacy of member Contact each subscriber that is being offered the date/match and obtain approval for the match prior to actually notifying potential members that match has been made Contact users after initial match has been conditionally approved, and provides users the capability to request additional information, such as personal information from the other member or other members which the requestor still wants to know before finally accepting the date/match Members can register or "check-in" at predetermined locations and/or establishments which is one additional level of specificity, for example, with regard to the location where a member is that may be interested in matching; For example, two or more members may actually be in the same restaurant where they can be informed of one or more other subscribers being present; members can register via sending a message to the system via text message, email, RFID, Bluetooth, and the like, either by initiating a registration or automatically Contact members after initial match has been conditionally approved and exchange, optionally automatically, profile information that was significant in making the match/date and/or other important information regarding a match/date that a member may want to know before finally accepting the match/date and/or information the members may want to know that is geared particularly for a first date, e.g., likes/dislikes, common interests, favorite foods, wines, alcoholic beverages, and the like Contact members to suggest and/or recommend and/or arrange meeting place based on, for example, geographic location, common interests/sports, common food tastes, common beverage tastes, common entertainment preferences and/or sponsors willing to, or interested in, being utilized for the match/date for the suggestion and/or recommendation, and optionally providing the members a discount and/or compensating by the sponsor to the networking and/or dating system proprietor for the advertising and/or recommendation to visit that sponsor Wireless messaging platform includes a protocol conversion server functioning to interface with a variety of wireless networks having different messaging characteristics for both transmitting and receiving messages, and parsing the different message formats for the content from a received message, and transmitting a message to a plurality of different networks and/or devices having different messaging and/or interface capabilities and/or functionality Contact members with a wireless consent form indicating that the matching/dating system and/or the members participating in the match/date have generally consented to potential cohabitation optionally without any recourse to the other party. Alternatively, the members may be contacted with other types of informed consent forms with limited recourse for acts and/or aggressive acts that are clearly assaults, but not sexual related misconduct or sexual related crimes that are felonious in nature carrying a high penalty/sentence. Alternatively, members may be presented with consent forms that eliminate any criminal penalty, but do not foreclose the possibility of civil lawsuits for damages relating to torts, and the like As another alternative and/or in addition thereto, members may be presented with consent forms that eliminate any civil penalty, but do not foreclose the possibility of criminal lawsuits for criminal type activities, perhaps with the exception of the most severe sexual crimes such as rape and/or sexual assault that carry significant prison time.

For example, athletes, celebrities, high worth individuals, or even average individuals, male or female, may be interested in the wireless consent initiative because that allows them more flexibility to meet a variety of individuals without the worry of later being sued. In additional alternative embodiments, broadcast messages may be transmitted to numerous individual that may be interested in meeting and/or dating a celebrity or predetermined individual or individuals. In this embodiment, the optimum matching individual or individuals may be selected to meet with the celebrity, celebrities, and the like, while utilizing the informed consent feature of the present invention. In another alternative embodiment, an individual or individuals may be randomly selected as part of a match or date, based on a lottery or other competition to meet or date a specific individual or individuals.

Additional optional hardware and software requirements are as follows for one or more embodiments of the present invention:

System Capabilities

Platform supports interactive messaging

Platform provides simultaneous parallel applications to run without collision

Multiple wireless initiatives or topics run without conflict

Different initiatives or topics may be user specific or selectable

While each initiative runs independently, there can be overlap in terms of customer base Platform is flexible to add/remove initiatives quickly and efficiently Wireless Initiatives Interactive trivia with fans inside and outside of the stadium Targeted messaging, e.g., targeted advertising Broadcast messaging, e.g., general advertising Interactive messaging, e.g., with concessions Profiling for each initiative or topic, e.g., based on network operator Urgent and emergency messaging Specific initiative: discounts for concessions and/or memorabilia Specific initiative: invite patrons to different activities before, during or after game, e.g., player loyalty, family activities, etc.

Specific initiative: seating upgrade program

Specific initiative: messaging patrons in one section and separate messaging to patrons in another section Specific initiative: messaging parent of a missing child Special initiative: dating where patrons can keep their seats to return to them, or their seats are re-allocated. In alternative embodiments, the patrons switch seats instead of moving to empty seats, either for the entire game or only a portion thereof with other patrons for match making possibilities.

Functional Specifications

Front end for user signup and profiling-secure site—for example, modeled after www.mlb.com, include one or more of:

type of seats does the customer want for upgrade (decks and range of sections)

information for dating concession profile capability for additional profile information validate user by sending message to device upon sign up auto append of network information to phone number during signup login and password protected site frames on website or interface that can be easily configured to have look and feel, for example, of particular baseball team capability for space on screen for advertising opportunity that can easily be modified and relatively dynamic capability to handle lost passwords web page or interface where customers with season tickets can mark a calendar with the seats they want to keep and the ones they are interested in freeing up for early sale or upgrade.

The optional Front End of the present invention used for administration and setting up parameter for each application, optionally includes a secure site, with one or more of the following:

application email address and password minutes for all the configuration parameters and/or functionality number of threads for each application for upgrades, at least one of releasing customers old seat immediately, or it until the customer approves of the release, or holding the customer's seat for a predetermined portion or all of the game, for example, in the dating functionality)

set schedule for games section rating setup, and seat upgrade pricing revenue allocation model provide a number of retries if message send failure Concessions The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

Concession Wireless Initiative

Purchased via cell phone

Web registration for preferences

Targeted concession offers

Confirmation that purchase is ready

Delivered to seat or ready for expedited pickup

Customer convenience: system identifies closest concessions to customer

Customer convenience: system determines concessions with short wait

Each concession labeled with a number for customer identification and fulfillment Customers can request menu, or register for each game to receive menu around game time via mobile device GPS can be used effectively to inform customer of closest concession stand to pickup order, and/or customer can provide section number and/or seat location for system to identify most convenient concession stand Most convenient concession stand can be determined based on one or more, or combination of, predetermined criteria, such as, closest concession location, shortest wait in line, specific item being ordered, and the like.

Interactive messaging, e.g., with concessions

Specific initiative: discounts for concessions and/or memorabilia

The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

In one alternative embodiment, the following message exchanges may be used:

First Message

"In Game" Concessions

Menu will be sent soon!

Reply with #, item short form and seating section

Ex: BE=beer

Reply 3BE for 3 beers

408SEC for section 408

Powered by NEXTEL

Second Message (paper menu?)

Menu

BE=Beer; CO=Coke; DCO=Diet Coke

HD=Hot Dog; BUR=Burger

TA=Taco/Salsa; PO=Popcorn

FF=French Fries; CH=Chips

PZ=Pretzel; PT=Peanut

LEM=Lemon Ice

Third Message

Order received!

Summary:

3 HD @ $3=$9

2 CO @ $3=$6

2 LEM @ $3.50=$7

Total=$22

Reply Y to ACCEPT

Credit Card charged

N to CANCEL

Fourth Message

Thank you for ordering!

Your order has been confirmed!

Confirm # REIF1001

Powered by: THE SPORTS AUTHORITY!

Fifth Message

ORDER READY

Bring Confirm # REIF1001 to Concession #33 by sect # 212

$2 off NIKE baseball gloves

Bring #NIKE305 and game ticket to

Any SPORTS AUTHORITY!

In another embodiment of the invention used in concessions initiative, the concession attendant receives the confirmation number or other identifying information from the customer when picking up the concessions. The concessions attendant enters the confirmation number or other identifying information when ready or optionally clicks on the order on the computer screen via a concessions interface associated therewith. From there, the order is then cleared from the system with respect to orders that require fulfillment, advantageously allowing the workers to streamline their work activities in the concessions. In an alternative embodiment, the concessions are actually delivered to the customer using the sutomer provided seating information, either provided by the customer through, for example, the wireless device or other registration and/or notification process, or even via a telephone call or automated attendant to associate with the order.

In another embodiment of the invention, the concessions menu is advantageously only delivered to customers that have entered the stadium via a location determination system, and/or checked into the stadium via a ticket reader/scanner. In alternative embodiments, all customers that have registered for the concessions service will receive an introductory message. Thus, customers that are not attending the game need only reply with a request to terminate the concessions service for that event and/or game.

In an alternative embodiment, the customer is advantageously directed to closest concessions via, for example, GPS chip in phone or by knowing where the customer sits at check in, or by having the customer input their seat location or location where they would like to pickup the concessions.

In another embodiment of the invention, we have determined that some mobile phones will utilize different transmit and receive addresses, and therefore, a user may not know how to appropriately register to be a subscriber for one or more wireless initiatives. For example, we have determined that some mobile phone networks utilize slightly different or different electronic addresses for the transmitting and receiving of electronic messages. For example, for the Research In Motion (RIM) Blackberry communication service, the mobile device is assigned a desktop email address. In one configuration of Blackberry, the mobile device only has one address. However, in the non-integrated configuration, the mobile device actually has a separate address when transmitting from the receive address.

In accordance with this embodiment of the invention, the user registers by providing their mobile phone number and optionally a network carrier for same. In this embodiment, the mobile phone user registers with their phone number and optionally wireless network provider. The registration system of the present invention then sends a message to the mobile device, requesting that the mobile device respond, optionally with a predetermined code and/or predetermined message. The mobile device then responds to the registration system, and the registration system corresponds the mobile device response with the original registered mobile address, thereby completing the registration process by ensuring that responses received from the mobile device can be mapped appropriately to the mobile subscriber. In the embodiment where the mobile user is requested to provide a predetermined code and/or message, the registration system uses the predetermined code to map the mobile phone response potentially having a different address with the transmit address provided by the user.

Dating, Matchmaking and/or Networking

In another embodiment of the invention, patrons are provided the opportunity to meet others in the venue or at a predesignated location near or away from the venue using standard matching rules. In one embodiment, the presence of the user is detected when entering the stadium, for example, via the ticket entrance systems. In another embodiment, the presence of the patron is detected or determined based on a message that is send to the user, for example, either right before, during or after the game. In this embodiment, the user can be prompted with a request whether they would like to participate in the matchmaking, dating and/or networking program.

For example, potential business or social partners may be selected or prompted for networking or dating. When the user responds yes, in this embodiment, their current seat is irrelevant if that seat is not to be released for another patron. Therefore, the system need only select a new set of seats for the networking and/or dating for the patrons, transmit the patrons the additional new seats via, for example, a wireless ticket, update the venue seating database for subsequent verification by the ushers when seating the patrons. The patrons may then proceed to the new location and have a meeting or date, and then return to their original seats if desired.

In another embodiment, a "burnt bridge" approach or feature is provided where the original seats for the patrons that are meeting are then released for other upgrade and/or networking programs. In this embodiment, the original seat of the patron must be known for example, via check-in procedure, registration for the program in advance for example over the web registration process or other registration process, or via the patron responding to the system with their wireless device of their current seat location. Alternate combinations or modifications of the above embodiments is also used.

Trivia

In the alternative embodiment of providing the user trivia information, based on registration and/or location, for example, while attending the game, watching the game at home, or any time prior to or after the game, the user may be provided with questions, as described above, to answer as part of a tournament and/or to be eligible for prizes, awards, and the like. In one embodiment, a section or portion of the users are targeted for the questions together, while other sections and/or portions of the users are targeted at a time period thereafter, for example, 1 minute later, to stagger the communication and transmission of data, thereby reducing congestion and/or unnecessary hardware to accomplish the transmission and acceptance of information to/from the patron.

In one embodiment, while all the questions are staggered over a predetermined period of time to the patrons, whether limited to patrons in the stadium, out of the stadium and/or both, the patrons are not notified whether their answer is correct until after all questions have been transmitted, and all patrons are provided the opportunity and/or sufficient time to respond. Once that predetermined time period has elapsed, the patrons will be notified whether their answer was correct, and whether they are still in the tournament. In optional embodiments, a predetermined time period will again elapse until new questions are sent and the tournament continues.

Optional Oracle or My SQL Database

In one embodiment of the invention, an Oracle or My SQL Database is used in connection with the present invention. In one embodiment, the result set is set to be proportionally with respect to the number of users and/or data that will be stored in the system. In another embodiment, the database is optionally partitioned for specific games and/or initiatives or groups of games and/or initiatives. The system is preferably thread safe when running the games and/or initiatives. The system is optionally integrated with Credit Card for payment, and/or integrated with the venue ticket system and/or point of sale system to optionally determine who came in and when into the venue. In another embodiment, the present invention maintains and updates financial balances for users, such as patrons and stadiums. In alternative embodiments, secure interaction with ushers and an interactive kiosk is provided.

The present invention optionally provides any standard algorithm for partitioning of group of seats and users, for example, for system resource allocation, load balancing and/or division of system functionality. In alternative embodiments, a local kiosk for the stadium and/or venue is provided where the user can enter information, such as register for one or more initiatives and/or programs. In alternative embodiments, the system of the present invention includes the capability of offering for sale seats which are not currently sold via messaging to wireless devices, such as text messaging to mobile phones, or other messaging and/or wireless communication to wireless devices, and consideration. In alternative embodiments of the invention, standard algorithms such as used in the airline industry may be used to overbook seats for the venue, and consideration.

In alternative embodiment of the invention, instant messaging or any type of communication method can be used in the present invention, include local and/or global networks, such as the Internet, LANs, WANs, WAP, 811.02a, 802.11b, 802.11g networks, and the like.

Messaging Software Requirements

Trivia and/or other messaging products/initiatives are Java applications that run in a J2EE application server and utilize a JDBC 2.0 compliant relational database. There are typically open source options available for system support. Currently for development and test environments we utilize are desktop environments running Windows 2000 with the open source options below. The draw back is that open source options typically don't provide formal system support approaches, although we have found the software to be very reliable and would recommend this approach for early stage pilots. Should the customer prefer purchase software options for these components are provided as well.

I. Server Software Specifications

Alternative A—Open Source Approach (1) Web/Application Server—Tomcat 4.1.18

(2) Database—MySQL 4.0

(3) Windows 2000 Server for each server

Alternative B—Purchased Product Approach (1) Application Server—Websphere Application Server 5.0

(2) Database—Oracle 9i DBMS (3) Windows 2000 Server for each server

II. Server Hardware Specifications (4) Each of the HW Servers specification:
- (i) 2xCPU—P4 2.4 GHz Xeon
- (ii) 2 GB RAM
- (iii) Monitor
- (iv) CD ROM
- (v) Floppy Drive
- (vi) Hard Drive depending on volume (see below)

III. Communication Specifications (5) POP3 Account and SMTP server accounts that can support number of active subscribers (6) Dedicated T1 access to POP3 and SMTP provider IV. Hardware and Software Sizing Configurations Phase 1:

1K-10K subscribers and players during the game

Two Servers

Server 1—runs Web/Application Server for the website and the Trivia Application

Server 2—runs the Database server (20 Gig)

Phase 2:

10K-25K subscribers and players during the game
- Server 1—runs Application Server for the Website front end
- Servers 2 and 3 (2 Servers)—run the Application Server for Trivia Application (two servers are used handle load balancing)
- Server 4—runs the Database server (50 gig) (Level 1 RAID 2×50G Array)

(Server 5—used as a backup to server 4—depending upon Reliability requirements)

Phase 3:

25K-50K subscribers and players during the game Server 1—runs Application Server to run the Website front end Servers 2, 3, 4 and 5—run the Application Server for Trivia Application (four servers are used to handle load balancing with hardware and software clustering)

Server 6—Database Server—150 gig (Level 0+1 RAID 6*50G Array)

(Server 7—used as a backup to server 6—depending upon reliability requirements).

In one alternative embodiment, as part of the sign up for trivia the system optionally asks the general admission or season ticket holders to input their seats to simplify how the system obtains information where the patron is being seated when they come to the game. In an alternative embodiment, the system obtains this information from the stadium database system, kiosk where the patron can enter the information at the stadium and/or via the point of sales system by the service personnel or attendant that is selling the tickets. Using any of the above methods, once the system knows where the patron is/are seating when present at the game, the system can then target sections of the stadium for, for example, the trivia quiz or other service/offering to the patrons.

Examples of different sections that can be separately targeted include for baseball, behind first base line first, behind home plate second, first base line third—all lower deck; same sections for upper deck and bleachers. Other sports may include football, hockey, soccer, basketball, and the like. In accordance with this embodiment, targeting different sections over different periods of time, thereby preventing a long delay to receive answers once the question is transmitted, may minimize collusion among patrons.

Thus, by segmenting the stadium over a few minutes in accordance with one embodiment of the invention, the present invention may increase the window of transmission to, for example, 2 minutes or more for the first round. As the rounds get successively smaller, the present invention will transmit messages faster. The present invention also provides optional winners for different sections of the field. In addition, the section winners can further optionally compete against each other, for example, the first class seating winner can further compete against the bleachers winner, and the like.

As discussed above, one or more of the above alternative embodiments may be incorporated into the embodiments described above, and/or any of the embodiments discussed below. Furthermore, any of the embodiments of the present invention may be used for any reserved seating event.

Figure 29:
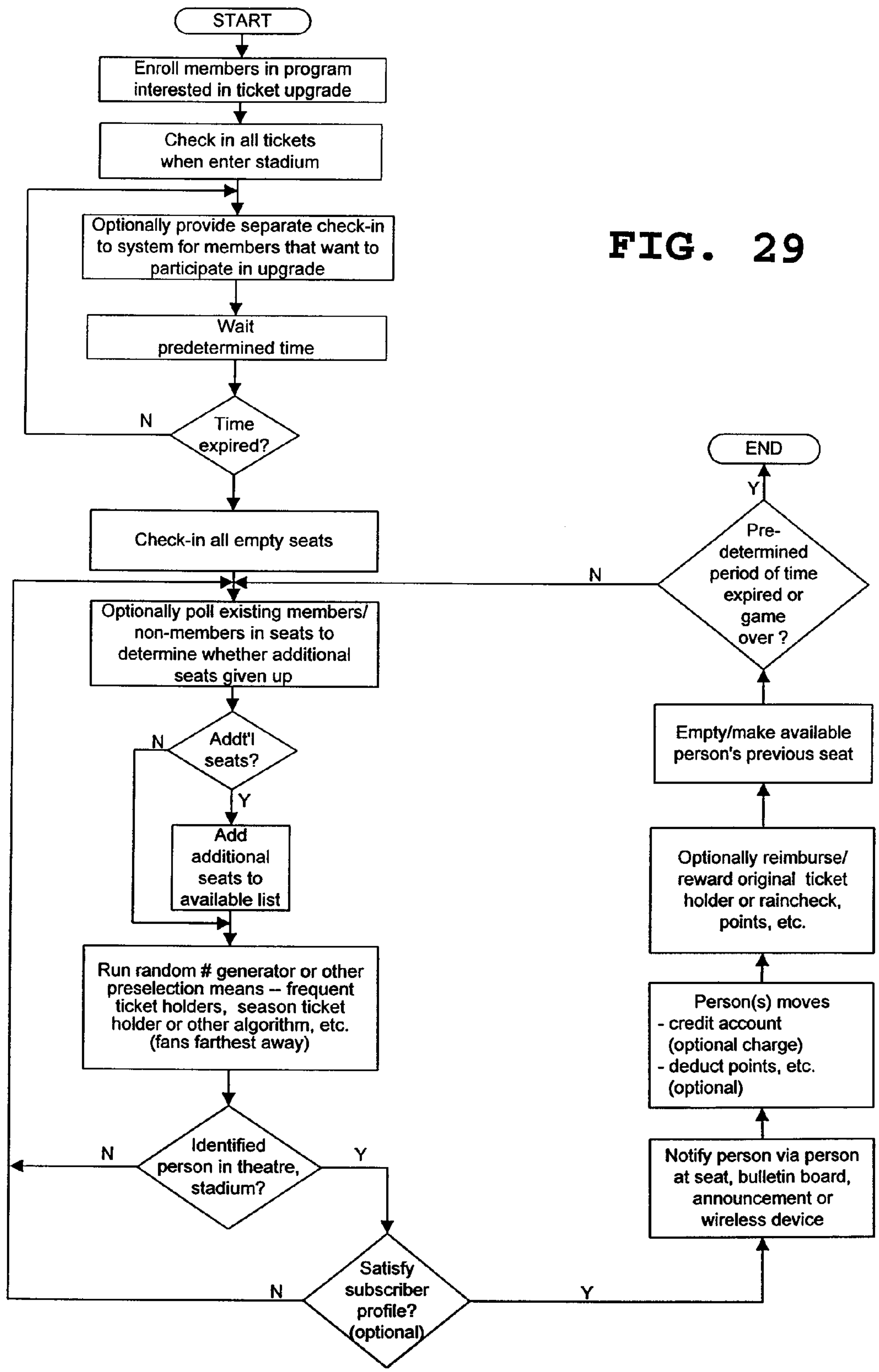

FIG. 29 is a flowchart of a seventh embodiment of the invention. In FIG. 29, the process begins by enrolling members in the program that are interested in the ticket upgrade. Tickets are checked in, for example, as the patrons enter the reserved seating area, such as a stadium or theater, through, for example, bar code readers, scanners, infrared readers, and/or manually or other method where the patron is checked in, either at the gate, seat or other location. An optional separate check in area is provided for patrons that want to participate in the upgrade program. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seats for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, a standard bidding process, or other predetermined process.

An optional polling process to poll existing members and non-members in seats to whether additional seats are available. That is, in another optional embodiment of the present invention, non-members may also make their seats available for re-allocation/re-sale at any point in the process. In this additional polling process, the next step is to determine whether additional seats have been made available. If additional seats have been made available, then these additional seats are added to the list of available seats.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or more means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

If the patron accepts, payment of money or other means may be effectuated on the spot via the wireless device, credit card, debit card, points, and the like, and the patron may now move to the other seat. In addition, the original ticket holder is optionally reimbursed with award points, a percentage of the revenue, a flat fee, an additional event ticket that might also be upgradable, and/or any other means for rewarding the original ticket holder. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

In accordance with the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that may be in the vicinity of the stadium but were unable to get seats. Since the present invention re-allocates and/or sells tickets very near to game time in accordance with one embodiment, the patron must be in the general vicinity of the stadium to take advantage of this embodiment of the invention.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron to help the patron decide the quality of the upgrade and whether to accept.

In one alternative embodiment, if the patron that has their ticket re-allocated in error, e.g., because the patron did not show up to the event based on the predetermined criteria but the patron was still planning on attending because they forgot about their seat being re-allocated, the system can re-allocate seats immediately upon the checking in of the patron and notify them that their seats have changed because they are late. In this situation, the stadium/venue might decide to further upgrade the patrons because of the mistake.

In accordance with one embodiment of the present invention, the process of the present invention specifically reserves seats of the highest or very high rating that are considered preferred, in the event a patron's seat is re-allocated prematurely or erroneously. In this situation, the patron who has had their seat re-allocated because they will likely receive an even better seat as a result of the mistaken (stadium or patron) or premature seat re-allocation.

In another embodiment of the present invention, as patrons are entering the venue or stadium, they are provided advantageously with a map of the stadium so patrons can analyze the potential upgrade to make a decision whether the upgraded seats are sufficiently good or of value to warrant the patron moving and/or paying for the additional upgrade. By handing the patron the map of the stadium, the process of the present invention is not required to transmit a detailed schematic to the patron's wireless device which would not normally be able to effectively permit the patron to evaluate the proposed upgrade seats. The map that is handed out may optionally include information for patrons on where to register for the upgrade and/or additional advertisement opportunities.

In one alternative embodiment, the patron that has purchased the ticket, for example, a season ticket holder, may advise the stadium that for a particular game, set of games or all games, they do not want their seats to be re-allocated, and perhaps, an additional fee is assessed for this type of patron. If the stadium provides the ability for the patron to selectively opt out of the seat re-allocation, the patron can, for example, connect to the system via the Internet, public switched telephone network, cellular network, and the like, and notify the system that they do not want their ticket re-allocated, for example, because they are coming late to the event. Other means of notifying the system and/or other reasons may be utilized in connection with the present invention.

In another alternative embodiment, the system provides patrons the ability to individually select when their tickets may be re-allocated. For example, one patron may prefer to only give up their ticket if they are late to the game by 15 minutes, while another patron may be willing to give up their ticket if they have not arrived 15 minutes before the game. In alternative embodiments, the stadium may provide incentives for the patron to have their ticket re-allocated prior to the game because it increases the stadiums chances of re-allocating/re-selling the ticket.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provide additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In an alternative embodiment, the system determines priority of re-allocation of seats based first upon patrons that have seats that may also be re-allocated. That is, the systems attempts to maximize the number of re-allocations by prioritizing the re-allocation based upon seats that may be re-allocated after already being re-allocated. For example, if front row seats in a stadium are available to be re-allocated, in this alternative embodiment, patrons that are in the next closest section for example on the field level would be upgraded first to those seats. Then, patrons with less preferred seats, for example, in the upper deck would be re-allocated to the seats that have now become available from the patrons that have been upgraded to the front row. Thus, using this alternative priority scheme, the present invention maximizes the re-allocation numbers. Of course, this priority algorithm may be combined with additional factors, for example, relating to subscriber/patron value. As described above, additional factors may be utilized in the algorithm to determine the subscriber or set of subscribers to offer the upgrade.

In alternative embodiments, patrons in the vicinity of the upgraded and re-allocated patrons may optionally rate the upgraded patron, for example, for appropriate behavior, wearing of excessively large hats, drunkenness behavior, and the like. These ratings may then be taken into account in the re-allocation algorithm for future upgrades to the patron.

In alternative embodiments, the patrons eligible for the upgrade may be notified using standard email communications over a wireless device, mobile telephone, and/or other standard communication means. For example, standard text-to-voice and/or voice-to-text communications may be used to contact the patron to evaluate whether an upgrade will be accepted and to actually accept the upgrade.

In another embodiment of the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that have already purchased tickets in the vicinity of the stadium but were unable to get seats and/or may be in the vicinity of the stadium but were unable to get seats. Since the present invention re-allocates and/or sells tickets at any time prior to and/or after beginning of game time in accordance with one embodiment, the patron may be in the general vicinity of the stadium to take advantage of this embodiment of the invention or even at any location when being offered upgrades and/or seats well in advance of the game. For example, the present invention can upgrade or sell tickets to patrons well in advance of the game since it advantageously is permitted or has the authority to resell tickets either via ticket holders that do not show up during the game and/or, for example, season ticket holders that have authorized the stadium in advance to resell their tickets based on predetermined criteria, for example, when the season ticket holder notifies the stadium that they will not be present at next weeks game.

In one optional embodiment of the invention, the patron presents the usher with the confirmation number which the usher can enter into a wireless device using a local or private wireless network, or can simply use a walkie talkie or telephone to call the dispatcher to confirm the upgrade and/or new seats using the customer provided confirmation number. The dispatcher will have access to the system to enter the confirmation number to confirm the validity of the upgrade. Alternatively, a patron will retain their old ticket. The patron will give in the old ticket to the usher which is scanned or barcoded by the usher for immediate identification of new seats and used in place of, or in addition to, confirmation number.

Of course, the confirmation may optionally be made via customer name with an appropriate identification card or other information. Further, alternative methods may be used to verify that the confirmation number and/or ticket being used by the patron is valid. For example, the patron may be equipped with a printing device associated with the wireless device or download an actual ticket on line from home prior to the game for the new ticket or upgrade. Alternatively, the patron may be equipped with an identifier card, optionally including a bar code with a unique identifier relating to the patron's account information and profile that can be scanned for additional convenience. Alternatively, a wireless device may be used to securely store this type of identification and/or account information.

In at least one alternative embodiment of the invention, the patron may comprise optionally a corporate account that has a number of tickets, for example, season tickets. In this embodiment, the corporate account may have associated therewith a plurality of email addresses or other communication addresses to transmit the seat or upgrade offer to a number of potential patrons that may rotate their attendance at the games. In accordance with this optional embodiment, multiple emails can be stored for a single user/corporate account, and the system may transmit individual messages to all email addresses, or may only transmit messages to individual patrons for corporate account that individually advise the system that they are associated with a particular ticket/bar code for a particular game and will be/are present at a particular game.

In an alternative embodiment, patrons may enter the stadium and subsequently inform the system that they are present and interested in an upgrade via a kiosk where the patron can scan a bar code and enter their customer number to be eligible for upgrades during the game. The system is then able to transmit a message to the customer, assuming that the customer has pre-registered with the system with the appropriate contact information. Alternatively, or in addition to individual use of a kiosk(s), the customer sales office may have a kiosk or additional functionality to enter the customer name and/or customer account and scan in the bar coded ticket on the spot to register each patron as they enter the stadium or venue.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron upon entry in the stadium to help the patron decide the quality of the upgrade and whether to accept when an offer is received by the patron at a predetermined time. The graphical map may comprise a small booklet with a map of the stadium showing seat locations, and optionally a game schedule.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provides additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In alternative embodiments, patrons in the vicinity of the upgraded and re-allocated patrons may optionally be eligible for a dating or matching service where patrons register and provide profile information to the system and/or through a third service provider dating service. Once the system knows that the patrons will be coming to the game and/or have actually checked in to the stadium, the system can then arrange for the two, four, etc. patrons to meet each other by allocating and/or re-allocating seats to the patrons together. Thus, based on profile information, customer request and availability, the system is able to upgrade or sell tickets to patrons to maximize their chances of meeting someone at the game. This optional feature provides significant potential enjoyment for the patrons participating in this dating or connection program. In accordance with this embodiment, one possible sequence of acceptance steps involves profile matching the two patrons (or groups of patrons) based on predetermined profile information; transmitting a first message to the first patron regarding availability of the second patron and requesting a conditional acceptance form the first patron; transmitting a second message to the second patron indicating that the first patron has conditionally accepted and request the second patron to accept; and when the second patron accepts before the first patron has rescinded the conditional acceptance, finalizing the upgrade and/or seat allocation for the first and second patrons. This embodiment of the invention is a complete reverse from typical dating and/or matchmaking services which attempt to develop detailed algorithms for the matching process because of the significant decision that exists in determining who to spend valuable time with. In accordance with the invention, patrons are already present at the game, and therefore, half or more than half the effort is already done. The remainder is to actually meet the other person which can be accomplished with profile criteria, whether or not the algorithms are very sophisticated.

In one embodiment, the patrons that are being matched have their original seats maintained and not made available for other upgrades in the event the matching does not work out early on. In this embodiment, one or both the patrons can return to their original seat. Hopefully, there will not be a significant argument of who would need to return to their original seat if an upgrade is actually performed. In addition, in accordance with this embodiment, the seats that are selected do not necessarily have to be better seats in the classical sense. That is, seats further away from other ticket holders might be considered preferred when matching two individuals for the first time. Alternatively, couple that would prefer a little more privacy or quieter game might request to be moved to a more isolated area. Alternatively, families with small children might prefer to be moved to a less busy area as well during the game where the children might be able to freely move around. All these scenarios and/or alternatives are possible in view of the present invention. The advantage of performing a match in a public setting is that the patrons do not have to worry about leaving or ending the date, and also do not have to worry that the other person will have their home address.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like.

In addition, this feature also optionally permits the patrons that have participated in the program to rate one another for future dates. For example, one patron can rate the conversational benefits of the second patron, the appearance of the second patron, the overall short term versus long terms relationship goals of the patron, and the like. These ratings may then be taken into account in the algorithm for future seat assignments, re-allocations and/or upgrades in the future for the first and second patrons, and all other patrons will now benefit with the additional profile information of the first and second patrons. The matching service may be for amusement or work related networking purposes, for example, to meet an executive that the patron currently works with or wishes to work with/sell in the future.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like. In addition, the system advantageously and optionally provides the feature of allowing patrons to text message one another directly, and/or exchange pictures via wireless email, text messaging, and other wireless devices that provide the standard capability of exchanging pictures, such a T Mobile and/or Sprint.

In alternative embodiments, the ticket holder can call in via a voice to text message, text message and/or email and let the stadium know early that they are not coming. In this manner the ticket holder obtains the convenience of the stadium or venue reselling their tickets in advance, thereby providing the venue with additional time to maximize the resale of the ticket.

In alternative embodiments, when the patron enters the stadium, they have their ticket barcoded or other device that detects their presence can be used such as infrared, Bluetooth, etc., and then they can become eligible for an upgrade. The patron can register in advance that they want to receive upgrades by providing their name, message address, e.g., email, telephone text message address, etc., and optionally their credit card or other payment mechanism for upgrades that actually cost money as opposed to free upgrades. In alternative embodiments, the patron can register at the ticket booth when purchasing their original ticket. In this scenario, the stadium representative can enter this information on behalf of, and with the permission of, the patron since the patron may already be providing their credit card, debit card, etc. to purchase the original tickets. Alternatively or in addition, a kiosk may be provided where the patron can enter their original ticket, e.g., scan in their original ticket and provide their name and text message information in the stadium to register for a one time upgrade for the game after purchasing, for example, a regular admission ticket.

In alternative embodiments, an usher can verify that the patron should be upgraded by the patron providing the confirmation number that may be transmitted in real-time by the system, and/or by the patron using their original confirmation number or original ticket with barcode or other identification means, such as a smart card, infrared reader, etc. that represents original ticket and presenting same to the user. The usher then needs only to scan in the original ticket and the system will verify whether the patron associated with the original ticket is valid and whether the upgrade is valid.

In alternative embodiments, a warning message may be sent to the ticket holder that has not shown up to game warning them that if they do not respond within a certain time period that their seat will be re-allocated or re-assigned to another patron. Similarly, a release message may be sent to the ticket holder after their seat has actually been released and/or re-allocated, thereby notifying the patron that if they change their mind in attending the game, they will have to obtain an additional ticket. In alternative embodiments, the ticket holder that has their seat released and re-allocated can be themselves re-allocated a similar, worse or better seat, depending on, for example, their subscriber value and/or other criteria. For example, if the patron is provided a better seat, this will encourage them to more readily give up their seats in the future even if they are attending the game. On the other hand, if the patron is provided a worse seat, then this encourages them not to artificially give up or have their seat released when attending the game. Accordingly, the present invention is designed to deal with various behavioral patterns of specific ticket holders, and may optionally and advantageously be a ticket holder specific with respect to various criteria for re-assigning, releasing, selling and/or re-allocating tickets.

In alternative embodiments, the system transmits to the ticket holder a welcome message after being upgraded and after having being moved to a new upgraded seat location. In one embodiment, the system identifies that the patron has been successfully upgraded after the patron provides the usher with a confirmation number or original ticket, which is then verified by the usher and system.

In alternative embodiments, the system, after having identified which patrons have checked into the stadium and/or have been upgraded, transmits a trivia question and/or additional advertisements to all patrons attending the game. In alternative embodiments, the information is transmitted to both patrons that are attending the game and additional patrons that have registered in the past to receive information but that are not attending the game. The participants can, for example, answer trivia questions and respond with their wireless device. Depending on whether the patron is attending the game or not, the system may determine to offer or deal with each of the patrons differently. For example, for patrons at the game, winners may be successively determined and narrowed, as patrons successfully and unsuccessfully answer questions, round after round of questions in a "spelling bee" format. For patrons that are not attending the game, winners may be declared, or statistics provided to the broadcast station that can be aired on television. In yet additional alternative embodiments, instead of transmitting information/questions to the patrons via the wireless device, the information/questions are displayed on the stadium billboard for patrons at the game and/or on television for patrons that are watching the game on television. The patron can then merely respond via the device, e.g., the telephone accordingly via a voice-to-text system or via other mobile devices via text messaging.

In alternative embodiments, the present invention provides the advantage of additional advertising sponsorship to the venue. For example, in one embodiment, the venue is partitioned into different locations that may be assigned to different sponsors. In one embodiment, the sponsor that provides the most value may be assigned a certain number of premium seats that are not available to other sponsors.

For example, the sponsor may offer a discount on the upgrade if you are a Verizon or Verizon Wireless customer or they credit your cell account for each seat upgrade or you get say 30 free minutes, etc. In alternative embodiments, the present invention provides the advantage of one wireless provider to advertise on another wireless providers mobile phone or wireless device. For example, if Verizon Wireless is a sponsor of the upgrade system for a particular stadium, the present invention will still work with, for example, AT&T, SPRINT, and CINGULAR customers. An advertisement message sent with the upgrade offer may read on the AT&T phone, "brought to you by Verizon Wireless." In an alternative embodiment of the present invention, text messaging is optionally used for mobile phones to perform the message communication of the present invention. The user is only required, in one embodiment, to reply or respond with a "Yes" to accept the upgrade offer since the user has advantageously pre-registered with the system, thereby minimizing the required communication/input by the user. In an alternative embodiment, the user, instead of pre-registering with the system, is charged on their wireless or even regular telephone number bill when they accept the upgrade offer. Thus, the wireless system that either administers the user's regular or wireless account or the upgrade sponsor may be responsible for actually billing the customer in this alternative embodiment.

In the alternative embodiment when text messaging is optionally used alone or in combination with other communication methods, the system provides the additional advantage of maximizing bandwidth usage by not requiring use of bandwidth on the wireless voice system, thereby maximizing system resources.

In another alternative embodiment, the present invention optionally and advantageously provides a security and/or safety feature in the event of, for example, a minor event where a parent gets separated from a child, a disaster or other event that might require evacuation of the stadium. In one embodiment, the person needing help provides their name to an attendant that can search the system for the contact information of their companion/parent. The system can thereafter send an email and/or text message to the companion/parent regarding the status of that person and provide instructions for meeting that person or arranging help, authorizing medical procedures, and the like. In another embodiment, the person requiring help, e.g., a child provides the attendant or kiosk with their ticket which can, e.g., scan the bar code or other reader system. The system can either automatically provide a text message to the parent who can then reply to the child/attendant via the kiosk to meet the child.

Alternatively, the parent can be instructed to meet the child at a predetermined location, and to stop looking for the child because the child was found. Thus, for this example, the person who is lost or separated from their party can notify security or access a kiosk. Security can, for example, notify the parent that child is in safe custody, and should not search the stadium, and therefore, meet outside stadium in a pre-specified safe place.

In an alternative embodiment, if a child/person is separated, the security guard/kiosk can arrange the best place to meet, either in or outside the stadium, together based on an optional global positioning system (GPS). In addition, the party with the mobile device can be provided directions on where to go to meet their party from who they have been separated.

In an alternative embodiment, the present invention may also be used in a security, defense and/or safety setting to direct patrons in a stadium for an orderly evacuation or notify patrons regarding status of a safety related event via, for example, a broadcast message including text message, email and the like. In this manner, system communication resources may be most efficiently utilized by not over-utilizing the system via voice communication, unless completely necessary. For example, the message can be broadcast in the event of an impending hurricane. In this situation, patrons in different sections get different messages, for example, to exit the stadium out of gates/exits that are either less occupied or closest to the section the patrons are sitting in. Advantageously, the present invention has the patrons contact information, including optionally and advantageously text messaging, that can be broadcast or sent to different patrons. The advantage of text messaging is that the bandwidth is more efficiently used in the event of an emergency, and there are no busy signals as in a voice network. Further, the message is send, and if the network is at capacity, the system can automatically resend or the message will be placed in queue and sent as soon as capacity becomes available.

In another alternative embodiment of the invention, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction.

For instance, in sporting venues the bracelet ticket includes the machine readable information that comprises at least one of a bar code and radio frequency identifier used for security check in, and optionally check out. In this manner, the standard reading machines that can scan the bar code or RFID information can keep track of people that have checked into the sporting event and/or venue. Advantageously, the machine readable information on the bracelet can also be used by the venue in the event the patrons seat assignment is modified, for example, via an electronic ticket exchange or upgrade program. In this embodiment, the visible indicia are no longer valid for the actual seating that may be dynamically changed and only represents optionally an initial seat assignment. However, the machine readable information may be used as a code to reference the specific patron and assign that patron a new seat. Thus, when the ticket reader scans the ticket and actually identifies, for example, the bar code, this information can be used to reference the patron, update and/or confirm the patron's current seat via the reader used, for example, by ushers in the venue, kiosk, entrance to the venue, and the like.

In an alternative embodiment, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction. This information, as previously mentioned, may be visually cognizable for the patron and in combination, readable by electronic means if the bracelet includes a magnetic strip, bar code imprinting, or RF chip.

In an alternative embodiment of the present invention, the security bracelet and ticket combination of the present invention advantageously includes a bar code or other machine readable information such as a RFID device. When, for example, a child is separated form their parent, the parent can notify security and the seat number associated with the child. If the child attempts to leave with their bar code/identifier, the system detects the bar code/identifier as either being valid and identifying the child that is missing or being invalid and raising another red flag. In an alternative embodiment, the bar codes/identifiers associated between children and adults correspond such that the child identifier must be within a predetermined time and/or number of checking out identifiers from/within the adult identifier. If this does not occur, the system determines that the child is leaving without their parent, and possibly being abducted.

In an alternative embodiment, the system links one or more tickets/identifiers together and requires the tickets/identifiers to exit the venue or event within a predetermined time period from one another and/or within a predetermined number of tickets/identifiers that have exited the venue and/or event. In the event that one ticket/identifier exits the venue or event and the associated identifier does not, then an alarm or other indictor occurs, and the attendants will detain the patrons that have initiated the alarm to for security purposes.

In an alternative embodiment, the tickets are advantageously coded with designations such as adult, child and the like. In the event a child ticket/identifier exits the stadium before the associated adult and/or more that a predetermined time period and/or number of patrons exiting, the system can initiate an alarm so that an attendant can determine if a child has exited the venue or event without their parent or with a wrong parent potentially averting a kidnapping. In this embodiment, an additional combination is the use of the standard fast pass feature, for example, at theme parks, and the like, where the venue records predetermined events that the user of the card enters in a faster line. In this embodiment, if a child ticket/identifier is not associated with a parent ticket/identifier, for example, as described above, the child may be denied entry into the event or venue if not accompanied by their parent. In alternative embodiments, the venue/event sponsor or organizer associates tickets upon request from the patron. In addition, in another alternative embodiment, a kiosk is provided inside and/or outside the venue for, for example, parents to register their tickets and have them associated with their children's tickets to prevent the child from exiting the venue without them, for example, as described above.

In an alternative embodiment of the present invention, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In another alternative embodiment of the present invention, a security bracelet is advantageously utilized, for example, such as the security bracelet disclosed in U.S. application Ser. No. 10/680,207, filed on Oct. 8, 2003, to Abraham I. Reifer, et al., and incorporated herein by reference, in the event of a reported event, security breach, abduction, and the like. In this embodiment, all patrons exiting the stadium must show their ticket and/or identifier so that the venue can check all patrons out of the stadium. Thus, for example, if two kidnappers come in the stadium, and want to use one bracelet for a child, the second kidnapper will be stranded in the stadium. In addition, if one kidnapper buys two tickets, then upon exit with the child and the additional ticket, a barcode/identifier will be exiting without ever having checked in, and then the alarm will go off as well.

In another alternative embodiment, the present invention provides a broadcast message to warn patrons of an event, such as an advertisement, sale and/or even a weather related event such as a hurricane that might require the venue to be evacuated. Advantageously, in at least one embodiment, the broadcast message comprises standard text messaging that optimizes or better utilizes capacity form the communication system. Thus, when using text messaging capabilities, the present invention efficiently transmits text messages to numerous subscribers regarding, for example, exit information, contacting and/or meeting additional parties that have been separated, and the like.

In an alternative embodiment of the present invention, the present invention optionally provides the capability to penetrate into secondary market with season ticket holders selling ahead of time the games they will not be attending. For example, the present invention optionally provides the feature for the season ticket holder and/or general ticket purchaser the ability to view in advance of the season and/or game the schedule, and to alert the venue and/or stadium of games and/or events they will not be attending, thereby permitting the stadium/venue to attempt to resell the tickets to other patrons. For example, in one embodiment of the invention, the patron is provided with a monthly schedule listing the events that may be attended. The patron, such as a season ticket holder, may then click or place an indicator on all games they will not be attending for the season in advance, thereby providing the stadium with the ability to resell tickets well in advance of the event. Once the patron completes identifying games that will not be attended, the system then compiles a list and transmits the list to the patron for an optional confirmation. This list is then used by the system to release seats well in advance of the game. In an alternative embodiment of the invention, registered users of the system for, for example, upgrades, may also be notified of seat availability for sales prior to the game/event. In an alternative of this embodiment, registered users may receive text messages, emails, and the like, notifying them advantageously of the availability of seats that heretofore have never been easily available to the public for sale, thereby allowing the venue to participate in secondary market ticket sales.

In one alternative embodiment of the present invention, the system/process of the present invention provides or operates as a middle person/broker between the ticket holder that is returning tickets to the venue, such as the season ticket holder, and a ticket sales system and/or company, such as tickets.com, by notifying the tickets company of the newly available seats via notification by the ticket holder, such as the season ticket holder of season ticket games not being attended.

In one alternative embodiment of the invention, the system and/or process transmits text messages, emails and the like, to offer tickets and/or seats and/or admittance to subscribers for events and/or games with empty seats even before game. Thus, the present invention allows the venue to participate in the secondary ticket sales market and the upgrade market, thereby increasing revenue and fan loyalty.

Of course, all of the embodiments of the present invention may be used for any reserved seating event, and/or venue that require tickets for entry thereof.

In another alternative embodiment of the present invention, the use of machine readable identifiers provides advantages for, for example, the upgrade program or ticket exchange of the present invention. For example, when the upgrade, reallocation and/or electronic ticket is issued, the machine readable identifier, for example, the bar code, on the original ticket is invalidated, thereby preventing use of the invalidated ticket. Accordingly, when a new ticket holder purchases the ticket form the season ticket holder, the new purchaser will be issued a new machine readable identifier, and optionally a new paper ticket. The present invention advantageously is able to handle the issuance of a new ticket and invalidates the old ticket and optionally the old identifier that has, for example, been returned by the season ticket holder, thereby providing dynamic ticketing capability.

In an alternative embodiment of the present invention, the new patron obtains a new identifier such as a barcode, the old bar code of, for example, the season ticket holder is invalidated. In one embodiment of the invention, season ticket holders are offered to opt in the upgrade process. Various commercial incentives are possible for the season ticket holder to opt in the upgrade process, such as monetary compensation when their ticket is used for an upgrade and/or resold whether they express their intention not to go to the game prior to the game, and the like. Alternatively, season ticket holders may be offered that the cost of their season tickets will, for example, remain the same as the previous year or be reduced if they participate in the program. Therefore, the combination season ticket trade-in and upgrade program in one embodiment of the invention will be beneficial to season ticket holders by allowing them to trade when they already know that they have no intention of attending a game, and allow the season ticket holder to recoup some cost of the season tickets if they do not attend and their ticket is used as an upgrade. In addition, additional patrons of the event and/or sports team are permitted to attend the game in locations/seats that they might never have been able to obtain access to. Further, the venue/stadium/team maximize revenues by being able to place tickets on the secondary market when the ticket holder notifies the venue early enough that they are not attending the event, the venue also obtains additional revenue from upgrades when tickets are upgraded, and the venue obtains additional fan loyalty.

In another embodiment of the present invention, the system provides the ability to advertise via email, text messaging, and the like, for one wireless carrier on the wireless device that is using another wireless carrier. Since the user of the wireless device has requested the service, the user appropriately receives the communication from the ticketing system of the present invention, and therefore, also appropriately received the advertisement from the wireless carrier that is different than the wireless carrier that the user of the wireless may be using at that time.

In another alternative embodiment of the present invention, offers to purchase seats either during the game or even well in advance of the game are "pushed" or transmitted out to registered users that have supplied their wireless and/or Internet addresses. For example, patrons can register in advance for the upgrade and/or regular ticket offers to purchase admittance via various methods including the Internet. When seats band/or admittance becomes available, a broadcast message or other standard messages may be transmitted to the registered patrons to notify them of the seat availability. Thus, seat offers are "pushed" to registered users that have requested this service advantageously to a wireless device and/or other address including standard telephone communication, as well as additional optional advertisements. The system, in one alternative embodiment, provides the user the option when registering to accept certain types of advertisements to be received on their wireless device via email and/or text messaging. In other embodiments, the user does not have the option of which advertisements to receive.

Advantageously, in accordance with one alternative embodiment of the present invention, if a patron decides to attend an event such as a sporting event when the patron does not have time to wait to receive paper tickets (e.g., the patron is visiting in another city/location and does not have time to wait to receive tickets via mail and is on the go), the system of the present invention transmits a ticket to the patron via, for example, a wireless communication system and/or other standard electronic communication system such as the Internet, and the patron can present their ticket, for example, on their wireless device and show up to game.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Patrons then text message and/or email and/or answer questions via voice-to-text messaging their answers. The system can then display the overall number of answers that are correct and incorrect, display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game.

The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another alternative embodiment of the present invention, the system uses a seat database to determine which of the reserved seats are currently in use. The system may integrate with the seat database system of a venue and/or stadium or optionally be used in parallel with the seat venue/stadium database. For example, prior to the event, the system may utilize the seat database of the venue to determine available seating and patrons that do not show up after a predetermined period of time. Alternatively, the present invention can operate using a separate database from the event/venue by copying or building a separate database used for the ticketing and/or upgrading according to the present invention. In this alternative, as patrons enter the venue, they are checked in directly to this separate database. At the time of the event, the system will be able to check-in patrons using either the identification system, e.g., bar code scanner, of the event or venue, or provide a separate identification system.

In alternative embodiments of the invention, the patron that knows they are attending the game but is going to be late can send in a HOLD message even prior to being provided a warning message that their seats are to be released if the patron does not respond to the message with the HOLD request. That is, in this embodiment, since the patron already knows well in advance that they are attending the game, but perhaps stuck in traffic, the patron can initiate the HOLD message before even being warned in advance of the possibility of their seat being released.

In another alternative embodiment, patrons that have registered with the system and optionally checked into the stadium and/or venue in advance and who also know that they would like an upgrade and/or ticket, may initiate their own upgrade request to the system to notify the system of their willingness to purchase an upgrade and/or new ticket for the event/venue. The system may then place these patrons on a higher priority since they have already expressed and intent and/or willingness to purchase the upgrade or ticket. The patron may notify the event and/or stadium of their willingness optionally well in advance of the game or near/after game time at a time which the patron commits or expresses an additional heightened desire to upgrade and/or purchase a ticket.

In alternative embodiments, the system includes the advantage of allowing patrons to register free for a predetermined period of time, for example, for the first year, without paying a yearly subscriber fee. Alternatively and/or in addition thereto, the system provides the patron with their first upgrade for free or for a reduced rate to further encourage the patron to register with the system and method of the present invention. Alternatively and/or in addition thereto, the system of the present invention offers the patron reduced and/or free concessions when purchasing a membership, ticket and/or upgrade to further encourage the patron to participate in the offers of the present invention.

In alternative embodiments of the present invention, the matching system and/or process, permits participants in the program to initiate a message to the system with the seat location and/or name of the patron that they would like to be matched with for a meeting, networking and/or socializing such as a date. In this embodiment, the system may the push the message to the other subscriber and assign new seats to the individuals that are to be matched. Alternatively, the system need not require a specific confirmation that the second individual to be notified of the potential match is physically located near the first individual, but can rely on the first individual to provide that information. For example, the first individual may see a potential date in a restaurant, and may then send a message to the system with that person's name or address, that they would like to meet that other individual. In that situation, the second individual will receive a message of the possible match, and can respond and accept or reject the offer to meet. The second individual can then provide a meeting destination or the system can suggest a meeting place based on the first individual advising the system of their location, and the location of the second individual.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Advantageously, the multiple choice questions each have unique selections, such as a1, b1, c1 and d1 for question #1; a2, b2, c2, and d2 for question #2; a3, b3, c3 and d3 for question #3, and the like. In this embodiment, the actual timing of questions is not necessary since each question and answer is unique. Therefore, the speed of responding to the question is immaterial to the winner of the contest and/or correct answer. Also, in the event one patron answers the question late, there will be no confusion which question the patron is submitting an answer for. Patrons text message and/or email and/or answer questions via voice-to-text messaging their answers as indicated above using the unique set of answers, in one embodiment. In alternative embodiments, the first predetermined number of patrons that answer the question correctly are considered the winners.

The system can then display the overall number of answers that are correct and incorrect, e.g., a1 50%, b1 28%, c1 12% and d1 10%, and display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another embodiment of the invention in connection with the seating upgrade and/or assignment system, an identifier and/or machine identifier such as a bar code, RFID, etc. optionally remains static for the user on the user's ticket and/or device that is provided for optional paperless ticketing. For example, the identifier will remain the same associated with the user, but the seat assignment, privileges, user characteristics, user preferences, and the like, may be dynamically changes. The system and method of the present invention will be updated so that the identifier can represent a dynamic seat assignment or other dynamic information, such as general admission to an associated event, or other event and/or venue, including, for example, a restaurant, bar, and the like.

In another embodiment of the present invention, the upgrades process and/or feature may be provided to users/ patrons as a complimentary reward for fan loyalty, to reward the user but also market other goods/services and/or other advertising opportunities to be transmitted via the wireless device and/or mobile phone. In one embodiment of the invention, the system and/or method initially queries the user, for example, at the beginning of the trivia contest and/or tournament or at the beginning of the game, whether the user is present in the stadium or not. The system can then perform, for example, the trivia contest, and determine a winner(s) to award for example some form of reward. Furthermore, in another embodiment of the invention, based on the number of people responding that they are present at the game, the present invention advantageously provides a random upgrade to a predetermined number of patrons as an additional fan loyalty program and/or advertising sponsorship to one or more entities that sponsor the free upgrades.

In another embodiment of the invention, a system and/or method is provided that advantageously builds and/or acquires and/or collects mobile contact addresses of users in an efficient manner. For example, in accordance with the present invention, a user advantageously need only provide the communication network and telephone number, and the present invention builds a data address therefrom. This allows the mobile or wireless device user to still register for a service without specifically knowing their data address for, for example, data communication such as SMS messaging, text messaging, email, and the like. In one embodiment, the mobile user is provided a drop down menu where the user selects the communication network and provides their mobile phone number.

The present invention is particularly advantageous currently with the recent enactment by the Federal Communications Commission (FCC) number portability where mobile phone users are able to transfer their existing numbers to other networks. Accordingly, we have determined that a user's number will advantageously provide a mode of contact for the user even when the user decides to change communication networks.

In one embodiment of the invention, the software processes and system determines and builds the actual messaging address (email, text, SMS, and the like) to send messages to the mobile device by the user only selecting and/or providing the communications network and the telephone number. Thus, the present invention advantageously simplifies the process for mobile or wireless device users to register and/or provide contact information, and therefore, beneficially increases the number of individuals that can effectively and easily register for a communication service.

In another embodiment, the present invention facilitates the ability for potential users to signup for the service of receiving, for example, trivia, upgrades and/or text messages via a user sign up device or apparatus. In one embodiment, the user sign up sheet includes numbers and/or circles that can be filled in like a grid, where the user can fill in or cover the numbers that identify their portable number. In addition, the user can check off the specific network carrier from a list of network carriers, or simply enter their specific network carrier. The user sign up sheet may be done electronically via a computer and user interface as described above, or may initially be filled out by a user via, for example, a piece of paper and then later entered into the computer system of the present invention.

In another embodiment of the invention, the system and method of the present invention is capable of re-locating a patron via the mobile address that was previously provided, even if the patron has changed wireless carriers. For example, in one embodiment, with the recent feature of mobile phone portability by the FCC, we have determined that a significant number of mobile phone users are likely never to change their number/address, and therefore, the system and method of the present invention is able to send text messages and/or email to all network addresses using the telephone number of the user if the system suspects that the previously provided network by the user is no longer being used. In this embodiment, the user can optionally respond to the message and/or network broadcast message, confirming that one of the messages has been received.

In another embodiment of the message, whenever a user wants to contact a mobile phone, mobile wireless device or even computer based, via for example, an Internet based account, wants to contact another mobile wireless device user, the present invention provides a transmission device, for example, via the Internet or individual models/mobile phones used for each of the networks to broadcast the message on all networks. Advantageously, in accordance with this embodiment, since the user is likely to maintain the same telephone number, their data or text messaging address will be their telephone number and one of the few network addresses. This type of broadcast message can happen anytime, and even for voice communication when the user of the wireless device needs to receive a data, text and/or voice message.

In another alternative embodiment of the invention, as described previously, the invention may be used by a patron to obtain specific data or information regarding sports or venue related information of interest. For example, patrons may communicate with the system and forward a player jersey number or number of racecar during an event such as a baseball game, football game, racing event such as Nascar, to obtain additional information including current statistics and past statistics. The present invention can then optionally sent statistics throughout the game or event to the patron without the patron requesting, for example, at specific time intervals or after notable achievements during the event, such as a home run, touch down, $7^{th}$ inning stretch, half time, number of laps traveled, and the like.

Thus, the present invention includes many variations in the type of information a user may receive, whether specifically checked into a venue or registered for the service for a particular event. In addition, the present invention includes various processes and systems for ensuring delivery of messages to patrons that have requested the service or merely sending messages that a patron may be interested in receiving.

In another embodiment of the invention, the matching and/or networking system includes the ability to contact and/or notify the users to coordinate the meeting using any one of a plurality of communication methods including text messaging, email and/or instant messaging, with the additional advantage of transmitting pictures, video and/or other data that provides additional information regarding the other person that has been suggested for the match and/or network. In one implementation of this embodiment, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. For example, different message transmit and/or receive formats may be used depending on the system. The present invention beneficially parses the various different formats to obtain the necessary information for the communications described herein. In addition, the represent invention formats the messages for the different wireless devices so that the messages may be appropriately received even though different devices and/or communication networks have different messaging formats. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In accordance with another embodiment of the invention, the matching and/or networking system includes the option of permitting a subscriber to notify the system when they are ready for a potential meeting and/or match. Once the matching and/or networking system is notified of the subscriber requesting the match, the system is then capable of either tracking the user though a positioning system such as GPS, permitting the user to register at predetermined locations upon user initiation such as via Bluetooth, RFID, infrared, and the like. In accordance with this embodiment, the subscribers are not being constantly tracked, and therefore, maintain an additional level of privacy. In alternative embodiment, the present invention continuously tracks the subscribers without specifically requesting to be matched. In this alternative embodiment, the subscriber is provided with less privacy because they may be notified of a specific match even though they might not be interested in the match and/or meeting at that time.

In an alternative embodiment, the present invention provides subscribers with the ability to accept/reject the match before each of the subscribers receive personal information of the other and/or before the date/match has been arranged with at minimum a meeting location. In this embodiment, the invention requires that both users accept the match and/or date prior to notifying the subscribers of the contact information for each subscriber. Therefore, subscribers can optionally request additional information from the system of the present invention, even multiple times, to better understand the potential date and/or match before accepting, and importantly, before the other subscriber is provided contact information and/or a meeting location of the subscriber. In the embodiment where the present invention merely provides the meeting location, the present invention advantageously does not provide the subscribers contact information and/or other personal information before the match/date. Advantageously, in accordance with this embodiment of the invention, subscribers never receive personalized or personal contact information unless the subscribers, after meeting in person, agree to exchange such information.

In another embodiment of the invention, the dating and/or networking system provides subscribers the functionality to email, instant message and/or text message at least one additional piece of personal information and/or questions, optionally directly to each other or via the system anonymously, to obtain additional information that may be more relevant than the user profile or information from the user profile that was used to make the initial date/match.

In another embodiment of the dating and/or matching system of the present invention, the system optionally provides automatic and/or user initiated registration in a particular establishment and/or geographic location, which can be used instead of a location determination system such as GPS, or together with such system. This form of registration may be even more precise than GPS because it confirms a subscriber's presence within a specific store, establishment, entertainment establishment, restaurant, and the like. Thus, in these embodiments, the subscriber either initiates the registration as described above, or alternatively, if the subscriber optionally sets the wireless device to automatic registration based on the appearance at a predetermined registration area and/or location, the subscriber will be automatically registered to receive communications regarding a potential match/date.

In an alternative embodiment of the present invention, once the dating and/or matching system determines that a potential match/date has been detected, the system optionally notifies the different subscribers and asks whether they want to continue to participate in the matching/dating program. When both, some and/or all subscribers agree to participate, the present invention can forward to each subscriber automatically the information that each subscriber shares substantially in common and/or the information that was responsible for the match/date between the subscribers. In this embodiment of the invention, the subscribers will know immediately the information that should be most relevant in making the match/date and can determine whether to actually agree to either contact or send the other subscriber additional information and/or arrange to meet the subscriber at a pre-designated location.

In an alternative embodiment of the present invention, the present invention optionally includes the ability to recommend a potential meeting place for the subscribers to meet after determining that the subscribers have agreed to participate in the date/meeting. In this embodiment, the present invention advantageously determines the location based on, for example, subscriber preferences, geographic location that is preferential for at least one of the subscribers and/or both subscribers, predetermined location where, for example, a sponsor will receive patronage and/or provide a discount for the subscribers and/or actual pay the organizer of the dating/matching system an advertising fee to promote their sponsorship. Accordingly, the present invention advantageously determines not only a potential match/date, but advantageously suggests, recommends and/or determines a specific location and/or geographic location and/or restaurant, clothing store, zoo, museum, and/or other suitable location for the subscribers to meet and optionally based on geographic distance and/or location.

Additional dating and/or matching features and/or differentiators of the networking and/or dating system of the present invention include one or more of the following:

Wireless messaging platform supports interactive messaging

Wireless messaging platform provides simultaneous parallel applications to run without collision Multiple wireless initiatives or topics run without conflict Different initiatives or topics may be user specific or selectable While each initiative runs independently, there can be overlap in terms of customer base Platform is flexible to add/remove initiatives quickly and efficiently One wireless carrier/network can be a dating/matching sponsor and advertise on the wireless device and/or network of another wireless carrier/network Contact members to notify of the match/date to allow members to either directly contact each other or send additional information via, for example, text messaging, email, instant messaging, such as pictures, video, and the like Contact members or wait for request from members to participate in match/date initiative; can then automatically track member via GPS instead of constantly tracking member all the time, thereby increasing privacy of member Contact each subscriber that is being offered the date/match and obtain approval for the match prior to actually notifying potential members that match has been made Contact users after initial match has been conditionally approved, and provides users the capability to request additional information, such as personal information from the other member or other members which the requestor still wants to know before finally accepting the date/match Members can register or "check-in" at predetermined locations and/or establishments which is one additional level of specificity, for example, with regard to the location where a member is that may be interested in matching; For example, two or more members may actually be in the same restaurant where they can be informed of one or more other subscribers being present; members can register via sending a message to the system via text message, email, RFID, Bluetooth, and the like, either by initiating a registration or automatically Contact members after initial match has been conditionally approved and exchange, optionally automatically, profile information that was significant in making the match/date and/or other important information regarding a match/date that a member may want to know before finally accepting the match/date and/or information the members may want to know that is geared particularly for a first date, e.g., likes/dislikes, common interests, favorite foods, wines, alcoholic beverages, and the like Contact members to suggest and/or recommend and/or arrange meeting place based on, for example, geographic location, common interests/sports, common food tastes, common beverage tastes, common entertainment preferences and/or sponsors willing to, or interested in, being utilized for the match/date for the suggestion and/or recommendation, and optionally providing the members a discount and/or compensating by the sponsor to the networking and/or dating system proprietor for the advertising and/or recommendation to visit that sponsor Wireless messaging platform includes a protocol conversion server functioning to interface with a variety of wireless networks having different messaging characteristics for both transmitting and receiving messages, and parsing the different message formats for the content from a received message, and transmitting a message to a plurality of different networks and/or devices having different messaging and/or interface capabilities and/or functionality Contact members with a wireless consent form indicating that the matching/dating system and/or the members participating in the match/date have generally consented to potential cohabitation optionally without any recourse to the other party. Alternatively, the members may be contacted with other types of informed consent forms with limited recourse for acts and/or aggressive acts that are clearly assaults, but not sexual related misconduct or sexual related crimes that are felonious in nature carrying a high penalty/sentence. Alternatively, members may be presented with consent forms that eliminate any criminal penalty, but do not foreclose the possibility of civil lawsuits for damages relating to torts, and the like As another alternative and/or in addition thereto, members may be presented with consent forms that eliminate any civil penalty, but do not foreclose the possibility of criminal lawsuits for criminal type activities, perhaps with the exception of the most severe sexual crimes such as rape and/or sexual assault that carry significant prison time.

For example, athletes, celebrities, high worth individuals, or even average individuals, male or female, may be interested in the wireless consent initiative because that allows them more flexibility to meet a variety of individuals without the worry of later being sued. In additional alternative embodiments, broadcast messages may be transmitted to numerous individual that may be interested in meeting and/or dating a celebrity or predetermined individual or individuals. In this embodiment, the optimum matching individual or individuals may be selected to meet with the celebrity, celebrities, and the like, while utilizing the informed consent feature of the present invention. In another alternative embodiment, an individual or individuals may be randomly selected as part of a match or date, based on a lottery or other competition to meet or date a specific individual or individuals.

Additional optional hardware and software requirements are as follows for one or more embodiments of the present invention:

System Capabilities

Platform supports interactive messaging

Platform provides simultaneous parallel applications to run without collision

Multiple wireless initiatives or topics run without conflict

Different initiatives or topics may be user specific or selectable

While each initiative runs independently, there can be overlap in terms of customer base Platform is flexible to add/remove initiatives quickly and efficiently Wireless Initiatives Interactive trivia with fans inside and outside of the stadium Targeted messaging, e.g., targeted advertising Broadcast messaging, e.g., general advertising Interactive messaging, e.g., with concessions Profiling for each initiative or topic, e.g., based on network operator Urgent and emergency messaging Specific initiative: discounts for concessions and/or memorabilia Specific initiative: invite patrons to different activities before, during or after game, e.g., player loyalty, family activities, etc.

Specific initiative: seating upgrade program

Specific initiative: messaging patrons in one section and separate messaging to patrons in another section Specific initiative: messaging parent of a missing child Special initiative: dating where patrons can keep their seats to return to them, or their seats are re-allocated. In alternative embodiments, the patrons switch seats instead of moving to empty seats, either for the entire game or only a portion thereof with other patrons for match making possibilities.

Functional Specifications

Front end for user signup and profiling-secure site—for example, modeled after www.mlb.com, include one or more of:

type of seats does the customer want for upgrade (decks and range of sections)

information for dating concession profile capability for additional profile information validate user by sending message to device upon sign up auto append of network information to phone number during signup login and password protected site frames on website or interface that can be easily configured to have look and feel, for example, of particular baseball team capability for space on screen for advertising opportunity that can easily be modified and relatively dynamic capability to handle lost passwords web page or interface where customers with season tickets can mark a calendar with the seats they want to keep and the ones they are interested in freeing up for early sale or upgrade.

The optional Front End of the present invention used for administration and setting up parameter for each application, optionally includes a secure site, with one or more of the following:

application email address and password minutes for all the configuration parameters and/or functionality number of threads for each application for upgrades, at least one of releasing customers old seat immediately, or it until the customer approves of the release, or holding the customer's seat for a predetermined portion or all of the game, for example, in the dating functionality)

set schedule for games section rating setup, and seat upgrade pricing revenue allocation model provide a number of retries if message send failure Concessions The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

Concession Wireless Initiative

Purchased via cell phone

Web registration for preferences

Targeted concession offers

Confirmation that purchase is ready

Delivered to seat or ready for expedited pickup

Customer convenience: system identifies closest concessions to customer

Customer convenience: system determines concessions with short wait

Each concession labeled with a number for customer identification and fulfillment Customers can request menu, or register for each game to receive menu around game time via mobile device GPS can be used effectively to inform customer of closest concession stand to pickup order, and/or customer can provide section number and/or seat location for system to identify most convenient concession stand Most convenient concession stand can be determined based on one or more, or combination of, predetermined criteria, such as, closest concession location, shortest wait in line, specific item being ordered, and the like.

Interactive messaging, e.g., with concessions

Specific initiative: discounts for concessions and/or memorabilia The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

In one alternative embodiment, the following message exchanges may be used:

First Message

"In Game" Concessions

Menu will be sent soon!

Reply with #, item short form and seating section

Ex: BE=beer

Reply 3BE for 3 beers

408SEC for section 408

Powered by NEXTEL

Second Message (paper menu?)

Menu

BE=Beer; CO=Coke; DCO=Diet Coke

HD=Hot Dog; BUR=Burger

TA=Taco/Salsa; PO=Popcorn

FF=French Fries; CH=Chips

PZ=Pretzel; PT=Peanut

LEM=Lemon Ice

Third Message

Order received!

Summary:

3 HD @ $3=$9

2 CO @ $3=$6

2 LEM @ $3.50=$7

Total=$22

Reply Y to ACCEPT

Credit Card charged

N to CANCEL

Fourth Message

Thank you for ordering!

Your order has been confirmed!

Confirm# REIF1001

Powered by: THE SPORTS AUTHORITY!

Fifth Message

ORDER READY

Bring Confirm # REIF1001 to Concession # 33 by sect # 212

$2 off NIKE baseball gloves

Bring #NIKE305 and game ticket to

Any SPORTS AUTHORITY!

In another embodiment of the invention used in concessions initiative, the concession attendant receives the confirmation number or other identifying information from the customer when picking up the concessions. The concessions attendant enters the confirmation number or other identifying information when ready or optionally clicks on the order on the computer screen via a concessions interface associated therewith. From there, the order is then cleared from the system with respect to orders that require fulfillment, advantageously allowing the workers to streamline their work activities in the concessions. In an alternative embodiment, the concessions are actually delivered to the customer using the customer provided seating information, either provided by the customer through, for example, the wireless device or other registration and/or notification process, or even via a telephone call or automated attendant to associate with the order.

In another embodiment of the invention, the concessions menu is advantageously only delivered to customers that have entered the stadium via a location determination system, and/or checked into the stadium via a ticket reader/scanner. In alternative embodiments, all customers that have registered for the concessions service will receive an introductory message. Thus, customers that are not attending the game need only reply with a request to terminate the concessions service for that event and/or game.

In an alternative embodiment, the customer is advantageously directed to closest concessions via, for example, GPS chip in phone or by knowing where the customer sits at check in, or by having the customer input their seat location or location where they would like to pickup the concessions.

In another embodiment of the invention, we have determined that some mobile phones will utilize different transmit and receive addresses, and therefore, a user may not know how to appropriately register to be a subscriber for one or more wireless initiatives. For example, we have determined that some mobile phone networks utilize slightly different or different electronic addresses for the transmitting and receiving of electronic messages. For example, for the Research In Motion (RIM) Blackberry communication service, the mobile device is assigned a desktop email address. In one configuration of Blackberry, the mobile device only has one address. However, in the non-integrated configuration, the mobile device actually has a separate address when transmitting from the receive address.

In accordance with this embodiment of the invention, the user registers by providing their mobile phone number and optionally a network carrier for same. In this embodiment, the mobile phone user registers with their phone number and optionally wireless network provider. The registration system of the present invention then sends a message to the mobile device, requesting that the mobile device respond, optionally with a predetermined code and/or predetermined message. The mobile device then responds to the registration system, and the registration system corresponds the mobile device response with the original registered mobile address, thereby completing the registration process by ensuring that responses received from the mobile device can be mapped appropriately to the mobile subscriber. In the embodiment where the mobile user is requested to provide a predetermined code and/or message, the registration system uses the predetermined code to map the mobile phone response potentially having a different address with the transmit address provided by the user.

Dating, Matchmaking and/or Networking

In another embodiment of the invention, patrons are provided the opportunity to meet others in the venue or at a predesignated location near or away from the venue using standard matching rules. In one embodiment, the presence of the user is detected when entering the stadium, for example, via the ticket entrance systems. In another embodiment, the presence of the patron is detected or determined based on a message that is send to the user, for example, either right before, during or after the game. In this embodiment, the user can be prompted with a request whether they would like to participate in the matchmaking, dating and/or networking program.

For example, potential business or social partners may be selected or prompted for networking or dating. When the user responds yes, in this embodiment, their current seat is irrelevant if that seat is not to be released for another patron. Therefore, the system need only select a new set of seats for the networking and/or dating for the patrons, transmit the patrons the additional new seats via, for example, a wireless ticket, update the venue seating database for subsequent verification by the ushers when seating the patrons. The patrons may then proceed to the new location and have a meeting or date, and then return to their original seats if desired.

In another embodiment, a "burnt bridge" approach or feature is provided where the original seats for the patrons that are meeting are then released for other upgrade and/or networking programs. In this embodiment, the original seat of the patron must be known for example, via check-in procedure, registration for the program in advance for example over the web registration process or other registration process, or via the patron responding to the system with their wireless device of their current seat location. Alternate combinations or modifications of the above embodiments is also used.

Trivia

In the alternative embodiment of providing the user trivia information, based on registration and/or location, for example, while attending the game, watching the game at home, or any time prior to or after the game, the user may be provided with questions, as described above, to answer as part of a tournament and/or to be eligible for prizes, awards, and the like. In one embodiment, a section or portion of the users are targeted for the questions together, while other sections and/or portions of the users are targeted at a time period thereafter, for example, 1 minute later, to stagger the communication and transmission of data, thereby reducing congestion and/or unnecessary hardware to accomplish the transmission and acceptance of information to/from the patron.

In one embodiment, while all the questions are staggered over a predetermined period of time to the patrons, whether limited to patrons in the stadium, out of the stadium and/or both, the patrons are not notified whether their answer is correct until after all questions have been transmitted, and all patrons are provided the opportunity and/or sufficient time to respond. Once that predetermined time period has elapsed, the patrons will be notified whether their answer was correct, and whether they are still in the tournament. In optional embodiments, a predetermined time period will again elapse until new questions are sent and the tournament continues.

Optional Oracle or My SQL Database In one embodiment of the invention, an Oracle or My SQL Database is used in connection with the present invention. In one embodiment, the result set is set to be proportionally with respect to the number of users and/or data that will be stored in the system. In another embodiment, the database is optionally partitioned for specific games and/or initiatives or groups of games and/or initiatives. The system is preferably thread safe when running the games and/or initiatives. The system is optionally integrated with Credit Card for payment, and/or integrated with the venue ticket system and/or point of sale system to optionally determine who came in and when into the venue. In another embodiment, the present invention maintains and updates financial balances for users, such as patrons and stadiums. In alternative embodiments, secure interaction with ushers and an interactive kiosk is provided.

The present invention optionally provides any standard algorithm for partitioning of group of seats and users, for example, for system resource allocation, load balancing and/or division of system functionality. In alternative embodiments, a local kiosk for the stadium and/or venue is provided where the user can enter information, such as register for one or more initiatives and/or programs. In alternative embodiments, the system of the present invention includes the capability of offering for sale seats which are not currently sold via messaging to wireless devices, such as text messaging to mobile phones, or other messaging and/or wireless communication to wireless devices, and consideration. In alternative embodiments of the invention, standard algorithms such as used in the airline industry may be used to overbook seats for the venue, and consideration.

In alternative embodiment of the invention, instant messaging or any type of communication method can be used in the present invention, include local and/or global networks, such as the Internet, LANs, WANs, WAP, 811.02a, 802.11b, 802.11g networks, and the like.

Messaging Software Requirements

Trivia and/or other messaging products/initiatives are Java applications that run in a J2EE application server and utilize a JDBC 2.0 compliant relational database. There are typically open source options available for system support. Currently for development and test environments we utilize are desktop environments running Windows 2000 with the open source options below. The draw back is that open source options typically don't provide formal system support approaches, although we have found the software to be very reliable and would recommend this approach for early stage pilots. Should the customer prefer purchase software options for these components are provided as well.

I. Server Software Specifications

Alternative A—Open Source Approach (1) Web/Application Server—Tomcat 4.1.18

(2) Database—MySQL 4.0

(3) Windows 2000 Server for each server

Alternative B—Purchased Product Approach (1) Application Server—Websphere Application Server 5.0

(2) Database—Oracle 9i DBMS (3) Windows 2000 Server for each server

II. Server Hardware Specifications (4) Each of the HW Servers specification:
(i) 2xCPU—P4 2.4 GHz Xeon
(ii) 2 GB RAM
(iii) Monitor
(iv) CD ROM
(v) Floppy Drive
(vi) Hard Drive depending on volume (see below)

III. Communication Specifications (5) POP3 Account and SMTP server accounts that can support number of active subscribers (6) Dedicated T1 access to POP3 and SMTP provider IV. Hardware and Software Sizing Configurations Phase 1:

1K-10K subscribers and players during the game

Two Servers

Server 1—runs Web/Application Server for the website and the Trivia Application

Server 2—runs the Database server (20 Gig)

Phase 2:

10K-25K subscribers and players during the game

Server 1—runs Application Server for the Website front end

Servers 2 and 3 (2 Servers)—run the Application Server for Trivia Application (two servers are used handle load balancing)

Server 4—runs the Database server (50 gig) (Level 1 RAID 2×50G Array)

(Server 5—used as a backup to server 4—depending upon Reliability requirements)

Phase 3:

25K-50K subscribers and players during the game

Server 1—runs Application Server to run the Website front end

Servers 2, 3, 4 and 5—run the Application Server for Trivia Application (four servers are used to handle load balancing with hardware and software clustering)

Server 6—Database Server—150 gig (Level 0+1 RAID 6*50G Array)

(Server 7—used as a backup to server 6—depending upon reliability requirements).

In one alternative embodiment, as part of the sign up for trivia the system optionally asks the general admission or season ticket holders to input their seats to simplify how the system obtains information where the patron is being seated when they come to the game. In an alternative embodiment, the system obtains this information from the stadium database system, kiosk where the patron can enter the information at the stadium and/or via the point of sales system by the service personnel or attendant that is selling the tickets. Using any of the above methods, once the system knows where the patron is/are seating when present at the game, the system can then target sections of the stadium for, for example, the trivia quiz or other service/offering to the patrons. Examples of different sections that can be separately targeted include for baseball, behind first base line first, behind home plate second, first base line third—all lower deck; same sections for upper deck and bleachers. Other sports may include football, hockey, soccer, basketball, and the like. In accordance with this embodiment, targeting different sections over different periods of time, thereby preventing a long delay to receive answers once the question is transmitted, may minimize collusion among patrons.

Thus, by segmenting the stadium over a few minutes in accordance with one embodiment of the invention, the present invention may increase the window of transmission to, for example, 2 minutes or more for the first round. As the rounds get successively smaller, the present invention will transmit messages faster. The present invention also provides optional winners for different sections of the field. In addition, the section winners can further optionally compete against each other, for example, the first class seating winner can further compete against the bleachers winner, and the like.

As discussed above, one or more of the above alternative embodiments may be incorporated into the embodiments described above, and/or any of the embodiments discussed below. Furthermore, any of the embodiments of the present invention may be used for any reserved seating event.

Figure 30:
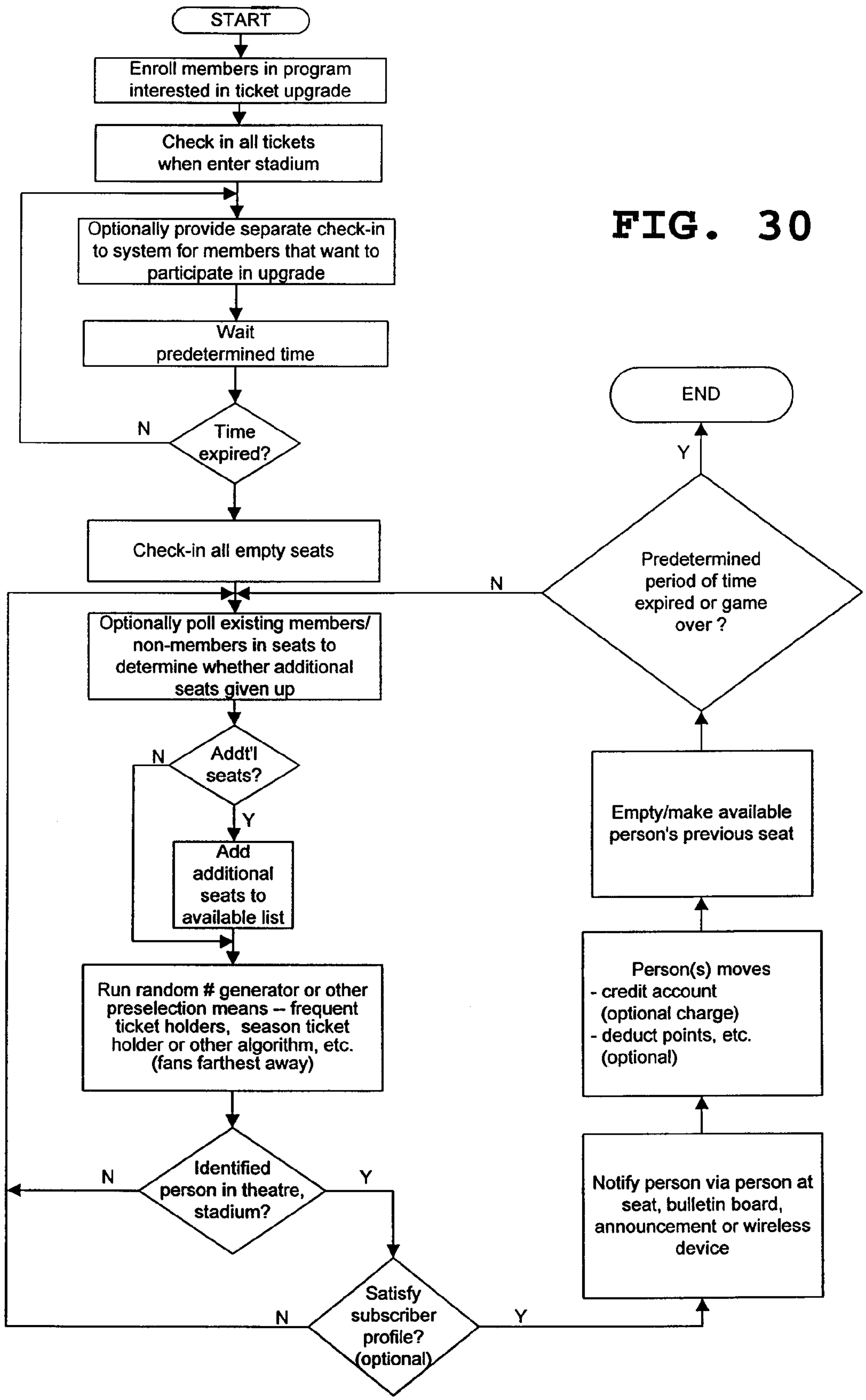

FIG. 30 is a flowchart of an eighth embodiment of the invention. In FIG. 30, the process begins by enrolling members in the program that are interested in the ticket upgrade. Tickets are checked in, for example, as the patrons enter the reserved seating area, such as a stadium or theater, through, for example, bar code readers, scanners, infrared readers, and/or manually or other method where the patron is checked in, either at the gate, seat or other location. An optional separate check in area is provided for patrons that want to participate in the upgrade program. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The seat re-allocation process is used to re-assign seats for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, a standard bidding process, or other predetermined process. Simultaneously or subsequently, the check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process.

An optional polling process to poll existing members and non-members in seats to whether additional seats are available. That is, in another optional embodiment of the present invention, non-members may also make their seats available for re-allocation/re-sale at any point in the process. In this additional polling process, the next step is to determine whether additional seats have been made available. If additional seats have been made available, then these additional seats are added to the list of available seats.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or more means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

If the patron accepts, payment of money or other means may be effectuated on the spot via the wireless device, credit card, debit card, points, and the like, and the patron may now move to the other seat. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

In accordance with the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that may be in the vicinity of the stadium but were unable to get seats. Since the present invention re-allocates and/or sells tickets very near to game time in accordance with one embodiment, the patron must be in the general vicinity of the stadium to take advantage of this embodiment of the invention.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron to help the patron decide the quality of the upgrade and whether to accept.

In one alternative embodiment, if the patron that has their ticket re-allocated in error, e.g., because the patron did not show up to the event based on the predetermined criteria but the patron was still planning on attending because they forgot about their seat being re-allocated, the system can re-allocate seats immediately upon the checking in of the patron and notify them that their seats have changed because they are late. In this situation, the stadium/venue might decide to further upgrade the patrons because of the mistake.

In accordance with one embodiment of the present invention, the process of the present invention specifically reserves seats of the highest or very high rating that are considered preferred, in the event a patron's seat is re-allocated prematurely or erroneously. In this situation, the patron who has had their seat re-allocated because they will likely receive an even better seat as a result of the mistaken (stadium or patron) or premature seat re-allocation.

In another embodiment of the present invention, as patrons are entering the venue or stadium, they are provided advantageously with a map of the stadium so patrons can analyze the potential upgrade to make a decision whether the upgraded seats are sufficiently good or of value to warrant the patron moving and/or paying for the additional upgrade. By handing the patron the map of the stadium, the process of the present invention is not required to transmit a detailed schematic to the patron's wireless device which would not normally be able to effectively permit the patron to evaluate the proposed upgrade seats. The map that is handed out may optionally include information for patrons on where to register for the upgrade and/or additional advertisement opportunities.

In one alternative embodiment, the patron that has purchased the ticket, for example, a season ticket holder, may advise the stadium that for a particular game, set of games or all games, they do not want their seats to be re-allocated, and perhaps, an additional fee is assessed for this type of patron. If the stadium provides the ability for the patron to selectively opt out of the seat re-allocation, the patron can, for example, connect to the system via the Internet, public switched telephone network, cellular network, and the like, and notify the system that they do not want their ticket re-allocated, for example, because they are coming late to the event. Other means of notifying the system and/or other reasons may be utilized in connection with the present invention.

In another alternative embodiment, the system provides patrons the ability to individually select when their tickets may be re-allocated. For example, one patron may prefer to only give up their ticket if they are late to the game by 15 minutes, while another patron may be willing to give up their ticket if they have not arrived 15 minutes before the game. In alternative embodiments, the stadium may provide incentives for the patron to have their ticket re-allocated prior to the game because it increases the stadiums chances of re-allocating/re-selling the ticket.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provide additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In an alternative embodiment, the system determines priority of re-allocation of seats based first upon patrons that have seats that may also be re-allocated. That is, the systems attempts to maximize the number of re-allocations by prioritizing the re-allocation based upon seats that may be re-allocated after already being re-allocated. For example, if front row seats in a stadium are available to be re-allocated, in this alternative embodiment, patrons that are in the next closest section for example on the field level would be upgraded first to those seats. Then, patrons with less preferred seats, for example, in the upper deck would be re-allocated to the seats that have now become available from the patrons that have been upgraded to the front row. Thus, using this alternative priority scheme, the present invention maximizes the re-allocation numbers. Of course, this priority algorithm may be combined with additional factors, for example, relating to subscriber/patron value. As described above, additional factors may be utilized in the algorithm to determine the subscriber or set of subscribers to offer the upgrade.

In alternative embodiments, patrons in the vicinity of the upgraded and re-allocated patrons may optionally rate the upgraded patron, for example, for appropriate behavior, wearing of excessively large hats, drunkenness behavior, and the like. These ratings may then be taken into account in the re-allocation algorithm for future upgrades to the patron.

In alternative embodiments, the patrons eligible for the upgrade may be notified using standard email communications over a wireless device, mobile telephone, and/or other standard communication means. For example, standard text-to-voice and/or voice-to-text communications may be used to contact the patron to evaluate whether an upgrade will be accepted and to actually accept the upgrade.

In another embodiment of the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that have already purchased tickets in the vicinity of the stadium but were unable to get seats and/or may be in the vicinity of the stadium but were unable to get seats. Since the present invention re-allocates and/or sells tickets at any time prior to and/or after beginning of game time in accordance with one embodiment, the patron may be in the general vicinity of the stadium to take advantage of this embodiment of the invention or even at any location when being offered upgrades and/or seats well in advance of the game. For example, the present invention can upgrade or sell tickets to patrons well in advance of the game since it advantageously is permitted or has the authority to resell tickets either via ticket holders that do not show up during the game and/or, for example, season ticket holders that have authorized the stadium in advance to resell their tickets based on predetermined criteria, for example, when the season ticket holder notifies the stadium that they will not be present at next weeks game.

In one optional embodiment of the invention, the patron presents the usher with the confirmation number which the usher can enter into a wireless device using a local or private wireless network, or can simply use a walkie talkie or telephone to call the dispatcher to confirm the upgrade and/or new seats using the customer provided confirmation number. The dispatcher will have access to the system to enter the confirmation number to confirm the validity of the upgrade. Alternatively, a patron will retain their old ticket. The patron will give in the old ticket to the usher which is scanned or barcoded by the usher for immediate identification of new seats and used in place of, or in addition to, confirmation number.

Of course, the confirmation may optionally be made via customer name with an appropriate identification card or other information. Further, alternative methods may be used to verify that the confirmation number and/or ticket being used by the patron is valid. For example, the patron may be equipped with a printing device associated with the wireless device or download an actual ticket on line from home prior to the game for the new ticket or upgrade. Alternatively, the patron may be equipped with an identifier card, optionally including a bar code with a unique identifier relating to the patron's account information and profile that can be scanned for additional convenience. Alternatively, a wireless device may be used to securely store this type of identification and/or account information.

In at least one alternative embodiment of the invention, the patron may comprise optionally a corporate account that has a number of tickets, for example, season tickets. In this embodiment, the corporate account may have associated therewith a plurality of email addresses or other communication addresses to transmit the seat or upgrade offer to a number of potential patrons that may rotate their attendance at the games. In accordance with this optional embodiment, multiple emails can be stored for a single user/corporate account, and the system may transmit individual messages to all email addresses, or may only transmit messages to individual patrons for corporate account that individually advise the system that they are associated with a particular ticket/bar code for a particular game and will be/are present at a particular game.

In an alternative embodiment, patrons may enter the stadium and subsequently inform the system that they are present and interested in an upgrade via a kiosk where the patron can scan a bar code and enter their customer number to be eligible for upgrades during the game. The system is then able to transmit a message to the customer, assuming that the customer has pre-registered with the system with the appropriate contact information. Alternatively, or in addition to individual use of a kiosk(s), the customer sales office may have a kiosk or additional functionality to enter the customer name and/or customer account and scan in the bar coded ticket on the spot to register each patron as they enter the stadium or venue.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron upon entry in the stadium to help the patron decide the quality of the upgrade and whether to accept when an offer is received by the patron at a predetermined time. The graphical map may comprise a small booklet with a map of the stadium showing seat locations, and optionally a game schedule.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provides additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In alternative embodiments, patrons in the vicinity of the upgraded and re-allocated patrons may optionally be eligible for a dating or matching service where patrons register and provide profile information to the system and/or through a third service provider dating service. Once the system knows that the patrons will be coming to the game and/or have actually checked in to the stadium, the system can then arrange for the two, four, etc. patrons to meet each other by allocating and/or re-allocating seats to the patrons together. Thus, based on profile information, customer request and availability, the system is able to upgrade or sell tickets to patrons to maximize their chances of meeting someone at the game. This optional feature provides significant potential enjoyment for the patrons participating in this dating or connection program. In accordance with this embodiment, one possible sequence of acceptance steps involves profile matching the two patrons (or groups of patrons) based on predetermined profile information; transmitting a first message to the first patron regarding availability of the second patron and requesting a conditional acceptance form the first patron; transmitting a second message to the second patron indicating that the first patron has conditionally accepted and request the second patron to accept; and when the second patron accepts before the first patron has rescinded the conditional acceptance, finalizing the upgrade and/or seat allocation for the first and second patrons. This embodiment of the invention is a complete reverse from typical dating and/or matchmaking services which attempt to develop detailed algorithms for the matching process because of the significant decision that exists in determining who to spend valuable time with. In accordance with the invention, patrons are already present at the game, and therefore, half or more than half the effort is already done. The remainder is to actually meet the other person which can be accomplished with profile criteria, whether or not the algorithms are very sophisticated.

In one embodiment, the patrons that are being matched have their original seats maintained and not made available for other upgrades in the event the matching does not work out early on. In this embodiment, one or both the patrons can return to their original seat. Hopefully, there will not be a significant argument of who would need to return to their original seat if an upgrade is actually performed. In addition, in accordance with this embodiment, the seats that are selected do not necessarily have to be better seats in the classical sense. That is, seats further away from other ticket holders might be considered preferred when matching two individuals for the first time. Alternatively, couple that would prefer a little more privacy or quieter game might request to be moved to a more isolated area. Alternatively, families with small children might prefer to be moved to a less busy area as well during the game where the children might be able to freely move around. All these scenarios and/or alternatives are possible in view of the present invention. The advantage of performing a match in a public setting is that the patrons do not have to worry about leaving or ending the date, and also do not have to worry that the other person will have their home address.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like.

In addition, this feature also optionally permits the patrons that have participated in the program to rate one another for future dates. For example, one patron can rate the conversational benefits of the second patron, the appearance of the second patron, the overall short term versus long terms relationship goals of the patron, and the like. These ratings may then be taken into account in the algorithm for future seat assignments, re-allocations and/or upgrades in the future for the first and second patrons, and all other patrons will now benefit with the additional profile information of the first and second patrons. The matching service may be for amusement or work related networking purposes, for example, to meet an executive that the patron currently works with or wishes to work with/sell in the future.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like. In addition, the system advantageously and optionally provides the feature of allowing patrons to text message one another directly, and/or exchange pictures via wireless email, text messaging, and other wireless devices that provide the standard capability of exchanging pictures, such a T Mobile and/or Sprint.

In alternative embodiments, the ticket holder can call in via a voice to text message, text message and/or email and let the stadium know early that they are not coming. In this manner the ticket holder obtains the convenience of the stadium or venue reselling their tickets in advance, thereby providing the venue with additional time to maximize the resale of the ticket.

In alternative embodiments, when the patron enters the stadium, they have their ticket barcoded or other device that detects their presence can be used such as infrared, Bluetooth, etc., and then they can become eligible for an upgrade. The patron can register in advance that they want to receive upgrades by providing their name, message address, e.g., email, telephone text message address, etc., and optionally their credit card or other payment mechanism for upgrades that actually cost money as opposed to free upgrades. In alternative embodiments, the patron can register at the ticket booth when purchasing their original ticket. In this scenario, the stadium representative can enter this information on behalf of, and with the permission of, the patron since the patron may already be providing their credit card, debit card, etc. to purchase the original tickets. Alternatively or in addition, a kiosk may be provided where the patron can enter their original ticket, e.g., scan in their original ticket and provide their name and text message information in the stadium to register for a one time upgrade for the game after purchasing, for example, a regular admission ticket.

In alternative embodiments, an usher can verify that the patron should be upgraded by the patron providing the confirmation number that may be transmitted in real-time by the system, and/or by the patron using their original confirmation number or original ticket with barcode or other identification means, such as a smart card, infrared reader, etc. that represents original ticket and presenting same to the user. The usher then needs only to scan in the original ticket and the system will verify whether the patron associated with the original ticket is valid and whether the upgrade is valid.

In alternative embodiments, a warning message may be sent to the ticket holder that has not shown up to game warning them that if they do not respond within a certain time period that their seat will be re-allocated or re-assigned to another patron. Similarly, a release message may be sent to the ticket holder after their seat has actually been released and/or re-allocated, thereby notifying the patron that if they change their mind in attending the game, they will have to obtain an additional ticket. In alternative embodiments, the ticket holder that has their seat released and re-allocated can be themselves re-allocated a similar, worse or better seat, depending on, for example, their subscriber value and/or other criteria. For example, if the patron is provided a better seat, this will encourage them to more readily give up their seats in the future even if they are attending the game. On the other hand, if the patron is provided a worse seat, then this encourages them not to artificially give up or have their seat released when attending the game. Accordingly, the present invention is designed to deal with various behavioral patterns of specific ticket holders, and may optionally and advantageously be a ticket holder specific with respect to various criteria for re-assigning, releasing, selling and/or re-allocating tickets.

In alternative embodiments, the system transmits to the ticket holder a welcome message after being upgraded and after having being moved to a new upgraded seat location. In one embodiment, the system identifies that the patron has been successfully upgraded after the patron provides the usher with a confirmation number or original ticket, which is then verified by the usher and system.

In alternative embodiments, the system, after having identified which patrons have checked into the stadium and/or have been upgraded, transmits a trivia question and/or additional advertisements to all patrons attending the game. In alternative embodiments, the information is transmitted to both patrons that are attending the game and additional patrons that have registered in the past to receive information but that are not attending the game. The participants can, for example, answer trivia questions and respond with their wireless device. Depending on whether the patron is attending the game or not, the system may determine to offer or deal with each of the patrons differently. For example, for patrons at the game, winners may be successively determined and narrowed, as patrons successfully and unsuccessfully answer questions, round after round of questions in a "spelling bee" format. For patrons that are not attending the game, winners may be declared, or statistics provided to the broadcast station that can be aired on television. In yet additional alternative embodiments, instead of transmitting information/questions to the patrons via the wireless device, the information/questions are displayed on the stadium billboard for patrons at the game and/or on television for patrons that are watching the game on television. The patron can then merely respond via the device, e.g., the telephone accordingly via a voice-to-text system or via other mobile devices via text messaging.

In alternative embodiments, the present invention provides the advantage of additional advertising sponsorship to the venue. For example, in one embodiment, the venue is partitioned into different locations that may be assigned to different sponsors. In one embodiment, the sponsor that provides the most value may be assigned a certain number of premium seats that are not available to other sponsors.

For example, the sponsor may offer a discount on the upgrade if you are a Verizon or Verizon Wireless customer or they credit your cell account for each seat upgrade or you get say 30 free minutes, etc. In alternative embodiments, the present invention provides the advantage of one wireless provider to advertise on another wireless providers mobile phone or wireless device. For example, if Verizon Wireless is a sponsor of the upgrade system for a particular stadium, the present invention will still work with, for example, AT&T, SPRINT, and CINGULAR customers. An advertisement message sent with the upgrade offer may read on the AT&T phone, "brought to you by Verizon Wireless." In an alternative embodiment of the present invention, text messaging is optionally used for mobile phones to perform the message communication of the present invention. The user is only required, in one embodiment, to reply or respond with a "Yes" to accept the upgrade offer since the user has advantageously pre-registered with the system, thereby minimizing the required communication/input by the user. In an alternative embodiment, the user, instead of pre-registering with the system, is charged on their wireless or even regular telephone number bill when they accept the upgrade offer. Thus, the wireless system that either administers the user's regular or wireless account or the upgrade sponsor may be responsible for actually billing the customer in this alternative embodiment.

In the alternative embodiment when text messaging is optionally used alone or in combination with other communication methods, the system provides the additional advantage of maximizing bandwidth usage by not requiring use of bandwidth on the wireless voice system, thereby maximizing system resources.

In another alternative embodiment, the present invention optionally and advantageously provides a security and/or safety feature in the event of, for example, a minor event where a parent gets separated from a child, a disaster or other event that might require evacuation of the stadium. In one embodiment, the person needing help provides their name to an attendant that can search the system for the contact information of their companion/parent. The system can thereafter send an email and/or text message to the companion/parent regarding the status of that person and provide instructions for meeting that person or arranging help, authorizing medical procedures, and the like. In another embodiment, the person requiring help, e.g., a child provides the attendant or kiosk with their ticket which can, e.g., scan the bar code or other reader system. The system can either automatically provide a text message to the parent who can then reply to the child/attendant via the kiosk to meet the child.

Alternatively, the parent can be instructed to meet the child at a predetermined location, and to stop looking for the child because the child was found. Thus, for this example, the person who is lost or separated from their party can notify security or access a kiosk. Security can, for example, notify the parent that child is in safe custody, and should not search the stadium, and therefore, meet outside stadium in a prespecified safe place.

In an alternative embodiment, if a child/person is separated, the security guard/kiosk can arrange the best place to meet, either in or outside the stadium, together based on an optional global positioning system (GPS). In addition, the party with the mobile device can be provided directions on where to go to meet their party from who they have been separated.

In an alternative embodiment, the present invention may also be used in a security, defense and/or safety setting to direct patrons in a stadium for an orderly evacuation or notify patrons regarding status of a safety related event via, for example, a broadcast message including text message, email and the like. In this manner, system communication resources may be most efficiently utilized by not over-utilizing the system via voice communication, unless completely necessary. For example, the message can be broadcast in the event of an impending hurricane. In this situation, patrons in different sections get different messages, for example, to exit the stadium out of gates/exits that are either less occupied or closest to the section the patrons are sitting in. Advantageously, the present invention has the patrons contact information, including optionally and advantageously text messaging, that can be broadcast or sent to different patrons. The advantage of text messaging is that the bandwidth is more efficiently used in the event of an emergency, and there are no busy signals as in a voice network. Further, the message is send, and if the network is at capacity, the system can automatically resend or the message will be placed in queue and sent as soon as capacity becomes available.

In another alternative embodiment of the invention, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction.

For instance, in sporting venues the bracelet ticket includes the machine readable information that comprises at least one of a bar code and radio frequency identifier used for security check in, and optionally check out. In this manner, the standard reading machines that can scan the bar code or RFID information can keep track of people that have checked into the sporting event and/or venue. Advantageously, the machine readable information on the bracelet can also be used by the venue in the event the patrons seat assignment is modified, for example, via an electronic ticket exchange or upgrade program. In this embodiment, the visible indicia are no longer valid for the actual seating that may be dynamically changed and only represents optionally an initial seat assignment. However, the machine readable information may be used as a code to reference the specific patron and assign that patron a new seat. Thus, when the ticket reader scans the ticket and actually identifies, for example, the bar code, this information can be used to reference the patron, update and/or confirm the patron's current seat via the reader used, for example, by ushers in the venue, kiosk, entrance to the venue, and the like.

In an alternative embodiment, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction. This information, as previously mentioned, may be visually cognizable for the patron and in combination, readable by electronic means if the bracelet includes a magnetic strip, bar code imprinting, or RF chip.

In an alternative embodiment of the present invention, the security bracelet and ticket combination of the present invention advantageously includes a bar code or other machine readable information such as a RFID device. When, for example, a child is separated form their parent, the parent can notify security and the seat number associated with the child. If the child attempts to leave with their bar code/identifier, the system detects the bar code/identifier as either being valid and identifying the child that is missing or being invalid and raising another red flag. In an alternative embodiment, the bar codes/identifiers associated between children and adults correspond such that the child identifier must be within a predetermined time and/or number of checking out identifiers from/within the adult identifier. If this does not occur, the system determines that the child is leaving without their parent, and possibly being abducted.

In an alternative embodiment, the system links one or more tickets/identifiers together and requires the tickets/identifiers to exit the venue or event within a predetermined time period from one another and/or within a predetermined number of tickets/identifiers that have exited the venue and/or event. In the event that one ticket/identifier exits the venue or event and the associated identifier does not, then an alarm or other indictor occurs, and the attendants will detain the patrons that have initiated the alarm to for security purposes.

In an alternative embodiment, the tickets are advantageously coded with designations such as adult, child and the like. In the event a child ticket/identifier exits the stadium before the associated adult and/or more that a predetermined time period and/or number of patrons exiting, the system can initiate an alarm so that an attendant can determine if a child has exited the venue or event without their parent or with a wrong parent potentially averting a kidnapping. In this embodiment, an additional combination is the use of the standard fast pass feature, for example, at theme parks, and the like, where the venue records predetermined events that the user of the card enters in a faster line. In this embodiment, if a child ticket/identifier is not associated with a parent ticket/identifier, for example, as described above, the child may be denied entry into the event or venue if not accompanied by their parent. In alternative embodiments, the venue/event sponsor or organizer associates tickets upon request from the patron. In addition, in another alternative embodiment, a kiosk is provided inside and/or outside the venue for, for example, parents to register their tickets and have them associated with their children's tickets to prevent the child from exiting the venue without them, for example, as described above.

In an alternative embodiment of the present invention, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In another alternative embodiment of the present invention, a security bracelet is advantageously utilized, for example, such as the security bracelet disclosed in U.S. application Ser. No. 10/680,207, filed on Oct. 8, 2003, to Abraham I. Reifer, et al., and incorporated herein by reference, in the event of a reported event, security breach, abduction, and the like. In this embodiment, all patrons exiting the stadium must show their ticket and/or identifier so that the venue can check all patrons out of the stadium. Thus, for example, if two kidnappers come in the stadium, and want to use one bracelet for a child, the second kidnapper will be stranded in the stadium. In addition, if one kidnapper buys two tickets, then upon exit with the child and the additional ticket, a barcode/identifier will be exiting without ever having checked in, and then the alarm will go off as well.

In another alternative embodiment, the present invention provides a broadcast message to warn patrons of an event, such as an advertisement, sale and/or even a weather related event such as a hurricane that might require the venue to be evacuated. Advantageously, in at least one embodiment, the broadcast message comprises standard text messaging that optimizes or better utilizes capacity form the communication system. Thus, when using text messaging capabilities, the present invention efficiently transmits text messages to numerous subscribers regarding, for example, exit information, contacting and/or meeting additional parties that have been separated, and the like.

In an alternative embodiment of the present invention, the present invention optionally provides the capability to penetrate into secondary market with season ticket holders selling ahead of time the games they will not be attending. For example, the present invention optionally provides the feature for the season ticket holder and/or general ticket purchaser the ability to view in advance of the season and/or game the schedule, and to alert the venue and/or stadium of games and/or events they will not be attending, thereby permitting the stadium/venue to attempt to resell the tickets to other patrons. For example, in one embodiment of the invention, the patron is provided with a monthly schedule listing the events that may be attended. The patron, such as a season ticket holder, may then click or place an indicator on all games they will not be attending for the season in advance, thereby providing the stadium with the ability to resell tickets well in advance of the event. Once the patron completes identifying games that will not be attended, the system then compiles a list and transmits the list to the patron for an optional confirmation. This list is then used by the system to release seats well in advance of the game. In an alternative embodiment of the invention, registered users of the system for, for example, upgrades, may also be notified of seat availability for sales prior to the game/event. In an alternative of this embodiment, registered users may receive text messages, emails, and the like, notifying them advantageously of the availability of seats that heretofore have never been easily available to the public for sale, thereby allowing the venue to participate in secondary market ticket sales.

In one alternative embodiment of the present invention, the system/process of the present invention provides or operates as a middle person/broker between the ticket holder that is returning tickets to the venue, such as the season ticket holder, and a ticket sales system and/or company, such as tickets.com, by notifying the tickets company of the newly available seats via notification by the ticket holder, such as the season ticket holder of season ticket games not being attended.

In one alternative embodiment of the invention, the system and/or process transmits text messages, emails and the like, to offer tickets and/or seats and/or admittance to subscribers for events and/or games with empty seats even before game. Thus, the present invention allows the venue to participate in the secondary ticket sales market and the upgrade market, thereby increasing revenue and fan loyalty.

Of course, all of the embodiments of the present invention may be used for any reserved seating event, and/or venue that require tickets for entry thereof.

In another alternative embodiment of the present invention, the use of machine readable identifiers provides advantages for, for example, the upgrade program or ticket exchange of the present invention. For example, when the upgrade, reallocation and/or electronic ticket is issued, the machine readable/identifier, for example, the bar code, on the original ticket is invalidated, thereby preventing use of the invalidated ticket. Accordingly, when a new ticket holder purchases the ticket form the season ticket holder, the new purchaser will be issued a new machine readable identifier, and optionally a new paper ticket. The present invention advantageously is able to handle the issuance of a new ticket and invalidates the old ticket and optionally the old identifier that has, for example, been returned by the season ticket holder, thereby providing dynamic ticketing capability.

In an alternative embodiment of the present invention, the new patron obtains a new identifier such as a barcode, the old bar code of, for example, the season ticket holder is invalidated. In one embodiment of the invention, season ticket holders are offered to opt in the upgrade process. Various commercial incentives are possible for the season ticket holder to opt in the upgrade process, such as monetary compensation when their ticket is used for an upgrade and/or resold whether they express their intention not to go to the game prior to the game, and the like. Alternatively, season ticket holders may be offered that the cost of their season tickets will, for example, remain the same as the previous year or be reduced if they participate in the program. Therefore, the combination season ticket trade-in and upgrade program in one embodiment of the invention will be beneficial to season ticket holders by allowing them to trade when they already know that they have no intention of attending a game, and allow the season ticket holder to recoup some cost of the season tickets if they do not attend and their ticket is used as an upgrade. In addition, additional patrons of the event and/or sports team are permitted to attend the game in locations/seats that they might never have been able to obtain access to. Further, the venue/stadium/team maximize revenues by being able to place tickets on the secondary market when the ticket holder notifies the venue early enough that they are not attending the event, the venue also obtains additional revenue from upgrades when tickets are upgraded, and the venue obtains additional fan loyalty.

In another embodiment of the present invention, the system provides the ability to advertise via email, text messaging, and the like, for one wireless carrier on the wireless device that is using another wireless carrier. Since the user of the wireless device has requested the service, the user appropriately receives the communication from the ticketing system of the present invention, and therefore, also appropriately received the advertisement from the wireless carrier that is different than the wireless carrier that the user of the wireless may be using at that time.

In another alternative embodiment of the present invention, offers to purchase seats either during the game or even well in advance of the game are "pushed" or transmitted out to registered users that have supplied their wireless and/or Internet addresses. For example, patrons can register in advance for the upgrade and/or regular ticket offers to purchase admittance via various methods including the Internet. When seats band/or admittance becomes available, a broadcast message or other standard messages may be transmitted to the registered patrons to notify them of the seat availability. Thus, seat offers are "pushed" to registered users that have requested this service advantageously to a wireless device and/or other address including standard telephone communication, as well as additional optional advertisements. The system, in one alternative embodiment, provides the user the option when registering to accept certain types of advertisements to be received on their wireless device via email and/or text messaging. In other embodiments, the user does not have the option of which advertisements to receive.

Advantageously, in accordance with one alternative embodiment of the present invention, if a patron decides to attend an event such as a sporting event when the patron does not have time to wait to receive paper tickets (e.g., the patron is visiting in another city/location and does not have time to wait to receive tickets via mail and is on the go), the system of the present invention transmits a ticket to the patron via, for example, a wireless communication system and/or other standard electronic communication system such as the Internet, and the patron can present their ticket, for example, on their wireless device and show up to game.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Patrons then text message and/or email and/or answer questions via voice-to-text messaging their answers. The system can then display the overall number of answers that are correct and incorrect, display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game.

The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another alternative embodiment of the present invention, the system uses a seat database to determine which of the reserved seats are currently in use. The system may integrate with the seat database system of a venue and/or stadium or optionally be used in parallel with the seat venue/stadium database. For example, prior to the event, the system may utilize the seat database of the venue to determine available seating and patrons that do not show up after a predetermined period of time. Alternatively, the present invention can operate using a separate database from the event/venue by copying or building a separate database used for the ticketing and/or upgrading according to the present invention. In this alternative, as patrons enter the venue, they are checked in directly to this separate database. At the time of the event, the system will be able to check-in patrons using either the identification system, e.g., bar code scanner, of the event or venue, or provide a separate identification system.

In alternative embodiments of the invention, the patron that knows they are attending the game but is going to be late can send in a HOLD message even prior to being provided a warning message that their seats are to be released if the patron does not respond to the message with the HOLD request. That is, in this embodiment, since the patron already knows well in advance that they are attending the game, but perhaps stuck in traffic, the patron can initiate the HOLD message before even being warned in advance of the possibility of their seat being released.

In another alternative embodiment, patrons that have registered with the system and optionally checked into the stadium and/or venue in advance and who also know that they would like an upgrade and/or ticket, may initiate their own upgrade request to the system to notify the system of their willingness to purchase an upgrade and/or new ticket for the event/venue. The system may then place these patrons on a higher priority since they have already expressed and intent and/or willingness to purchase the upgrade or ticket. The patron may notify the event and/or stadium of their willingness optionally well in advance of the game or near/after game time at a time which the patron commits or expresses an additional heightened desire to upgrade and/or purchase a ticket.

In alternative embodiments, the system includes the advantage of allowing patrons to register free for a predetermined period of time, for example, for the first year, without paying a yearly subscriber fee. Alternatively and/or in addition thereto, the system provides the patron with their first upgrade for free or for a reduced rate to further encourage the patron to register with the system and method of the present invention. Alternatively and/or in addition thereto, the system of the present invention offers the patron reduced and/or free concessions when purchasing a membership, ticket and/or upgrade to further encourage the patron to participate in the offers of the present invention.

In alternative embodiments of the present invention, the matching system and/or process, permits participants in the program to initiate a message to the system with the seat location and/or name of the patron that they would like to be matched with for a meeting, networking and/or socializing such as a date. In this embodiment, the system may the push the message to the other subscriber and assign new seats to the individuals that are to be matched. Alternatively, the system Need not require a specific confirmation that the second individual to be notified of the potential match is physically located near the first individual, but can rely on the first individual to provide that information. For example, the first individual may see a potential date in a restaurant, and may then send a message to the system with that person's name or address, that they would like to meet that other individual. In that situation, the second individual will receive a message of the possible match, and can respond and accept or reject the offer to meet. The second individual can then provide a meeting destination or the system can suggest a meeting place based on the first individual advising the system of their location, and the location of the second individual.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Advantageously, the multiple choice questions each have unique selections, such as a1, b1, c1 and d1 for question #1; a2, b2, c2, and d2 for question #2; a3, b3, c3 and d3 for question #3, and the like. In this embodiment, the actual timing of questions is not necessary since each question and answer is unique. Therefore, the speed of responding to the question is immaterial to the winner of the contest and/or correct answer. Also, in the event one patron answers the question late, there will be no confusion which question the patron is submitting an answer for. Patrons text message and/or email and/or answer questions via voice-to-text messaging their answers as indicated above using the unique set of answers, in one embodiment. In alternative embodiments, the first predetermined number of patrons that answer the question correctly are considered the winners.

The system can then display the overall number of answers that are correct and incorrect, e.g., a1 50%, b1 28%, c1 12% and d1 10%, and display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another embodiment of the invention in connection with the seating upgrade and/or assignment system, an identifier and/or machine identifier such as a bar code, RFID, etc. optionally remains static for the user on the user's ticket and/or device that is provided for optional paperless ticketing. For example, the identifier will remain the same associated with the user, but the seat assignment, privileges, user characteristics, user preferences, and the like, may be dynamically changes. The system and method of the present invention will be updated so that the identifier can represent a dynamic seat assignment or other dynamic information, such as general admission to an associated event, or other event and/or venue, including, for example, a restaurant, bar, and the like.

In another embodiment of the present invention, the upgrades process and/or feature may be provided to users/patrons as a complimentary reward for fan loyalty, to reward the user but also market other goods/services and/or other advertising opportunities to be transmitted via the wireless device and/or mobile phone. In one embodiment of the invention, the system and/or method initially queries the user, for example, at the beginning of the trivia contest and/or tournament or at the beginning of the game, whether the user is present in the stadium or not. The system can then perform, for example, the trivia contest, and determine a winner(s) to award for example some form of reward. Furthermore, in another embodiment of the invention, based on the number of people responding that they are present at the game, the present invention advantageously provides a random upgrade to a predetermined number of patrons as an additional fan loyalty program and/or advertising sponsorship to one or more entities that sponsor the free upgrades.

In another embodiment of the invention, a system and/or method is provided that advantageously builds and/or acquires and/or collects mobile contact addresses of users in an efficient manner. For example, in accordance with the present invention, a user advantageously need only provide the communication network and telephone number, and the present invention builds a data address therefrom. This allows the mobile or wireless device user to still register for a service without specifically knowing their data address for, for example, data communication such as SMS messaging, text messaging, email, and the like. In one embodiment, the mobile user is provided a drop down menu where the user selects the communication network and provides their mobile phone number.

The present invention is particularly advantageous currently with the recent enactment by the Federal Communications Commission (FCC) number portability where mobile phone users are able to transfer their existing numbers to other networks. Accordingly, we have determined that a user's number will advantageously provide a mode of contact for the user even when the user decides to change communication networks. For example, in at least one embodiment, the present invention uses the cell phone number and IP address combination, e.g., 2029422785@verizon.net, or 3016814455@attwireless.com, and/or any other mobile telephone plus IP address combination that may be used to utilize the IP address of the cell phone. Alternatively and/or in addition, the SMS address may be used.

In one embodiment of the invention, the software processes and system determines and builds the actual messaging address (email, text, SMS, and the like) to send messages to the mobile device by the user only selecting and/or providing the communications network and the telephone number. Thus, the present invention advantageously simplifies the process for mobile or wireless device users to register and/or provide contact information, and therefore, beneficially increases the number of individuals that can effectively and easily register for a communication service.

In another embodiment, the present invention facilitates the ability for potential users to signup for the service of receiving, for example, trivia, upgrades and/or text messages via a user sign up device or apparatus. In one embodiment, the user sign up sheet includes numbers and/or circles that can be filled in like a grid, where the user can fill in or cover the numbers that identify their portable number. In addition, the user can check off the specific network carrier from a list of network carriers, or simply enter their specific network carrier. The user sign up sheet may be done electronically via a computer and user interface as described above, or may initially be filled out by a user via, for example, a piece of paper and then later entered into the computer system of the present invention.

In another embodiment of the invention, the system and method of the present invention is capable of re-locating a patron via the mobile address that was previously provided, even if the patron has changed wireless carriers. For example, in one embodiment, with the recent feature of mobile phone by the FCC, we have determined that a significant number of mobile phone users are likely never to change their number/address, and therefore, the system and method of the present invention is able to send text messages and/or email to all network addresses using the telephone number of the user if the system suspects that the previously provided network by the user is no longer being used. In this embodiment, the user can optionally respond to the message and/or network broadcast message, confirming that one of the messages has been received. For example, in at least one embodiment, the present invention uses the cell phone number and IP address combination, e.g., 2029422785@verizon.net, or 3016814455@attwireless.com, and/or any other mobile telephone plus IP address combination that may be used to utilize the IP address of the cell phone. Alternatively and/or in addition, the SMS address may be used.

In another embodiment of the message, whenever a user wants to contact a mobile phone, mobile wireless device or even computer based, via for example, an Internet based account, wants to contact another mobile wireless device user, the present invention provides a transmission device, for example, via the Internet or individual models/mobile phones used for each of the networks to broadcast the message on all networks. Advantageously, in accordance with this embodiment, since the user is likely to maintain the same telephone number, their data or text messaging address will be their telephone number and one of the few network addresses. This type of broadcast message can happen anytime, and even for voice communication when the user of the wireless device needs to receive a data, text and/or voice message.

In another alternative embodiment of the invention, as described previously, the invention may be used by a patron to obtain specific data or information regarding sports or venue related information of interest. For example, patrons may communicate with the system and forward a player jersey number or number of racecar during an event such as a baseball game, football game, racing event such as Nascar, to obtain additional information including current statistics and past statistics. The present invention can then optionally sent statistics throughout the game or event to the patron without the patron requesting, for example, at specific time intervals or after notable achievements during the event, such as a home run, touch down, $7^{th}$ inning stretch, half time, number of laps traveled, and the like.

Thus, the present invention includes many variations in the type of information a user may receive, whether specifically checked into a venue or registered for the service for a particular event. In addition, the present invention includes various processes and systems for ensuring delivery of messages to patrons that have requested the service or merely sending messages that a patron may be interested in receiving.

In another embodiment of the invention, the matching and/or networking system includes the ability to contact and/or notify the users to coordinate the meeting using any one of a plurality of communication methods including text messaging, email and/or instant messaging, with the additional advantage of transmitting pictures, video and/or other data that provides additional information regarding the other person that has been suggested for the match and/or network. In one implementation of this embodiment, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. For example, different message transmit and/or receive formats may be used depending on the system. The present invention beneficially parses the various different formats to obtain the necessary information for the communications described herein. In addition, the represent invention formats the messages for the different wireless devices so that the messages may be appropriately received even though different devices and/or communication networks have different messaging formats. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In accordance with another embodiment of the invention, the matching and/or networking system includes the option of permitting a subscriber to notify the system when they are ready for a potential meeting and/or match. Once the matching and/or networking system is notified of the subscriber requesting the match, the system is then capable of either tracking the user though a positioning system such as GPS, permitting the user to register at predetermined locations upon user initiation such as via Bluetooth, RFID, infrared, and the like. In accordance with this embodiment, the subscribers are not being constantly tracked, and therefore, maintain an additional level of privacy. In alternative embodiment, the present invention continuously tracks the subscribers without specifically requesting to be matched. In this alternative embodiment, the subscriber is provided with less privacy because they may be notified of a specific match even though they might not be interested in the match and/or meeting at that time.

In an alternative embodiment, the present invention provides subscribers with the ability to accept/reject the match before each of the subscribers receive personal information of the other and/or before the date/match has been arranged with at minimum a meeting location. In this embodiment, the invention requires that both users accept the match and/or date prior to notifying the subscribers of the contact information for each subscriber. Therefore, subscribers can optionally request additional information from the system of the present invention, even multiple times, to better understand the potential date and/or match before accepting, and importantly, before the other subscriber is provided contact information and/or a meeting location of the subscriber. In the embodiment where the present invention merely provides the meeting location, the present invention advantageously does not provide the subscribers contact information and/or other personal information before the match/date. Advantageously, in accordance with this embodiment of the invention, subscribers never receive personalized or personal contact information unless the subscribers, after meeting in person, agree to exchange such information.

In another embodiment of the invention, the dating and/or networking system provides subscribers the functionality to email, instant message and/or text message at least one additional piece of personal information and/or questions, optionally directly to each other or via the system anonymously, to obtain additional information that may be more relevant than the user profile or information from the user profile that was used to make the initial date/match.

In another embodiment of the dating and/or matching system of the present invention, the system optionally provides automatic and/or user initiated registration in a particular establishment and/or geographic location, which can be used instead of a location determination system such as GPS, or together with such system. This form of registration may be even more precise than GPS because it confirms a subscriber's presence within a specific store, establishment, entertainment establishment, restaurant, and the like. Thus, in these embodiments, the subscriber either initiates the registration as described above, or alternatively, if the subscriber optionally sets the wireless device to automatic registration based on the appearance at a predetermined registration area and/or location, the subscriber will be automatically registered to receive communications regarding a potential match/date.

In an alternative embodiment of the present invention, once the dating and/or matching system determines that a potential match/date has been detected, the system optionally notifies the different subscribers and asks whether they want to continue to participate in the matching/dating program. When both, some and/or all subscribers agree to participate, the present invention can forward to each subscriber automatically the information that each subscriber shares substantially in common and/or the information that was responsible for the match/date between the subscribers. In this embodiment of the invention, the subscribers will know immediately the information that should be most relevant in making the match/date and can determine whether to actually agree to either contact or send the other subscriber additional information and/or arrange to meet the subscriber at a pre-designated location.

In an alternative embodiment of the present invention, the present invention optionally includes the ability to recommend a potential meeting place for the subscribers to meet after determining that the subscribers have agreed to participate in the date/meeting. In this embodiment, the present invention advantageously determines the location based on, for example, subscriber preferences, geographic location that is preferential for at least one of the subscribers and/or both subscribers, predetermined location where, for example, a sponsor will receive patronage and/or provide a discount for the subscribers and/or actual pay the organizer of the dating/matching system an advertising fee to promote their sponsorship. Accordingly, the present invention advantageously determines not only a potential match/date, but advantageously suggests, recommends and/or determines a specific location and/or geographic location and/or restaurant, clothing store, zoo, museum, and/or other suitable location for the subscribers to meet and optionally based on geographic distance and/or location.

Additional dating and/or matching features and/or differentiators of the networking and/or dating system of the present invention include one or more fo the following:

Wireless messaging platform supports interactive messaging

Wireless messaging platform provides simultaneous parallel applications to run without collision Multiple wireless initiatives or topics run without conflict Different initiatives or topics may be user specific or selectable While each initiative runs independently, there can be overlap in terms of customer base Platform is flexible to add/remove initiatives quickly and efficiently One wireless carrier/network can be a dating/matching sponsor and advertise on the wireless device and/or network of another wireless carrier/network Contact members to notify of the match/date to allow members to either directly contact each other or send additional information via, for example, text messaging, email, instant messaging, such as pictures, video, and the like Contact members or wait for request from members to participate in match/date initiative; can then automatically track member via GPS instead of constantly tracking member all the time, thereby increasing privacy of member Contact each subscriber that is being offered the date/match and obtain approval for the match prior to actually notifying potential members that match has been made Contact users after initial match has been conditionally approved, and provides users the capability to request additional information, such as personal information from the other member or other members which the requestor still wants to know before finally accepting the date/match Members can register or "check-in" at predetermined locations and/or establishments which is one additional level of specificity, for example, with regard to the location where a member is that may be interested in matching; For example, two or more members may actually be in the same restaurant where they can be informed of one or more other subscribers being present; members can register via sending a message to the system via text message, email, RFID, Bluetooth, and the like, either by initiating a registration or automatically Contact members after initial match has been conditionally approved and exchange, optionally automatically, profile information that was significant in making the match/date and/or other important information regarding a match/date that a member may want to know before finally accepting the match/date and/or information the members may want to know that is geared particularly for a first date, e.g., likes/dislikes, common interests, favorite foods, wines, alcoholic beverages, and the like Contact members to suggest and/or recommend and/or arrange meeting place based on, for example, geographic location, common interests/sports, common food tastes, common beverage tastes, common entertainment preferences and/or sponsors willing to, or interested in, being utilized for the match/date for the suggestion and/or recommendation, and optionally providing the members a discount and/or compensating by the sponsor to the networking and/or dating system proprietor for the advertising and/or recommendation to visit that sponsor Wireless messaging platform includes a protocol conversion server functioning to interface with a variety of wireless networks having different messaging characteristics for both transmitting and receiving messages, and parsing the different message formats for the content from a received message, and transmitting a message to a plurality of different networks and/or devices having different messaging and/or interface capabilities and/or functionality Contact members with a wireless consent form indicating that the matching/dating system and/or the members participating in the match/date have generally consented to potential cohabitation optionally without any recourse to the other party. Alternatively, the members may be contacted with other types of informed consent forms with limited recourse for acts and/or aggressive acts that are clearly assaults, but not sexual related misconduct or sexual related crimes that are felonious in nature carrying a high penalty/sentence. Alternatively, members may be presented with consent forms that eliminate any criminal penalty, but do not foreclose the possibility of civil lawsuits for damages relating to torts, and the like As another alternative and/or in addition thereto, members may be presented with consent forms that eliminate any civil penalty, but do not foreclose the possibility of criminal lawsuits for criminal type activities, perhaps with the exception of the most severe sexual crimes such as rape and/or sexual assault that carry significant prison time.

For example, athletes, celebrities, high worth individuals, or even average individuals, male or female, may be interested in the wireless consent initiative because that allows them more flexibility to meet a variety of individuals without the worry of later being sued. In additional alternative embodiments, broadcast messages may be transmitted to numerous individual that may be interested in meeting and/or dating a celebrity or predetermined individual or individuals. In this embodiment, the optimum matching individual or individuals may be selected to meet with the celebrity, celebrities, and the like, while utilizing the informed consent feature of the present invention. In another alternative embodiment, an individual or individuals may be randomly selected as part of a match or date, based on a lottery or other competition to meet or date a specific individual or individuals.

Additional optional hardware and software requirements are as follows for one or more embodiments of the present invention:

System Capabilities

Platform supports interactive messaging

Platform provides simultaneous parallel applications to run without collision

Multiple wireless initiatives or topics run without conflict

Different initiatives or topics may be user specific or selectable

While each initiative runs independently, there can be overlap in terms of customer base Platform is flexible to add/remove initiatives quickly and efficiently Wireless Initiatives Interactive trivia with fans inside and outside of the stadium Targeted messaging, e.g., targeted advertising Broadcast messaging, e.g., general advertising Interactive messaging, e.g., with concessions Profiling for each initiative or topic, e.g., based on network operator Urgent and emergency messaging Specific initiative: discounts for concessions and/or memorabilia Specific initiative: invite patrons to different activities before, during or after game, e.g., player loyalty, family activities, etc.

Specific initiative: seating upgrade program

Specific initiative: messaging patrons in one section and separate messaging to patrons in another section Specific initiative: messaging parent of a missing child Special initiative: dating where patrons can keep their seats to return to them, or their seats are re-allocated. In alternative embodiments, the patrons switch seats instead of moving to empty seats, either for the entire game or only a portion thereof with other patrons for match making possibilities.

Functional Specifications

Front end for user signup and profiling-secure site—for example, modeled after www.mlb.com, include one or more of:

type of seats does the customer want for upgrade (decks and range of sections)

information for dating concession profile capability for additional profile information validate user by sending message to device upon sign up auto append of network information to phone number during signup login and password protected site frames on website or interface that can be easily configured to have look and feel, for example, of particular baseball team capability for space on screen for advertising opportunity that can easily be modified and relatively dynamic capability to handle lost passwords web page or interface where customers with season tickets can mark a calendar with the seats they want to keep and the ones they are interested in freeing up for early sale or upgrade.

The optional Front End of the present invention used for administration and setting up parameter for each application, optionally includes a secure site, with one or more of the following:

application email address and password minutes for all the configuration parameters and/or functionality number of threads for each application for upgrades, at least one of releasing customers old seat immediately, or it until the customer approves of the release, or holding the customer's seat for a predetermined portion or all of the game, for example, in the dating functionality)

set schedule for games section rating setup, and seat upgrade pricing revenue allocation model provide a number of retries if message send failure Concessions The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

Concession Wireless Initiative

Purchased via cell phone

Web registration for preferences

Targeted concession offers

Confirmation that purchase is ready

Delivered to seat or ready for expedited pickup

Customer convenience: system identifies closest concessions to customer

Customer convenience: system determines concessions with short wait

Each concession labeled with a number for customer identification and fulfillment Customers can request menu, or register for each game to receive menu around game time via mobile device GPS can be used effectively to inform customer of closest concession stand to pickup order, and/or customer can provide section number and/or seat location for system to identify most convenient concession stand Most convenient concession stand can be determined based on one or more, or combination of, predetermined criteria, such as, closest concession location, shortest wait in line, specific item being ordered, and the like.

Interactive messaging, e.g., with concessions

Specific initiative: discounts for concessions and/or memorabilia

The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

In one alternative embodiment, the following message exchanges may be used:

First Message

"In Game" Concessions

Menu will be sent soon!

Reply with #, item short form and seating section

Ex: BE=beer

Reply 3BE for 3 beers

408SEC for section 408

Powered by NEXTEL

Second Message (paper menu?)

Menu

BE=Beer; CO=Coke; DCO=Diet Coke

HD=Hot Dog; BUR=Burger

TA=Taco/Salsa; PO=Popcorn

FF=French Fries; CH=Chips

PZ=Pretzel; PT=Peanut

LEM=Lemon Ice

Third Message

Order received!

Summary:

3 HD @ $3=$9

2CO @ $3=$6

2 LEM @ $3.50=$7

Total=$22

Reply Y to ACCEPT

Credit Card charged

N to CANCEL

Fourth Message

Thank you for ordering!

Your order has been confirmed!

Confirm # REIF1001

Powered by: THE SPORTS AUTHORITY!

Fifth Message

ORDER READY

Bring Confirm # REIF1001 to Concession # 33 by sect # 212

$2 off NIKE baseball gloves

Bring #NIKE305 and game ticket to

Any SPORTS AUTHORITY!

In another embodiment of the invention used in concessions initiative, the concession attendant receives the confirmation number or other identifying information from the customer when picking up the concessions. The concessions attendant enters the confirmation number or other identifying information when ready or optionally clicks on the order on the computer screen via a concessions interface associated therewith. From there, the order is then cleared from the system with respect to orders that require fulfillment, advantageously allowing the workers to streamline their work activities in the concessions. In an alternative embodiment, the concessions are actually delivered to the customer using the sutomer provided seating information, either provided by the customer through, for example, the wireless device or other registration and/or notification process, or even via a telephone call or automated attendant to associate with the order.

In another embodiment of the invention, the concessions menu is advantageously only delivered to customers that have entered the stadium via a location determination system, and/or checked into the stadium via a ticket reader/scanner. In alternative embodiments, all customers that have registered for the concessions service will receive an introductory message. Thus, customers that are not attending the game need only reply with a request to terminate the concessions service for that event and/or game.

In an alternative embodiment, the customer is advantageously directed to closest concessions via, for example, GPS chip in phone or by knowing where the customer sits at check in, or by having the customer input their seat location or location where they would like to pickup the concessions.

In another embodiment of the invention, we have determined that some mobile phones will utilize different transmit and receive addresses, and therefore, a user may not know how to appropriately register to be a subscriber for one or more wireless initiatives. For example, we have determined that some mobile phone networks utilize slightly different or different electronic addresses for the transmitting and receiving of electronic messages. For example, for the Research In Motion (RIM) Blackberry communication service, the mobile device is assigned a desktop email address. In one configuration of Blackberry, the mobile device only has one address. However, in the non-integrated configuration, the mobile device actually has a separate address when transmitting from the receive address.

In accordance with this embodiment of the invention, the user registers by providing their mobile phone number and optionally a network carrier for same. In this embodiment, the mobile phone user registers with their phone number and optionally wireless network provider. The registration system of the present invention then sends a message to the mobile device, requesting that the mobile device respond, optionally with a predetermined code and/or predetermined message. The mobile device then responds to the registration system, and the registration system corresponds the mobile device response with the original registered mobile address, thereby completing the registration process by ensuring that responses received from the mobile device can be mapped appropriately to the mobile subscriber. In the embodiment where the mobile user is requested to provide a predetermined code and/or message, the registration system uses the predetermined code to map the mobile phone response potentially having a different address with the transmit address provided by the user.

Dating, Matchmaking and/or Networking

In another embodiment of the invention, patrons are provided the opportunity to meet others in the venue or at a predesignated location near or away from the venue using standard matching rules. In one embodiment, the presence of the user is detected when entering the stadium, for example, via the ticket entrance systems. In another embodiment, the presence of the patron is detected or determined based on a message that is send to the user, for example, either right before, during or after the game. In this embodiment, the user can be prompted with a request whether they would like to participate in the matchmaking, dating and/or networking program.

For example, potential business or social partners may be selected or prompted for networking or dating. When the user responds yes, in this embodiment, their current seat is irrelevant if that seat is not to be released for another patron. Therefore, the system need only select a new set of seats for the networking and/or dating for the patrons, transmit the patrons the additional new seats via, for example, a wireless ticket, update the venue seating database for subsequent verification by the ushers when seating the patrons. The patrons may then proceed to the new location and have a meeting or date, and then return to their original seats if desired.

In another embodiment, a "burnt bridge" approach or feature is provided where the original seats for the patrons that are meeting are then released for other upgrade and/or networking programs. In this embodiment, the original seat of the patron must be known for example, via check-in procedure, registration for the program in advance for example over the web registration process or other registration process, or via the patron responding to the system with their wireless device of their current seat location. Alternate combinations or modifications of the above embodiments is also used.

Trivia

In the alternative embodiment of providing the user trivia information, based on registration and/or location, for example, while attending the game, watching the game at home, or any time prior to or after the game, the user may be provided with questions, as described above, to answer as part of a tournament and/or to be eligible for prizes, awards, and the like. In one embodiment, a section or portion of the users are targeted for the questions together, while other sections and/or portions of the users are targeted at a time period thereafter, for example, 1 minute later, to stagger the communication and transmission of data, thereby reducing congestion and/or unnecessary hardware to accomplish the transmission and acceptance of information to/from the patron.

In one embodiment, while all the questions are staggered over a predetermined period of time to the patrons, whether limited to patrons in the stadium, out of the stadium and/or both, the patrons are not notified whether their answer is correct until after all questions have been transmitted, and all patrons are provided the opportunity and/or sufficient time to respond. Once that predetermined time period has elapsed, the patrons will be notified whether their answer was correct, and whether they are still in the tournament. In optional embodiments, a predetermined time period will again elapse until new questions are sent and the tournament continues.

Optional Oracle or My SQL Database

In one embodiment of the invention, an Oracle or My SQL Database is used in connection with the present invention. In one embodiment, the result set is set to be proportionally with respect to the number of users and/or data that will be stored in the system. In another embodiment, the database is optionally partitioned for specific games and/or initiatives or groups of games and/or initiatives. The system is preferably thread safe when running the games and/or initiatives. The system is optionally integrated with Credit Card for payment, and/or integrated with the venue ticket system and/or point of sale system to optionally determine who came in and when into the venue. In another embodiment, the present invention maintains and updates financial balances for users, such as patrons and stadiums. In alternative embodiments, secure interaction with ushers and an interactive kiosk is provided.

The present invention optionally provides any standard algorithm for partitioning of group of seats and users, for example, for system resource allocation, load balancing and/or division of system functionality. In alternative embodiments, a local kiosk for the stadium and/or venue is provided where the user can enter information, such as register for one or more initiatives and/or programs. In alternative embodiments, the system of the present invention includes the capability of offering for sale seats which are not currently sold via messaging to wireless devices, such as text messaging to mobile phones, or other messaging and/or wireless communication to wireless devices, and consideration. In alternative embodiments of the invention, standard algorithms such as used in the airline industry may be used to overbook seats for the venue, and consideration.

In alternative embodiment of the invention, instant messaging or any type of communication method can be used in the present invention, include local and/or global networks, such as the Internet, LANs, WANs, WAP, 811.02a, 802.11b, 802.11g networks, and the like.

Messaging Software Requirements

Trivia and/or other messaging products/initiatives are Java applications that run in a J2EE application server and utilize a JDBC 2.0 compliant relational database. There are typically open source options available for system support. Currently for development and test environments we utilize are desktop environments running Windows 2000 with the open source options below. The draw back is that open source options typically don't provide formal system support approaches, although we have found the software to be very reliable and would recommend this approach for early stage pilots. Should the customer prefer purchase software options for these components are provided as well.

I. Server Software Specifications

Alternative A—Open Source Approach (1) Web/Application Server—Tomcat 4.1.18

(2) Database—MySQL 4.0

(3) Windows 2000 Server for each server

Alternative B—Purchased Product Approach (1) Application Server—Websphere Application Server 5.0

(2) Database—Oracle 9i DBMS (3) Windows 2000 Server for each server

II. Server Hardware Specifications (4) Each of the HW Servers specification:
- (i) 2xCPU—P4 2.4 GHz Xeon
- (ii) 2 GB RAM
- (iii) Monitor
- (iv) CD ROM
- (v) Floppy Drive
- (vi) Hard Drive depending on volume (see below)

III. Communication Specifications (5) POP3 Account and SMTP server accounts that can support number of active subscribers (6) Dedicated T1 access to POP3 and SMTP provider IV. Hardware and Software Sizing Configurations Phase 1:

1K-10K subscribers and players during the game

Two Servers

Server 1—runs Web/Application Server for the website and the Trivia Application

Server 2—runs the Database server (20 Gig)

Phase 2:

10K-25K subscribers and players during the game

Server 1—runs Application Server for the Website front end

Servers 2 and 3 (2 Servers)—run the Application Server for Trivia Application (two servers are used handle load balancing)

Server 4—runs the Database server (50 gig) (Level 1 RAID 2×50G Array)

(Server 5—used as a backup to server 4—depending upon Reliability requirements)

Phase 3:

25K-50K subscribers and players during the game

Server 1—runs Application Server to run the Website front end

Servers 2, 3, 4 and 5—run the Application Server for Trivia Application (four servers are used to handle load balancing with hardware and software clustering)

Server 6—Database Server—150 gig (Level 0+1 RAID 6*50G Array)

(Server 7—used as a backup to server 6—depending upon reliability requirements).

In one alternative embodiment, as part of the sign up for trivia the system optionally asks the general admission or season ticket holders to input their seats to simplify how the system obtains information where the patron is being seated when they come to the game. In an alternative embodiment, the system obtains this information from the stadium database system, kiosk where the patron can enter the information at the stadium and/or via the point of sales system by the service personnel or attendant that is selling the tickets. Using any of the above methods, once the system knows where the patron is/are seating when present at the game, the system can then target sections of the stadium for, for example, the trivia quiz or other service/offering to the patrons.

Examples of different sections that can be separately targeted include for baseball, behind first base line first, behind home plate second, first base line third—all lower deck; same sections for upper deck and bleachers. Other sports may include football, hockey, soccer, basketball, and the like. In accordance with this embodiment, targeting different sections over different periods of time, thereby preventing a long delay to receive answers once the question is transmitted, may minimize collusion among patrons.

Thus, by segmenting the stadium over a few minutes in accordance with one embodiment of the invention, the present invention may increase the window of transmission to, for example, 2 minutes or more for the first round. As the rounds get successively smaller, the present invention will transmit messages faster. The present invention also provides optional winners for different sections of the field. In addition, the section winners can further optionally compete against each other, for example, the first class seating winner can further compete against the bleachers winner, and the like.

As discussed above, one or more of the above alternative embodiments may be incorporated into the embodiments described above, and/or any of the embodiments discussed below. Furthermore, any of the embodiments of the present invention may be used for any reserved seating event.

Figure 31:
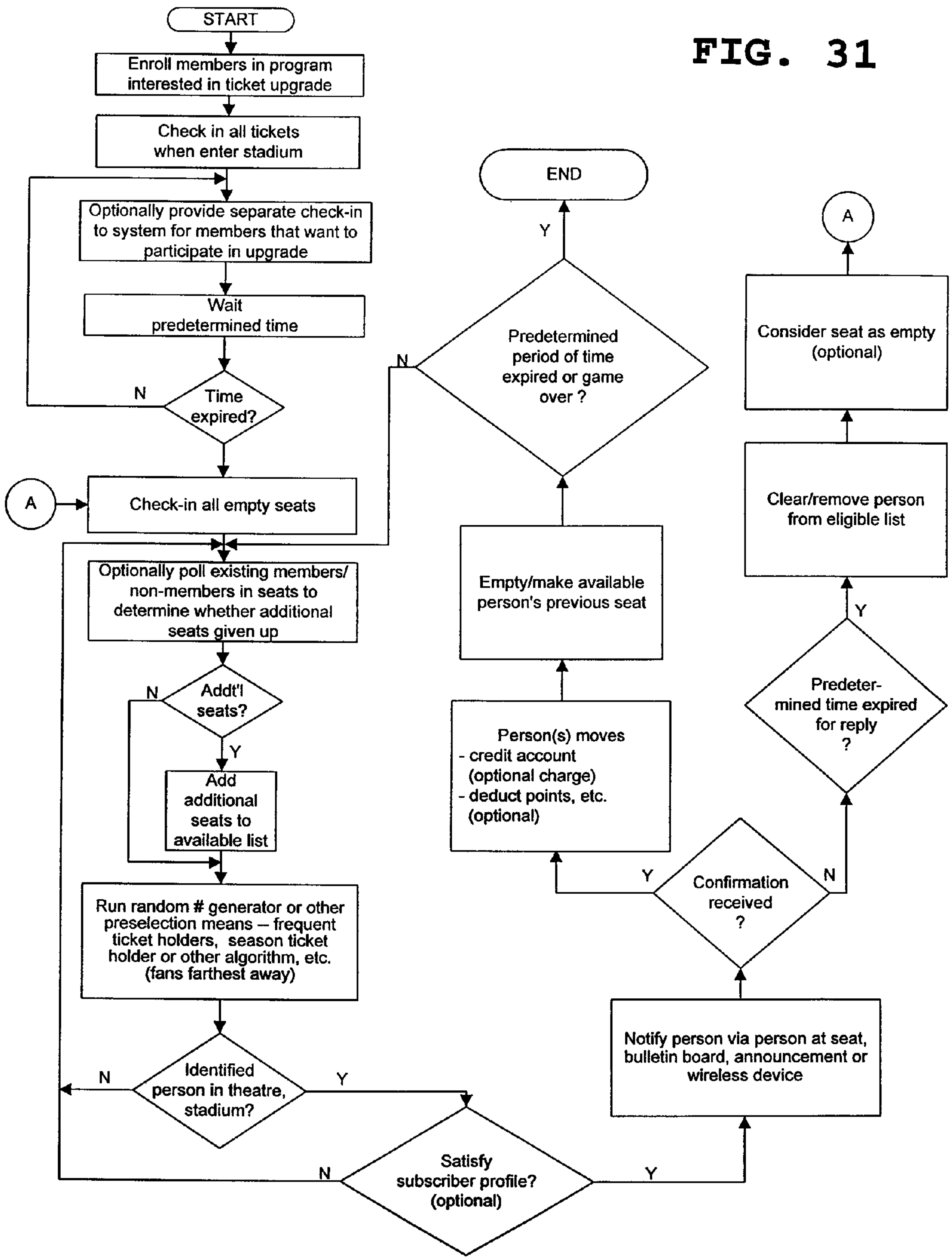

FIG. 31 is a flowchart of a ninth embodiment of the invention. In FIG. 31, the process begins by enrolling members in the program that are interested in the ticket upgrade. Tickets are checked in, for example, as the patrons enter the reserved seating area, such as a stadium or theater, through, for example, bar code readers, scanners, infrared readers, and/or manually or other method where the patron is checked in, either at the gate, seat or other location. An optional separate check in area is provided for patrons that want to participate in the upgrade program. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seats for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, a standard bidding process, or other predetermined process.

An optional polling process to poll existing members and non-members in seats to whether additional seats are available. That is, in another optional embodiment of the present invention, non-members may also make their seats available for re-allocation/re-sale at any point in the process. In this additional polling process, the next step is to determine whether additional seats have been made available. If additional seats have been made available, then these additional seats are added to the list of available seats.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or more means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

If no confirmation is received from the patron for a predetermined period of time, the re-allocation process continues to wait until the predetermined period of time has expired. Once the predetermined period of time has expired and there is no response received from the patron provided with the option of changing their seat, the patron is cleared or removed from the eligible list, and the seat is considered or assigned empty status for the re-allocation algorithm to be again implemented.

If the patron accepts and a confirmation is received, payment of money or other means may be effectuated on the spot via the wireless device, credit card, debit card, points, and the like, and the patron may now move to the other seat. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

Of course, the re-allocation algorithm does not have to be run or implemented one patron at a time, but may be run to re-allocate or re-assign a plurality of patrons. If one patron or higher priority patron does not accept, then the next already generated patron may be queried to determine whether the next patron desires the seat re-allocation. Further, the system optionally downloads instructions on how to get to the new location, and can provide step-by-step instructions using an optional standard global positioning system (GPS) incorporated in, or as a separate accessory to, the wireless device.

In accordance with the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that may be in the vicinity of the stadium but were unable to get seats. Since the present invention re-allocates and/or sells tickets very near to game time in accordance with one embodiment, the patron must be in the general vicinity of the stadium to take advantage of this embodiment of the invention.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron to help the patron decide the quality of the upgrade and whether to accept.

In one alternative embodiment, if the patron that has their ticket re-allocated in error, e.g., because the patron did not show up to the event based on the predetermined criteria but the patron was still planning on attending because they forgot about their seat being re-allocated, the system can re-allocate seats immediately upon the checking in of the patron and notify them that their seats have changed because they are late. In this situation, the stadium/venue might decide to further upgrade the patrons because of the mistake.

In accordance with one embodiment of the present invention, the process of the present invention specifically reserves seats of the highest or very high rating that are considered preferred, in the event a patron's seat is re-allocated prematurely or erroneously. In this situation, the patron who has had their seat re-allocated because they will likely receive an even better seat as a result of the mistaken (stadium or patron) or premature seat re-allocation.

In another embodiment of the present invention, as patrons are entering the venue or stadium, they are provided advantageously with a map of the stadium so patrons can analyze the potential upgrade to make a decision whether the upgraded seats are sufficiently good or of value to warrant the patron moving and/or paying for the additional upgrade. By handing the patron the map of the stadium, the process of the present invention is not required to transmit a detailed schematic to the patron's wireless device which would not normally be able to effectively permit the patron to evaluate the proposed upgrade seats. The map that is handed out may optionally include information for patrons on where to register for the upgrade and/or additional advertisement opportunities.

In one alternative embodiment, the patron that has purchased the ticket, for example, a season ticket holder, may advise the stadium that for a particular game, set of games or all games, they do not want their seats to be re-allocated, and perhaps, an additional fee is assessed for this type of patron. If the stadium provides the ability for the patron to selectively opt out of the seat re-allocation, the patron can, for example, connect to the system via the Internet, public switched telephone network, cellular network, and the like, and notify the system that they do not want their ticket re-allocated, for example, because they are coming late to the event. Other means of notifying the system and/or other reasons may be utilized in connection with the present invention.

In another alternative embodiment, the system provides patrons the ability to individually select when their tickets may be re-allocated. For example, one patron may prefer to only give up their ticket if they are late to the game by 15 minutes, while another patron may be willing to give up their ticket if they have not arrived 15 minutes before the game. In alternative embodiments, the stadium may provide incentives for the patron to have their ticket re-allocated prior to the game because it increases the stadiums chances of re-allocating/re-selling the ticket.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provide additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In an alternative embodiment, the system determines priority of re-allocation of seats based first upon patrons that have seats that may also be re-allocated. That is, the systems attempts to maximize the number of re-allocations by prioritizing the re-allocation based upon seats that may be re-allocated after already being re-allocated. For example, if front row seats in a stadium are available to be re-allocated, in this alternative embodiment, patrons that are in the next closest section for example on the field level would be upgraded first to those seats. Then, patrons with less preferred seats, for example, in the upper deck would be re-allocated to the seats that have now become available from the patrons that have been upgraded to the front row. Thus, using this alternative priority scheme, the present invention maximizes the re-allocation numbers. Of course, this priority algorithm may be combined with additional factors, for example, relating to subscriber/patron value. As described above, additional factors may be utilized in the algorithm to determine the subscriber or set of subscribers to offer the upgrade.

In alternative embodiments, patrons in the vicinity of the upgraded and re-allocated patrons may optionally rate the upgraded patron, for example, for appropriate behavior, wearing of excessively large hats, drunkenness behavior, and the like. These ratings may then be taken into account in the re-allocation algorithm for future upgrades to the patron.

In alternative embodiments, the patrons eligible for the upgrade may be notified using standard email communications over a wireless device, mobile telephone, and/or other standard communication means. For example, standard text-to-voice and/or voice-to-text communications may be used to contact the patron to evaluate whether an upgrade will be accepted and to actually accept the upgrade.

In another embodiment of the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that have already purchased tickets in the vicinity of the stadium but were unable to get seats and/or may be in the vicinity of the stadium but were unable to get seats. Since the present invention re-allocates and/or sells tickets at any time prior to and/or after beginning of game time in accordance with one embodiment, the patron may be in the general vicinity of the stadium to take advantage of this embodiment of the invention or even at any location when being offered upgrades and/or seats well in advance of the game. For example, the present invention can upgrade or sell tickets to patrons well in advance of the game since it advantageously is permitted or has the authority to resell tickets either via ticket holders that do not show up during the game and/or, for example, season ticket holders that have authorized the stadium in advance to resell their tickets based on predetermined criteria, for example, when the season ticket holder notifies the stadium that they will not be present at next weeks game.

In one optional embodiment of the invention, the patron presents the usher with the confirmation number which the usher can enter into a wireless device using a local or private wireless network, or can simply use a walkie talkie or telephone to call the dispatcher to confirm the upgrade and/or new seats using the customer provided confirmation number. The dispatcher will have access to the system to enter the confirmation number to confirm the validity of the upgrade. Alternatively, a patron will retain their old ticket. The patron will give in the old ticket to the usher which is scanned or barcoded by the usher for immediate identification of new seats and used in place of, or in addition to, confirmation number.

Of course, the confirmation may optionally be made via customer name with an appropriate identification card or other information. Further, alternative methods may be used to verify that the confirmation number and/or ticket being used by the patron is valid. For example, the patron may be equipped with a printing device associated with the wireless device or download an actual ticket on line from home prior to the game for the new ticket or upgrade. Alternatively, the patron may be equipped with an identifier card, optionally including a bar code with a unique identifier relating to the patron's account information and profile that can be scanned for additional convenience. Alternatively, a wireless device may be used to securely store this type of identification and/or account information.

In at least one alternative embodiment of the invention, the patron may comprise optionally a corporate account that has a number of tickets, for example, season tickets. In this embodiment, the corporate account may have associated therewith a plurality of email addresses or other communication addresses to transmit the seat or upgrade offer to a number of potential patrons that may rotate their attendance at the games. In accordance with this optional embodiment, multiple emails can be stored for a single user/corporate account, and the system may transmit individual messages to all email addresses, or may only transmit messages to individual patrons for corporate account that individually advise the system that they are associated with a particular ticket/bar code for a particular game and will be/are present at a particular game.

In an alternative embodiment, patrons may enter the stadium and subsequently inform the system that they are present and interested in an upgrade via a kiosk where the patron can scan a bar code and enter their customer number to be eligible for upgrades during the game. The system is then able to transmit a message to the customer, assuming that the customer has pre-registered with the system with the appropriate contact information. Alternatively, or in addition to individual use of a kiosk(s), the customer sales office may have a kiosk or additional functionality to enter the customer name and/or customer account and scan in the bar coded ticket on the spot to register each patron as they enter the stadium or venue.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron upon entry in the stadium to help the patron decide the quality of the upgrade and whether to accept when an offer is received by the patron at a predetermined time. The graphical map may comprise a small booklet with a map of the stadium showing seat locations, and optionally a game schedule.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provides additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In alternative embodiments, patrons in the vicinity of the upgraded and re-allocated patrons may optionally be eligible for a dating or matching service where patrons register and provide profile information to the system and/or through a third service provider dating service. Once the system knows that the patrons will be coming to the game and/or have actually checked in to the stadium, the system can then arrange for the two, four, etc. patrons to meet each other by allocating and/or re-allocating seats to the patrons together. Thus, based on profile information, customer request and availability, the system is able to upgrade or sell tickets to patrons to maximize their chances of meeting someone at the game. This optional feature provides significant potential enjoyment for the patrons participating in this dating or connection program. In accordance with this embodiment, one possible sequence of acceptance steps involves profile matching the two patrons (or groups of patrons) based on predetermined profile information; transmitting a first message to the first patron regarding availability of the second patron and requesting a conditional acceptance form the first patron; transmitting a second message to the second patron indicating that the first patron has conditionally accepted and request the second patron to accept; and when the second patron accepts before the first patron has rescinded the conditional acceptance, finalizing the upgrade and/or seat allocation for the first and second patrons. This embodiment of the invention is a complete reverse from typical dating and/or matchmaking services which attempt to develop detailed algorithms for the matching process because of the significant decision that exists in determining who to spend valuable time with. In accordance with the invention, patrons are already present at the game, and therefore, half or more than half the effort is already done. The remainder is to actually meet the other person which can be accomplished with profile criteria, whether or not the algorithms are very sophisticated.

In one embodiment, the patrons that are being matched have their original seats maintained and not made available for other upgrades in the event the matching does not work out early on. In this embodiment, one or both the patrons can return to their original seat. Hopefully, there will not be a significant argument of who would need to return to their original seat if an upgrade is actually performed. In addition, in accordance with this embodiment, the seats that are selected do not necessarily have to be better seats in the classical sense. That is, seats further away from other ticket holders might be considered preferred when matching two individuals for the first time. Alternatively, couple that would prefer a little more privacy or quieter game might request to be moved to a more isolated area. Alternatively, families with small children might prefer to be moved to a less busy area as well during the game where the children might be able to freely move around. All these scenarios and/or alternatives are possible in view of the present invention. The advantage of performing a match in a public setting is that the patrons do not have to worry about leaving or ending the date, and also do not have to worry that the other person will have their home address.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like.

In addition, this feature also optionally permits the patrons that have participated in the program to rate one another for future dates. For example, one patron can rate the conversational benefits of the second patron, the appearance of the second patron, the overall short term versus long terms relationship goals of the patron, and the like. These ratings may then be taken into account in the algorithm for future seat assignments, re-allocations and/or upgrades in the future for the first and second patrons, and all other patrons will now benefit with the additional profile information of the first and second patrons. The matching service may be for amusement or work related networking purposes, for example, to meet an executive that the patron currently works with or wishes to work with/sell in the future.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like. In addition, the system advantageously and optionally provides the feature of allowing patrons to text message one another directly, and/or exchange pictures via wireless email, text messaging, and other wireless devices that provide the standard capability of exchanging pictures, such a T Mobile and/or Sprint.

In alternative embodiments, the ticket holder can call in via a voice to text message, text message and/or email and let the stadium know early that they are not coming. In this manner the ticket holder obtains the convenience of the stadium or venue reselling their tickets in advance, thereby providing the venue with additional time to maximize the resale of the ticket.

In alternative embodiments, when the patron enters the stadium, they have their ticket barcoded or other device that detects their presence can be used such as infrared, Bluetooth, etc., and then they can become eligible for an upgrade. The patron can register in advance that they want to receive upgrades by providing their name, message address, e.g., email, telephone text message address, etc., and optionally their credit card or other payment mechanism for upgrades that actually cost money as opposed to free upgrades. In alternative embodiments, the patron can register at the ticket booth when purchasing their original ticket. In this scenario, the stadium representative can enter this information on behalf of, and with the permission of, the patron since the patron may already be providing their credit card, debit card, etc. to purchase the original tickets. Alternatively or in addition, a kiosk may be provided where the patron can enter their original ticket, e.g., scan in their original ticket and provide their name and text message information in the stadium to register for a one time upgrade for the game after purchasing, for example, a regular admission ticket.

In alternative embodiments, an usher can verify that the patron should be upgraded by the patron providing the confirmation number that may be transmitted in real-time by the system, and/or by the patron using their original confirmation number or original ticket with barcode or other identification means, such as a smart card, infrared reader, etc. that represents original ticket and presenting same to the user. The usher then needs only to scan in the original ticket and the system will verify whether the patron associated with the original ticket is valid and whether the upgrade is valid.

In alternative embodiments, a warning message may be sent to the ticket holder that has not shown up to game warning them that if they do not respond within a certain time period that their seat will be re-allocated or re-assigned to another patron. Similarly, a release message may be sent to the ticket holder after their seat has actually been released and/or re-allocated, thereby notifying the patron that if they change their mind in attending the game, they will have to obtain an additional ticket. In alternative embodiments, the ticket holder that has their seat released and re-allocated can be themselves re-allocated a similar, worse or better seat, depending on, for example, their subscriber value and/or other criteria. For example, if the patron is provided a better seat, this will encourage them to more readily give up their seats in the future even if they are attending the game. On the other hand, if the patron is provided a worse seat, then this encourages them not to artificially give up or have their seat released when attending the game. Accordingly, the present invention is designed to deal with various behavioral patterns of specific ticket holders, and may optionally and advantageously be a ticket holder specific with respect to various criteria for re-assigning, releasing, selling and/or re-allocating tickets.

In alternative embodiments, the system transmits to the ticket holder a welcome message after being upgraded and after having being moved to a new upgraded seat location. In one embodiment, the system identifies that the patron has been successfully upgraded after the patron provides the usher with a confirmation number or original ticket, which is then verified by the usher and system.

In alternative embodiments, the system, after having identified which patrons have checked into the stadium and/or have been upgraded, transmits a trivia question and/or additional advertisements to all patrons attending the game. In alternative embodiments, the information is transmitted to both patrons that are attending the game and additional patrons that have registered in the past to receive information but that are not attending the game. The participants can, for example, answer trivia questions and respond with their wireless device. Depending on whether the patron is attending the game or not, the system may determine to offer or deal with each of the patrons differently. For example, for patrons at the game, winners may be successively determined and narrowed, as patrons successfully and unsuccessfully answer questions, round after round of questions in a "spelling bee" format. For patrons that are not attending the game, winners may be declared, or statistics provided to the broadcast station that can be aired on television. In yet additional alternative embodiments, instead of transmitting information/questions to the patrons via the wireless device, the information/questions are displayed on the stadium billboard for patrons at the game and/or on television for patrons that are watching the game on television. The patron can then merely respond via the device, e.g., the telephone accordingly via a voice-to-text system or via other mobile devices via text messaging.

In alternative embodiments, the present invention provides the advantage of additional advertising sponsorship to the venue. For example, in one embodiment, the venue is partitioned into different locations that may be assigned to different sponsors. In one embodiment, the sponsor that provides the most value may be assigned a certain number of premium seats that are not available to other sponsors.

For example, the sponsor may offer a discount on the upgrade if you are a Verizon or Verizon Wireless customer or they credit your cell account for each seat upgrade or you get say 30 free minutes, etc. In alternative embodiments, the present invention provides the advantage of one wireless provider to advertise on another wireless providers mobile phone or wireless device. For example, if Verizon Wireless is a sponsor of the upgrade system for a particular stadium, the present invention will still work with, for example, AT&T, SPRINT, and CINGULAR customers. An advertisement message sent with the upgrade offer may read on the AT&T phone, "brought to you by Verizon Wireless." In an alternative embodiment of the present invention, text messaging is optionally used for mobile phones to perform the message communication of the present invention. The user is only required, in one embodiment, to reply or respond with a "Yes" to accept the upgrade offer since the user has advantageously pre-registered with the system, thereby minimizing the required communication/input by the user. In an alternative embodiment, the user, instead of pre-registering with the system, is charged on their wireless or even regular telephone number bill when they accept the upgrade offer. Thus, the wireless system that either administers the user's regular or wireless account or the upgrade sponsor may be responsible for actually billing the customer in this alternative embodiment.

In the alternative embodiment when text messaging is optionally used alone or in combination with other communication methods, the system provides the additional advantage of maximizing bandwidth usage by not requiring use of bandwidth on the wireless voice system, thereby maximizing system resources.

In another alternative embodiment, the present invention optionally and advantageously provides a security and/or safety feature in the event of, for example, a minor event where a parent gets separated from a child, a disaster or other event that might require evacuation of the stadium. In one embodiment, the person needing help provides their name to an attendant that can search the system for the contact information of their companion/parent. The system can thereafter send an email and/or text message to the companion/parent regarding the status of that person and provide instructions for meeting that person or arranging help, authorizing medical procedures, and the like. In another embodiment, the person requiring help, e.g., a child provides the attendant or kiosk with their ticket which can, e.g., scan the bar code or other reader system. The system can either automatically provide a text message to the parent who can then reply to the child/attendant via the kiosk to meet the child.

Alternatively, the parent can be instructed to meet the child at a predetermined location, and to stop looking for the child because the child was found. Thus, for this example, the person who is lost or separated from their party can notify security or access a kiosk. Security can, for example, notify the parent that child is in safe custody, and should not search the stadium, and therefore, meet outside stadium in a prespecified safe place.

In an alternative embodiment, if a child/person is separated, the security guard/kiosk can arrange the best place to meet, either in or outside the stadium, together based on an optional global positioning system (GPS). In addition, the party with the mobile device can be provided directions on where to go to meet their party from who they have been separated.

In an alternative embodiment, the present invention may also be used in a security, defense and/or safety setting to direct patrons in a stadium for an orderly evacuation or notify patrons regarding status of a safety related event via, for example, a broadcast message including text message, email and the like. In this manner, system communication resources may be most efficiently utilized by not over-utilizing the system via voice communication, unless completely necessary. For example, the message can be broadcast in the event of an impending hurricane. In this situation, patrons in different sections get different messages, for example, to exit the stadium out of gates/exits that are either less occupied or closest to the section the patrons are sitting in. Advantageously, the present invention has the patrons contact information, including optionally and advantageously text messaging, that can be broadcast or sent to different patrons. The advantage of text messaging is that the bandwidth is more efficiently used in the event of an emergency, and there are no busy signals as in a voice network. Further, the message is send, and if the network is at capacity, the system can automatically resend or the message will be placed in queue and sent as soon as capacity becomes available.

In another alternative embodiment of the invention, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction.

For instance, in sporting venues the bracelet ticket includes the machine readable information that comprises at least one of a bar code and radio frequency identifier used for security check in, and optionally check out. In this manner, the standard reading machines that can scan the bar code or RFID information can keep track of people that have checked into the sporting event and/or venue. Advantageously, the machine readable information on the bracelet can also be used by the venue in the event the patrons seat assignment is modified, for example, via an electronic ticket exchange or upgrade program. In this embodiment, the visible indicia are no longer valid for the actual seating that may be dynamically changed and only represents optionally an initial seat assignment. However, the machine readable information may be used as a code to reference the specific patron and assign that patron a new seat. Thus, when the ticket reader scans the ticket and actually identifies, for example, the bar code, this information can be used to reference the patron, update and/or confirm the patron's current seat via the reader used, for example, by ushers in the venue, kiosk, entrance to the venue, and the like.

In an alternative embodiment, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction. This information, as previously mentioned, may be visually cognizable for the patron and in combination, readable by electronic means if the bracelet includes a magnetic strip, bar code imprinting, or RF chip.

In an alternative embodiment of the present invention, the security bracelet and ticket combination of the present invention advantageously includes a bar code or other machine readable information such as a RFID device. When, for example, a child is separated form their parent, the parent can notify security and the seat number associated with the child. If the child attempts to leave with their bar code/identifier, the system detects the bar code/identifier as either being valid and identifying the child that is missing or being invalid and raising another red flag. In an alternative embodiment, the bar codes/identifiers associated between children and adults correspond such that the child identifier must be within a predetermined time and/or number of checking out identifiers from/within the adult identifier. If this does not occur, the system determines that the child is leaving without their parent, and possibly being abducted.

In an alternative embodiment, the system links one or more tickets/identifiers together and requires the tickets/identifiers to exit the venue or event within a predetermined time period from one another and/or within a predetermined number of tickets/identifiers that have exited the venue and/or event. In the event that one ticket/identifier exits the venue or event and the associated identifier does not, then an alarm or other indictor occurs, and the attendants will detain the patrons that have initiated the alarm to for security purposes.

In an alternative embodiment, the tickets are advantageously coded with designations such as adult, child and the like. In the event a child ticket/identifier exits the stadium before the associated adult and/or more that a predetermined time period and/or number of patrons exiting, the system can initiate an alarm so that an attendant can determine if a child has exited the venue or event without their parent or with a wrong parent potentially averting a kidnapping. In this embodiment, an additional combination is the use of the standard fast pass feature, for example, at theme parks, and the like, where the venue records predetermined events that the user of the card enters in a faster line. In this embodiment, if a child ticket/identifier is not associated with a parent ticket/identifier, for example, as described above, the child may be denied entry into the event or venue if not accompanied by their parent. In alternative embodiments, the venue/event sponsor or organizer associates tickets upon request from the patron. In addition, in another alternative embodiment, a kiosk is provided inside and/or outside the venue for, for example, parents to register their tickets and have them associated with their children's tickets to prevent the child from exiting the venue without them, for example, as described above.

In an alternative embodiment of the present invention, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In another alternative embodiment of the present invention, a security bracelet is advantageously utilized, for example, such as the security bracelet disclosed in U.S. application Ser. No. 10/680,207, filed on Oct. 8, 2003, to Abraham I. Reifer, et al., and incorporated herein by reference, in the event of a reported event, security breach, abduction, and the like. In this embodiment, all patrons exiting the stadium must show their ticket and/or identifier so that the venue can check all patrons out of the stadium. Thus, for example, if two kidnappers come in the stadium, and want to use one bracelet for a child, the second kidnapper will be stranded in the stadium. In addition, if one kidnapper buys two tickets, then upon exit with the child and the additional ticket, a barcode/identifier will be exiting without ever having checked in, and then the alarm will go off as well.

In another alternative embodiment, the present invention provides a broadcast message to warn patrons of an event, such as an advertisement, sale and/or even a weather related event such as a hurricane that might require the venue to be evacuated. Advantageously, in at least one embodiment, the broadcast message comprises standard text messaging that optimizes or better utilizes capacity form the communication system. Thus, when using text messaging capabilities, the present invention efficiently transmits text messages to numerous subscribers regarding, for example, exit information, contacting and/or meeting additional parties that have been separated, and the like.

In an alternative embodiment of the present invention, the present invention optionally provides the capability to penetrate into secondary market with season ticket holders selling ahead of time the games they will not be attending. For example, the present invention optionally provides the feature for the season ticket holder and/or general ticket purchaser the ability to view in advance of the season and/or game the schedule, and to alert the venue and/or stadium of games and/or events they will not be attending, thereby permitting the stadium/venue to attempt to resell the tickets to other patrons. For example, in one embodiment of the invention, the patron is provided with a monthly schedule listing the events that may be attended. The patron, such as a season ticket holder, may then click or place an indicator on all games they will not be attending for the season in advance, thereby providing the stadium with the ability to resell tickets well in advance of the event. Once the patron completes identifying games that will not be attended, the system then compiles a list and transmits the list to the patron for an optional confirmation. This list is then used by the system to release seats well in advance of the game. In an alternative embodiment of the invention, registered users of the system for, for example, upgrades, may also be notified of seat availability for sales prior to the game/event. In an alternative of this embodiment, registered users may receive text messages, emails, and the like, notifying them advantageously of the availability of seats that heretofore have never been easily available to the public for sale, thereby allowing the venue to participate in secondary market ticket sales.

In one alternative embodiment of the present invention, the system/process of the present invention provides or operates as a middle person/broker between the ticket holder that is returning tickets to the venue, such as the season ticket holder, and a ticket sales system and/or company, such as tickets.com, by notifying the tickets company of the newly available seats via notification by the ticket holder, such as the season ticket holder of season ticket games not being attended.

In one alternative embodiment of the invention, the system and/or process transmits text messages, emails and the like, to offer tickets and/or seats and/or admittance to subscribers for events and/or games with empty seats even before game. Thus, the present invention allows the venue to participate in the secondary ticket sales market and the upgrade market, thereby increasing revenue and fan loyalty.

Of course, all of the embodiments of the present invention may be used for any reserved seating event, and/or venue that require tickets for entry thereof.

In another alternative embodiment of the present invention, the use of machine readable identifiers provides advantages for, for example, the upgrade program or ticket exchange of the present invention. For example, when the upgrade, reallocation and/or electronic ticket is issued, the machine readable identifier, for example, the bar code, on the original ticket is invalidated, thereby preventing use of the invalidated ticket. Accordingly, when a new ticket holder purchases the ticket form the season ticket holder, the new purchaser will be issued a new machine readable identifier, and optionally a new paper ticket. The present invention advantageously is able to handle the issuance of a new ticket and invalidates the old ticket and optionally the old identifier that has, for example, been returned by the season ticket holder, thereby providing dynamic ticketing capability.

In an alternative embodiment of the present invention, the new patron obtains a new identifier such as a barcode, the old bar code of, for example, the season ticket holder is invalidated. In one embodiment of the invention, season ticket holders are offered to opt in the upgrade process. Various commercial incentives are possible for the season ticket holder to opt in the upgrade process, such as monetary compensation when their ticket is used for an upgrade and/or resold whether they express their intention not to go to the game prior to the game, and the like. Alternatively, season ticket holders may be offered that the cost of their season tickets will, for example, remain the same as the previous year or be reduced if they participate in the program. Therefore, the combination season ticket trade-in and upgrade program in one embodiment of the invention will be beneficial to season ticket holders by allowing them to trade when they already know that they have no intention of attending a game, and allow the season ticket holder to recoup some cost of the season tickets if they do not attend and their ticket is used as an upgrade. In addition, additional patrons of the event and/or sports team are permitted to attend the game in locations/seats that they might never have been able to obtain access to. Further, the venue/stadium/team maximize revenues by being able to place tickets on the secondary market when the ticket holder notifies the venue early enough that they are not attending the event, the venue also obtains additional revenue from upgrades when tickets are upgraded, and the venue obtains additional fan loyalty.

In another embodiment of the present invention, the system provides the ability to advertise via email, text messaging, and the like, for one wireless carrier on the wireless device that is using another wireless carrier. Since the user of the wireless device has requested the service, the user appropriately receives the communication from the ticketing system of the present invention, and therefore, also appropriately received the advertisement from the wireless carrier that is different than the wireless carrier that the user of the wireless may be using at that time.

In another alternative embodiment of the present invention, offers to purchase seats either during the game or even well in advance of the game are "pushed" or transmitted out to registered users that have supplied their wireless and/or Internet addresses. For example, patrons can register in advance for the upgrade and/or regular ticket offers to purchase admittance via various methods including the Internet. When seats band/or admittance becomes available, a broadcast message or other standard messages may be transmitted to the registered patrons to notify them of the seat availability. Thus, seat offers are "pushed" to registered users that have requested this service advantageously to a wireless device and/or other address including standard telephone communication, as well as additional optional advertisements. The system, in one alternative embodiment, provides the user the option when registering to accept certain types of advertisements to be received on their wireless device via email and/or text messaging. In other embodiments, the user does not have the option of which advertisements to receive.

Advantageously, in accordance with one alternative embodiment of the present invention, if a patron decides to attend an event such as a sporting event when the patron does not have time to wait to receive paper tickets (e.g., the patron is visiting in another city/location and does not have time to wait to receive tickets via mail and is on the go), the system of the present invention transmits a ticket to the patron via, for example, a wireless communication system and/or other standard electronic communication system such as the Internet, and the patron can present their ticket, for example, on their wireless device and show up to game.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Patrons then text message and/or email and/or answer questions via voice-to-text messaging their answers. The system can then display the overall number of answers that are correct and incorrect, display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game.

The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another alternative embodiment of the present invention, the system uses a seat database to determine which of the reserved seats are currently in use. The system may integrate with the seat database system of a venue and/or stadium or optionally be used in parallel with the seat venue/stadium database. For example, prior to the event, the system may utilize the seat database of the venue to determine available seating and patrons that do not show up after a predetermined period of time. Alternatively, the present invention can operate using a separate database from the event/venue by copying or building a separate database used for the ticketing and/or upgrading according to the present invention. In this alternative, as patrons enter the venue, they are checked in directly to this separate database. At the time of the event, the system will be able to check-in patrons using either the identification system, e.g., bar code scanner, of the event or venue, or provide a separate identification system.

In alternative embodiments of the invention, the patron that knows they are attending the game but is going to be late can send in a HOLD message even prior to being provided a warning message that their seats are to be released if the patron does not respond to the message with the HOLD request. That is, in this embodiment, since the patron already knows well in advance that they are attending the game, but perhaps stuck in traffic, the patron can initiate the HOLD message before even being warned in advance of the possibility of their seat being released.

In another alternative embodiment, patrons that have registered with the system and optionally checked into the stadium and/or venue in advance and who also know that they would like an upgrade and/or ticket, may initiate their own upgrade request to the system to notify the system of their willingness to purchase an upgrade and/or new ticket for the event/venue. The system may then place these patrons on a higher priority since they have already expressed and intent and/or willingness to purchase the upgrade or ticket. The patron may notify the event and/or stadium of their willingness optionally well in advance of the game or near/after game time at a time which the patron commits or expresses an additional heightened desire to upgrade and/or purchase a ticket.

In alternative embodiments, the system includes the advantage of allowing patrons to register free for a predetermined period of time, for example, for the first year, without paying a yearly subscriber fee. Alternatively and/or in addition thereto, the system provides the patron with their first upgrade for free or for a reduced rate to further encourage the patron to register with the system and method of the present invention. Alternatively and/or in addition thereto, the system of the present invention offers the patron reduced and/or free concessions when purchasing a membership, ticket and/or upgrade to further encourage the patron to participate in the offers of the present invention.

In alternative embodiments of the present invention, the matching system and/or process, permits participants in the program to initiate a message to the system with the seat location and/or name of the patron that they would like to be matched with for a meeting, networking and/or socializing such as a date. In this embodiment, the system may the push the message to the other subscriber and assign new seats to the individuals that are to be matched. Alternatively, the system need not require a specific confirmation that the second individual to be notified of the potential match is physically located near the first individual, but can rely on the first individual to provide that information. For example, the first individual may see a potential date in a restaurant, and may then send a message to the system with that person's name or address, that they would like to meet that other individual. In that situation, the second individual will receive a message of the possible match, and can respond and accept or reject the offer to meet. The second individual can then provide a meeting destination or the system can suggest a meeting place based on the first individual advising the system of their location, and the location of the second individual.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Advantageously, the multiple choice questions each have unique selections, such as a1, b1, c1 and d1 for question #1; a2, b2, c2, and d2 for question #2; a3, b3, c3 and d3 for question #3, and the like. In this embodiment, the actual timing of questions is not necessary since each question and answer is unique. Therefore, the speed of responding to the question is immaterial to the winner of the contest and/or correct answer. Also, in the event one patron answers the question late, there will be no confusion which question the patron is submitting an answer for. Patrons text message and/or email and/or answer questions via voice-to-text messaging their answers as indicated above using the unique set of answers, in one embodiment. In alternative embodiments, the first predetermined number of patrons that answer the question correctly are considered the winners.

The system can then display the overall number of answers that are correct and incorrect, e.g., a1 50%, b1 28%, c1 12% and d1 10%, and display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another embodiment of the invention in connection with the seating upgrade and/or assignment system, an identifier and/or machine identifier such as a bar code, RFID, etc. optionally remains static for the user on the user's ticket and/or device that is provided for optional paperless ticketing. For example, the identifier will remain the same associated with the user, but the seat assignment, privileges, user characteristics, user preferences, and the like, may be dynamically changes. The system and method of the present invention will be updated so that the identifier can represent a dynamic seat assignment or other dynamic information, such as general admission to an associated event, or other event and/or venue, including, for example, a restaurant, bar, and the like.

In another embodiment of the present invention, the upgrades process and/or feature may be provided to users/patrons as a complimentary reward for fan loyalty, to reward the user but also market other goods/services and/or other advertising opportunities to be transmitted via the wireless device and/or mobile phone. In one embodiment of the invention, the system and/or method initially queries the user, for example, at the beginning of the trivia contest and/or tournament or at the beginning of the game, whether the user is present in the stadium or not. The system can then perform, for example, the trivia contest, and determine a winner(s) to award for example some form of reward. Furthermore, in another embodiment of the invention, based on the number of people responding that they are present at the game, the present invention advantageously provides a random upgrade to a predetermined number of patrons as an additional fan loyalty program and/or advertising sponsorship to one or more entities that sponsor the free upgrades.

In another embodiment of the invention, a system and/or method is provided that advantageously builds and/or acquires and/or collects mobile contact addresses of users in an efficient manner. For example, in accordance with the present invention, a user advantageously need only provide the communication network and telephone number, and the present invention builds a data address therefrom. This allows the mobile or wireless device user to still register for a service without specifically knowing their data address for, for example, data communication such as SMS messaging, text messaging, email, and the like. In one embodiment, the mobile user is provided a drop down menu where the user selects the communication network and provides their mobile phone number.

The present invention is particularly advantageous currently with the recent enactment by the Federal Communications Commission (FCC) number portability where mobile phone users are able to transfer their existing numbers to other networks. Accordingly, we have determined that a user's number will advantageously provide a mode of contact for the user even when the user decides to change communication networks. For example, in at least one embodiment, the present invention uses the cell phone number and IP address combination, e.g., 2029422785@verizon.net, or 3016814455@attwireless.com, and/or any other mobile telephone plus IP address combination that may be used to utilize the IP address of the cell phone. Alternatively and/or in addition, the SMS address may be used.

In one embodiment of the invention, the software processes and system determines and builds the actual messaging address (email, text, SMS, and the like) to send messages to the mobile device by the user only selecting and/or providing the communications network and the telephone number. Thus, the present invention advantageously simplifies the process for mobile or wireless device users to register and/or provide contact information, and therefore, beneficially increases the number of individuals that can effectively and easily register for a communication service.

In another embodiment, the present invention facilitates the ability for potential users to signup for the service of receiving, for example, trivia, upgrades and/or text messages via a user sign up device or apparatus. In one embodiment, the user sign up sheet includes numbers and/or circles that can be filled in like a grid, where the user can fill in or cover the numbers that identify their portable number. In addition, the user can check off the specific network carrier from a list of network carriers, or simply enter their specific network carrier. The user sign up sheet may be done electronically via a computer and user interface as described above, or may initially be filled out by a user via, for example, a piece of paper and then later entered into the computer system of the present invention.

In another embodiment of the invention, the system and method of the present invention is capable of re-locating a patron via the mobile address that was previously provided, even if the patron has changed wireless carriers. For example, in one embodiment, with the recent feature of mobile phone portability by the FCC, we have determined that a significant number of mobile phone users are likely never to change their number/address, and therefore, the system and method of the present invention is able to send text messages and/or email to all network addresses using the telephone number of the user if the system suspects that the previously provided network by the user is no longer being used. In this embodiment, the user can optionally respond to the message and/or network broadcast message, confirming that one of the messages has been received. For example, in at least one embodiment, the present invention uses the cell phone number and IP address combination, e.g., 2029422785@verizon.net, or 3016814455@attwireless.com, and/or any other mobile telephone plus IP address combination that may be used to utilize the IP address of the cell phone. Alternatively and/or in addition, the SMS address may be used.

In another embodiment of the message, whenever a user wants to contact a mobile phone, mobile wireless device or even computer based, via for example, an Internet based account, wants to contact another mobile wireless device user, the present invention provides a transmission device, for example, via the Internet or individual models/mobile phones used for each of the networks to broadcast the message on all networks. Advantageously, in accordance with this embodiment, since the user is likely to maintain the same telephone number, their data or text messaging address will be their telephone number and one of the few network addresses. This type of broadcast message can happen anytime, and even for voice communication when the user of the wireless device needs to receive a data, text and/or voice message.

In another alternative embodiment of the invention, as described previously, the invention may be used by a patron to obtain specific data or information regarding sports or venue related information of interest. For example, patrons may communicate with the system and forward a player jersey number or number of racecar during an event such as a baseball game, football game, racing event such as Nascar, to obtain additional information including current statistics and past statistics. The present invention can then optionally sent statistics throughout the game or event to the patron without the patron requesting, for example, at specific time intervals or after notable achievements during the event, such as a home run, touch down, $7^{th}$ inning stretch, half time, number of laps traveled, and the like.

Thus, the present invention includes many variations in the type of information a user may receive, whether specifically checked into a venue or registered for the service for a particular event. In addition, the present invention includes various processes and systems for ensuring delivery of messages to patrons that have requested the service or merely sending messages that a patron may be interested in receiving.

In another embodiment of the invention, the matching and/or networking system includes the ability to contact and/or notify the users to coordinate the meeting using any one of a plurality of communication methods including text messaging, email and/or instant messaging, with the additional advantage of transmitting pictures, video and/or other data that provides additional information regarding the other person that has been suggested for the match and/or network. In one implementation of this embodiment, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. For example, different message transmit and/or receive formats may be used depending on the system. The present invention beneficially parses the various different formats to obtain the necessary information for the communications described herein. In addition, the represent invention formats the messages for the different wireless devices so that the messages may be appropriately received even though different devices and/or communication networks have different messaging formats. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In accordance with another embodiment of the invention, the matching and/or networking system includes the option of permitting a subscriber to notify the system when they are ready for a potential meeting and/or match. Once the matching and/or networking system is notified of the subscriber requesting the match, the system is then capable of either tracking the user though a positioning system such as GPS, permitting the user to register at predetermined locations upon user initiation such as via Bluetooth, RFID, infrared, and the like. In accordance with this embodiment, the subscribers are not being constantly tracked, and therefore, maintain an additional level of privacy. In alternative embodiment, the present invention continuously tracks the subscribers without specifically requesting to be matched. In this alternative embodiment, the subscriber is provided with less privacy because they may be notified of a specific match even though they might not be interested in the match and/or meeting at that time.

In an alternative embodiment, the present invention provides subscribers with the ability to accept/reject the match before each of the subscribers receive personal information of the other and/or before the date/match has been arranged with at minimum a meeting location. In this embodiment, the invention requires that both users accept the match and/or date prior to notifying the subscribers of the contact information for each subscriber. Therefore, subscribers can optionally request additional information from the system of the present invention, even multiple times, to better understand the potential date and/or match before accepting, and importantly, before the other subscriber is provided contact information and/or a meeting location of the subscriber. In the embodiment where the present invention merely provides the meeting location, the present invention advantageously does not provide the subscribers contact information and/or other personal information before the match/date. Advantageously, in accordance with this embodiment of the invention, subscribers never receive personalized or personal contact information unless the subscribers, after meeting in person, agree to exchange such information.

In another embodiment of the invention, the dating and/or networking system provides subscribers the functionality to email, instant message and/or text message at least one additional piece of personal information and/or questions, optionally directly to each other or via the system anonymously, to obtain additional information that may be more relevant than the user profile or information from the user profile that was used to make the initial date/match.

In another embodiment of the dating and/or matching system of the present invention, the system optionally provides automatic and/or user initiated registration in a particular establishment and/or geographic location, which can be used instead of a location determination system such as GPS, or together with such system. This form of registration may be even more precise than GPS because it confirms a subscriber's presence within a specific store, establishment, entertainment establishment, restaurant, and the like. Thus, in these embodiments, the subscriber either initiates the registration as described above, or alternatively, if the subscriber optionally sets the wireless device to automatic registration based on the appearance at a predetermined registration area and/or location, the subscriber will be automatically registered to receive communications regarding a potential match/date.

In an alternative embodiment of the present invention, once the dating and/or matching system determines that a potential match/date has been detected, the system optionally notifies the different subscribers and asks whether they want to continue to participate in the matching/dating program. When both, some and/or all subscribers agree to participate, the present invention can forward to each subscriber automatically the information that each subscriber shares substantially in common and/or the information that was responsible for the match/date between the subscribers. In this embodiment of the invention, the subscribers will know immediately the information that should be most relevant in making the match/date and can determine whether to actually agree to either contact or send the other subscriber additional information and/or arrange to meet the subscriber at a pre-designated location.

In an alternative embodiment of the present invention, the present invention optionally includes the ability to recommend a potential meeting place for the subscribers to meet after determining that the subscribers have agreed to participate in the date/meeting. In this embodiment, the present invention advantageously determines the location based on, for example, subscriber preferences, geographic location that is preferential for at least one of the subscribers and/or both subscribers, predetermined location where, for example, a sponsor will receive patronage and/or provide a discount for the subscribers and/or actual pay the organizer of the dating/matching system an advertising fee to promote their sponsorship. Accordingly, the present invention advantageously determines not only a potential match/date, but advantageously suggests, recommends and/or determines a specific location and/or geographic location and/or restaurant, clothing store, zoo, museum, and/or other suitable location for the subscribers to meet and optionally based on geographic distance and/or location.

Additional dating and/or matching features and/or differentiators of the networking and/or dating system of the present invention include one or more fo the following:

Wireless messaging platform supports interactive messaging

Wireless messaging platform provides simultaneous parallel applications to run without collision Multiple wireless initiatives or topics run without conflict Different initiatives or topics may be user specific or selectable While each initiative runs independently, there can be overlap in terms of customer base Platform is flexible to add/remove initiatives quickly and efficiently One wireless carrier/network can be a dating/matching sponsor and advertise on the wireless device and/or network of another wireless carrier/network Contact members to notify of the match/date to allow members to either directly contact each other or send additional information via, for example, text messaging, email, instant messaging, such as pictures, video, and the like Contact members or wait for request from members to participate in match/date initiative; can then automatically track member via GPS instead of constantly tracking member all the time, thereby increasing privacy of member Contact each subscriber that is being offered the date/match and obtain approval for the match prior to actually notifying potential members that match has been made Contact users after initial match has been conditionally approved, and provides users the capability to request additional information, such as personal information from the other member or other members which the requestor still wants to know before finally accepting the date/match Members can register or "check-in" at predetermined locations and/or establishments which is one additional level of specificity, for example, with regard to the location where a member is that may be interested in matching; For example, two or more members may actually be in the same restaurant where they can be informed of one or more other subscribers being present; members can register via sending a message to the system via text message, email, RFID, Bluetooth, and the like, either by initiating a registration or automatically Contact members after initial match has been conditionally approved and exchange, optionally automatically, profile information that was significant in making the match/date and/or other important information regarding a match/date that a member may want to know before finally accepting the match/date and/or information the members may want to know that is geared particularly for a first date, e.g., likes/dislikes, common interests, favorite foods, wines, alcoholic beverages, and the like Contact members to suggest and/or recommend and/or arrange meeting place based on, for example, geographic location, common interests/sports, common food tastes, common beverage tastes, common entertainment preferences and/or sponsors willing to, or interested in, being utilized for the match/date for the suggestion and/or recommendation, and optionally providing the members a discount and/or compensating by the sponsor to the networking and/or dating system proprietor for the advertising and/or recommendation to visit that sponsor Wireless messaging platform includes a protocol conversion server functioning to interface with a variety of wireless networks having different messaging characteristics for both transmitting and receiving messages, and parsing the different message formats for the content from a received message, and transmitting a message to a plurality of different networks and/or devices having different messaging and/or interface capabilities and/or functionality Contact members with a wireless consent form indicating that the matching/dating system and/or the members participating in the match/date have generally consented to potential cohabitation optionally without any recourse to the other party. Alternatively, the members may be contacted with other types of informed consent forms with limited recourse for acts and/or aggressive acts that are clearly assaults, but not sexual related misconduct or sexual related crimes that are felonious in nature carrying a high penalty/sentence. Alternatively, members may be presented with consent forms that eliminate any criminal penalty, but do not foreclose the possibility of civil lawsuits for damages relating to b and the like As another alternative and/or in addition thereto, members may be presented with consent forms that eliminate any civil penalty, but do not foreclose the possibility of criminal lawsuits for criminal type activities, perhaps with the exception of the most severe sexual crimes such as rape and/or sexual assault that carry significant prison time.

For example, athletes, celebrities, high worth individuals, or even average individuals, male or female, may be interested in the wireless consent initiative because that allows them more flexibility to meet a variety of individuals without the worry of later being sued. In additional alternative embodiments, broadcast messages may be transmitted to numerous individual that may be interested in meeting and/or dating a celebrity or predetermined individual or individuals. In this embodiment, the optimum matching individual or individuals may be selected to meet with the celebrity, celebrities, and the like, while utilizing the informed consent feature of the present invention. In another alternative embodiment, an individual or individuals may be randomly selected as part of a match or date, based on a lottery or other competition to meet or date a specific individual or individuals.

Additional optional hardware and software requirements are as follows for one or more embodiments of the present invention:

System Capabilities

Platform supports interactive messaging

Platform provides simultaneous parallel applications to run without collision

Multiple wireless initiatives or topics run without conflict

Different initiatives or topics may be user specific or selectable

While each initiative runs independently, there can be overlap in terms of customer base Platform is flexible to add/remove initiatives quickly and efficiently Wireless Initiatives Interactive trivia with fans inside and outside of the stadium Targeted messaging, e.g., targeted advertising Broadcast messaging, e.g., general advertising Interactive messaging, e.g., with concessions Profiling for each initiative or topic, e.g., based on network operator Urgent and emergency messaging Specific initiative: discounts for concessions and/or memorabilia Specific initiative: invite patrons to different activities before, during or after game, e.g., player loyalty, family activities, etc.

Specific initiative: seating upgrade program

Specific initiative: messaging patrons in one section and separate messaging to patrons in another section Specific initiative: messaging parent of a missing child Special initiative: dating where patrons can keep their seats to return to them, or their seats are re-allocated. In alternative embodiments, the patrons switch seats instead of moving to empty seats, either for the entire game or only a portion thereof with other patrons for match making possibilities.

Functional Specifications

Front end for user signup and profiling-secure site—for example, modeled after www.mlb.com, include one or more of:

type of seats does the customer want for upgrade (decks and range of sections)

information for dating concession profile capability for additional profile information validate user by sending message to device upon sign up auto append of network information to phone number during signup login and password protected site frames on website or interface that can be easily configured to have look and feel, for example, of particular baseball team capability for space on screen for advertising opportunity that can easily be modified and relatively dynamic capability to handle lost passwords web page or interface where customers with season tickets can mark a calendar with the seats they want to keep and the ones they are interested in freeing up for early sale or upgrade.

The optional Front End of the present invention used for administration and setting up parameter for each application, optionally includes a secure site, with one or more of the following:

application email address and password minutes for all the configuration parameters and/or functionality number of threads for each application for upgrades, at least one of releasing customers old seat immediately, or it until the customer approves of the release, or holding the customer's seat for a predetermined portion or all of the game, for example, in the dating functionality)

set schedule for games section rating setup, and seat upgrade pricing revenue allocation model provide a number of retries if message send failure Concessions The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

Concession Wireless Initiative

Purchased via cell phone

Web registration for preferences

Targeted concession offers

Confirmation that purchase is ready

Delivered to seat or ready for expedited pickup

Customer convenience: system identifies closest concessions to customer

Customer convenience: system determines concessions with short wait

Each concession labeled with a number for customer identification and fulfillment Customers can request menu, or register for each game to receive menu around game time via mobile device GPS can be used effectively to inform customer of closest concession stand to pickup order, and/or customer can provide section number and/or seat location for system to identify most convenient concession stand Most convenient concession stand can be determined based on one or more, or combination of, predetermined criteria, such as, closest concession location, shortest wait in line, specific item being ordered, and the like.

Interactive messaging, e.g., with concessions

Specific initiative: discounts for concessions and/or memorabilia

The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

In one alternative embodiment, the following message exchanges may be used:

First Message

"In Game" Concessions

Menu will be sent soon!

Reply with #, item short form and seating section

Ex: BE=beer

Reply 3BE for 3 beers 408SEC for section 408

Powered by NEXTEL

Second Message (paper menu?)

Menu

BE=Beer; CO=Coke; DCO=Diet Coke

HD=Hot Dog; BUR=Burger

TA=Taco/Salsa; PO=Popcorn

FF=French Fries; CH=Chips

PZ=Pretzel; PT=Peanut

LEM=Lemon Ice

Third Message

Order received!

Summary:

3 HD @ $3=$9

2 CO @ $3=$6

2 LEM @ $3.50=$7

Total=$22

Reply Y to ACCEPT

Credit Card charged

N to CANCEL

Fourth Message

Thank you for ordering!

Your order has been confirmed!

Confirm # REIF1001

Powered by: THE SPORTS AUTHORITY!

Fifth Message

ORDER READY

Bring Confirm # REIF1001 to Concession #33 by sect # 212

$2 off NIKE baseball gloves

Bring #NIKE305 and game ticket to

Any SPORTS AUTHORITY!

In another embodiment of the invention used in concessions initiative, the concession attendant receives the confirmation number or other identifying information from the customer when picking up the concessions. The concessions attendant enters the confirmation number or other identifying information when ready or optionally clicks on the order on the computer screen via a concessions interface associated therewith. From there, the order is then cleared from the system with respect to orders that require fulfillment, advantageously allowing the workers to streamline their work activities in the concessions. In an alternative embodiment, the concessions are actually delivered to the customer using the customer provided seating information, either provided by the customer through, for example, the wireless device or other registration and/or notification process, or even via a telephone call or automated attendant to associate with the order.

In another embodiment of the invention, the concessions menu is advantageously only delivered to customers that have entered the stadium via a location determination system, and/or checked into the stadium via a ticket reader/scanner. In alternative embodiments, all customers that have registered for the concessions service will receive an introductory message. Thus, customers that are not attending the game need only reply with a request to terminate the concessions service for that event and/or game.

In an alternative embodiment, the customer is advantageously directed to closest concessions via, for example, GPS chip in phone or by knowing where the customer sits at check in, or by having the customer input their seat location or location where they would like to pickup the concessions.

In another embodiment of the invention, we have determined that some mobile phones will utilize different transmit and receive addresses, and therefore, a user may not know how to appropriately register to be a subscriber for one or more wireless initiatives. For example, we have determined that some mobile phone networks utilize slightly different or different electronic addresses for the transmitting and receiving of electronic messages. For example, for the Research In Motion (RIM) Blackberry communication service, the mobile device is assigned a desktop email address. In one configuration of Blackberry, the mobile device only has one address. However, in the non-integrated configuration, the mobile device actually has a separate address when transmitting from the receive address.

In accordance with this embodiment of the invention, the user registers by providing their mobile phone number and optionally a network carrier for same. In this embodiment, the mobile phone user registers with their phone number and optionally wireless network provider. The registration system of the present invention then sends a message to the mobile device, requesting that the mobile device respond, optionally with a predetermined code and/or predetermined message. The mobile device then responds to the registration system, and the registration system corresponds the mobile device response with the original registered mobile address, thereby completing the registration process by ensuring that responses received from the mobile device can be mapped appropriately to the mobile subscriber. In the embodiment where the mobile user is requested to provide a predetermined code and/or message, the registration system uses the predetermined code to map the mobile phone response potentially having a different address with the transmit address provided by the user.

Dating, Matchmaking and/or Networking

In another embodiment of the invention, patrons are provided the opportunity to meet others in the venue or at a predesignated location near or away from the venue using standard matching rules. In one embodiment, the presence of the user is detected when entering the stadium, for example, via the ticket entrance systems. In another embodiment, the presence of the patron is detected or determined based on a message that is send to the user, for example, either right before, during or after the game. In this embodiment, the user can be prompted with a request whether they would like to participate in the matchmaking, dating and/or networking program.

For example, potential business or social partners may be selected or prompted for networking or dating. When the user responds yes, in this embodiment, their current seat is irrelevant if that seat is not to be released for another patron. Therefore, the system need only select a new set of seats for the networking and/or dating for the patrons, transmit the patrons the additional new seats via, for example, a wireless ticket, update the venue seating database for subsequent verification by the ushers when seating the patrons. The patrons may then proceed to the new location and have a meeting or date, and then return to their original seats if desired.

In another embodiment, a "burnt bridge" approach or feature is provided where the original seats for the patrons that are meeting are then released for other upgrade and/or networking programs. In this embodiment, the original seat of the patron must be known for example, via check-in procedure, registration for the program in advance for example over the web registration process or other registration process, or via the patron responding to the system with their wireless device of their current seat location. Alternate combinations or modifications of the above embodiments is also used.

Trivia

In the alternative embodiment of providing the user trivia information, based on registration and/or location, for example, while attending the game, watching the game at home, or any time prior to or after the game, the user may be provided with questions, as described above, to answer as part of a tournament and/or to be eligible for prizes, awards, and the like. In one embodiment, a section or portion of the users are targeted for the questions together, while other sections and/or portions of the users are targeted at a time period thereafter, for example, 1 minute later, to stagger the communication and transmission of data, thereby reducing congestion and/or unnecessary hardware to accomplish the transmission and acceptance of information to/from the patron.

In one embodiment, while all the questions are staggered over a predetermined period of time to the patrons, whether limited to patrons in the stadium, out of the stadium and/or both, the patrons are not notified whether their answer is correct until after all questions have been transmitted, and all patrons are provided the opportunity and/or sufficient time to respond. Once that predetermined time period has elapsed, the patrons will be notified whether their answer was correct, and whether they are still in the tournament. In optional embodiments, a predetermined time period will again elapse until new questions are sent and the tournament continues.

Optional Oracle or Mv SQL Database

In one embodiment of the invention, an Oracle or My SQL Database is used in connection with the present invention. In one embodiment, the result set is set to be proportionally with respect to the number of users and/or data that will be stored in the system. In another embodiment, the database is optionally partitioned for specific games and/or initiatives or groups of games and/or initiatives. The system is preferably thread safe when running the games and/or initiatives. The system is optionally integrated with Credit Card for payment, and/or integrated with the venue ticket system and/or point of sale system to optionally determine who came in and when into the venue. In another embodiment, the present invention maintains and updates financial balances for users, such as patrons and stadiums. In alternative embodiments, secure interaction with ushers and an interactive kiosk is provided.

The present invention optionally provides any standard algorithm for partitioning of group of seats and users, for example, for system resource allocation, load balancing and/or division of system functionality. In alternative embodiments, a local kiosk for the stadium and/or venue is provided where the user can enter information, such as register for one or more initiatives and/or programs. In alternative embodiments, the system of the present invention includes the capability of offering for sale seats which are not currently sold via messaging to wireless devices, such as text messaging to mobile phones, or other messaging and/or wireless communication to wireless devices, and consideration. In alternative embodiments of the invention, standard algorithms such as used in the airline industry may be used to overbook seats for the venue, and consideration.

In alternative embodiment of the invention, instant messaging or any type of communication method can be used in the present invention, include local and/or global networks, such as the Internet, LANs, WANs, WAP, 811.02a, 802.11b, 802.11g networks, and the like.

Messaging Software Requirements

Trivia and/or other messaging products/initiatives are Java applications that run in a J2EE application server and utilize a JDBC 2.0 compliant relational database. There are typically open source options available for system support.

Currently for development and test environments we utilize are desktop environments running Windows 2000 with the open source options below. The draw back is that open source options typically don't provide formal system support approaches, although we have found the software to be very reliable and would recommend this approach for early stage pilots. Should the customer prefer purchase software options for these components are provided as well.

I. Server Software Specifications

Alternative A—Open Source Approach (1) Web/Application Server—Tomcat 4.1.18

(2) Database—MySQL 4.0

(3) Windows 2000 Server for each server

Alternative B—Purchased Product Approach (1) Application Server—Websphere Application Server 5.0

(2) Database—Oracle 9i DBMS (3) Windows 2000 Server for each server

II. Server Hardware Specifications (4) Each of the HW Servers specification:
- (i) 2xCPU—P4 2.4 GHz Xeon
- (ii) 2 GB RAM
- (iii) Monitor
- (iv) CD ROM
- (v) Floppy Drive
- (vi) Hard Drive depending on volume (see below)

III. Communication Specifications (5) POP3 Account and SMTP server accounts that can support number of active subscribers (6) Dedicated T1 access to POP3 and SMTP provider IV. Hardware and Software Sizing Configurations Phase 1:

1K-10K subscribers and players during the game

Two Servers

Server 1—runs Web/Application Server for the website and the Trivia Application

Server 2—runs the Database server (20 Gig)

Phase 2:

10K-25K subscribers and players during the game Server 1—runs Application Server for the Website front end Servers 2 and 3 (2 Servers)—run the Application Server for Trivia Application (two servers are used handle load balancing)

Server 4—runs the Database server (50 gig) (Level 1 RAID 2×50G Array) (Server 5—used as a backup to server 4—depending upon Reliability requirements)

Phase 3:

25K-50K subscribers and players during the game

Server 1—runs Application Server to run the Website front end

Servers 2, 3, 4 and 5—run the Application Server for Trivia Application (four servers are used to handle load balancing with hardware and software clustering)

Server 6—Database Server—150 gig (Level 0+1 RAID 6*50G Array)

(Server 7—used as a backup to server 6—depending upon reliability requirements).

In one alternative embodiment, as part of the sign up for trivia the system optionally asks the general admission or season ticket holders to input their seats to simplify how the system obtains information where the patron is being seated when they come to the game. In an alternative embodiment, the system obtains this information from the stadium database system, kiosk where the patron can enter the information at the stadium and/or via the point of sales system by the service personnel or attendant that is selling the tickets. Using any of the above methods, once the system knows where the patron is/are seating when present at the game, the system can then target sections of the stadium for, for example, the trivia quiz or other service/offering to the patrons.

Examples of different sections that can be separately targeted include for baseball, behind first base line first, behind home plate second, first base line third—all lower deck; same sections for upper deck and bleachers. Other sports may include football, hockey, soccer, basketball, and the like. In accordance with this embodiment, targeting different sections over different periods of time, thereby preventing a long delay to receive answers once the question is transmitted, may minimize collusion among patrons.

Thus, by segmenting the stadium over a few minutes in accordance with one embodiment of the invention, the present invention may increase the window of transmission to, for example, 2 minutes or more for the first round. As the rounds get successively smaller, the present invention will transmit messages faster. The present invention also provides optional winners for different sections of the field. In addition, the section winners can further optionally compete against each other, for example, the first class seating winner can further compete against the bleachers winner, and the like.

As discussed above, one or more of the above alternative embodiments may be incorporated into the embodiments described above, and/or any of the embodiments discussed below. Furthermore, any of the embodiments of the present invention may be used for any reserved seating or other event.

Figure 32:
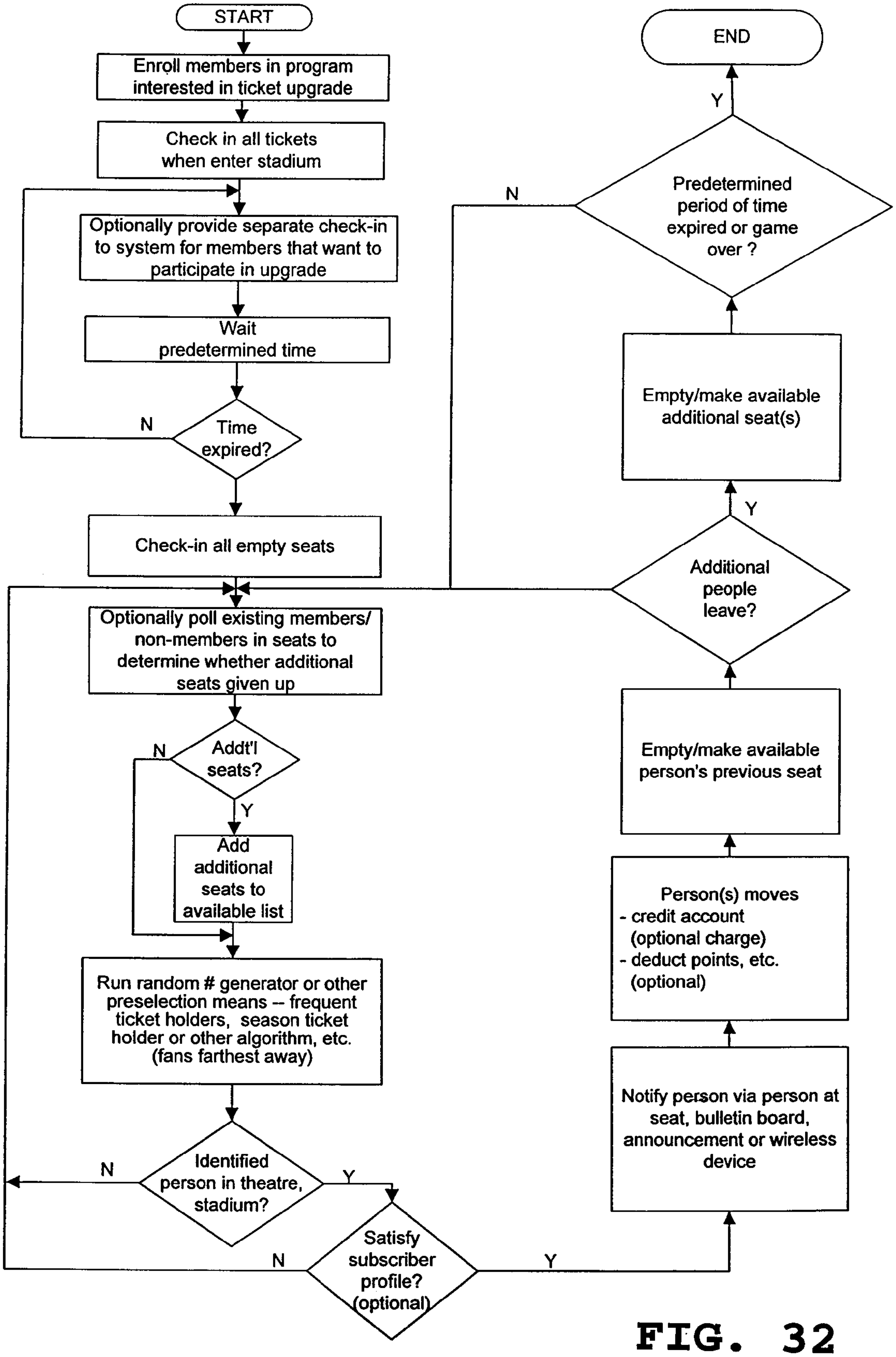

FIG. 32 is a flowchart of a tenth embodiment of the invention. In FIG. 32, the process begins by enrolling members in the program that are interested in the ticket upgrade. Tickets are checked in, for example, as the patrons enter the reserved seating area, such as a stadium or theater, through, for example, bar code readers, scanners, infrared readers, and/or manually or other method where the patron is checked in, either at the gate, seat or other location. An optional separate check in area is provided for patrons that want to participate in the upgrade program. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seats for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, a standard bidding process, or other predetermined process.

An optional polling process to poll existing members and non-members in seats to whether additional seats are available. That is, in another optional embodiment of the present invention, non-members may also make their seats available for re-allocation/re-sale at any point in the process. In this additional polling process, the next step is to determine whether additional seats have been made available. If additional seats have been made available, then these additional seats are added to the list of available seats.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or more means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

If the patron accepts, payment of money or other means may be effectuated on the spot via the wireless device, credit card, debit card, points, and the like, and the patron may now move to the other seat. The patron's seat may then optionally be made available as an empty seat to the re-allocation process. The process then optionally determines whether there have been additional vacancies, for example, just prior to the event, during the event or as a result of predetermined processes, and empties and/or makes available these additional seats for the event. For example, if standard smart card, standard scanner, standard bluetooth, wireless, or other technology is used in the present invention, additional seats may be made available as patrons leave the event early, for example if diverted for an urgent business meeting, and the like. These additional seats may provide additional opportunities for patron satisfaction, revenue (theater or patrons), advertising, advertising sponsorship for banner advertising on the wireless device and/or in the theater, and the like. Thus, scanners posted at strategic locations, for example, at the exit of the theater or stadium will confirm that the patron is leaving, and optionally prompt the patron to confirm that they do not plan on returning. This embodiment may optionally be used in other embodiments of the present invention, and vice versa.

If a predetermined period of time has not expired, then the re-allocation process may be run again to optionally continuously re-allocate seats while advantageously including the additional seats. The patron may optionally store the upgraded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

In accordance with the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that may be in the vicinity of the stadium but were unable to get seats. Since the present invention re-allocates and/or sells tickets very near to game time in accordance with one embodiment, the patron must be in the general vicinity of the stadium to take advantage of this embodiment of the invention.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron to help the patron decide the quality of the upgrade and whether to accept.

In one alternative embodiment, if the patron that has their ticket re-allocated in error, e.g., because the patron did not show up to the event based on the predetermined criteria but the patron was still planning on attending because they forgot about their seat being re-allocated, the system can re-allocate seats immediately upon the checking in of the patron and notify them that their seats have changed because they are late. In this situation, the stadium/venue might decide to further upgrade the patrons because of the mistake.

In accordance with one embodiment of the present invention, the process of the present invention specifically reserves seats of the highest or very high rating that are considered preferred, in the event a patron's seat is re-allocated prematurely or erroneously. In this situation, the patron who has had their seat re-allocated because they will likely receive an even better seat as a result of the mistaken (stadium or patron) or premature seat re-allocation.

In another embodiment of the present invention, as patrons are entering the venue or stadium, they are provided advantageously with a map of the stadium so patrons can analyze the potential upgrade to make a decision whether the upgraded seats are sufficiently good or of value to warrant the patron moving and/or paying for the additional upgrade. By handing the patron the map of the stadium, the process of the present invention is not required to transmit a detailed schematic to the patron's wireless device which would not normally be able to effectively permit the patron to evaluate the proposed upgrade seats. The map that is handed out may optionally include information for patrons on where to register for the upgrade and/or additional advertisement opportunities.

In one alternative embodiment, the patron that has purchased the ticket, for example, a season ticket holder, may advise the stadium that for a particular game, set of games or all games, they do not want their seats to be re-allocated, and perhaps, an additional fee is assessed for this type of patron. If the stadium provides the ability for the patron to selectively opt out of the seat re-allocation, the patron can, for example, connect to the system via the Internet, public switched telephone network, cellular network, and the like, and notify the system that they do not want their ticket re-allocated, for example, because they are coming late to the event. Other means of notifying the system and/or other reasons may be utilized in connection with the present invention.

In another alternative embodiment, the system provides patrons the ability to individually select when their tickets may be re-allocated. For example, one patron may prefer to only give up their ticket if they are late to the game by 15 minutes, while another patron may be willing to give up their ticket if they have not arrived 15 minutes before the game. In alternative embodiments, the stadium may provide incentives for the patron to have their ticket re-allocated prior to the game because it increases the stadiums chances of re-allocating/re-selling the ticket.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provide additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In an alternative embodiment, the system determines priority of re-allocation of seats based first upon patrons that have seats that may also be re-allocated. That is, the systems attempts to maximize the number of re-allocations by prioritizing the re-allocation based upon seats that may be re-allocated after already being re-allocated. For example, if front row seats in a stadium are available to be re-allocated, in this alternative embodiment, patrons that are in the next closest section for example on the field level would be upgraded first to those seats. Then, patrons with less preferred seats, for example, in the upper deck would be re-allocated to the seats that have now become available from the patrons that have been upgraded to the front row. Thus, using this alternative priority scheme, the present invention maximizes the re-allocation numbers. Of course, this priority algorithm may be combined with additional factors, for example, relating to subscriber/patron value. As described above, additional factors may be utilized in the algorithm to determine the subscriber or set of subscribers to offer the upgrade.

In alternative embodiments, patrons in the vicinity of the upgraded and re-allocated patrons may optionally rate the upgraded patron, for example, for appropriate behavior, wearing of excessively large hats, drunkenness behavior, and the like. These ratings may then be taken into account in the re-allocation algorithm for future upgrades to the patron.

In alternative embodiments, the patrons eligible for the upgrade may be notified using standard email communications over a wireless device, mobile telephone, and/or other standard communication means. For example, standard text-to-voice and/or voice-to-text communications may be used to contact the patron to evaluate whether an upgrade will be accepted and to actually accept the upgrade.

In another embodiment of the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that have already purchased tickets in the vicinity of the stadium but were unable to get seats and/or may be in the vicinity of the stadium but were unable to get seats. Since the present invention re-allocates and/or sells tickets at any time prior to and/or after beginning of game time in accordance with one embodiment, the patron may be in the general vicinity of the stadium to take advantage of this embodiment of the invention or even at any location when being offered upgrades and/or seats well in advance of the game. For example, the present invention can upgrade or sell tickets to patrons well in advance of the game since it advantageously is permitted or has the authority to resell tickets either via ticket holders that do not show up during the game and/or, for example, season ticket holders that have authorized the stadium in advance to resell their tickets based on predetermined criteria, for example, when the season ticket holder notifies the stadium that they will not be present at next weeks game.

In one optional embodiment of the invention, the patron presents the usher with the confirmation number which the usher can enter into a wireless device using a local or private wireless network, or can simply use a walkie talkie or telephone to call the dispatcher to confirm the upgrade and/or new seats using the customer provided confirmation number. The dispatcher will have access to the system to enter the confirmation number to confirm the validity of the upgrade. Alternatively, a patron will retain their old ticket. The patron will give in the old ticket to the usher which is scanned or barcoded by the usher for immediate identification of new seats and used in place of, or in addition to, confirmation number.

Of course, the confirmation may optionally be made via customer name with an appropriate identification card or other information. Further, alternative methods may be used to verify that the confirmation number and/or ticket being used by the patron is valid. For example, the patron may be equipped with a printing device associated with the wireless device or download an actual ticket on line from home prior to the game for the new ticket or upgrade. Alternatively, the patron may be equipped with an identifier card, optionally including a bar code with a unique identifier relating to the patron's account information and profile that can be scanned for additional convenience. Alternatively, a wireless device may be used to securely store this type of identification and/or account information.

In at least one alternative embodiment of the invention, the patron may comprise optionally a corporate account that has a number of tickets, for example, season tickets. In this embodiment, the corporate account may have associated therewith a plurality of email addresses or other communication addresses to transmit the seat or upgrade offer to a number of potential patrons that may rotate their attendance at the games. In accordance with this optional embodiment, multiple emails can be stored for a single user/corporate account, and the system may transmit individual messages to all email addresses, or may only transmit messages to individual patrons for corporate account that individually advise the system that they are associated with a particular ticket/bar code for a particular game and will be/are present at a particular game.

In an alternative embodiment, patrons may enter the stadium and subsequently inform the system that they are present and interested in an upgrade via a kiosk where the patron can scan a bar code and enter their customer number to be eligible for upgrades during the game. The system is then able to transmit a message to the customer, assuming that the customer has pre-registered with the system with the appropriate contact information. Alternatively, or in addition to individual use of a kiosk(s), the customer sales office may have a kiosk or additional functionality to enter the customer name and/or customer account and scan in the bar coded ticket on the spot to register each patron as they enter the stadium or venue.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron upon entry in the stadium to help the patron decide the quality of the upgrade and whether to accept when an offer is received by the patron at a predetermined time. The graphical map may comprise a small booklet with a map of the stadium showing seat locations, and optionally a game schedule.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provides additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In alternative embodiments, patrons in the vicinity of the upgraded and re-allocated patrons may optionally be eligible for a dating or matching service where patrons register and provide profile information to the system and/or through a third service provider dating service. Once the system knows that the patrons will be coming to the game and/or have actually checked in to the stadium, the system can then arrange for the two, four, etc. patrons to meet each other by allocating and/or re-allocating seats to the patrons together. Thus, based on profile information, customer request and availability, the system is able to upgrade or sell tickets to patrons to maximize their chances of meeting someone at the game. This optional feature provides significant potential enjoyment for the patrons participating in this dating or connection program. In accordance with this embodiment, one possible sequence of acceptance steps involves profile matching the two patrons (or groups of patrons) based on predetermined profile information; transmitting a first message to the first patron regarding availability of the second patron and requesting a conditional acceptance form the first patron; transmitting a second message to the second patron indicating that the first patron has conditionally accepted and request the second patron to accept; and when the second patron accepts before the first patron has rescinded the conditional acceptance, finalizing the upgrade and/or seat allocation for the first and second patrons. This embodiment of the invention is a complete reverse from typical dating and/or matchmaking services which attempt to develop detailed algorithms for the matching process because of the significant decision that exists in determining who to spend valuable time with. In accordance with the invention, patrons are already present at the game, and therefore, half or more than half the effort is already done. The remainder is to actually meet the other person which can be accomplished with profile criteria, whether or not the algorithms are very sophisticated.

In one embodiment, the patrons that are being matched have their original seats maintained and not made available for other upgrades in the event the matching does not work out early on. In this embodiment, one or both the patrons can return to their original seat. Hopefully, there will not be a significant argument of who would need to return to their original seat if an upgrade is actually performed. In addition, in accordance with this embodiment, the seats that are selected do not necessarily have to be better seats in the classical sense. That is, seats further away from other ticket holders might be considered preferred when matching two individuals for the first time. Alternatively, couple that would prefer a little more privacy or quieter game might request to be moved to a more isolated area. Alternatively, families with small children might prefer to be moved to a less busy area as well during the game where the children might be able to freely move around. All these scenarios and/or alternatives are possible in view of the present invention. The advantage of performing a match in a public setting is that the patrons do not have to worry about leaving or ending the date, and also do not have to worry that the other person will have their home address.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like.

In addition, this feature also optionally permits the patrons that have participated in the program to rate one another for future dates. For example, one patron can rate the conversational benefits of the second patron, the appearance of the second patron, the overall short term versus long terms relationship goals of the patron, and the like. These ratings may then be taken into account in the algorithm for future seat assignments, re-allocations and/or upgrades in the future for the first and second patrons, and all other patrons will now benefit with the additional profile information of the first and second patrons. The matching service may be for amusement or work related networking purposes, for example, to meet an executive that the patron currently works with or wishes to work with/sell in the future.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like. In addition, the system advantageously and optionally provides the feature of allowing patrons to text message one another directly, and/or exchange pictures via wireless email, text messaging, and other wireless devices that provide the standard capability of exchanging pictures, such a T Mobile and/or Sprint.

In alternative embodiments, the ticket holder can call in via a voice to text message, text message and/or email and let the stadium know early that they are not coming. In this manner the ticket holder obtains the convenience of the stadium or venue reselling their tickets in advance, thereby providing the venue with additional time to maximize the resale of the ticket.

In alternative embodiments, when the patron enters the stadium, they have their ticket barcoded or other device that detects their presence can be used such as infrared, Bluetooth, etc., and then they can become eligible for an upgrade. The patron can register in advance that they want to receive upgrades by providing their name, message address, e.g., email, telephone text message address, etc., and optionally their credit card or other payment mechanism for upgrades that actually cost money as opposed to free upgrades. In alternative embodiments, the patron can register at the ticket booth when purchasing their original ticket. In this scenario; the stadium representative can enter this information on behalf of, and with the permission of, the patron since the patron may already be providing their credit card, debit card, etc. to purchase the original tickets. Alternatively or in addition, a kiosk may be provided where the patron can enter their original ticket, e.g., scan in their original ticket and provide their name and text message information in the stadium to register for a one time upgrade for the game after purchasing, for example, a regular admission ticket.

In alternative embodiments, an usher can verify that the patron should be upgraded by the patron providing the confirmation number that may be transmitted in real-time by the system, and/or by the patron using their original confirmation number or original ticket with barcode or other identification means, such as a smart card, infrared reader, etc. that represents original ticket and presenting same to the user. The usher then needs only to scan in the original ticket and the system will verify whether the patron associated with the original ticket is valid and whether the upgrade is valid.

In alternative embodiments, a warning message may be sent to the ticket holder that has not shown up to game warning them that if they do not respond within a certain time period that their seat will be re-allocated or re-assigned to another patron. Similarly, a release message may be sent to the ticket holder after their seat has actually been released and/or re-allocated, thereby notifying the patron that if they change their mind in attending the game, they will have to obtain an additional ticket. In alternative embodiments, the ticket holder that has their seat released and re-allocated can be themselves re-allocated a similar, worse or better seat, depending on, for example, their subscriber value and/or other criteria. For example, if the patron is provided a better seat, this will encourage them to more readily give up their seats in the future even if they are attending the game. On the other hand, if the patron is provided a worse seat, then this encourages them not to artificially give up or have their seat released when attending the game. Accordingly, the present invention is designed to deal with various behavioral patterns of specific ticket holders, and may optionally and advantageously be a ticket holder specific with respect to various criteria for re-assigning, releasing, selling and/or re-allocating tickets.

In alternative embodiments, the system transmits to the ticket holder a welcome message after being upgraded and after having being moved to a new upgraded seat location. In one embodiment, the system identifies that the patron has been successfully upgraded after the patron provides the usher with a confirmation number or original ticket, which is then verified by the usher and system.

In alternative embodiments, the system, after having identified which patrons have checked into the stadium and/or have been upgraded, transmits a trivia question and/or additional advertisements to all patrons attending the game. In alternative embodiments, the information is transmitted to both patrons that are attending the game and additional patrons that have registered in the past to receive information but that are not attending the game. The participants can, for example, answer trivia questions and respond with their wireless device. Depending on whether the patron is attending the game or not, the system may determine to offer or deal with each of the patrons differently. For example, for patrons at the game, winners may be successively determined and narrowed, as patrons successfully and unsuccessfully answer questions, round after round of questions in a “spelling bee” format. For patrons that are not attending the game, winners may be declared, or statistics provided to the broadcast station that can be aired on television. In yet additional alternative embodiments, instead of transmitting information/questions to the patrons via the wireless device, the information/questions are displayed on the stadium billboard for patrons at the game and/or on television for patrons that are watching the game on television. The patron can then merely respond via the device, e.g., the telephone accordingly via a voice-to-text system or via other mobile devices via text messaging.

In alternative embodiments, the present invention provides the advantage of additional advertising sponsorship to the venue. For example, in one embodiment, the venue is partitioned into different locations that may be assigned to different sponsors. In one embodiment, the sponsor that provides the most value may be assigned a certain number of premium seats that are not available to other sponsors.

For example, the sponsor may offer a discount on the upgrade if you are a Verizon or Verizon Wireless customer or they credit your cell account for each seat upgrade or you get say 30 free minutes, etc. In alternative embodiments, the present invention provides the advantage of one wireless provider to advertise on another wireless providers mobile phone or wireless device. For example, if Verizon Wireless is a sponsor of the upgrade system for a particular stadium, the present invention will still work with, for example, AT&T, SPRINT, and CINGULAR customers. An advertisement message sent with the upgrade offer may read on the AT&T phone, “brought to you by Verizon Wireless.” In an alternative embodiment of the present invention, text messaging is optionally used for mobile phones to perform the message communication of the present invention. The user is only required, in one embodiment, to reply or respond with a “Yes” to accept the upgrade offer since the user has advantageously pre-registered with the system, thereby minimizing the required communication/input by the user. In an alternative embodiment, the user, instead of pre-registering with the system, is charged on their wireless or even regular telephone number bill when they accept the upgrade offer. Thus, the wireless system that either administers the user’s regular or wireless account or the upgrade sponsor may be responsible for actually billing the customer in this alternative embodiment.

In the alternative embodiment when text messaging is optionally used alone or in combination with other communication methods, the system provides the additional advantage of maximizing bandwidth usage by not requiring use of bandwidth on the wireless voice system, thereby maximizing system resources.

In another alternative embodiment, the present invention optionally and advantageously provides a security and/or safety feature in the event of, for example, a minor event where a parent gets separated from a child, a disaster or other event that might require evacuation of the stadium. In one embodiment, the person needing help provides their name to an attendant that can search the system for the contact information of their companion/parent. The system can thereafter send an email and/or text message to the companion/parent regarding the status of that person and provide instructions for meeting that person or arranging help, authorizing medical procedures, and the like. In another embodiment, the person requiring help, e.g., a child provides the attendant or kiosk with their ticket which can, e.g., scan the bar code or other reader system. The system can either automatically provide a text message to the parent who can then reply to the child/attendant via the kiosk to meet the child.

Alternatively, the parent can be instructed to meet the child at a predetermined location, and to stop looking for the child because the child was found. Thus, for this example, the person who is lost or separated from their party can notify security or access a kiosk. Security can, for example, notify the parent that child is in safe custody, and should not search the stadium, and therefore, meet outside stadium in a pre-specified safe place.

In an alternative embodiment, if a child/person is separated, the security guard/kiosk can arrange the best place to meet, either in or outside the stadium, together based on an optional global positioning system (GPS). In addition, the party with the mobile device can be provided directions on where to go to meet their party from who they have been separated.

In an alternative embodiment, the present invention may also be used in a security, defense and/or safety setting to direct patrons in a stadium for an orderly evacuation or notify patrons regarding status of a safety related event via, for example, a broadcast message including text message, email and the like. In this manner, system communication resources may be most efficiently utilized by not over-utilizing the system via voice communication, unless completely necessary. For example, the message can be broadcast in the event of an impending hurricane. In this situation, patrons in different sections get different messages, for example, to exit the stadium out of gates/exits that are either less occupied or closest to the section the patrons are sitting in. Advantageously, the present invention has the patrons contact information, including optionally and advantageously text messaging, that can be broadcast or sent to different patrons. The advantage of text messaging is that the bandwidth is more efficiently used in the event of an emergency, and there are no busy signals as in a voice network. Further, the message is send, and if the network is at capacity, the system can automatically resend or the message will be placed in queue and sent as soon as capacity becomes available.

In another alternative embodiment of the invention, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction.

For instance, in sporting venues the bracelet ticket includes the machine readable information that comprises at least one of a bar code and radio frequency identifier used for security check in, and optionally check out. In this manner, the standard reading machines that can scan the bar code or RFID information can keep track of people that have checked into the sporting event and/or venue. Advantageously, the machine readable information on the bracelet can also be used by the venue in the event the patrons seat assignment is modified, for example, via an electronic ticket exchange or upgrade program. In this embodiment, the visible indicia are no longer valid for the actual seating that may be dynamically changed and only represents optionally an initial seat assignment. However, the machine readable information may be used as a code to reference the specific patron and assign that patron a new seat. Thus, when the ticket reader scans the ticket and actually identifies, for example, the bar code, this information can be used to reference the patron, update and/or confirm the patron's current seat via the reader used, for example, by ushers in the venue, kiosk, entrance to the venue, and the like.

In an alternative embodiment, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction. This information, as previously mentioned, may be visually cognizable for the patron and in combination, readable by electronic means if the bracelet includes a magnetic strip, bar code imprinting, or RF chip.

In an alternative embodiment of the present invention, the security bracelet and ticket combination of the present invention advantageously includes a bar code or other machine readable information such as a RFID device. When, for example, a child is separated form their parent, the parent can notify security and the seat number associated with the child. If the child attempts to leave with their bar code/identifier, the system detects the bar code/identifier as either being valid and identifying the child that is missing or being invalid and raising another red flag. In an alternative embodiment, the bar codes/identifiers associated between children and adults correspond such that the child identifier must be within a predetermined time and/or number of checking out identifiers from/within the adult identifier. If this does not occur, the system determines that the child is leaving without their parent, and possibly being abducted.

In an alternative embodiment, the system links one or more tickets/identifiers together and requires the tickets/identifiers to exit the venue or event within a predetermined time period from one another and/or within a predetermined number of tickets/identifiers that have exited the venue and/or event. In the event that one ticket/identifier exits the venue or event and the associated identifier does not, then an alarm or other indictor occurs, and the attendants will detain the patrons that have initiated the alarm to for security purposes.

In an alternative embodiment, the tickets are advantageously coded with designations such as adult, child and the like. In the event a child ticket/identifier exits the stadium before the associated adult and/or more that a predetermined time period and/or number of patrons exiting, the system can initiate an alarm so that an attendant can determine if a child has exited the venue or event without their parent or with a wrong parent potentially averting a kidnapping. In this embodiment, an additional combination is the use of the standard fast pass feature, for example, at theme parks, and the like, where the venue records predetermined events that the user of the card enters in a faster line. In this embodiment, if a child ticket/identifier is not associated with a parent ticket/identifier, for example, as described above, the child may be denied entry into the event or venue if not accompanied by their parent. In alternative embodiments, the venue/event sponsor or organizer associates tickets upon request from the patron. In addition, in another alternative embodiment, a kiosk is provided inside and/or outside the venue for, for example, parents to register their tickets and have them associated with their children's tickets to prevent the child from exiting the venue without them, for example, as described above.

In an alternative embodiment of the present invention, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In another alternative embodiment of the present invention, a security bracelet is advantageously utilized, for example, such as the security bracelet disclosed in U.S. application Ser. No. 10/680,207, filed on Oct. 8, 2003, to Abraham I. Reifer, et al., and incorporated herein by reference, in the event of a reported event, security breach, abduction, and the like. In this embodiment, all patrons exiting the stadium must show their ticket and/or identifier so that the venue can check all patrons out of the stadium. Thus, for example, if two kidnappers come in the stadium, and want to use one bracelet for a child, the second kidnapper will be stranded in the stadium. In addition, if one kidnapper buys two tickets, then upon exit with the child and the additional ticket, a barcode/identifier will be exiting without ever having checked in, and then the alarm will go off as well.

In another alternative embodiment, the present invention provides a broadcast message to warn patrons of an event, such as an advertisement, sale and/or even a weather related event such as a hurricane that might require the venue to be evacuated. Advantageously, in at least one embodiment, the broadcast message comprises standard text messaging that optimizes or better utilizes capacity form the communication system. Thus, when using text messaging capabilities, the present invention efficiently transmits text messages to numerous subscribers regarding, for example, exit information, contacting and/or meeting additional parties that have been separated, and the like.

In an alternative embodiment of the present invention, the present invention optionally provides the capability to penetrate into secondary market with season ticket holders selling ahead of time the games they will not be attending. For example, the present invention optionally provides the feature for the season ticket holder and/or general ticket purchaser the ability to view in advance of the season and/or game the schedule, and to alert the venue and/or stadium of games and/or events they will not be attending, thereby permitting the stadium/venue to attempt to resell the tickets to other patrons. For example, in one embodiment of the invention, the patron is provided with a monthly schedule listing the events that may be attended. The patron, such as a season ticket holder, may then click or place an indicator on all games they will not be attending for the season in advance, thereby providing the stadium with the ability to resell tickets well in advance of the event. Once the patron completes identifying games that will not be attended, the system then compiles a list and transmits the list to the patron for an optional confirmation. This list is then used by the system to release seats well in advance of the game. In an alternative embodiment of the invention, registered users of the system for, for example, upgrades, may also be notified of seat availability for sales prior to the game/event. In an alternative of this embodiment, registered users may receive text messages, emails, and the like, notifying them advantageously of the availability of seats that heretofore have never been easily available to the public for sale, thereby allowing the venue to participate in secondary market ticket sales.

In one alternative embodiment of the present invention, the system/process of the present invention provides or operates as a middle person/broker between the ticket holder that is returning tickets to the venue, such as the season ticket holder, and a ticket sales system and/or company, such as tickets.com, by notifying the tickets company of the newly available seats via notification by the ticket holder, such as the season ticket holder of season ticket games not being attended.

In one alternative embodiment of the invention, the system and/or process transmits text messages, emails and the like, to offer tickets and/or seats and/or admittance to subscribers for events and/or games with empty seats even before game. Thus, the present invention allows the venue to participate in the secondary ticket sales market and the upgrade market, thereby increasing revenue and fan loyalty.

Of course, all of the embodiments of the present invention may be used for any reserved seating event, and/or venue that require tickets for entry thereof.

In another alternative embodiment of the present invention, the use of machine readable identifiers provides advantages for, for example, the upgrade program or ticket exchange of the present invention. For example, when the upgrade, reallocation and/or electronic ticket is issued, the machine readable identifier, for example, the bar code, on the original ticket is invalidated, thereby preventing use of the invalidated ticket. Accordingly, when a new ticket holder purchases the ticket form the season ticket holder, the new purchaser will be issued a new machine readable identifier, and optionally a new paper ticket. The present invention advantageously is able to handle the issuance of a new ticket and invalidates the old ticket and optionally the old identifier that has, for example, been returned by the season ticket holder, thereby providing dynamic ticketing capability.

In an alternative embodiment of the present invention, the new patron obtains a new identifier such as a barcode, the old bar code of, for example, the season ticket holder is invalidated. In one embodiment of the invention, season ticket holders are offered to opt in the upgrade process. Various commercial incentives are possible for the season ticket holder to opt in the upgrade process, such as monetary compensation when their ticket is used for an upgrade and/or resold whether they express their intention not to go to the game prior to the game, and the like. Alternatively, season ticket holders may be offered that the cost of their season tickets will, for example, remain the same as the previous year or be reduced if they participate in the program. Therefore, the combination season ticket trade-in and upgrade program in one embodiment of the invention will be beneficial to season ticket holders by allowing them to trade when they already know that they have no intention of attending a game, and allow the season ticket holder to recoup some cost of the season tickets if they do not attend and their ticket is used as an upgrade. In addition, additional patrons of the event and/or sports team are permitted to attend the game in locations/seats that they might never have been able to obtain access to. Further, the venue/stadium/team maximize revenues by being able to place tickets on the secondary market when the ticket holder notifies the venue early enough that they are not attending the event, the venue also obtains additional revenue from upgrades when tickets are upgraded, and the venue obtains additional fan loyalty.

In another embodiment of the present invention, the system provides the ability to advertise via email, text messaging, and the like, for one wireless carrier on the wireless device that is using another wireless carrier. Since the user of the wireless device has requested the service, the user appropriately receives the communication from the ticketing system of the present invention, and therefore, also appropriately received the advertisement from the wireless carrier that is different than the wireless carrier that the user of the wireless may be using at that time.

In another alternative embodiment of the present invention, offers to purchase seats either during the game or even well in advance of the game are "pushed" or transmitted out to registered users that have supplied their wireless and/or Internet addresses. For example, patrons can register in advance for the upgrade and/or regular ticket offers to purchase admittance via various methods including the Internet. When seats band/or admittance becomes available, a broadcast message or other standard messages may be transmitted to the registered patrons to notify them of the seat availability. Thus, seat offers are "pushed" to registered users that have requested this service advantageously to a wireless device and/or other address including standard telephone communication, as well as additional optional advertisements. The system, in one alternative embodiment, provides the user the option when registering to accept certain types of advertisements to be received on their wireless device via email and/or text messaging. In other embodiments, the user does not have the option of which advertisements to receive.

Advantageously, in accordance with one alternative embodiment of the present invention, if a patron decides to attend an event such as a sporting event when the patron does not have time to wait to receive paper tickets (e.g., the patron is visiting in another city/location and does not have time to wait to receive tickets via mail and is on the go), the system of the present invention transmits a ticket to the patron via, for example, a wireless communication system and/or other standard electronic communication system such as the Internet, and the patron can present their ticket, for example, on their wireless device and show up to game.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Patrons then text message and/or email and/or answer questions via voice-to-text messaging their answers. The system can then display the overall number of answers that are correct and incorrect, display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game.

The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another alternative embodiment of the present invention, the system uses a seat database to determine which of the reserved seats are currently in use. The system may integrate with the seat database system of a venue and/or stadium or optionally be used in parallel with the seat venue/stadium database. For example, prior to the event, the system may utilize the seat database of the venue to determine available seating and patrons that do not show up after a predetermined period of time. Alternatively, the present invention can operate using a separate database from the event/venue by copying or building a separate database used for the ticketing and/or upgrading according to the present invention. In this alternative, as patrons enter the venue, they are checked in directly to this separate database. At the time of the event, the system will be able to check-in patrons using either the identification system, e.g., bar code scanner, of the event or venue, or provide a separate identification system.

In alternative embodiments of the invention, the patron that knows they are attending the game but is going to be late can send in a HOLD message even prior to being provided a warning message that their seats are to be released if the patron does not respond to the message with the HOLD request. That is, in this embodiment, since the patron already knows well in advance that they are attending the game, but perhaps stuck in traffic, the patron can initiate the HOLD message before even being warned in advance of the possibility of their seat being released.

In another alternative embodiment, patrons that have registered with the system and optionally checked into the stadium and/or venue in advance and who also know that they would like an upgrade and/or ticket, may initiate their own upgrade request to the system to notify the system of their willingness to purchase an upgrade and/or new ticket for the event/venue. The system may then place these patrons on a higher priority since they have already expressed and intent and/or willingness to purchase the upgrade or ticket. The patron may notify the event and/or stadium of their willingness optionally well in advance of the game or near/after game time at a time which the patron commits or expresses an additional heightened desire to upgrade and/or purchase a ticket.

In alternative embodiments, the system includes the advantage of allowing patrons to register free for a predetermined period of time, for example, for the first year, without paying a yearly subscriber fee. Alternatively and/or in addition thereto, the system provides the patron with their first upgrade for free or for a reduced rate to further encourage the patron to register with the system and method of the present invention. Alternatively and/or in addition thereto, the system of the present invention offers the patron reduced and/or free concessions when purchasing a membership, ticket and/or upgrade to further encourage the patron to participate in the offers of the present invention.

In alternative embodiments of the present invention, the matching system and/or process, permits participants in the program to initiate a message to the system with the seat location and/or name of the patron that they would like to be matched with for a meeting, networking and/or socializing such as a date. In this embodiment, the system may the push the message to the other subscriber and assign new seats to the individuals that are to be matched. Alternatively, the system Need not require a specific confirmation that the second individual to be notified of the potential match is physically located near the first individual, but can rely on the first individual to provide that information. For example, the first individual may see a potential date in a restaurant, and may then send a message to the system with that person's name or address, that they would like to meet that other individual. In that situation, the second individual will receive a message of the possible match, and can respond and accept or reject the offer to meet. The second individual can then provide a meeting destination or the system can suggest a meeting place based on the first individual advising the system of their location, and the location of the second individual.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Advantageously, the multiple choice questions each have unique selections, such as a1, b1, c1 and d1 for question #1; a2, b2, c2, and d2 for question

#2; a3, b3, c3 and d3 for question #3, and the like. In this embodiment, the actual timing of questions is not necessary since each question and answer is unique. Therefore, the speed of responding to the question is immaterial to the winner of the contest and/or correct answer. Also, in the event one patron answers the question late, there will be no confusion which question the patron is submitting an answer for. Patrons text message and/or email and/or answer questions via voice-to-text messaging their answers as indicated above using the unique set of answers, in one embodiment. In alternative embodiments, the first predetermined number of patrons that answer the question correctly are considered the winners.

The system can then display the overall number of answers that are correct and incorrect, e.g., a1 50%, b1 28%, c1 12% and d1 10%, and display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another embodiment of the invention in connection with the seating upgrade and/or assignment system, an identifier and/or machine identifier such as a bar code, RFID, etc. optionally remains static for the user on the user's ticket and/or device that is provided for optional paperless ticketing. For example, the identifier will remain the same associated with the user, but the seat assignment, privileges, user characteristics, user preferences, and the like, may be dynamically changes. The system and method of the present invention will be updated so that the identifier can represent a dynamic seat assignment or other dynamic information, such as general admission to an associated event, or other event and/or venue, including, for example, a restaurant, bar, and the like.

In another embodiment of the present invention, the upgrades process and/or feature may be provided to users/patrons as a complimentary reward for fan loyalty, to reward the user but also market other goods/services and/or other advertising opportunities to be transmitted via the wireless device and/or mobile phone. In one embodiment of the invention, the system and/or method initially queries the user, for example, at the beginning of the trivia contest and/or tournament or at the beginning of the game, whether the user is present in the stadium or not. The system can then perform, for example, the trivia contest, and determine a winner(s) to award for example some form of reward. Furthermore, in another embodiment of the invention, based on the number of people responding that they are present at the game, the present invention advantageously provides a random upgrade to a predetermined number of patrons as an additional fan loyalty program and/or advertising sponsorship to one or more entities that sponsor the free upgrades.

In another embodiment of the invention, a system and/or method is provided that advantageously builds and/or acquires and/or collects mobile contact addresses of users in an efficient manner. For example, in accordance with the present invention, a user advantageously need only provide the communication network and telephone number, and the present invention builds a data address therefrom. This allows the mobile or wireless device user to still register for a service without specifically knowing their data address for, for example, data communication such as SMS messaging, text messaging, email, and the like. In one embodiment, the mobile user is provided a drop down menu where the user selects the communication network and provides their mobile phone number.

The present invention is particularly advantageous currently with the recent enactment by the Federal Communications Commission (FCC) number portability where mobile phone users are able to transfer their existing numbers to other networks. Accordingly, we have determined that a user's number will advantageously provide a mode of contact for the user even when the user decides to change communication networks. For example, in at least one embodiment, the present invention uses the cell phone number and IP address combination, e.g., 2029422785@verizon.net, or 3016814455@attwireless.com, and/or any other mobile telephone plus IP address combination that may be used to utilize the IP address of the cell phone. Alternatively and/or in addition, the SMS address may be used.

In one embodiment of the invention, the software processes and system determines and builds the actual messaging address (email, text, SMS, and the like) to send messages to the mobile device by the user only selecting and/or providing the communications network and the telephone number. Thus, the present invention advantageously simplifies the process for mobile or wireless device users to register and/or provide contact information, and therefore, beneficially increases the number of individuals that can effectively and easily register for a communication service.

In another embodiment, the present invention facilitates the ability for potential users to signup for the service of receiving, for example, trivia, upgrades and/or text messages via a user sign up device or apparatus. In one embodiment, the user sign up sheet includes numbers and/or circles that can be filled in like a grid, where the user can fill in or cover the numbers that identify their portable number. In addition, the user can check off the specific network carrier from a list of network carriers, or simply enter their specific network carrier. The user sign up sheet may be done electronically via a computer and user interface as described above, or may initially be filled out by a user via, for example, a piece of paper and then later entered into the computer system of the present invention.

In another embodiment of the invention, the system and method of the present invention is capable of re-locating a patron via the mobile address that was previously provided, even if the patron has changed wireless carriers. For example, in one embodiment, with the recent feature of mobile phone portability by the FCC, we have determined that a significant number of mobile phone users are likely never to change their number/address, and therefore, the system and method of the present invention is able to send text messages and/or email to all network addresses using the telephone number of the user if the system suspects that the previously provided network by the user is no longer being used. In this embodiment, the user can optionally respond to the message and/or network broadcast message, confirming that one of the messages has been received.

In another embodiment of the message, whenever a user wants to contact a mobile phone, mobile wireless device or even computer based, via for example, an Internet based account, wants to contact another mobile wireless device user, the present invention provides a transmission device, for example, via the Internet or individual models/mobile phones used for each of the networks to broadcast the message on all networks. Advantageously, in accordance with this embodiment, since the user is likely to maintain the same telephone number, their data or text messaging address will be their telephone number and one of the few network addresses. This type of broadcast message can happen anytime, and even for voice communication when the user of the wireless device needs to receive a data, text and/or voice message.

In another alternative embodiment of the invention, as described previously, the invention may be used by a patron to obtain specific data or information regarding sports or venue related information of interest. For example, patrons may communicate with the system and forward a player jersey number or number of racecar during an event such as a baseball game, football game, racing event such as Nascar, to obtain additional information including current statistics and past statistics. The present invention can then optionally sent statistics throughout the game or event to the patron without the patron requesting, for example, at specific time intervals or after notable achievements during the event, such as a home run, touch down, 7th inning stretch, half time, number of laps traveled, and the like.

Thus, the present invention includes many variations in the type of information a user may receive, whether specifically checked into a venue or registered for the service for a particular event. In addition, the present invention includes various processes and systems for ensuring delivery of messages to patrons that have requested the service or merely sending messages that a patron may be interested in receiving.

In another embodiment of the invention, the matching and/or networking system includes the ability to contact and/or notify the users to coordinate the meeting using any one of a plurality of communication methods including text messaging, email and/or instant messaging, with the additional advantage of transmitting pictures, video and/or other data that provides additional information regarding the other person that has been suggested for the match and/or network. In one implementation of this embodiment, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. For example, different message transmit and/or receive formats may be used depending on the system. The present invention beneficially parses the various different formats to obtain the necessary information for the communications described herein. In addition, the represent invention formats the messages for the different wireless devices so that the messages may be appropriately received even though different devices and/or communication networks have different messaging formats. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In accordance with another embodiment of the invention, the matching and/or networking system includes the option of permitting a subscriber to notify the system when they are ready for a potential meeting and/or match. Once the matching and/or networking system is notified of the subscriber requesting the match, the system is then capable of either tracking the user though a positioning system such as GPS, permitting the user to register at predetermined locations upon user initiation such as via Bluetooth, RFID, infrared, and the like. In accordance with this embodiment, the subscribers are not being constantly tracked, and therefore, maintain an additional level of privacy. In alternative embodiment, the present invention continuously tracks the subscribers without specifically requesting to be matched. In this alternative embodiment, the subscriber is provided with less privacy because they may be notified of a specific match even though they might not be interested in the match and/or meeting at that time.

In an alternative embodiment, the present invention provides subscribers with the ability to accept/reject the match before each of the subscribers receive personal information of the other and/or before the date/match has been arranged with at minimum a meeting location. In this embodiment, the invention requires that both users accept the match and/or date prior to notifying the subscribers of the contact information for each subscriber. Therefore, subscribers can optionally request additional information from the system of the present invention, even multiple times, to better understand the potential date and/or match before accepting, and importantly, before the other subscriber is provided contact information and/or a meeting location of the subscriber. In the embodiment where the present invention merely provides the meeting location, the present invention advantageously does not provide the subscribers contact information and/or other personal information before the match/date. Advantageously, in accordance with this embodiment of the invention, subscribers never receive personalized or personal contact information unless the subscribers, after meeting in person, agree to exchange such information.

In another embodiment of the invention, the dating and/or networking system provides subscribers the functionality to email, instant message and/or text message at least one additional piece of personal information and/or questions, optionally directly to each other or via the system anonymously, to obtain additional information that may be more relevant than the user profile or information from the user profile that was used to make the initial date/match.

In another embodiment of the dating and/or matching system of the present invention, the system optionally provides automatic and/or user initiated registration in a particular establishment and/or geographic location, which can be used instead of a location determination system such as GPS, or together with such system. This form of registration may be even more precise than GPS because it confirms a subscriber's presence within a specific store, establishment, entertainment establishment, restaurant, and the like. Thus, in these embodiments, the subscriber either initiates the registration as described above, or alternatively, if the subscriber optionally sets the wireless device to automatic registration based on the appearance at a predetermined registration area and/or location, the subscriber will be automatically registered to receive communications regarding a potential match/date.

In an alternative embodiment of the present invention, once the dating and/or matching system determines that a potential match/date has been detected, the system optionally notifies the different subscribers and asks whether they want to continue to participate in the matching/dating program. When both, some and/or all subscribers agree to participate, the present invention can forward to each subscriber automatically the information that each subscriber shares substantially in common and/or the information that was responsible for the match/date between the subscribers. In this embodiment of the invention, the subscribers will know immediately the information that should be most relevant in making the match/date and can determine whether to actually agree to either contact or send the other subscriber additional information and/or arrange to meet the subscriber at a pre-designated location.

In an alternative embodiment of the present invention, the present invention optionally includes the ability to recommend a potential meeting place for the subscribers to meet after determining that the subscribers have agreed to participate in the date/meeting. In this embodiment, the present invention advantageously determines the location based on, for example, subscriber preferences, geographic location that is preferential for at least one of the subscribers and/or both subscribers, predetermined location where, for example, a sponsor will receive patronage and/or provide a discount for the subscribers and/or actual pay the organizer of the dating/matching system an advertising fee to promote their sponsorship. Accordingly, the present invention advantageously determines not only a potential match/date, but advantageously suggests, recommends and/or determines a specific location and/or geographic location and/or restaurant, clothing store, zoo, museum, and/or other suitable location for the subscribers to meet and optionally based on geographic distance and/or location.

Additional dating and/or matching features and/or differentiators of the networking and/or dating system of the present invention include one or more fo the following:

Wireless messaging platform supports interactive messaging

Wireless messaging platform provides simultaneous parallel applications to run without collision Multiple wireless initiatives or topics run without conflict Different initiatives or topics may be user specific or selectable While each initiative runs independently, there can be overlap in terms of customer base Platform is flexible to add/remove initiatives quickly and efficiently One wireless carrier/network can be a dating/matching sponsor and advertise on the wireless device and/or network of another wireless carrier/network Contact members to notify of the match/date to allow members to either directly contact each other or send additional information via, for example, text messaging, email, instant messaging, such as pictures, video, and the like Contact members or wait for request from members to participate in match/date initiative; can then automatically track member via GPS instead of constantly tracking member all the time, thereby increasing privacy of member Contact each subscriber that is being offered the date/match and obtain approval for the match prior to actually notifying potential members that match has been made Contact users after initial match has been conditionally approved, and provides users the capability to request additional information, such as personal information from the other member or other members which the requestor still wants to know before finally accepting the date/match Members can register or "check-in" at predetermined locations and/or establishments which is one additional level of specificity, for example, with regard to the location where a member is that may be interested in matching; For example, two or more members may actually be in the same restaurant where they can be informed of one or more other subscribers being present; members can register via sending a message to the system via text message, email, RFID, Bluetooth, and the like, either by initiating a registration or automatically Contact members after initial match has been conditionally approved and exchange, optionally automatically, profile information that was significant in making the match/date and/or other important information regarding a match/date that a member may want to know before finally accepting the match/date and/or information the members may want to know that is geared particularly for a first date, e.g., likes/dislikes, common interests, favorite foods, wines, alcoholic beverages, and the like Contact members to suggest and/or recommend and/or arrange meeting place based on, for example, geographic location, common interests/sports, common food tastes, common beverage tastes, common entertainment preferences and/or sponsors willing to, or interested in, being utilized for the match/date for the suggestion and/or recommendation, and optionally providing the members a discount and/or compensating by the sponsor to the networking and/or dating system proprietor for the advertising and/or recommendation to visit that sponsor Wireless messaging platform includes a protocol conversion server functioning to interface with a variety of wireless networks having different messaging characteristics for both transmitting and receiving messages, and parsing the different message formats for the content from a received message, and transmitting a message to a plurality of different networks and/or devices having different messaging and/or interface capabilities and/or functionality Contact members with a wireless consent form indicating that the matching/dating system and/or the members participating in the match/date have generally consented to potential cohabitation optionally without any recourse to the other party. Alternatively, the members may be contacted with other types of informed consent forms with limited recourse for acts and/or aggressive acts that are clearly assaults, but not sexual related misconduct or sexual related crimes that are felonious in nature carrying a high penalty/sentence. Alternatively, members may be presented with consent forms that eliminate any criminal penalty, but do not foreclose the possibility of civil lawsuits for damages relating to torts, and the like As another alternative and/or in addition thereto, members may be presented with consent forms that eliminate any civil penalty, but do not foreclose the possibility of criminal lawsuits for criminal type activities, perhaps with the exception of the most severe sexual crimes such as rape and/or sexual assault that carry significant prison time.

For example, athletes, celebrities, high worth individuals, or even average individuals, male or female, may be interested in the wireless consent initiative because that allows them more flexibility to meet a variety of individuals without the worry of later being sued. In additional alternative embodiments, broadcast messages may be transmitted to numerous individual that may be interested in meeting and/or dating a celebrity or predetermined individual or individuals. In this embodiment, the optimum matching individual or individuals may be selected to meet with the celebrity, celebrities, and the like, while utilizing the informed consent feature of the present invention. In another alternative embodiment, an individual or individuals may be randomly selected as part of a match or date, based on a lottery or other competition to meet or date a specific individual or individuals.

Additional optional hardware and software requirements are as follows for one or more embodiments of the present invention:

System Capabilities

Platform supports interactive messaging

Platform provides simultaneous parallel applications to run without collision

Multiple wireless initiatives or topics run without conflict

Different initiatives or topics may be user specific or selectable

While each initiative runs independently, there can be overlap in terms of customer base Platform is flexible to add/remove initiatives quickly and efficiently Wireless Initiatives Interactive trivia with fans inside and outside of the stadium Targeted messaging, e.g., targeted advertising Broadcast messaging, e.g., general advertising Interactive messaging, e.g., with concessions Profiling for each initiative or topic, e.g., based on network operator Urgent and emergency messaging Specific initiative: discounts for concessions and/or memorabilia Specific initiative: invite patrons to different activities before, during or after game, e.g., player loyalty, family activities, etc.

Specific initiative: seating upgrade program

Specific initiative: messaging patrons in one section and separate messaging to patrons in another section Specific initiative: messaging parent of a missing child Special initiative: dating where patrons can keep their seats to return to them, or their seats are re-allocated. In alternative embodiments, the patrons switch seats instead of moving to empty seats, either for the entire game or only a portion thereof with other patrons for match making possibilities.

Functional Specifications

Front end for user signup and profiling-secure site—for example, modeled after www.mlb.com, include one or more of:

type of seats does the customer want for upgrade (decks and range of sections)

information for dating concession profile capability for additional profile information validate user by sending message to device upon sign up auto append of network information to phone number during signup login and password protected site frames on website or interface that can be easily configured to have look and feel, for example, of particular baseball team capability for space on screen for advertising opportunity that can easily be modified and relatively dynamic capability to handle lost passwords web page or interface where customers with season tickets can mark a calendar with the seats they want to keep and the ones they are interested in freeing up for early sale or upgrade.

The optional Front End of the present invention used for administration and setting up parameter for each application, optionally includes a secure site, with one or more of the following:

application email address and password minutes for all the configuration parameters and/or functionality number of threads for each application for upgrades, at least one of releasing customers old seat immediately, or it until the customer approves of the release, or holding the customer's seat for a predetermined portion or all of the game, for example, in the dating functionality)

set schedule for games section rating setup, and seat upgrade pricing revenue allocation model provide a number of retries if message send failure Concessions The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

Concession Wireless Initiative

Purchased via cell phone

Web registration for preferences

Targeted concession offers

Confirmation that purchase is ready

Delivered to seat or ready for expedited pickup

Customer convenience: system identifies closest concessions to customer

Customer convenience: system determines concessions with short wait

Each concession labeled with a number for customer identification and fulfillment Customers can request menu, or register for each game to receive menu around game time via mobile device GPS can be used effectively to inform customer of closest concession stand to pickup order, and/or customer can provide section number and/or seat location for system to identify most convenient concession stand Most convenient concession stand can be determined based on one or more, or combination of, predetermined criteria, such as, closest concession location, shortest wait in line, specific item being ordered, and the like.

Interactive messaging, e.g., with concessions

Specific initiative: discounts for concessions and/or memorabilia

The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

In one alternative embodiment, the following message exchanges may be used:

First Message

"In Game" Concessions

Menu will be sent soon!

Reply with #, item short form and seating section

Ex: BE=beer

Reply 3BE for 3 beers

408SEC for section 408

Powered by NEXTEL

Second Message (paper menu?)

Menu

BE=Beer; CO=Coke; DCO=Diet Coke

HD=Hot Dog; BUR=Burger

TA=Taco/Salsa; PO=Popcorn

FF=French Fries; CH=Chips

PZ=Pretzel; PT=Peanut

LEM=Lemon Ice

Third Message

Order received!

Summary:

3 HD @ $3=$9

2 CO @ $3=$6

2 LEM @ $3.50=$7

Total=$22

Reply Y to ACCEPT

Credit Card charged

N to CANCEL

Fourth Message

Thank you for ordering!

Your order has been confirmed!

Confirm # REIF1001

Powered by: THE SPORTS AUTHORITY!

Fifth Message

ORDER READY

Bring Confirm # REIF1001 to Concession # 33 by sect # 212

$2 off NIKE baseball gloves

Bring #NIKE305 and game ticket to

Any SPORTS AUTHORITY!

In another embodiment of the invention used in concessions initiative, the concession attendant receives the confirmation number or other identifying information from the customer when picking up the concessions. The concessions attendant enters the confirmation number or other identifying information when ready or optionally clicks on the order on the computer screen via a concessions interface associated therewith. From there, the order is then cleared from the system with respect to orders that require fulfillment, advantageously allowing the workers to streamline their work activities in the concessions. In an alternative embodiment, the concessions are actually delivered to the customer using the customer provided seating information, either provided by the customer through, for example, the wireless device or other registration and/or notification process, or even via a telephone call or automated attendant to associate with the order.

In another embodiment of the invention, the concessions menu is advantageously only delivered to customers that have entered the stadium via a location determination system, and/or checked into the stadium via a ticket reader/scanner. In alternative embodiments, all customers that have registered for the concessions service will receive an introductory message. Thus, customers that are not attending the game need only reply with a request to terminate the concessions service for that event and/or game.

In an alternative embodiment, the customer is advantageously directed to closest concessions via, for example, GPS chip in phone or by knowing where the customer sits at check in, or by having the customer input their seat location or location where they would like to pickup the concessions.

In another embodiment of the invention, we have determined that some mobile phones will utilize different transmit and receive addresses, and therefore, a user may not know how to appropriately register to be a subscriber for one or more wireless initiatives. For example, we have determined that some mobile phone networks utilize slightly different or different electronic addresses for the transmitting and receiving of electronic messages. For example, for the Research In Motion (RIM) Blackberry communication service, the mobile device is assigned a desktop email address. In one configuration of Blackberry, the mobile device only has one address. However, in the non-integrated configuration, the mobile device actually has a separate address when transmitting from the receive address.

In accordance with this embodiment of the invention, the user registers by providing their mobile phone number and optionally a network carrier for same. In this embodiment, the mobile phone user registers with their phone number and optionally wireless network provider. The registration system of the present invention then sends a message to the mobile device, requesting that the mobile device respond, optionally with a predetermined code and/or predetermined message. The mobile device then responds to the registration system, and the registration system corresponds the mobile device response with the original registered mobile address, thereby completing the registration process by ensuring that responses received from the mobile device can be mapped appropriately to the mobile subscriber. In the embodiment where the mobile user is requested to provide a predetermined code and/or message, the registration system uses the predetermined code to map the mobile phone response potentially having a different address with the transmit address provided by the user.

Dating, Matchmaking and/or Networking

In another embodiment of the invention, patrons are provided the opportunity to meet others in the venue or at a predesignated location near or away from the venue using standard matching rules. In one embodiment, the presence of the user is detected when entering the stadium, for example, via the ticket entrance systems. In another embodiment, the presence of the patron is detected or determined based on a message that is send to the user, for example, either right before, during or after the game. In this embodiment, the user can be prompted with a request whether they would like to participate in the matchmaking, dating and/or networking program.

For example, potential business or social partners may be selected or prompted for networking or dating. When the user responds yes, in this embodiment, their current seat is irrelevant if that seat is not to be released for another patron. Therefore, the system need only select a new set of seats for the networking and/or dating for the patrons, transmit the patrons the additional new seats via, for example, a wireless ticket, update the venue seating database for subsequent verification by the ushers when seating the patrons. The patrons may then proceed to the new location and have a meeting or date, and then return to their original seats if desired.

In another embodiment, a "burnt bridge" approach or feature is provided where the original seats for the patrons that are meeting are then released for other upgrade and/or networking programs. In this embodiment, the original seat of the patron must be known for example, via check-in procedure, registration for the program in advance for example over the web registration process or other registration process, or via the patron responding to the system with their wireless device of their current seat location. Alternate combinations or modifications of the above embodiments is also used.

Trivia

In the alternative embodiment of providing the user trivia information, based on registration and/or location, for example, while attending the game, watching the game at home, or any time prior to or after the game, the user may be provided with questions, as described above, to answer as part of a tournament and/or to be eligible for prizes, awards, and the like. In one embodiment, a section or portion of the users are targeted for the questions together, while other sections and/or portions of the users are targeted at a time period thereafter, for example, 1 minute later, to stagger the communication and transmission of data, thereby reducing congestion and/or unnecessary hardware to accomplish the transmission and acceptance of information to/from the patron.

In one embodiment, while all the questions are staggered over a predetermined period of time to the patrons, whether limited to patrons in the stadium, out of the stadium and/or both, the patrons are not notified whether their answer is correct until after all questions have been transmitted, and all patrons are provided the opportunity and/or sufficient time to respond. Once that predetermined time period has elapsed, the patrons will be notified whether their answer was correct, and whether they are still in the tournament. In optional embodiments, a predetermined time period will again elapse until new questions are sent and the tournament continues.

Optional Oracle or My SQL Database

In one embodiment of the invention, an Oracle or My SQL Database is used in connection with the present invention. In one embodiment, the result set is set to be proportionally with respect to the number of users and/or data that will be stored in the system. In another embodiment, the database is optionally partitioned for specific games and/or initiatives or groups of games and/or initiatives. The system is preferably thread safe when running the games and/or initiatives. The system is optionally integrated with Credit Card for payment, and/or integrated with the venue ticket system and/or point of sale system to optionally determine who came in and when into the venue. In another embodiment, the present invention maintains and updates financial balances for users, such as patrons and stadiums. In alternative embodiments, secure interaction with ushers and an interactive kiosk is provided.

The present invention optionally provides any standard algorithm for partitioning of group of seats and users, for example, for system resource allocation, load balancing and/or division of system functionality. In alternative embodiments, a local kiosk for the stadium and/or venue is provided where the user can enter information, such as register for one or more initiatives and/or programs. In alternative embodiments, the system of the present invention includes the capability of offering for sale seats which are not currently sold via messaging to wireless devices, such as text messaging to mobile phones, or other messaging and/or wireless communication to wireless devices, and consideration. In alternative embodiments of the invention, standard algorithms such as used in the airline industry may be used to overbook seats for the venue, and consideration.

In alternative embodiment of the invention, instant messaging or any type of communication method can be used in the present invention, include local and/or global networks, such as the Internet, LANs, WANs, WAP, 811.02a, 802.11b, 802.11g networks, and the like.

Messaging Software Requirements

Trivia and/or other messaging products/initiatives are Java applications that run in a J2EE application server and utilize a JDBC 2.0 compliant relational database. There are typically open source options available for system support. Currently for development and test environments we utilize are desktop environments running Windows 2000 with the open source options below. The draw back is that open source options typically don't provide formal system support approaches, although we have found the software to be very reliable and would recommend this approach for early stage pilots. Should the customer prefer purchase software options for these components are provided as well.

I. Server Software Specifications

Alternative A—Open Source Approach (1) Web/Application Server—Tomcat 4.1.18

(2) Database—MySQL 4.0

(3) Windows 2000 Server for each server

Alternative B—Purchased Product Approach (1) Application Server—Websphere Application Server 5.0

(2) Database—Oracle 9i DBMS (3) Windows 2000 Server for each server

II. Server Hardware Specifications (4) Each of the HW Servers specification:
- (i) 2xCPU—P4 2.4 GHz Xeon
- (ii) 2 GB RAM
- (iii) Monitor
- (iv) CD ROM
- (v) Floppy Drive
- (vi) Hard Drive depending on volume (see below)

III. Communication Specifications (5) POP3 Account and SMTP server accounts that can support number of active subscribers (6) Dedicated T1 access to POP3 and SMTP provider IV. Hardware and Software Sizing Configurations Phase 1:

1K-10K subscribers and players during the game

Two Servers

Server 1—runs Web/Application Server for the website and the Trivia Application

Server 2—runs the Database server (20 Gig)

Phase 2:

10K-25K subscribers and players during the game

Server 1—runs Application Server for the Website front end

Servers 2 and 3 (2 Servers)—run the Application Server for Trivia Application (two servers are used handle load balancing)

Server 4—runs the Database server (50 gig) (Level 1 RAID 2×50G Array)

Server 5—used as a backup to server 4—depending upon Reliability requirements)

Phase 3:

25K-50K subscribers and players during the game Server 1—runs Application Server to run the Website front end Servers 2, 3, 4 and 5—run the Application Server for Trivia Application (four servers are used to handle load balancing with hardware and software clustering)

Server 6—Database Server—150 gig (Level 0+1 RAID 6*50G Array)

(Server 7—used as a backup to server 6—depending upon reliability requirements).

In one alternative embodiment, as part of the sign up for trivia the system optionally asks the general admission or season ticket holders to input their seats to simplify how the system obtains information where the patron is being seated when they come to the game. In an alternative embodiment, the system obtains this information from the stadium database system, kiosk where the patron can enter the information at the stadium and/or via the point of sales system by the service personnel or attendant that is selling the tickets. Using any of the above methods, once the system knows where the patron is/are seating when present at the game, the system can then target sections of the stadium for, for example, the trivia quiz or other service/offering to the patrons.

Examples of different sections that can be separately targeted include for baseball, behind first base line first, behind home plate second, first base line third—all lower deck; same sections for upper deck and bleachers. Other sports may include football, hockey, soccer, basketball, and the like. In accordance with this embodiment, targeting different sections over different periods of time, thereby preventing a long delay to receive answers once the question is transmitted, may minimize collusion among patrons.

Thus, by segmenting the stadium over a few minutes in accordance with one embodiment of the invention, the present invention may increase the window of transmission to, for example, 2 minutes or more for the first round. As the rounds get successively smaller, the present invention will transmit messages faster. The present invention also provides optional winners for different sections of the field. In addition, the section winners can further optionally compete against each other, for example, the first class seating winner can further compete against the bleachers winner, and the like.

As discussed above, one or more of the above alternative embodiments may be incorporated into the embodiments described above, and/or any of the embodiments discussed below. Furthermore, any of the embodiments of the present invention may be used for any reserved seating or other event.

Figure 33:
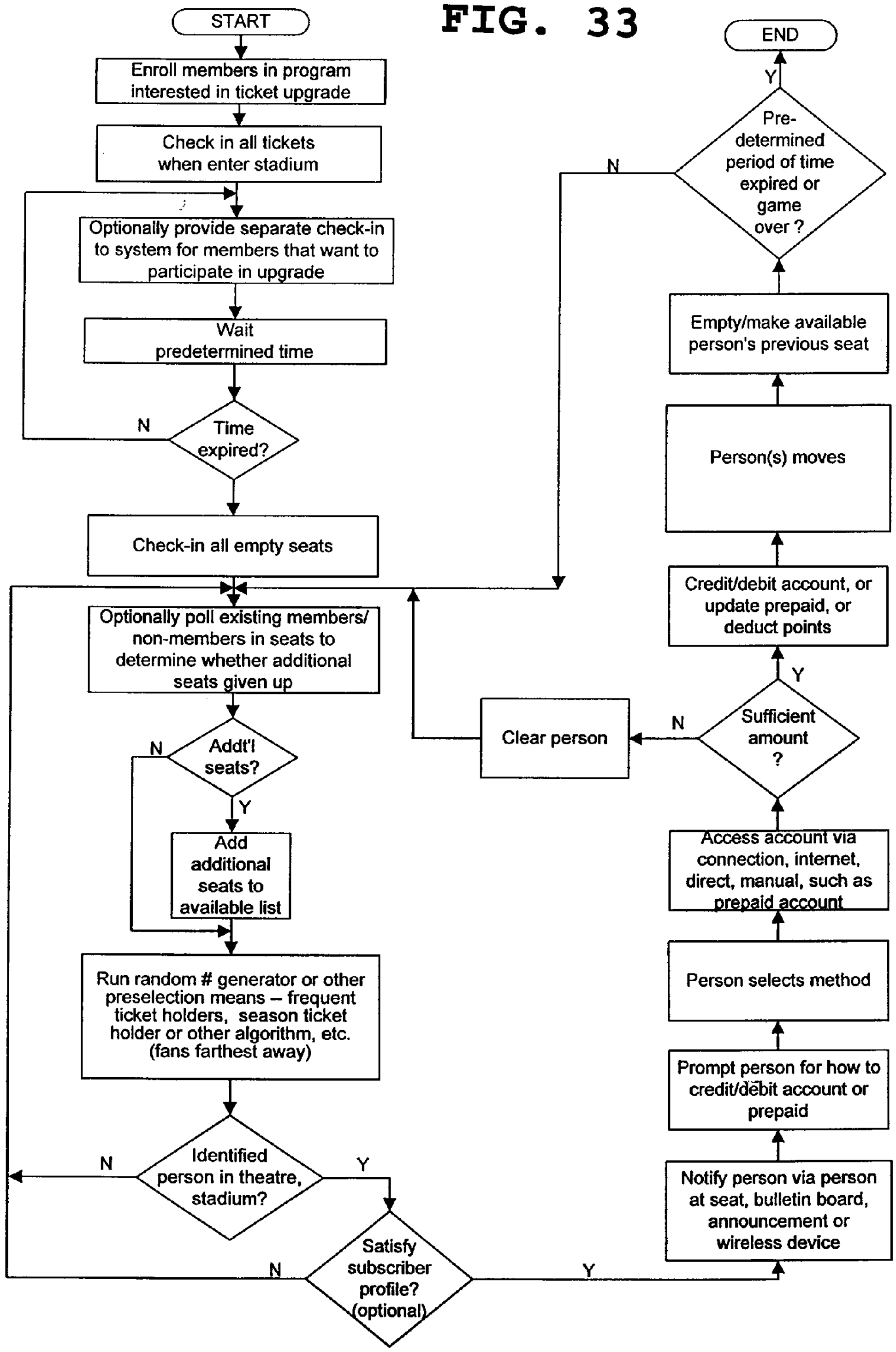

FIG. 33 is a flowchart of an eleventh embodiment of the invention. In FIG. 33, the process begins by enrolling members in the program that are interested in the ticket upgrade. Tickets are checked in, for example, as the patrons enter the reserved seating area, such as a stadium or theater, through, for example, bar code readers, scanners, infrared readers, and/or manually or other method where the patron is checked in, either at the gate, seat or other location. An optional separate check in area is provided for patrons that want to participate in the upgrade program. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. The patron may check in either a predetermined time before or after the event begins. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seats for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, a standard bidding process, or other predetermined process.

An optional polling process to poll existing members and non-members in seats to whether additional seats are available. That is, in another optional embodiment of the present invention, non-members may also make their seats available for re-allocation/re-sale at any point in the process. In this additional polling process, the next step is to determine whether additional seats have been made available. If additional seats have been made available, then these additional seats are added to the list of available seats.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or more means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. Optionally, a bidding process may be initiated that allows various patrons to bid against one another. Any standard bidding process may optionally be used. The patron, of course has the option to decline, and if so, the process continues and returns to the re-allocation process to attempt to locate another possible patron.

The patron is prompted for the method of obtaining the tickets, such as a payment method, such as credit card, debit card, cash, point redemption, or optionally a gift/prize. The patron subsequently selects a payment method. The patron's account is debited at a future time, or optionally immediately via connection to a standard clearinghouse network, such as visa network, master card network or other network via direct connection or via the Internet, and the like. If sufficient funds do not exist, then the person is cleared or rejected from the opportunity for the seat re-allocation/upgrade process. If sufficient funds do exist, then the patron's account is debited or points deducted. Alternatively, one person may purchase the upgrade on behalf of another person.

The patron then moves to the new seat, and the system then clears the patron's old seat from the system to optionally provide re-allocation of the previous seat. As indicated previously, if the patron accepts, payment of money or other means may be effectuated on the spot via the wireless device, credit card, debit card, points, and the like, and the patron may now move to the other seat. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

In accordance with the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that may be in the vicinity of the stadium but were unable to get seats. Since the present invention re-allocates and/or sells tickets very near to game time in accordance with one embodiment, the patron must be in the general vicinity of the stadium to take advantage of this embodiment of the invention.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron to help the patron decide the quality of the upgrade and whether to accept.

In one alternative embodiment, if the patron that has their ticket re-allocated in error, e.g., because the patron did not show up to the event based on the predetermined criteria but the patron was still planning on attending because they forgot about their seat being re-allocated, the system can re-allocate seats immediately upon the checking in of the patron and notify them that their seats have changed because they are late. In this situation, the stadium/venue might decide to further upgrade the patrons because of the mistake.

In accordance with one embodiment of the present invention, the process of the present invention specifically reserves seats of the highest or very high rating that are considered preferred, in the event a patron's seat is re-allocated prematurely or erroneously. In this situation, the patron who has had their seat re-allocated because they will likely receive an even better seat as a result of the mistaken (stadium or patron) or premature seat re-allocation.

In another embodiment of the present invention, as patrons are entering the venue or stadium, they are provided advantageously with a map of the stadium so patrons can analyze the potential upgrade to make a decision whether the upgraded seats are sufficiently good or of value to warrant the patron moving and/or paying for the additional upgrade. By handing the patron the map of the stadium, the process of the present invention is not required to transmit a detailed schematic to the patron's wireless device which would not normally be able to effectively permit the patron to evaluate the proposed upgrade seats. The map that is handed out may optionally include information for patrons on where to register for the upgrade and/or additional advertisement opportunities.

In one alternative embodiment, the patron that has purchased the ticket, for example, a season ticket holder, may advise the stadium that for a particular game, set of games or all games, they do not want their seats to be re-allocated, and perhaps, an additional fee is assessed for this type of patron. If the stadium provides the ability for the patron to selectively opt out of the seat re-allocation, the patron can, for example, connect to the system via the Internet, public switched telephone network, cellular network, and the like, and notify the system that they do not want their ticket re-allocated, for example, because they are coming late to the event. Other means of notifying the system and/or other reasons may be utilized in connection with the present invention.

In another alternative embodiment, the system provides patrons the ability to individually select when their tickets may be re-allocated. For example, one patron may prefer to only give up their ticket if they are late to the game by 15 minutes, while another patron may be willing to give up their ticket if they have not arrived 15 minutes before the game. In alternative embodiments, the stadium may provide incentives for the patron to have their ticket re-allocated prior to the game because it increases the stadiums chances of re-allocating/re-selling the ticket.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provide additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In an alternative embodiment, the system determines priority of re-allocation of seats based first upon patrons that have seats that may also be re-allocated. That is, the systems attempts to maximize the number of re-allocations by prioritizing the re-allocation based upon seats that may be re-allocated after already being re-allocated. For example, if front row seats in a stadium are available to be re-allocated, in this alternative embodiment, patrons that are in the next closest section for example on the field level would be upgraded first to those seats. Then, patrons with less preferred seats, for example, in the upper deck would be re-allocated to the seats that have now become available from the patrons that have been upgraded to the front row. Thus, using this alternative priority scheme, the present invention maximizes the re-allocation numbers. Of course, this priority algorithm may be combined with additional factors, for example, relating to subscriber/patron value. As described above, additional factors may be utilized in the algorithm to determine the subscriber or set of subscribers to offer the upgrade.

In alternative embodiments, patrons in the vicinity of the upgraded and re-allocated patrons may optionally rate the upgraded patron, for example, for appropriate behavior, wearing of excessively large hats, drunkenness behavior, and the like. These ratings may then be taken into account in the re-allocation algorithm for future upgrades to the patron.

In alternative embodiments, the patrons eligible for the upgrade may be notified using standard email communications over a wireless device, mobile telephone, and/or other standard communication means. For example, standard text-to-voice and/or voice-to-text communications may be used to contact the patron to evaluate whether an upgrade will be accepted and to actually accept the upgrade.

In another embodiment of the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that have already purchased tickets in the vicinity of the stadium but were unable to get seats and/or may be in the vicinity of the stadium but were unable to get seats. Since the present invention re-allocates and/or sells tickets at any time prior to and/or after beginning of game time in accordance with one embodiment, the patron may be in the general vicinity of the stadium to take advantage of this embodiment of the invention or even at any location when being offered upgrades and/or seats well in advance of the game. For example, the present invention can upgrade or sell tickets to patrons well in advance of the game since it advantageously is permitted or has the authority to resell tickets either via ticket holders that do not show up during the game and/or, for example, season ticket holders that have authorized the stadium in advance to resell their tickets based on predetermined criteria, for example, when the season ticket holder notifies the stadium that they will not be present at next weeks game.

In one optional embodiment of the invention, the patron presents the usher with the confirmation number which the usher can enter into a wireless device using a local or private wireless network, or can simply use a walkie talkie or telephone to call the dispatcher to confirm the upgrade and/or new seats using the customer provided confirmation number. The dispatcher will have access to the system to enter the confirmation number to confirm the validity of the upgrade. Alternatively, a patron will retain their old ticket. The patron will give in the old ticket to the usher which is scanned or barcoded by the usher for immediate identification of new seats and used in place of, or in addition to, confirmation number.

Of course, the confirmation may optionally be made via customer name with an appropriate identification card or other information. Further, alternative methods may be used to verify that the confirmation number and/or ticket being used by the patron is valid. For example, the patron may be equipped with a printing device associated with the wireless device or download an actual ticket on line from home prior to the game for the new ticket or upgrade. Alternatively, the patron may be equipped with an identifier card, optionally including a bar code with a unique identifier relating to the patron's account information and profile that can be scanned for additional convenience. Alternatively, a wireless device may be used to securely store this type of identification and/or account information.

In at least one alternative embodiment of the invention, the patron may comprise optionally a corporate account that has a number of tickets, for example, season tickets. In this embodiment, the corporate account may have associated therewith a plurality of email addresses or other communication addresses to transmit the seat or upgrade offer to a number of potential patrons that may rotate their attendance at the games. In accordance with this optional embodiment, multiple emails can be stored for a single user/corporate account, and the system may transmit individual messages to all email addresses, or may only transmit messages to individual patrons for corporate account that individually advise the system that they are associated with a particular ticket/bar code for a particular game and will be/are present at a particular game.

In an alternative embodiment, patrons may enter the stadium and subsequently inform the system that they are present and interested in an upgrade via a kiosk where the patron can scan a bar code and enter their customer number to be eligible for upgrades during the game. The system is then able to transmit a message to the customer, assuming that the customer has pre-registered with the system with the appropriate contact information. Alternatively, or in addition to individual use of a kiosk(s), the customer sales office may have a kiosk or additional functionality to enter the customer name and/or customer account and scan in the bar coded ticket on the spot to register each patron as they enter the stadium or venue.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron upon entry in the stadium to help the patron decide the quality of the upgrade and whether to accept when an offer is received by the patron at a predetermined time. The graphical map may comprise a small booklet with a map of the stadium showing seat locations, and optionally a game schedule.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provides additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In alternative embodiments, patrons in the vicinity of the upgraded and re-allocated patrons may optionally be eligible for a dating or matching service where patrons register and provide profile information to the system and/or through a third service provider dating service. Once the system knows that the patrons will be coming to the game and/or have actually checked in to the stadium, the system can then arrange for the two, four, etc. patrons to meet each other by allocating and/or re-allocating seats to the patrons together. Thus, based on profile information, customer request and availability, the system is able to upgrade or sell tickets to patrons to maximize their chances of meeting someone at the game. This optional feature provides significant potential enjoyment for the patrons participating in this dating or connection program. In accordance with this embodiment, one possible sequence of acceptance steps involves profile matching the two patrons (or groups of patrons) based on predetermined profile information; transmitting a first message to the first patron regarding availability of the second patron and requesting a conditional acceptance form the first patron; transmitting a second message to the second patron indicating that the first patron has conditionally accepted and request the second patron to accept; and when the second patron accepts before the first patron has rescinded the conditional acceptance, finalizing the upgrade and/or seat allocation for the first and second patrons. This embodiment of the invention is a complete reverse from typical dating and/or matchmaking services which attempt to develop detailed algorithms for the matching process because of the significant decision that exists in determining who to spend valuable time with. In accordance with the invention, patrons are already present at the game, and therefore, half or more than half the effort is already done. The remainder is to actually meet the other person which can be accomplished with profile criteria, whether or not the algorithms are very sophisticated.

In one embodiment, the patrons that are being matched have their original seats maintained and not made available for other upgrades in the event the matching does not work out early on. In this embodiment, one or both the patrons can return to their original seat. Hopefully, there will not be a significant argument of who would need to return to their original seat if an upgrade is actually performed. In addition, in accordance with this embodiment, the seats that are selected do not necessarily have to be better seats in the classical sense. That is, seats further away from other ticket holders might be considered preferred when matching two individuals for the first time. Alternatively, couple that would prefer a little more privacy or quieter game might request to be moved to a more isolated area. Alternatively, families with small children might prefer to be moved to a less busy area as well during the game where the children might be able to freely move around. All these scenarios and/or alternatives are possible in view of the present invention. The advantage of performing a match in a public setting is that the patrons do not have to worry about leaving or ending the date, and also do not have to worry that the other person will have their home address.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like.

In addition, this feature also optionally permits the patrons that have participated in the program to rate one another for future dates. For example, one patron can rate the conversational benefits of the second patron, the appearance of the second patron, the overall short term versus long terms relationship goals of the patron, and the like. These ratings may then be taken into account in the algorithm for future seat assignments, re-allocations and/or upgrades in the future for the first and second patrons, and all other patrons will now benefit with the additional profile information of the first and second patrons. The matching service may be for amusement or work related networking purposes, for example, to meet an executive that the patron currently works with or wishes to work with/sell in the future.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like. In addition, the system advantageously and optionally provides the feature of allowing patrons to text message one another directly, and/or exchange pictures via wireless email, text messaging, and other wireless devices that provide the standard capability of exchanging pictures, such a T Mobile and/or Sprint.

In alternative embodiments, the ticket holder can call in via a voice to text message, text message and/or email and let the stadium know early that they are not coming. In this manner the ticket holder obtains the convenience of the stadium or venue reselling their tickets in advance, thereby providing the venue with additional time to maximize the resale of the ticket.

In alternative embodiments, when the patron enters the stadium, they have their ticket barcoded or other device that detects their presence can be used such as infrared, Bluetooth, etc., and then they can become eligible for an upgrade. The patron can register in advance that they want to receive upgrades by providing their name, message address, e.g., email, telephone text message address, etc., and optionally their credit card or other payment mechanism for upgrades that actually cost money as opposed to free upgrades. In alternative embodiments, the patron can register at the ticket booth when purchasing their original ticket. In this scenario, the stadium representative can enter this information on behalf of, and with the permission of, the patron since the patron may already be providing their credit card, debit card, etc. to purchase the original tickets. Alternatively or in addition, a kiosk may be provided where the patron can enter their original ticket, e.g., scan in their original ticket and provide their name and text message information in the stadium to register for a one time upgrade for the game after purchasing, for example, a regular admission ticket.

In alternative embodiments, an usher can verify that the patron should be upgraded by the patron providing the confirmation number that may be transmitted in real-time by the system, and/or by the patron using their original confirmation number or original ticket with barcode or other identification means, such as a smart card, infrared reader, etc. that represents original ticket and presenting same to the user. The usher then needs only to scan in the original ticket and the system will verify whether the patron associated with the original ticket is valid and whether the upgrade is valid.

In alternative embodiments, a warning message may be sent to the ticket holder that has not shown up to game warning them that if they do not respond within a certain time period that their seat will be re-allocated or re-assigned to another patron. Similarly, a release message may be sent to the ticket holder after their seat has actually been released and/or re-allocated, thereby notifying the patron that if they change their mind in attending the game, they will have to obtain an additional ticket. In alternative embodiments, the ticket holder that has their seat released and re-allocated can be themselves re-allocated a similar, worse or better seat, depending on, for example, their subscriber value and/or other criteria. For example, if the patron is provided a better seat, this will encourage them to more readily give up their seats in the future even if they are attending the game. On the other hand, if the patron is provided a worse seat, then this encourages them not to artificially give up or have their seat released when attending the game. Accordingly, the present invention is designed to deal with various behavioral patterns of specific ticket holders, and may optionally and advantageously be a ticket holder specific with respect to various criteria for re-assigning, releasing, selling and/or re-allocating tickets.

In alternative embodiments, the system transmits to the ticket holder a welcome message after being upgraded and after having being moved to a new upgraded seat location. In one embodiment, the system identifies that the patron has been successfully upgraded after the patron provides the usher with a confirmation number or original ticket, which is then verified by the usher and system.

In alternative embodiments, the system, after having identified which patrons have checked into the stadium and/or have been upgraded, transmits a trivia question and/or additional advertisements to all patrons attending the game. In alternative embodiments, the information is transmitted to both patrons that are attending the game and additional patrons that have registered in the past to receive information but that are not attending the game. The participants can, for example, answer trivia questions and respond with their wireless device. Depending on whether the patron is attending the game or not, the system may determine to offer or deal with each of the patrons differently. For example, for patrons at the game, winners may be successively determined and narrowed, as patrons successfully and unsuccessfully answer questions, round after round of questions in a "spelling bee" format. For patrons that are not attending the game, winners may be declared, or statistics provided to the broadcast station that can be aired on television. In yet additional alternative embodiments, instead of transmitting information/questions to the patrons via the wireless device, the information/questions are displayed on the stadium billboard for patrons at the game and/or on television for patrons that are watching the game on television. The patron can then merely respond via the device, e.g., the telephone accordingly via a voice-to-text system or via other mobile devices via text messaging.

In alternative embodiments, the present invention provides the advantage of additional advertising sponsorship to the venue. For example, in one embodiment, the venue is partitioned into different locations that may be assigned to different sponsors. In one embodiment, the sponsor that provides the most value may be assigned a certain number of premium seats that are not available to other sponsors.

For example, the sponsor may offer a discount on the upgrade if you are a Verizon or Verizon Wireless customer or they credit your cell account for each seat upgrade or you get say 30 free minutes, etc. In alternative embodiments, the present invention provides the advantage of one wireless provider to advertise on another wireless providers mobile phone or wireless device. For example, if Verizon Wireless is a sponsor of the upgrade system for a particular stadium, the present invention will still work with, for example, AT&T, SPRINT, and CINGULAR customers. An advertisement message sent with the upgrade offer may read on the AT&T phone, "brought to you by Verizon Wireless." In an alternative embodiment of the present invention, text messaging is optionally used for mobile phones to perform the message communication of the present invention. The user is only required, in one embodiment, to reply or respond with a "Yes" to accept the upgrade offer since the user has advantageously pre-registered with the system, thereby minimizing the required communication/input by the user. In an alternative embodiment, the user, instead of pre-registering with the system, is charged on their wireless or even regular telephone number bill when they accept the upgrade offer. Thus, the wireless system that either administers the user's regular or wireless account or the upgrade sponsor may be responsible for actually billing the customer in this alternative embodiment.

In the alternative embodiment when text messaging is optionally used alone or in combination with other communication methods, the system provides the additional advantage of maximizing bandwidth usage by not requiring use of bandwidth on the wireless voice system, thereby maximizing system resources.

In another alternative embodiment, the present invention optionally and advantageously provides a security and/or safety feature in the event of, for example, a minor event where a parent gets separated from a child, a disaster or other event that might require evacuation of the stadium. In one embodiment, the person needing help provides their name to an attendant that can search the system for the contact information of their companion/parent. The system can thereafter send an email and/or text message to the companion/parent regarding the status of that person and provide instructions for meeting that person or arranging help, authorizing medical procedures, and the like. In another embodiment, the person requiring help, e.g., a child provides the attendant or kiosk with their ticket which can, e.g., scan the bar code or other reader system. The system can either automatically provide a text message to the parent who can then reply to the child/attendant via the kiosk to meet the child.

Alternatively, the parent can be instructed to meet the child at a predetermined location, and to stop looking for the child because the child was found. Thus, for this example, the person who is lost or separated from their party can notify security or access a kiosk. Security can, for example, notify the parent that child is in safe custody, and should not search the stadium, and therefore, meet outside stadium in a prespecified safe place.

In an alternative embodiment, if a child/person is separated, the security guard/kiosk can arrange the best place to meet, either in or outside the stadium, together based on an optional global positioning system (GPS). In addition, the party with the mobile device can be provided directions on where to go to meet their party from who they have been separated.

In an alternative embodiment, the present invention may also be used in a security, defense and/or safety setting to direct patrons in a stadium for an orderly evacuation or notify patrons regarding status of a safety related event via, for example, a broadcast message including text message, email and the like. In this manner, system communication resources may be most efficiently utilized by not over-utilizing the system via voice communication, unless completely necessary. For example, the message can be broadcast in the event of an impending hurricane. In this situation, patrons in different sections get different messages, for example, to exit the stadium out of gates/exits that are either less occupied or closest to the section the patrons are sitting in. Advantageously, the present invention has the patrons contact information, including optionally and advantageously text messaging, that can be broadcast or sent to different patrons. The advantage of text messaging is that the bandwidth is more efficiently used in the event of an emergency, and there are no busy signals as in a voice network. Further, the message is send, and if the network is at capacity, the system can automatically resend or the message will be placed in queue and sent as soon as capacity becomes available.

In another alternative embodiment of the invention, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction.

For instance, in sporting venues the bracelet ticket includes the machine readable information that comprises at least one of a bar code and radio frequency identifier used for security check in, and optionally check out. In this manner, the standard reading machines that can scan the bar code or RFID information can keep track of people that have checked into the sporting event and/or venue. Advantageously, the machine readable information on the bracelet can also be used by the venue in the event the patrons seat assignment is modified, for example, via an electronic ticket exchange or upgrade program. In this embodiment, the visible indicia are no longer valid for the actual seating that may be dynamically changed and only represents optionally an initial seat assignment. However, the machine readable information may be used as a code to reference the specific patron and assign that patron a new seat. Thus, when the ticket reader scans the ticket and actually identifies, for example, the bar code, this information can be used to reference the patron, update and/or confirm the patron's current seat via the reader used, for example, by ushers in the venue, kiosk, entrance to the venue, and the like.

In an alternative embodiment, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction. This information, as previously mentioned, may be visually cognizable for the patron and in combination, readable by electronic means if the bracelet includes a magnetic strip, bar code imprinting, or RF chip.

In an alternative embodiment of the present invention, the security bracelet and ticket combination of the present invention advantageously includes a bar code or other machine readable information such as a RFID device. When, for example, a child is separated form their parent, the parent can notify security and the seat number associated with the child. If the child attempts to leave with their bar code/identifier, the system detects the bar code/identifier as either being valid and identifying the child that is missing or being invalid and raising another red flag. In an alternative embodiment, the bar codes/identifiers associated between children and adults correspond such that the child identifier must be within a predetermined time and/or number of checking out identifiers from/within the adult identifier. If this does not occur, the system determines that the child is leaving without their parent, and possibly being abducted.

In an alternative embodiment, the system links one or more tickets/identifiers together and requires the tickets/identifiers to exit the venue or event within a predetermined time period from one another and/or within a predetermined number of tickets/identifiers that have exited the venue and/or event. In the event that one ticket/identifier exits the venue or event and the associated identifier does not, then an alarm or other indictor occurs, and the attendants will detain the patrons that have initiated the alarm to for security purposes.

In an alternative embodiment, the tickets are advantageously coded with designations such as adult, child and the like. In the event a child ticket/identifier exits the stadium before the associated adult and/or more that a predetermined time period and/or number of patrons exiting, the system can initiate an alarm so that an attendant can determine if a child has exited the venue or event without their parent or with a wrong parent potentially averting a kidnapping. In this embodiment, an additional combination is the use of the standard fast pass feature, for example, at theme parks, and the like, where the venue records predetermined events that the user of the card enters in a faster line. In this embodiment, if a child ticket/identifier is not associated with a parent ticket/identifier, for example, as described above, the child may be denied entry into the event or venue if not accompanied by their parent. In alternative embodiments, the venue/event sponsor or organizer associates tickets upon request from the patron. In addition, in another alternative embodiment, a kiosk is provided inside and/or outside the venue for, for example, parents to register their tickets and have them associated with their children's tickets to prevent the child from exiting the venue without them, for example, as described above.

In an alternative embodiment of the present invention, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In another alternative embodiment of the present invention, a security bracelet is advantageously utilized, for example, such as the security bracelet disclosed in U.S. application Ser. No. 10/680,207, filed on Oct. 8, 2003, to Abraham I. Reifer, et al., and incorporated herein by reference, in the event of a reported event, security breach, abduction, and the like. In this embodiment, all patrons exiting the stadium must show their ticket and/or identifier so that the venue can check all patrons out of the stadium. Thus, for example, if two kidnappers come in the stadium, and want to use one bracelet for a child, the second kidnapper will be stranded in the stadium. In addition, if one kidnapper buys two tickets, then upon exit with the child and the additional ticket, a barcode/identifier will be exiting without ever having checked in, and then the alarm will go off as well.

In another alternative embodiment, the present invention provides a broadcast message to warn patrons of an event, such as an advertisement, sale and/or even a weather related event such as a hurricane that might require the venue to be evacuated. Advantageously, in at least one embodiment, the broadcast message comprises standard text messaging that optimizes or better utilizes capacity form the communication system. Thus, when using text messaging capabilities, the present invention efficiently transmits text messages to numerous subscribers regarding, for example, exit information, contacting and/or meeting additional parties that have been separated, and the like.

In an alternative embodiment of the present invention, the present invention optionally provides the capability to penetrate into secondary market with season ticket holders selling ahead of time the games they will not be attending. For example, the present invention optionally provides the feature for the season ticket holder and/or general ticket purchaser the ability to view in advance of the season and/or game the schedule, and to alert the venue and/or stadium of games and/or events they will not be attending, thereby permitting the stadium/venue to attempt to resell the tickets to other patrons. For example, in one embodiment of the invention, the patron is provided with a monthly schedule listing the events that may be attended. The patron, such as a season ticket holder, may then click or place an indicator on all games they will not be attending for the season in advance, thereby providing the stadium with the ability to resell tickets well in advance of the event. Once the patron completes identifying games that will not be attended, the system then compiles a list and transmits the list to the patron for an optional confirmation. This list is then used by the system to release seats well in advance of the game. In an alternative embodiment of the invention, registered users of the system for, for example, upgrades, may also be notified of seat availability for sales prior to the game/event. In an alternative of this embodiment, registered users may receive text messages, emails, and the like, notifying them advantageously of the availability of seats that heretofore have never been easily available to the public for sale, thereby allowing the venue to participate in secondary market ticket sales.

In one alternative embodiment of the present invention, the system/process of the present invention provides or operates as a middle person/broker between the ticket holder that is returning tickets to the venue, such as the season ticket holder, and a ticket sales system and/or company, such as tickets.com, by notifying the tickets company of the newly available seats via notification by the ticket holder, such as the season ticket holder of season ticket games not being attended.

In one alternative embodiment of the invention, the system and/or process transmits text messages, emails and the like, to offer tickets and/or seats and/or admittance to subscribers for events and/or games with empty seats even before game. Thus, the present invention allows the venue to participate in the secondary ticket sales market and the upgrade market, thereby increasing revenue and fan loyalty.

Of course, all of the embodiments of the present invention may be used for any reserved seating event, and/or venue that require tickets for entry thereof.

In another alternative embodiment of the present invention, the use of machine readable identifiers provides advantages for, for example, the upgrade program or ticket exchange of the present invention. For example, when the upgrade, reallocation and/or electronic ticket is issued, the machine readable identifier, for example, the bar code, on the original ticket is invalidated, thereby preventing use of the invalidated ticket. Accordingly, when a new ticket holder purchases the ticket form the season ticket holder, the new purchaser will be issued a new machine readable identifier, and optionally a new paper ticket. The present invention advantageously is able to handle the issuance of a new ticket and invalidates the old ticket and optionally the old identifier that has, for example, been returned by the season ticket holder, thereby providing dynamic ticketing capability.

In an alternative embodiment of the present invention, the new patron obtains a new identifier such as a barcode, the old bar code of, for example, the season ticket holder is invalidated. In one embodiment of the invention, season ticket holders are offered to opt in the upgrade process. Various commercial incentives are possible for the season ticket holder to opt in the upgrade process, such as monetary compensation when their ticket is used for an upgrade and/or resold whether they express their intention not to go to the game prior to the game, and the like. Alternatively, season ticket holders may be offered that the cost of their season tickets will, for example, remain the same as the previous year or be reduced if they participate in the program. Therefore, the combination season ticket trade-in and upgrade program in one embodiment of the invention will be beneficial to season ticket holders by allowing them to trade when they already know that they have no intention of attending a game, and allow the season ticket holder to recoup some cost of the season tickets if they do not attend and their ticket is used as an upgrade. In addition, additional patrons of the event and/or sports team are permitted to attend the game in locations/seats that they might never have been able to obtain access to. Further, the venue/stadium/team maximize revenues by being able to place tickets on the secondary market when the ticket holder notifies the venue early enough that they are not attending the event, the venue also obtains additional revenue from upgrades when tickets are upgraded, and the venue obtains additional fan loyalty.

In another embodiment of the present invention, the system provides the ability to advertise via email, text messaging, and the like, for one wireless carrier on the wireless device that is using another wireless carrier. Since the user of the wireless device has requested the service, the user appropriately receives the communication from the ticketing system of the present invention, and therefore, also appropriately received the advertisement from the wireless carrier that is different than the wireless carrier that the user of the wireless may be using at that time.

In another alternative embodiment of the present invention, offers to purchase seats either during the game or even well in advance of the game are "pushed" or transmitted out to registered users that have supplied their wireless and/or Internet addresses. For example, patrons can register in advance for the upgrade and/or regular ticket offers to purchase admittance via various methods including the Internet. When seats band/or admittance becomes available, a broadcast message or other standard messages may be transmitted to the registered patrons to notify them of the seat availability. Thus, seat offers are "pushed" to registered users that have requested this service advantageously to a wireless device and/or other address including standard telephone communication, as well as additional optional advertisements. The system, in one alternative embodiment, provides the user the option when registering to accept certain types of advertisements to be received on their wireless device via email and/or text messaging. In other embodiments, the user does not have the option of which advertisements to receive.

Advantageously, in accordance with one alternative embodiment of the present invention, if a patron decides to attend an event such as a sporting event when the patron does not have time to wait to receive paper tickets (e.g., the patron is visiting in another city/location and does not have time to wait to receive tickets via mail and is on the go), the system of the present invention transmits a ticket to the patron via, for example, a wireless communication system and/or other standard electronic communication system such as the Internet, and the patron can present their ticket, for example, on their wireless device and show up to game.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@tixx.com. Patrons then text message and/or email and/or answer questions via voice-to-text messaging their answers. The system can then display the overall number of answers that are correct and incorrect, display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another alternative embodiment of the present invention, the system uses a seat database to determine which of the reserved seats are currently in use. The system may integrate with the seat database system of a venue and/or stadium or optionally be used in parallel with the seat venue/stadium database. For example, prior to the event, the system may utilize the seat database of the venue to determine available seating and patrons that do not show up after a predetermined period of time. Alternatively, the present invention can operate using a separate database from the event/venue by copying or building a separate database used for the ticketing and/or upgrading according to the present invention. In this alternative, as patrons enter the venue, they are checked in directly to this separate database. At the time of the event, the system will be able to check-in patrons using either the identification system, e.g., bar code scanner, of the event or venue, or provide a separate identification system.

In alternative embodiments of the invention, the patron that knows they are attending the game but is going to be late can send in a HOLD message even prior to being provided a warning message that their seats are to be released if the patron does not respond to the message with the HOLD request. That is, in this embodiment, since the patron already knows well in advance that they are attending the game, but perhaps stuck in traffic, the patron can initiate the HOLD message before even being warned in advance of the possibility of their seat being released.

In another alternative embodiment, patrons that have registered with the system and optionally checked into the stadium and/or venue in advance and who also know that they would like an upgrade and/or ticket, may initiate their own upgrade request to the system to notify the system of their willingness to purchase an upgrade and/or new ticket for the event/venue. The system may then place these patrons on a higher priority since they have already expressed and intent and/or willingness to purchase the upgrade or ticket. The patron may notify the event and/or stadium of their willingness optionally well in advance of the game or near/after game time at a time which the patron commits or expresses an additional heightened desire to upgrade and/or purchase a ticket.

In alternative embodiments, the system includes the advantage of allowing patrons to register free for a predetermined period of time, for example, for the first year, without paying a yearly subscriber fee. Alternatively and/or in addition thereto, the system provides the patron with their first upgrade for free or for a reduced rate to further encourage the patron to register with the system and method of the present invention. Alternatively and/or in addition thereto, the system of the present invention offers the patron reduced and/or free concessions when purchasing a membership, ticket and/or upgrade to further encourage the patron to participate in the offers of the present invention.

In alternative embodiments of the present invention, the matching system and/or process, permits participants in the program to initiate a message to the system with the seat location and/or name of the patron that they would like to be matched with for a meeting, networking and/or socializing such as a date. In this embodiment, the system may the push the message to the other subscriber and assign new seats to the individuals that are to be matched. Alternatively, the system need not require a specific confirmation that the second individual to be notified of the potential match is physically located near the first individual, but can rely on the first individual to provide that information. For example, the first individual may see a potential date in a restaurant, and may then send a message to the system with that person's name or address, that they would like to meet that other individual. In that situation, the second individual will receive a message of the possible match, and can respond and accept or reject the offer to meet. The second individual can then provide a meeting destination or the system can suggest a meeting place based on the first individual advising the system of their location, and the location of the second individual.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Advantageously, the multiple choice questions each have unique selections, such as a1, b1, c1 and d1 for question #1; a2, b2, c2, and d2 for question #2; a3, b3, c3 and d3 for question #3, and the like. In this embodiment, the actual timing of questions is not necessary since each question and answer is unique. Therefore, the speed of responding to the question is immaterial to the winner of the contest and/or correct answer. Also, in the event one patron answers the question late, there will be no confusion which question the patron is submitting an answer for. Patrons text message and/or email and/or answer questions via voice-to-text messaging their answers as indicated above using the unique set of answers, in one embodiment. In alternative embodiments, the first predetermined number of patrons that answer the question correctly are considered the winners.

The system can then display the overall number of answers that are correct and incorrect, e.g., a1 50%, b1 28%, c1 12% and d1 10%, and display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another embodiment of the invention in connection with the seating upgrade and/or assignment system, an identifier and/or machine identifier such as a bar code, RFID, etc. optionally remains static for the user on the user's ticket and/or device that is provided for optional paperless ticketing. For example, the identifier will remain the same associated with the user, but the seat assignment, privileges, user characteristics, user preferences, and the like, may be dynamically changes. The system and method of the present invention will be updated so that the identifier can represent a dynamic seat assignment or other dynamic information, such as general admission to an associated event, or other event and/or venue, including, for example, a restaurant, bar, and the like.

In another embodiment of the present invention, the upgrades process and/or feature may be provided to users/patrons as a complimentary reward for fan loyalty, to reward the user but also market other goods/services and/or other advertising opportunities to be transmitted via the wireless device and/or mobile phone. In one embodiment of the invention, the system and/or method initially queries the user, for example, at the beginning of the trivia contest and/or tournament or at the beginning of the game, whether the user is present in the stadium or not. The system can then perform, for example, the trivia contest, and determine a winner(s) to award for example some form of reward. Furthermore, in another embodiment of the invention, based on the number of people responding that they are present at the game, the present invention advantageously provides a random upgrade to a predetermined number of patrons as an additional fan loyalty program and/or advertising sponsorship to one or more entities that sponsor the free upgrades.

In another embodiment of the invention, a system and/or method is provided that advantageously builds and/or acquires and/or collects mobile contact addresses of users in an efficient manner. For example, in accordance with the present invention, a user advantageously need only provide the communication network and telephone number, and the present invention builds a data address therefrom. This allows the mobile or wireless device user to still register for a service without specifically knowing their data address for, for example, data communication such as SMS messaging, text messaging, email, and the like. In one embodiment, the mobile user is provided a drop down menu where the user selects the communication network and provides their mobile phone number.

The present invention is particularly advantageous currently with the recent enactment by the Federal Communications Commission (FCC) number portability where mobile phone users are able to transfer their existing numbers to other networks. Accordingly, we have determined that a user's number will advantageously provide a mode of contact for the user even when the user decides to change communication networks. For example, in at least one embodiment, the present invention uses the cell phone number and IP address combination, e.g., 2029422785@verizon.net, or 3016814455@attwireless.com, and/or any other mobile telephone plus IP address combination that may be used to utilize the IP address of the cell phone. Alternatively and/or in addition, the SMS address may be used.

In one embodiment of the invention, the software processes and system determines and builds the actual messaging address (email, text, SMS, and the like) to send messages to the mobile device by the user only selecting and/or providing the communications network and the telephone number. Thus, the present invention advantageously simplifies the process for mobile or wireless device users to register and/or provide contact information, and therefore, beneficially increases the number of individuals that can effectively and easily register for a communication service.

In another embodiment, the present invention facilitates the ability for potential users to signup for the service of receiving, for example, trivia, upgrades and/or text messages via a user sign up device or apparatus. In one embodiment, the user sign up sheet includes numbers and/or circles that can be filled in like a grid, where the user can fill in or cover the numbers that identify their portable number. In addition, the user can check off the specific network carrier from a list of network carriers, or simply enter their specific network carrier. The user sign up sheet may be done electronically via a computer and user interface as described above, or may initially be filled out by a user via, for example, a piece of paper and then later entered into the computer system of the present invention.

In another embodiment of the invention, the system and method of the present invention is capable of re-locating a patron via the mobile address that was previously provided, even if the patron has changed wireless carriers. For example, in one embodiment, with the recent feature of mobile phone portability by the FCC, we have determined that a significant number of mobile phone users are likely never to change their number/address, and therefore, the system and method of the present invention is able to send text messages and/or email to all network addresses using the telephone number of the user if the system suspects that the previously provided network by the user is no longer being used. In this embodiment, the user can optionally respond to the message and/or network broadcast message, confirming that one of the messages has been received.

In another embodiment of the message, whenever a user wants to contact a mobile phone, mobile wireless device or even computer based, via for example, an Internet based account, wants to contact another mobile wireless device user, the present invention provides a transmission device, for example, via the Internet or individual models/mobile phones used for each of the networks to broadcast the message on all networks. Advantageously, in accordance with this embodiment, since the user is likely to maintain the same telephone number, their data or text messaging address will be their telephone number and one of the few network addresses. This type of broadcast message can happen anytime, and even for voice communication when the user of the wireless device needs to receive a data, text and/or voice message.

In another alternative embodiment of the invention, as described previously, the invention may be used by a patron to obtain specific data or information regarding sports or venue related information of interest. For example, patrons may communicate with the system and forward a player jersey number or number of racecar during an event such as a baseball game, football game, racing event such as Nascar, to obtain additional information including current statistics and past statistics. The present invention can then optionally sent statistics throughout the game or event to the patron without the patron requesting, for example, at specific time intervals or after notable achievements during the event, such as a home run, touch down, $7^{th}$ inning stretch, half time, number of laps traveled, and the like.

Thus, the present invention includes many variations in the type of information a user may receive, whether specifically checked into a venue or registered for the service for a particular event. In addition, the present invention includes various processes and systems for ensuring delivery of messages to patrons that have requested the service or merely sending messages that a patron may be interested in receiving.

In another embodiment of the invention, the matching and/or networking system includes the ability to contact and/or notify the users to coordinate the meeting using any one of a plurality of communication methods including text messaging, email and/or instant messaging, with the additional advantage of transmitting pictures, video and/or other data that provides additional information regarding the other person that has been suggested for the match and/or network. In one implementation of this embodiment, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. For example, different message transmit and/or receive formats may be used depending on the system. The present invention beneficially parses the various different formats to obtain the necessary information for the communications described herein. In addition, the represent invention formats the messages for the different wireless devices so that the messages may be appropriately received even though different devices and/or communication networks have different messaging formats. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In accordance with another embodiment of the invention, the matching and/or networking system includes the option of permitting a subscriber to notify the system when they are ready for a potential meeting and/or match. Once the matching and/or networking system is notified of the subscriber requesting the match, the system is then capable of either tracking the user though a positioning system such as GPS, permitting the user to register at predetermined locations upon user initiation such as via Bluetooth, RFID, infrared, and the like. In accordance with this embodiment, the subscribers are not being constantly tracked, and therefore, maintain an additional level of privacy. In alternative embodiment, the present invention continuously tracks the subscribers without specifically requesting to be matched. In this alternative embodiment, the subscriber is provided with less privacy because they may be notified of a specific match even though they might not be interested in the match and/or meeting at that time.

In an alternative embodiment, the present invention provides subscribers with the ability to accept/reject the match before each of the subscribers receive personal information of the other and/or before the date/match has been arranged with at minimum a meeting location. In this embodiment, the invention requires that both users accept the match and/or date prior to notifying the subscribers of the contact information for each subscriber. Therefore, subscribers can optionally request additional information from the system of the present invention, even multiple times, to better understand the potential date and/or match before accepting, and importantly, before the other subscriber is provided contact information and/or a meeting location of the subscriber. In the embodiment where the present invention merely provides the meeting location, the present invention advantageously does not provide the subscribers contact information and/or other personal information before the match/date. Advantageously, in accordance with this embodiment of the invention, subscribers never receive personalized or personal contact information unless the subscribers, after meeting in person, agree to exchange such information.

In another embodiment of the invention, the dating and/or networking system provides subscribers the functionality to email, instant message and/or text message at least one additional piece of personal information and/or questions, optionally directly to each other or via the system anonymously, to obtain additional information that may be more relevant than the user profile or information from the user profile that was used to make the initial date/match.

In another embodiment of the dating and/or matching system of the present invention, the system optionally provides automatic and/or user initiated registration in a particular establishment and/or geographic location, which can be used instead of a location determination system such as GPS, or together with such system. This form of registration may be even more precise than GPS because it confirms a subscriber's presence within a specific store, establishment, entertainment establishment, restaurant, and the like. Thus, in these embodiments, the subscriber either initiates the registration as described above, or alternatively, if the subscriber optionally sets the wireless device to automatic registration based on the appearance at a predetermined registration area and/or location, the subscriber will be automatically registered to receive communications regarding a potential match/date.

In an alternative embodiment of the present invention, once the dating and/or matching system determines that a potential match/date has been detected, the system optionally notifies the different subscribers and asks whether they want to continue to participate in the matching/dating program. When both, some and/or all subscribers agree to participate, the present invention can forward to each subscriber automatically the information that each subscriber shares substantially in common and/or the information that was responsible for the match/date between the subscribers. In this embodiment of the invention, the subscribers will know immediately the information that should be most relevant in making the match/date and can determine whether to actually agree to either contact or send the other subscriber additional information and/or arrange to meet the subscriber at a pre-designated location.

In an alternative embodiment of the present invention, the present invention optionally includes the ability to recommend a potential meeting place for the subscribers to meet after determining that the subscribers have agreed to participate in the date/meeting. In this embodiment, the present invention advantageously determines the location based on, for example, subscriber preferences, geographic location that is preferential for at least one of the subscribers and/or both subscribers, predetermined location where, for example, a sponsor will receive patronage and/or provide a discount for the subscribers and/or actual pay the organizer of the dating/matching system an advertising fee to promote their sponsorship. Accordingly, the present invention advantageously determines not only a potential match/date, but advantageously suggests, recommends and/or determines a specific location and/or geographic location and/or restaurant, clothing store, zoo, museum, and/or other suitable location for the subscribers to meet and optionally based on geographic distance and/or location.

Additional dating and/or matching features and/or differentiators of the networking and/or dating system of the present invention include one or more fo the following:

Wireless messaging platform supports interactive messaging

Wireless messaging platform provides simultaneous parallel applications to run without collision Multiple wireless initiatives or topics run without conflict Different initiatives or topics may be user specific or selectable While each initiative runs independently, there can be overlap in terms of customer base Platform is flexible to add/remove initiatives quickly and efficiently One wireless carrier/network can be a dating/matching sponsor and advertise on the wireless device and/or network of another wireless carrier/network Contact members to notify of the match/date to allow members to either directly contact each other or send additional information via, for example, text messaging, email, instant messaging, such as pictures, video, and the like Contact members or wait for request from members to participate in match/date initiative; can then automatically track member via GPS instead of constantly tracking member all the time, thereby increasing privacy of member Contact each subscriber that is being offered the date/match and obtain approval for the match prior to actually notifying potential members that match has been made Contact users after initial match has been conditionally approved, and provides users the capability to request additional information, such as personal information from the other member or other members which the requester still wants to know before finally accepting the date/match Members can register or "check-in" at predetermined locations and/or establishments which is one additional level of specificity, for example, with regard to the location where a member is that may be interested in matching; For example, two or more members may actually be in the same restaurant where they can be informed of one or more other subscribers being present; members can register via sending a message to the system via text message, email, RFID, Bluetooth, and the like, either by initiating a registration or automatically Contact members after initial match has been conditionally approved and exchange, optionally automatically, profile information that was significant in making the match/date and/or other important information regarding a match/date that a member may want to know before finally accepting the match/date and/or information the members may want to know that is geared particularly for a first date, e.g., likes/dislikes, common interests, favorite foods, wines, alcoholic beverages, and the like Contact members to suggest and/or recommend and/or arrange meeting place based on, for example, geographic location, common interests/sports, common food tastes, common beverage tastes, common entertainment preferences and/or sponsors willing to, or interested in, being utilized for the match/date for the suggestion and/or recommendation, and optionally providing the members a discount and/or compensating by the sponsor to the networking and/or dating system proprietor for the advertising and/or recommendation to visit that sponsor Wireless messaging platform includes a protocol conversion server functioning to interface with a variety of wireless networks having different messaging characteristics for both transmitting and receiving messages, and parsing the different message formats for the content from a received message, and transmitting a message to a plurality of different networks and/or devices having different messaging and/or interface capabilities and/or functionality Contact members with a wireless consent form indicating that the matching/dating system and/or the members participating in the match/date have generally consented to potential cohabitation optionally without any recourse to the other party. Alternatively, the members may be contacted with other types of informed consent forms with limited recourse for acts and/or aggressive acts that are clearly assaults, but not sexual related misconduct or sexual related crimes that are felonious in nature carrying a high penalty/sentence. Alternatively, members may be presented with consent forms that eliminate any criminal penalty, but do not foreclose the possibility of civil lawsuits for damages relating to torts, and the like As another alternative and/or in addition thereto, members may be presented with consent forms that eliminate any civil penalty, but do not foreclose the possibility of criminal lawsuits for criminal type activities, perhaps with the exception of the most severe sexual crimes such as rape and/or sexual assault that carry significant prison time.

For example, athletes, celebrities, high worth individuals, or even average individuals, male or female, may be interested in the wireless consent initiative because that allows them more flexibility to meet a variety of individuals without the worry of later being sued. In additional alternative embodiments, broadcast messages may be transmitted to numerous individual that may be interested in meeting and/or dating a celebrity or predetermined individual or individuals. In this embodiment, the optimum matching individual or individuals may be selected to meet with the celebrity, celebrities, and the like, while utilizing the informed consent feature of the present invention. In another alternative embodiment, an individual or individuals may be randomly selected as part of a match or date, based on a lottery or other competition to meet or date a specific individual or individuals.

Additional optional hardware and software requirements are as follows for one or more embodiments of the present invention:

System Capabilities

Platform supports interactive messaging

Platform provides simultaneous parallel applications to run without collision

Multiple wireless initiatives or topics run without conflict

Different initiatives or topics may be user specific or selectable

While each initiative runs independently, there can be overlap in terms of customer base Platform is flexible to add/remove initiatives quickly and efficiently Wireless Initiatives Interactive trivia with fans inside and outside of the stadium Targeted messaging, e.g., targeted advertising Broadcast messaging, e.g., general advertising Interactive messaging, e.g., with concessions Profiling for each initiative or topic, e.g., based on network operator Urgent and emergency messaging Specific initiative: discounts for concessions and/or memorabilia Specific initiative: invite patrons to different activities before, during or after game, e.g., player loyalty, family activities, etc.

Specific initiative: seating upgrade program

Specific initiative: messaging patrons in one section and separate messaging to patrons in another section Specific initiative: messaging parent of a missing child Special initiative: dating where patrons can keep their seats to return to them, or their seats are re-allocated. In alternative embodiments, the patrons switch seats instead of moving to empty seats, either for the entire game or only a portion thereof with other patrons for match making possibilities.

Functional Specifications

Front end for user signup and profiling-secure site—for example, modeled after www.mlb.com, include one or more of:

type of seats does the customer want for upgrade (decks and range of sections)

information for dating concession profile capability for additional profile information validate user by sending message to device upon sign up auto append of network information to phone number during signup login and password protected site frames on website or interface that can be easily configured to have look and feel, for example, of particular baseball team capability for space on screen for advertising opportunity that can easily be modified and relatively dynamic capability to handle lost passwords web page or interface where customers with season tickets can mark a calendar with the seats they want to keep and the ones they are interested in freeing up for early sale or upgrade.

The optional Front End of the present invention used for administration and setting up parameter for each application, optionally includes a secure site, with one or more of the following:

application email address and password minutes for all the configuration parameters and/or functionality number of threads for each application for upgrades, at least one of releasing customers old seat immediately, or it until the customer approves of the release, or holding the customer's seat for a predetermined portion or all of the game, for example, in the dating functionality)

set schedule for games section rating setup, and seat upgrade pricing revenue allocation model provide a number of retries if message send failure Concessions The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

Concession Wireless Initiative

Purchased via cell phone

Web registration for preferences

Targeted concession offers

Confirmation that purchase is ready

Delivered to seat or ready for expedited pickup

Customer convenience: system identifies closest concessions to customer

Customer convenience: system determines concessions with short wait

Each concession labeled with a number for customer identification and fulfillment Customers can request menu, or register for each game to receive menu around game time via mobile device GPS can be used effectively to inform customer of closest concession stand to pickup order, and/or customer can provide section number and/or seat location for system to identify most convenient concession stand Most convenient concession stand can be determined based on one or more, or combination of, predetermined criteria, such as, closest concession location, shortest wait in line, specific item being ordered, and the like.

Interactive messaging, e.g., with concessions

Specific initiative: discounts for concessions and/or memorabilia

The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

In one alternative embodiment, the following message exchanges may be used:

First Message

"In Game" Concessions

Menu will be sent soon!

Reply with #, item short form and seating section

Ex: BE=beer

Reply 3BE for 3 beers

408SEC for section 408

Powered by NEXTEL

Second Message (paper menu?)

Menu

BE=Beer; CO=Coke; DCO=Diet Coke

HD=Hot Dog; BUR=Burger

TA=Taco/Salsa; PO=Popcorn

FF=French Fries; CH=Chips

PZ=Pretzel; PT=Peanut

LEM=Lemon Ice

Third Message

Order received!

Summary:

3 HD @ $3=$9

2 CO @ $3=$6

2 LEM @ $3.50=$7

Total=$22

Reply Y to ACCEPT

Credit Card charged

N to CANCEL

Fourth Message

Thank you for ordering!

Your order has been confirmed!

Confirm # REIF1001

Powered by: THE SPORTS AUTHORITY!

Fifth Message

ORDER READY

Bring Confirm # REIF1001 to Concession # 33 by sect # 212

$2 off NIKE baseball gloves

Bring #NIKE305 and game ticket to

Any SPORTS AUTHORITY!

In another embodiment of the invention used in concessions initiative, the concession attendant receives the confirmation number or other identifying information from the customer when picking up the concessions. The concessions attendant enters the confirmation number or other identifying information when ready or optionally clicks on the order on the computer screen via a concessions interface associated therewith. From there, the order is then cleared from the system with respect to orders that require fulfillment, advantageously allowing the workers to streamline their work activities in the concessions. In an alternative embodiment, the concessions are actually delivered to the customer using the sutomer provided seating information, either provided by the customer through, for example, the wireless device or other registration and/or notification process, or even via a telephone call or automated attendant to associate with the order.

In another embodiment of the invention, the concessions menu is advantageously only delivered to customers that have entered the stadium via a location determination system, and/or checked into the stadium via a ticket reader/scanner. In alternative embodiments, all customers that have registered for the concessions service will receive an introductory message. Thus, customers that are not attending the game need only reply with a request to terminate the concessions service for that event and/or game.

In an alternative embodiment, the customer is advantageously directed to closest concessions via, for example, GPS chip in phone or by knowing where the customer sits at check in, or by having the customer input their seat location or location where they would like to pickup the concessions.

In another embodiment of the invention, we have determined that some mobile phones will utilize different transmit and receive addresses, and therefore, a user may not know how to appropriately register to be a subscriber for one or more wireless initiatives. For example, we have determined that some mobile phone networks utilize slightly different or different electronic addresses for the transmitting and receiving of electronic messages. For example, for the Research In Motion (RIM) Blackberry communication service, the mobile device is assigned a desktop email address. In one configuration of Blackberry, the mobile device only has one address. However, in the non-integrated configuration, the mobile device actually has a separate address when transmitting from the receive address.

In accordance with this embodiment of the invention, the user registers by providing their mobile phone number and optionally a network carrier for same. In this embodiment, the mobile phone user registers with their phone number and optionally wireless network provider. The registration system of the present invention then sends a message to the mobile device, requesting that the mobile device respond, optionally with a predetermined code and/or predetermined message. The mobile device then responds to the registration system, and the registration system corresponds the mobile device response with the original registered mobile address, thereby completing the registration process by ensuring that responses received from the mobile device can be mapped appropriately to the mobile subscriber. In the embodiment where the mobile user is requested to provide a predetermined code and/or message, the registration system uses the predetermined code to map the mobile phone response potentially having a different address with the transmit address provided by the user.

Dating, Matchmaking and/or Networking

In another embodiment of the invention, patrons are provided the opportunity to meet others in the venue or at a predesignated location near or away from the venue using standard matching rules. In one embodiment, the presence of the user is detected when entering the stadium, for example, via the ticket entrance systems. In another embodiment, the presence of the patron is detected or determined based on a message that is send to the user, for example, either right before, during or after the game. In this embodiment, the user can be prompted with a request whether they would like to participate in the matchmaking, dating and/or networking program.

For example, potential business or social partners may be selected or prompted for networking or dating. When the user responds yes, in this embodiment, their current seat is irrelevant if that seat is not to be released for another patron. Therefore, the system need only select a new set of seats for the networking and/or dating for the patrons, transmit the patrons the additional new seats via, for example, a wireless ticket, update the venue seating database for subsequent verification by the ushers when seating the patrons. The patrons may then proceed to the new location and have a meeting or date, and then return to their original seats if desired.

In another embodiment, a "burnt bridge" approach or feature is provided where the original seats for the patrons that are meeting are then released for other upgrade and/or networking programs. In this embodiment, the original seat of the patron must be known for example, via check-in procedure, registration for the program in advance for example over the web registration process or other registration process, or via the patron responding to the system with their wireless device of their current seat location. Alternate combinations or modifications of the above embodiments is also used.

Trivia

In the alternative embodiment of providing the user trivia information, based on registration and/or location, for example, while attending the game, watching the game at home, or any time prior to or after the game, the user may be provided with questions, as described above, to answer as part of a tournament and/or to be eligible for prizes, awards, and the like. In one embodiment, a section or portion of the users are targeted for the questions together, while other sections and/or portions of the users are targeted at a time period thereafter, for example, 1 minute later, to stagger the communication and transmission of data, thereby reducing congestion and/or unnecessary hardware to accomplish the transmission and acceptance of information to/from the patron.

In one embodiment, while all the questions are staggered over a predetermined period of time to the patrons, whether limited to patrons in the stadium, out of the stadium and/or both, the patrons are not notified whether their answer is correct until after all questions have been transmitted, and all patrons are provided the opportunity and/or sufficient time to respond. Once that predetermined time period has elapsed, the patrons will be notified whether their answer was correct, and whether they are still in the tournament. In optional embodiments, a predetermined time period will again elapse until new questions are sent and the tournament continues.

Optional Oracle or My SQL Database

In one embodiment of the invention, an Oracle or My SQL Database is used in connection with the present invention. In one embodiment, the result set is set to be proportionally with respect to the number of users and/or data that will be stored in the system. In another embodiment, the database is optionally partitioned for specific games and/or initiatives or groups of games and/or initiatives. The system is preferably thread safe when running the games and/or initiatives. The system is optionally integrated with Credit Card for payment, and/or integrated with the venue ticket system and/or point of sale system to optionally determine who came in and when into the venue. In another embodiment, the present invention maintains and updates financial balances for users, such as patrons and stadiums. In alternative embodiments, secure interaction with ushers and an interactive kiosk is provided.

The present invention optionally provides any standard algorithm for partitioning of group of seats and users, for example, for system resource allocation, load balancing and/or division of system functionality. In alternative embodiments, a local kiosk for the stadium and/or venue is provided where the user can enter information, such as register for one or more initiatives and/or programs. In alternative embodiments, the system of the present invention includes the capability of offering for sale seats which are not currently sold via messaging to wireless devices, such as text messaging to mobile phones, or other messaging and/or wireless communication to wireless devices, and consideration. In alternative embodiments of the invention, standard algorithms such as used in the airline industry may be used to overbook seats for the venue, and consideration.

In alternative embodiment of the invention, instant messaging or any type of communication method can be used in the present invention, include local and/or global networks, such as the Internet, LANs, WANs, WAP, 811.02a, 802.11b, 802.11g networks, and the like.

Messaging Software Requirements

Trivia and/or other messaging products/initiatives are Java applications that run in a J2EE application server and utilize a JDBC 2.0 compliant relational database. There are typically open source options available for system support. Currently for development and test environments we utilize are desktop environments running Windows 2000 with the open source options below. The draw back is that open source options typically don't provide formal system support approaches, although we have found the software to be very reliable and would recommend this approach for early stage pilots. Should the customer prefer purchase software options for these components are provided as well.

I. Server Software Specifications

Alternative A—Open Source Approach (1) Web/Application Server—Tomcat 4.1.18

(2) Database—MySQL 4.0

(3) Windows 2000 Server for each server

Alternative B—Purchased Product Approach (1) Application Server—Websphere Application Server 5.0

(2) Database—Oracle 9i DBMS (3) Windows 2000 Server for each server

II. Server Hardware Specifications (4) Each of the HW Servers specification:
- (i) 2xCPU—P4 2.4 GHz Xeon
- (ii) 2 GB RAM
- (iii) Monitor
- (iv) CD ROM
- (v) Floppy Drive
- (vi) Hard Drive depending on volume (see below)

III. Communication Specifications (5) POP3 Account and SMTP server accounts that can support number of active subscribers (6) Dedicated T1 access to POP3 and SMTP provider IV. Hardware and Software Sizing Configurations Phase 1:

1K-10K subscribers and players during the game

Two Servers

Server 1—runs Web/Application Server for the website and the Trivia Application

Server 2—runs the Database server (20 Gig)

Phase 2:

10K-25K subscribers and players during the game

Server 1—runs Application Server for the Website front end

Servers 2 and 3 (2 Servers)—run the Application Server for Trivia Application (two servers are used handle load balancing)

Server 4—runs the Database server (50 gig) (Level 1 RAID 2×50G Array)

(Server 5—used as a backup to server 4—depending upon Reliability requirements)

Phase 3:

25K-50K subscribers and players during the game

Server 1—runs Application Server to run the Website front end

Servers 2, 3, 4 and 5—run the Application Server for Trivia Application (four servers are used to handle load balancing with hardware and software clustering)

Server 6—Database Server—150 gig (Level 0+1 RAID 6*50G Array)

(Server 7—used as a backup to server 6—depending upon reliability requirements).

In one alternative embodiment, as part of the sign up for trivia the system optionally asks the general admission or season ticket holders to input their seats to simplify how the system obtains information where the patron is being seated when they come to the game. In an alternative embodiment, the system obtains this information from the stadium database system, kiosk where the patron can enter the information at the stadium and/or via the point of sales system by the service personnel or attendant that is selling the tickets. Using any of the above methods, once the system knows where the patron is/are seating when present at the game, the system can then target sections of the stadium for, for example, the trivia quiz or other service/offering to the patrons.

Examples of different sections that can be separately targeted include for baseball, behind first base line first, behind home plate second, first base line third—all lower deck; same sections for upper deck and bleachers. Other sports may include football, hockey, soccer, basketball, and the like. In accordance with this embodiment, targeting different sections over different periods of time, thereby preventing a long delay to receive answers once the question is transmitted, may minimize collusion among patrons.

Thus, by segmenting the stadium over a few minutes in accordance with one embodiment of the invention, the present invention may increase the window of transmission to, for example, 2 minutes or more for the first round. As the rounds get successively smaller, the present invention will transmit messages faster. The present invention also provides optional winners for different sections of the field. In addition, the section winners can further optionally compete against each other, for example, the first class seating winner can further compete against the bleachers winner, and the like.

As discussed above, one or more of the above alternative embodiments may be incorporated into the embodiments described above, and/or any of the embodiments discussed below. Furthermore, any of the embodiments of the present invention may be used for any reserved seating or other event.

Figure 34:
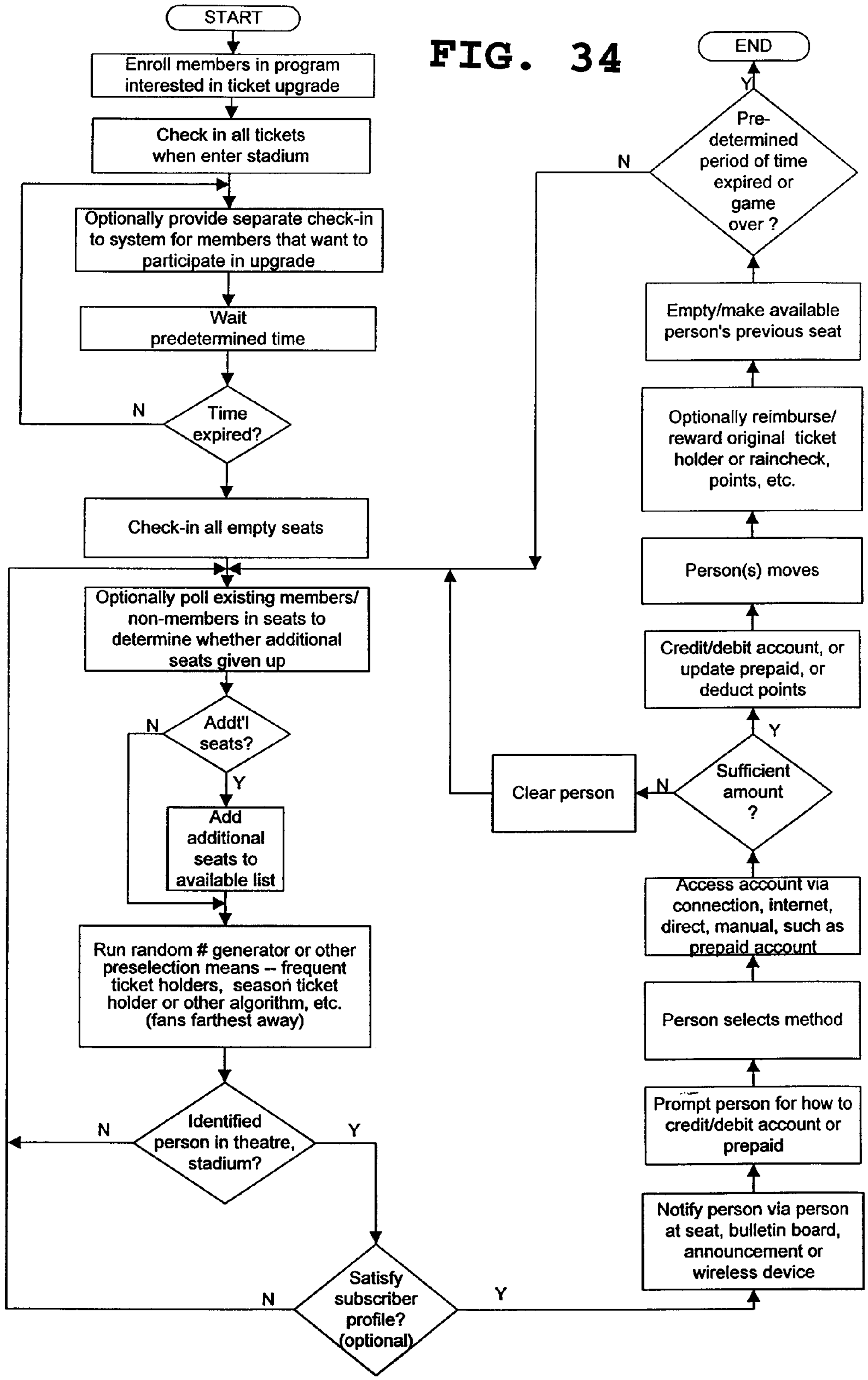

FIG. 34 is a flowchart of a twelfth embodiment of the invention. In FIG. 34, the process begins by enrolling members in the program that are interested in the ticket upgrade. Tickets are checked in, for example, as the patrons enter the reserved seating area, such as a stadium or theater, through, for example, bar code readers, scanners, infrared readers, and/or manually or other method where the patron is checked in, either at the gate, seat or other location. An optional separate check in area is provided for patrons that want to participate in the upgrade program. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seats for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, a standard bidding process, or other predetermined process.

An optional polling process to poll existing members and non-members in seats to whether additional seats are available. That is, in another optional embodiment of the present invention, non-members may also make their seats available for re-allocation/re-sale at any point in the process. In this additional polling process, the next step is to determine whether additional seats have been made available. If additional seats have been made available, then these additional seats are added to the list of available seats.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or more means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

The patron is prompted for the method of obtaining the tickets, such as a payment method, such as credit card, debit card, cash, point redemption, or optionally a gift/prize. The patron subsequently selects a payment method. The patron's account is debited at a future time, or optionally immediately via connection to a standard clearinghouse network, such as visa network, master card network or other network via direct connection or via the Internet, and the like.

If sufficient funds do not exist, then the person is cleared or rejected from the opportunity for the seat re-allocation/upgrade process. If sufficient funds do exist, then the patron's account is debited or points deducted. Alternatively, one person may purchase the upgrade on behalf of another person.

The patron then moves to the new seat, and the system then clears the patron's old seat from the system to optionally provide re-allocation of the previous seat. As indicated previously, if the patron accepts, payment of money or other means may be effectuated on the spot via the wireless device, credit card, debit card, points, and the like, and the patron may now move to the other seat. In addition, the original ticket holder is optionally reimbursed with award points, a percentage of the revenue, a flat fee, an additional event ticket that might also be upgradable, and/or any other means for rewarding the original ticket holder. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

In accordance with the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that may be in the vicinity of the stadium but were unable to get seats. Since the present invention re-allocates and/or sells tickets very near to game time in accordance with one embodiment, the patron must be in the general vicinity of the stadium to take advantage of this embodiment of the invention.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron to help the patron decide the quality of the upgrade and whether to accept.

In one alternative embodiment, if the patron that has their ticket re-allocated in error, e.g., because the patron did not show up to the event based on the predetermined criteria but the patron was still planning on attending because they forgot about their seat being re-allocated, the system can re-allocate seats immediately upon the checking in of the patron and notify them that their seats have changed because they are late. In this situation, the stadium/venue might decide to further upgrade the patrons because of the mistake.

In accordance with one embodiment of the present invention, the process of the present invention specifically reserves seats of the highest or very high rating that are considered preferred, in the event a patron's seat is re-allocated prematurely or erroneously. In this situation, the patron who has had their seat re-allocated because they will likely receive an even better seat as a result of the mistaken (stadium or patron) or premature seat re-allocation.

In another embodiment of the present invention, as patrons are entering the venue or stadium, they are provided advantageously with a map of the stadium so patrons can analyze the potential upgrade to make a decision whether the upgraded seats are sufficiently good or of value to warrant the patron moving and/or paying for the additional upgrade. By handing the patron the map of the stadium, the process of the present invention is not required to transmit a detailed schematic to the patron's wireless device which would not normally be able to effectively permit the patron to evaluate the proposed upgrade seats. The map that is handed out may optionally include information for patrons on where to register for the upgrade and/or additional advertisement opportunities.

In one alternative embodiment, the patron that has purchased the ticket, for example, a season ticket holder, may advise the stadium that for a particular game, set of games or all games, they do not want their seats to be re-allocated, and perhaps, an additional fee is assessed for this type of patron. If the stadium provides the ability for the patron to selectively opt out of the seat re-allocation, the patron can, for example, connect to the system via the Internet, public switched telephone network, cellular network, and the like, and notify the system that they do not want their ticket re-allocated, for example, because they are coming late to the event. Other means of notifying the system and/or other reasons may be utilized in connection with the present invention.

In another alternative embodiment, the system provides patrons the ability to individually select when their tickets may be re-allocated. For example, one patron may prefer to only give up their ticket if they are late to the game by 15 minutes, while another patron may be willing to give up their ticket if they have not arrived 15 minutes before the game. In alternative embodiments, the stadium may provide incentives for the patron to have their ticket re-allocated prior to the game because it increases the stadiums chances of re-allocating/re-selling the ticket.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provide additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In an alternative embodiment, the system determines priority of re-allocation of seats based first upon patrons that have seats that may also be re-allocated. That is, the systems attempts to maximize the number of re-allocations by prioritizing the re-allocation based upon seats that may be re-allocated after already being re-allocated. For example, if front row seats in a stadium are available to be re-allocated, in this alternative embodiment, patrons that are in the next closest section for example on the field level would be upgraded first to those seats. Then, patrons with less preferred seats, for example, in the upper deck would be re-allocated to the seats that have now become available from the patrons that have been upgraded to the front row. Thus, using this alternative priority scheme, the present invention maximizes the re-allocation numbers. Of course, this priority algorithm may be combined with additional factors, for example, relating to subscriber/patron value. As described above, additional factors may be utilized in the algorithm to determine the subscriber or set of subscribers to offer the upgrade.

In alternative embodiments, patrons in the vicinity of the upgraded and re-allocated patrons may optionally rate the upgraded patron, for example, for appropriate behavior, wearing of excessively large hats, drunkenness behavior, and the like. These ratings may then be taken into account in the re-allocation algorithm for future upgrades to the patron.

In alternative embodiments, the patrons eligible for the upgrade may be notified using standard email communications over a wireless device, mobile telephone, and/or other standard communication means. For example, standard text-to-voice and/or voice-to-text communications may be used to contact the patron to evaluate whether an upgrade will be accepted and to actually accept the upgrade.

In another embodiment of the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that have already purchased tickets in the vicinity of the stadium but were unable to get seats and/or may be in the vicinity of the stadium but were unable to get seats. Since the present invention re-allocates and/or sells tickets at any time prior to and/or after beginning of game time in accordance with one embodiment, the patron may be in the general vicinity of the stadium to take advantage of this embodiment of the invention or even at any location when being offered upgrades and/or seats well in advance of the game. For example, the present invention can upgrade or sell tickets to patrons well in advance of the game since it advantageously is permitted or has the authority to resell tickets either via ticket holders that do not show up during the game and/or, for example, season ticket holders that have authorized the stadium in advance to resell their tickets based on predetermined criteria, for example, when the season ticket holder notifies the stadium that they will not be present at next weeks game.

In one optional embodiment of the invention, the patron presents the usher with the confirmation number which the usher can enter into a wireless device using a local or private wireless network, or can simply use a walkie talkie or telephone to call the dispatcher to confirm the upgrade and/or new seats using the customer provided confirmation number. The dispatcher will have access to the system to enter the confirmation number to confirm the validity of the upgrade. Alternatively, a patron will retain their old ticket. The patron will give in the old ticket to the usher which is scanned or barcoded by the usher for immediate identification of new seats and used in place of, or in addition to, confirmation number.

Of course, the confirmation may optionally be made via customer name with an appropriate identification card or other information. Further, alternative methods may be used to verify that the confirmation number and/or ticket being used by the patron is valid. For example, the patron may be equipped with a printing device associated with the wireless device or download an actual ticket on line from home prior to the game for the new ticket or upgrade. Alternatively, the patron may be equipped with an identifier card, optionally including a bar code with a unique identifier relating to the patron's account information and profile that can be scanned for additional convenience. Alternatively, a wireless device may be used to securely store this type of identification and/or account information.

In at least one alternative embodiment of the invention, the patron may comprise optionally a corporate account that has a number of tickets, for example, season tickets. In this embodiment, the corporate account may have associated therewith a plurality of email addresses or other communication addresses to transmit the seat or upgrade offer to a number of potential patrons that may rotate their attendance at the games. In accordance with this optional embodiment, multiple emails can be stored for a single user/corporate account, and the system may transmit individual messages to all email addresses, or may only transmit messages to individual patrons for corporate account that individually advise the system that they are associated with a particular ticket/bar code for a particular game and will be/are present at a particular game.

In an alternative embodiment, patrons may enter the stadium and subsequently inform the system that they are present and interested in an upgrade via a kiosk where the patron can scan a bar code and enter their customer number to be eligible for upgrades during the game. The system is then able to transmit a message to the customer, assuming that the customer has pre-registered with the system with the appropriate contact information. Alternatively, or in addition to individual use of a kiosk(s), the customer sales office may have a kiosk or additional functionality to enter the customer name and/or customer account and scan in the bar coded ticket on the spot to register each patron as they enter the stadium or venue.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron upon entry in the stadium to help the patron decide the quality of the upgrade and whether to accept when an offer is received by the patron at a predetermined time. The graphical map may comprise a small booklet with a map of the stadium showing seat locations, and optionally a game schedule.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provides additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In alternative embodiments, patrons in the vicinity of the upgraded and re-allocated patrons may optionally be eligible for a dating or matching service where patrons register and provide profile information to the system and/or through a third service provider dating service. Once the system knows that the patrons will be coming to the game and/or have actually checked in to the stadium, the system can then arrange for the two, four, etc. patrons to meet each other by allocating and/or re-allocating seats to the patrons together. Thus, based on profile information, customer request and availability, the system is able to upgrade or sell tickets to patrons to maximize their chances of meeting someone at the game. This optional feature provides significant potential enjoyment for the patrons participating in this dating or connection program. In accordance with this embodiment, one possible sequence of acceptance steps involves profile matching the two patrons (or groups of patrons) based on predetermined profile information; transmitting a first message to the first patron regarding availability of the second patron and requesting a conditional acceptance form the first patron; transmitting a second message to the second patron indicating that the first patron has conditionally accepted and request the second patron to accept; and when the second patron accepts before the first patron has rescinded the conditional acceptance, finalizing the upgrade and/or seat allocation for the first and second patrons. This embodiment of the invention is a complete reverse from typical dating and/or matchmaking services which attempt to develop detailed algorithms for the matching process because of the significant decision that exists in determining who to spend valuable time with. In accordance with the invention, patrons are already present at the game, and therefore, half or more than half the effort is already done. The remainder is to actually meet the other person which can be accomplished with profile criteria, whether or not the algorithms are very sophisticated.

In one embodiment, the patrons that are being matched have their original seats maintained and not made available for other upgrades in the event the matching does not work out early on. In this embodiment, one or both the patrons can return to their original seat. Hopefully, there will not be a significant argument of who would need to return to their original seat if an upgrade is actually performed. In addition, in accordance with this embodiment, the seats that are selected do not necessarily have to be better seats in the classical sense. That is, seats further away from other ticket holders might be considered preferred when matching two individuals for the first time. Alternatively, couple that would prefer a little more privacy or quieter game might request to be moved to a more isolated area. Alternatively, families with small children might prefer to be moved to a less busy area as well during the game where the children might be able to freely move around. All these scenarios and/or alternatives are possible in view of the present invention. The advantage of performing a match in a public setting is that the patrons do not have to worry about leaving or ending the date, and also do not have to worry that the other person will have their home address.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like.

In addition, this feature also optionally permits the patrons that have participated in the program to rate one another for future dates. For example, one patron can rate the conversational benefits of the second patron, the appearance of the second patron, the overall short term versus long terms relationship goals of the patron, and the like. These ratings may then be taken into account in the algorithm for future seat assignments, re-allocations and/or upgrades in the future for the first and second patrons, and all other patrons will now benefit with the additional profile information of the first and second patrons. The matching service may be for amusement or work related networking purposes, for example, to meet an executive that the patron currently works with or wishes to work with/sell in the future.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like. In addition, the system advantageously and optionally provides the feature of allowing patrons to text message one another directly, and/or exchange pictures via wireless email, text messaging, and other wireless devices that provide the standard capability of exchanging pictures, such a T Mobile and/or Sprint.

In alternative embodiments, the ticket holder can call in via a voice to text message, text message and/or email and let the stadium know early that they are not coming. In this manner the ticket holder obtains the convenience of the stadium or venue reselling their tickets in advance, thereby providing the venue with additional time to maximize the resale of the ticket.

In alternative embodiments, when the patron enters the stadium, they have their ticket barcoded or other device that detects their presence can be used such as infrared, Bluetooth, etc., and then they can become eligible for an upgrade. The patron can register in advance that they want to receive upgrades by providing their name, message address, e.g., email, telephone text message address, etc., and optionally their credit card or other payment mechanism for upgrades that actually cost money as opposed to free upgrades. In alternative embodiments, the patron can register at the ticket booth when purchasing their original ticket. In this scenario, the stadium representative can enter this information on behalf of, and with the permission of, the patron since the patron may already be providing their credit card, debit card, etc. to purchase the original tickets. Alternatively or in addition, a kiosk may be provided where the patron can enter their original ticket, e.g., scan in their original ticket and provide their name and text message information in the stadium to register for a one time upgrade for the game after purchasing, for example, a regular admission ticket.

In alternative embodiments, an usher can verify that the patron should be upgraded by the patron providing the confirmation number that may be transmitted in real-time by the system, and/or by the patron using their original confirmation number or original ticket with barcode or other identification means, such as a smart card, infrared reader, etc. that represents original ticket and presenting same to the user. The usher then needs only to scan in the original ticket and the system will verify whether the patron associated with the original ticket is valid and whether the upgrade is valid.

In alternative embodiments, a warning message may be sent to the ticket holder that has not shown up to game warning them that if they do not respond within a certain time period that their seat will be re-allocated or re-assigned to another patron. Similarly, a release message may be sent to the ticket holder after their seat has actually been released and/or re-allocated, thereby notifying the patron that if they change their mind in attending the game, they will have to obtain an additional ticket. In alternative embodiments, the ticket holder that has their seat released and re-allocated can be themselves re-allocated a similar, worse or better seat, depending on, for example, their subscriber value and/or other criteria. For example, if the patron is provided a better seat, this will encourage them to more readily give up their seats in the future even if they are attending the game. On the other hand, if the patron is provided a worse seat, then this encourages them not to artificially give up or have their seat released when attending the game. Accordingly, the present invention is designed to deal with various behavioral patterns of specific ticket holders, and may optionally and advantageously be a ticket holder specific with respect to various criteria for re-assigning, releasing, selling and/or re-allocating tickets.

In alternative embodiments, the system transmits to the ticket holder a welcome message after being upgraded and after having being moved to a new upgraded seat location. In one embodiment, the system identifies that the patron has been successfully upgraded after the patron provides the usher with a confirmation number or original ticket, which is then verified by the usher and system.

In alternative embodiments, the system, after having identified which patrons have checked into the stadium and/or have been upgraded, transmits a trivia question and/or additional advertisements to all patrons attending the game. In alternative embodiments, the information is transmitted to both patrons that are attending the game and additional patrons that have registered in the past to receive information but that are not attending the game. The participants can, for example, answer trivia questions and respond with their wireless device. Depending on whether the patron is attending the game or not, the system may determine to offer or deal with each of the patrons differently. For example, for patrons at the game, winners may be successively determined and narrowed, as patrons successfully and unsuccessfully answer questions, round after round of questions in a "spelling bee" format. For patrons that are not attending the game, winners may be declared, or statistics provided to the broadcast station that can be aired on television. In yet additional alternative embodiments, instead of transmitting information/questions to the patrons via the wireless device, the information/questions are displayed on the stadium billboard for patrons at the game and/or on television for patrons that are watching the game on television. The patron can then merely respond via the device, e.g., the telephone accordingly via a voice-to-text system or via other mobile devices via text messaging.

In alternative embodiments, the present invention provides the advantage of additional advertising sponsorship to the venue. For example, in one embodiment, the venue is partitioned into different locations that may be assigned to different sponsors. In one embodiment, the sponsor that provides the most value may be assigned a certain number of premium seats that are not available to other sponsors.

For example, the sponsor may offer a discount on the upgrade if you are a Verizon or Verizon Wireless customer or they credit your cell account for each seat upgrade or you get say 30 free minutes, etc. In alternative embodiments, the present invention provides the advantage of one wireless provider to advertise on another wireless providers mobile phone or wireless device. For example, if Verizon Wireless is a sponsor of the upgrade system for a particular stadium, the present invention will still work with, for example, AT&T, SPRINT, and CINGULAR customers. An advertisement message sent with the upgrade offer may read on the AT&T phone, "brought to you by Verizon Wireless." In an alternative embodiment of the present invention, text messaging is optionally used for mobile phones to perform the message communication of the present invention. The user is only required, in one embodiment, to reply or respond with a "Yes" to accept the upgrade offer since the user has advantageously pre-registered with the system, thereby minimizing the required communication/input by the user. In an alternative embodiment, the user, instead of pre-registering with the system, is charged on their wireless or even regular telephone number bill when they accept the upgrade offer. Thus, the wireless system that either administers the user's regular or wireless account or the upgrade sponsor may be responsible for actually billing the customer in this alternative embodiment.

In the alternative embodiment when text messaging is optionally used alone or in combination with other communication methods, the system provides the additional advantage of maximizing bandwidth usage by not requiring use of bandwidth on the wireless voice system, thereby maximizing system resources.

In another alternative embodiment, the present invention optionally and advantageously provides a security and/or safety feature in the event of, for example, a minor event where a parent gets separated from a child, a disaster or other event that might require evacuation of the stadium. In one embodiment, the person needing help provides their name to an attendant that can search the system for the contact information of their companion/parent. The system can thereafter send an email and/or text message to the companion/parent regarding the status of that person and provide instructions for meeting that person or arranging help, authorizing medical procedures, and the like. In another embodiment, the person requiring help, e.g., a child provides the attendant or kiosk with their ticket which can, e.g., scan the bar code or other reader system. The system can either automatically provide a text message to the parent who can then reply to the child/attendant via the kiosk to meet the child.

Alternatively, the parent can be instructed to meet the child at a predetermined location, and to stop looking for the child because the child was found. Thus, for this example, the person who is lost or separated from their party can notify security or access a kiosk. Security can, for example, notify the parent that child is in safe custody, and should not search the stadium, and therefore, meet outside stadium in a pre-specified safe place.

In an alternative embodiment, if a child/person is separated, the security guard/kiosk can arrange the best place to meet, either in or outside the stadium, together based on an optional global positioning system (GPS). In addition, the party with the mobile device can be provided directions on where to go to meet their party from who they have been separated.

In an alternative embodiment, the present invention may also be used in a security, defense and/or safety setting to direct patrons in a stadium for an orderly evacuation or notify patrons regarding status of a safety related event via, for example, a broadcast message including text message, email and the like. In this manner, system communication resources may be most efficiently utilized by not over-utilizing the system via voice communication, unless completely necessary. For example, the message can be broadcast in the event of an impending hurricane. In this situation, patrons in different sections get different messages, for example, to exit the stadium out of gates/exits that are either less occupied or closest to the section the patrons are sitting in. Advantageously, the present invention has the patrons contact information, including optionally and advantageously text messaging, that can be broadcast or sent to different patrons. The advantage of text messaging is that the bandwidth is more efficiently used in the event of an emergency, and there are no busy signals as in a voice network. Further, the message is send, and if the network is at capacity, the system can automatically resend or the message will be placed in queue and sent as soon as capacity becomes available.

In another alternative embodiment of the invention, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction.

For instance, in sporting venues the bracelet ticket includes the machine readable information that comprises at least one of a bar code and radio frequency identifier used for security check in, and optionally check out. In this manner, the standard reading machines that can scan the bar code or RFID information can keep track of people that have checked into the sporting event and/or venue. Advantageously, the machine readable information on the bracelet can also be used by the venue in the event the patrons seat assignment is modified, for example, via an electronic ticket exchange or upgrade program. In this embodiment, the visible indicia are no longer valid for the actual seating that may be dynamically changed and only represents optionally an initial seat assignment. However, the machine readable information may be used as a code to reference the specific patron and assign that patron a new seat. Thus, when the ticket reader scans the ticket and actually identifies, for example, the bar code, this information can be used to reference the patron, update and/or confirm the patron's current seat via the reader used, for example, by ushers in the venue, kiosk, entrance to the venue, and the like.

In an alternative embodiment, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction. This information, as previously mentioned, may be visually cognizable for the patron and in combination, readable by electronic means if the bracelet includes a magnetic strip, bar code imprinting, or RF chip.

In an alternative embodiment of the present invention, the security bracelet and ticket combination of the present invention advantageously includes a bar code or other machine readable information such as a RFID device. When, for example, a child is separated form their parent, the parent can notify security and the seat number associated with the child. If the child attempts to leave with their bar code/identifier, the system detects the bar code/identifier as either being valid and identifying the child that is missing or being invalid and raising another red flag. In an alternative embodiment, the bar codes/identifiers associated between children and adults correspond such that the child identifier must be within a predetermined time and/or number of checking out identifiers from/within the adult identifier. If this does not occur, the system determines that the child is leaving without their parent, and possibly being abducted.

In an alternative embodiment, the system links one or more tickets/identifiers together and requires the tickets/identifiers to exit the venue or event within a predetermined time period from one another and/or within a predetermined number of tickets/identifiers that have exited the venue and/or event. In the event that one ticket/identifier exits the venue or event and the associated identifier does not, then an alarm or other indictor occurs, and the attendants will detain the patrons that have initiated the alarm to for security purposes.

In an alternative embodiment, the tickets are advantageously coded with designations such as adult, child and the like. In the event a child ticket/identifier exits the stadium before the associated adult and/or more that a predetermined time period and/or number of patrons exiting, the system can initiate an alarm so that an attendant can determine if a child has exited the venue or event without their parent or with a wrong parent potentially averting a kidnapping. In this embodiment, an additional combination is the use of the standard fast pass feature, for example, at theme parks, and the like, where the venue records predetermined events that the user of the card enters in a faster line. In this embodiment, if a child ticket/identifier is not associated with a parent ticket/identifier, for example, as described above, the child may be denied entry into the event or venue if not accompanied by their parent. In alternative embodiments, the venue/event sponsor or organizer associates tickets upon request from the patron. In addition, in another alternative embodiment, a kiosk is provided inside and/or outside the venue for, for example, parents to register their tickets and have them associated with their children's tickets to prevent the child from exiting the venue without them, for example, as described above.

In an alternative embodiment of the present invention, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In another alternative embodiment of the present invention, a security bracelet is advantageously utilized, for example, such as the security bracelet disclosed in U.S. application Ser. No. 10/680,207, filed on Oct. 8, 2003, to Abraham I. Reifer, et al., and incorporated herein by reference, in the event of a reported event, security breach, abduction, and the like. In this embodiment, all patrons exiting the stadium must show their ticket and/or identifier so that the venue can check all patrons out of the stadium. Thus, for example, if two kidnappers come in the stadium, and want to use one bracelet for a child, the second kidnapper will be stranded in the stadium. In addition, if one kidnapper buys two tickets, then upon exit with the child and the additional ticket, a barcode/identifier will be exiting without ever having checked in, and then the alarm will go off as well.

In another alternative embodiment, the present invention provides a broadcast message to warn patrons of an event, such as an advertisement, sale and/or even a weather related event such as a hurricane that might require the venue to be evacuated. Advantageously, in at least one embodiment, the broadcast message comprises standard text messaging that optimizes or better utilizes capacity form the communication system. Thus, when using text messaging capabilities, the present invention efficiently transmits text messages to numerous subscribers regarding, for example, exit information, contacting and/or meeting additional parties that have been separated, and the like.

In an alternative embodiment of the present invention, the present invention optionally provides the capability to penetrate into secondary market with season ticket holders selling ahead of time the games they will not be attending. For example, the present invention optionally provides the feature for the season ticket holder and/or general ticket purchaser the ability to view in advance of the season and/or game the schedule, and to alert the venue and/or stadium of games and/or events they will not be attending, thereby permitting the stadium/venue to attempt to resell the tickets to other patrons. For example, in one embodiment of the invention, the patron is provided with a monthly schedule listing the events that may be attended. The patron, such as a season ticket holder, may then click or place an indicator on all games they will not be attending for the season in advance, thereby providing the stadium with the ability to resell tickets well in advance of the event. Once the patron completes identifying games that will not be attended, the system then compiles a list and transmits the list to the patron for an optional confirmation. This list is then used by the system to release seats well in advance of the game. In an alternative embodiment of the invention, registered users of the system for, for example, upgrades, may also be notified of seat availability for sales prior to the game/event. In an alternative of this embodiment, registered users may receive text messages, emails, and the like, notifying them advantageously of the availability of seats that heretofore have never been easily available to the public for sale, thereby allowing the venue to participate in secondary market ticket sales.

In one alternative embodiment of the present invention, the system/process of the present invention provides or operates as a middle person/broker between the ticket holder that is returning tickets to the venue, such as the season ticket holder, and a ticket sales system and/or company, such as tickets.com, by notifying the tickets company of the newly available seats via notification by the ticket holder, such as the season ticket holder of season ticket games not being attended.

In one alternative embodiment of the invention, the system and/or process transmits text messages, emails and the like, to offer tickets and/or seats and/or admittance to subscribers for events and/or games with empty seats even before game. Thus, the present invention allows the venue to participate in the secondary ticket sales market and the upgrade market, thereby increasing revenue and fan loyalty.

Of course, all of the embodiments of the present invention may be used for any reserved seating event, and/or venue that require tickets for entry thereof.

In another alternative embodiment of the present invention, the use of machine readable identifiers provides advantages for, for example, the upgrade program or ticket exchange of the present invention. For example, when the upgrade, re-allocation and/or electronic ticket is issued, the machine readable identifier, for example, the bar code, on the original ticket is invalidated, thereby preventing use of the invalidated ticket. Accordingly, when a new ticket holder purchases the ticket form the season ticket holder, the new purchaser will be issued a new machine readable identifier, and optionally a new paper ticket. The present invention advantageously is able to handle the issuance of a new ticket and invalidates the old ticket and optionally the old identifier that has, for example, been returned by the season ticket holder, thereby providing dynamic ticketing capability.

In an alternative embodiment of the present invention, the new patron obtains a new identifier such as a barcode, the old bar code of, for example, the season ticket holder is invalidated. In one embodiment of the invention, season ticket holders are offered to opt in the upgrade process. Various commercial incentives are possible for the season ticket holder to opt in the upgrade process, such as monetary compensation when their ticket is used for an upgrade and/or resold whether they express their intention not to go to the game prior to the game, and the like. Alternatively, season ticket holders may be offered that the cost of their season tickets will, for example, remain the same as the previous year or be reduced if they participate in the program. Therefore, the combination season ticket trade-in and upgrade program in one embodiment of the invention will be beneficial to season ticket holders by allowing them to trade when they already know that they have no intention of attending a game, and allow the season ticket holder to recoup some cost of the season tickets if they do not attend and their ticket is used as an upgrade. In addition, additional patrons of the event and/or sports team are permitted to attend the game in locations/seats that they might never have been able to obtain access to. Further, the venue/stadium/team maximize revenues by being able to place tickets on the secondary market when the ticket holder notifies the venue early enough that they are not attending the event, the venue also obtains additional revenue from upgrades when tickets are upgraded, and the venue obtains additional fan loyalty.

In another embodiment of the present invention, the system provides the ability to advertise via email, text messaging, and the like, for one wireless carrier on the wireless device that is using another wireless carrier. Since the user of the wireless device has requested the service, the user appropriately receives the communication from the ticketing system of the present invention, and therefore, also appropriately received the advertisement from the wireless carrier that is different than the wireless carrier that the user of the wireless may be using at that time.

In another alternative embodiment of the present invention, offers to purchase seats either during the game or even well in advance of the game are "pushed" or transmitted out to registered users that have supplied their wireless and/or Internet addresses. For example, patrons can register in advance for the upgrade and/or regular ticket offers to purchase admittance via various methods including the Internet. When seats band/or admittance becomes available, a broadcast message or other standard messages may be transmitted to the registered patrons to notify them of the seat availability. Thus, seat offers are "pushed" to registered users that have requested this service advantageously to a wireless device and/or other address including standard telephone communication, as well as additional optional advertisements. The system, in one alternative embodiment, provides the user the option when registering to accept certain types of advertisements to be received on their wireless device via email and/or text messaging. In other embodiments, the user does not have the option of which advertisements to receive.

Advantageously, in accordance with one alternative embodiment of the present invention, if a patron decides to attend an event such as a sporting event when the patron does not have time to wait to receive paper tickets (e.g., the patron is visiting in another city/location and does not have time to wait to receive tickets via mail and is on the go), the system of the present invention transmits a ticket to the patron via, for example, a wireless communication system and/or other standard electronic communication system such as the Internet, and the patron can present their ticket, for example, on their wireless device and show up to game.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Patrons then text message and/or email and/or answer questions via voice-to-text messaging their answers. The system can then display the overall number of answers that are correct and incorrect, display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another alternative embodiment of the present invention, the system uses a seat database to determine which of the reserved seats are currently in use. The system may integrate with the seat database system of a venue and/or stadium or optionally be used in parallel with the seat venue/stadium database. For example, prior to the event, the system may utilize the seat database of the venue to determine available seating and patrons that do not show up after a predetermined period of time. Alternatively, the present invention can operate using a separate database from the event/venue by copying or building a separate database used for the ticketing and/or upgrading according to the present invention. In this alternative, as patrons enter the venue, they are checked in directly to this separate database. At the time of the event, the system will be able to check-in patrons using either the identification system, e.g., bar code scanner, of the event or venue, or provide a separate identification system.

In alternative embodiments of the invention, the patron that knows they are attending the game but is going to be late can send in a HOLD message even prior to being provided a warning message that their seats are to be released if the patron does not respond to the message with the HOLD request. That is, in this embodiment, since the patron already knows well in advance that they are attending the game, but perhaps stuck in traffic, the patron can initiate the HOLD message before even being warned in advance of the possibility of their seat being released.

In another alternative embodiment, patrons that have registered with the system and optionally checked into the stadium and/or venue in advance and who also know that they would like an upgrade and/or ticket, may initiate their own upgrade request to the system to notify the system of their willingness to purchase an upgrade and/or new ticket for the event/venue. The system may then place these patrons on a higher priority since they have already expressed and intent and/or willingness to purchase the upgrade or ticket. The patron may notify the event and/or stadium of their willingness optionally well in advance of the game or near/after game time at a time which the patron commits or expresses an additional heightened desire to upgrade and/or purchase a ticket.

In alternative embodiments, the system includes the advantage of allowing patrons to register free for a predetermined period of time, for example, for the first year, without paying a yearly subscriber fee. Alternatively and/or in addition thereto, the system provides the patron with their first upgrade for free or for a reduced rate to further encourage the patron to register with the system and method of the present invention. Alternatively and/or in addition thereto, the system of the present invention offers the patron reduced and/or free concessions when purchasing a membership, ticket and/or upgrade to further encourage the patron to participate in the offers of the present invention.

In alternative embodiments of the present invention, the matching system and/or process, permits participants in the program to initiate a message to the system with the seat location and/or name of the patron that they would like to be matched with for a meeting, networking and/or socializing such as a date. In this embodiment, the system may the push the message to the other subscriber and assign new seats to the individuals that are to be matched. Alternatively, the system need not require a specific confirmation that the second individual to be notified of the potential match is physically located near the first individual, but can rely on the first individual to provide that information. For example, the first individual may see a potential date in a restaurant, and may then send a message to the system with that person's name or address, that they would like to meet that other individual. In that situation, the second individual will receive a message of the possible match, and can respond and accept or reject the offer to meet. The second individual can then provide a meeting destination or the system can suggest a meeting place based on the first individual advising the system of their location, and the location of the second individual.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Advantageously, the multiple choice questions each have unique selections, such as a1, b1, c1 and d1 for question #1; a2, b2, c2, and d2 for question #2; a3, b3, c3 and d3 for question #3, and the like. In this embodiment, the actual timing of questions is not necessary since each question and answer is unique. Therefore, the speed of responding to the question is immaterial to the winner of the contest and/or correct answer. Also, in the event one patron answers the question late, there will be no confusion which question the patron is submitting an answer for. Patrons text message and/or email and/or answer questions via voice-to-text messaging their answers as indicated above using the unique set of answers, in one embodiment. In alternative embodiments, the first predetermined number of patrons that answer the question correctly are considered the winners.

The system can then display the overall number of answers that are correct and incorrect, e.g., a1 50%, b1 28%, c1 12% and d1 10%, and display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another embodiment of the invention in connection with the seating upgrade and/or assignment system, an identifier and/or machine identifier such as a bar code, RFID, etc. optionally remains static for the user on the user's ticket and/or device that is provided for optional paperless ticketing. For example, the identifier will remain the same associated with the user, but the seat assignment, privileges, user characteristics, user preferences, and the like, may be dynamically changes. The system and method of the present invention will be updated so that the identifier can represent a dynamic seat assignment or other dynamic information, such as general admission to an associated event, or other event and/or venue, including, for example, a restaurant, bar, and the like.

In another embodiment of the present invention, the upgrades process and/or feature may be provided to users/patrons as a complimentary reward for fan loyalty, to reward the user but also market other goods/services and/or other advertising opportunities to be transmitted via the wireless device and/or mobile phone. In one embodiment of the invention, the system and/or method initially queries the user, for example, at the beginning of the trivia contest and/or tournament or at the beginning of the game, whether the user is present in the stadium or not. The system can then perform, for example, the trivia contest, and determine a winner(s) to award for example some form of reward. Furthermore, in another embodiment of the invention, based on the number of people responding that they are present at the game, the present invention advantageously provides a random upgrade to a predetermined number of patrons as an additional fan loyalty program and/or advertising sponsorship to one or more entities that sponsor the free upgrades.

In another embodiment of the invention, a system and/or method is provided that advantageously builds and/or acquires and/or collects mobile contact addresses of users in an efficient manner. For example, in accordance with the present invention, a user advantageously need only provide the communication network and telephone number, and the present invention builds a data address therefrom. This allows the mobile or wireless device user to still register for a service without specifically knowing their data address for, for example, data communication such as SMS messaging, text messaging, email, and the like. In one embodiment, the mobile user is provided a drop down menu where the user selects the communication network and provides their mobile phone number.

The present invention is particularly advantageous currently with the recent enactment by the Federal Communications Commission (FCC) number portability where mobile phone users are able to transfer their existing numbers to other networks. Accordingly, we have determined that a user's number will advantageously provide a mode of contact for the user even when the user decides to change communication networks. For example, in at least one embodiment, the present invention uses the cell phone number and IP address combination, e.g., 2029422785@verizon.net, or 3016814455@attwireless.com, and/or any other mobile telephone plus IP address combination that may be used to utilize the IP address of the cell phone. Alternatively and/or in addition, the SMS address may be used.

In one embodiment of the invention, the software processes and system determines and builds the actual messaging address (email, text, SMS, and the like) to send messages to the mobile device by the user only selecting and/or providing the communications network and the telephone number. Thus, the present invention advantageously simplifies the process for mobile or wireless device users to register and/or provide contact information, and therefore, beneficially increases the number of individuals that can effectively and easily register for a communication service.

In another embodiment, the present invention facilitates the ability for potential users to signup for the service of receiving, for example, trivia, upgrades and/or text messages via a user sign up device or apparatus. In one embodiment, the user sign up sheet includes numbers and/or circles that can be filled in like a grid, where the user can fill in or cover the numbers that identify their portable number. In addition, the user can check off the specific network carrier from a list of network carriers, or simply enter their specific network carrier. The user sign up sheet may be done electronically via a computer and user interface as described above, or may initially be filled out by a user via, for example, a piece of paper and then later entered into the computer system of the present invention.

In another embodiment of the invention, the system and method of the present invention is capable of re-locating a patron via the mobile address that was previously provided, even if the patron has changed wireless carriers. For example, in one embodiment, with the recent feature of mobile phone portability by the FCC, we have determined that a significant number of mobile phone users are likely never to change their number/address, and therefore, the system and method of the present invention is able to send text messages and/or email to all network addresses using the telephone number of the user if the system suspects that the previously provided network by the user is no longer being used. In this embodiment, the user can optionally respond to the message and/or network broadcast message, confirming that one of the messages has been received.

In another embodiment of the message, whenever a user wants to contact a mobile phone, mobile wireless device or even computer based, via for example, an Internet based account, wants to contact another mobile wireless device user, the present invention provides a transmission device, for example, via the Internet or individual models/mobile phones used for each of the networks to broadcast the message on all networks. Advantageously, in accordance with this embodiment, since the user is likely to maintain the same telephone number, their data or text messaging address will be their telephone number and one of the few network addresses. This type of broadcast message can happen anytime, and even for voice communication when the user of the wireless device needs to receive a data, text and/or voice message.

In another alternative embodiment of the invention, as described previously, the invention may be used by a patron to obtain specific data or information regarding sports or venue related information of interest. For example, patrons may communicate with the system and forward a player jersey number or number of racecar during an event such as a baseball game, football game, racing event such as Nascar, to obtain additional information including current statistics and past statistics. The present invention can then optionally sent statistics throughout the game or event to the patron without the patron requesting, for example, at specific time intervals or after notable achievements during the event, such as a home run, touch down, 7th inning stretch, half time, number of laps traveled, and the like.

Thus, the present invention includes many variations in the type of information a user may receive, whether specifically checked into a venue or registered for the service for a particular event. In addition, the present invention includes various processes and systems for ensuring delivery of messages to patrons that have requested the service or merely sending messages that a patron may be interested in receiving.

In another embodiment of the invention, the matching and/or networking system includes the ability to contact and/or notify the users to coordinate the meeting using any one of a plurality of communication methods including text messaging, email and/or instant messaging, with the additional advantage of transmitting pictures, video and/or other data that provides additional information regarding the other person that has been suggested for the match and/or network. In one implementation of this embodiment, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. For example, different message transmit and/or receive formats may be used depending on the system. The present invention beneficially parses the various different formats to obtain the necessary information for the communications described herein. In addition, the represent invention formats the messages for the different wireless devices so that the messages may be appropriately received even though different devices and/or communication networks have different messaging formats. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In accordance with another embodiment of the invention, the matching and/or networking system includes the option of permitting a subscriber to notify the system when they are ready for a potential meeting and/or match. Once the matching and/or networking system is notified of the subscriber requesting the match, the system is then capable of either tracking the user though a positioning system such as GPS, permitting the user to register at predetermined locations upon user initiation such as via Bluetooth, RFID, infrared, and the like. In accordance with this embodiment, the subscribers are not being constantly tracked, and therefore, maintain an additional level of privacy. In alternative embodiment, the present invention continuously tracks the subscribers without specifically requesting to be matched. In this alternative embodiment, the subscriber is provided with less privacy because they may be notified of a specific match even though they might not be interested in the match and/or meeting at that time.

In an alternative embodiment, the present invention provides subscribers with the ability to accept/reject the match before each of the subscribers receive personal information of the other and/or before the date/match has been arranged with at minimum a meeting location. In this embodiment, the invention requires that both users accept the match and/or date prior to notifying the subscribers of the contact information for each subscriber. Therefore, subscribers can optionally request additional information from the system of the present invention, even multiple times, to better understand the potential date and/or match before accepting, and importantly, before the other subscriber is provided contact information and/or a meeting location of the subscriber. In the embodiment where the present invention merely provides the meeting location, the present invention advantageously does not provide the subscribers contact information and/or other personal information before the match/date. Advantageously, in accordance with this embodiment of the invention, subscribers never receive personalized or personal contact information unless the subscribers, after meeting in person, agree to exchange such information.

In another embodiment of the invention, the dating and/or networking system provides subscribers the functionality to email, instant message and/or text message at least one additional piece of personal information and/or questions, optionally directly to each other or via the system anonymously, to obtain additional information that may be more relevant than the user profile or information from the user profile that was used to make the initial date/match.

In another embodiment of the dating and/or matching system of the present invention, the system optionally provides automatic and/or user initiated registration in a particular establishment and/or geographic location, which can be used instead of a location determination system such as GPS, or together with such system. This form of registration may be even more precise than GPS because it confirms a subscriber's presence within a specific store, establishment, entertainment establishment, restaurant, and the like. Thus, in these embodiments, the subscriber either initiates the registration as described above, or alternatively, if the subscriber optionally sets the wireless device to automatic registration based on the appearance at a predetermined registration area and/or location, the subscriber will be automatically registered to receive communications regarding a potential match/date.

In an alternative embodiment of the present invention, once the dating and/or matching system determines that a potential match/date has been detected, the system optionally notifies the different subscribers and asks whether they want to continue to participate in the matching/dating program. When both, some and/or all subscribers agree to participate, the present invention can forward to each subscriber automatically the information that each subscriber shares substantially in common and/or the information that was responsible for the match/date between the subscribers. In this embodiment of the invention, the subscribers will know immediately the information that should be most relevant in making the match/date and can determine whether to actually agree to either contact or send the other subscriber additional information and/or arrange to meet the subscriber at a pre-designated location.

In an alternative embodiment of the present invention, the present invention optionally includes the ability to recommend a potential meeting place for the subscribers to meet after determining that the subscribers have agreed to participate in the date/meeting. In this embodiment, the present invention advantageously determines the location based on, for example, subscriber preferences, geographic location that is preferential for at least one of the subscribers and/or both subscribers, predetermined location where, for example, a sponsor will receive patronage and/or provide a discount for the subscribers and/or actual pay the organizer of the dating/matching system an advertising fee to promote their sponsorship. Accordingly, the present invention advantageously determines not only a potential match/date, but advantageously suggests, recommends and/or determines a specific location and/or geographic location and/or restaurant, clothing store, zoo, museum, and/or other suitable location for the subscribers to meet and optionally based on geographic distance and/or location.

Additional dating and/or matching features and/or differentiators of the networking and/or dating system of the present invention include one or more fo the following:

Wireless messaging platform supports interactive messaging

Wireless messaging platform provides simultaneous parallel applications to run without collision Multiple wireless initiatives or topics run without conflict Different initiatives or topics may be user specific or selectable While each initiative runs independently, there can be overlap in terms of customer base Platform is flexible to add/remove initiatives quickly and efficiently One wireless carrier/network can be a dating/matching sponsor and advertise on the wireless device and/or network of another wireless carrier/network Contact members to notify of the match/date to allow members to either directly contact each other or send additional information via, for example, text messaging, email, instant messaging, such as pictures, video, and the like Contact members or wait for request from members to participate in match/date initiative; can then automatically track member via GPS instead of constantly tracking member all the time, thereby increasing privacy of member Contact each subscriber that is being offered the date/match and obtain approval for the match prior to actually notifying potential members that match has been made Contact users after initial match has been conditionally approved, and provides users the capability to request additional information, such as personal information from the other member or other members which the requestor still wants to know before finally accepting the date/match Members can register or "check-in" at predetermined locations and/or establishments which is one additional level of specificity, for example, with regard to the location where a member is that may be interested in matching; For example, two or more members may actually be in the same restaurant where they can be informed of one or more other subscribers being present; members can register via sending a message to the system via text message, email, RFID, Bluetooth, and the like, either by initiating a registration or automatically Contact members after initial match has been conditionally approved and exchange, optionally automatically, profile information that was significant in making the match/date and/or other important information regarding a match/date that a member may want to know before finally accepting the match/date and/or information the members may want to know that is geared particularly for a first date, e.g., likes/dislikes, common interests, favorite foods, wines, alcoholic beverages, and the like Contact members to suggest and/or recommend and/or arrange meeting place based on, for example, geographic location, common interests/sports, common food tastes, common beverage tastes, common entertainment preferences and/or sponsors willing to, or interested in, being utilized for the match/date for the suggestion and/or recommendation, and optionally providing the members a discount and/or compensating by the sponsor to the networking and/or dating system proprietor for the advertising and/or recommendation to visit that sponsor Wireless messaging platform includes a protocol conversion server functioning to interface with a variety of wireless networks having different messaging characteristics for both transmitting and receiving messages, and parsing the different message formats for the content from a received message, and transmitting a message to a plurality of different networks and/or devices having different messaging and/or interface capabilities and/or functionality Contact members with a wireless consent form indicating that the matching/dating system and/or the members participating in the match/date have generally consented to potential cohabitation optionally without any recourse to the other party. Alternatively, the members may be contacted with other types of informed consent forms with limited recourse for acts and/or aggressive acts that are clearly assaults, but not sexual related misconduct or sexual related crimes that are felonious in nature carrying a high penalty/sentence. Alternatively, members may be presented with consent forms that eliminate any criminal penalty, but do not foreclose the possibility of civil lawsuits for damages relating to torts, and the like As another alternative and/or in addition thereto, members may be presented with consent forms that eliminate any civil penalty, but do not foreclose the possibility of criminal lawsuits for criminal type activities, perhaps with the exception of the most severe sexual crimes such as rape and/or sexual assault that carry significant prison time.

For example, athletes, celebrities, high worth individuals, or even average individuals, male or female, may be interested in the wireless consent initiative because that allows them more flexibility to meet a variety of individuals without the worry of later being sued. In additional alternative embodiments, broadcast messages may be transmitted to numerous individual that may be interested in meeting and/or dating a celebrity or predetermined individual or individuals. In this embodiment, the optimum matching individual or individuals may be selected to meet with the celebrity, celebrities, and the like, while utilizing the informed consent feature of the present invention. In another alternative embodiment, an individual or individuals may be randomly selected as part of a match or date, based on a lottery or other competition to meet or date a specific individual or individuals.

Additional optional hardware and software requirements are as follows for one or more embodiments of the present invention:

System Capabilities

Platform supports interactive messaging

Platform provides simultaneous parallel applications to run without collision

Multiple wireless initiatives or topics run without conflict

Different initiatives or topics may be user specific or selectable

While each initiative runs independently, there can be overlap in terms of customer base Platform is flexible to add/remove initiatives quickly and efficiently Wireless Initiatives Interactive trivia with fans inside and outside of the stadium Targeted messaging, e.g., targeted advertising Broadcast messaging, e.g., general advertising Interactive messaging, e.g., with concessions Profiling for each initiative or topic, e.g., based on network operator Urgent and emergency messaging Specific initiative: discounts for concessions and/or memorabilia Specific initiative: invite patrons to different activities before, during or after game, e.g., player loyalty, family activities, etc.

Specific initiative: seating upgrade program

Specific initiative: messaging patrons in one section and separate messaging to patrons in another section Specific initiative: messaging parent of a missing child Special initiative: dating where patrons can keep their seats to return to them, or their seats are re-allocated. In alternative embodiments, the patrons switch seats instead of moving to empty seats, either for the entire game or only a portion thereof with other patrons for match making possibilities.

Functional Specifications

Front end for user signup and profiling-secure site—for example, modeled after www.mlb.com, include one or more of:

type of seats does the customer want for upgrade (decks and range of sections)

information for dating concession profile capability for additional profile information validate user by sending message to device upon sign up auto append of network information to phone number during signup login and password protected site frames on website or interface that can be easily configured to have look and feel, for example, of particular baseball team capability for space on screen for advertising opportunity that can easily be modified and relatively dynamic capability to handle lost passwords web page or interface where customers with season tickets can mark a calendar with the seats they want to keep and the ones they are interested in freeing up for early sale or upgrade.

The optional Front End of the present invention used for administration and setting up parameter for each application, optionally includes a secure site, with one or more of the following:

application email address and password minutes for all the configuration parameters and/or functionality number of threads for each application for upgrades, at least one of releasing customers old seat immediately, or it until the customer approves of the release, or holding the customer's seat for a predetermined portion or all of the game, for example, in the dating functionality)

set schedule for games section rating setup, and seat upgrade pricing revenue allocation model provide a number of retries if message send failure Concessions The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

Concession Wireless Initiative

Purchased via cell phone

Web registration for preferences

Targeted concession offers

Confirmation that purchase is ready

Delivered to seat or ready for expedited pickup

Customer convenience: system identifies closest concessions to customer

Customer convenience: system determines concessions with short wait

Each concession labeled with a number for customer identification and fulfillment Customers can request menu, or register for each game to receive menu around game time via mobile device GPS can be used effectively to inform customer of closest concession stand to pickup order, and/or customer can provide section number and/or seat location for system to identify most convenient concession stand Most convenient concession stand can be determined based on one or more, or combination of, predetermined criteria, such as, closest concession location, shortest wait in line, specific item being ordered, and the like.

Interactive messaging, e.g., with concessions

Specific initiative: discounts for concessions and/or memorabilia

The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., “b1” and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., “c1” but also indicate to the system that they want to order more, or include an additional order from their wireless device. In alternative embodiments, the user may be presented to hyperlinks or hyper-like like options to select from, or the user may be directed to a website via their wireless device to select/order concessions.

In one alternative embodiment, the following message exchanges may be used:

First Message

“In Game” Concessions

Menu will be sent soon!

Reply with #, item short form and seating section

Ex: BE=beer

Reply 3BE for 3 beers
408SEC for section 408

Powered by NEXTEL

Second Message (paper menu?)

Menu

BE=Beer; CO=Coke; DCO=Diet Coke

HD=Hot Dog; BUR=Burger

TA=Taco/Salsa; PO=Popcorn

FF=French Fries; CH=Chips

PZ=Pretzel; PT=Peanut

LEM=Lemon Ice

Third Message

Order received!

Summary:

3 HD @ $3=$9

2 CO @ $3=$6

2 LEM @ $3.50=$7

Total=$22

Reply Y to ACCEPT

Credit Card charged

N to CANCEL

Fourth Message

Thank you for ordering!

Your order has been confirmed!

Confirm # REIF1001

Powered by: THE SPORTS AUTHORITY!

Fifth Message

ORDER READY

Bring Confirm # REIF1001 to Concession #33 by sect # 212

$2 off NIKE baseball gloves

Bring #NIKE305 and game ticket to

Any SPORTS AUTHORITY!

In another embodiment of the invention used in concessions initiative, the concession attendant receives the confirmation number or other identifying information from the customer when picking up the concessions. The concessions attendant enters the confirmation number or other identifying information when ready or optionally clicks on the order on the computer screen via a concessions interface associated therewith. From there, the order is then cleared from the system with respect to orders that require fulfillment, advantageously allowing the workers to streamline their work activities in the concessions. In an alternative embodiment, the concessions are actually delivered to the customer using the sutomer provided seating information, either provided by the customer through, for example, the wireless device or other registration and/or notification process, or even via a telephone call or automated attendant to associate with the order.

In another embodiment of the invention, the concessions menu is advantageously only delivered to customers that have entered the stadium via a location determination system, and/or checked into the stadium via a ticket reader/scanner. In alternative embodiments, all customers that have registered for the concessions service will receive an introductory message. Thus, customers that are not attending the game need only reply with a request to terminate the concessions service for that event and/or game.

In an alternative embodiment, the customer is advantageously directed to closest concessions via, for example, GPS chip in phone or by knowing where the customer sits at check in, or by having the customer input their seat location or location where they would like to pickup the concessions.

In another embodiment of the invention, we have determined that s some mobile phones will utilize different transmit and receive addresses, and therefore, a user may not know how to appropriately register to be a subscriber for one or more wireless initiatives. For example, we have determined that some mobile phone networks utilize slightly different or different electronic addresses for the transmitting and receiving of electronic messages. For example, for the Research In Motion (RIM) Blackberry communication service, the mobile device is assigned a desktop email address. In one configuration of Blackberry, the mobile device only has one address. However, in the non-integrated configuration, the mobile device actually has a separate address when transmitting from the receive address.

In accordance with this embodiment of the invention, the user registers by providing their mobile phone number and optionally a network carrier for same. In this embodiment, the mobile phone user registers with their phone number and optionally wireless network provider. The registration system of the present invention then sends a message to the mobile device, requesting that the mobile device respond, optionally with a predetermined code and/or predetermined message. The mobile device then responds to the registration system, and the registration system corresponds the mobile device response with the original registered mobile address, thereby completing the registration process by ensuring that responses received from the mobile device can be mapped appropriately to the mobile subscriber. In the embodiment where the mobile user is requested to provide a predetermined code and/or message, the registration system uses the predetermined code to map the mobile phone response potentially having a different address with the transmit address provided by the user.

Dating, Matchmaking and/or Networking

In another embodiment of the invention, patrons are provided the opportunity to meet others in the venue or at a predesignated location near or away from the venue using standard matching rules. In one embodiment, the presence of the user is detected when entering the stadium, for example, via the ticket entrance systems. In another embodiment, the presence of the patron is detected or determined based on a message that is send to the user, for example, either right before, during or after the game. In this embodiment, the user can be prompted with a request whether they would like to participate in the matchmaking, dating and/or networking program.

For example, potential business or social partners may be selected or prompted for networking or dating. When the user responds yes, in this embodiment, their current seat is irrelevant if that seat is not to be released for another patron. Therefore, the system need only select a new set of seats for the networking and/or dating for the patrons, transmit the patrons the additional new seats via, for example, a wireless ticket, update the venue seating database for subsequent verification by the ushers when seating the patrons. The patrons may then proceed to the new location and have a meeting or date, and then return to their original seats if desired.

In another embodiment, a "burnt bridge" approach or feature is provided where the original seats for the patrons that are meeting are then released for other upgrade and/or networking programs. In this embodiment, the original seat of the patron must be known for example, via check-in procedure, registration for the program in advance for example over the web registration process or other registration process, or via the patron responding to the system with their wireless device of their current seat location. Alternate combinations or modifications of the above embodiments is also used.

Trivia

In the alternative embodiment of providing the user trivia information, based on registration and/or location, for example, while attending the game, watching the game at home, or any time prior to or after the game, the user may be provided with questions, as described above, to answer as part of a tournament and/or to be eligible for prizes, awards, and the like. In one embodiment, a section or portion of the users are targeted for the questions together, while other sections and/or portions of the users are targeted at a time period thereafter, for example, 1 minute later, to stagger the communication and transmission of data, thereby reducing congestion and/or unnecessary hardware to accomplish the transmission and acceptance of information to/from the patron.

In one embodiment, while all the questions are staggered over a predetermined period of time to the patrons, whether limited to patrons in the stadium, out of the stadium and/or both, the patrons are not notified whether their answer is correct until after all questions have been transmitted, and all patrons are provided the opportunity and/or sufficient time to respond. Once that predetermined time period has elapsed, the patrons will be notified whether their answer was correct, and whether they are still in the tournament. In optional embodiments, a predetermined time period will again elapse until new questions are sent and the tournament continues.

Optional Oracle or My SQL Database

In one embodiment of the invention, an Oracle or My SQL Database is used in connection with the present invention. In one embodiment, the result set is set to be proportionally with respect to the number of users and/or data that will be stored in the system. In another embodiment, the database is optionally partitioned for specific games and/or initiatives or groups of games and/or initiatives. The system is preferably thread safe when running the games and/or initiatives. The system is optionally integrated with Credit Card for payment, and/or integrated with the venue ticket system and/or point of sale system to optionally determine who came in and when into the venue. In another embodiment, the present invention maintains and updates financial balances for users, such as patrons and stadiums. In alternative embodiments, secure interaction with ushers and an interactive kiosk is provided.

The present invention optionally provides any standard algorithm for partitioning of group of seats and users, for example, for system resource allocation, load balancing and/or division of system functionality. In alternative embodiments, a local kiosk for the stadium and/or venue is provided where the user can enter information, such as register for one or more initiatives and/or programs. In alternative embodiments, the system of the present invention includes the capability of offering for sale seats which are not currently sold via messaging to wireless devices, such as text messaging to mobile phones, or other messaging and/or wireless communication to wireless devices, and consideration. In alternative embodiments of the invention, standard algorithms such as used in the airline industry may be used to overbook seats for the venue, and consideration.

In alternative embodiment of the invention, instant messaging or any type of communication method can be used in the present invention, include local and/or global networks, such as the Internet, LANs, WANs, WAP, 811.02a, 802.11b, 802.11g networks, and the like.

Messaging Software Requirements

Trivia and/or other messaging products/initiatives are Java applications that run in a J2EE application server and utilize a JDBC 2.0 compliant relational database. There are typically open source options available for system support. Currently for development and test environments we utilize are desktop environments running Windows 2000 with the open source options below. The draw back is that open source options typically don't provide formal system support approaches, although we have found the software to be very reliable and would recommend this approach for early stage pilots. Should the customer prefer purchase software options for these components are provided as well.

I. Server Software Specifications

Alternative A—Open Source Approach (1) Web/Application Server—Tomcat 4.1.18

(2) Database—MySQL 4.0

(3) Windows 2000 Server for each server

Alternative B—Purchased Product Approach (1) Application Server—Websphere Application Server 5.0

(2) Database—Oracle 9i DBMS (3) Windows 2000 Server for each server

II. Server Hardware Specifications (4) Each of the HW Servers specification:
(i) 2xCPU—P4 2.4 GHz Xeon
(ii) 2 GB RAM
(iii) Monitor
(iv) CD ROM
(v) Floppy Drive
(vi) Hard Drive depending on volume (see below)

III. Communication Specifications (5) POP3 Account and SMTP server accounts that can support number of active subscribers (6) Dedicated T1 access to POP3 and SMTP provider IV. Hardware and Software Sizing Configurations Phase 1:

1K-10K subscribers and players during the game

Two Servers

Server 1—runs Web/Application Server for the website and the Trivia Application

Server 2—runs the Database server (20 Gig)

Phase 2:

10K-25K subscribers and players during the game

Server 1—runs Application Server for the Website front end

Servers 2 and 3 (2 Servers)—run the Application Server for Trivia Application (two servers are used handle load balancing)

Server 4—runs the Database server (50 gig) (Level 1 RAID 2×50G Array)

(Server 5—used as a backup to server 4—depending upon Reliability requirements)

Phase 3:

25K-50K subscribers and players during the game

Server 1—runs Application Server to run the Website front end

Servers 2, 3, 4 and 5—run the Application Server for Trivia Application (four servers are used to handle load balancing with hardware and software clustering)

Server 6—Database Server—150 gig (Level 0+1 RAID 6*50G Array)

(Server 7—used as a backup to server 6—depending upon reliability requirements).

In one alternative embodiment, as part of the sign up for trivia the system optionally asks the general admission or season ticket holders to input their seats to simplify how the system obtains information where the patron is being seated when they come to the game. In an alternative embodiment, the system obtains this information from the stadium database system, kiosk where the patron can enter the information at the stadium and/or via the point of sales system by the service personnel or attendant that is selling the tickets. Using any of the above methods, once the system knows where the patron is/are seating when present at the game, the system can then target sections of the stadium for, for example, the trivia quiz or other service/offering to the patrons.

Examples of different sections that can be separately targeted include for baseball, behind first base line first, behind home plate second, first base line third—all lower deck; same sections for upper deck and bleachers. Other sports may include football, hockey, soccer, basketball, and the like. In accordance with this embodiment, targeting different sections over different periods of time, thereby preventing a long delay to receive answers once the question is transmitted, may minimize collusion among patrons.

Thus, by segmenting the stadium over a few minutes in accordance with one embodiment of the invention, the present invention may increase the window of transmission to, for example, 2 minutes or more for the first round. As the rounds get successively smaller, the present invention will transmit messages faster. The present invention also provides optional winners for different sections of the field. In addition, the section winners can further optionally compete against each other, for example, the first class seating winner can further compete against the bleachers winner, and the like.

As discussed above, one or more of the above alternative embodiments may be incorporated into the embodiments described above, and/or any of the embodiments discussed below. Furthermore, any of the embodiments of the present invention may be used for any reserved seating or other event.

Figure 35:
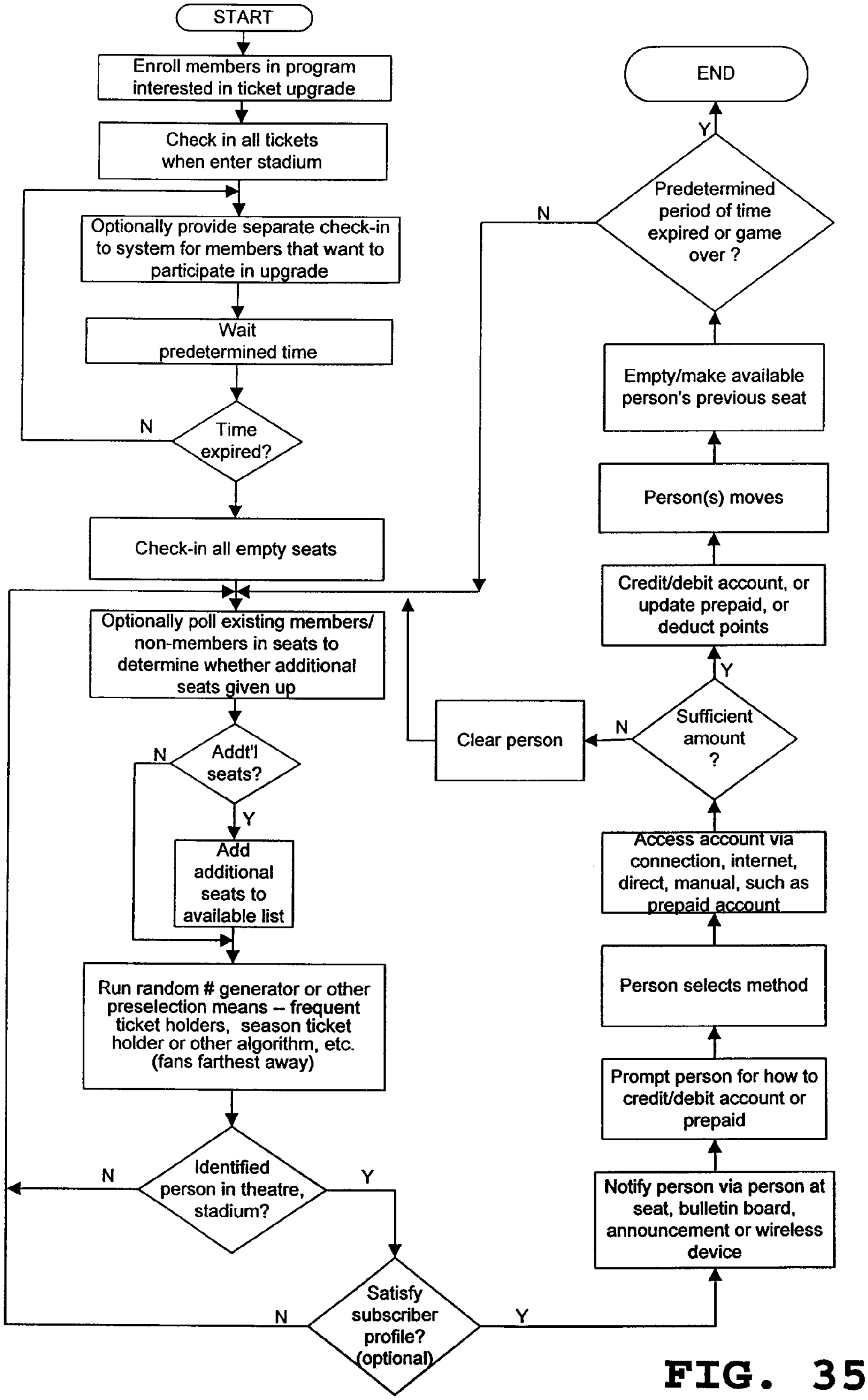

FIG. 35 is a flowchart of a thirteenth embodiment of the invention. In FIG. 35, the process begins by enrolling members in the program that are interested in the ticket upgrade. Tickets are checked in, for example, as the patrons enter the reserved seating area, such as a stadium or theater, through, for example, bar code readers, scanners, infrared readers, and/or manually or other method where the patron is checked in, either at the gate, seat or other location. An optional separate check in area is provided for patrons that want to participate in the upgrade program. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The seat re-allocation process is used to re-assign seats for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, a standard bidding process, or other predetermined process. Simultaneously or subsequently, the check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process.

An optional polling process to poll existing members and non-members in seats to whether additional seats are available. That is, in another optional embodiment of the present invention, non-members may also make their seats available for re-allocation/re-sale at any point in the process. In this additional polling process, the next step is to determine whether additional seats have been made available. If additional seats have been made available, then these additional seats are added to the list of available seats.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or more means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

The patron is prompted for the method of obtaining the tickets, such as a payment method, such as credit card, debit card, cash, point redemption, or optionally a gift/prize. The patron subsequently selects a payment method. The patron's account is debited at a future time, or optionally immediately via connection to a standard clearinghouse network, such as visa network, master card network or other network via direct connection or via the Internet, and the like. If sufficient funds do not exist, then the person is cleared or rejected from the opportunity for the seat re-allocation/upgrade process. If sufficient funds do exist; then the patron's account is debited or points deducted. Alternatively, one person may purchase the upgrade on behalf of another person.

The patron then moves to the new seat, and the system then clears the patron's old seat from the system to optionally provide re-allocation of the previous seat. As indicated previously, if the patron accepts, payment of money or other means may be effectuated on the spot via the wireless device, credit card, debit card, points, and the like, and the patron may now move to the other seat. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

Figure 36:
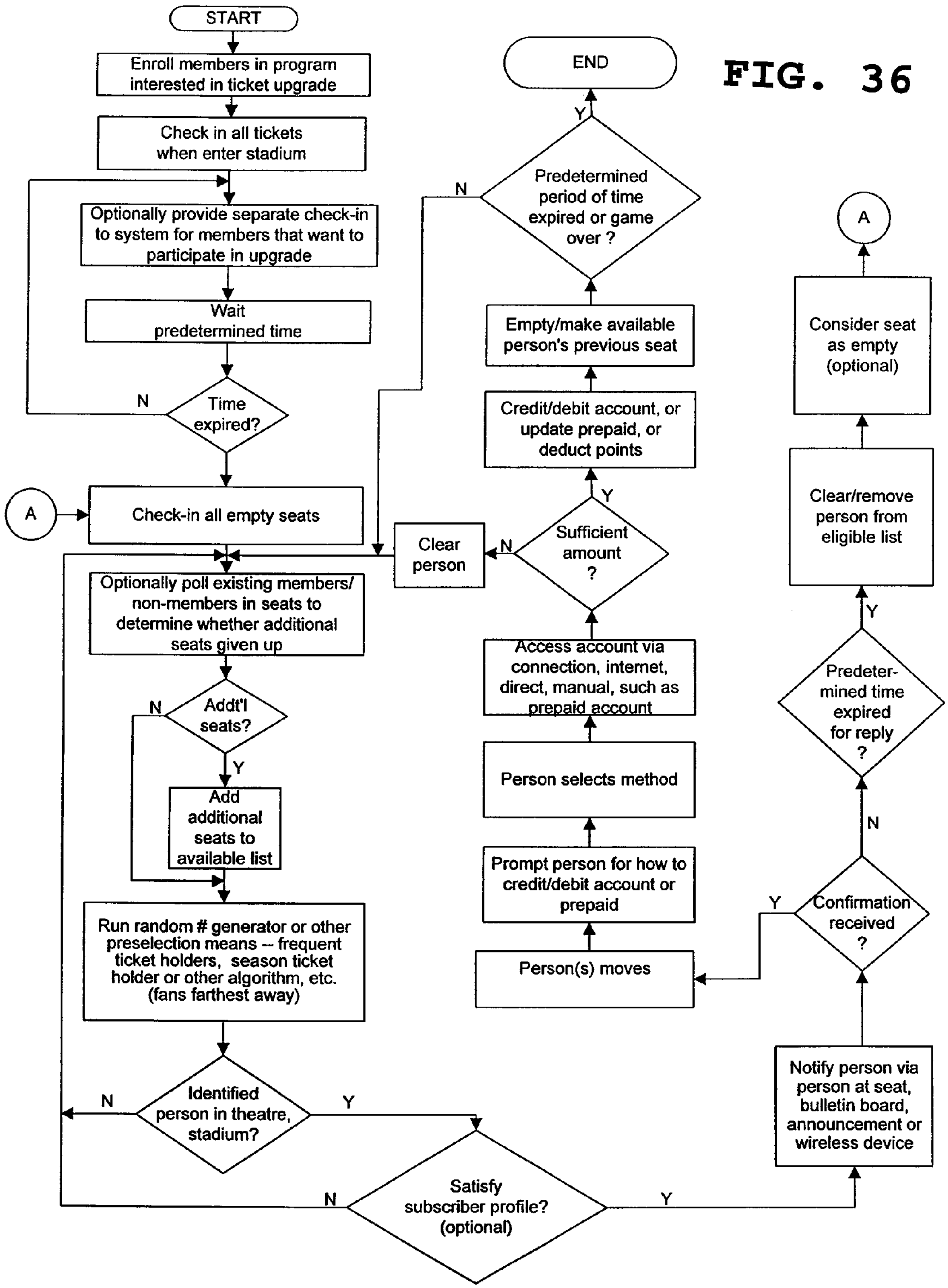

FIG. 36 is a flowchart of a fourteenth embodiment of the invention. In FIG. 36, the process begins by enrolling members in the program that are interested in the ticket upgrade. Tickets are checked in, for example, as the patrons enter the reserved seating area, such as a stadium or theater, through, for example, bar code readers, scanners, infrared readers, and/or manually or other method where the patron is checked in, either at the gate, seat or other location. An optional separate check in area is provided for patrons that want to participate in the upgrade program. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seats for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, a standard bidding process, or other predetermined process.

An optional polling process to poll existing members and non-members in seats to whether additional seats are available. That is, in another optional embodiment of the present invention, non-members may also make their seats available for re-allocation/re-sale at any point in the process. In this additional polling process, the next step is to determine whether additional seats have been made available. If additional seats have been made available, then these additional seats are added to the list of available seats.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or more means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

The patron is prompted for the method of obtaining the tickets, such as a payment method, such as credit card, debit card, cash, point redemption, or optionally a gift/prize. The patron subsequently selects a payment method. The patron's account is debited at a future time, or optionally immediately via connection to a standard clearinghouse network, such as visa network, master card network or other network via direct connection or via the Internet, and the like. If sufficient funds do not exist, then the person is cleared or rejected from the opportunity for the seat re-allocation/upgrade process. If sufficient funds do exist, then the patron's account is debited or points deducted. Alternatively, one person may purchase the upgrade on behalf of another person.

The patron then moves to the new seat, and the system then clears the patron's old seat from the system to optionally provide re-allocation of the previous seat.

If no confirmation is received from the patron for a predetermined period of time, the re-allocation process continues to wait until the predetermined period of time has expired. Once the predetermined period of time has expired and there is no response received from the patron provided with the option of changing their seat, the patron is cleared or removed from the eligible list, and the seat is considered or assigned empty status for the re-allocation algorithm to be again implemented.

As indicated previously, if the patron accepts and a confirmation is received, payment of money or other means may be effectuated on the spot via the wireless device, credit card, debit card, points, and the like, and the patron may now move to the other seat. The patron's seat may then optionally be made available as an empty seat to the re-allocation process. If a predetermined period of time has not expired, then the re-allocation process may be run again to optionally continuously re-allocate seats. The patron may optionally store the up-graded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

Of course, the re-allocation algorithm does not have to be run or implemented one patron at a time, but may be run to re-allocate or re-assign a plurality of patrons. If one patron or higher priority patron does not accept, then the next already generated patron may be queried to determine whether the next patron desires the seat re-allocation. Further, the system optionally downloads instructions on how to get to the new location, and can provide step-by-step instructions using an optional standard global positioning system (GPS) incorporated in, or as a separate accessory to, the wireless device.

In accordance with the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that may be in the vicinity of the stadium but were unable to get seats. Since the present invention re-allocates and/or sells tickets very near to game time in accordance with one embodiment, the patron must be in the general vicinity of the stadium to take advantage of this embodiment of the invention.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron to help the patron decide the quality of the upgrade and whether to accept.

In one alternative embodiment, if the patron that has their ticket re-allocated in error, e.g., because the patron did not show up to the event based on the predetermined criteria but the patron was still planning on attending because they forgot about their seat being re-allocated, the system can re-allocate seats immediately upon the checking in of the patron and notify them that their seats have changed because they are late. In this situation, the stadium/venue might decide to further upgrade the patrons because of the mistake.

In accordance with one embodiment of the present invention, the process of the present invention specifically reserves seats of the highest or very high rating that are considered preferred, in the event a patron's seat is re-allocated prematurely or erroneously. In this situation, the patron who has had their seat re-allocated because they will likely receive an even better seat as a result of the mistaken (stadium or patron) or premature seat re-allocation.

In another embodiment of the present invention, as patrons are entering the venue or stadium, they are provided advantageously with a map of the stadium so patrons can analyze the potential upgrade to make a decision whether the upgraded seats are sufficiently good or of value to warrant the patron moving and/or paying for the additional upgrade. By handing the patron the map of the stadium, the process of the present invention is not required to transmit a detailed schematic to the patron's wireless device which would not normally be able to effectively permit the patron to evaluate the proposed upgrade seats. The map that is handed out may optionally include information for patrons on where to register for the upgrade and/or additional advertisement opportunities.

In one alternative embodiment, the patron that has purchased the ticket, for example, a season ticket holder, may advise the stadium that for a particular game, set of games or all games, they do not want their seats to be re-allocated, and perhaps, an additional fee is assessed for this type of patron. If the stadium provides the ability for the patron to selectively opt out of the seat re-allocation, the patron can, for example, connect to the system via the Internet, public switched telephone network, cellular network, and the like, and notify the system that they do not want their ticket re-allocated, for example, because they are coming late to the event. Other means of notifying the system and/or other reasons may be utilized in connection with the present invention.

In another alternative embodiment, the system provides patrons the ability to individually select when their tickets may be re-allocated. For example, one patron may prefer to only give up their ticket if they are late to the game by 15 minutes, while another patron may be willing to give up their ticket if they have not arrived 15 minutes before the game. In alternative embodiments, the stadium may provide incentives for the patron to have their ticket re-allocated prior to the game because it increases the stadiums chances of re-allocating/re-selling the ticket.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provide additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket.

Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In an alternative embodiment, the system determines priority of re-allocation of seats based first upon patrons that have seats that may also be re-allocated. That is, the systems attempts to maximize the number of re-allocations by prioritizing the re-allocation based upon seats that may be re-allocated after already being re-allocated. For example, if front row seats in a stadium are available to be re-allocated, in this alternative embodiment, patrons that are in the next closest section for example on the field level would be upgraded first to those seats. Then, patrons with less preferred seats, for example, in the upper deck would be re-allocated to the seats that have now become available from the patrons that have been upgraded to the front row. Thus, using this alternative priority scheme, the present invention maximizes the re-allocation numbers. Of course, this priority algorithm may be combined with additional factors, for example, relating to subscriber/patron value. As described above, additional factors may be utilized in the algorithm to determine the subscriber or set of subscribers to offer the upgrade.

In alternative embodiments, patrons in the vicinity of the upgraded and re-allocated patrons may optionally rate the upgraded patron, for example, for appropriate behavior, wearing of excessively large hats, drunkenness behavior, and the like. These ratings may then be taken into account in the re-allocation algorithm for future upgrades to the patron.

In alternative embodiments, the patrons eligible for the upgrade may be notified using standard email communications over a wireless device, mobile telephone, and/or other standard communication means. For example, standard text-to-voice and/or voice-to-text communications may be used to contact the patron to evaluate whether an upgrade will be accepted and to actually accept the upgrade.

In another embodiment of the invention, as indicated above, when the patron registers for ticket re-allocation and/or purchase, via for example the Internet, the patron may enter payment information at that time. Accordingly, when the patron accepts the ticket re-allocation and/or purchase, the system can automatically charge the patron without the patron actually submitting/typing, for example, credit card information over a wireless device. The tickets of the present invention may be used to re-allocate patrons that are sitting in the stadium and/or patrons that have already purchased tickets in the vicinity of the stadium but were unable to get seats and/or may be in the vicinity of the stadium but were unable to get seats. Since the present invention re-allocates and/or sells tickets at any time prior to and/or after beginning of game time in accordance with one embodiment, the patron may be in the general vicinity of the stadium to take advantage of this embodiment of the invention or even at any location when being offered upgrades and/or seats well in advance of the game. For example, the present invention can upgrade or sell tickets to patrons well in advance of the game since it advantageously is permitted or has the authority to resell tickets either via ticket holders that do not show up during the game and/or, for example, season ticket holders that have authorized the stadium in advance to resell their tickets based on predetermined criteria, for example, when the season ticket holder notifies the stadium that they will not be present at next weeks game.

In one optional embodiment of the invention, the patron presents the usher with the confirmation number which the usher can enter into a wireless device using a local or private wireless network, or can simply use a walkie talkie or telephone to call the dispatcher to confirm the upgrade and/or new seats using the customer provided confirmation number. The dispatcher will have access to the system to enter the confirmation number to confirm the validity of the upgrade. Alternatively, a patron will retain their old ticket. The patron will give in the old ticket to the usher which is scanned or barcoded by the usher for immediate identification of new seats and used in place of, or in addition to, confirmation number.

Of course, the confirmation may optionally be made via customer name with an appropriate identification card or other information. Further, alternative methods may be used to verify that the confirmation number and/or ticket being used by the patron is valid. For example, the patron may be equipped with a printing device associated with the wireless device or download an actual ticket on line from home prior to the game for the new ticket or upgrade. Alternatively, the patron may be equipped with an identifier card, optionally including a bar code with a unique identifier relating to the patron's account information and profile that can be scanned for additional convenience. Alternatively, a wireless device may be used to securely store this type of identification and/or account information.

In at least one alternative embodiment of the invention, the patron may comprise optionally a corporate account that has a number of tickets, for example, season tickets. In this embodiment, the corporate account may have associated therewith a plurality of email addresses or other communication addresses to transmit the seat or upgrade offer to a number of potential patrons that may rotate their attendance at the games. In accordance with this optional embodiment, multiple emails can be stored for a single user/corporate account, and the system may transmit individual messages to all email addresses, or may only transmit messages to individual patrons for corporate account that individually advise the system that they are associated with a particular ticket/bar code for a particular game and will be/are present at a particular game.

In an alternative embodiment, patrons may enter the stadium and subsequently inform the system that they are present and interested in an upgrade via a kiosk where the patron can scan a bar code and enter their customer number to be eligible for upgrades during the game. The system is then able to transmit a message to the customer, assuming that the customer has pre-registered with the system with the appropriate contact information. Alternatively, or in addition to individual use of a kiosk(s), the customer sales office may have a kiosk or additional functionality to enter the customer name and/or customer account and scan in the bar coded ticket on the spot to register each patron as they enter the stadium or venue.

As described above, the patron may be transmitted, for example, emailed, the actual ticket or a confirmation number that they can use proceed to their seat and/or re-allocated seat. An optional graphical display via, for example, GPS, as discussed above may be used to guide the patron to the new location upon acceptance, as well as to help the patron decide whether to purchase the ticket and/or upgrade. For example, a graphical map of the stadium and/or textual description may be provided to the patron upon entry in the stadium to help the patron decide the quality of the upgrade and whether to accept when an offer is received by the patron at a predetermined time. The graphical map may comprise a small booklet with a map of the stadium showing seat locations, and optionally a game schedule.

The present invention has particular benefits for stadiums that are constantly sold out, but where patrons habitually do not show up. For example, many stadiums are sold out by season ticket holders that do not show up to the game on a regular basis. The present invention permits these tickets to be re-allocated in accordance with, for example, predetermined algorithms, and provides additional patrons a better experience. In addition, the present invention has the benefit of moving the patrons closer to the action/players, and therefore, the ability to support and/or motivate the players to play well. In additional alternative embodiments, the stadium may provide the original ticket holder a portion of the proceeds as a result of the ticket re-allocation, thereby providing additional incentive to the ticket holder to permit their ticket to be re-allocated (when this is a voluntary program in the stadium). The stadium may then keep a percentage, portion or service fee from the resale and/or re-allocation of the ticket. Of course, the above embodiment may further apply to yet another embodiment where the stadium does not offer the upgrade to patrons sitting in the stadium, but to patrons that, for example, may be in the geographic vicinity of the game but that may not currently have any tickets or that may be willing to purchase the tickets when availability is determined and to travel to the event.

In alternative embodiments, patrons in the vicinity of the upgraded and re-allocated patrons may optionally be eligible for a dating or matching service where patrons register and provide profile information to the system and/or through a third service provider dating service. Once the system knows that the patrons will be coming to the game and/or have actually checked in to the stadium, the system can then arrange for the two, four, etc. patrons to meet each other by allocating and/or re-allocating seats to the patrons together. Thus, based on profile information, customer request and availability, the system is able to upgrade or sell tickets to patrons to maximize their chances of meeting someone at the game. This optional feature provides significant potential enjoyment for the patrons participating in this dating or connection program. In accordance with this embodiment, one possible sequence of acceptance steps involves profile matching the two patrons (or groups of patrons) based on predetermined profile information; transmitting a first message to the first patron regarding availability of the second patron and requesting a conditional acceptance form the first patron; transmitting a second message to the second patron indicating that the first patron has conditionally accepted and request the second patron to accept; and when the second patron accepts before the first patron has rescinded the conditional acceptance, finalizing the upgrade and/or seat allocation for the first and second patrons. This embodiment of the invention is a complete reverse from typical dating and/or matchmaking services which attempt to develop detailed algorithms for the matching process because of the significant decision that exists in determining who to spend valuable time with. In accordance with the invention, patrons are already present at the game, and therefore, half or more than half the effort is already done. The remainder is to actually meet the other person which can be accomplished with profile criteria, whether or not the algorithms are very sophisticated.

In one embodiment, the patrons that are being matched have their original seats maintained and not made available for other upgrades in the event the matching does not work out early on. In this embodiment, one or both the patrons can return to their original seat. Hopefully, there will not be a significant argument of who would need to return to their original seat if an upgrade is actually performed. In addition, in accordance with this embodiment, the seats that are selected do not necessarily have to be better seats in the classical sense. That is, seats further away from other ticket holders might be considered preferred when matching two individuals for the first time. Alternatively, couple that would prefer a little more privacy or quieter game might request to be moved to a more isolated area. Alternatively, families with small children might prefer to be moved to a less busy area as well during the game where the children might be able to freely move around. All these scenarios and/or alternatives are possible in view of the present invention. The advantage of performing a match in a public setting is that the patrons do not have to worry about leaving or ending the date, and also do not have to worry that the other person will have their home address.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like.

In addition, this feature also optionally permits the patrons that have participated in the program to rate one another for future dates. For example, one patron can rate the conversational benefits of the second patron, the appearance of the second patron, the overall short term versus long terms relationship goals of the patron, and the like. These ratings may then be taken into account in the algorithm for future seat assignments, re-allocations and/or upgrades in the future for the first and second patrons, and all other patrons will now benefit with the additional profile information of the first and second patrons. The matching service may be for amusement or work related networking purposes, for example, to meet an executive that the patron currently works with or wishes to work with/sell in the future.

In an alternative embodiment of the dating/matching service of the present invention, a dating/matching service is provided to patrons that enter a predetermined location and/or geographic area. The patron can enter physically the location and/or geographic and register, for example, by manually entering data in a computer, transmitting information relating to the registration of the patron via infrared, Bluetooth and/or other technology, and/or automatically register via use of GPS information associated with or used in a wireless device associated with the patron. For example, patrons that enter an establishment can register upon entry that they are now present within the general location of the establishment. Upon registry, the system can implement various matching algorithms currently in use by various matching services in connection with other patrons that have also registered at the same location and/or a location in the general area that the original patron registered. According to this embodiment, the system advantageously matches individuals that have registered in the same geographic location and/or geographic locations that are in the same general area where the patrons can walk and/or drive to meet each other in the same general time frame, such as the same evening, same afternoon same day, and the like. In addition, the system advantageously and optionally provides the feature of allowing patrons to text message one another directly, and/or exchange pictures via wireless email, text messaging, and other wireless devices that provide the standard capability of exchanging pictures, such a T Mobile and/or Sprint.

In alternative embodiments, the ticket holder can call in via a voice to text message, text message and/or email and let the stadium know early that they are not coming. In this manner the ticket holder obtains the convenience of the stadium or venue reselling their tickets in advance, thereby providing the venue with additional time to maximize the resale of the ticket.

In alternative embodiments, when the patron enters the stadium, they have their ticket barcoded or other device that detects their presence can be used such as infrared, Bluetooth, etc., and then they can become eligible for an upgrade. The patron can register in advance that they want to receive upgrades by providing their name, message address, e.g., email, telephone text message address, etc., and optionally their credit card or other payment mechanism for upgrades that actually cost money as opposed to free upgrades. In alternative embodiments, the patron can register at the ticket booth when purchasing their original ticket. In this scenario, the stadium representative can enter this information on behalf of, and with the permission of, the patron since the patron may already be providing their credit card, debit card, etc. to purchase the original tickets. Alternatively or in addition, a kiosk may be provided where the patron can enter their original ticket, e.g., scan in their original ticket and provide their name and text message information in the stadium to register for a one time upgrade for the game after purchasing, for example, a regular admission ticket.

In alternative embodiments, an usher can verify that the patron should be upgraded by the patron providing the confirmation number that may be transmitted in real-time by the system, and/or by the patron using their original confirmation number or original ticket with barcode or other identification means, such as a smart card, infrared reader, etc. that represents original ticket and presenting same to the user. The usher then needs only to scan in the original ticket and the system will verify whether the patron associated with the original ticket is valid and whether the upgrade is valid.

In alternative embodiments, a warning message may be sent to the ticket holder that has not shown up to game warning them that if they do not respond within a certain time period that their seat will be re-allocated or re-assigned to another patron. Similarly, a release message may be sent to the ticket holder after their seat has actually been released and/or re-allocated, thereby notifying the patron that if they change their mind in attending the game, they will have to obtain an additional ticket. In alternative embodiments, the ticket holder that has their seat released and re-allocated can be themselves re-allocated a similar, worse or better seat, depending on, for example, their subscriber value and/or other criteria. For example, if the patron is provided a better seat, this will encourage them to more readily give up their seats in the future even if they are attending the game. On the other hand, if the patron is provided a worse seat, then this encourages them not to artificially give up or have their seat released when attending the game. Accordingly, the present invention is designed to deal with various behavioral patterns of specific ticket holders, and may optionally and advantageously be a ticket holder specific with respect to various criteria for re-assigning, releasing, selling and/or re-allocating tickets.

In alternative embodiments, the system transmits to the ticket holder a welcome message after being upgraded and after having being moved to a new upgraded seat location. In one embodiment, the system identifies that the patron has been successfully upgraded after the patron provides the usher with a confirmation number or original ticket, which is then verified by the usher and system.

In alternative embodiments, the system, after having identified which patrons have checked into the stadium and/or have been upgraded, transmits a trivia question and/or additional advertisements to all patrons attending the game. In alternative embodiments, the information is transmitted to both patrons that are attending the game and additional patrons that have registered in the past to receive information but that are not attending the game. The participants can, for example, answer trivia questions and respond with their wireless device. Depending on whether the patron is attending the game or not, the system may determine to offer or deal with each of the patrons differently. For example, for patrons at the game, winners may be successively determined and narrowed, as patrons successfully and unsuccessfully answer questions, round after round of questions in a "spelling bee" format. For patrons that are not attending the game, winners may be declared, or statistics provided to the broadcast station that can be aired on television. In yet additional alternative embodiments, instead of transmitting information/questions to the patrons via the wireless device, the information/questions are displayed on the stadium billboard for patrons at the game and/or on television for patrons that are watching the game on television. The patron can then merely respond via the device, e.g., the telephone accordingly via a voice-to-text system or via other mobile devices via text messaging.

In alternative embodiments, the present invention provides the advantage of additional advertising sponsorship to the venue. For example, in one embodiment, the venue is partitioned into different locations that may be assigned to different sponsors. In one embodiment, the sponsor that provides the most value may be assigned a certain number of premium seats that are not available to other sponsors.

For example, the sponsor may offer a discount on the upgrade if you are a Verizon or Verizon Wireless customer or they credit your cell account for each seat upgrade or you get say 30 free minutes, etc. In alternative embodiments, the present invention provides the advantage of one wireless provider to advertise on another wireless providers mobile phone or wireless device. For example, if Verizon Wireless is a sponsor of the upgrade system for a particular stadium, the present invention will still work with, for example, AT&T, SPRINT, and CINGULAR customers. An advertisement message sent with the upgrade offer may read on the AT&T phone, "brought to you by Verizon Wireless." In an alternative embodiment of the present invention, text messaging is optionally used for mobile phones to perform the message communication of the present invention. The user is only required, in one embodiment, to reply or respond with a "Yes" to accept the upgrade offer since the user has advantageously pre-registered with the system, thereby minimizing the required communication/input by the user. In an alternative embodiment, the user, instead of pre-registering with the system, is charged on their wireless or even regular telephone number bill when they accept the upgrade offer. Thus, the wireless system that either administers the user's regular or wireless account or the upgrade sponsor may be responsible for actually billing the customer in this alternative embodiment.

In the alternative embodiment when text messaging is optionally used alone or in combination with other communication methods, the system provides the additional advantage of maximizing bandwidth usage by not requiring use of bandwidth on the wireless voice system, thereby maximizing system resources.

In another alternative embodiment, the present invention optionally and advantageously provides a security and/or safety feature in the event of, for example, a minor event where a parent gets separated from a child, a disaster or other event that might require evacuation of the stadium. In one embodiment, the person needing help provides their name to an attendant that can search the system for the contact information of their companion/parent. The system can thereafter send an email and/or text message to the companion/parent regarding the status of that person and provide instructions for meeting that person or arranging help, authorizing medical procedures, and the like. In another embodiment, the person requiring help, e.g., a child provides the attendant or kiosk with their ticket which can, e.g., scan the bar code or other reader system. The system can either automatically provide a text message to the parent who can then reply to the child/attendant via the kiosk to meet the child.

Alternatively, the parent can be instructed to meet the child at a predetermined location, and to stop looking for the child because the child was found. Thus, for this example, the person who is lost or separated from their party can notify security or access a kiosk. Security can, for example, notify the parent that child is in safe custody, and should not search the stadium, and therefore, meet outside stadium in a pre-specified safe place.

In an alternative embodiment, if a child/person is separated, the security guard/kiosk can arrange the best place to meet, either in or outside the stadium, together based on an optional global positioning system (GPS). In addition, the party with the mobile device can be provided directions on where to go to meet their party from who they have been separated.

In an alternative embodiment, the present invention may also be used in a security, defense and/or safety setting to direct patrons in a stadium for an orderly evacuation or notify patrons regarding status of a safety related event via, for example, a broadcast message including text message, email and the like. In this manner, system communication resources may be most efficiently utilized by not over-utilizing the system via voice communication, unless completely necessary. For example, the message can be broadcast in the event of an impending hurricane. In this situation, patrons in different sections get different messages, for example, to exit the stadium out of gates/exits that are either less occupied or closest to the section the patrons are sitting in. Advantageously, the present invention has the patrons contact information, including optionally and advantageously text messaging, that can be broadcast or sent to different patrons. The advantage of text messaging is that the bandwidth is more efficiently used in the event of an emergency, and there are no busy signals as in a voice network. Further, the message is send, and if the network is at capacity, the system can automatically resend or the message will be placed in queue and sent as soon as capacity becomes available.

In another alternative embodiment of the invention, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction.

For instance, in sporting venues the bracelet ticket includes the machine readable information that comprises at least one of a bar code and radio frequency identifier used for security check in, and optionally check out. In this manner, the standard reading machines that can scan the bar code or RFID information can keep track of people that have checked into the sporting event and/or venue. Advantageously, the machine readable information on the bracelet can also be used by the venue in the event the patrons seat assignment is modified, for example, via an electronic ticket exchange or upgrade program. In this embodiment, the visible indicia are no longer valid for the actual seating that may be dynamically changed and only represents optionally an initial seat assignment. However, the machine readable information may be used as a code to reference the specific patron and assign that patron a new seat. Thus, when the ticket reader scans the ticket and actually identifies, for example, the bar code, this information can be used to reference the patron, update and/or confirm the patron's current seat via the reader used, for example, by ushers in the venue, kiosk, entrance to the venue, and the like.

In an alternative embodiment, the security bracelets of the present invention can be required to be displayed and read on exit from a venue when a parent has reported that a child has been separated. In this event, all patrons are checked when they exit the stadium. The parent can report the specific seat that the child was sitting in, and then on exit, all patrons are checked. If the specific seat appears or if a child attempts to leave without scanning or presenting their bracelet, then that child can be taken into custody until their parent arrives, thereby possibly preventing abduction. This information, as previously mentioned, may be visually cognizable for the patron and in combination, readable by electronic means if the bracelet includes a magnetic strip, bar code imprinting, or RF chip.

In an alternative embodiment of the present invention, the security bracelet and ticket combination of the present invention advantageously includes a bar code or other machine readable information such as a RFID device. When, for example, a child is separated form their parent, the parent can notify security and the seat number associated with the child. If the child attempts to leave with their bar code/identifier, the system detects the bar code/identifier as either being valid and identifying the child that is missing or being invalid and raising another red flag. In an alternative embodiment, the bar codes/identifiers associated between children and adults correspond such that the child identifier must be within a predetermined time and/or number of checking out identifiers from/within the adult identifier. If this does not occur, the system determines that the child is leaving without their parent, and possibly being abducted.

In an alternative embodiment, the system links one or more tickets/identifiers together and requires the tickets/identifiers to exit the venue or event within a predetermined time period from one another and/or within a predetermined number of tickets/identifiers that have exited the venue and/or event. In the event that one ticket/identifier exits the venue or event and the associated identifier does not, then an alarm or other indictor occurs, and the attendants will detain the patrons that have initiated the alarm to for security purposes.

In an alternative embodiment, the tickets are advantageously coded with designations such as adult, child and the like. In the event a child ticket/identifier exits the stadium before the associated adult and/or more that a predetermined time period and/or number of patrons exiting, the system can initiate an alarm so that an attendant can determine if a child has exited the venue or event without their parent or with a wrong parent potentially averting a kidnapping. In this embodiment, an additional combination is the use of the standard fast pass feature, for example, at theme parks, and the like, where the venue records predetermined events that the user of the card enters in a faster line. In this embodiment, if a child ticket/identifier is not associated with a parent ticket/identifier, for example, as described above, the child may be denied entry into the event or venue if not accompanied by their parent. In alternative embodiments, the venue/event sponsor or organizer associates tickets upon request from the patron. In addition, in another alternative embodiment, a kiosk is provided inside and/or outside the venue for, for example, parents to register their tickets and have them associated with their children's tickets to prevent the child from exiting the venue without them, for example, as described above.

In an alternative embodiment of the present invention, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In another alternative embodiment of the present invention, a security bracelet is advantageously utilized, for example, such as the security bracelet disclosed in U.S. application Ser. No. 10/680,207, filed on Oct. 8, 2003, to Abraham I. Reifer, et al., and incorporated herein by reference, in the event of a reported event, security breach, abduction, and the like. In this embodiment, all patrons exiting the stadium must show their ticket and/or identifier so that the venue can check all patrons out of the stadium. Thus, for example, if two kidnappers come in the stadium, and want to use one bracelet for a child, the second kidnapper will be stranded in the stadium. In addition, if one kidnapper buys two tickets, then upon exit with the child and the additional ticket, a barcode/identifier will be exiting without ever having checked in, and then the alarm will go off as well.

In another alternative embodiment, the present invention provides a broadcast message to warn patrons of an event, such as an advertisement, sale and/or even a weather related event such as a hurricane that might require the venue to be evacuated. Advantageously, in at least one embodiment, the broadcast message comprises standard text messaging that optimizes or better utilizes capacity form the communication system. Thus, when using text messaging capabilities, the present invention efficiently transmits text messages to numerous subscribers regarding, for example, exit information, contacting and/or meeting additional parties that have been separated, and the like.

In an alternative embodiment of the present invention, the present invention optionally provides the capability to penetrate into secondary market with season ticket holders selling ahead of time the games they will not be attending. For example, the present invention optionally provides the feature for the season ticket holder and/or general ticket purchaser the ability to view in advance of the season and/or game the schedule, and to alert the venue and/or stadium of games and/or events they will not be attending, thereby permitting the stadium/venue to attempt to resell the tickets to other patrons. For example, in one embodiment of the invention, the patron is provided with a monthly schedule listing the events that may be attended. The patron, such as a season ticket holder, may then click or place an indicator on all games they will not be attending for the season in advance, thereby providing the stadium with the ability to resell tickets well in advance of the event. Once the patron completes identifying games that will not be attended, the system then compiles a list and transmits the list to the patron for an optional confirmation. This list is then used by the system to release seats well in advance of the game. In an alternative embodiment of the invention, registered users of the system for, for example, upgrades, may also be notified of seat availability for sales prior to the game/event. In an alternative of this embodiment, registered users may receive text messages, emails, and the like, notifying them advantageously of the availability of seats that heretofore have never been easily available to the public for sale, thereby allowing the venue to participate in secondary market ticket sales.

In one alternative embodiment of the present invention, the system/process of the present invention provides or operates as a middle person/broker between the ticket holder that is returning tickets to the venue, such as the season ticket holder, and a ticket sales system and/or company, such as tickets.com, by notifying the tickets company of the newly available seats via notification by the ticket holder, such as the season ticket holder of season ticket games not being attended.

In one alternative embodiment of the invention, the system and/or process transmits text messages, emails and the like, to offer tickets and/or seats and/or admittance to subscribers for events and/or games with empty seats even before game. Thus, the present invention allows the venue to participate in the secondary ticket sales market and the upgrade market, thereby increasing revenue and fan loyalty.

Of course, all of the embodiments of the present invention may be used for any reserved seating event, and/or venue that require tickets for entry thereof.

In another alternative embodiment of the present invention, the use of machine readable identifiers provides advantages for, for example, the upgrade program or ticket exchange of the present invention. For example, when the upgrade, re-allocation and/or electronic ticket is issued, the machine readable identifier, for example, the bar code, on the original ticket is invalidated, thereby preventing use of the invalidated ticket. Accordingly, when a new ticket holder purchases the ticket form the season ticket holder, the new purchaser will be issued a new machine readable identifier, and optionally a new paper ticket. The present invention advantageously is able to handle the issuance of a new ticket and invalidates the old ticket and optionally the old identifier that has, for example, been returned by the season ticket holder, thereby providing dynamic ticketing capability.

In an alternative embodiment of the present invention, the new patron obtains a new identifier such as a barcode, the old bar code of, for example, the season ticket holder is invalidated. In one embodiment of the invention, season ticket holders are offered to opt in the upgrade process. Various commercial incentives are possible for the season ticket holder to opt in the upgrade process, such as monetary compensation when their ticket is used for an upgrade and/or resold whether they express their intention not to go to the game prior to the game, and the like. Alternatively, season ticket holders may be offered that the cost of their season tickets will, for example, remain the same as the previous year or be reduced if they participate in the program. Therefore, the combination season ticket trade-in and upgrade program in one embodiment of the invention will be beneficial to season ticket holders by allowing them to trade when they already know that they have no intention of attending a game, and allow the season ticket holder to recoup some cost of the season tickets if they do not attend and their ticket is used as an upgrade. In addition, additional patrons of the event and/or sports team are permitted to attend the game in locations/seats that they might never have been able to obtain access to. Further, the venue/stadium/team maximize revenues by being able to place tickets on the secondary market when the ticket holder notifies the venue early enough that they are not attending the event, the venue also obtains additional revenue from upgrades when tickets are upgraded, and the venue obtains additional fan loyalty.

In another embodiment of the present invention, the system provides the ability to advertise via email, text messaging, and the like, for one wireless carrier on the wireless device that is using another wireless carrier. Since the user of the wireless device has requested the service, the user appropriately receives the communication from the ticketing system of the present invention, and therefore, also appropriately received the advertisement from the wireless carrier that is different than the wireless carrier that the user of the wireless may be using at that time.

In another alternative embodiment of the present invention, offers to purchase seats either during the game or even well in advance of the game are "pushed" or transmitted out to registered users that have supplied their wireless and/or Internet addresses. For example, patrons can register in advance for the upgrade and/or regular ticket offers to purchase admittance via various methods including the Internet. When seats band/or admittance becomes available, a broadcast message or other standard messages may be transmitted to the registered patrons to notify them of the seat availability. Thus, seat offers are "pushed" to registered users that have requested this service advantageously to a wireless device and/or other address including standard telephone communication, as well as additional optional advertisements. The system, in one alternative embodiment, provides the user the option when registering to accept certain types of advertisements to be received on their wireless device via email and/or text messaging. In other embodiments, the user does not have the option of which advertisements to receive.

Advantageously, in accordance with one alternative embodiment of the present invention, if a patron decides to attend an event such as a sporting event when the patron does not have time to wait to receive paper tickets (e.g., the patron is visiting in another city/location and does not have time to wait to receive tickets via mail and is on the go), the system of the present invention transmits a ticket to the patron via, for example, a wireless communication system and/or other standard electronic communication system such as the Internet, and the patron can present their ticket, for example, on their wireless device and show up to game.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Patrons then text message and/or email and/or answer questions via voice-to-text messaging their answers. The system can then display the overall number of answers that are correct and incorrect, display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another alternative embodiment of the present invention, the system uses a seat database to determine which of the reserved seats are currently in use. The system may integrate with the seat database system of a venue and/or stadium or optionally be used in parallel with the seat venue/stadium database. For example, prior to the event, the system may utilize the seat database of the venue to determine available seating and patrons that do not show up after a predetermined period of time. Alternatively, the present invention can operate using a separate database from the event/venue by copying or building a separate database used for the ticketing and/or upgrading according to the present invention. In this alternative, as patrons enter the venue, they are checked in directly to this separate database. At the time of the event, the system will be able to check-in patrons using either the identification system, e.g., bar code scanner, of the event or venue, or provide a separate identification system.

In alternative embodiments of the invention, the patron that knows they are attending the game but is going to be late can send in a HOLD message even prior to being provided a warning message that their seats are to be released if the patron does not respond to the message with the HOLD request. That is, in this embodiment, since the patron already knows well in advance that they are attending the game, but perhaps stuck in traffic, the patron can initiate the HOLD message before even being warned in advance of the possibility of their seat being released.

In another alternative embodiment, patrons that have registered with the system and optionally checked into the stadium and/or venue in advance and who also know that they would like an upgrade and/or ticket, may initiate their own upgrade request to the system to notify the system of their willingness to purchase an upgrade and/or new ticket for the event/venue. The system may then place these patrons on a higher priority since they have already expressed and intent and/or willingness to purchase the upgrade or ticket. The patron may notify the event and/or stadium of their willingness optionally well in advance of the game or near/after game time at a time which the patron commits or expresses an additional heightened desire to upgrade and/or purchase a ticket.

In alternative embodiments, the system includes the advantage of allowing patrons to register free for a predetermined period of time, for example, for the first year, without paying a yearly subscriber fee. Alternatively and/or in addition thereto, the system provides the patron with their first upgrade for free or for a reduced rate to further encourage the patron to register with the system and method of the present invention. Alternatively and/or in addition thereto, the system of the present invention offers the patron reduced and/or free concessions when purchasing a membership, ticket and/or upgrade to further encourage the patron to participate in the offers of the present invention.

In alternative embodiments of the present invention, the matching system and/or process, permits participants in the program to initiate a message to the system with the seat location and/or name of the patron that they would like to be matched with for a meeting, networking and/or socializing such as a date. In this embodiment, the system may the push the message to the other subscriber and assign new seats to the individuals that are to be matched. Alternatively, the system Need not require a specific confirmation that the second individual to be notified of the potential match is physically located near the first individual, but can rely on the first individual to provide that information. For example, the first individual may see a potential date in a restaurant, and may then send a message to the system with that person's name or address, that they would like to meet that other individual. In that situation, the second individual will receive a message of the possible match, and can respond and accept or reject the offer to meet. The second individual can then provide a meeting destination or the system can suggest a meeting place based on the first individual advising the system of their location, and the location of the second individual.

In another embodiment of the present invention, an interactive patron entertainment system is provided where trivia questions, for example multiple choice questions on a variety of topics, are sent to the patron via email and/or text messaging and/or displayed on the scoreboard with an address to respond, such as trivia@utixx.com. Advantageously, the multiple choice questions each have unique selections, such as a1, b1, c1 and d1 for question #1; a2, b2, c2, and d2 for question #2; a3, b3, c3 and d3 for question #3, and the like. In this embodiment, the actual timing of questions is not necessary since each question and answer is unique. Therefore, the speed of responding to the question is immaterial to the winner of the contest and/or correct answer. Also, in the event one patron answers the question late, there will be no confusion which question the patron is submitting an answer for. Patrons text message and/or email and/or answer questions via voice-to-text messaging their answers as indicated above using the unique set of answers, in one embodiment. In alternative embodiments, the first predetermined number of patrons that answer the question correctly are considered the winners.

The system can then display the overall number of answers that are correct and incorrect, e.g., a1 50%, b1 28%, c1 12% and d1 10%, and display bar graphs and the like to the event patrons by displaying on a display, such as the scoreboard of a sporting event. The system then identifies the patrons that have correctly answered the question and can then send new questions to be answered just to the previously correct patrons, thereby further narrowing the group of patrons. Successive questions can be sent, including questions that are not multiple choice and that require actual text to be entered via standard wireless device interfaces, and patrons are successively eliminated until a single or sub-set of patrons are determined to be the winners. Advantageously, the present invention provides entertainment to the patrons at the event by optionally providing successive questions throughout an event. In another alternative embodiment, simultaneously with the questions to the patrons present at the event, the present invention is also capable of sending the questions to patrons that have registered with the system, but are not at the event, for example, at home watching on the television or simply not currently involved in the game. The present invention is able to transmit the same and/or different questions to those registered users as well. Further, in another alternative embodiment of the present invention, viewers watching the television, for example the same event that patrons are attending, may be presented with the same and/or different questions as well as an address and/or telephone number to call and provide their answer which they can compete with patrons at the event or can be used to provide a separate comparison of the answers and/or separate winners to the contest. In this embodiment, for example, questions may be displayed on the television, Internet website, and the like, during the event, and viewers watching the television may respond to the questions as described above. The system can optionally compare the percentage of correct answers between the television viewers and the patrons at the event, and/or provide separate awards or a single award to the winners from the pool of television/Internet viewers and/or patrons in the event.

In another embodiment of the invention in connection with the seating upgrade and/or assignment system, an identifier and/or machine identifier such as a bar code, RFID, etc. optionally remains static for the user on the user's ticket and/or device that is provided for optional paperless ticketing. For example, the identifier will remain the same associated with the user, but the seat assignment, privileges, user characteristics, user preferences, and the like, may be dynamically changes. The system and method of the present invention will be updated so that the identifier can represent a dynamic seat assignment or other dynamic information, such as general admission to an associated event, or other event and/or venue, including, for example, a restaurant, bar, and the like.

In another embodiment of the present invention, the upgrades process and/or feature may be provided to users/ patrons as a complimentary reward for fan loyalty, to reward the user but also market other goods/services and/or other advertising opportunities to be transmitted via the wireless device and/or mobile phone. In one embodiment of the invention, the system and/or method initially queries the user, for example, at the beginning of the trivia contest and/or tournament or at the beginning of the game, whether the user is present in the stadium or not. The system can then perform, for example, the trivia contest, and determine a winner(s) to award for example some form of reward. Furthermore, in another embodiment of the invention, based on the number of people responding that they are present at the game, the present invention advantageously provides a random upgrade to a predetermined number of patrons as an additional fan loyalty program and/or advertising sponsorship to one or more entities that sponsor the free upgrades.

In another embodiment of the invention, a system and/or method is provided that advantageously builds and/or acquires and/or collects mobile contact addresses of users in an efficient manner. For example, in accordance with the present invention, a user advantageously need only provide the communication network and telephone number, and the present invention builds a data address therefrom. This allows the mobile or wireless device user to still register for a service without specifically knowing their data address for, for example, data communication such as SMS messaging, text messaging, email, and the like. In one embodiment, the mobile user is provided a drop down menu where the user selects the communication network and provides their mobile phone number.

The present invention is particularly advantageous currently with the recent enactment by the Federal Communications Commission (FCC) number portability where mobile phone users are able to transfer their existing numbers to other networks. Accordingly, we have determined that a user's number will advantageously provide a mode of contact for the user even when the user decides to change communication networks. For example, in at least one embodiment, the present invention uses the cell phone number and IP address combination, e.g., 2029422785@verizon.net, or 3016814455@attwireless.com, and/or any other mobile telephone plus IP address combination that may be used to utilize the IP address of the cell phone. Alternatively and/or in addition, the SMS address may be used.

In one embodiment of the invention, the software processes and system determines and builds the actual messaging address (email, text, SMS, and the like) to send messages to the mobile device by the user only selecting and/or providing the communications network and the telephone number. Thus, the present invention advantageously simplifies the process for mobile or wireless device users to register and/or provide contact information, and therefore, beneficially increases the number of individuals that can effectively and easily register for a communication service.

In another embodiment, the present invention facilitates the ability for potential users to signup for the service of receiving, for example, trivia, upgrades and/or text messages via a user sign up device or apparatus. In one embodiment, the user sign up sheet includes numbers and/or circles that can be filled in like a grid, where the user can fill in or cover the numbers that identify their portable number. In addition, the user can check off the specific network carrier from a list of network carriers, or simply enter their specific network carrier. The user sign up sheet may be done electronically via a computer and user interface as described above, or may initially be filled out by a user via, for example, a piece of paper and then later entered into the computer system of the present invention.

In another embodiment of the invention, the system and method of the present invention is capable of re-locating a patron via the mobile address that was previously provided, even if the patron has changed wireless carriers. For example, in one embodiment, with the recent feature of mobile phone portability by the FCC, we have determined that a significant number of mobile phone users are likely never to change their number/address, and therefore, the system and method of the present invention is able to send text messages and/or email to all network addresses using the telephone number of the user if the system suspects that the previously provided network by the user is no longer being used. In this embodiment, the user can optionally respond to the message and/or network broadcast message, confirming that one of the messages has been received.

In another embodiment of the message, whenever a user wants to contact a mobile phone, mobile wireless device or even computer based, via for example, an Internet based account, wants to contact another mobile wireless device user, the present invention provides a transmission device, for example, via the Internet or individual models/mobile phones used for each of the networks to broadcast the message on all networks. Advantageously, in accordance with this embodiment, since the user is likely to maintain the same telephone number, their data or text messaging address will be their telephone number and one of the few network addresses. This type of broadcast message can happen anytime, and even for voice communication when the user of the wireless device needs to receive a data, text and/or voice message.

In another alternative embodiment of the invention, as described previously, the invention may be used by a patron to obtain specific data or information regarding sports or venue related information of interest. For example, patrons may communicate with the system and forward a player jersey number or number of racecar during an event such as a baseball game, football game, racing event such as Nascar, to obtain additional information including current statistics and past statistics. The present invention can then optionally sent statistics throughout the game or event to the patron without the patron requesting, for example, at specific time intervals or after notable achievements during the event, such as a home run, touch down, 7th inning stretch, half time, number of laps traveled, and the like.

Thus, the present invention includes many variations in the type of information a user may receive, whether specifically checked into a venue or registered for the service for a particular event. In addition, the present invention includes various processes and systems for ensuring delivery of messages to patrons that have requested the service or merely sending messages that a patron may be interested in receiving.

In another embodiment of the invention, the matching and/or networking system includes the ability to contact and/or notify the users to coordinate the meeting using any one of a plurality of communication methods including text messaging, email and/or instant messaging, with the additional advantage of transmitting pictures, video and/or other data that provides additional information regarding the other person that has been suggested for the match and/or network. In one implementation of this embodiment, the system and method are adapted to utilize any type of wireless device with different interface and communication options. For example, different wireless devices have different constraints with respect to the interface, e.g., number of characters, how the subject and body of the messages are used/communicated, etc. Accordingly, the present invention optionally provides a protocol conversion system depending on the type of wireless device and the wireless device constraints, including message constraints and/or the wireless communication system. For example, different message transmit and/or receive formats may be used depending on the system. The present invention beneficially parses the various different formats to obtain the necessary information for the communications described herein. In addition, the represent invention formats the messages for the different wireless devices so that the messages may be appropriately received even though different devices and/or communication networks have different messaging formats. In alternative embodiments, the system determines the wireless device provider based on the address received from the wireless device, and is able to automatically determine the type of message and/or message constraints and transmission constraints associated therewith based for example, on real-time information or on pre-determined stored information on the device and/or communication system. Accordingly, a protocol conversion system for different wireless devices is provided by the present invention for sending and/or receiving messages, such as upgrade offers, responses, acceptances, and the like, from a variety of different users/mobile devices and wireless systems.

In accordance with another embodiment of the invention, the matching and/or networking system includes the option of permitting a subscriber to notify the system when they are ready for a potential meeting and/or match. Once the matching and/or networking system is notified of the subscriber requesting the match, the system is then capable of either tracking the user though a positioning system such as GPS, permitting the user to register at predetermined locations upon user initiation such as via Bluetooth, RFID, infrared, and the like. In accordance with this embodiment, the subscribers are not being constantly tracked, and therefore, maintain an additional level of privacy. In alternative embodiment, the present invention continuously tracks the subscribers without specifically requesting to be matched. In this alternative embodiment, the subscriber is provided with less privacy because they may be notified of a specific match even though they might not be interested in the match and/or meeting at that time.

In an alternative embodiment, the present invention provides subscribers with the ability to accept/reject the match before each of the subscribers receive personal information of the other and/or before the date/match has been arranged with at minimum a meeting location. In this embodiment, the invention requires that both users accept the match and/or date prior to notifying the subscribers of the contact information for each subscriber. Therefore, subscribers can optionally request additional information from the system of the present invention, even multiple times, to better understand the potential date and/or match before accepting, and importantly, before the other subscriber is provided contact information and/or a meeting location of the subscriber. In the embodiment where the present invention merely provides the meeting location, the present invention advantageously does not provide the subscribers contact information and/or other personal information before the match/date. Advantageously, in accordance with this embodiment of the invention, subscribers never receive personalized or personal contact information unless the subscribers, after meeting in person, agree to exchange such information.

In another embodiment of the invention, the dating and/or networking system provides subscribers the functionality to email, instant message and/or text message at least one additional piece of personal information and/or questions, optionally directly to each other or via the system anonymously, to obtain additional information that may be more relevant than the user profile or information from the user profile that was used to make the initial date/match.

In another embodiment of the dating and/or matching system of the present invention, the system optionally provides automatic and/or user initiated registration in a particular establishment and/or geographic location, which can be used instead of a location determination system such as GPS, or together with such system. This form of registration may be even more precise than GPS because it confirms a subscriber's presence within a specific store, establishment, entertainment establishment, restaurant, and the like. Thus, in these embodiments, the subscriber either initiates the registration as described above, or alternatively, if the subscriber optionally sets the wireless device to automatic registration based on the appearance at a predetermined registration area and/or location, the subscriber will be automatically registered to receive communications regarding a potential match/date.

In an alternative embodiment of the present invention, once the dating and/or matching system determines that a potential match/date has been detected, the system optionally notifies the different subscribers and asks whether they want to continue to participate in the matching/dating program. When both, some and/or all subscribers agree to participate, the present invention can forward to each subscriber automatically the information that each subscriber shares substantially in common and/or the information that was responsible for the match/date between the subscribers. In this embodiment of the invention, the subscribers will know immediately the information that should be most relevant in making the match/date and can determine whether to actually agree to either contact or send the other subscriber additional information and/or arrange to meet the subscriber at a pre-designated location.

In an alternative embodiment of the present invention, the present invention optionally includes the ability to recommend a potential meeting place for the subscribers to meet after determining that the subscribers have agreed to participate in the date/meeting. In this embodiment, the present invention advantageously determines the location based on, for example, subscriber preferences, geographic location that is preferential for at least one of the subscribers and/or both subscribers, predetermined location where, for example, a sponsor will receive patronage and/or provide a discount for the subscribers and/or actual pay the organizer of the dating/matching system an advertising fee to promote their sponsorship. Accordingly, the present invention advantageously determines not only a potential match/date, but advantageously suggests, recommends and/or determines a specific location and/or geographic location and/or restaurant, clothing store, zoo, museum, and/or other suitable location for the subscribers to meet and optionally based on geographic distance and/or location.

Additional dating and/or matching features and/or differentiators of the networking and/or dating system of the present invention include one or more fo the following:

Wireless messaging platform supports interactive messaging

Wireless messaging platform provides simultaneous parallel applications to run without collision Multiple wireless initiatives or topics run without conflict Different initiatives or topics may be user specific or selectable While each initiative runs independently, there can be overlap in terms of customer base Platform is flexible to add/remove initiatives quickly and efficiently One wireless carrier/network can be a dating/matching sponsor and advertise on the wireless device and/or network of another wireless carrier/network Contact members to notify of the match/date to allow members to either directly contact each other or send additional information via, for example, text messaging, email, instant messaging, such as pictures, video, and the like Contact members or wait for request from members to participate in match/date initiative; can then automatically track member via GPS instead of constantly tracking member all the time, thereby increasing privacy of member Contact each subscriber that is being offered the date/match and obtain approval for the match prior to actually notifying potential members that match has been made Contact users after initial match has been conditionally approved, and provides users the capability to request additional information, such as personal information from the other member or other members which the requester still wants to know before finally accepting the date/match Members can register or "check-in" at predetermined locations and/or establishments which is one additional level of specificity, for example, with regard to the location where a member is that may be interested in matching; For example, two or more members may actually be in the same restaurant where they can be informed of one or more other subscribers being present; members can register via sending a message to the system via text message, email, RFID, Bluetooth, and the like, either by initiating a registration or automatically Contact members after initial match has been conditionally approved and exchange, optionally automatically, profile information that was significant in making the match/date and/or other important information regarding a match/date that a member may want to know before finally accepting the match/date and/or information the members may want to know that is geared particularly for a first date, e.g., likes/dislikes, common interests, favorite foods, wines, alcoholic beverages, and the like Contact members to suggest and/or recommend and/or arrange meeting place based on, for example, geographic location, common interests/sports, common food tastes, common beverage tastes, common entertainment preferences and/or sponsors willing to, or interested in, being utilized for the match/date for the suggestion and/or recommendation, and optionally providing the members a discount and/or compensating by the sponsor to the networking and/or dating system proprietor for the advertising and/or recommendation to visit that sponsor Wireless messaging platform includes a protocol conversion server functioning to interface with a variety of wireless networks having different messaging characteristics for both transmitting and receiving messages, and parsing the different message formats for the content from a received message, and transmitting a message to a plurality of different networks and/or devices having different messaging and/or interface capabilities and/or functionality Contact members with a wireless consent form indicating that the matching/dating system and/or the members participating in the match/date have generally consented to potential cohabitation optionally without any recourse to the other party. Alternatively, the members may be contacted with other types of informed consent forms with limited recourse for acts and/or aggressive acts that are clearly assaults, but not sexual related misconduct or sexual related crimes that are felonious in nature carrying a high penalty/sentence. Alternatively, members may be presented with consent forms that eliminate any criminal penalty, but do not foreclose the possibility of civil lawsuits for damages relating to torts, and the like As another alternative and/or in addition thereto, members may be presented with consent forms that eliminate any civil penalty, but do not foreclose the possibility of criminal lawsuits for criminal type activities, perhaps with the exception of the most severe sexual crimes such as rape and/or sexual assault that carry significant prison time.

For example, athletes, celebrities, high worth individuals, or even average individuals, male or female, may be interested in the wireless consent initiative because that allows them more flexibility to meet a variety of individuals without the worry of later being sued. In additional alternative embodiments, broadcast messages may be transmitted to numerous individual that may be interested in meeting and/or dating a celebrity or predetermined individual or individuals. In this embodiment, the optimum matching individual or individuals may be selected to meet with the celebrity, celebrities, and the like, while utilizing the informed consent feature of the present invention. In another alternative embodiment, an individual or individuals may be randomly selected as part of a match or date, based on a lottery or other competition to meet or date a specific individual or individuals.

Additional optional hardware and software requirements are as follows for one or more embodiments of the present invention:

System Capabilities

Platform supports interactive messaging

Platform provides simultaneous parallel applications to run without collision

Multiple wireless initiatives or topics run without conflict

Different initiatives or topics may be user specific or selectable

While each initiative runs independently, there can be overlap in terms of customer base Platform is flexible to add/remove initiatives quickly and efficiently Wireless Initiatives Interactive trivia with fans inside and outside of the stadium Targeted messaging, e.g., targeted advertising Broadcast messaging, e.g., general advertising Interactive messaging, e.g., with concessions Profiling for each initiative or topic, e.g., based on network operator Urgent and emergency messaging Specific initiative: discounts for concessions and/or memorabilia Specific initiative: invite patrons to different activities before, during or after game, e.g., player loyalty, family activities, etc.

Specific initiative: seating upgrade program

Specific initiative: messaging patrons in one section and separate messaging to patrons in another section Specific initiative: messaging parent of a missing child Special initiative: dating where patrons can keep their seats to return to them, or their seats are re-allocated. In alternative embodiments, the patrons switch seats instead of moving to empty seats, either for the entire game or only a portion thereof with other patrons for match making possibilities.

Functional Specifications

Front end for user signup and profiling-secure site—for example, modeled after www.mlb.com, include one or more of:

type of seats does the customer want for upgrade (decks and range of sections)

information for dating concession profile capability for additional profile information validate user by sending message to device upon sign up auto append of network information to phone number during signup login and password protected site frames on website or interface that can be easily configured to have look and feel, for example, of particular baseball team capability for space on screen for advertising opportunity that can easily be modified and relatively dynamic capability to handle lost passwords web page or interface where customers with season tickets can mark a calendar with the seats they want to keep and the ones they are interested in freeing up for early sale or upgrade.

The optional Front End of the present invention used for administration and setting up parameter for each application, optionally includes a secure site, with one or more of the following:

application email address and password minutes for all the configuration parameters and/or functionality number of threads for each application for upgrades, at least one of releasing customers old seat immediately, or it until the customer approves of the release, or holding the customer's seat for a predetermined portion or all of the game, for example, in the dating functionality)

set schedule for games section rating setup, and seat upgrade pricing revenue allocation model provide a number of retries if message send failure Concessions The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

Concession Wireless Initiative

Purchased via cell phone

Web registration for preferences

Targeted concession offers

Confirmation that purchase is ready

Delivered to seat or ready for expedited pickup

Customer convenience: system identifies closest concessions to customer

Customer convenience: system determines concessions with short wait

Each concession labeled with a number for customer identification and fulfillment Customers can request menu, or register for each game to receive menu around game time via mobile device GPS can be used effectively to inform customer of closest concession stand to pickup order, and/or customer can provide section number and/or seat location for system to identify most convenient concession stand Most convenient concession stand can be determined based on one or more, or combination of, predetermined criteria, such as, closest concession location, shortest wait in line, specific item being ordered, and the like.

Interactive messaging, e.g., with concessions

Specific initiative: discounts for concessions and/or memorabilia

The optional Concessions functionality of the present invention used for administration and setting up parameter for each application, optionally includes a secure site, with one or more of the following:

setup for orders be delivered to concession kiosk order confirmation provided to user user informed when order fulfilled so he can go to an express line for pickup or have delivery option auto bill feature interactive abbreviated user interface that optionally uses user entered profile to determine initial prompt of possible concession orders to expedite orders, and to reduce number of characters needed to be transmitted. An example user interface for a patron that has a grouping of four season tickets is:

Would you like to order?

(a1) 4 hd; 4 coke; 4 ff (b1) 4 hd; 3 coke; 1 beer; 4 ff (c1) 5 hd; 3 coke; 1 beer; 3 ff (d1) 3 hd; 1 taco; 3 coke; 3 ff hd=hot dog; coke=cola; ff=french fries; pz=pretzels; pt=peanuts; lem=lemon ice, and the like.

The second communication may then be reduced if the user wants a smaller quantity as follows:

Would you like to order?

(a2) 2 hd; 2 coke; 2 ff (b2) 2 hd; 1 coke; 1 beer; 2 ff (c2) 3 hd; 2 coke; 1 beer; 3 ff (d2) 2 hd; 1 taco; 3 coke; 2 ff In alternative embodiments, unique selections are provided in the event several selections by the user are provided, thereby eliminating any possible confusion regarding the selection by the user.

The user can have the option of selecting a specific option, e.g., "b1" and having their payment optionally done automatically, for example, if they provided a credit card, debit card, etc. on the user registration. Alternatively, the user can select the option that is closest with additional information to indicate to the system to create additional permutations of the selected option for the user to review and accept in another communication. In yet another alternative, the user can accept a particular option, e.g., "c1" but also indicate to the system that they want to order more, or include an additional order from their wireless device. In alternative embodiments, the user may be presented to hyperlinks or hyper-like like options to select from, or the user may be directed to a website via their wireless device to select/order concessions.

In one alternative embodiment, the following message exchanges may be used:

First Message

"In Game" Concessions

Menu will be sent soon!

Reply with #, item short form and seating section

Ex: BE=beer

Reply 3BE for 3 beers

408SEC for section 408

Powered by NEXTEL

Second Message (paper menu?)

Menu

BE=Beer; CO=Coke; DCO=Diet Coke

HD=Hot Dog; BUR=Burger

TA=Taco/Salsa; PO=Popcorn

FF=French Fries; CH=Chips

PZ=Pretzel; PT=Peanut

LEM=Lemon Ice

Third Message

Order received!

Summary:

3 HD @ $3=$9

2 CO @ $3=$6

2 LEM @ $3.50=$7

Total=$22

Reply Y to ACCEPT

Credit Card charged

N to CANCEL

Fourth Message

Thank you for ordering!

Your order has been confirmed!

Confirm # REIF1001

Powered by: THE SPORTS AUTHORITY!

Fifth Message

ORDER READY

Bring Confirm # REIF1001 to Concession #33 by sect # 212

$2 off NIKE baseball gloves

Bring #NIKE305 and game ticket to

Any SPORTS AUTHORITY!

In another embodiment of the invention used in concessions initiative, the concession attendant receives the confirmation number or other identifying information from the customer when picking up the concessions. The concessions attendant enters the confirmation number or other identifying information when ready or optionally clicks on the order on the computer screen via a concessions interface associated therewith. From there, the order is then cleared from the system with respect to orders that require fulfillment, advantageously allowing the workers to streamline their work activities in the concessions. In an alternative embodiment, the concessions are actually delivered to the customer using the customer provided seating information, either provided by the customer through, for example, the wireless device or other registration and/or notification process, or even via a telephone call or automated attendant to associate with the order.

In another embodiment of the invention, the concessions menu is advantageously only delivered to customers that have entered the stadium via a location determination system, and/or checked into the stadium via a ticket reader/scanner. In alternative embodiments, all customers that have registered for the concessions service will receive an introductory message. Thus, customers that are not attending the game need only reply with a request to terminate the concessions service for that event and/or game.

In an alternative embodiment, the customer is advantageously directed to closest concessions via, for example, GPS chip in phone or by knowing where the customer sits at check in, or by having the customer input their seat location or location where they would like to pickup the concessions.

In another embodiment of the invention, we have determined that some mobile phones will utilize different transmit and receive addresses, and therefore, a user may not know how to appropriately register to be a subscriber for one or more wireless initiatives. For example, we have determined that some mobile phone networks utilize slightly different or different electronic addresses for the transmitting and receiving of electronic messages. For example, for the Research In Motion (RIM) Blackberry communication service, the mobile device is assigned a desktop email address. In one configuration of Blackberry, the mobile device only has one address. However, in the non-integrated configuration, the mobile device actually has a separate address when transmitting from the receive address.

In accordance with this embodiment of the invention, the user registers by providing their mobile phone number and optionally a network carrier for same. In this embodiment, the mobile phone user registers with their phone number and optionally wireless network provider. The registration system of the present invention then sends a message to the mobile device, requesting that the mobile device respond, optionally with a predetermined code and/or predetermined message. The mobile device then responds to the registration system, and the registration system corresponds the mobile device response with the original registered mobile address, thereby completing the registration process by ensuring that responses received from the mobile device can be mapped appropriately to the mobile subscriber. In the embodiment where the mobile user is requested to provide a predetermined code and/or message, the registration system uses the predetermined code to map the mobile phone response potentially having a different address with the transmit address provided by the user.

Dating, Matchmaking and/or Networking

In another embodiment of the invention, patrons are provided the opportunity to meet others in the venue or at a predesignated location near or away from the venue using standard matching rules. In one embodiment, the presence of the user is detected when entering the stadium, for example, via the ticket entrance systems. In another embodiment, the presence of the patron is detected or determined based on a message that is send to the user, for example, either right before, during or after the game. In this embodiment, the user can be prompted with a request whether they would like to participate in the matchmaking, dating and/or networking program.

For example, potential business or social partners may be selected or prompted for networking or dating. When the user responds yes, in this embodiment, their current seat is irrelevant if that seat is not to be released for another patron. Therefore, the system need only select a new set of seats for the networking and/or dating for the patrons, transmit the patrons the additional new seats via, for example, a wireless ticket, update the venue seating database for subsequent verification by the ushers when seating the patrons. The patrons may then proceed to the new location and have a meeting or date, and then return to their original seats if desired.

In another embodiment, a "burnt bridge" approach or feature is provided where the original seats for the patrons that are meeting are then released for other upgrade and/or networking programs. In this embodiment, the original seat of the patron must be known for example, via check-in procedure, registration for the program in advance for example over the web registration process or other registration process, or via the patron responding to the system with their wireless device of their current seat location. Alternate combinations or modifications of the above embodiments is also used.

Trivia

In the alternative embodiment of providing the user trivia information, based on registration and/or location, for example, while attending the game, watching the game at home, or any time prior to or after the game, the user may be provided with questions, as described above, to answer as part of a tournament and/or to be eligible for prizes, awards, and the like. In one embodiment, a section or portion of the users are targeted for the questions together, while other sections and/or portions of the users are targeted at a time period thereafter, for example, 1 minute later, to stagger the communication and transmission of data, thereby reducing congestion and/or unnecessary hardware to accomplish the transmission and acceptance of information to/from the patron.

In one embodiment, while all the questions are staggered over a predetermined period of time to the patrons, whether limited to patrons in the stadium, out of the stadium and/or both, the patrons are not notified whether their answer is correct until after all questions have been transmitted, and all patrons are provided the opportunity and/or sufficient time to respond. Once that predetermined time period has elapsed, the patrons will be notified whether their answer was correct, and whether they are still in the tournament. In optional embodiments, a predetermined time period will again elapse until new questions are sent and the tournament continues.

Optional Oracle or My SQL Database

In one embodiment of the invention, an Oracle or My SQL Database is used in connection with the present invention. In one embodiment, the result set is set to be proportionally with respect to the number of users and/or data that will be stored in the system. In another embodiment, the database is optionally partitioned for specific games and/or initiatives or groups of games and/or initiatives. The system is preferably thread safe when running the games and/or initiatives. The system is optionally integrated with Credit Card for payment, and/or integrated with the venue ticket system and/or point of sale system to optionally determine who came in and when into the venue. In another embodiment, the present invention maintains and updates financial balances for users, such as patrons and stadiums. In alternative embodiments, secure interaction with ushers and an interactive kiosk is provided.

The present invention optionally provides any standard algorithm for partitioning of group of seats and users, for example, for system resource allocation, load balancing and/or division of system functionality. In alternative embodiments, a local kiosk for the stadium and/or venue is provided where the user can enter information, such as register for one or more initiatives and/or programs. In alternative embodiments, the system of the present invention includes the capability of offering for sale seats which are not currently sold via messaging to wireless devices, such as text messaging to mobile phones, or other messaging and/or wireless communication to wireless devices, and consideration. In alternative embodiments of the invention, standard algorithms such as used in the airline industry may be used to overbook seats for the venue, and consideration.

In alternative embodiment of the invention, instant messaging or any type of communication method can be used in the present invention, include local and/or global networks, such as the Internet, LANs, WANs, WAP, 811.02a, 802.11b, 802.11g networks, and the like.

Messaging Software Requirements

Trivia and/or other messaging products/initiatives are Java applications that run in a J2EE application server and utilize a JDBC 2.0 compliant relational database. There are typically open source options available for system support. Currently for development and test environments we utilize are desktop environments running Windows 2000 with the open source options below. The draw back is that open source options typically don't provide formal system support approaches, although we have found the software to be very reliable and would recommend this approach for early stage pilots. Should the customer prefer purchase software options for these components are provided as well.

I. Server Software Specifications

Alternative A—Open Source Approach (1) Web/Application Server—Tomcat 4.1.18

(2) Database—MySQL 4.0

(3) Windows 2000 Server for each server

Alternative B—Purchased Product Approach (1) Application Server—Websphere Application Server 5.0

(2) Database—Oracle 9i DBMS (3) Windows 2000 Server for each server

II. Server Hardware Specifications (4) Each of the HW Servers specification:
 (i) 2xCPU—P4 2.4 GHz Xeon
 (ii) 2 GB RAM
 (iii) Monitor
 (iv) CD ROM
 (v) Floppy Drive
 (vi) Hard Drive depending on volume (see below)

III. Communication Specifications (5) POP3 Account and SMTP server accounts that can support number of active subscribers (6) Dedicated T1 access to POP3 and SMTP provider IV. Hardware and Software Sizing Configurations Phase 1:

1K-10K subscribers and players during the game

Two Servers

Server 1—runs Web/Application Server for the website and the Trivia Application

Server 2—runs the Database server (20 Gig)

Phase 2:

10K-25K subscribers and players during the game

Server 1—runs Application Server for the Website front end

Servers 2 and 3 (2 Servers)—run the Application Server for Trivia Application (two servers are used handle load balancing)

Server 4—runs the Database server (50 gig) (Level 1 RAID 2×50G Array)

(Server 5—used as a backup to server 4—depending upon Reliability requirements)

Phase 3:

25K-50K subscribers and players during the game

Server 1—runs Application Server to run the Website front end

Servers 2, 3, 4 and 5—run the Application Server for Trivia Application (four servers are used to handle load balancing with hardware and software clustering)

Server 6—Database Server—150 gig (Level 0+1 RAID 6*50G Array)

(Server 7—used as a backup to server 6—depending upon reliability requirements).

In one alternative embodiment, as part of the sign up for trivia the system optionally asks the general admission or season ticket holders to input their seats to simplify how the system obtains information where the patron is being seated when they come to the game. In an alternative embodiment, the system obtains this information from the stadium database system, kiosk where the patron can enter the information at the stadium and/or via the point of sales system by the service personnel or attendant that is selling the tickets. Using any of the above methods, once the system knows where the patron is/are seating when present at the game, the system can then target sections of the stadium for, for example, the trivia quiz or other service/offering to the patrons.

Examples of different sections that can be separately targeted include for baseball, behind first base line first, behind home plate second, first base line third—all lower deck; same sections for upper deck and bleachers. Other sports may include football, hockey, soccer, basketball, and the like. In accordance with this embodiment, targeting different sections over different periods of time, thereby preventing a long delay to receive answers once the question is transmitted, may minimize collusion among patrons.

Thus, by segmenting the stadium over a few minutes in accordance with one embodiment of the invention, the present invention may increase the window of transmission to, for example, 2 minutes or more for the first round. As the rounds get successively smaller, the present invention will transmit messages faster. The present invention also provides optional winners for different sections of the field. In addition, the section winners can further optionally compete against each other, for example, the first class seating winner can further compete against the bleachers winner, and the like.

As discussed above, one or more of the above alternative embodiments may be incorporated into the embodiments described above, and/or any of the embodiments discussed below. Furthermore, any of the embodiments of the present invention may be used for any reserved seating or other event.

Figure 37:
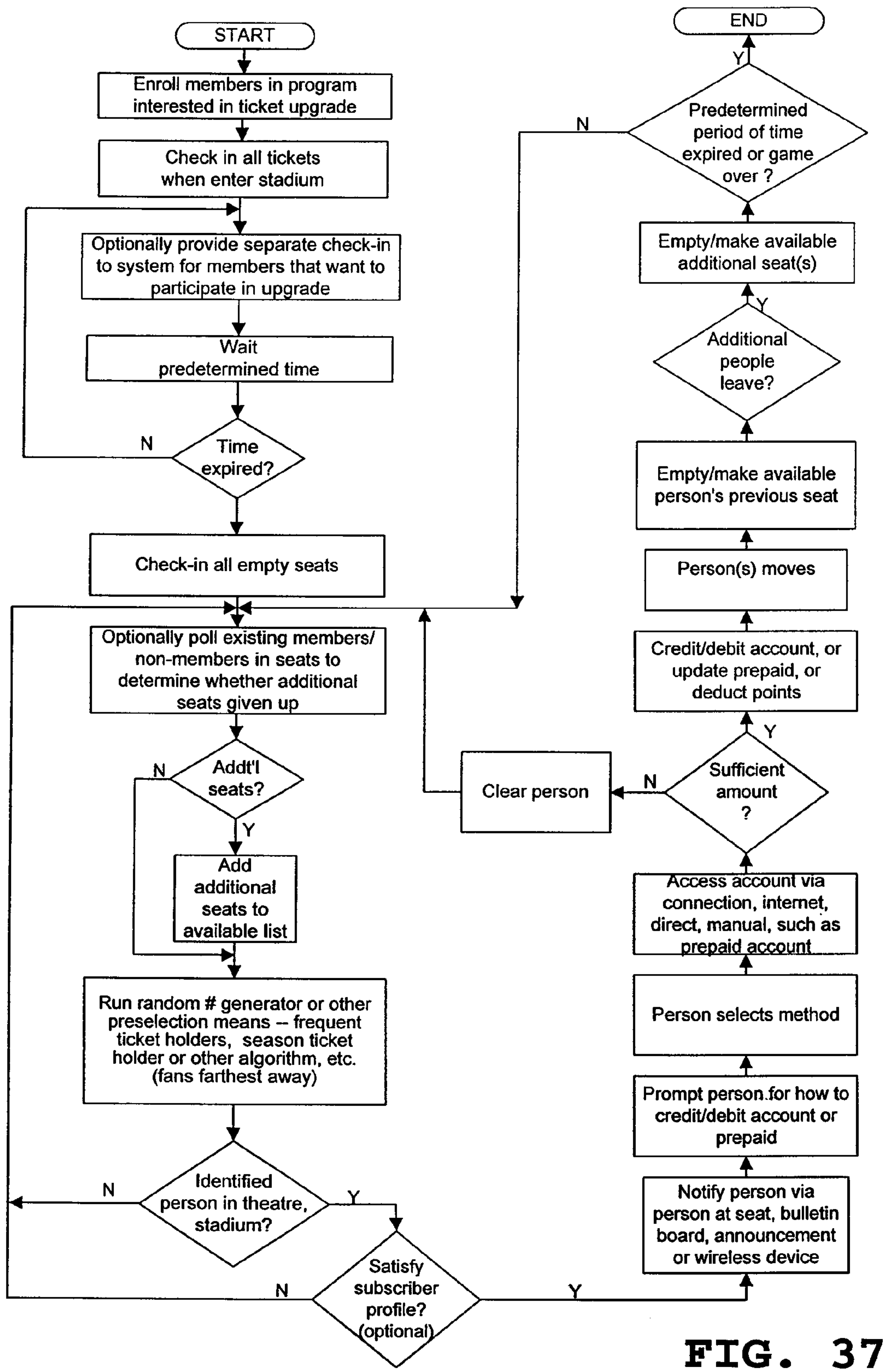

FIG. 37 is a flowchart of a fifteenth embodiment of the invention. In FIG. 37, the process begins by enrolling members in the program that are interested in the ticket upgrade. Tickets are checked in, for example, as the patrons enter the reserved seating area, such as a stadium or theater, through, for example, bar code readers, scanners, infrared readers, and/or manually or other method where the patron is checked in, either at the gate, seat or other location. An optional separate check in area is provided for patrons that want to participate in the upgrade program. For example, patrons can optionally check in a predetermined time before the event through a wireless device, Internet connection, manual or voice recognition telephone, or other manner. The important point is to provide a standard manner for allowing patrons to check in, and if the patron fails to check in using a predetermined procedure, to allow that seat to be provided to another willing patron in accordance with a process to be described below. Currently, such a process is impossible and unthinkable in view of the difficulty reserved seating events have in simply getting the patrons seated prior to the beginning of the event. The present invention represents a revolutionary process to enhance event enjoyment, earn patron loyalty and optionally provide additional revenues to the theater/stadium or optionally other patrons with the desirable ticket.

The check in procedure continues for a predetermined period of time until a predetermined time period has expired, for example, 5 minutes before the event begins, 10 minutes after the event begins, after a predetermined event, such as the second act of a play, and the like. Once the predetermined time period or event has been completed, the check in procedure may be considered completed to begin the seat re-allocation process. To begin the seat re-allocation process, a re-allocation algorithm is used to re-assign seats for patrons that are willing or interested in different or better seats. Such re-allocation processes or algorithms may include a random process, a process where priority patrons are given priority for re-assignment of seat, a process where patrons are willing to pay additional for the re-assignment to either the theater or the individual patron whose seat is being provided to another patron, frequent event patrons, season ticket patrons, a standard bidding process, or other predetermined process.

An optional polling process to poll existing members and non-members in seats to whether additional seats are available. That is, in another optional embodiment of the present invention, non-members may also make their seats available for re-allocation/re-sale at any point in the process. In this additional polling process, the next step is to determine whether additional seats have been made available. If additional seats have been made available, then these additional seats are added to the list of available seats.

If the patron that is identified by the re-allocation process is determined to be present in the theater, for example, via mobile telephone, wireless device, and/or manual verification, an optional sub-process determines whether the patron's optional profile is also satisfied with the available seating. If the optional subscriber profile is not satisfied, then the re-allocation process searches for another possible patron. If the optional profile sub-process is satisfied, then the eligible patron is notified via one or more means, such as announcement, manually, wireless device, mobile telephone, bulletin board, and/or other means. The patron is then notified and presented with the option of moving for free, use of award points, additional money to the theater and/or patron to whose seat is being provided, or other predetermined criteria to obtain the seat. The patron, of course has the option to decline, and if so, the process continues and returns to the re-allocation process to attempt to locate another possible patron.

The patron is prompted for the method of obtaining the tickets, such as a payment method, such as credit card, debit card, cash, point redemption, or optionally a gift/prize. The patron subsequently selects a payment method. The patron's account is debited at a future time, or optionally immediately via connection to a standard clearinghouse network, such as visa network, master card network or other network via direct connection or via the Internet, and the like. If sufficient funds do not exist, then the person is cleared or rejected from the opportunity for the seat re-allocation/upgrade process. If sufficient funds do exist, then the patron's account is debited or points deducted. Alternatively, one person may purchase the upgrade on behalf of another person.

The patron then moves to the new seat, and the system then clears the patron's old seat from the system to optionally provide re-allocation of the previous seat. As indicated previously, if the patron accepts, payment of money or other means may be effectuated on the spot via the wireless device, credit card, debit card, points, and the like, and the patron may now move to the other seat. The patron's seat may then optionally be made available as an empty seat to the re-allocation process. The process then optionally determines whether there have been additional vacancies, for example, just prior to the event, during the event or as a result of predetermined processes, and empties and/or makes available these additional seats for the event. For example, if standard smart card, standard scanner, standard bluetooth, wireless, or other technology is used in the present invention, additional seats may be made available as patrons leave the event early, for example if diverted for an urgent business meeting, and the like. These additional seats may provide additional opportunities for patron satisfaction, revenue (theater or patrons), advertising, advertising sponsorship for banner advertising on the wireless device and/or in the theater, and the like. Thus, scanners posted at strategic locations, for example, at the exit of the theater or stadium will confirm that the patron is leaving, and optionally prompt the patron to confirm that they do not plan on returning. This embodiment may optionally be used in other embodiments of the present invention, and vice versa.

If a predetermined period of time has not expired, then the re-allocation process may be run again to optionally continuously re-allocate seats while advantageously including the additional seats. The patron may optionally store the upgraded ticket on a wireless device for proof of entrance to the better seating area. Optionally, the seat and/or row and/or section, includes a separate reader device to receive optionally the original ticket that is now re-allocated to a better seat, or a new ticket that may optionally be received by the patron via the wireless device and/or manually via a worker in the theater or stadium.

Figure 38:
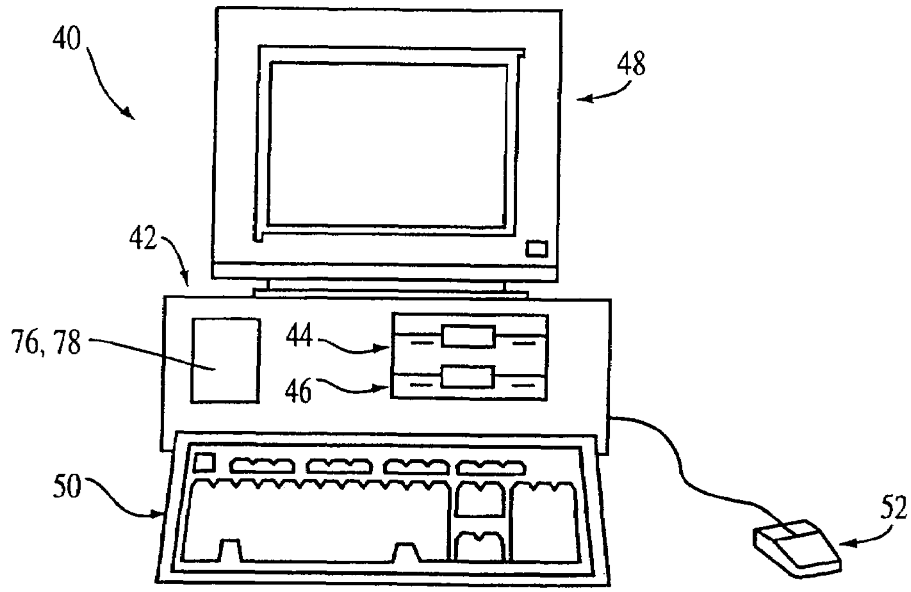
FIG. 38 is an illustration of a main central processing unit for implementing the computer processing in accordance with a computer implemented embodiment of the present invention.

FIG. 38 is an illustration of a main central processing unit for implementing the computer processing in accordance with a computer implemented embodiment of the present invention. The procedures described above may be presented in terms of program procedures executed on, for example, a computer or network of computers.

Viewed externally in FIG. 38, a computer system designated by reference numeral 40 has a central processing unit 42 having disk drives 44 and 46. Disk drive indications 44 and 46 are merely symbolic of a number of disk drives which might be accommodated by the computer system. Typically these would include a floppy disk drive such as 44, a hard disk drive (not shown externally) and a CD ROM indicated by slot 46. The number and type of drives varies, typically with different computer configurations. Disk drives 44 and 46 are in fact optional, and for space considerations, may easily be omitted from the computer system used in conjunction with the production process/apparatus described herein.

The computer also has an optional display 48 upon which information is displayed. In some situations, a keyboard 50 and a mouse 52 may be provided as input devices to interface with the central processing unit 42. Then again, for enhanced portability, the keyboard 50 may be either a limited function keyboard or omitted in its entirety. In addition, mouse 52 may be a touch pad control device, or a track ball device, or even omitted in its entirety as well. In addition, the computer system also optionally includes at least one infrared transmitter 76 and/or infrared receiver 78 for either transmitting and/or receiving infrared signals, as described below.

Figure 39:
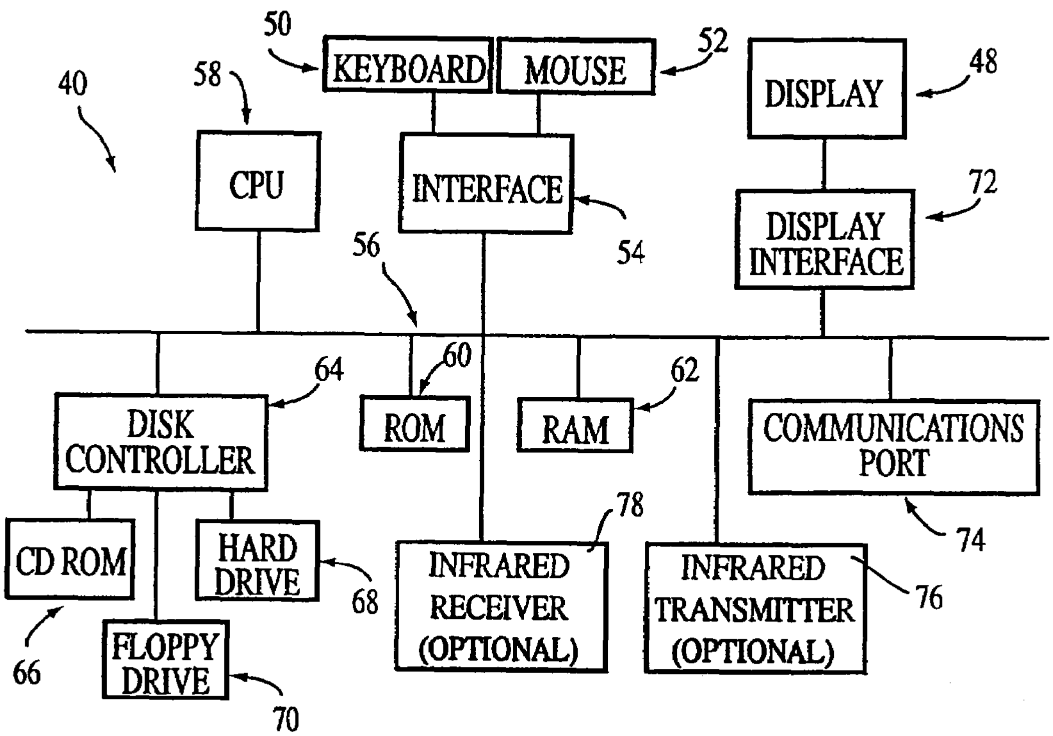
FIG. 39 illustrates a block diagram of the internal hardware of the computer of FIG. 38.

FIG. 39 illustrates a block diagram of the internal hardware of the computer of FIG. 38. A bus 56 serves as the main information highway interconnecting the other components of the computer. CPU 58 is the central processing unit of the system, performing calculations and logic operations required to execute a program. Read only memory (ROM) 60 and random access memory (RAM) 62 constitute the main memory of the computer. Disk controller 64 interfaces one or more disk drives to the system bus 56. These disk drives may be floppy disk drives such as 70, or CD ROM or DVD (digital video disks) drive such as 66, or internal or external hard drives 68. As indicated previously, these various disk drives and disk controllers are optional devices.

A display interface 72 interfaces display 48 and permits information from the bus 56 to be displayed on the display 48. Again as indicated, display 48 is also an optional accessory. For example, display 48 could be substituted or omitted. Communication with external devices, for example, the components of the apparatus described herein, occurs utilizing communication port 74. For example, optical fibers and/or electrical cables and/or conductors and/or optical communication (e.g., infrared, and the like) and/or wireless communication (e.g., radio frequency (RF), and the like) can be used as the transport medium between the external devices and communication port 74.

In addition to the standard components of the computer, the computer also optionally includes at least one of infrared transmitter 76 or infrared receiver 78. Infrared transmitter 76 is utilized when the computer system is used in conjunction with one or more of the processing components/stations that transmits/receives data via infrared signal transmission.

Figure 40:
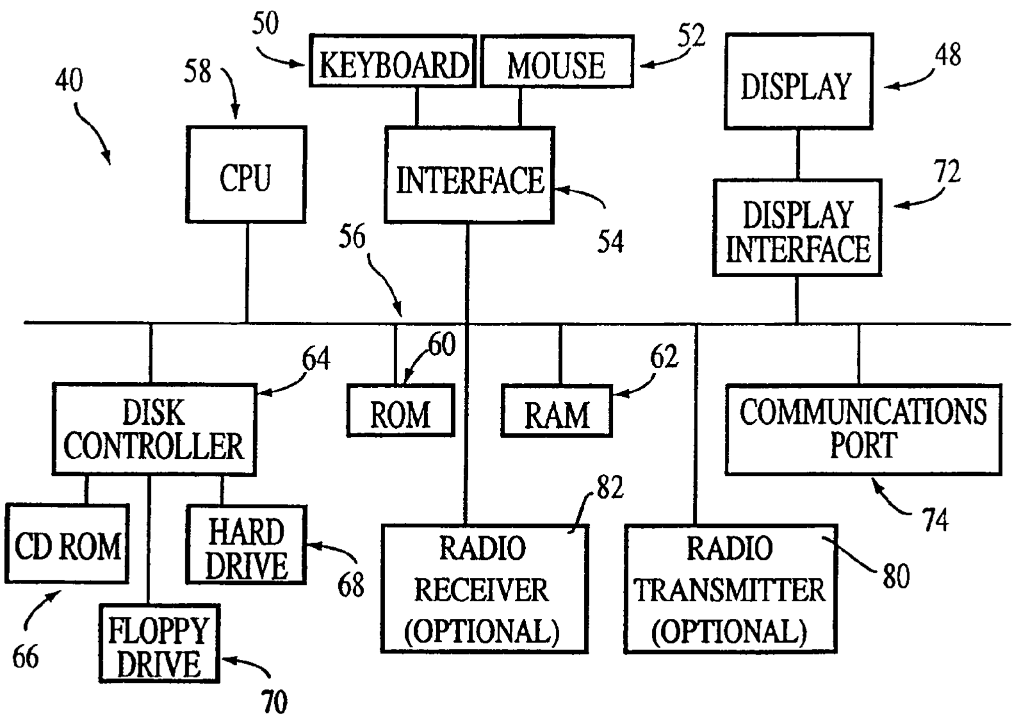
FIG. 40 is a block diagram of the internal hardware of the computer of FIG. 38 in accordance with a second embodiment.

FIG. 40 is a block diagram of the internal hardware of the computer of FIG. 38 in accordance with a second embodiment. In FIG. 40, instead of utilizing an infrared transmitter or infrared receiver, the computer system uses at least one of a low power radio transmitter 80 and/or a low power radio receiver 82. The low power radio transmitter 80 transmits the signal for reception by components of the production process, and receives signals from the components via the low power radio receiver 82. The low power radio transmitter and/or receiver 80, 82 are standard devices in industry.

Figure 41:
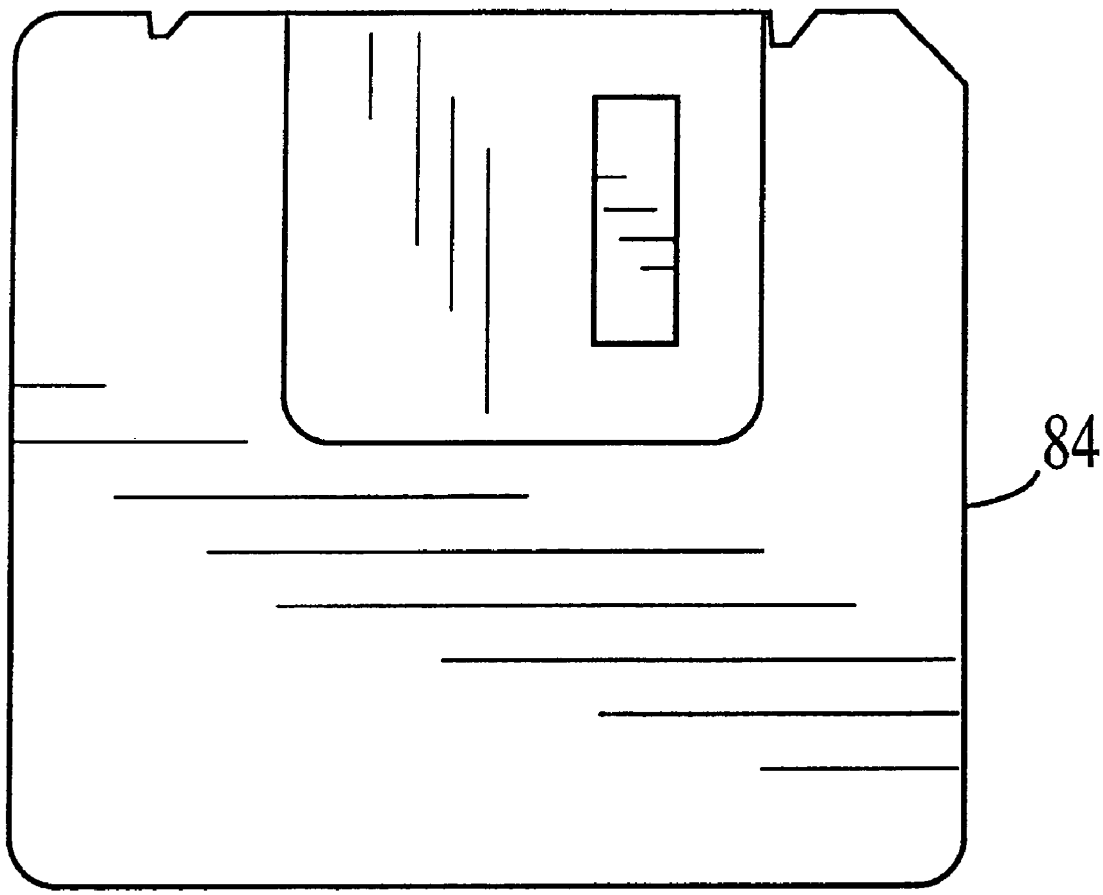
FIG. 41 is an illustration of an exemplary memory medium which can be used with disk drives illustrated in FIGS. 38-40.

FIG. 41 is an illustration of an exemplary memory medium which can be used with disk drives illustrated in FIGS. 38-40. Typically, memory media such as floppy disks, or a CD ROM, or a digital video disk will contain, for example, a multi-byte locale for a single byte language and the program information for controlling the computer to enable the computer to perform the functions described herein. Alternatively, ROM 60 and/or RAM 62 illustrated in FIGS. 37-38 can also be used to store the program information that is used to instruct the central processing unit 58 to perform the operations associated with the production process.

Although processing system 40 is illustrated having a single processor, a single hard disk drive and a single local memory, processing system 40 may suitably be equipped with any multitude or combination of processors or storage devices. Processing system 40 may, in point of fact, be replaced by, or combined with, any suitable processing system operative in accordance with the principles of the present invention, including sophisticated calculators, and hand-held, laptop/notebook, mini, mainframe and super computers, as well as processing system network combinations of the same.

Conventional processing system architecture is more fully discussed in *Computer Organization and Architecture*, by William Stallings, MacMillam Publishing Co. (3rd ed. 1993); conventional processing system network design is more fully discussed in *Data Network Design*, by Darren L. Spohn, McGraw-Hill, Inc. (1993), and conventional data communications is more fully discussed in *Data Communications Principles*, by R. D. Gitlin, J. F. Hayes and S. B. Weinstain, Plenum Press (1992) and in *The Irwin Handbook of Telecommunications*, by James Harry Green, Irwin Professional Publishing (2nd ed. 1992). Each of the foregoing publications is incorporated herein by reference.

Alternatively, the hardware configuration may be arranged according to the multiple instruction multiple data (MIMD) multiprocessor format for additional computing efficiency. The details of this form of computer architecture are disclosed in greater detail in, for example, U.S. Pat. No. 5,163,131; Boxer, A., Where Buses Cannot Go, IEEE Spectrum, February 1995, pp. 41-45; and Barroso, L. A. et al., RPM: A Rapid Prototyping Engine for Multiprocessor Systems, IEEE Computer February 1995, pp. 26-34, all of which are incorporated herein by reference.

In alternate preferred embodiments, the above-identified processor, and in particular microprocessing circuit 58, may be replaced by or combined with any other suitable processing circuits, including programmable logic devices, such as PALs (programmable array logic) and PLAs (programmable logic arrays). DSPs (digital signal processors), FPGAs (field programmable gate arrays), ASICs (application specific integrated circuits), VLSIs (very large scale integrated circuits) or the like.

Figure 42:
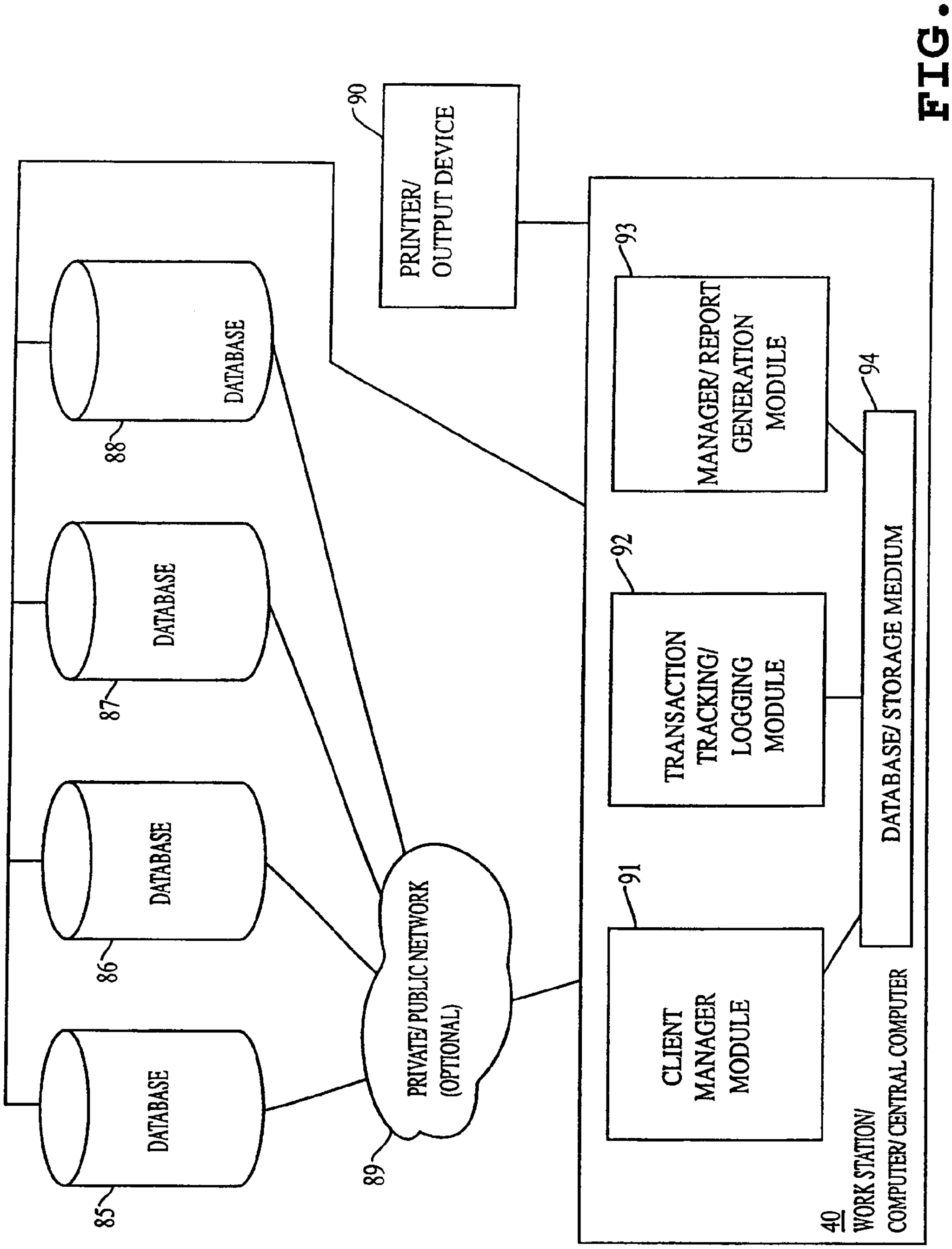
FIG. 42 is an illustration of the functional operation of the main central processing unit illustrated in FIGS. 38-41.

FIG. 42 is an illustration of the functional operation of the main central processing system illustrated in FIGS. 38-41. In FIG. 42, main central processing unit 40 interfaces with various external databases 85-88 to obtain the necessary information for tracking the performance of the resources. Main central processing unit 40 may be hardwired or directly connected to databases 85-88, or alternatively, access databases 85-88 via a private and/or public network 89.

Main central processing unit 40 is connected to an output device 90 for generating the report. The output device 90 may be a printer, or other output device such as a facsimile, electronic mail, and the like. Main central processing unit 40 includes, for example, a client manager module 91, such as Broker's Ally manufactured by Scherrer Resources, Inc. of Philadelphia, Pa. that may be modified to perform the functions described herein.

Main central processing unit 40 includes, for example, a transaction tracking or logging module 92, such as the functionality provided by the Excel Software package manufactured by Microsoft Corporation that may be modified to perform the functions described herein. Main central processing unit 40 also includes, for example, a manager/report generator module 91, such as Axys manufactured by Advent Software, Inc. of San Francisco, Calif., that may be modified to perform the functions described herein. Other suitable software packages are also available that may be modified to perform the functions described herein.

It should be noted that while the above process was described with reference to the figures, in essence, the various steps of the present invention are performed in hardware. Accordingly, each step of the present invention typically generates a physical electrical signal which represents a physical result of a specific step described in the flow charts. The flow charts represent physical electrical signals which are generated and used in subsequent steps of the process. Therefore, the flowcharts represent the transforming of physical electrical signals representing physical characteristics and quantities into other physical electrical signals also representing transformed physical characteristics.

The Internet is not a physical or tangible entity, but rather a giant network which interconnects innumerable smaller groups of linked computer networks. It is thus a network of networks. This is best understood if one considers what a linked group of computers—referred to here as a "network"—is, and what it does. Small networks are now ubiquitous (and are often called "local area networks"). For example, in many United States Courthouses, computers are linked to each other for the purpose of exchanging files and messages (and to share equipment such as printers). These are networks.

Some networks are "closed" networks, not linked to other computers or networks. Many networks, however, are connected to other networks, which are in turn connected to other networks in a manner which permits each computer in any network to communicate with computers on any other network in the system. This global Web of linked networks and computers is referred to as the Internet.

The nature of the Internet is such that it is very difficult, if not impossible, to determine its size at a given moment. It is indisputable, however, that the Internet has experienced extraordinary growth in recent years. In 1981, fewer than 300 computers were linked to the Internet, and by 1989, the number stood at fewer than 90,000 computers. By 1993, over 1,000,000 computers were linked. Today, over 9,400,000 host computers worldwide, of which approximately 60 percent located within the United States, are estimated to be linked to the Internet. This count does not include the personal computers people use to access the Internet using modems. In all, reasonable estimates are that as many as 40 million people around the world can and do access the enormously flexible communication Internet medium. That figure is expected to grow to 200 million Internet users by the year 1999.

Some of the computers and computer networks that make up the Internet are owned by governmental and public institutions, some are owned by non-profit organizations, and some are privately owned. The resulting whole is a decentralized, global medium of communications—or "cyberspace"—that links people, institutions, corporations, and governments around the world. The Internet is an international system. This communications medium allows any of the literally tens of millions of people with access to the Internet to exchange information. These communications can occur almost instantaneously, and can be directed either to specific individuals, to a broader group of people interested in a particular subject, or to the world as a whole.

The Internet had its origins in 1969 as an experimental project of the Advanced Research Project Agency ("ARPA"), and was called ARPANET. This network linked computers and computer networks owned by the military, defense contractors, and university laboratories conducting defense-related research. The network later allowed researchers across the country to access directly and to use extremely powerful supercomputers located at a few key universities and laboratories. As it evolved far beyond its research origins in the United States to encompass universities, corporations, and people around the world, the ARPANET came to be called the "DARPA Internet," and finally just the "Internet."

From its inception, the network was designed to be a decentralized, self-maintaining series of redundant links between computers and computer networks, capable of rapidly transmitting communications without direct human involvement or control, and with the automatic ability to re-route communications if one or more individual links were damaged or otherwise unavailable. Among other goals, this redundant system of linked computers was designed to allow vital research and communications to continue even if portions of the network were damaged, say, in a war.

To achieve this resilient nationwide (and ultimately global) communications medium, the ARPANET encouraged the creation of multiple links to and from each computer (or computer network) on the network. Thus, a computer located in Washington, D.C., might be linked (usually using dedicated telephone lines) to other computers in neighboring states or on the Eastern seaboard. Each of those computers could in turn be linked to other computers, which themselves would be linked to other computers.

A communication sent over this redundant series of linked computers could travel any of a number of routes to its destination. Thus, a message sent from a computer in Washington, D.C., to a computer in Palo Alto, Calif., might first be sent to a computer in Philadelphia, and then be forwarded to a computer in Pittsburgh, and then to Chicago, Denver, and Salt Lake City, before finally reaching Palo Alto. If the message could not travel along that path (because of military attack, simple technical malfunction, or other reason), the message would automatically (without human intervention or even knowledge) be re-routed, perhaps, from Washington, D.C. to Richmond, and then to Atlanta, New Orleans, Dallas, Albuquerque, Los Angeles, and finally to Palo Alto. This type of transmission, and re-routing, would likely occur in a matter of seconds.

Messages between computers on the Internet do not necessarily travel entirely along the same path. The Internet uses "packet switching" communication protocols that allow individual messages to be subdivided into smaller "packets" that are then sent independently to the destination, and are then automatically reassembled by the receiving computer. While all packets of a given message often travel along the same path to the destination, if computers along the route become overloaded, then packets can be re-routed to less loaded computers.

At the same time that ARPANET was maturing (it subsequently ceased to exist), similar networks developed to link universities, research facilities, businesses, and individuals around the world. These other formal or loose networks included BITNET, CSNET, FIDONET, and USENET. Eventually, each of these networks (many of which overlapped) were themselves linked together, allowing users of any computers linked to any one of the networks to transmit communications to users of computers on other networks. It is this series of linked networks (themselves linking computers and computer networks) that is today commonly known as the Internet.

No single entity—academic, corporate, governmental, or non-profit—administers the Internet. It exists and functions as a result of the fact that hundreds of thousands of separate operators of computers and computer networks independently decided to use common data transfer protocols to exchange communications and information with other computers (which in turn exchange communications and information with still other computers). There is no centralized storage location, control point, or communications channel for the Internet, and it would not be technically feasible for a single entity to control all of the information conveyed on the Internet.

How Individuals Access the Internet

Individuals have a wide variety of avenues to access cyberspace in general, and the Internet in particular. In terms of physical access, there are two common methods to establish an actual link to the Internet. First, one can use a computer or computer terminal that is directly (and usually permanently) connected to a computer network that is itself directly or indirectly connected to the Internet. Second, one can use a "personal computer" with a "modem" to connect over a telephone line to a larger computer or computer network that is itself directly or indirectly connected to the Internet. As detailed below, both direct and modem connections are made available to people by a wide variety of academic, governmental, or commercial entities.

Students, faculty, researchers, and others affiliated with the vast majority of colleges and universities in the United States can access the Internet through their educational institutions. Such access is often via direct connection using computers located in campus libraries, offices, or computer centers, or may be through telephone access using a modem from a student's or professors campus or off-campus location. Some colleges and universities install "ports" or outlets for direct network connections in each dormitory room or provide access via computers located in common areas in dormitories. Such access enables students and professors to use information and content provided by the college or university itself, and to use the vast amount of research resources and other information available on the Internet worldwide.

Similarly, Internet resources and access are sufficiently important to many corporations and other employers that those employers link their office computer networks to the Internet and provide employees with direct or modem access to the office network (and thus to the Internet). Such access might be used by, for example, a corporation involved in scientific or medical research or manufacturing to enable corporate employees to exchange information and ideas with academic researchers in their fields.

Those who lack access to the Internet through their schools or employers still have a variety of ways they can access the Internet. Many communities across the country have established "free-nets" or community networks to provide their citizens with a local link to the Internet (and to provide local-oriented content and discussion groups). The first such community network, the Cleveland Free-Net Community Computer System, was established in 1986, and free-nets now exist in scores of communities as diverse as Richmond, Virginia, Tallahassee, Florida, Seattle, Wash., and San Diego, Calif. Individuals typically can access free-nets at little or no cost via modem connection or by using computers available in community buildings. Free-nets are often operated by a local library, educational institution, or non-profit community group.

Individuals can also access the Internet through many local libraries. Libraries often offer patrons use of computers that are linked to the Internet. In addition, some libraries offer telephone modem access to the libraries' computers, which are themselves connected to the Internet. Increasingly, patrons now use library services and resources without ever physically entering the library itself. Libraries typically provide such direct or modem access at no cost to the individual user.

Individuals can also access the Internet by patronizing an increasing number of storefront "computer coffee shops," where customers—while they drink their coffee—can use computers provided by the shop to access the Internet. Such Internet access is typically provided by the shop for a small hourly fee.

Individuals can also access the Internet through commercial and non-commercial "Internet service providers" that typically offer modem telephone access to a computer or computer network linked to the Internet. Many such providers are commercial entities offering Internet access for a monthly or hourly fee. Some Internet service providers, however, are non-profit organizations that offer free or very low cost access to the Internet. For example, the International Internet Association offers free modem access to the Internet upon request. Also, a number of trade or other non-profit associations offer Internet access as a service to members.

Another common way for individuals to access the Internet is through one of the major national commercial "online services" such as America Online, CompuServe, the Microsoft Network, or Prodigy. These online services offer nationwide computer networks (so that subscribers can dial-in to a local telephone number), and the services provide extensive and well organized content within their own proprietary computer networks. In addition to allowing access to the extensive content available within each online service, the services also allow subscribers to link to the much larger resources of the Internet. Full access to the online service (including access to the Internet) can be obtained for modest monthly or hourly fees. The major commercial online services have almost twelve million individual subscribers across the United States.

In addition to using the national commercial online services, individuals can also access the Internet using some (but not all) of the thousands of local dial-in computer services, often called "bulletin board systems" or "BBSs." With an investment of as little as $2,000.00 and the cost of a telephone line, individuals, non-profit organizations, advocacy groups, and businesses can offer their own dial-in computer "bulletin board" service where friends, members, subscribers, or customers can exchange ideas and information. BBSs range from single computers with only one telephone line into the computer (allowing only one user at a time), to single computers with many telephone lines into the computer (allowing multiple simultaneous users), to multiple linked computers each servicing multiple dial-in telephone lines (allowing multiple simultaneous users). Some (but not all) of these BBS systems offer direct or indirect links to the Internet. Some BBS systems charge users a nominal fee for access, while many others are free to the individual users.

Although commercial access to the Internet is growing rapidly, many users of the Internet—such as college students and staff—do not individually pay for access (except to the extent, for example, that the cost of computer services is a component of college tuition). These and other Internet users can access the Internet without paying for such access with a credit card or other form of payment.

Methods to Communicate Over the Internet

Once one has access to the Internet, there are a wide variety of different methods of communication and information exchange over the network. These many methods of communication and information retrieval are constantly evolving and are therefore difficult to categorize concisely. The most common methods of communications on the Internet (as well as within the major online services) can be roughly grouped into six categories:

(1) one-to-one messaging (such as "e-mail"), (2) one-to-many messaging (such as "listserv"), (3) distributed message databases (such as "USENET newsgroups"), (4) real time communication (such as "Internet Relay Chat"), (5) real time remote computer utilization (such as "telnet"), (6) remote information retrieval (such as "ftp," "gopher," and the "World Wide Web").

Most of these methods of communication can be used to transmit text, data, computer programs, sound, visual images (i.e., pictures), and moving video images.

One-to-one messaging. One method of communication on the Internet is via electronic mail, or "e-mail," comparable in principle to sending a first class letter. One can address and transmit a message to one or more other people. E-mail on the Internet is not routed through a central control point, and can take many and varying paths to the recipients. Unlike postal mail, simple e-mail generally is not "sealed" or secure, and can be accessed or viewed on intermediate computers between the sender and recipient (unless the message is encrypted).

One-to-many messaging. The Internet also contains automatic mailing list services (such as "listservs"), that allow communications about particular subjects of interest to a group of people. For example, people can subscribe to a "listserv" mailing list on a particular topic of interest to them. The subscriber can submit messages on the topic to the listserv that are forwarded (via e-mail), either automatically or through a human moderator overseeing the listserv, to anyone who has subscribed to the mailing list. A recipient of such a message can reply to the message and have the reply also distributed to everyone on the mailing list. This service provides the capability to keep abreast of developments or events in a particular subject area.

Most listserv-type mailing lists automatically forward all incoming messages to all mailing list subscribers. There are thousands of such mailing list services on the Internet, collectively with hundreds of thousands of subscribers. Users of "open" listservs typically can add or remove their names from the mailing list automatically, with no direct human involvement. Listservs may also be "closed," i.e., only allowing for one's acceptance into the listserv by a human moderator.

Distributed message databases. Similar in function to listservs—but quite different in how communications are transmitted—are distributed message databases such as "USENET newsgroups." User-sponsored newsgroups are among the most popular and widespread applications of Internet services, and cover all imaginable topics of interest to users. Like listservs, newsgroups are open discussions and exchanges on particular topics. Users, however, need not subscribe to the discussion mailing list in advance, but can instead access the database at any time. Some USENET newsgroups are "moderated" but most are open access. For the moderated newsgroups, n10 all messages to the newsgroup are forwarded to one person who can screen them for relevance to the topics under discussion. USENET newsgroups are disseminated using ad hoc, peer to peer connections between approximately 200,000 computers (called USENET "servers") around the world. For unmoderated newsgroups, when an individual user with access to a USENET server posts a message to a newsgroup, the message is automatically forwarded to all adjacent USENET servers that furnish access to the newsgroup, and it is then propagated to the servers adjacent to those servers, etc. The messages are temporarily stored on each receiving server, where they are available for review and response by individual users. The messages are automatically and periodically purged from each system after a time to make room for new messages. Responses to messages, like the original messages, are automatically distributed to all other computers receiving the newsgroup or forwarded to a moderator in the case of a moderated newsgroup. The dissemination of messages to USENET servers around the world is an automated process that does not require direct human intervention or review.

There are newsgroups on more than fifteen thousand different subjects. In 1994, approximately 70,000 messages were posted to newsgroups each day, and those messages were distributed to the approximately 190,000 computers or computer networks that participate in the USENET newsgroup system. Once the messages reach the approximately 190,000 receiving computers or computer networks, they are available to individual users of those computers or computer networks. Collectively, almost 100,000 new messages (or "articles") are posted to newsgroups each day.

Real time communication. In addition to transmitting messages that can be later read or accessed, individuals on the Internet can engage in an immediate dialog, in "real time", with other people on the Internet. In its simplest forms, "talk" allows one-to-one communications and "Internet Relay Chat" (or IRC) allows two or more to type messages to each other that almost immediately appear on the others' computer screens. IRC is analogous to a telephone party line, using a computer and keyboard rather than a telephone. With IRC, however, at any one time there are thousands of different party lines available, in which collectively tens of thousands of users are engaging in conversations on a huge range of subjects. Moreover, one can create a new party line to discuss a different topic at any time. Some IRC conversations are "moderated" or include "channel operators."

In addition, commercial online services such as America Online, CompuServe, the Microsoft Network, and Prodigy have their own "chat" systems allowing their members to converse.

Real time remote computer utilization. Another method to use information on the Internet is to access and control remote computers in "real time" using "telnet." For example, using telnet, a researcher at a university would be able to use the computing power of a supercomputer located at a different university. A student can use telnet to connect to a remote library to access the library's online card catalog program.

Remote information retrieval. The final major category of communication may be the most well known use of the Internet—the search for and retrieval of information located on remote computers. There are three primary methods to locate and retrieve information on the Internet.

A simple method uses "ftp" (or file transfer protocol) to list the names of computer files available on a remote computer, and to transfer one or more of those files to an individual's local computer.

Another approach uses a program and format named "gopher" to guide an individual's search through the resources available on a remote computer.

The World Wide Web

A third approach, and fast becoming the most well-known on the Internet, is the "World Wide Web." The Web utilizes a "hypertext" formatting language called hypertext markup language (HTML), and programs that "browse" the Web can display HTML documents containing text, images, sound, animation and moving video. Any HTML document can include links to other types of information or resources, so that while viewing an HTML document that, for example, describes resources available on the Internet, one can "click" using a computer mouse on the description of the resource and be immediately connected to the resource itself. Such "hyperlinks" allow information to be accessed and organized in very flexible ways, and allow people to locate and efficiently view related information even if the information is stored on numerous computers all around the world.

Purpose. The World Wide Web (W3C) was created to serve as the platform for a global, online store of knowledge, containing information from a diversity of sources and accessible to Internet users around the world. Though information on the Web is contained in individual computers, the fact that each of these computers is connected to the Internet through W3C protocols allows all of the information to become part of a single body of knowledge. It is currently the most advanced information system developed on the Internet, and embraces within its data model most information in previous networked information systems such as ftp, gopher, wais, and Usenet.

History. W3C was originally developed at CERN, the European Particle Physics Laboratory, and was initially used to allow information sharing within internationally dispersed teams of researchers and engineers. Originally aimed at the High Energy Physics community, it has spread to other areas and attracted much interest in user support, resource recovery, and many other areas which depend on collaborative and information sharing. The Web has extended beyond the scientific and academic community to include communications by individuals, non-profit organizations, and businesses.

Basic Operation. The World Wide Web is a series of documents stored in different computers all over the Internet. Documents contain information stored in a variety of formats, including text, still images, sounds, and video. An essential element of the Web is that any document has an address (rather like a telephone number). Most Web documents contain "links." These are short sections of text or image which refer to another document. Typically the linked text is blue or underlined when displayed, and when selected by the user, the referenced document is automatically displayed, wherever in the world it actually is stored. Links for example are used to lead from overview documents to more detailed documents, from tables of contents to particular pages, but also as cross-references, footnotes, and new forms of information structure.

Many organizations now have "home pages" on the Web. These are documents which provide a set of links designed to represent the organization, and through links from the home page, guide the user directly or indirectly to information about or relevant to that organization. As an example of the use of links a home page might contain links such as those:

THE NATURE OF CYBERSPACE

CREATION OF THE INTERNET AND THE DEVELOPMENT OF CYBERSPACE

HOW PEOPLE ACCESS THE INTERNET

METHODS TO COMMUNICATE OVER THE INTERNET

Links may take the user from the original Web site to another Web site on another computer connected to the Internet. These links from one computer to another, from one document to another across the Internet, are what unify the Web into a single body of knowledge, and what makes the Web unique. The Web was designed with a maximum target time to follow a link of one tenth of a second.

Publishing. The World Wide Web exists fundamentally as a platform through which people and organizations can communicate through shared information. When information is made available, it is said to be "published" on the Web. Publishing on the Web simply requires that the "publisher" has a computer connected to the Internet and that the computer is running W3C server software. The computer can be as simple as a small personal computer costing less than $1500 dollars or as complex as a multi-million dollar mainframe computer. Many Web publishers choose instead to lease disk storage space from someone else who has the necessary computer facilities, eliminating the need for actually owning any equipment oneself.

The Web, as a universe of network accessible information, contains a variety of documents prepared with quite varying degrees of care, from the hastily typed idea, to the professionally executed corporate profile. The power of the Web stems from the ability of a link to point to any document, regardless of its status or physical location.

Information to be published on the Web must also be formatted according to the rules of the Web standards. These standardized formats assure that all Web users who want to read the material will be able to view it. Web standards are sophisticated and flexible enough that they have grown to meet the publishing needs of many large corporations, banks, brokerage houses, newspapers and magazines which now publish "online" editions of their material, as well as government agencies, and even courts, which use the Web to disseminate information to the public. At the same time, Web publishing is simple enough that thousands of individual users and small community organizations are using the Web to publish their own personal "home pages," the equivalent of individualized newsletters about that person or organization, which are available to everyone on the Web.

Web publishers have a choice to make their Web sites open to the general pool of all Internet users, or close them, thus making the information accessible only to those with advance authorization. Many publishers choose to keep their sites open to all in order to give their information the widest potential audience. In the event that the publishers choose to maintain restrictions on access, this may be accomplished by assigning specific user names and passwords as a prerequisite to access to the site. Or, in the case of Web sites maintained for internal use of one organization, access will only be allowed from other computers within that organization's local network.

Searching the Web. A variety of systems have developed that allow users of the Web to search particular information among all of the public sites that are part of the Web. Services such as Yahoo, Magellan, Altavista, Webcrawler, and Lycos are all services known as "search engines" which allow users to search for Web sites that contain certain categories of information, or to search for key words. For example, a Web user looking for the text of Supreme Court opinions would type the words "Supreme Court" into a search engine, and then be presented with a list of World Wide Web sites that contain Supreme Court information. This list would actually be a series of links to those sites. Having searched out a number of sites that might contain the desired information, the user would then follow individual links, browsing through the information on each site, until the desired material is found. For many content providers on the Web, the ability to be found by these search engines is very important.

Common standards. The Web links together disparate information on an ever-growing number of Internet-linked computers by setting common information storage formats (HTML) and a common language for the exchange of Web documents (HTTP). Although the information itself may be in many different formats, and stored on computers which are not otherwise compatible, the basic Web standards provide a basic set of standards which allow communication and exchange of information. Despite the fact that many types of computers are used on the Web, and the fact that many of these machines are otherwise incompatible, those who "publish" information on the Web are able to communicate with those who seek to access information with little difficulty because of these basic technical standards.

A distributed system with no centralized control. Running on tens of thousands of individual computers on the Internet, the Web is what is known as a distributed system. The Web was designed so that organizations with computers containing information can become part of the Web simply by attaching their computers to the Internet and running appropriate World Wide Web software. No single organization controls any membership in the Web, nor is there any single centralized point from which individual Web sites or services can be blocked from the Web. From a users perspective, it may appear to be a single, integrated system, but in reality it has no centralized control point.

Contrast to closed databases. The Web's open, distributed, decentralized nature stands in sharp contrast to most information systems that have come before it. Private information services such as Westlaw, Lexis/Nexis, and Dialog, have contained large storehouses of knowledge, and can be accessed from the Internet with the appropriate passwords and access software. However, these databases are not linked together into a single whole, as is the World Wide Web.

Success of the Web in research, education, and political activities. The World Wide Web has become so popular because of its open, distributed, and easy-to-use nature. Rather than requiring those who seek information to purchase new software or hardware, and to learn a new kind of system for each new database of information they seek to access, the Web environment makes it easy for users to jump from one set of information to another. By the same token, the open nature of the Web makes it easy for publishers to reach their intended audiences without having to know in advance what kind of computer each potential reader has, and what kind of software they will be using.

The Internet is not exclusively, or even primarily, a means of commercial communication. Many commercial entities maintain Web sites to inform potential consumers about their goods and services, or to solicit purchases, but many other Web sites exist solely for the dissemination of non-commercial information. The other forms of Internet communication—e-mail, bulletin boards, newsgroups, and chat rooms—frequently have non-commercial goals. For the economic and technical reasons set forth in the following paragraphs, the Internet is an especially attractive means for not-for-profit entries or public interest groups to reach their desired audiences. Human Rights Watch, Inc., offers information on its Internet site regarding reported human rights abuses around the world. National Writers Union provides a forum for writers on issues of concern to them. Stop Prisoner Rape, Inc., posts text, graphics, and statistics regarding the incidence and prevention of rape in prisons. Critical Path AIDS Project, Inc., offers information on safer sex, the transmission of HIV, and the treatment of AIDS.

Such diversity of content on the Internet is possible because the Internet provides an easy and inexpensive way for a speaker to reach a large audience, potentially of millions. The start-up and operating costs entailed by communication on the Internet are significantly lower than those associated with use of other forms of mass communication, such as television, radio, newspapers, and magazines. This enables operation of their own Web sites not only by large companies, such as Microsoft and Time Warner, but also by small, not-for-profit groups, such as Stop Prisoner Rape and Critical Path AIDS Project. Commercial online services such as America Online allow subscribers to create Web pages free of charge. Any Internet user can communicate by posting a message to one of the thousands of newsgroups and bulletin boards or by engaging in an on-line "chat", and thereby reach an audience worldwide that shares an interest in a particular topic.

The ease of communication through the Internet is facilitated by the use of hypertext markup language (HTML), which allows for the creation of "hyperlinks" or "links". HTML enables a user to jump from one source to other related sources by clicking on the link. A link might take the user from Web site to Web site, or to other files within a particular Web site. Similarly, by typing a request into a search engine, a user can retrieve many different sources of content related to the search that the creators of the engine have collected.

Through the use of HTML, for example, Critical Path and Stop Prisoner Rape link their Web sites to several related databases, and a user can immediately jump from the home pages of these organizations to the related databases simply by clicking on a link. America Online creates chat rooms for particular discussions but also allows subscribers to create their own chat rooms. Similarly, a newsgroup gathers postings on a particular topic and distributes them to the newsgroup's subscribers. Users of the Carnegie Library can read on-line versions of Vanity Fair and Playboy, and America Online's subscribers can peruse the New York Times, Boating, and other periodicals. Critical Path, Stop Prisoner Rape, America Online and the Carnegie Library all make available content of other speakers over whom they have little or no editorial control.

Because of the different forms of Internet communication, a user of the Internet may speak or listen interchangeably, blurring the distinction between "speakers" and "listeners" on the Internet. Chat rooms, e-mail, and newsgroups are interactive forms of communication, providing the user with the opportunity both to speak and to listen.

It follows that unlike traditional media, the barriers to entry as a speaker on the Internet do not differ significantly from the barriers to entry as a listener. Once one has entered cyberspace, one may engage in the dialogue that occurs there. In the argot of the medium, the receiver can and does become the content provider, and vice-versa. The Internet is therefore a unique and wholly new medium of worldwide human communication.

Once a provider posts content on the Internet, it is available to all other Internet users worldwide. Similarly, once a user posts a message to a newsgroup or bulletin board, that message becomes available to all subscribers to that newsgroup or bulletin board. Once a provider posts its content on the Internet, it cannot prevent that content from entering any community. Unlike the newspaper, broadcast station, or cable system, Internet technology necessarily gives a speaker a potential worldwide audience. Because the Internet is a network of networks any network connected to the Internet has the capacity to send and receive information to any other network. Hotwired Ventures, for example, cannot prevent its materials on mixology from entering communities that have no interest in that topic.

It takes several steps to enter cyberspace. At the most fundamental level, a user must have access to a computer with the ability to reach the Internet (typically by way of a modem). A user must then direct the computer to connect with the access provider, enter a password, and enter the appropriate commands to find particular data. On the World Wide Web, a user must normally use a search engine or enter an appropriate address. Similarly, accessing newsgroups, bulletin boards, and chat rooms requires several steps.

Unlike other forms of communication on the Internet, there is technology by which an operator of a World Wide Web server may interrogate a user of a Web site. An HTML document can include a fill-in-the-blank "form" to request information from a visitor to a Web site, and this information can be transmitted back to the Web server and be processed by a computer program, usually a Common Gateway Interface (cgi) script. The Web server could then grant or deny access to the information sought. The cgi script is the means by which a Web site can process a fill-in form and thereby screen visitors by requesting a credit card number or adult password.

A large percentage, perhaps 40% or more, of content on the Internet originates outside the United States. An Internet user could access a Web site of London (which presumably is on a server in England), and then link to other sites of interest in England. A user can sometimes discern from a URL that content is coming from overseas, since InterNIC allows a content provider to imbed a country code in a domain name. Foreign content is otherwise indistinguishable from domestic content (as long as it is in English), since foreign speech is created, named, and posted in the same manner as domestic speech. There is no requirement that foreign speech contain a country code in its URL.

The use of "caching" makes it difficult to determine whether the material originated from foreign or domestic sources. Because of the high cost of using the trans-Atlantic and trans-Pacific cables, and because the high demand on those cables leads to bottleneck delays, content is often "cached", or temporarily stored, on servers in the United States. Material from a foreign source in Europe can travel over the trans-Alantic cable to the receiver in the United States, and pass through a domestic caching server which then stores a copy for subsequent retrieval. This domestic caching server, rather than the original foreign server, will send the material from the cache to the subsequent receivers, without placing a demand on the trans-oceanic cables. This shortcut effectively eliminates most of the distance for both the request and the information and, hence, most of the delay. The caching server discards the stored information according to its configuration (e.g., after a certain time or as the demand for the information diminishes). Caching therefore advances core Internet values: the cheap and speedy retrieval of information.

Caching is not merely an international phenomenon. Domestic content providers store popular domestic material on their caching servers to avoid the delay of successive searches for the same material and to decrease the demand on their Internet connection. America Online can cache the home page of the New York Times on its servers when a subscriber first requests it, so that subsequent subscribers who make the same request will receive the same home page, but from America Online's caching service rather than from the New York Times's server.

Figure 43:
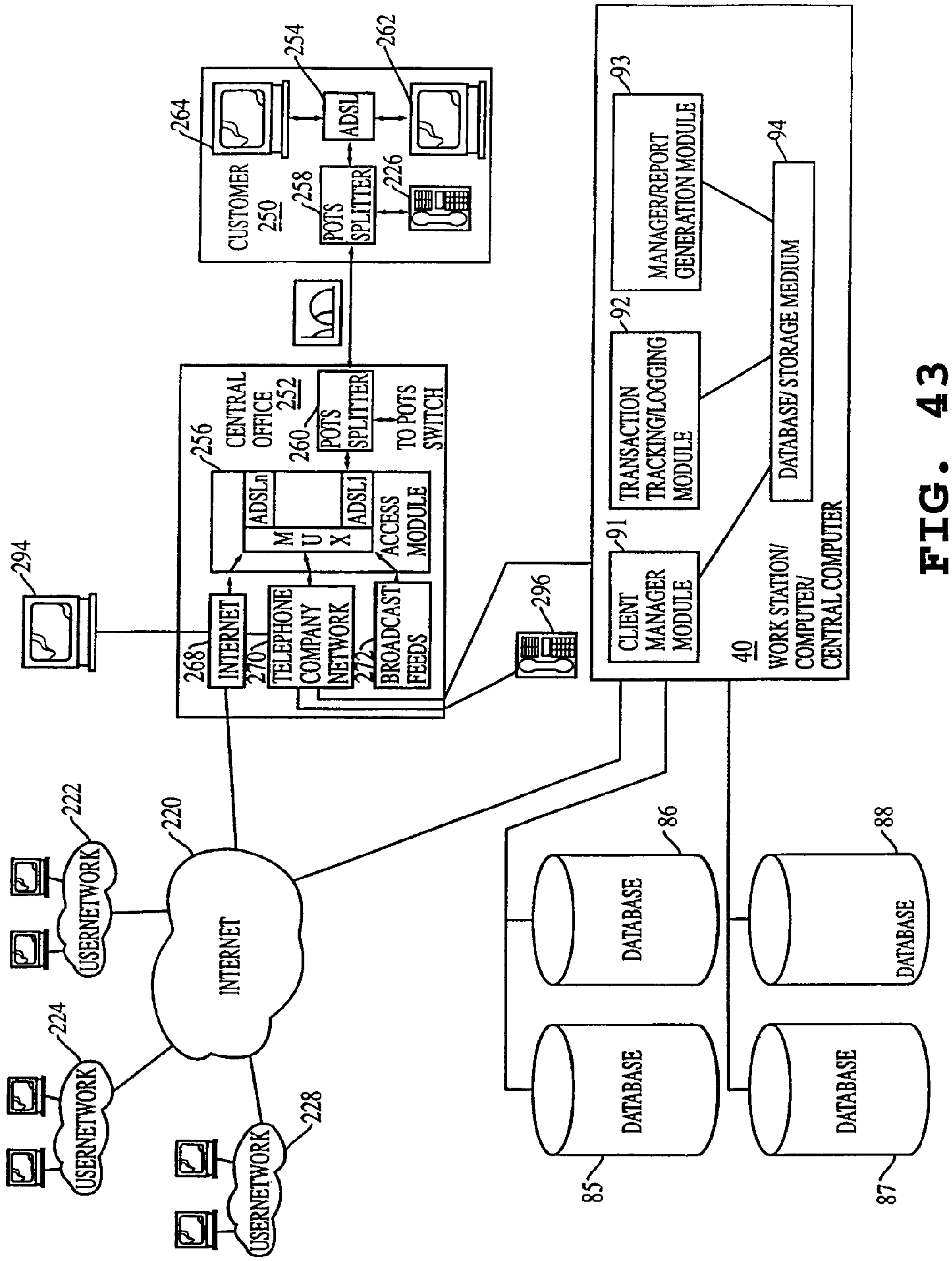
FIG. 43 is a block diagram of an alternative computer system suitable for implementing the invention.

FIG. 43 is an illustration of the architecture of the combined internet, POTS, and ADSL architecture for use in the present invention in accordance with a first embodiment. In FIG. 43, to preserve POTS and to prevent a fault in the ADSL equipment 254, 256 from compromising analog voice traffic 226, 296 the voice part of the spectrum (the lowest 4 kHz) is separated from the rest by a passive filter, called a POTS splitter 258, 260. The rest of the available bandwidth—from about 10 kHz to 1 MHZ—carries data at rates up to 6 bits per second for every hertz of bandwidth from data equipment 262, 264, 294. The ADSL equipment 256 then has access to a number of destinations including significantly the Internet 268, and other destinations 270, 272.

To exploit the higher frequencies, ADSL makes use of advanced modulation techniques, of which the best known is the discrete multitone (DMT) technology. As its name implies, ADSL transmits data asymmetrically—at different rates upstream toward the central office 252 and downstream toward the subscriber 250.

Cable television providers are providing analogous Internet service to PC users over their TV cable systems by means of special cable modems. Such modems are capable of transmitting up to 30 Mb/s over hybrid fiber/coax systems, which use fiber to bring signals to a neighborhood and coax to distribute it to individual subscribers.

Cable modems come in many forms. Most create a downstream data stream out of one of the 6-MHZ TV channels that occupy spectrum above 50 MHZ (and more likely 550 MHZ) and carve an upstream channel out of the 5-50-MHZ band, which is currently unused. Using 64-state quadrature amplitude modulation (64 QAM), a downstream channel can realistically transmit about 30 Mb/s (the off-quoted lower speed of 10 Mb/s refers to PC rates associated with Ethernet connections). Upstream rates differ considerably from vendor to vendor, but good hybrid fiber/coax systems can deliver upstream speeds of a few megabits per second. Thus, like ADSL, cable modems transmit much more information downstream than upstream.

The internet architecture 220 and ADSL architecture 354, 356 may also be combined with, for example, user networks 222, 224, and 228. As illustrated in this first embodiment, users may access or use or participate in the administration, management computer assisted program in computer 40 via various different access methods. In this first embodiment, the various databases are only accessible via access to and/or by computer system 40.

Figure 44:
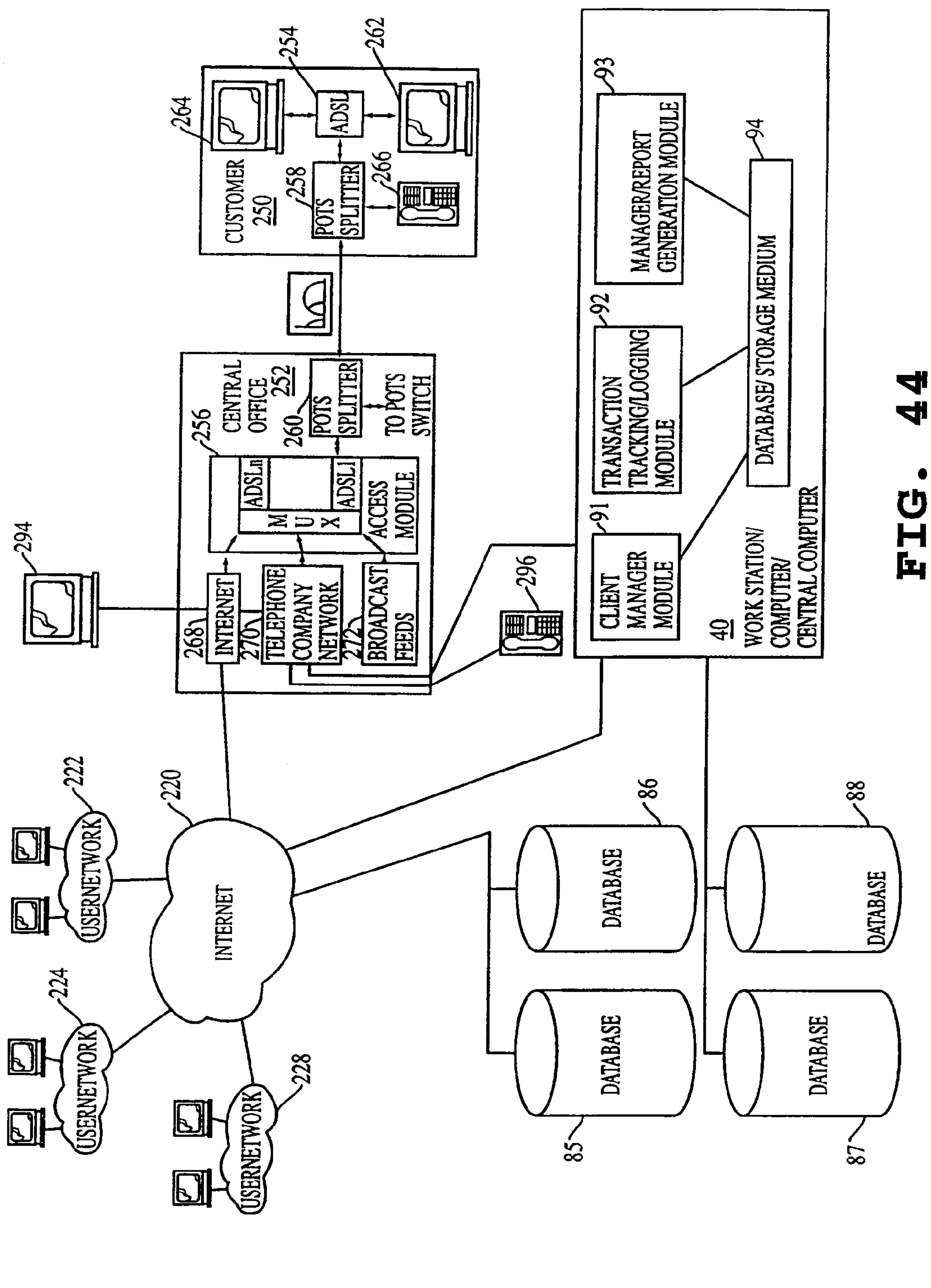
FIG. 44 is a block diagram showing a portion of the computer system of FIG. 43 in more detail.

FIG. 44 is an illustration of the architecture of the combined internet, POTS, and ADSL architecture for use in the present invention in accordance with a second embodiment. As illustrated in this second embodiment, users may access or use or participate in the administration, management computer assisted program in computer 40 via various different access methods. In this second embodiment, some databases (e.g., 87, 88) are only accessible via access to and/or by computer system 40, and other databases (e.g., 85, 86) are only accessible via access to and/or by internet 220.

Figure 45:
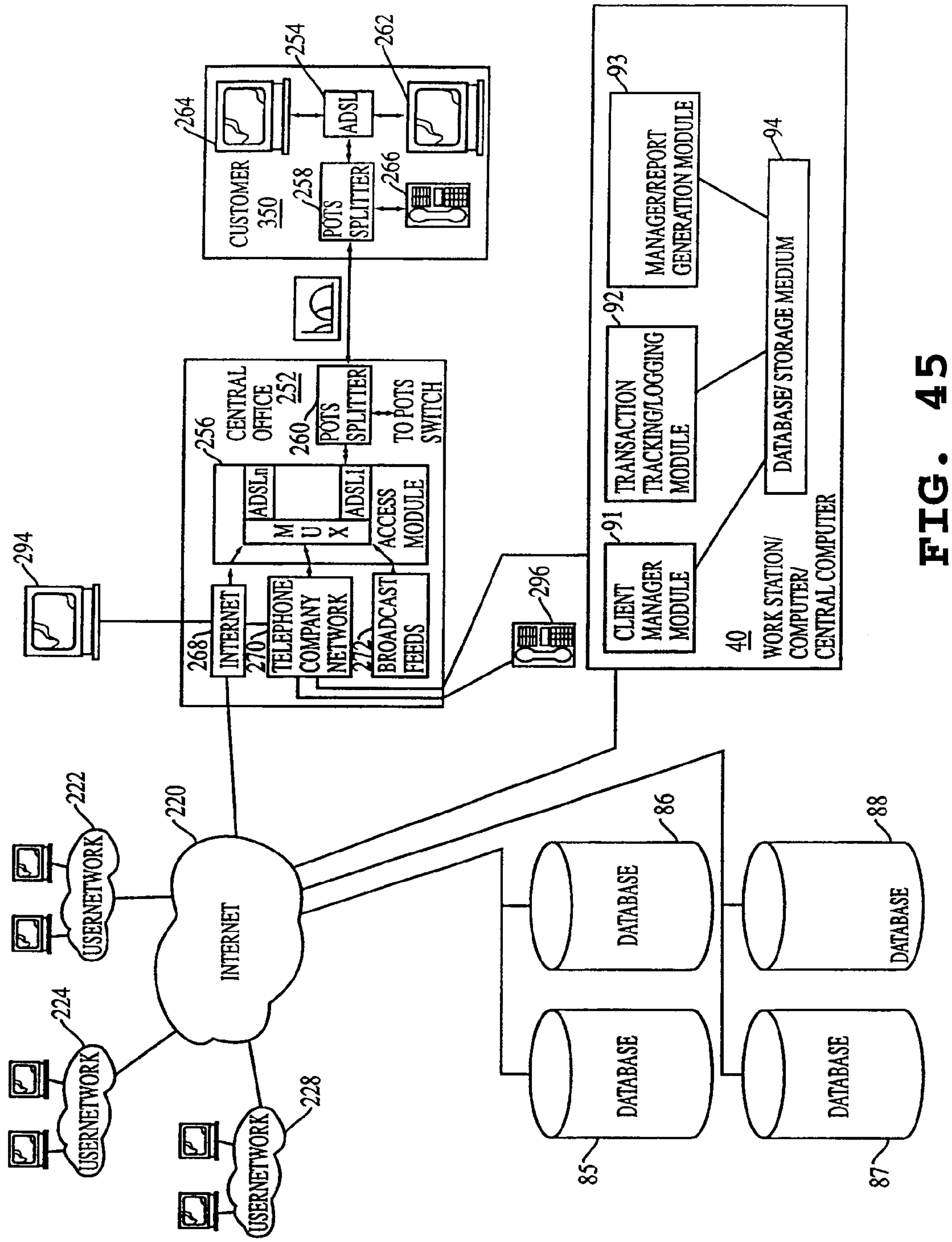
FIG. 45 is an illustration of the architecture of the combined internet, POTS, and ADSL architecture for use in the present invention in accordance with a first embodiment.

FIG. 45 is an illustration of the architecture of the combined internet, POTS, and ADSL architecture for use in the present invention in accordance with a third embodiment. As illustrated in this third embodiment, users may access or use or participate in the administration, management computer assisted program in computer 40 via various different access methods. In this third embodiment, the databases (e.g., 85, 86, 87 and/or 88) are only accessible via access to and/or by internet 220.

Figure 46:
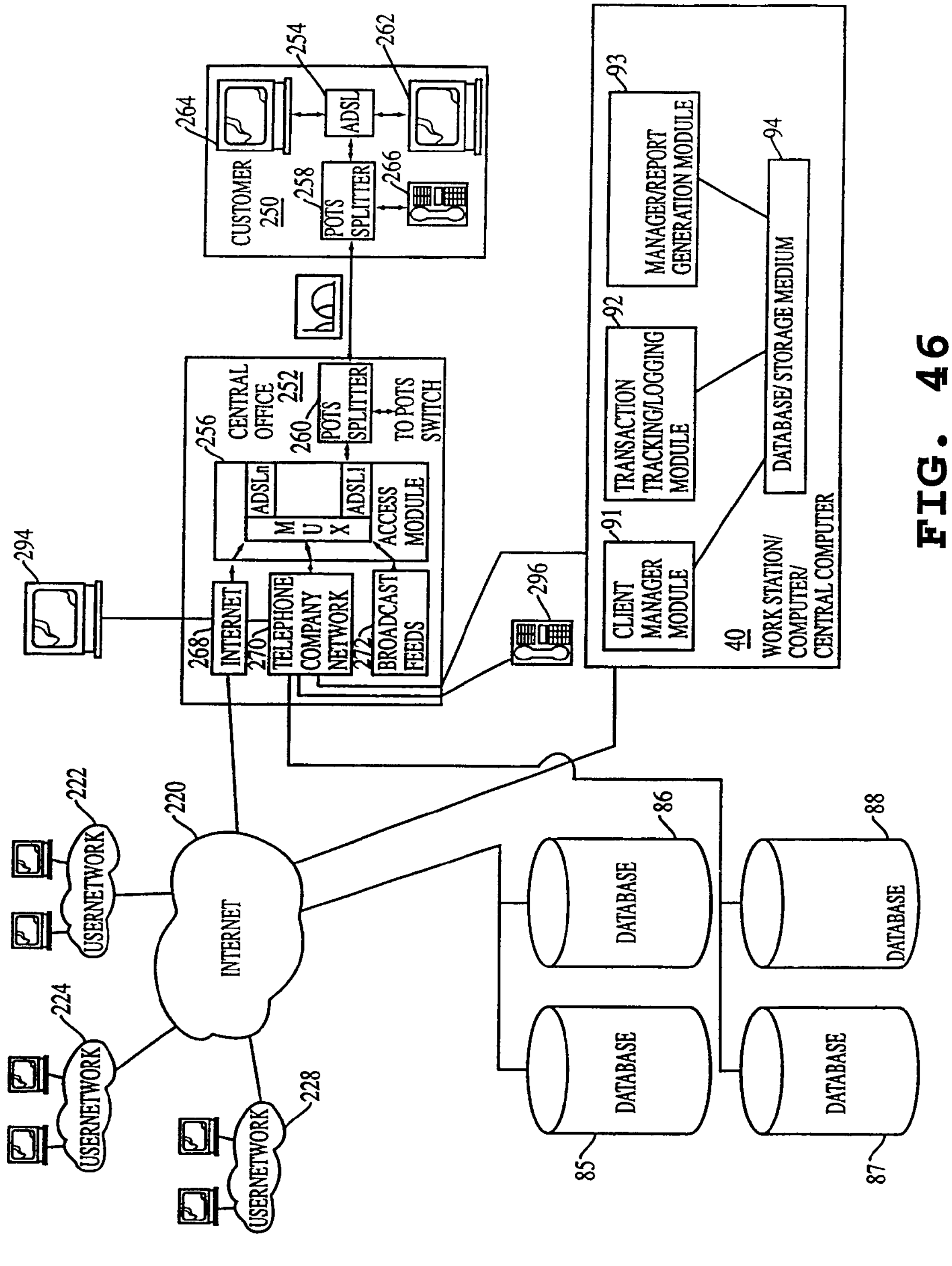
FIG. 46 is an illustration of the architecture of the combined internet, POTS, and ADSL architecture for use in the present invention in accordance with a second embodiment.

FIG. 46 is an illustration of the architecture of the combined internet, POTS, and ADSL architecture for use in the present invention in accordance with a fourth embodiment. As illustrated in this fourth embodiment, users may access or use or participate in the administration, management computer assisted program in computer 40 via various different access methods. In this fourth embodiment, some databases (e.g., 87, 88) are only accessible via access to and/or by ADSL system 256 via interface network 270, and other databases (e.g., 85, 86) are only accessible via access to and/or by internet 220.

The above embodiments are only to be construed as examples of the various different types of computer systems that may be utilized in combination with the computer assisted-implemented process of the present invention with wireless devices.

Figure 47:
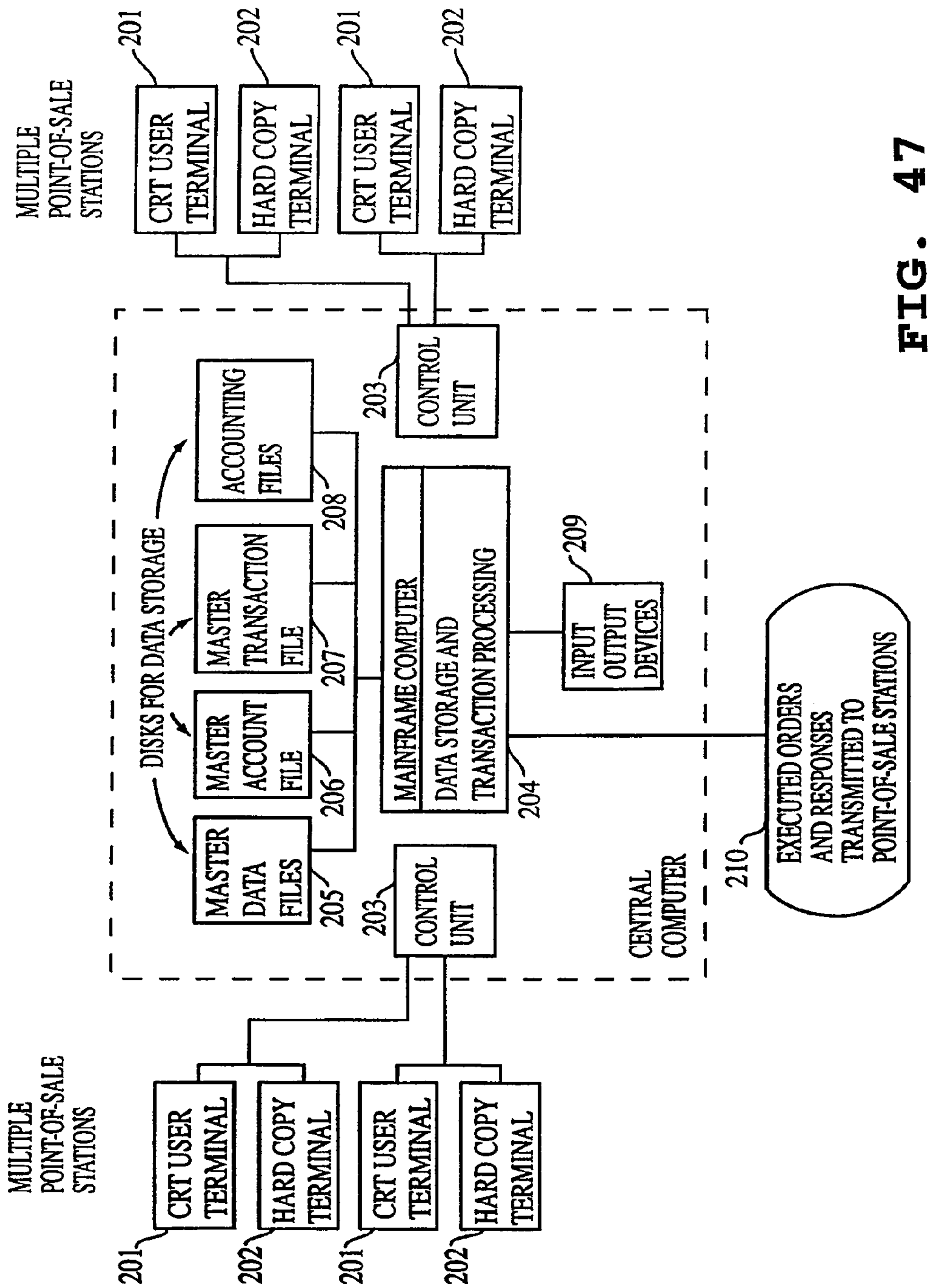
FIG. 47 is an illustration of the architecture of the combined internet, POTS, and ADSL architecture for use in the present invention in accordance with a third embodiment.

FIG. 47 is a block diagram of an alternative computer system suitable for implementing the invention. At each point-of-sale station, there is a CRT user terminal 201 and associated hard copy terminal 202. The hardware system would include a plurality of these terminals. Each terminal communicates with a central computer 204 through a control unit 203, which controls the point-of-sale terminals, receives purchase orders, redemption orders, and account inquiries from the point-of-sale stations and transmits them to the central computer and receives account verifications, transaction verifications, current market conditions, and responses to customer inquiries regarding account status from the central computer 204 and transmits them to the appropriate point-of-sale stations.

Each control unit could serve up to, for example, approximately 20 point-of-sale stations. The account verifications, transaction verifications, current market conditions, and responses to customer inquiries are transmitted first to the CRT user terminal 201. If the investor requests a written transaction record or a written account status report, the hard copy terminal 202 provides it upon command.

The central computer 204 contains storage space for data relating to transactions that are in process; processes all purchase and redemption transactions; performs the update operation; conducts the management information reporting operation and the period-by-period performance monitoring operation; calculates the income generated periodically in each account; and performs the individual record-keeping and reporting operation.

The central computer 204 transmits information to and receives information from the master data files 205 as required in order to retrieve current and projected market data, perform the update operation, conduct the management information reporting operation and the period-by-period performance monitoring operation, and retrieve the escalation rates needed to calculate revenues.

The central computer 204 also transmits information to and receives information from the master account file 206. The central computer 204 also transmits information to and receives information from the master transaction file 207 in connection with purchase and redemption transactions and in connection with management information reporting operation. The central computer 204 also transmits end-of-period financial statements to the accounting files 208 for storage and retrieves these statements from the accounting files 208 when prompted by the input/output devices of the central computer 209.

The system manager has a complement of input/output devices 209. Into the input devices are entered requests for the daily and periodic reports to the manager, the management information reports, the period-by-period investment performance reports, and the individual reports and instructions for managing and controlling the hardware system and its software. The output devices are used to obtain the daily and periodic reports to the manager, the management information reports, the period-by-period performance reports, and the individual reports.

Figure 48:
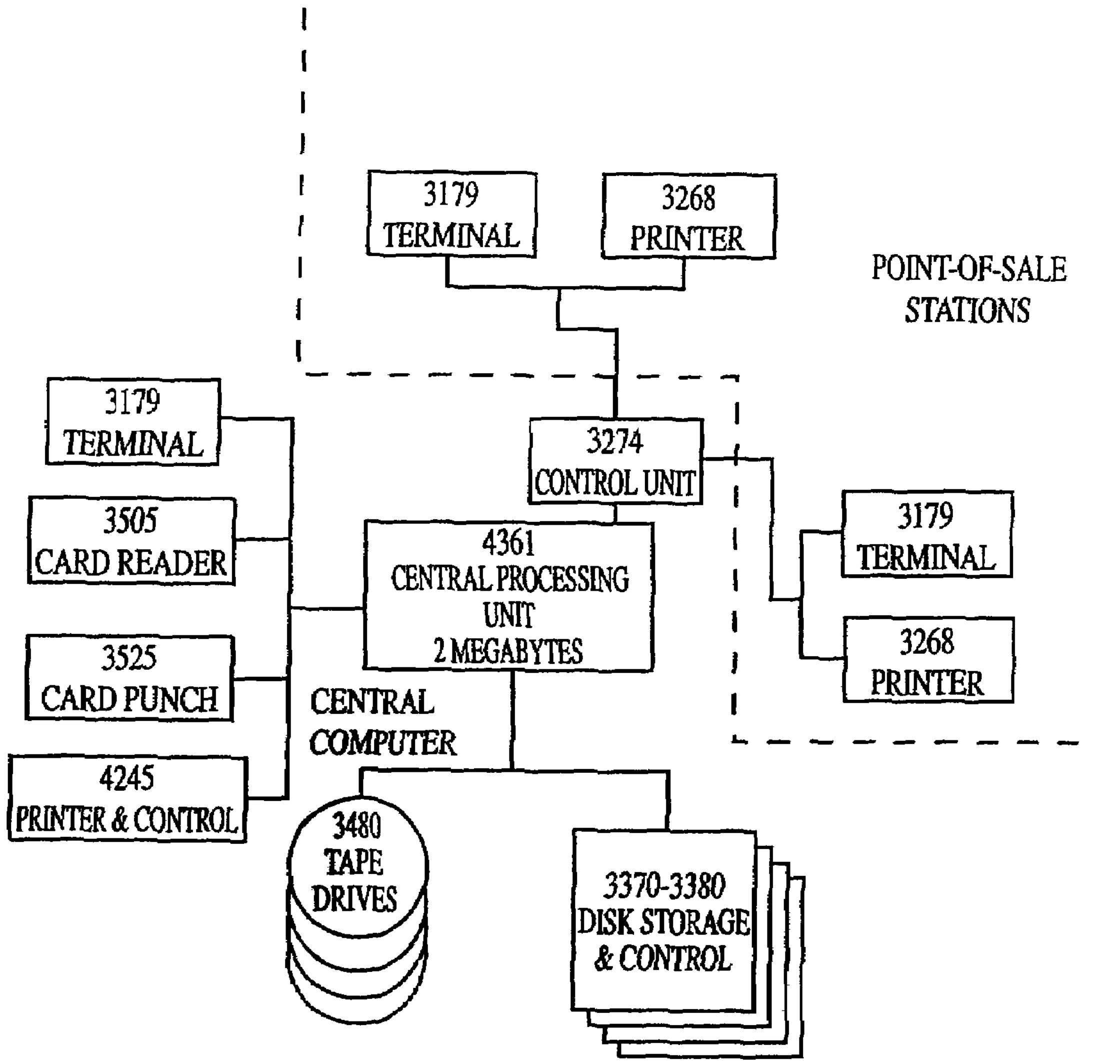
FIG. 48 is an illustration of the architecture of the combined internet, POTS, and ADSL architecture for use in the present invention in accordance with a fourth embodiment.

FIG. 48 is a block diagram showing a portion of the computer system of FIG. 47 in more detail. The exemplary system includes the following types of devices:

| Make Model | Item in FIG. 25 |
|---|---|
| IBM 3278 or 3279 or 3179 | CRT user terminal 201 |
| IBM 3268 | Hard copy terminal 202 |
| IBM 3274 | Control unit 203 |
| IBM 4361 | central computer 204 |
| IBM 3370-3380 | disks 205-208 |
| IBM 3420 or 3480 | tape drives 205-208 |
| IBM 3179 | CRT terminal 209 |
| IBM 3505 | card reader 209 |
| IBM 3525 | card punch 209 |
| IBM 4245 | printer 209 |

It is to be understood that there are a large number of commercially available substitutes for each item of hardware which could be combined into fully compatible systems. Accordingly, the scope of the invention is not limited by the particularity of the hardware system described herein.

The methods which are described herein, are implemented, for example, on the hardware system(s) described in FIG. 47 (or other suitable computer system) by embodying the flow-charted routines into a series of software packages that substantially follow the sequence of steps in the flow charts. There are conventional software packages that are commercially available that can also be adapted to perform one or more of the steps described herein. Accordingly, as described below, it would not be necessary in order to implement the invention to write separate software for each step from scratch.

The Point-of Sale software package marketed by International Business Machines (IBM), for example, is a general interactive data package for point-of-sale applications that can be formatted to provide the precise means of receiving customer orders and inquiries, and transmitting the responses to customer inquiries, and the transaction reports.

The Interactive Financial Systems (IFS) library of software packages marketed by IBM, for example, contains a set of general financial and accounting packages that can be adapted and formatted to provide the data base management, accounting, and financial reporting operations required to implement the invention. Part I of IFS contains data base management routines, which can be used to manage the master data files 205, the master account file 206, the master transaction file 207, and the accounting files 208. It also contains routines that can be adapted to handle the account management functions.

Part II of IFS contains general routines that cover general ledger maintenance and the preparation of financial statements and related schedules. It can be adapted and formatted to provide the precise means of preparing the daily transaction summary and summary of current position; the end-of-period investment performance and position report; the end-of-period reports to account holders; the end-of-period statements; and the report to the manager. Part III of IFS can be adapted to monitor accounts receivable. As an alternative to the IFS software package, the MSA software package produced by Management Science of America can be used.

The VSE/SP software package marketed by IBM contains a complete software package for operating the hardware system diagramed in FIGS. 25-26. It is possible to write the software needed to implement each of the other routines in one of the available user languages, such as FORTRAN, Pascal, C, C++, and the like, by following the sequence of steps described herein.

Notations and Nomenclature

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

For example, the specific sequence of the above described process may be altered so that certain processes are conducted in parallel or independent, with other processes, to the extent that the processes are not dependent upon each other. Thus, the specific order of steps described herein are not to be considered implying a specific sequence of steps to perform the above described process. Other alterations or modifications of the above processes are also contemplated. For example, further insubstantial approximations of the above equations are also considered within the scope of the processes described above. One or more, or all of the above steps may optionally be performed manually. The above embodiments are only to be construed as examples of the various different types of computer systems that may be utilized in connection with the computer assisted-implemented process for purchasing and provisioning items over global and/or local networks.

GLOSSARY

Dongle: a small security device that attaches to a computer port to control access to a specific software application. A dongle-protected program will run only when its dongle is attached to the computer.

Piconet: two or more Bluetooth units sharing the same channel—that is, operating in synchronism and following the same hopping sequence.

Profile: a document that describes exactly how different basic protocols and procedures work together in various kinds of Bluetooth devices and applications.

Service discovery protocol (SDP): a procedure used by Bluetooth-enabled devices to determine what services are available from or through other Bluetooth-enabled devices.

The invention claimed is:

1. A method of dynamically at least one of allocating at least one of: goods or services to an event customer; establishing communication with a mobile device user; and providing entertainment to a customer via a data communication network, said data communication network optionally comprising a server, workstations operably connectable to said server, one or more databases operably connectable to said server and said workstations, said workstations optionally including a web browser interface facilitating communication with said server, a point of sale server operably connectable to the server, a point of sale system operably connectable to the point of sale server, and wireless devices operably connectable to said server, said wireless devices comprising at least one of a transmitter and receiver and a transceiver for receiving and transmitting signals, said method comprising the at least one of the sequential, non-sequential and sequence independent steps of:

(a) at least one of receiving a communication from and transmitting the communication to the event customer, the communication including a request to at least one of obtain admittance to at least one event, establish communication, and obtain at least one of goods and services, the communication optionally also including an identifier associated with an identification device;

(b) optionally updating an account associated with said identifier to reflect the request;

(c) at least one of accessing and verifying the account, optionally by utilizing the identifier associated with the identification device;

(d) at least one of sending to the event customer information regarding the request to obtain admittance from the event customer to a venue optionally after verification of the request, entering the event customer in a communication database, and entering the event customer to obtain the at least one of goods and services;

(e) at least one of determining an available allocation associated with the event, establishing communication with the event customer, and notifying at least one of the event customers that are at least one of currently attending the event and registered for at least one of allocating, provisioning, upgrading and awarding responsive to said determining the available allocation, and determining the at least one of the goods and services to be provisioned for the at least one event customer;

(f) receiving an acceptance from at least one of the event customers at least one of said at least one of: allocating, provisioning, upgrading and awarding in accordance with predetermined criteria, said communication, and said at least one of goods and services communication;

(g) obtaining at least one mobile contact address used thereon by the event user to establish said communication with the event user;

(h) optionally transmitting a confirmation to the at least one wireless device confirming to the at least one event customer the at least one of said at least one of: allocating, provisioning, upgrading and awarding;

(i) determining event customers to be notified via the at least one wireless device, and notifying the event customers responsive to customer profiles when they exist comprising at least one of communication, patron satisfaction communication, additional revenue, additional advertising, and advertising sponsorship for advertising on the wireless device;

(j) polling by a computer system implementing said server a plurality of users of the wireless devices for additional communications including additional requests for at least one of additional movie tickets, additional sporting event tickets, additional concessions, additional services, additional offers, additional entertainment services and additional merchandise;

(k) optionally, when said communication is unsuccessful or potentially unsuccessful with the event user, transmitting another communication to at least another communication network using at least a portion of the at least one mobile contact address provided from the event user and at least one network address, and the event user optionally confirming receipt of said another communication;

(l) optionally billing the at least one of the event customers in at least one of real-time or at a later time for at least one of said at least one of allocating, provisioning, upgrading and awarding and said at least one of goods and services in accordance with the second predetermined criteria; and (m) optionally receiving payment from at least one of the event customers responsive to said billing step (l).

2. The method of claim 1, wherein said identification device comprises a memory medium for storing the identifier, and wherein said accessing step further comprises reading said identifier from said identification device with a reading device.

3. The method of claim 1, wherein the account is stored in at least one of the server, the identification device, and the point of sale server.

4. The method of claim 1, further comprising receiving demographic information from the event customer.

5. The method of claim 1, further comprising generating at least one of a physical receipt, a confirmation, and an electronic confirmation with at least one of the identification device and the point of sale server.

6. A method of dynamically providing at least one of goods and services to a customer via a data communication network, said data communication network optionally comprising a server, workstations operably connectable to said server, one or more databases operably connectable to said server and said workstations, said workstations optionally including a web browser interface facilitating communication with said server, a point of sale server operably connectable to the server, a point of sale system operably connectable to the point of sale server, and wireless devices operably connectable to said server, said wireless devices comprising at least one of a transmitter and receiver and a transceiver for receiving and transmitting signals, said method comprising the at least one of the sequential, non-sequential and sequence independent steps of:

(a) at least one of receiving a communication from and transmitting the communication to the event customer, the communication optionally also including an identifier associated with an identification device;

(b) optionally updating an account associated with said identifier to reflect the request;

(c) at least one of accessing and verifying the account, optionally by utilizing the identifier stored on the identification device;

(d) entering the event customer to participate in the obtaining of at least one of goods, services and offering;

(e) determining at least one of a concessions and offering communication for the at least one event customer;

(f) transmitting a confirmation to the at least one wireless device confirming to the at least one event customer the at least one of said concessions and offering;

(g) determining event customers to be notified via the at least one wireless device, and notifying the event customers responsive to customer profiles when they exist comprising at least one of communication, patron satisfaction communication, additional revenue, additional advertising, additional offering and advertising sponsorship for advertising on the wireless device;

(h) polling by a computer system implementing said server a plurality of users of the wireless devices for additional communications including additional requests for at least one of additional movie tickets, additional sporting event tickets, additional concessions, additional services, additional offers, additional entertainment services and additional merchandise;

(i) optionally receiving an acceptance from at least one of the event customers said at least one of concessions and offering communication;

(j) optionally billing the at least one of the event customers in at least one of real-time or at a later time for said at least one of goods and services in accordance with the second predetermined criteria; and (k) optionally receiving payment from the at least one of the event customers responsive to said billing step (j).

7. A method according to claim 6, further comprising the step of requesting the event customer to input location information.

8. A method according to claim 6, further comprising the step of receiving location information from at least one of a venue database system, kiosk where the event customer enters the location information and a point of sales system from an attendant selling seating information.

9. A method according to claim 6, further comprising the step of targeting sections of the venue to provide at least one other service or offering to the event customers seated in various of the sections of the venue.

10. A method according to claim 9, wherein the sections that can be separately or substantially targeted include at least one of: behind first base line; behind home plate; first base line; lower deck; upper deck; bleachers; in the venue; outside the venue; and a predetermined geographic location.

11. A method according to claim 9, wherein at least one of the sections that can be separately or substantially targeted are awarded at least one winner representative therefor.

12. A method according to claim 11, wherein at least another of the sections that can be separately or substantially targeted are awarded at least another winner representative therefor, and the winner representative and the another winner representative compete against each other in additional entertainment programs.

13. A method according to claim 9, wherein the sections are at least one of separately and substantially targeted, and wherein said method further includes the step of targeting the different sections over different periods of time, thereby preventing a long delay to receive answers once the question is transmitted, and to optionally minimize collusion among event customers.

14. A method according to claim 9, wherein the sections are at least one of separately and substantially targeted, and wherein said method further includes the step of transmitting the entertainment program to customers located in different sections over a predetermined time interval.

15. A method according to claim 9, further comprising the steps of:

transmitting an entertainment program to first customers located in different sections over a first predetermined time interval in a first round; and transmitting the entertainment program to second customers located in different sections over a second predetermined time interval in a second round, wherein the second customers are a smaller set of participants in the entertainment program than the first customers.

16. A method according to claim 9, further comprising the steps of:

transmitting a first portion of the entertainment program to first customers over a first predetermined time interval in a first round requesting that the first customers respond with at least one first response; and transmitting a second portion of the entertainment program to second customers over a second predetermined time interval in a second round requesting that the second customers respond with at least one second response, wherein the first and second responses are unique with respect to each other.

17. A method according to claim 9, further comprising the steps of:

transmitting a first portion of the entertainment program to first customers over a first predetermined time interval in a first round requesting that the first customers respond with at least one first response from a first set of responses; and transmitting a second portion of the entertainment program to second customers over a second predetermined time interval in a second round requesting that the second customers respond with at least one second response from a second set of responses, wherein the first and second set of responses are all unique with respect to each other.

18. A method of dynamically establishing communication with a mobile device user via a data communication network, said data communication network optionally comprising a server, workstations operably connectable to said server, one or more databases operably connectable to said server and said workstations, said workstations optionally including a web browser interface facilitating communication with said server, a point of sale server operably connectable to the server, a point of sale system operably connectable to the point of sale server, and wireless devices operably connectable to said server, said wireless devices comprising at least one of a transmitter and receiver and a transceiver for receiving and transmitting signals, said method comprising the at least one of the sequential, non-sequential and sequence independent steps of:

(a) at least one of receiving a communication from and transmitting a communication to, an event customer, the communication including a request to establish communication, the communication also including an identifier associated with an identification device;

(b) updating a database to reflect said communication;

(c) at least one of accessing and verifying said updating step (b) optionally by utilizing the identifier associated with the identification device;

(d) entering the event customer in a communication database;

(e) determining at least one mobile communication address to communicate with the event user, said determining step (e) optionally requiring the event user to provide a network address associated with the at least one mobile communication address;

(f) establishing communication with the event customer;

(g) receiving a communication from the at least one event customer regarding said communication;

(h) optionally when said communication is unsuccessful or potentially unsuccessful with the event user, transmitting another communication to at least another communication network using at least a portion of the at least one mobile communication address, and the event user optionally confirming receipt of said another communication;

(i) transmitting a confirmation to the at least one event customer;

(j) determining event customers to be notified, and notifying the event customers responsive to customer profiles when they exist comprising at least one of communication, patron satisfaction communication, additional revenue, additional advertising, and advertising sponsorship for advertising on the wireless device; and (k) polling by a computer system implementing said server a plurality of users of the wireless devices for additional communications including additional requests for at least one of additional movie tickets, additional sporting event tickets, additional concessions, additional services, additional offers, additional entertainment services and additional merchandise.

19. The method of claim 18, further comprising the steps of:

transmitting to and receiving from, the at least one wireless device of the event customer the communication including the request for at least one of the movie ticket, the sporting event ticket, the concession, the service, the offer, the entertainment service and the merchandise, via at least one of a short message text service (SMS) communication, bluetooth and a wireless communication comprising an identifier associated with the wireless device and an Internet Protocol (IP) address that at least one of are displayed on and notify the wireless device upon receipt from the wireless device.

registering the event customer, and processing customer profiles when they exist in accordance with predetermined criteria, and determining responsive to the processing of the customer profiles event customers to be notified via the at least one wireless device, and notifying the event customers responsive to the customer profiles comprising at least one of patron satisfaction communication, additional revenue, additional advertising, and advertising sponsorship for advertising on the wireless device; and polling the wireless devices of a plurality of users for additional communications including additional requests for at least one of additional movie tickets, additional sporting event tickets, additional concessions, additional services, additional offers, additional entertainment services and additional merchandise.

20. The method of claim 18, further comprising the step of processing customer profiles when they exist in accordance with predetermined criteria, and determining responsive to the processing of the customer profiles event customers to be notified via the at least one wireless device, and notifying the event customers responsive to the customer profiles comprising advertising sponsorship for advertising on the wireless device.

21. A method of dynamically at least one of: allocating goods or services to an event customer; establishing communication with a mobile device user; and providing entertainment to a customer via a data communication network, said data communication network optionally comprising a server, workstations operably connectable to said server, one or more databases operably connectable to said server and said workstations, said workstations optionally including a web browser interface facilitating communication with said server, a point of sale server operably connectable to the server, a point of sale system operably connectable to the point of sale server, and wireless devices operably connectable to said server, said wireless devices comprising at least one of a transmitter and receiver and a transceiver for receiving and transmitting signals, said method comprising the at least one of the sequential, non-sequential and sequence independent steps of:

(a) at least one of receiving a first communication from and transmitting the first communication to a first event customer, the communication including a first request to at least one of obtain admittance to at least one event, establish communication, and obtain at least one of goods and services;

(b) at least one of accessing and verifying an account associated with the first communication;

(c) at least one of receiving a second communication from and transmitting the second communication to a second event customer, the second communication including a second request to at least one of obtain admittance to at least one event, establish communication, and obtain at least one of goods and services;

(d) at least one of accessing and verifying an account associated with the second communication;

(e) at least one of sending to the first and second event customers information regarding the first and second communications to obtain admittance optionally after verification of the first and second communications, entering the first and second event customers in a communication database, and entering the first and second event customers to obtain the at least one of goods and services;

(f) at least one of determining an available allocation associated with the event, establishing communication with the first and second event customers, and notifying at least one of the first and second event customers that are at least one of currently attending the event and registered for at least one of allocating, provisioning, upgrading and awarding responsive to said determining the available allocation, and determining the at least one of the goods and services to be provisioned for the at least one of the first and second event customers;

(g) optionally receiving an acceptance from the at least one of the first and second event customers at least one of said at least one of: allocating, provisioning, upgrading, communicating and awarding in accordance with predetermined criteria, said communication, and said at least one of goods and services communication;

(h) optionally transmitting a confirmation to at least one wireless device confirming to the at least one of the first and second event customers the at least one of said at least one of: allocating, provisioning, upgrading, communicating and awarding;

(i) determining event customers to be notified via the at least one wireless device, and notifying the event customers responsive to customer profiles when they exist comprising at least one of communication, patron satisfaction communication, additional revenue, additional advertising, and advertising sponsorship for advertising on the wireless device;

(j) polling by a computer system implementing said server a plurality of users for additional communications including additional requests for at least one of additional movie tickets, additional sporting event tickets, additional concessions, additional services, additional offers, additional communications, additional entertainment services and additional merchandise.

22. The method of claim 21, wherein said transmitting to the wireless device further comprises transmitting to the wireless device using a unique address including a username and domain associated with at least one of the customer and the wireless device.

23. The method of claim 21, wherein the customer is registered by at least one of receiving a message from the customer and receiving automatically a response form the customer to the communication, and the method further includes parsing the received information including an address for communication with the customer.

24. The method of claim 21, further comprising the step of provisioning of demographic information to program sponsors by receiving information from each user.

25. The method of claim 21, further comprising the step of compiling information for advertising and marketing used to create custom offerings to users for creating targeted programs that address user needs and for targeting potential new customers.

26. The method of claim 21, further comprising the step of running different applications, thereby achieving interoperability among applications.

27. The method of claim 21, further comprising the step of communicating using at least one mobile network carrier using a communications technology and uniform interface standard for presenting and delivering wireless services on mobile devices.

28. A method of dynamically at least one of: allocating goods or services to an event customer; establishing communication with a mobile device user; and providing entertainment to a customer via a data communication network, said data communication network optionally comprising a server, workstations operably connectable to said server, one or more databases operably connectable to said server and said workstations, said workstations optionally including a web browser interface facilitating communication with said server, a point of sale server operably connectable to the server, a point of sale system operably connectable to the point of sale server, and wireless devices operably connectable to said server, said wireless devices comprising at least one of a transmitter and receiver and a transceiver for receiving and transmitting signals, said method comprising the at least one of the sequential, non-sequential and sequence independent steps of:

(a) at least one of receiving a first communication from and transmitting the first communication to a first event customer, the communication including a first request to at least one of obtain admittance to at least one event, establish communication, and obtain at least one of goods and services;

(b) at least one of accessing and verifying an account associated with the first communication;

(c) at least one of receiving a second communication from and transmitting the second communication to a second event customer, the second communication including a second request to at least one of obtain admittance to at least one event, establish communication, and obtain at least one of goods and services;

(d) at least one of accessing and verifying an account associated with the second communication;

(e) sending to the first and second event customers information to obtain admittance optionally after verification of the first and second requests, entering the first and second event customers in a database;

(f) determining a predetermined time period associated with the event indicative of event customers not attending the event in accordance with first predetermined criteria including at least one of agreement with one or more of the event customers, the event customer not providing notice of non-attendance a first predetermined time period prior to the event, the event customer not providing notice of non-attendance a second predetermined time period after start of the event, the event customer leaving the event early, and other predetermined criteria;

(g) polling the wireless devices of a plurality of users to determine whether additional seats have been made available, and if additional seats have been made available, then adding the additional seats to a list of available seats for said method of dynamically at least one of allocating, upgrading and awarding admittance to the events to the event customer;

(h) releasing an allocation associated with the another event customer and notifying at least one of the first and second event customers that are at least one of currently attending the event and registered for said at least one of reallocating, reprovisioning, upgrading and awarding responsive to said releasing the allocation; and (i) optionally receiving an acceptance from at least one of the first and second event customers said at least one of reallocating, reprovisioning, upgrading and awarding in accordance with second predetermined criteria;

(j) optionally transmitting a confirmation to at least one wireless device confirming to the at least one of the first and second event customers the at least one of said at least one of: allocating, provisioning, upgrading and awarding;

(k) determining event customers to be notified via the at least one wireless device, and notifying the event customers responsive to customer profiles when they exist comprising at least one of communication, patron satisfaction communication, additional revenue, additional advertising, and advertising sponsorship for advertising on the wireless device;

(l) polling by a computer system implementing said server a plurality of users for additional communications including additional requests for at least one of additional movie tickets, additional sporting event tickets, additional concessions, additional services, additional offers, additional entertainment services and additional merchandise.

29. The method of claim 28, further comprising the step of processing customer profiles when they exist in accordance with predetermined criteria, and determining responsive to the processing of the customer profiles the at least one of the first and second event customers to be notified via the at least one wireless device, and notifying the at least one of the first and second event customers responsive to the customer profiles comprising seating the first and second event customers in adjacent seats for a date.

30. The method of claim 28, further comprising the step of processing customer profiles when they exist in accordance with predetermined criteria, and determining responsive to the processing of the customer profiles the at least one of the first and second event customers to be notified via the at least one wireless device, and notifying the at least one of the first and second event customers responsive to the customer profiles comprising modifying the seating of the first and second event customers to adjacent seats for a date in accordance with a predetermined time period.

31. A system of dynamically providing at least one of goods and services to a customer via a data communication network, said data communication network optionally comprising a server, workstations operably connectable to said server, one or more databases operably connectable to said server and said workstations, said workstations optionally including a web browser interface facilitating communication with said server, a point of sale server operably connectable to the server, a point of sale system operably connectable to the point of sale server, and at least one wireless device operably connectable to said server, said wireless device comprising at least one of a transmitter and receiver and a transceiver for receiving and transmitting signals, said system comprising:

a computer processor executing instructions stored on a computer readable medium, and performing at least one of the sequential, non-sequential and sequence functions of:

(a) enabling at least one of receiving a communication from and transmitting the communication to the event customer, the communication optionally also including an identifier associated with an wireless device;

(b) optionally enabling updating an account associated with said identifier to reflect the request;

(c) enabling at least one of accessing and verifying the account, optionally by utilizing the identifier stored on the wireless device;

(d) enabling entering of the event customer to participate in the obtaining of at least one of goods, services and offering;

(e) enabling determining at least one of a concessions and offering communication for the at least one event customer;

(f) enabling transmitting a confirmation to the at least one wireless device confirming to the at least one event customer the at least one of said concessions and offering;

(g) enabling determining event customers to be notified via the at least one wireless device, and enabling notifying the event customers responsive to customer profiles when they exist comprising at least one of communication, patron satisfaction communication, additional revenue, additional advertising, additional offering and advertising sponsorship for advertising on the wireless device;

(h) enabling polling a plurality of users of the wireless devices for additional communications including additional requests for at least one of additional movie tickets, additional sporting event tickets, additional concessions, additional services, additional offers, additional entertainment services and additional merchandise;

(i) optionally enabling receiving an acceptance from at least one of the event customers said at least one of concessions and offering communication;

(j) optionally enabling billing the at least one of the event customers in at least one of real-time or at a later time for said at least one of goods and services in accordance with the second predetermined criteria; and (k) optionally enabling receiving payment from the at least one of the event customers responsive to said billing step (j).

32. A computer system according to claim 31, wherein said computer system further enables receiving location information from at least one of a venue database system, kiosk where the event customer enters the location information, the customer and a point of sales system from an attendant selling seating information.

33. A computer system according to claim 31, wherein said computer system further enables targeting sections of the venue to provide at least one other service or offering to the event customers in various of the sections of the venue.

34. A computer system according to claim 33, wherein the sections are at least one of separately and substantially targeted, and wherein said method further includes the step of targeting the different sections over different periods of time, thereby preventing a long delay to receive answers once the question is transmitted, and to optionally minimize collusion among event customers.

35. A computer system according to claim 33, wherein the sections are at least one of separately and substantially targeted, and wherein said method further includes the step of transmitting the entertainment program to customers located in different sections over a predetermined time interval.

36. A computer system according to claim 33, wherein said computer system further:

enables transmitting an entertainment program to first customers located in different sections over a first predetermined time interval in a first round; and enables transmitting the entertainment program to second customers located in different sections over a second predetermined time interval in a second round, wherein the second customers are a smaller set of participants in the entertainment program than the first customers.

37. A computer system according to claim 33, wherein said computer system further:

enables transmitting a first portion of the entertainment program to first customers over a first predetermined time interval in a first round requesting that the first customers respond with at least one first response; and enables transmitting a second portion of the entertainment program to second customers over a second predetermined time interval in a second round requesting that the second customers respond with at least one second response, wherein the first and second responses are unique with respect to each other.

38. A computer system according to claim 31, wherein said computer system further enables interactive messaging between the computer system and the at least one wireless device based on at least one of a pre-formatted data format and predetermined data format.

39. A method according to claim 1, further comprising enabling interactive messaging with the at least one wireless device based on at least one of a pre-formatted data format and predetermined data format.

40. A method according to claim 6, further comprising enabling interactive messaging with the at least one wireless device based on at least one of a pre-formatted data format and predetermined data format.

41. A method according to claim 18, further comprising enabling interactive messaging with the at least one wireless device based on at least one of a pre-formatted data format and predetermined data format.

42. A method according to claim 21, further comprising enabling interactive messaging with the at least one wireless device based on at least one of a pre-formatted data format and predetermined data format.

43. A method according to claim 28, further comprising enabling interactive messaging with the at least one wireless device based on at least one of a pre-formatted data format and predetermined data format.

* * * * *